United States Patent
Henrichs

(10) Patent No.: US 7,782,731 B2
(45) Date of Patent: Aug. 24, 2010

(54) OPTICAL HARD DISK DRIVE HAVING A PHASE-CHANGE MICROHEAD ARRAY CHIP

(76) Inventor: Joseph Reid Henrichs, 641 NE. Swann Cir., Lee's Summit, MO (US) 64086-8464

( * ) Notice: Subject to any disclaimer, the term of this patent is extended or adjusted under 35 U.S.C. 154(b) by 833 days.

(21) Appl. No.: 10/201,366

(22) Filed: Jul. 23, 2002

(65) Prior Publication Data

US 2003/0161245 A1 Aug. 28, 2003

Related U.S. Application Data

(60) Provisional application No. 60/307,130, filed on Jul. 23, 2001.

(51) Int. Cl.
*G11B 7/20* (2006.01)

(52) U.S. Cl. .................. 369/95; 369/101; 369/102; 369/126

(58) Field of Classification Search .............. 369/95, 369/96, 121, 124.03, 101, 102, 126
See application file for complete search history.

(56) References Cited

U.S. PATENT DOCUMENTS

| | | | | |
|---|---|---|---|---|
| 5,177,727 A | * | 1/1993 | Mashimo | 369/44.37 |
| 5,615,198 A | * | 3/1997 | Kubokawa | 369/102 |
| 5,726,828 A | * | 3/1998 | Kakuta et al. | 360/98.01 |
| 5,754,509 A | * | 5/1998 | Miyazaki et al. | 369/53.29 |
| 5,777,314 A | * | 7/1998 | Roustaei | 235/462.42 |
| 5,986,996 A | * | 11/1999 | Kitamura et al. | 369/112.16 |
| 6,005,743 A | * | 12/1999 | Price et al. | 360/78.12 |
| 6,026,033 A | * | 2/2000 | Casper | 365/189.09 |
| 6,072,761 A | * | 6/2000 | Tani | 369/116 |
| 6,130,873 A | * | 10/2000 | Lazarev et al. | 369/116 |
| 6,154,326 A | * | 11/2000 | Ueyanagi et al. | 359/819 |
| 6,178,146 B1 | * | 1/2001 | Hogan | 369/47.41 |
| 6,208,485 B1 | * | 3/2001 | Chainer et al. | 360/98.07 |
| 6,249,824 B1 | * | 6/2001 | Henrichs | 710/8 |
| 6,266,712 B1 | * | 7/2001 | Henrichs | 710/8 |
| 6,466,528 B1 | * | 10/2002 | Pietruszynski et al. | 369/44.29 |
| 6,614,744 B2 | * | 9/2003 | Trezza | 369/121 |
| 6,661,820 B1 | * | 12/2003 | Camilleri et al. | 372/38.09 |
| 2003/0012107 A1 | * | 1/2003 | Fukui et al. | 369/53.25 |

* cited by examiner

*Primary Examiner*—Dismery E Mercedes
(74) *Attorney, Agent, or Firm*—K&L Gates LLP

(57) ABSTRACT

An optical data-storage hard disk drive that uses stationary Phase-Change Microhead Array Chips in place of conventional flying-heads, rotary voice-coil actuators, or other similar types of servo-tracking mechanisms to simultaneously record and/or reproduce data to and/or from a multitude of data-tracks located across the data-surfaces of a multitude of phase-change based disc media using a multitude of microheads.

15 Claims, 115 Drawing Sheets

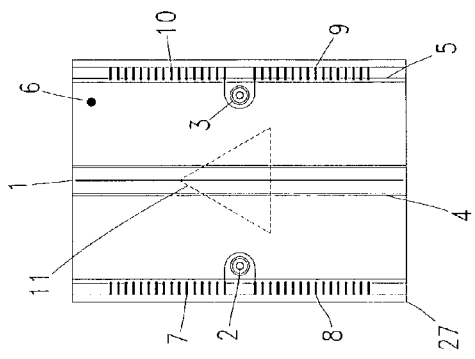
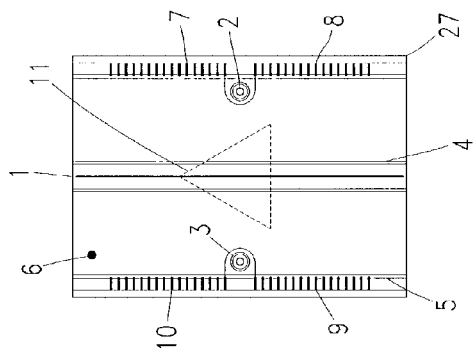
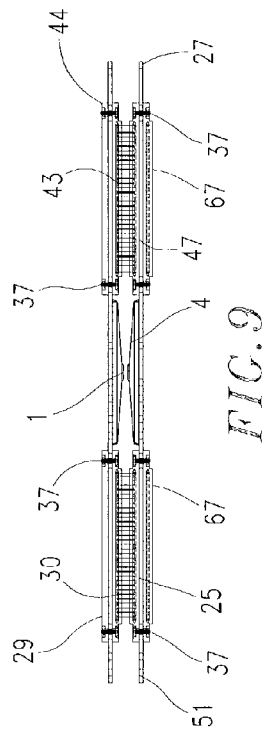
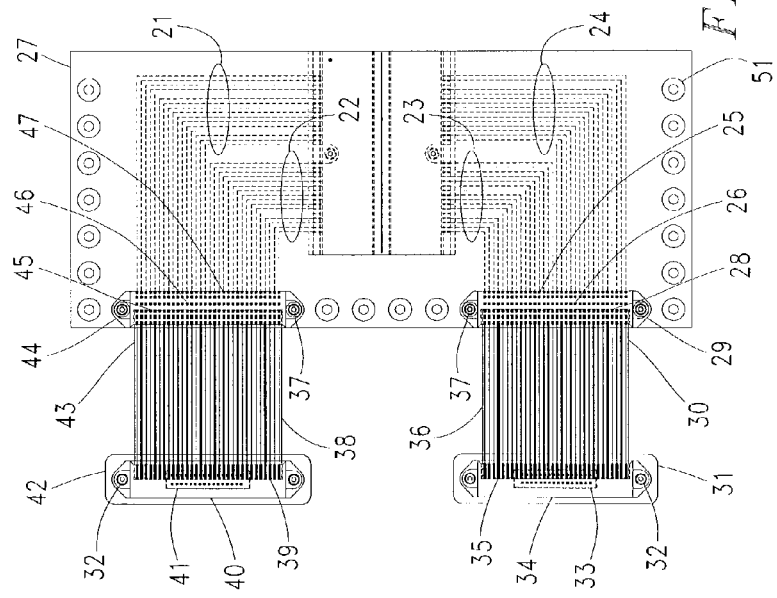
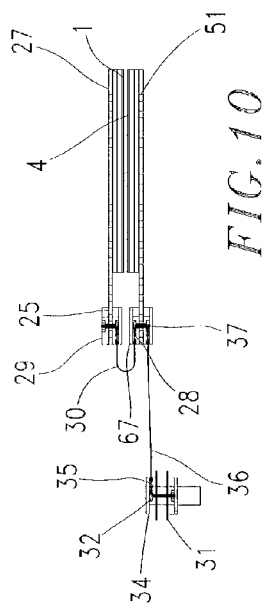

*RD — Redirected point-to-point (-CS) or "Chip Select" line.

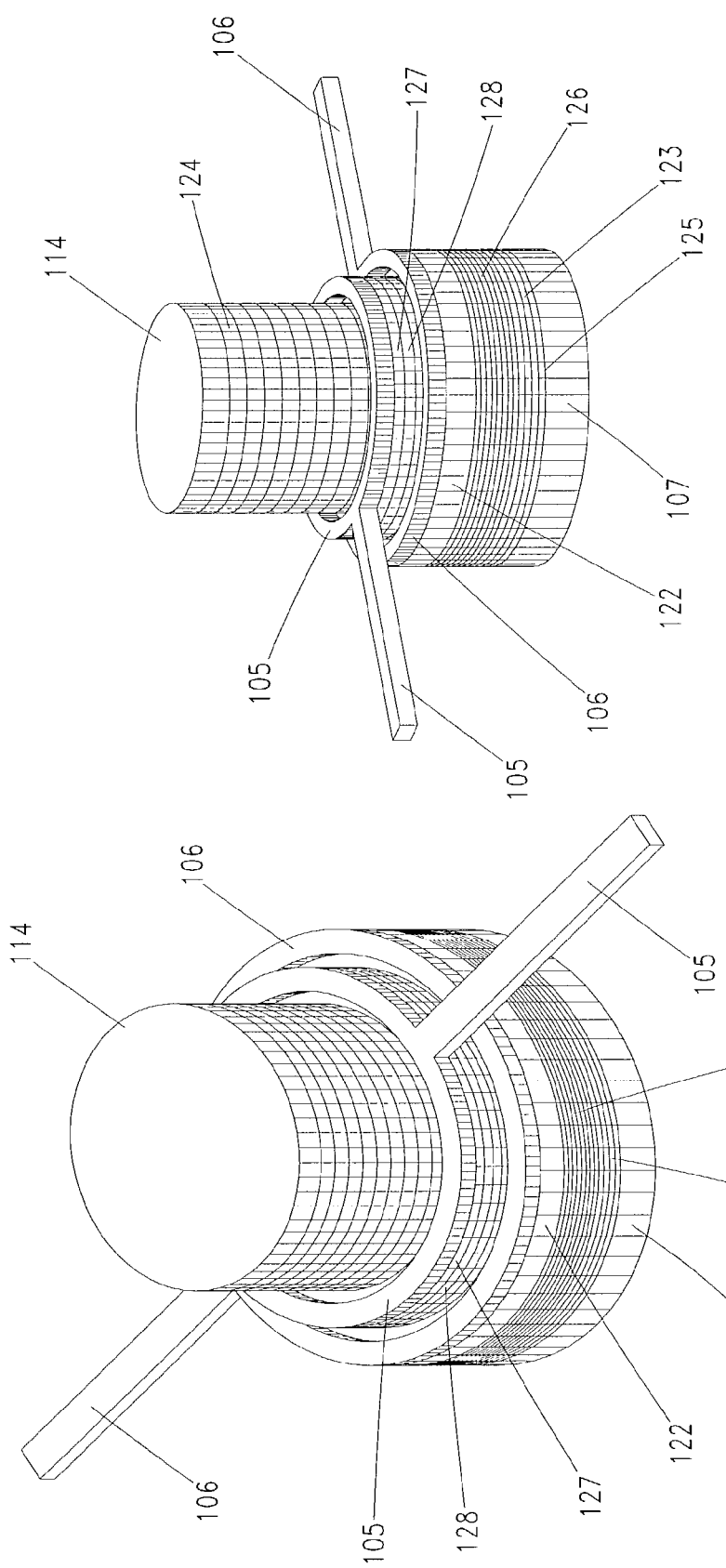

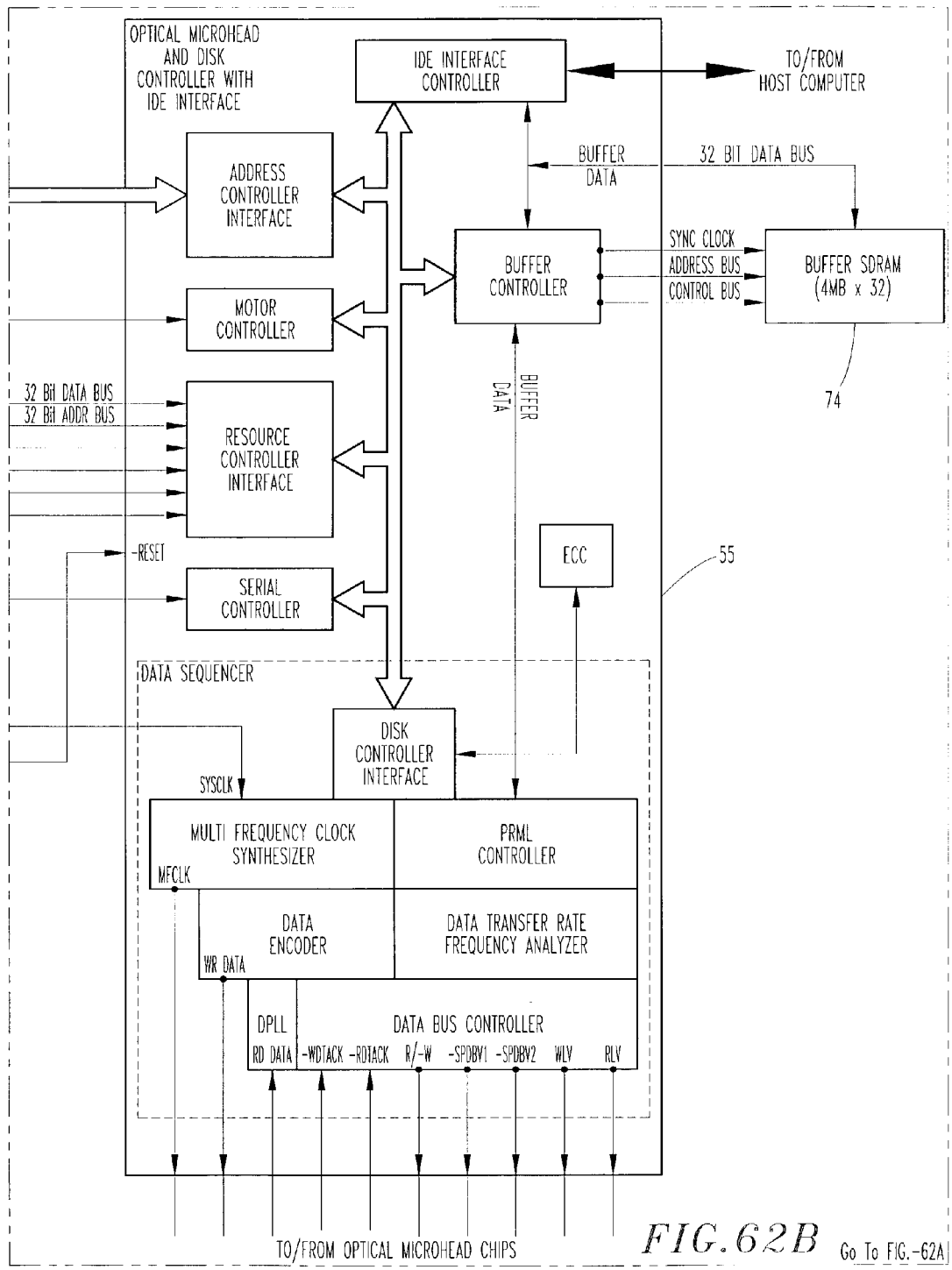
FIG. 62B  Go To FIG.-62A

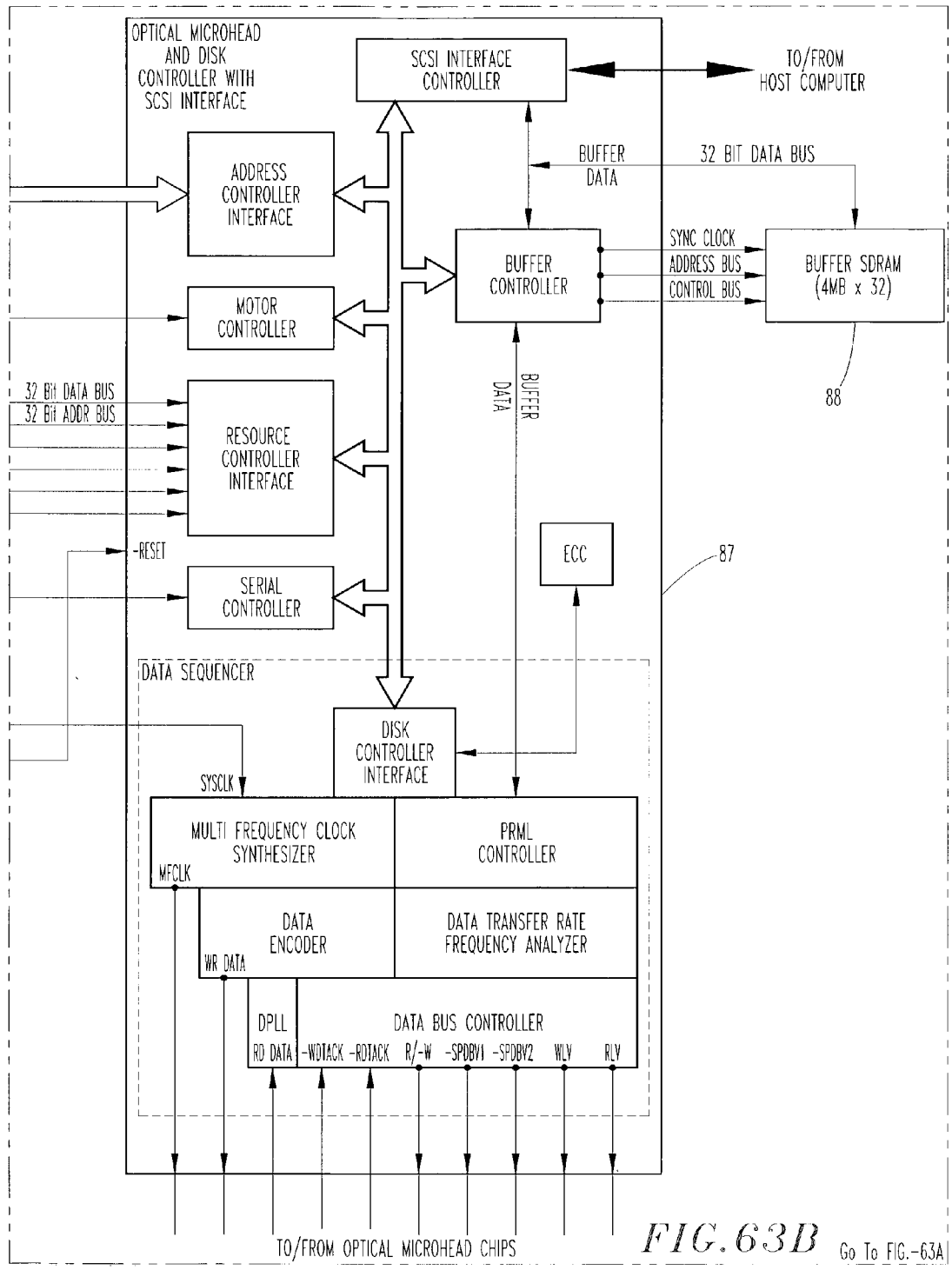
FIG. 63B   Go To FIG.-63A

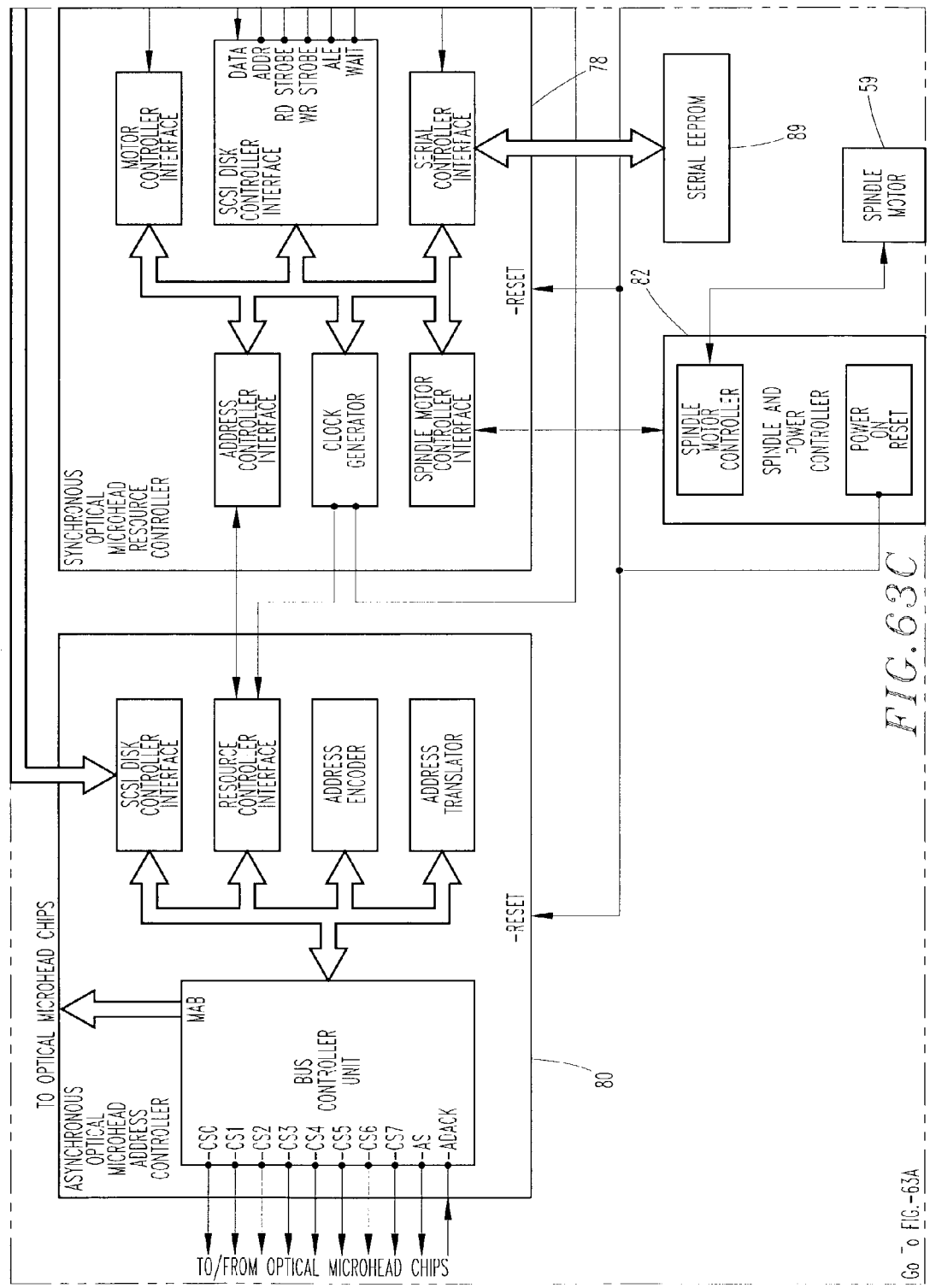

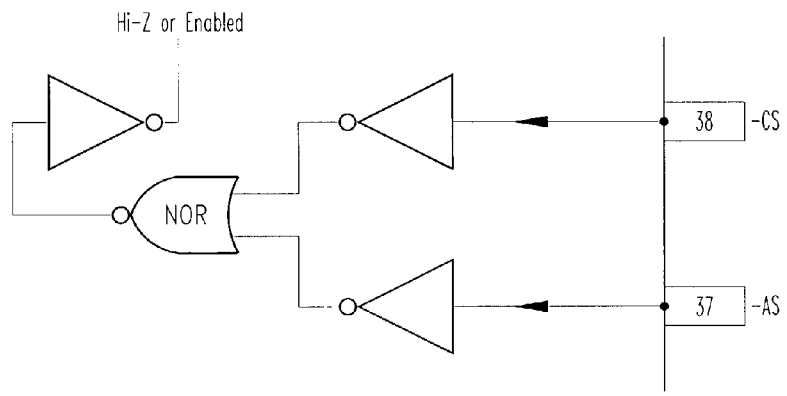
FIG. 65
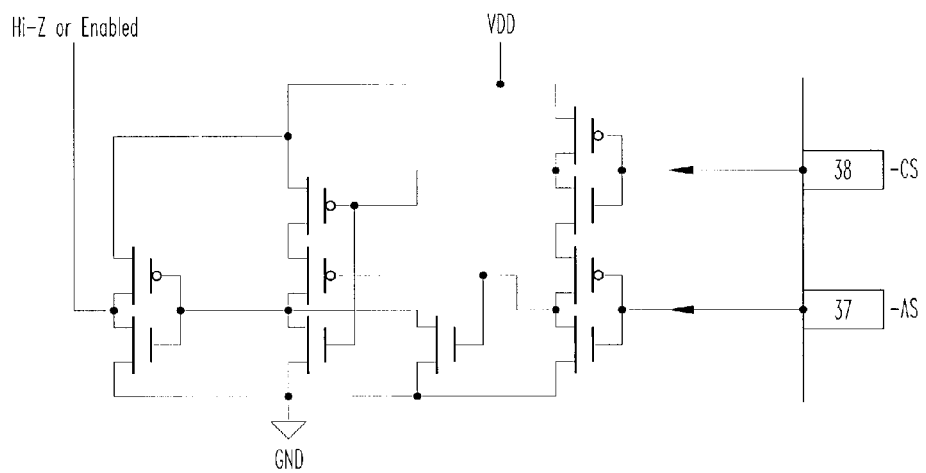
FIG. 66
| Conversions |
|---|
| Hi-Z=+0.9V/+2.3V |
| VDD=+5V=True |
| GND=0V=False |
FIG. 68
TRUTH TABLE
| Inputs | | Outputs |
|---|---|---|
| 37 | 38 | Hi-Z or Enabled |
| True | True | Hi-Z |
| True | False | Hi-Z |
| False | True | Hi-Z |
| False | False | Enabled |
FIG. 67

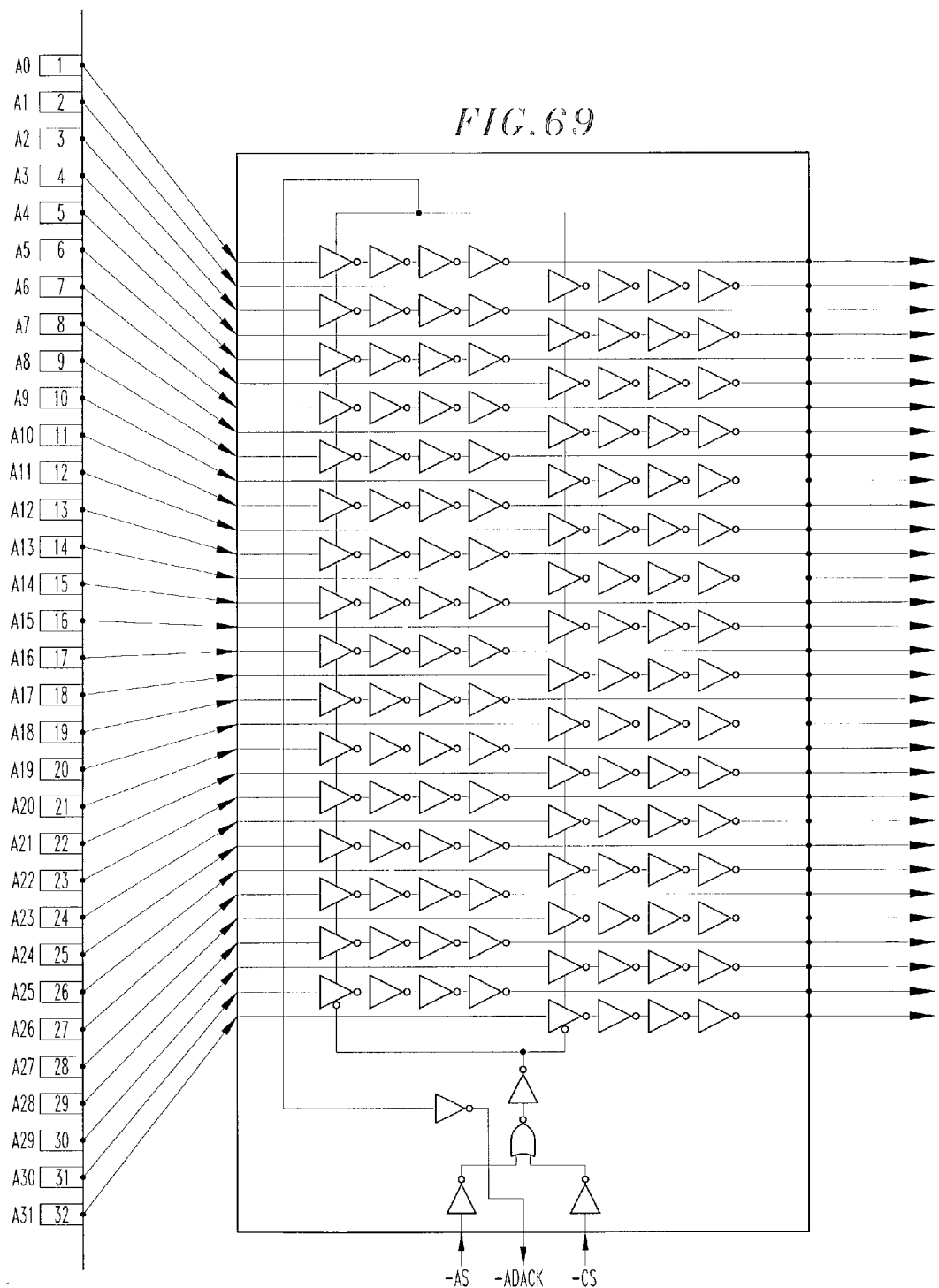

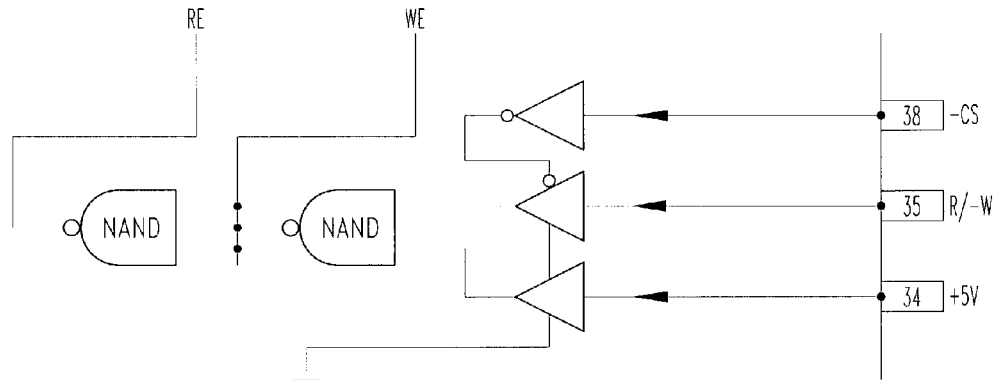
*FIG.87*
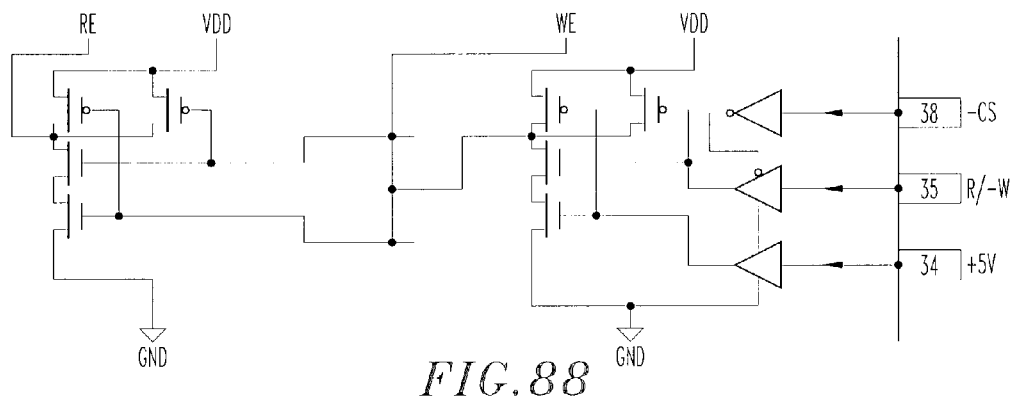
*FIG.88*
| Conversions |
|---|
| Hi-Z=+0.9V/+2.3V |
| VDD=+5V=True |
| GND=0V=False |
*FIG.90*
TRUTH TABLE
| Inputs | | | Outputs | |
|---|---|---|---|---|
| 34 | 35 | 38 | WE | RE |
| True | True | False | Hi-Z | Enabled |
| True | False | False | Enabled | Hi-Z |
*FIG.89*

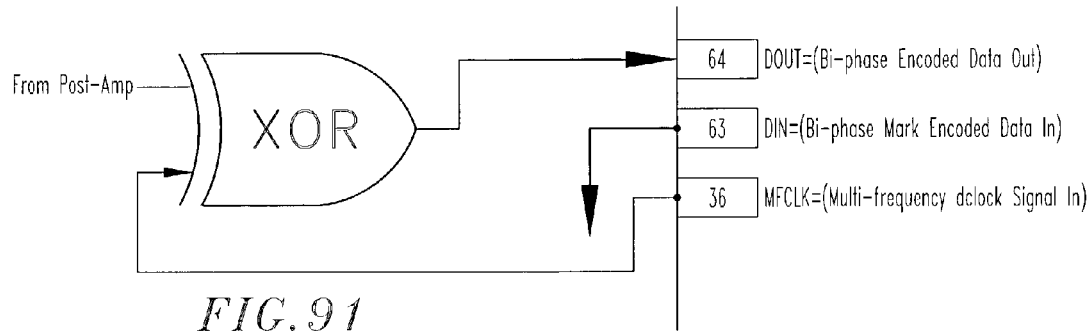
FIG. 91
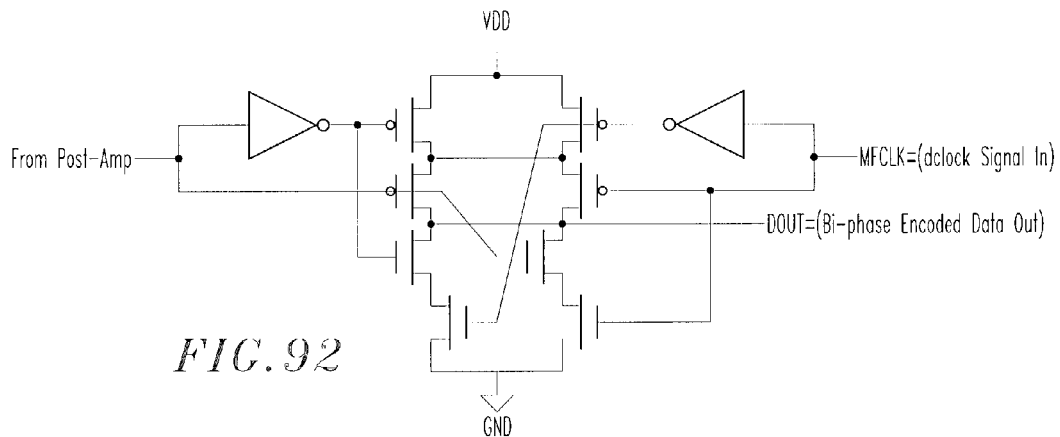
FIG. 92
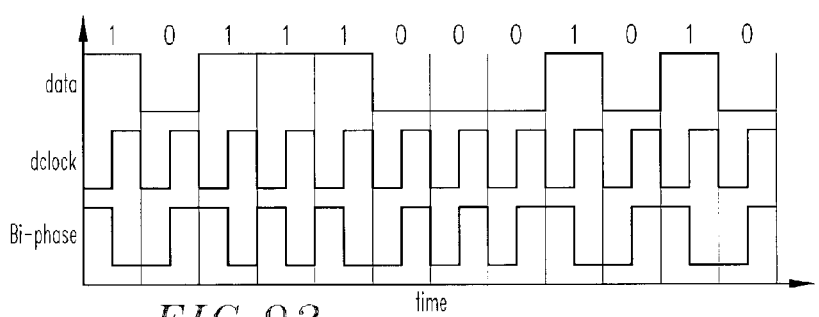
FIG. 93
| Conversions |
|---|
| Hi-Z=+0.9V/+2.3V |
| VDD=+5V=True |
| GND=0V=False |
FIG. 95
TRUTH TABLE
| Inputs | | Output |
|---|---|---|
| A | B | A ⊕ B |
| False | False | False |
| False | True | True |
| True | False | True |
| True | True | False |
FIG. 94

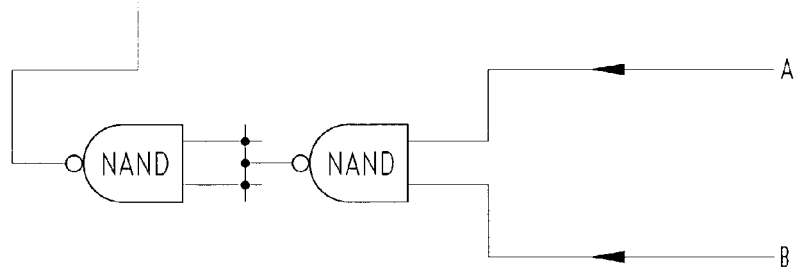
*FIG.102*
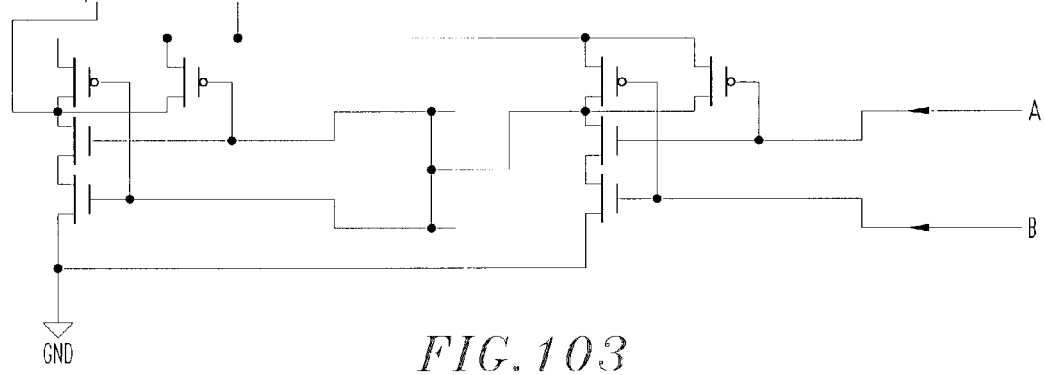
*FIG.103*
| Conversions |
|---|
| Hi-Z=+0.9V/+2.3V |
| VDD=+5V=True |
| GND=0V=False |
*FIG.105*
| TRUTH TABLE | | |
|---|---|---|
| Inputs | | Outputs |
| A | B | -RDTACK/-WDTACK |
| True | True | Hi-Z |
| False | False | Enabled |
*FIG.104*

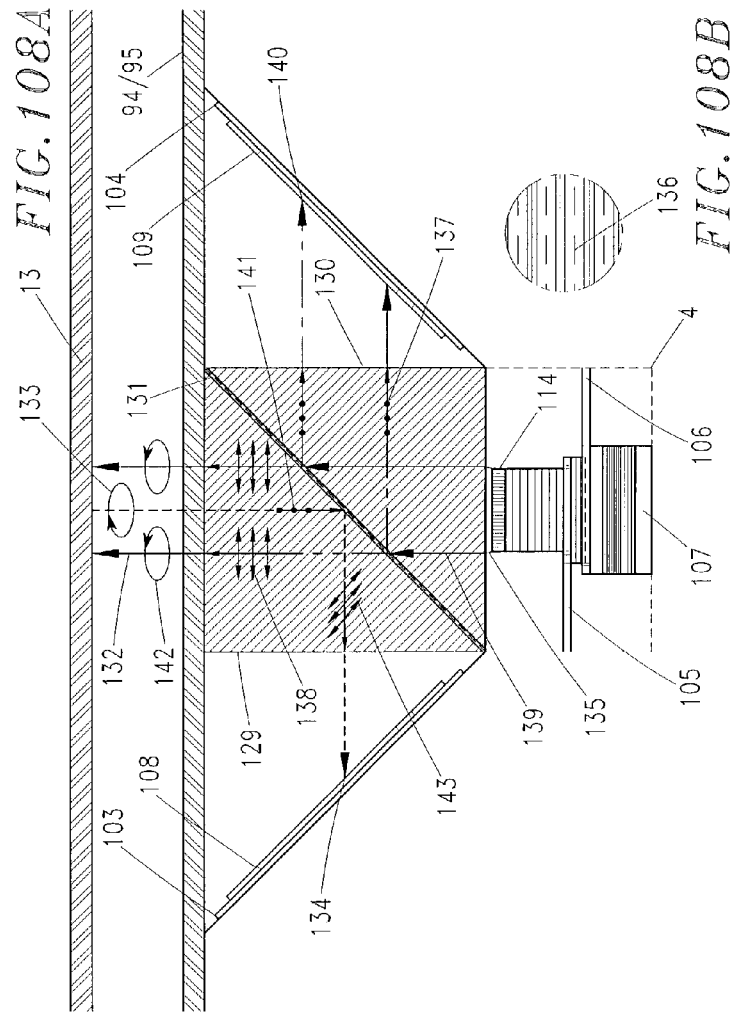
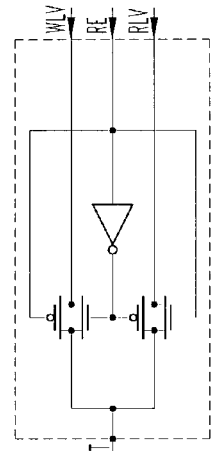
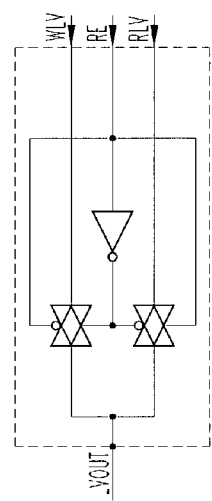
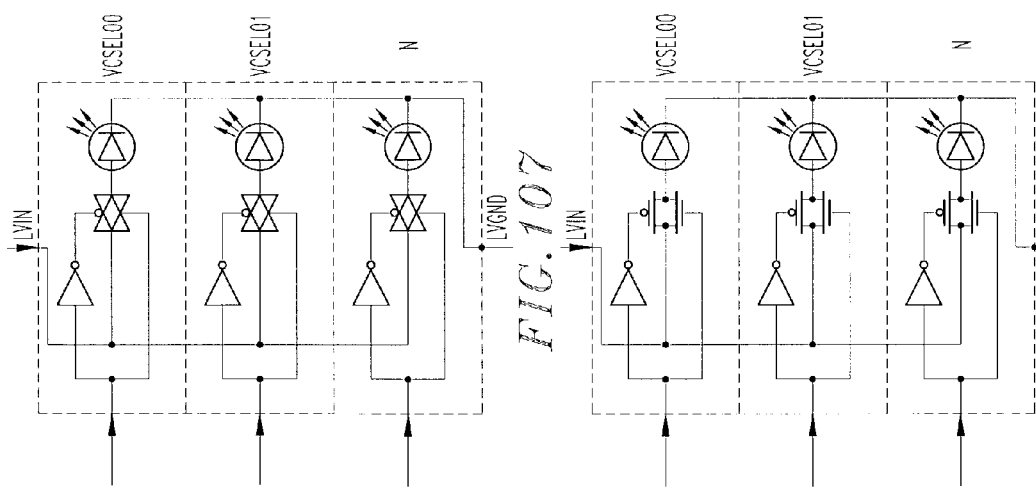

| Left | Right |
|---|---|
| 64 | 64 VAR |
| 63 | 63 +5V |
| 62 | 62 LS1 |
| 61 | 61 LS2 |
| 60 | 60 LS3 |
| 59 | 59 LS4 |
| 58 | 58 LS5 |
| 57 | 57 LS6 |
| 56 | 56 LS7 |
| 55 | 55 LS8 |
| 54 | 54 LSN |
| 53 | 53 GND |
| 52 | 52 +5V |
| 51 | 51 FUT |
| 50 | 50 FUT |
| 49 | 49 FUT |
| 48 | 48 FUT |
| 47 | 47 FUT |
| 46 | 46 FUT |
| 45 | 45 FUT |
| 44 | 44 FUT |
| 43 | 43 DOT1 |
| 42 | 42 DOT2 |
| 41 | 41 DOT3 |
| 40 | 40 DOT4 |
| 39 | 39 DOT5 |
| 38 | 38 DOT6 |
| 37 | 37 DOT7 |
| 36 | 36 DOT8 |
| 35 | 35 DOTN |
| 34 | 34 LE |
| 33 | 33 OE |

FIG.122

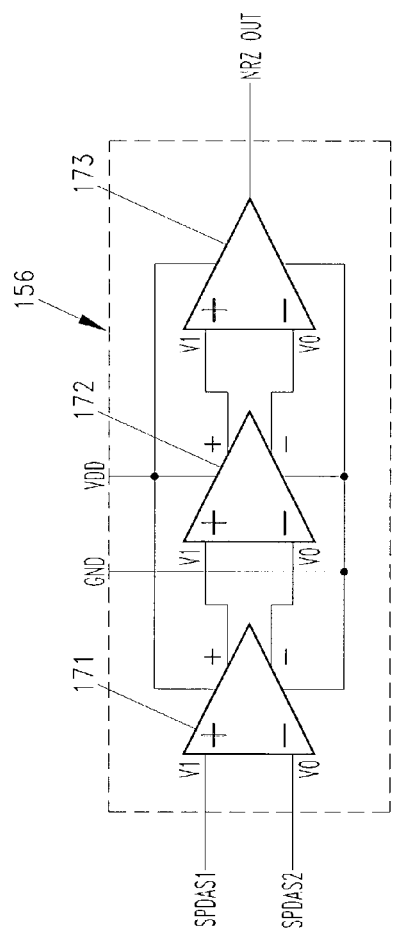
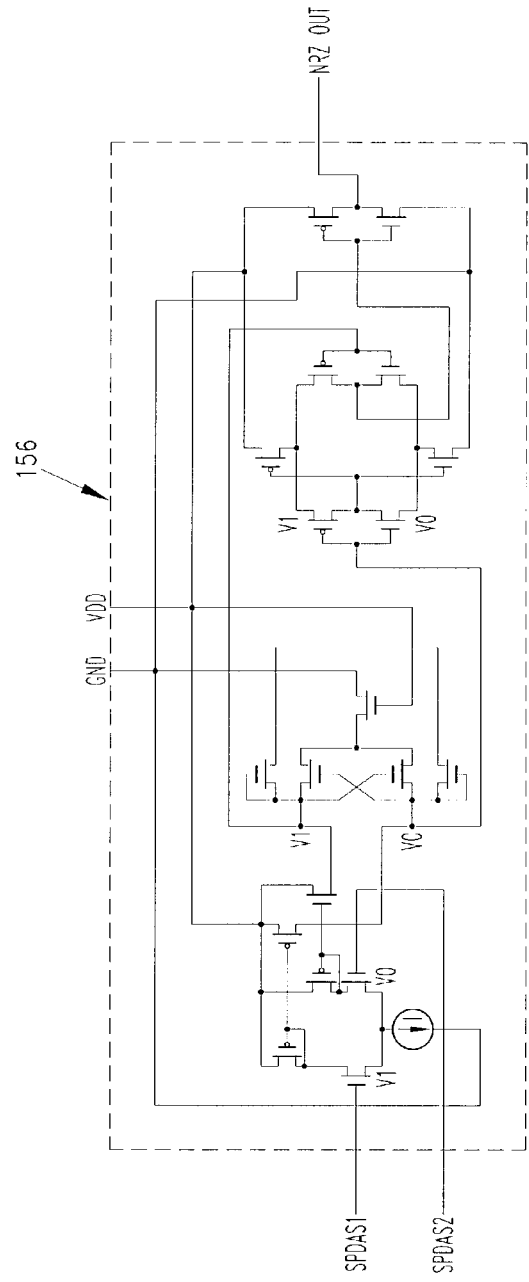

OPTICAL HARD DISK DRIVE HAVING A PHASE-CHANGE MICROHEAD ARRAY CHIP

CROSS-REFERENCE TO RELATED APPLICATIONS

This application is entitled to the benefit of Provisional Patent Application, Ser. No. 60/307,130, filed in the U.S. Patent and Trademark Office, Jul. 23, 2001.

BACKGROUND

1. Field of the Invention

In general this invention relates to magnetic disk drive data-storage, and in particular to a Phase-Change hard disk drive data-storage apparatus that uses stationary Phase-Change Microhead Array Chips in place of conventional 'Flying-Heads', 'Rotary Voice-Coil Actuators', or other similar types of 'Servo-Tracking' mechanisms to simultaneously record and/or reproduce data optically to and/or from a multitude of data-track locations that are distributed concentrically across the data-surfaces of a multitude of disk-platters comprising Phase-Change data-storage medium.

2. Description of Prior Art

Prior art teaches that magnetic-media data-storage disk drives, particularly fixed magnetic-media data-storage disk drives are valued because of several factors. Including, a disk drive's overall size (i.e., or what is sometimes referred to as form factor), a disk drive's data-storage capacity, a disk drive's random access times (i.e., or what is sometimes referred to as access time or average access time), a disk drive's cost per data-byte stored, and a disk drive's "Mean Time Before Failure" (MTBF). Further, data-containing tracks are arranged as concentric-circles on the surfaces (i.e., the data-surface) of circular shaped disk-platters (the disc media), consequently, because the outermost tracks or concentric track-circles are longer they have a greater number of magnetic data-cell domains available compared to the shorter innermost data-tracks of concentric-circles also present on the same disk-platter data-surfaces. Further, the disk-platters and there associated data-surfaces are rotated at a constant angular velocity. Consequently, the head-sliders containing data transducers will fly at a faster and somewhat higher altitude above the before mentioned disk-platters outermost tracks, where relative head to disk velocity is greatest.

However, when disk-platters and there associated data-surfaces are rotated at a constant angular velocity, therefore the head-sliders containing data transducers will fly at a slower and somewhat lower altitude above the before mentioned disk-platters innermost tracks, where relative head to disk velocity is at a minimum. One known way to increase data-storage capacity of a fixed disk drive system is to divide disk-platter data-surfaces into data-zones (i.e., sometimes called data-sectors and typically comprise of data and data-areas distributed as radial sections of concentric disk-platter data-tracks), while calibrating associated transfer data-rates to the smallest disk-platter data-track diameter dimension (i.e., innermost data-track) within each particular radially distributed data-zone (i.e., this technique is sometimes called zoned data recording).

Moreover, the number of data-sectors or data-fields within each concentric track may vary from data-zone to data-zone. In order to switch from one data-zone to a different data-zone, it is necessary for a hard disk drive to adapt itself in real-time to a different number of data-sectors and a new data-rate for the switched to and different data-zone. Other known ways to increase data storage capacity include a varying of disk rotation speed as a function of the radial position of an optical data-head transducer while maintaining a substantially constant data-transfer frequency-rate, as used in optical "Compact Disk" (CD) technologies, or as an alternative method, varying a data-transfer frequency-rate with each data-track as a function of the radial position of a magnetic data-head transducer while maintaining a substantially constant disk-rotation, as used in conventional magnetic, and non-conventional optical flying-head hard drive technologies.

Furthermore, another issue confronting the designer of a hard disk drive system is data-head positioning and data-block transfer-rates. Typically, hard disk drive data-head positioning is carried out using a 'Head Positioner' or 'Rotary Voice-Coil Actuator', and normally involves track-seeking operations for moving a hard disk drive's 'Head-Stack' assembly from a departure data-track location to a destination data-track location. This is done simultaneously throughout the radial-extents of all installed disk-platters and their respective data-surfaces, using various data-track following operations for causing a hard disk drive's head-stack (and consequently all data-head transducers) to follow precisely only one particular data-track during a data-block read-data or a data-block write-data disk-operation. Therefore, to provide precise head-stack positioning, during a data-track seeking and following operation, some servo information is typically provided to a Rotary Voice-Coil Actuator's tracking mechanism.

Furthermore, prior-art teaches that the previously mentioned servo information may be contained on a special data-surface written exclusively with servo-information (i.e., sometimes called a dedicated servo surface), or as an alternative method, may be externally supplied by an 'Optical Encoder' coupled to a head-stack assembly's positioning arm, or may be supplied from servo-information interspersed and embedded among the data-fields within each circular concentric data-track. In addition, one other approach not mentioned before is provided by a technique called the 'Open Loop Stepper-Motor' head-stack positioning servo technique; wherein, the positional stability of a data-head at any selected data-track location is provided by the electromagnetic detents of a hard disk drive's Stepper-Motor.

Consequently, when servo-information is embedded on a data-surface formatted for Zoned-Data-Recording, several complications may arise in the reliably of providing robust servo-head positioning information. Therefore, there must be sufficient embedded information to provide stability to the 'Servo-Loop' and to provide positional responses during the high-speed portions of track-seeking and track-following operations, so that velocity or position profiles may be adjusted on the fly, based on present head-velocity or head-position at the time of servo-sampling. Typically, if the servo-information is recorded at the same data-rate while in positional relationship with the recorded data-blocks, as has been conventionally employed in prior art, servo-architecture is normally complex enough to switch data-rates and servo-positions. However, if regularly spaced servo-information were radially placed across data-storage disk-platter data-surfaces, while splitting some of the data-fields, located on the aforementioned data-surfaces, into segments, data-zones, when crossed-over, could cause serious complications to arise when trying to read each 'Split Data Field' as a single data-block.

Furthermore, the before mentioned disk-platter's rotational velocity must be constantly monitored and carefully maintained at a predetermined constant angular velocity for the aforesaid 'Split Data Field' scheme to function properly; therefore, adding additional complexity to the servo-tracking system. In addition, data-fields are conventionally managed by what is normally called a 'Data Sequencer'. Further, a Disk Controller's Data Sequencer may include an 'Encoder and Decoder' unit, which is used to transform "Non-Return to Zero" (NRZ) data-streams, into other, more manageable, data-formats.

For example, a three-to-two 1,7 "Run Length-Limited" (RLL) code, which is used to achieve a compression of data relative to the 'Flux-Transition Density' on the data-surfaces of disk-platters (i.e., 1,7 RLL coding is based upon three code-bits or groups for two non-encoded data-bits, but results in a four-to-three overall data compression-rate permitting more data to be recorded on the data-surfaces of disk-platters per the number of flux-transitions that may be contained within the magnetic domains of disk-platter data-cells).

Furthermore, prior-art teaches that a Disk Controller's Data Sequencer conventionally performs the task of decoding 'Data Sector Overhead' information in order to locate a desired data-sector's location, and to obtain information relating to the correctness or validity of the data being read back from a particular data-sector location. A Data Sequencer is implemented as a state-machine that will conventionally monitor all incoming data-flow in order to locate a particular data-ID 'Preamble-Field', a particular data-ID 'Address Mark', a particular data-ID 'Sector-Field', a particular data-ID 'Data-Field', and a small number of 'Error Correction Syndrome' bytes that are appended to each data-ID 'Data-Field'.

Moreover, prior-art teaches that the Data Sequencer will cause the appropriate action to be taken as each of the aforementioned fields are identified and located. For example, if a data-block, contained within the 'Data-Field' of a particular cylinder/track's data-sector location, is being sought after, the aforementioned Data Sequencer will compare incoming data-ID 'Sector-Field' information with the sought after data-sector information already stored in a particular register. When a positive comparison occurs the Data Sequencer causes data-blocks read from data-ID Data-Fields, via a magnetic-transducer data-head and hard disk drive read-channel, to be sent to a Buffer Controller's 'block buffer memory' location, where the read data-block's 'Error Correction Syndrome' remainder-bytes are checked for errors, and if there are no errors detected within the read data-blocks, as determined by analyzing the "Error Correction Code" (ECC) remainder-bytes, the data-blocks are sent from the Buffer Controller's 'block buffer memory' location to the host-system computer, using a suitable interface such as the "Small Computer System Interface" (SCSI), or the "Integrated Drive Electronics/AT Attachment" (IDE/ATA-2) interface.

Moreover, prior-art also teaches that in conventional Magnetic or in non-conventional Phase-Change hard disk drive designs, each data-sector is individually handled in response to a specific-input from a supervisory microcontroller. For example, as a particular data-sector is read, the aforementioned supervisory microcontroller will inform a Disk Controller's Data Sequencer, whether to read, or not to read, the next contiguous data-sector into a Disk Controller's buffer cache memory. Consequently, this causes a supervisory microcontroller intervention to occur for every data-sector being processed.

Typically, this is done with a programmable 'Sector Counter', which is preset by a supervisory microcontroller to a desired sector count so a Data Sequencer can process data-sectors sequentially until the count in the aforementioned 'Sector Counter' is reached. However, some hard disk drive designs do not use, or normally include within their designs, the added complication of 'Zoned Data-Recording' and 'Split Data-Fields'. For these hard disk drive designs, head-stack positioner stability is provided by an 'Optical Encoder' coupled between a rotary head-stack positioner and the stationary base a hard disk drive's enclosure to provide a feedback signal, which is used to appropriately position the rotary head-stack, and therefore foregoes the use of 'Embedded Servo-Sectors', as is conventional within some prior-art.

Furthermore, prior-art also teaches, as an alternative to the split-data recording scheme, the use of a supervisory microcontroller that has been given the responsibility of managing each 'Split Data-Field' layout in 'real-time'. This leads, however, to tremendous levels of bus-traffic control between the supervisory microcontroller and a Disk Controller's Data Sequencer during read-data and/or write-data disk-operations. Precluding the supervisory microcontroller from performing other useful tasks, such as head-positioning servo-supervision, error-correction, and command-status exchanges with the host computer system, which are typically communicated over a hard disk drive's interfacing bus-structure.

Moreover, in order to function effectively the before mentioned supervisory microcontroller approach would require a separate supervisory microcontroller for data-transference, which means that at least two supervisory microprocessors would be required to implement a hard disk drive's command architecture and overall disk-operation.

SUMMARY OF THE INVENTION

In accordance with the present invention, a Phase-Change Microhead Array Chip Hard Disk Drive apparatus that uses disk-platter data-surfaces covered with Phase-Change data-storage medium.

Objects and Advantages

Each Phase-Change Microhead Array Chip Hard Disk Drive will consist of at least, but not confined too, one disk-platter having two data-surfaces containing a multiplicity of concentrically configured data-track locations that are rotated at a substantially constant angular velocity. Further, with at least one Phase-Change Microhead Array Chip is placed into a stationary position above each of a disk-platter's two data-surfaces, by a chip-positioning circuit board. Wherein, the number of cylinder/tracks made available to each stationary Phase-Change Microhead Array Chip is determined by the number of laser-diodes comprising the microhead-array of each stationary Phase-Change Microhead Array Chip. For example, if the number of "Vertical Cavity Surface Emitting Laser" (VCSEL) laser-diode configured microheads contained within a respective Phase-Change Microhead Array Chip's microhead-array were to equal 325,000 microheads, this would in turn physically equate to 325,000 corresponding cylinder/track locations for the data-surface the microhead-array containing Phase-Change Microhead Array Chip is positioned above.

Moreover, each Phase-Change Microhead Array Chip will contain either a surface-emitting laser-diode microhead-array, an "Edge Emitting Laser" (EEL) diode microhead-array, or a VCSEL diode microhead-array (e.g., a laser-diode array containing a minimum of one thousand or a maximum of four billion individually addressable laser-diodes, which are independently used as light sources during read-data or write-data disk-operations), a microhead 'Address Latch And Chip Select Circuit', a microhead 'Address Decoder Circuit', a microhead 'Address Buffer Circuit', a laser-diode or 'VCSEL Microhead Power Control Circuit', a 'Read Preamp Circuit', a 'Read Decision Circuit', a 'Read Buffer Circuit', a 'Write Driver Circuit', a 'Write Preamp Circuit', a 'R/W Control Circuit', at least two forward or reversed biased "Photo-Detector" (PD) arrays, or as an alternative embodiment at least two reversed-biased "Silicon Photo-Detector" (SPD) photocell-array (providing a photo-electrically created read-data reference-signal voltage output and a photo-electrically created read-data read-signal voltage output during read-data disk-operations).

Furthermore, using conventional semiconductor methods like "Molecular Beam Epitaxy" (MBE), photolithography, and chemical etching for manufacturing Phase-Change Microhead Array Chips will have their photonic and electronic semiconductor components altogether constructed from a single semiconductor substrate wafer (along with a multitude of other Phase-Change Microhead Array Chips). Further, if the Phase-Change Microhead Array Chips were designed to contain a microhead-array comprising three-hundred and twenty-five thousand individual laser-diode microheads, then each laser-diode microhead located within each microhead-array would have an elliptical dimension of 1000-nm width×1010-nm length. The laser-diode microheads located within each microhead-array form a single line of laser-diode microheads across the entire Phase-Change Microhead Array Chip, which in turn results in the chips having a dimension of 2.358-in in length. Consequently, if 2.358-in Phase-Change Microhead Array Chips were used in Phase-Change Microhead Array Chip Hard Disk Drives the hard disk drive's resulting form-factor would be a standard 3.5-in.

In addition, every Phase-Change Microhead Array Chip that is installed into a hard disk drive unit-assembly would be assembled and positioned into a stationary fixed location relative to the data-surfaces of installed disk-platters. Further, at least one Phase-Change Microhead Array Chip will be placed into a fixed position approximately 50-μm above and perpendicular to every data-surface present within a drive's unit-assembly. Moreover, every laser-diode microhead contained within each microhead-array will be evenly spaced with an emitter-centerline-to-emitter-centerline spacing of 1.0-μm. Further, after undergone an etching process every laser-diode microhead will have an elliptical shaped mesa structure with an elliptical dimension of 1000 nm width× 1010-nm length. Additionally, the elliptical shaped mesa structure of the laser-diode microheads promotes a stable polarity for the microhead's laser-emission. Therefore, as a preferred embodiment of the present invention, the elliptical shape and dimensions of the laser-diode microheads should be considered a-typical for all Phase-Change Microhead Array Chips installed into a Phase-Change Microhead Array Chip Hard Disk Drive's unit-assembly.

In addition, the use of standard semiconductor lithography, etching, and masking techniques are used to simultaneously manufacture the Phase-Change Microhead Array Chip's two "Semiconductor Photo-Diode" (SPD) photocell-arrays, microhead-address latch-decoder circuits, the chip-selection chip-control circuits, the data I/O circuits, the pre-amplification circuits, the data encoding/decoding circuits, and the digital-signal processing circuits, along with a Phase-Change Microhead Array Chip's address, data, and control-bus circuits. Further, the laser-diode microhead-arrays contained within the Phase-Change Microhead Array Chips are simultaneously created using "Molecular Beam Epitaxy" (MBE), "Metal-Organic Vapor-Phase Epitaxy" (MOVPE), or "Metal-Organic Chemical Vapor Deposition" (MOCVD), which are three well-known methods of manufacturing and are regularly used to mass-produce integrated electro-optical components.

Moreover, prior-art also teaches that conventional flying-head assemblies (i.e., what are sometimes called head stack assemblies) are simultaneously moved, as a group, to or from cylinder/track locations during a host-requested read-data or write-data disk-operation. As defined, data-tracks are closed concentric circles of sectored digital-data, which begin at the center of a disk-platter's data-surface and radiate out away from that center, one concentric circle after another, toward a hard disk drive disk-platter's outermost circumference. Moreover, prior-art teaches that current hard disk drive technologies use a Rotary Voice-Coil Actuator (i.e., sometimes called a nologies use a Rotary Voice-Coil Actuator (i.e., sometimes called a Rotary Positioner) to accomplish track-to-track head-stack movements (i.e., the movement of a head-stack assembly across disk-platter data-surfaces, from one data-track cylinder location containing sectored data to another different data-track cylinder location containing different sectored data).

However, during host-requested Phase-Change Microhead Array Chip Hard Disk Drive's disk-operations mechanical movements of the Phase-Change Microhead Array Chips' laser-diode microheads, from one concentric cylinder/track location to another is unnecessary. Moreover, the Phase-Change Microhead Array Chips, while containing a multitude of stationary laser-diode microheads, would have ready for use one of its stationary laser-diode microheads already positioned at the host-requested cylinder/track location. Therefore, unlike conventional electromechanical Rotary Voice-Coil head switching and head-stack positioning, the Phase-Change Microhead Array Chips electronically switch off one laser-diode microhead, while simultaneously switching on another above a different host-requested cylinder/track location.

Furthermore, a Phase-Change Microhead Array Chip Hard Disk Drive's cylinder and data-tracks and the laser-diode microheads positioned above them, have the same address numbers and locations. For example, during a host-requested disk-operation a Phase-Change Microhead Array Chip Hard Disk Drive's Disk Controller will be instructed to address a single stationary laser-diode microhead that is located within the Phase-Change Microhead Array Chip positioned above a data-surface containing data or data-area being requested by the host-system. Further, when laser-diode microheads are electronically addressed by the Disk Controller the cylinder/ data-track location found directly underneath the addressed microhead is also addressed and made accessible to the Disk Controller for read-data or write-data disk-operations. Therefore, each cylinder/data-track location and the laser-diode microhead positioned above it will have the same address-number and location. Further, during a read-data or a write-data disk-operation, a Phase-Change Microhead Array Chip Hard Disk Drive's Disk Controller will receive from a host-system, a request to either read or write data to or from a particular disk-platter's data-surface containing the requested data-sector. For example, such a request would typically comprise:

(i) A data-head selection number (e.g., data-head number five) is sent to the Disk Controller as a binary signal, which is translated and used by the aforesaid Disk Controller to select the stationary Phase-Change Microhead Array Chip installed above the data-surface that comprises data-track and data-sector locations containing host-requested data;
  (ii) A cylinder and data-track number (e.g., cylinder and data-track number fifty-four) is sent to the Disk Controller as a binary signal, which is translated and used by the previously mentioned Disk Controller to address one stationary laser-diode microhead that is positioned above one cylinder/data-track location. Further, the previously mentioned cylinder/data-track location, having the same address as the microhead, will comprise of data-sectors that contain the host-requested data;

(iii) A data-sector number (e.g., data-sector number twelve) is sent to the Disk Controller as a binary signal, which is translated and used during a read-data or write-data disk-operation by the before mentioned Disk Controller to activate the laser-diode microhead that is located above the host requested cylinder/data-track location at a time when data-sectors containing host-requested data are rotated into position directly underneath the adjacent location the addressed laser-diode microhead. During read-data or write-data disk-operations, the disk-platter data-surface area that is located directly underneath an addressed laser-diode microhead is where data transcription to or from a disk-platter data-surface occurs.

Furthermore, the Disk Controller that is used in Phase-Change Microhead Array Chip Hard Disk Drives will forward all system-supplied microhead location address numbers to a Disk Controller's 'Asynchronous Optical Microhead Address Controller' for translation. Further, newly translated microhead location address numbers, using an Asynchronous Optical Microhead Address Controller's "Microhead Address Bus" (MAB), are forwarded as thirty-two low and/or high binary-signal voltages down a shared 32-bit microhead address bus-cable to the Phase-Change Microhead Array Chips. A "Chip-Selected"—CS Phase-Change Microhead Array Chip will respond to the bus supplied address signal by first latching all thirty-two low and/or high signal voltages into an internally located 'Address Latch And CSC' circuit, where they will be temporally stored until they are decoded by a decoder-tree and used to select one laser-diode microhead.

Furthermore, the decoding of the location address number for a particular laser-diode microhead will cause the electrical potential of the selection line connected to the respective laser-diode microhead to change from a logic-low voltage-signal to a logic-high voltage-signal, which in turn will select the laser-diode microhead, by giving it access to the "Write Laser Voltage" (WLV) or "Read Laser Voltage" (RLV) bus-signals that are used to activate the addressed laser-diode microhead's laser-emissions. Consequently, a selected laser-diode microhead will have the same physical-location and address-number as a cylinder/data-track location that comprises the data-sector(s) that contain the host-requested data to be read during a read-data disk-operation, or the data-sector(s) that contain the host-requested data-areas to be written to during a write-data disk-operation. Its only after an addressed selection of a stationary laser-diode microhead been successfully executed can a host-requested read-data or write-data disk-operation be allowed to proceed.

Furthermore, because Phase-Change Microhead Array Chips are fully integrated semiconductor devices they can successfully accomplish 50-ns (i.e., 50 nanosecond) 'track-to-track' switching times (i.e., what is sometimes called in conventional hard disk drive design average seek time). Additionally, as a means to increase user data-storage capacity, Phase-Change Microhead Array Chip Hard Disk Drives will use an 'ID-less' system for sector-locating and tracking. An ID-less system of sector locating and tracking has several advantages over the conventional 'ID After Wedge' or 'ID Before Sector' methods of sector locating and tracking. For example, the lack of an ID or 'Identifier Field', which is conventionally written to the data-surfaces of a hard disk drive's disk-platters, will regain approximately 4% of the diskplatter's data-surface real estate for usage as end-user data-storage. Further, during a read-data or a write-data disk-operation, and in case of errors, a 'Sector-ID' is neither read nor corrected, which increases the overall data throughput for the hard disk drive.

Accordingly, besides the objects and advantages of the Phase-Change Microhead Array Chip Hard Disk Drive, which is described in my patent above, several objects and advantages of the present invention are:

(a) To provide a Phase-Change Microhead Array Chip Hard Disk Drive that overcomes several limitations and drawbacks present in the prior art previously disclosed;

(b) To provide a Phase-Change Microhead Array Chip Hard Disk Drive that uses a dedicated head-to-track system. Wherein, each installed Phase-Change Microhead Array Chip can have a minimum of one-thousand or maximum of four-billion stationary, individual, and addressable read and write laser-diode or VCSELs constructed into each Phase-Change Microhead Array Chip's microhead-array;

(c) To provide a Phase-Change Microhead Array Chip Hard Disk Drive with 'average access times' (i.e., typically the amount of time it takes to find requested data by moving head-stack assemblies from one data-track location to another data-track location as described in the prior art) that are about "50" nanoseconds in duration;

(d) To provide a Phase-Change Microhead Array Chip Hard Disk Drive that is during a hard disk drive crash non-destruction to previously recorded data, thus allowing full recovery of all previously recorded data, therein eliminating any catastrophic data loss;

(e) To provide a Phase-Change Microhead Array Chip Hard Disk Drive, which because of its simultaneous and independent control over each microhead-array chip that is installed above a disk-platter data-surface.

Further objects and advantages are provided by the stationary Phase-Change Microhead Array Chips when they are used in place of Head Sliders, Air-Bearings, and Rotary Voice-Coil Actuators (i.e., sometimes called a rotary positioner), and the other conventional flying-head technologies presently used in conventional hard disk drive designs.

Moreover, a Phase-Change Microhead Array Chip Hard Disk Drive is primarily a dedicated laser-diode microhead to data-track information and data-storage non-volatile memory system. Wherein, each Phase-Change Microhead Array Chip will have a minimum of one thousand or a maximum of four billion stationary, individual, and addressable read/write laser-diode microheads constructed into every Phase-Change Microhead Array Chip's microhead-array. Further, data-track access times (i.e., what is normally called average-seek-times) or the amount of time it takes to address and find one host requested data-track location from a data-track location previously requested. This is done conventionally, as prior art shows, by moving a hard disk drive's head-stack assembly from one data-track location to another, and is a principle benchmark used in rating the performance of a hard disk drive and its system of data-access. If the 'average seek time' as described above were decreased in any way for any particular hard disk drive design, it would demonstrate a marked improvement for that particular hard disk drive's design.

Typically, conventional flying-head hard disk drive designs have their 'average-access-times' normally measured in 'milliseconds' or thousandths of a second. If using milliseconds as a unit of measure, an 'average-seek-time' of 8.5-milliseconds is today to be considered normal for conventional flying-head hard disk drive designs. However, a hard disk drive that is based upon the Phase-Change Microhead Array Chip Hard Disk Drive design, because it has Phase-Change Microhead Array Chips positioned over every disk-platter data-surface located within its unit-assembly that contain laser-diode microhead-array's comprising thousands of individual microheads located into a stationary position over every concentric data-track circle located on every disk-platter data-surface, its 'average seek times' are thousands of times shorter than those exhibited by current hard disk drive designs.

Consequently, the 'average-seek-time' bench-mark ratings for any flying-head (i.e., Phase-Change or conventional magnetic) hard disk drive design would be easily challenged by any hard disk drive design using the Phase-Change Microhead Array Chip approach to its hard disk drive design. This is simply because, unlike the slow mechanical track-to-track switching used by conventional 'Rotary Positioned' flying-head technologies, the high speed data-track switching from one data-track location to another occurs, for a Phase-Change Microhead Array Chip Hard Disk Drive design, electronically, inside the drive's Phase-Change Microhead Array Chips. Therefore, instead of using 'milliseconds' or thousandths of one second to measure 'average-seek-time' time periods, 'nanoseconds' or billionths of one second, are instead, used to measure the high speed 'average-seek-time' and 'full-stroke seek-time' periods that will occur within a Phase-Change Microhead Array Chip Hard Disk Drive.

Furthermore, by using semiconductor-based transmission-gates to execute selection processes and data-head switching for any particular laser-diode microhead present within a microhead-array, new high-speed 'averageseek-time' bench-mark ratings are made possible and therefore, are proposed here. Typically, semiconductor transmission-gates have their operational-speeds measured in nanoseconds (i.e., typically a single MOSFET or MESFET transmission-gate can change its electrical state at around 5.0 nanoseconds). Therefore, a Phase-Change Microhead Array Chip's 'average-seek-times', 'track-to-track average-seeks', or 'full stroke seek times' are in reality, the amount of time it takes to electronically switch-off a previously used selection line and to electronically switch-on a new selection line that leads to a different laser-diode microhead that is located in a different stationary position over a host-requested cylinder data-track location.

Furthermore, by calculating the amount of time it takes for a chip-selected Phase-Change Microhead Array Chip's 'Asynchronous Optical Microhead Address Controller' to receive a new thirty-two bit microhead-location-address signal from a Phase-Change Microhead Array Chip Hard Disk Drive's Disk Controller, adding in the time it takes for a single microhead selection line to become high-enabled, an 'average-seek-time' of around 50-ns (i.e., 50 nanoseconds) can be determined. For example, if using CMOS transmission-gates, this new 'average-seek-time' is calculated to be about two thousand times faster than the 'average-seek-times' or 'full-stroke seektimes' for any current flying-head based hard disk drive design. Consequently, this demonstrates, over prior art, an incredible increase in the 'average-seek-time' performance ratings for the Phase-Change Microhead Array Chip Hard Disk Drive design. Further, the Phase-Change Microhead Array Chip Hard Disk Drive design will also improve the "Mean Time Before Failure" (MTBF) or useful-life benchmark rating that is normally used by hard disk drive designers to predicate a particular hard disk drive design's usefulness before it has a failure. This, improvement in the "Mean Time Before Failure" (MTBF), or useful-life benchmark rating is accomplished, by eliminating, from the Phase-Change Microhead Array Chip Hard Disk Drive design, the head-stack and rotary voice-coil assemblies normally used in conventional flying-head hard disk drive designs.

Furthermore, about 60% of all conventional flying-head hard disk drive fatal-error crashes (i.e., sometimes called catastrophic hard disk drive failure) are catastrophic, and typically are the result of Rotary Voice-Coil and/or Spindle-Motor mechanical malfunctions or failures. When examining this problem further, we find that flying-heads, in striving to maintain today's critical flying-height distance of 0.5- to 2.5-µm above disk-platter data-surfaces on what is sometimes called an 'air-bearing', the before mentioned flying-heads can be caused to easily make physical contact with data-surfaces, for example during a catastrophic hard disk drive crash, which will always result in data loss (i.e., sometimes called catastrophic data loss). Prior-art teaches that the use of an air bearing produced through the use of aerodynamically designed flying-head head-sliders allows for very low flight distances for flying data-heads, which results in increased areal densities for the hard disk drive using lower flight distances for its data-heads. In fact, within a conventional rotary positioned flying-head hard disk drive design, a head-slider's flight distance, which is today normally 0.5- to 2.5-µm, would be difficult, if not impossible to achieve, were it not for the aerodynamic design of current flying-head head-sliders and the air-bearings that they produce.

Furthermore, catastrophic data-loosing hard disk drive crashes most often occur when a Spindle-Motor's power supply fails, or the hard disk drive, during a read-data or write-data disk-operation, is suddenly shaken or dropped, while the hard disk drive's head-stack assembly has not been properly repositioned into an innermost disk-platter area (i.e., sometimes called the head-stack parking area), but remains located over a data-surface when any of the malfunctions mentioned occurs. Consequently, during a power-supply failure a hard disk drive's Spindle-Motor will lose its momentum and begin to spin down causing the head-slider air-bearings to decay, where they can no longer maintain the aerodynamic lift necessary for maintaining the head-slider's flight.

Therefore, a conventional flying-head hard disk drive's head-stack assembly, not being repositioned into said head-stack parking area, and being subject too complete loss of head-slider air-bearings, the before mentioned hard disk drive flying-heads will make physical contact with the before mentioned disk-platter data-surfaces, ultimately crashing into the data-sector areas located on the aforesaid hard disk drive's data-surfaces, destroying any previously recorded data stored therein. Typically, this kind of failure is normally referred to as 'hard disk crash' or 'hard disk fatal-error crash' and accounts for about 60% of all conventional flying-head hard disk drive failures.

Furthermore, the root-cause behind many hard disk drive failures is a Disk Controller's failed BIOS system or BIOS system-chip, or a Spindle-Motor's malfunctioning power-supply. Nevertheless, whatever the root-cause might be the end-result is always the same, hard disk drive crashes and severe data-loss. In the event a Phase-Change Microhead Array Chip Hard Disk Drive should suffer a hard disk fatal-error crash, the severe data-loss normally associated with these hard disk drive crashes, because of a Phase-Change Microhead Array Chip Hard Disk Drive's stationary microhead design, will not ever occur. Although, if a Phase-Change Microhead Array Chip Hard Disk Drive's Spindle-Motor should fail or if there is some kind of Disk Controller "Basic-In-Out System" (BIOS) system-chip failure, the Phase-Change Microhead Array Chips, which contain the laser-diode microhead-arrays are stationary; positioned by chip-positioning circuit boards between 50- to 200-μm above the data-surfaces of installed disk-platters.

Therefore, unless a Phase-Change Microhead Array Chip itself fails or malfunctions, the Phase-Change Microhead Array Chips are never moved, or repositioned in any way once installed into a Phase-Change Microhead Array Chip Hard Disk Drive unit-assembly. Consequently, by using the stationary Phase-Change Microhead Array Chip approach to hard disk drive design, we have eliminated the need for any head-sliders, air-bearings, and rotary voice coils, along with their potential for hard disk drive fatal-error crashes and catastrophic data-loss. Ultimately, this will double the MTBF benchmark rating for any hard disk drive design that uses the Phase-Change Microhead Array Chip Hard Disk Drive approach.

DRAWING FIGURES

In the drawings, closely related figures have the same number, but different alphabetic suffixes:

FIG. 6 shows an orthographic plan-view of the chip-positioning circuit board and surface mounting chip-socket for the Phase-Change Microhead Array Chip.

FIG. 7 shows an orthographic plan-view of the Bottom Data Surface Phase-Change Microhead Array Chip.

FIG. 8 shows an orthographic plan-view of the Top Data Surface Phase-Change Microhead Array Chip.

FIG. 9 is an orthographic front-view drawing of a combination Top and Bottom chip-positioning circuit board, which is shown with the Phase-Change Microhead Array Chips installed into their surface-mounted chip-sockets.

FIG. 10 is an orthographic side-view drawing of a combination Top and Bottom chip-positioning circuit board, which is shown with the Phase-Change Microhead Array Chips, installed into their surface-mounted chip-sockets.

FIG. 55 is a 3D drawing showing a 45° right-side close-up of one Phase-Change Microhead Array Chip VCSEL microhead, while displaying minute structural details for a Phase-Change Microhead Array Chip VCSEL microhead.

FIG. 56 is a 3D drawing showing a 10° left-side close-up of one Phase-Change Microhead Array Chip VCSEL microhead, while displaying minute structural details for a Phase-Change Microhead Array Chip VCSEL microhead.

FIG. 62B is an enlarged block-diagram drawing showing details of internal component configurations for the ATA-2 IDE Disk Controller used in the Phase-Change Microhead Array Chip Hard Disk Drive design, which displays an enlarged block-diagram showing details of the block-diagram illustrated in FIG. 62A.

FIG. 63B is an enlarged block-diagram drawing showing details of internal component configurations for the SCSI Disk Controller used in the Phase-Change Microhead Array Chip Hard Disk Drive design, which displays an enlarged block-diagram drawing showing details of the block-diagram illustrated in FIG. 63A.

FIG. 63C is an enlarged block-diagram drawing showing details of internal component configurations for the SCSI Disk Controller used in the Phase-Change Microhead Array Chip Hard Disk Drive design, which displays an enlarged block-diagram drawing showing details of the block-diagram illustrated in FIG. 63A.

FIG. 65 is a logic-diagram drawing of the Address-Strobe And Chip-Select circuit.

FIG. 66 is a circuit-diagram drawing of the Address-Strobe And Chip-Select circuit.

FIG. 67 is a truth-table diagram for the Address-Strobe and Chip-Select circuit.

FIG. 68 is a conversion-table diagram for the Address-Strobe and Chip-Select circuit.

FIG. 69 is a logic-diagram drawing of the 32-bit Address Latch And Chip-Select circuit used in the Phase-Change Microhead Array Chip design, which displays a Chip-Select circuit's connectivity within the Phase-Change Microhead Array Chips.

FIG. 87 is a logic-diagram drawing showing the digital logic behind the operation of the R/W Control Circuit.

FIG. 88 is a circuit-diagram drawing showing the circuit configurations behind the operation of the R/W Control Circuit.

FIG. 89 is a truth-table diagram-drawing showing in word form the digital logic behind the operation of the R/W Control Circuit.

FIG. 90 is a conversion-table legend drawing used to translate drawing symbols that represent various voltage settings for circuits illustrated in FIGS. 87, and 88.

FIG. 91 is a logic-diagram drawing showing the digital logic behind the operation of a read-channel's AOI XOR Bi-Phase Encoded Data-Out Circuit, Pre-DPLL Circuit, and DClock-Input Circuit.

FIG. 92 is a circuit-diagram drawing showing the circuit configurations behind the operation of a read-channel's AOI XOR Bi-Phase Encoded Data-Out Circuit, Pre-DPLL Circuit, and Dclock-Input Circuit.

FIG. 93 is a Bi-Phase Data Encoding diagram drawing displaying the data-stream encoding scheme to be used by a read-channel's AOI XOR Bi-Phase Encoded Data-Out Circuit, Pre-DPLL Circuit, and Dclock-Input Circuit.

FIG. 94 is a truth-table diagram-drawing showing in word form the digital logic behind the operation of a read-channel's AOI XOR Bi-Phase Encoded Data-Out Circuit, Pre-DPLL Circuit, and Dclock-Input Circuit.

FIG. 95 is a conversion-table legend drawing used to translate drawing symbols that represent various voltage settings for circuits illustrated in FIGS. 91, 92, and 93.

FIG. 102 is a logic-diagram drawing showing the digital logic behind the operation of write-channel's "Write Data Acknowledge" (–WDTACK) control signals.

FIG. 103 is a circuit-diagram drawing showing the circuit configurations behind the operation of a write-channel's "Write Data Acknowledge" (–WDTACK) control circuits.

FIG. 104 is a truth-table diagram drawing showing in word form the digital logic behind the operation of a write-channel's "Write Data Acknowledge" (–WDTACK) control signals.

FIG. 105 is a conversion-table legend drawing used to translate drawing symbols that represent various voltage settings for circuits illustrated in FIGS. 102 and 103.

FIG. 107 is a logic-diagram drawing showing the digital logic behind the operation of the Microhead Selection Line and Transmission-Gate Switching Circuits, while displaying the digital logic behind the operation of a Microhead Selection Line Circuit's control over every VCSEL microhead's connection to the power buses used in the Phase-Change Microhead Array Chips, using three illustrated examples of VCSEL microheads, which are shown in FIG. 107 as VCSEL00, VCSEL01, and N.

FIG. 108A is an orthographic side-view drawing showing details of a One Half-Mirrored Beam-Splitting Analyzer, One Quarter-Wave Light Polarizing Calcite Plate, One VCSEL Microhead, and two "Semiconductor Photo-Conductor" (SPC) photo-detection arrays.

FIG. 108B is a close-up drawing figure detail that uses an enclosed hatched-pattern to illustrate the necessary crystallographic orientation of two crystals used in the construction of the Half-Mirrored Beam-Splitting Analyzer.

FIG. 109 is a circuit-diagram drawing showing the circuit configurations behind the operation of a read-channel's VCSEL Microhead "Power Control Circuits" (PCCs), while displaying circuit configurations behind the operation of the two transmission-gates responsible for circuit pathway selection and power switching between the "Write Laser Voltage" (WLV) and the "Read Laser Voltage" (RLV) input power-bus lines.

FIG. 110 is a logic-diagram drawing showing the digital logic behind the operation of a read-channel's VCSEL Microhead "Vertical Cavity Surface Emitting Laser Power Control Circuit" (VCSEL Microhead PCC), while displaying the digital logic behind the operation of the two transmission-gates responsible for circuit pathway selection and power switching between the "Write Laser Voltage" (WLV) and the "Read Laser Voltage" (RLV) input power-bus lines.

FIG. 111 is a circuit-diagram drawing showing the circuit configurations behind the operation of the Microhead Selection Line and Transmission-Gate Switching Circuits, while displaying the circuit configurations behind the operation of a Microhead Selection Line Circuit's control over the connectivity to power bus lines for every VCSEL microhead used within a Phase-Change Microhead Array Chip, which are illustrated in FIG. 111 as VCSEL00, VCSEL01, and N.

Figure 112:
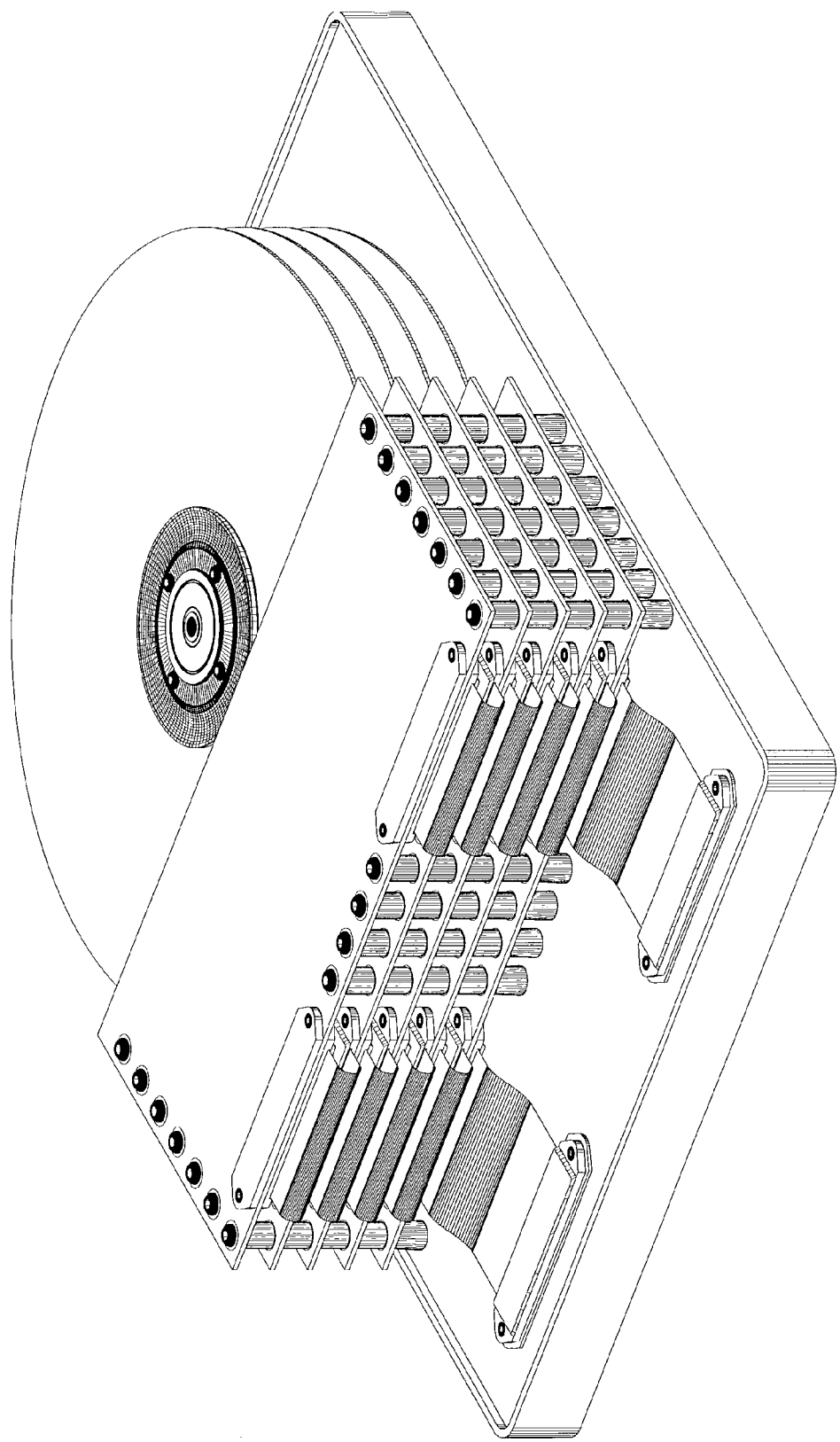

FIG. 112 is a 3D perspective-view drawing that illustrates how a Phase-Change Microhead Array Chip Hard Disk Drive unit-assembly will look when fully assembled, while for reasons of visual clarity is shown without a hard disk cover or a hard disk cover's sealing gasket.

Figure 113:
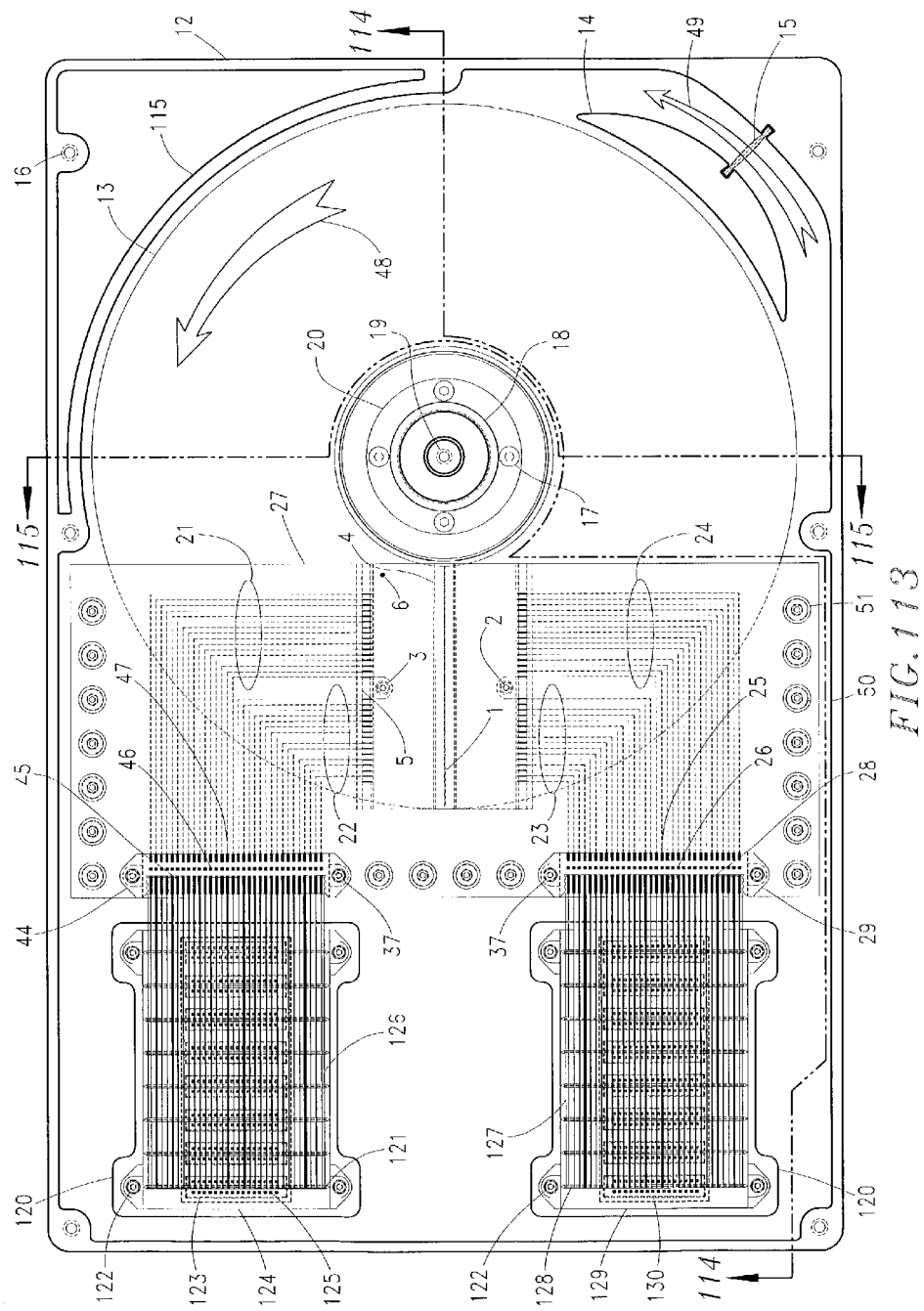

FIG. 113 shows an orthographic plan-view of a Phase-Change Microhead Array Chip Hard Disk Drive unit-assembly, shown with the hard disk drive cover and sealing gasket removed and configured with a dedicated Microhead-array Chip bus system.

Figure 114:
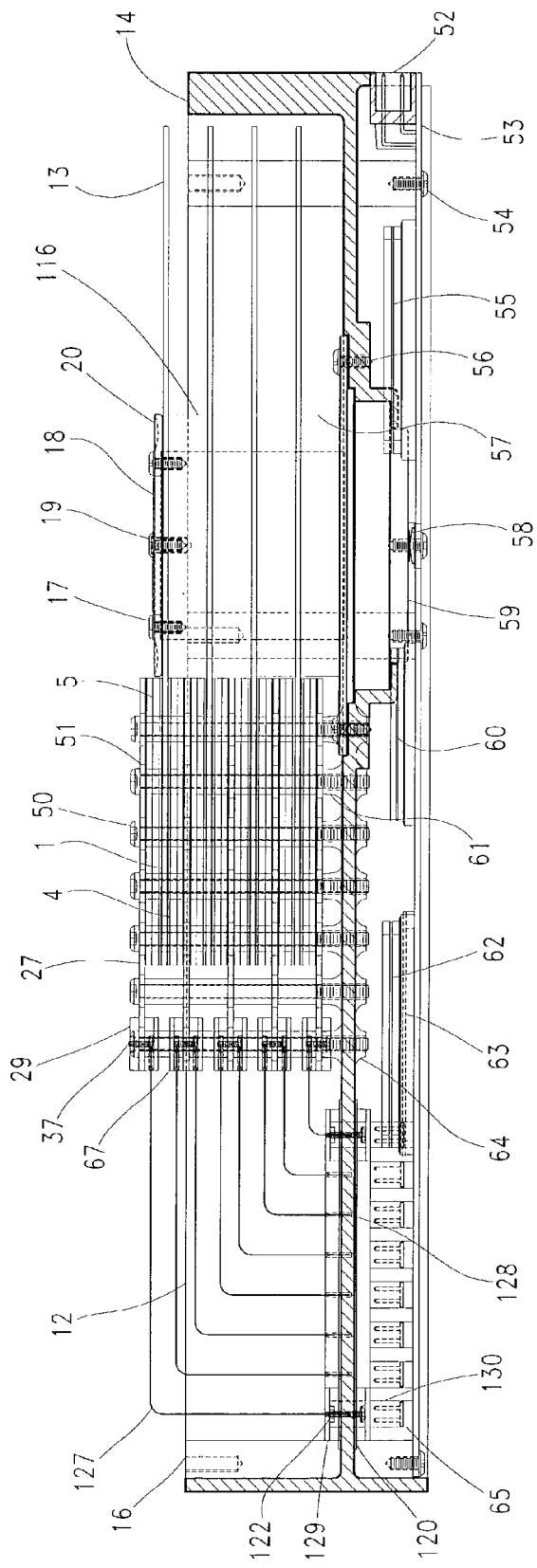

FIG. 114 shows an orthographic side-view of a Phase-Change Microhead Array Chip Hard Disk Drive unit-assembly, shown with the hard disk drive cover and sealing gasket removed and configured with a dedicated Microhead-array Chip bus system, displaying section 114-114.

Figure 115:
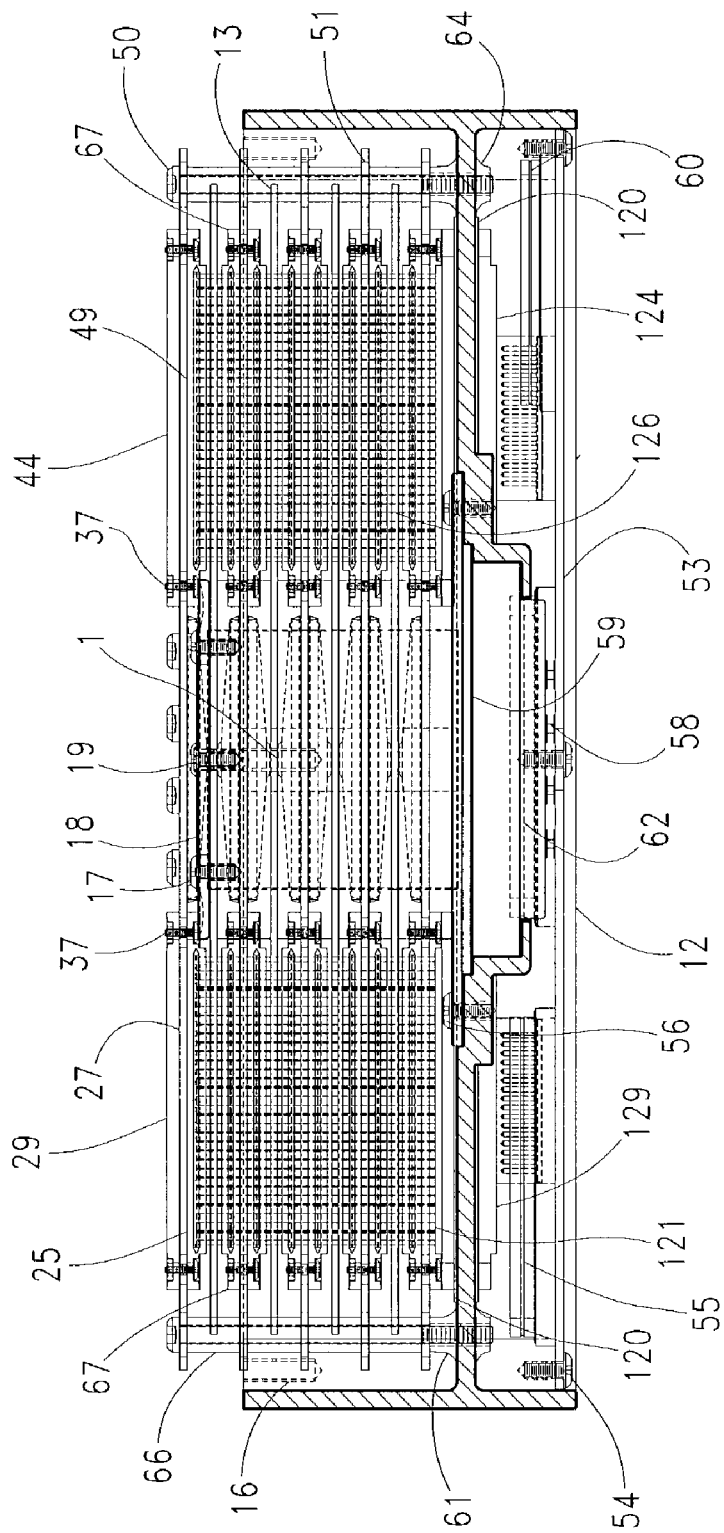

FIG. 115 shows an orthographic front-view of a Phase-Change Microhead Array Chip Hard Disk Drive unit-assembly, shown with the hard disk drive cover and sealing gasket removed and configured with a dedicated Microhead-array Chip bus system, displaying section 115-115.

Figure 116:
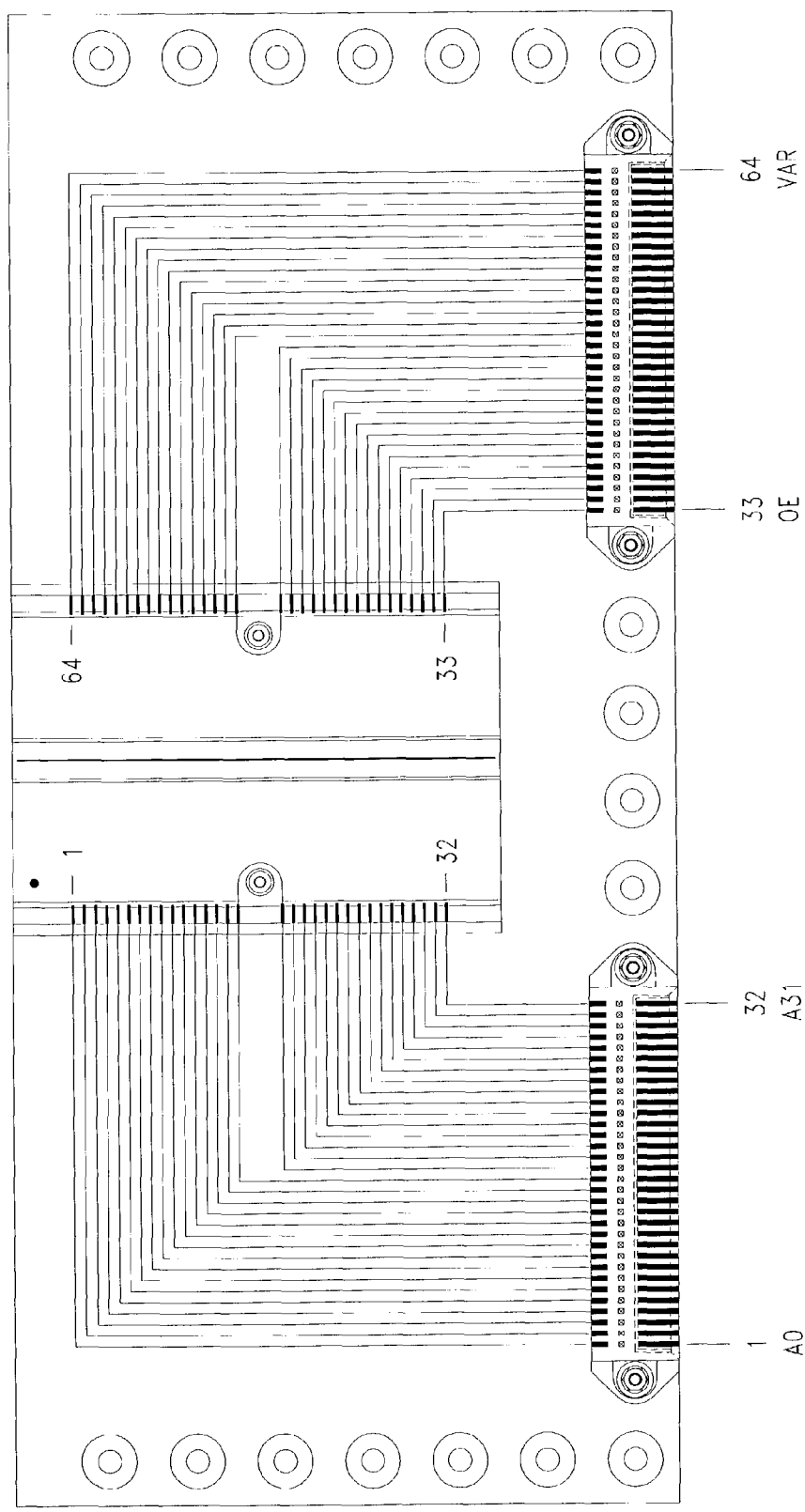

FIG. 116 is a plan-view drawing of a chip-positioning circuit board that displays a Phase-Change Microhead Array Chip Number-1, which is positioned for disk-platter one's bottom-side (also called disk-platter one's data-surface side-one).

Figure 117:
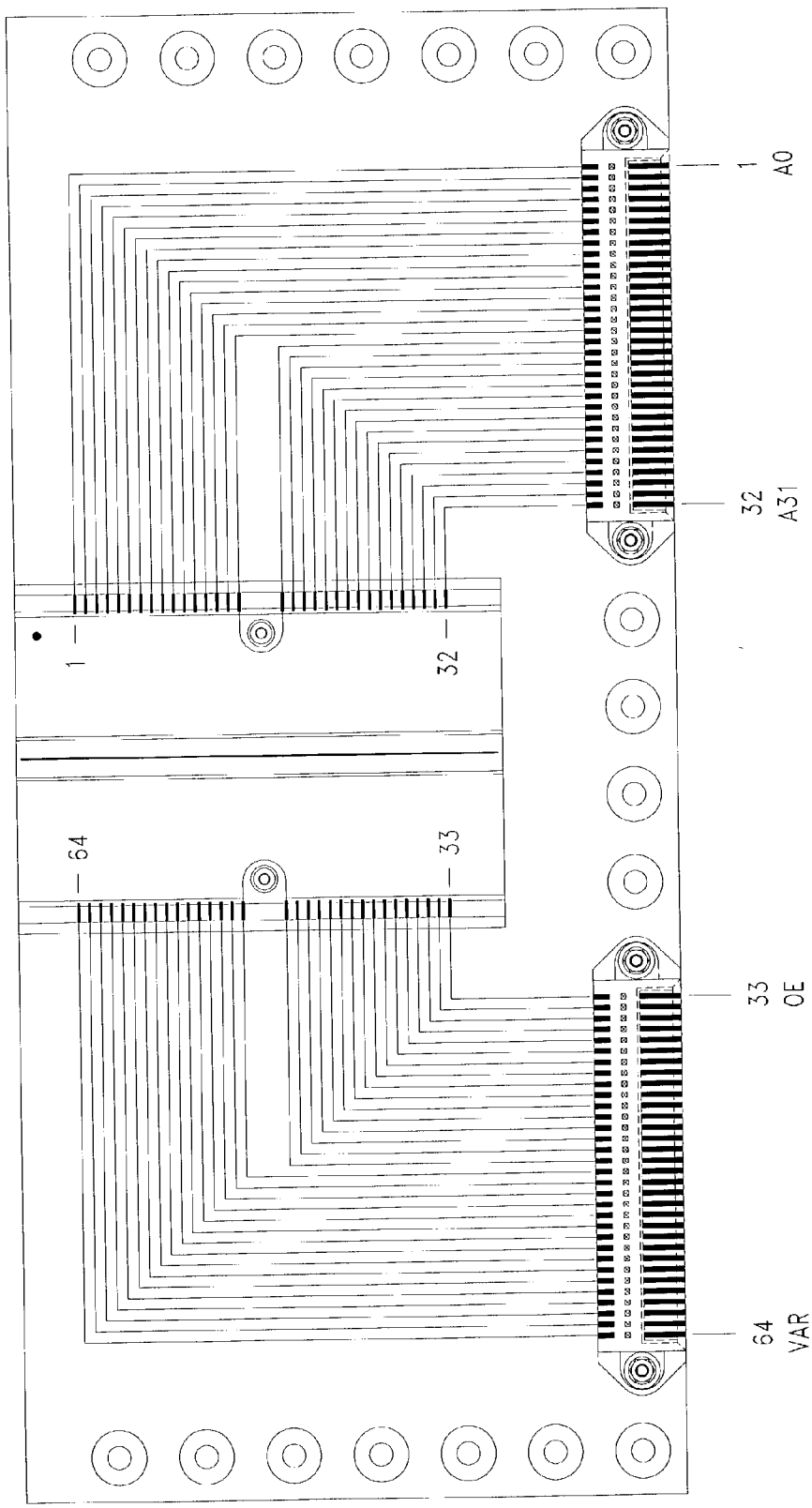

FIG. 117 is a plan-view drawing of a chip-positioning circuit board that displays a Phase-Change Microhead Array Chip Number-2, which is positioned for disk-platter one's top-side (also called disk-platter one's data-surface side-two).

Figure 118:
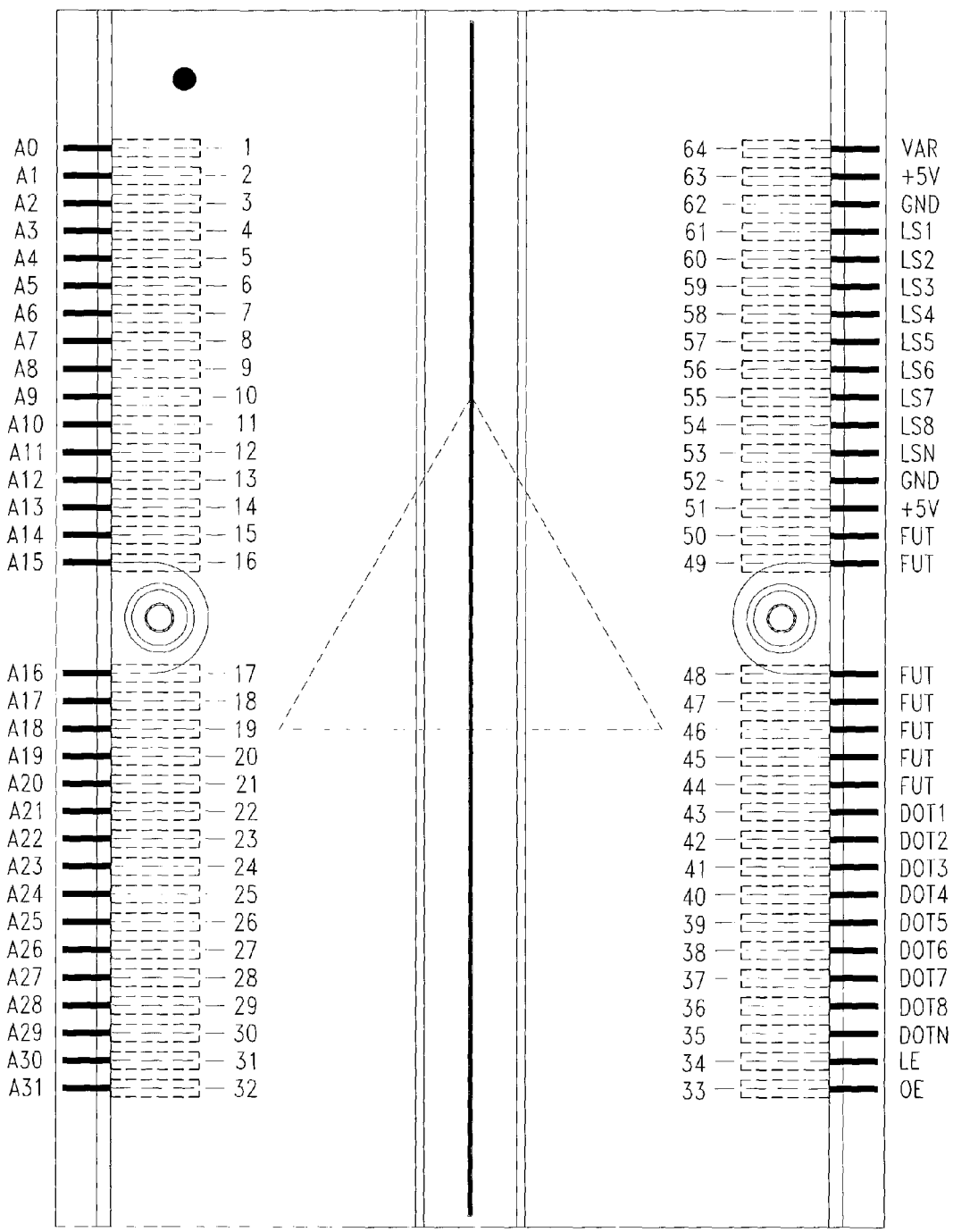

FIG. 118 is an orthographic plan-view drawing of a Phase-Change Microhead Array Chip, which shown installed into a surface-mounted chip-socket that displays pin locations, number assignments, and logic-function labels for the Bottom Data-Surface Phase-Change Multichannel Phase-Change Microhead Array Chip.

Figure 119:
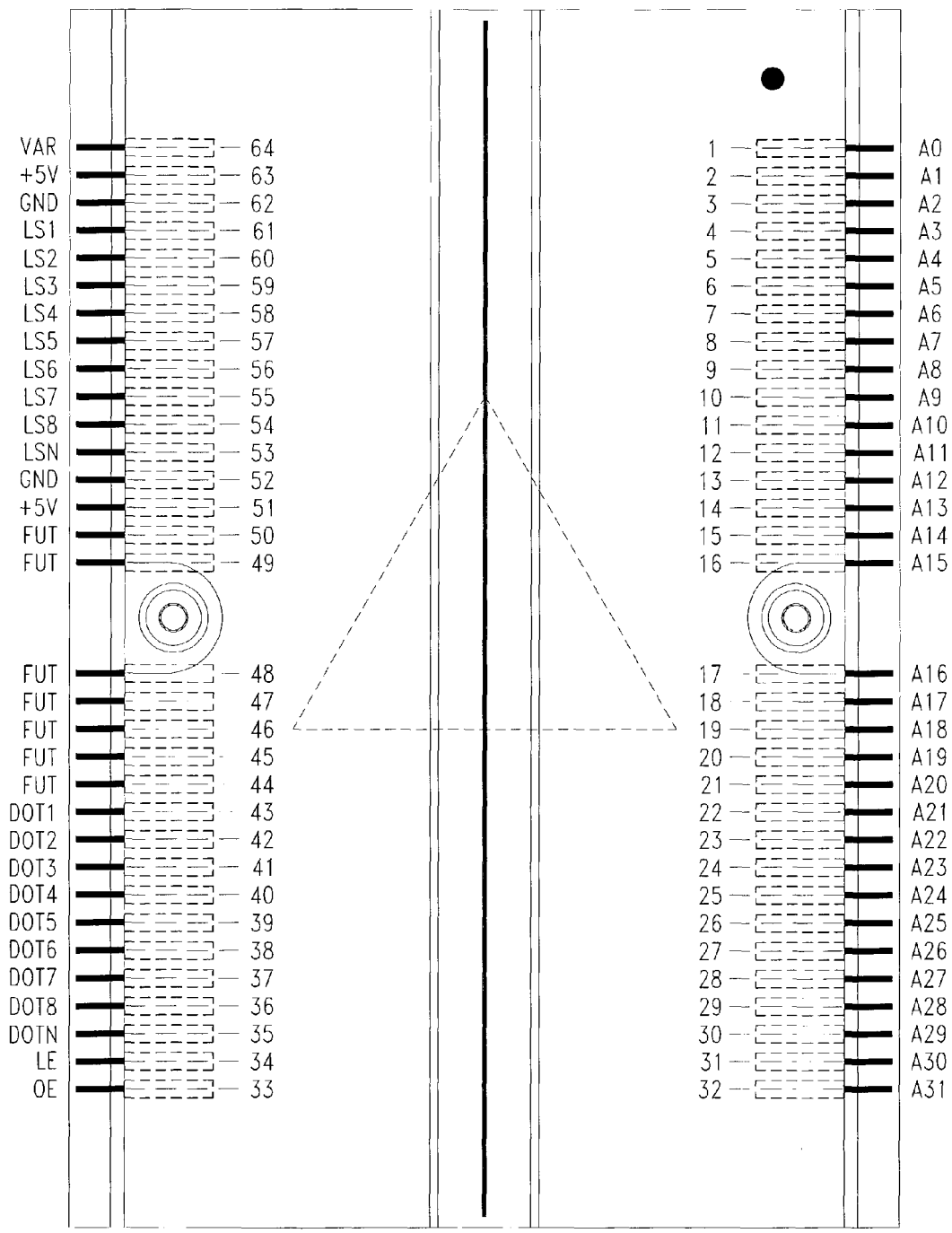

FIG. 119 is an orthographic plan-view drawing of a Phase-Change Microhead Array Chip, which is shown installed into a surface-mounted chip-socket that displays pin locations, number assignments, and logic-function labels for the Top Data-Surface Phase-Change Multichannel Phase-Change Microhead Array Chips.

Figure 120:
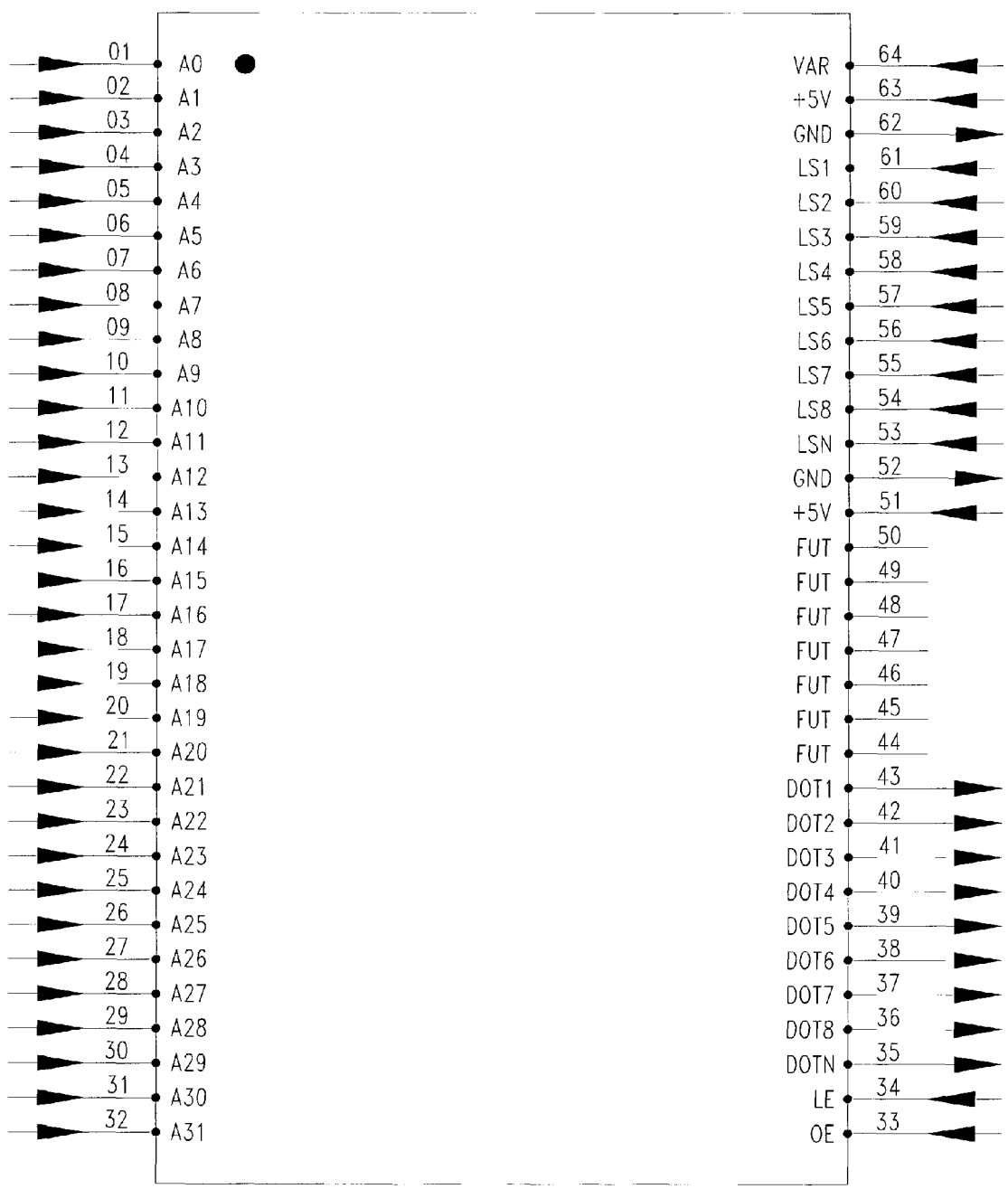

FIG. 120 is a logic-signal flow schematic for the Bottom Data-Surface Multichannel Phase-Change Microhead Array Chips, displaying signal direction, pin assignments, and function labels.

Figure 121:
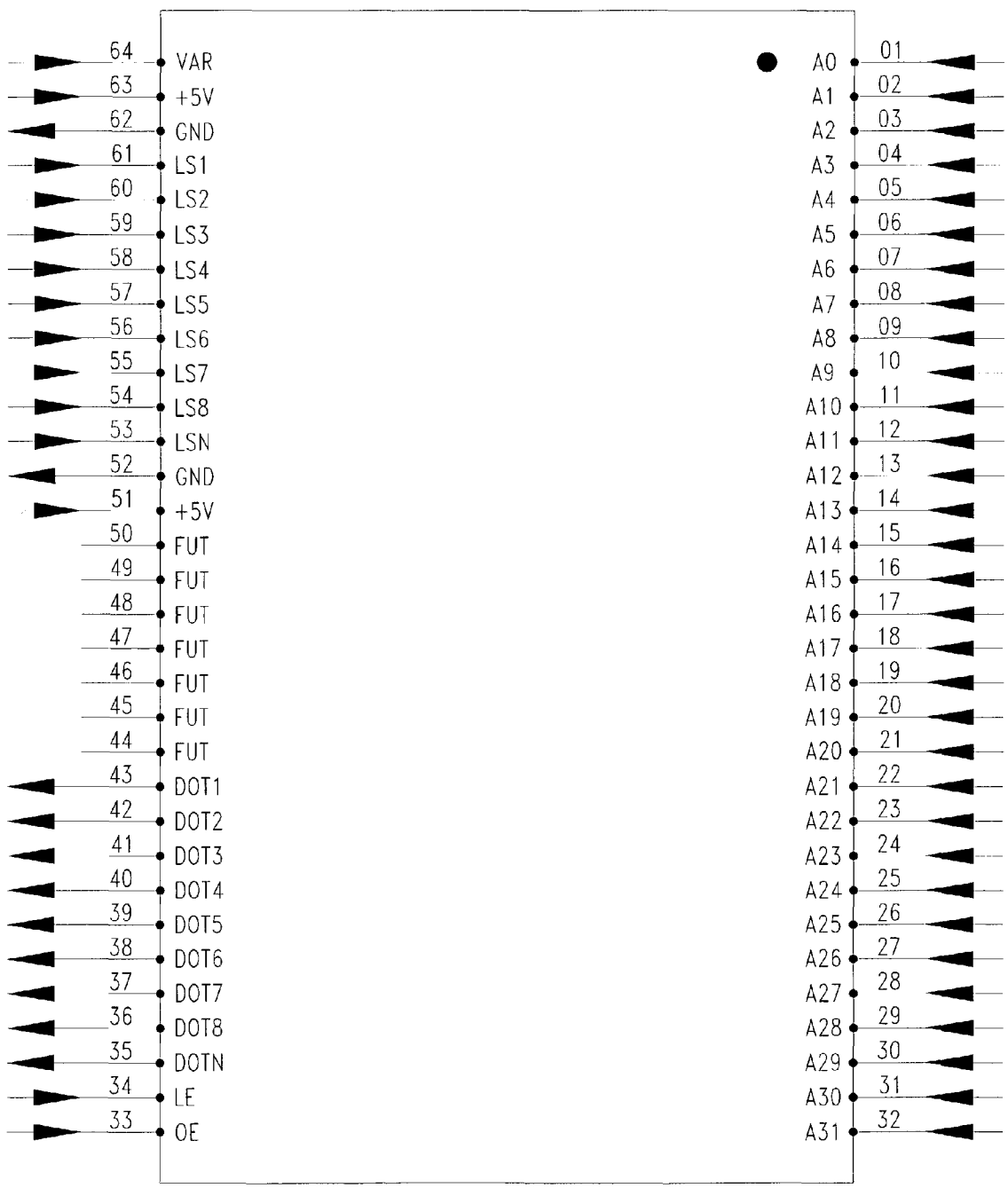

FIG. 121 is a logic-signal flow schematic for the Top Data-Surface Multichannel Phase-Change Microhead Array Chips, displaying signal direction, pin assignments, and pin function labels.

FIG. 122 is a plan-view drawing of a Polymer flex buscable for the chip-positioning circuit boards' right side connector as used in the Multichannel Phase-Change Microhead Array Chip design, displaying data-bus, future-bus, and control-bus pin assignments.

Figure 123:
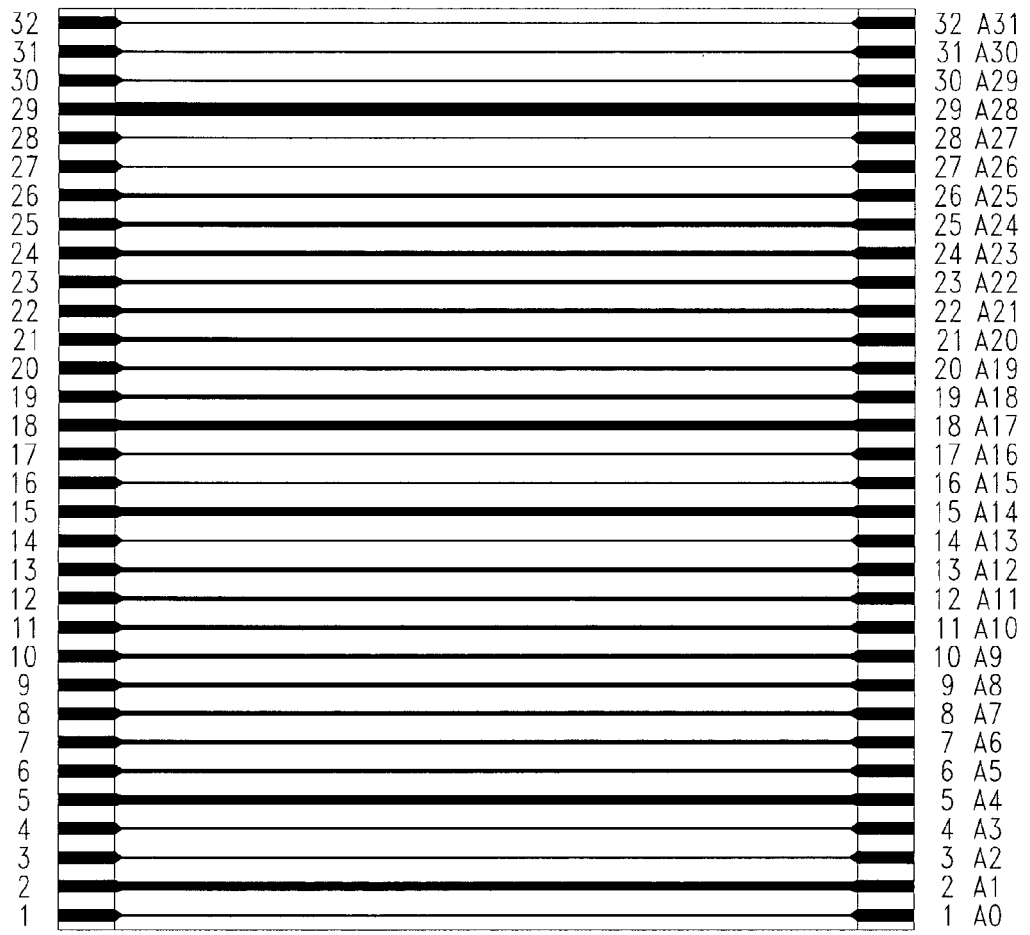

FIG. 123 is a plan-view drawing of a Polymer flex buscable for the chip-positioning circuit boards' left side connector as used in the Multichannel Phase-Change Microhead Array Chip design, displaying the "32" bit address-bus pin assignments.

Figure 124:
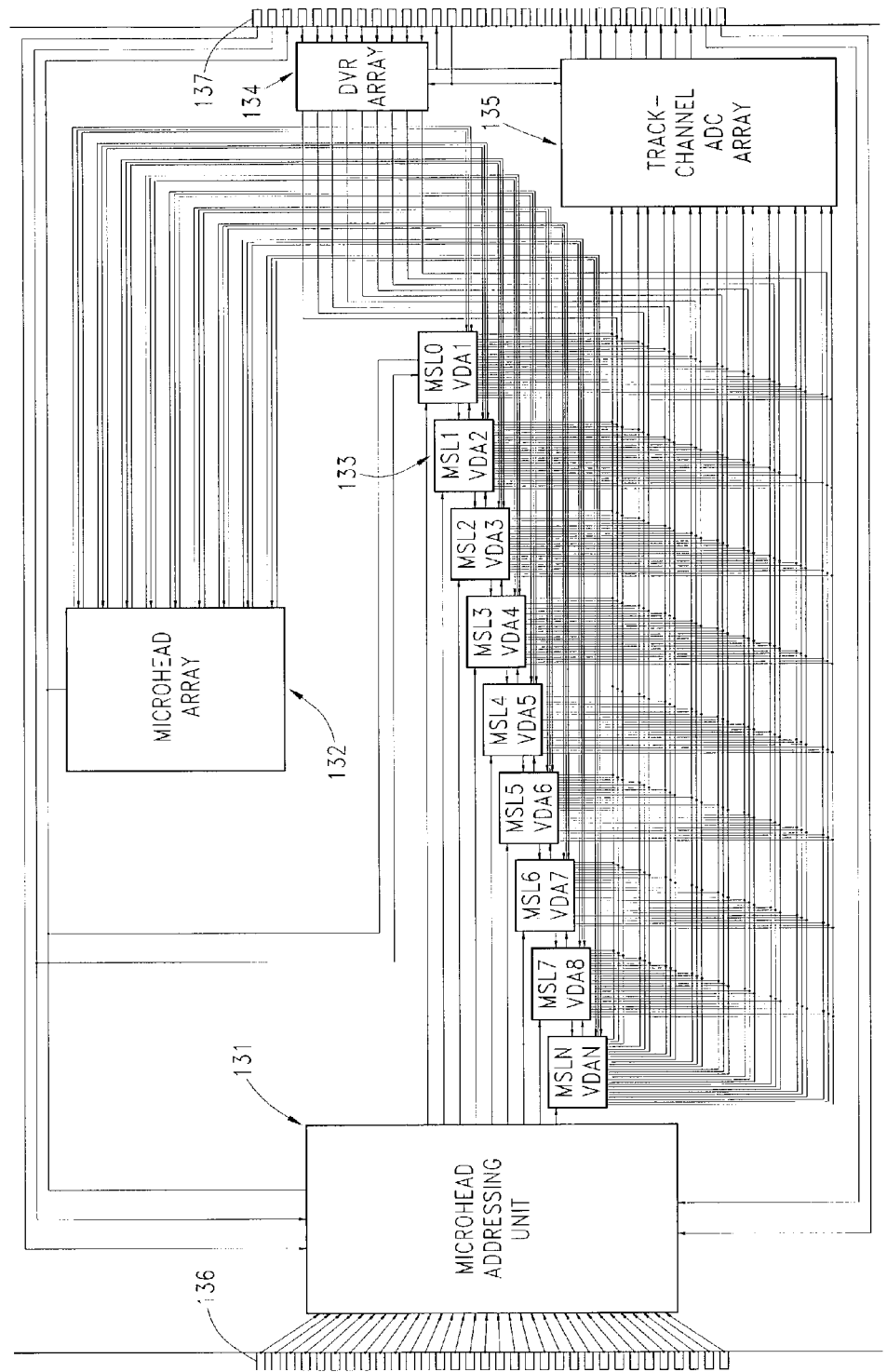

FIG. 124 is a block-diagram drawing showing the internal component configurations for the Multichannel Phase-Change Microhead Array Chips.

Figure 125:
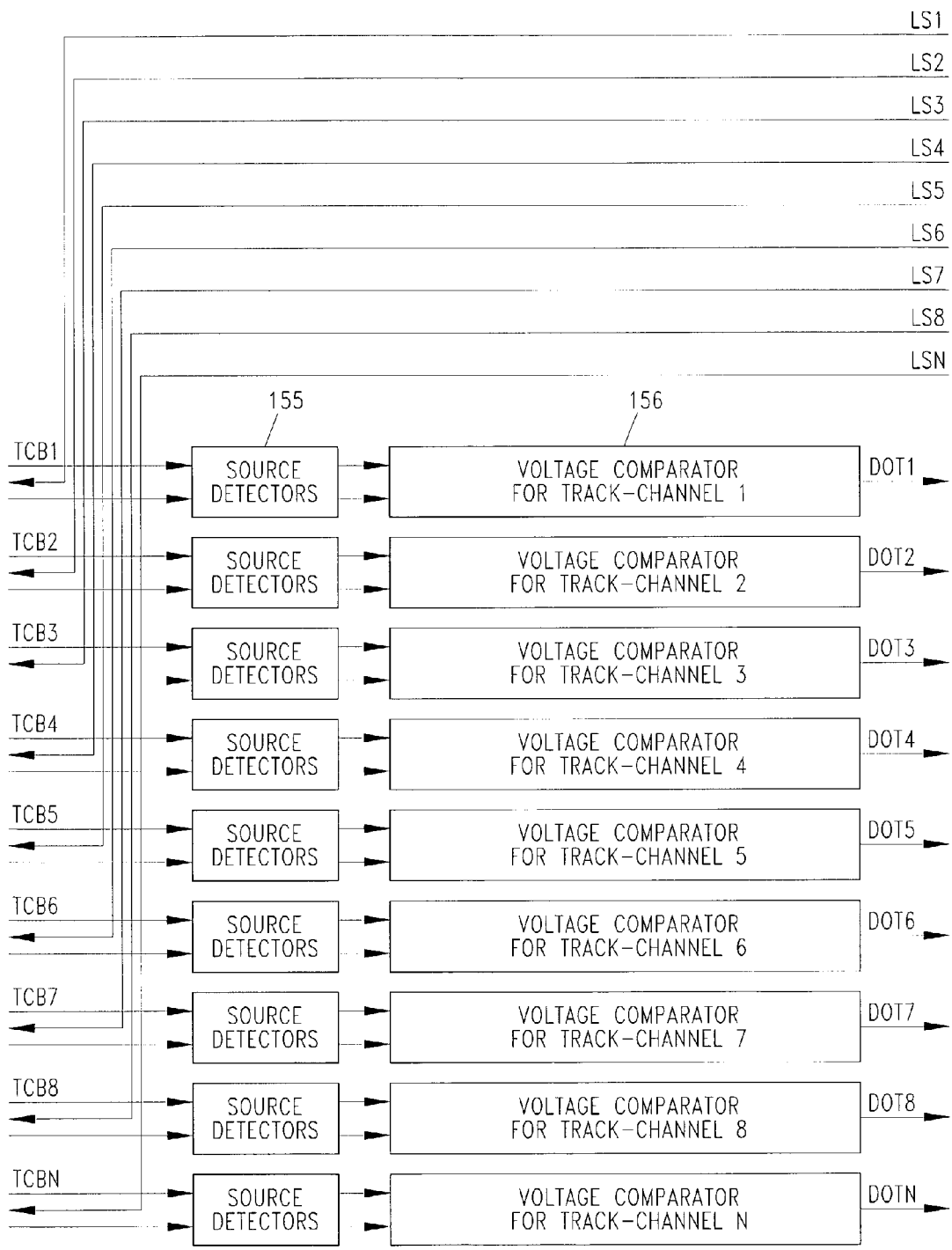

FIG. 125 is a block-diagram drawing showing the internal component configurations for a Multichannel Phase-Change Microhead Array Chip's multiple read channels.

Figure 126:
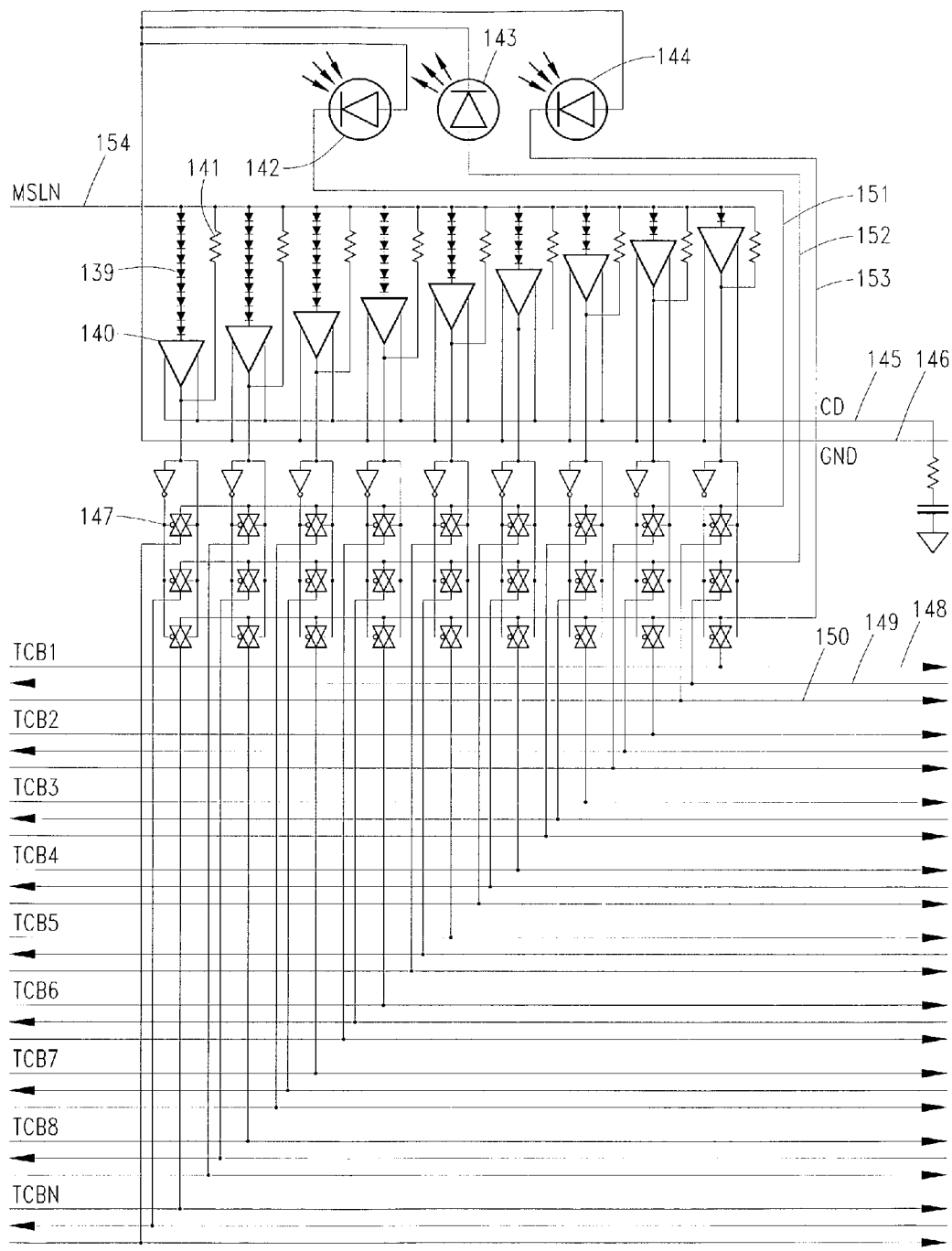

FIG. 126 is a logic-diagram drawing showing the internal logic configurations for the Multichannel Phase-Change Microhead Array Chip's Multiswitching Voltage Detector Arrays, which are each, located at the termination of every microhead selection line.

Figure 127:
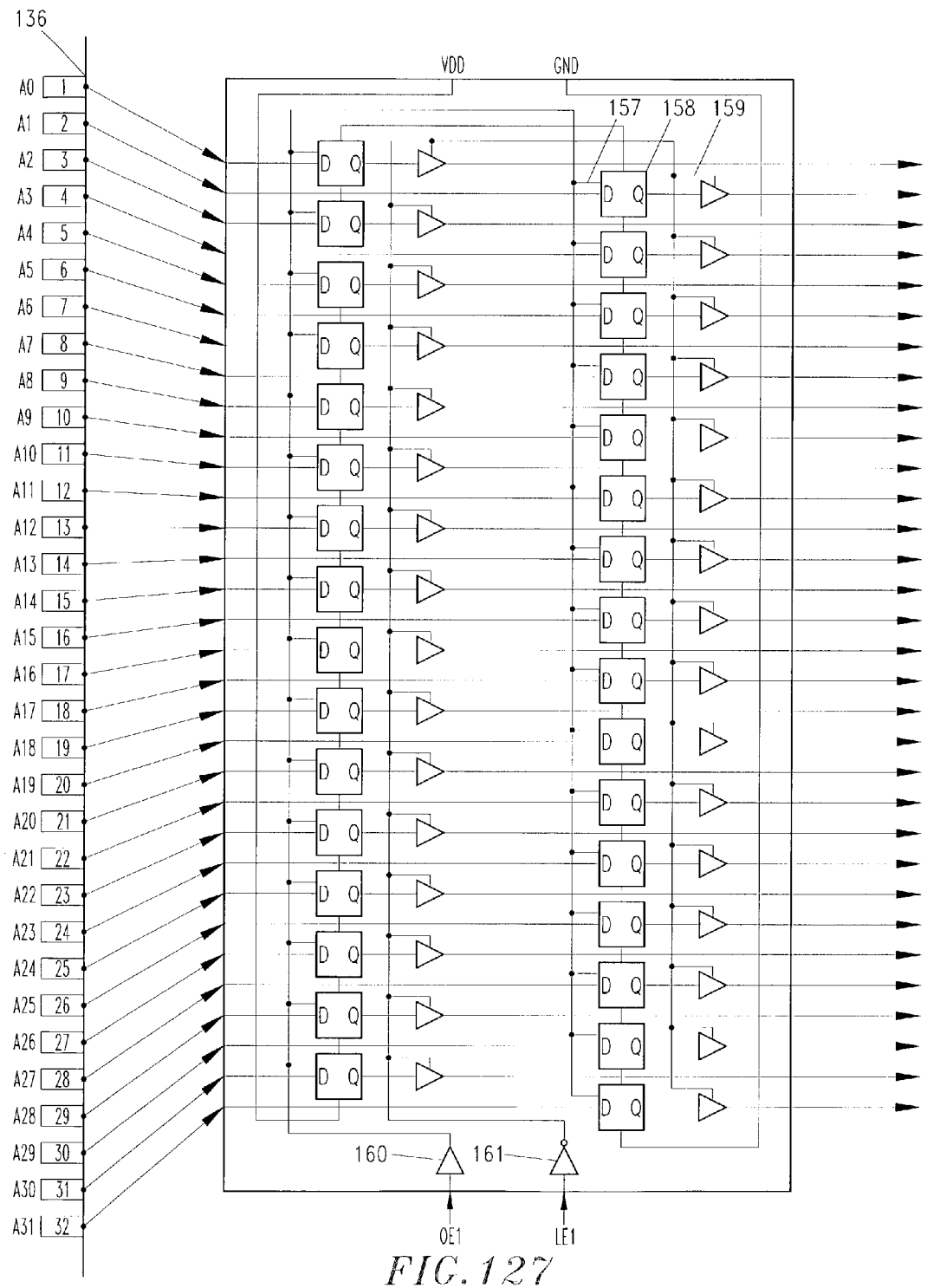

FIG. 127 is a logic-diagram drawing of the 32-bit Microhead Address Latch circuit used in every Multichannel Phase-Change Microhead Array Chip.

Figure 128:
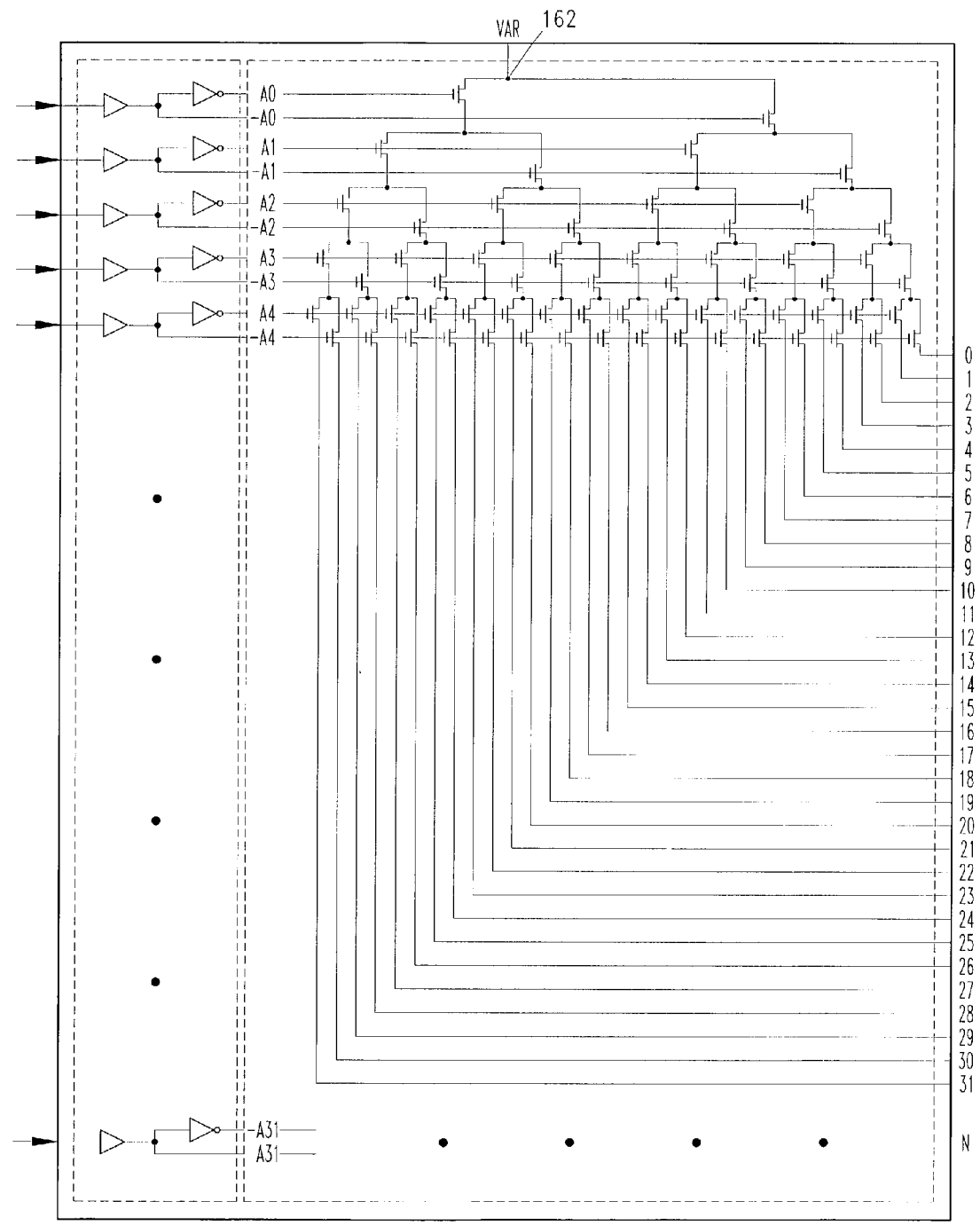

FIG. 128 is a circuit-diagram drawing showing circuit details of the 32-bit Address-Decoder circuit.

Figure 129:
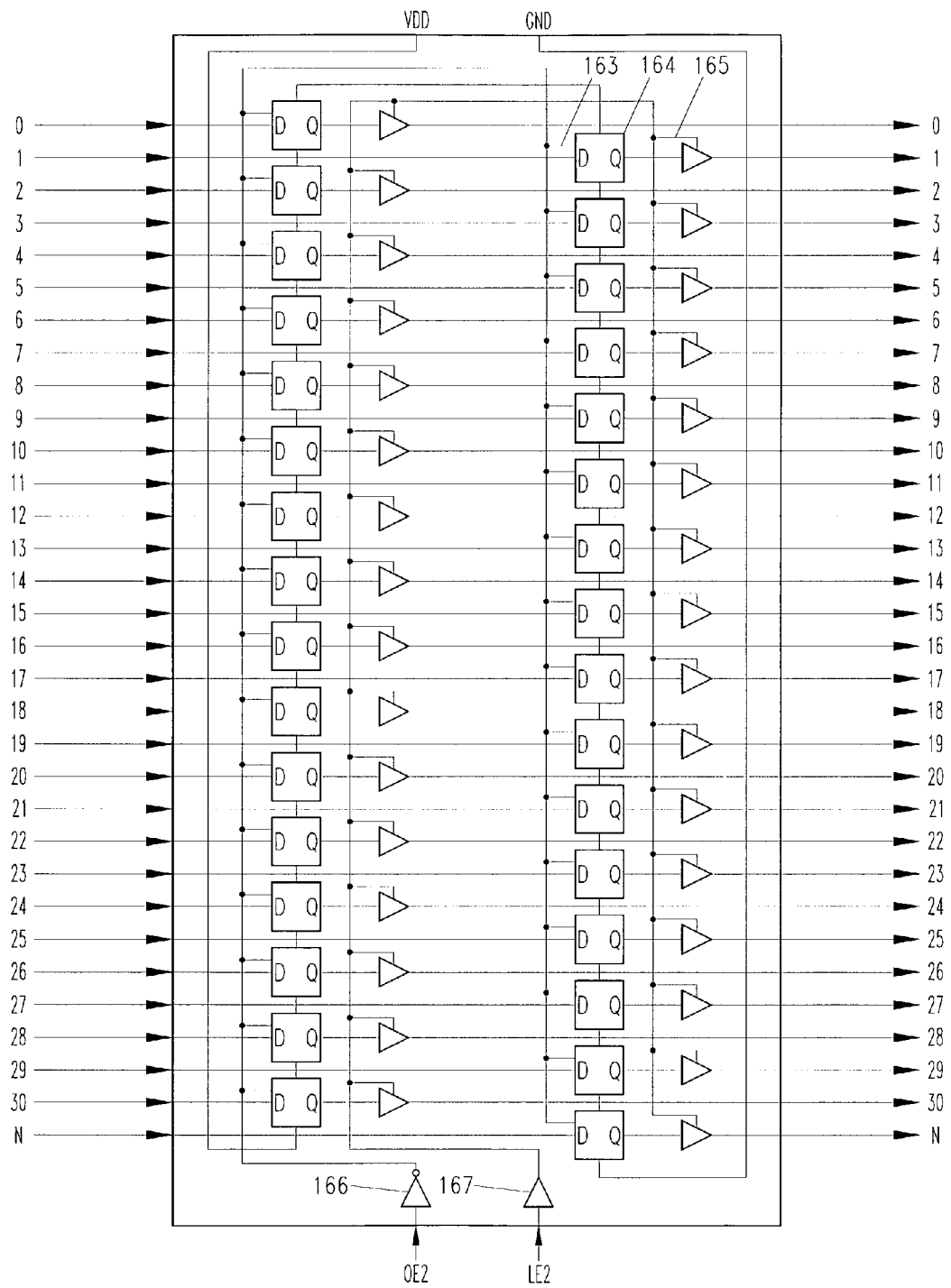

FIG. 129 is a logic-diagram drawing of the Voltage-Variable MSL Buffer and Latch Circuit used in every Multichannel Phase-Change Microhead Array Chip.

Figure 130:
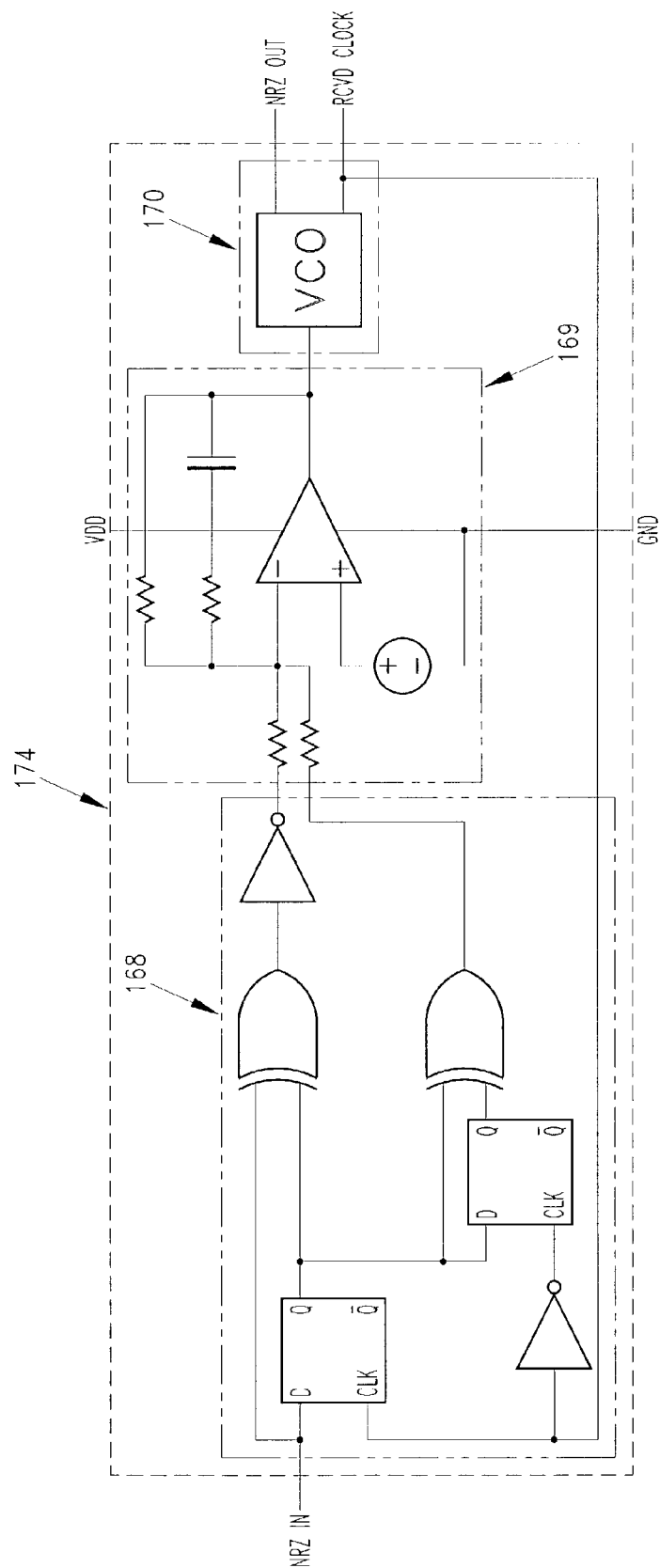

FIG. 130 is both a logic and a block-diagram drawing of a multiple readchannel's Self-Clocking DPLL circuit.

Figure 131:
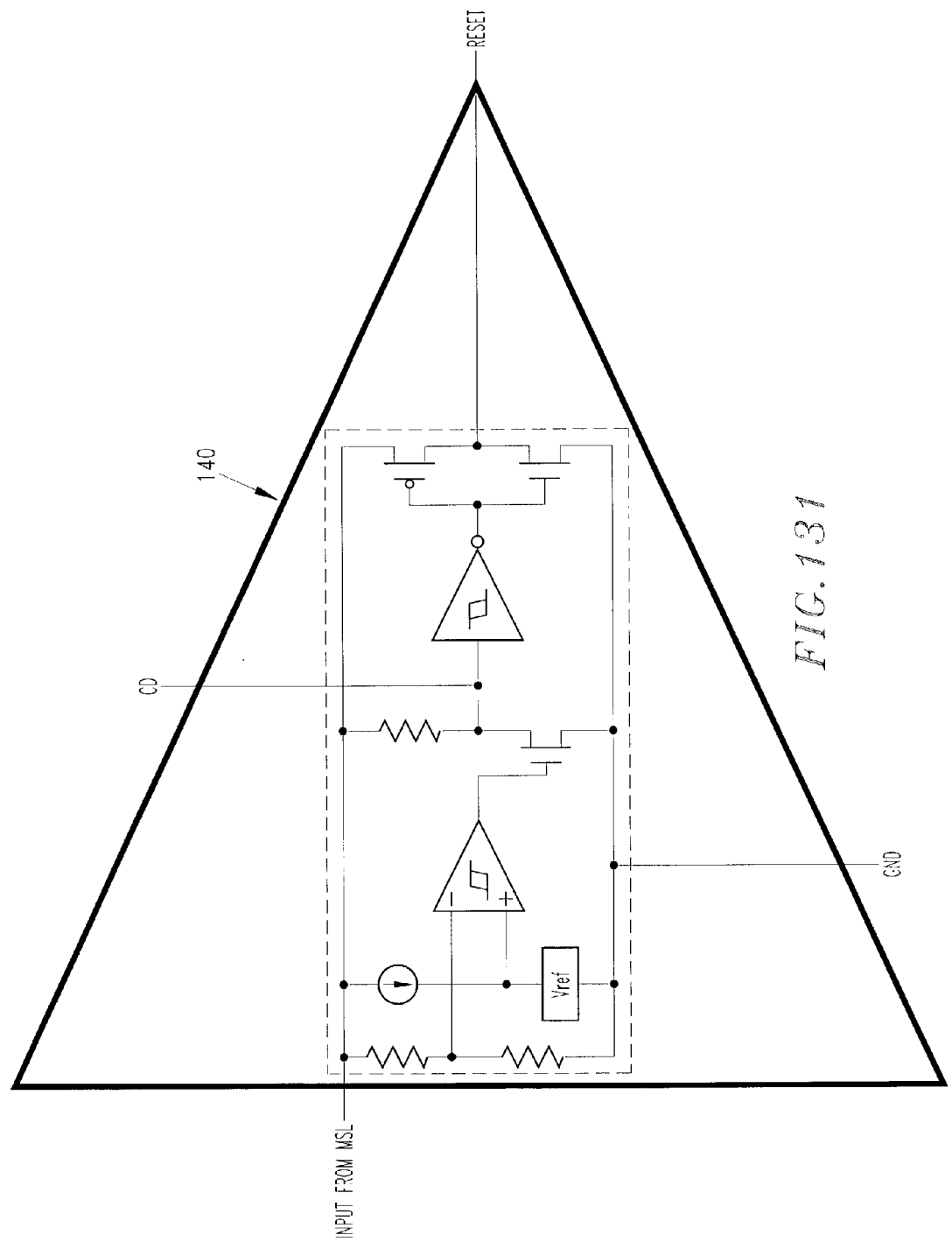

FIG. 131 is a block and logic-diagram drawing of one of the voltage detector circuits that makeup the Multiswitching Voltage Detector Arrays located within every Multichannel Phase-Change Microhead Array Chip.

FIG. 132 is a logic-diagram drawing of a Track-Channel Voltage Comparator circuit, which along with other voltage comparators form an array that partially comprises the multiple read-channel of every Multichannel Phase-Change Microhead Array Chip.

FIG. 133 is a circuit-diagram drawing of a Track-Channel Voltage Comparator circuit, which along with other voltage comparators form an array that partially comprises the multiple read-channel of every Multichannel Phase-Change Microhead Array Chip.

Figure 134:
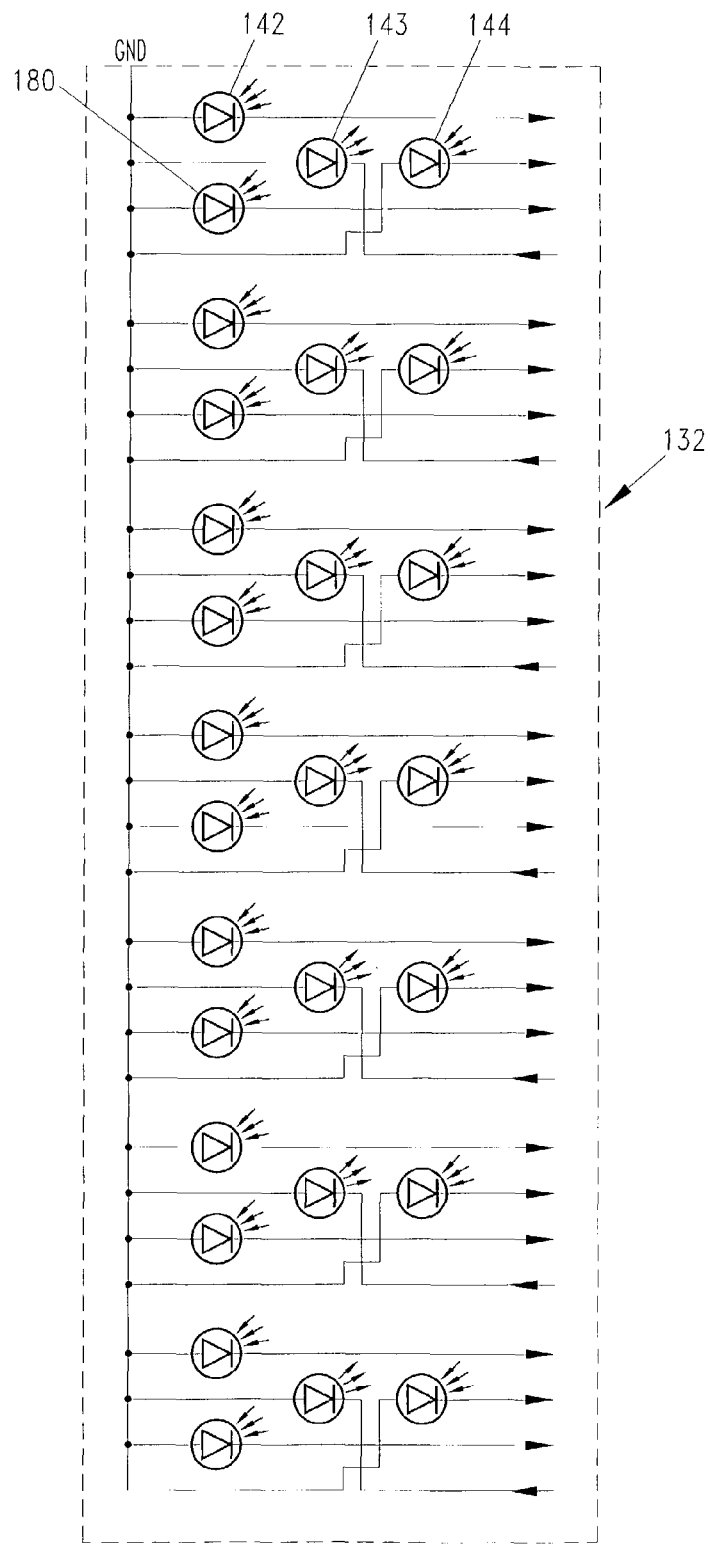

FIG. 134 is a circuit-diagram drawing of the photo-detectors and photo-emitters used to comprise the microhead-array located within every Multichannel Phase-Change Microhead Array Chip.

Figure 135:
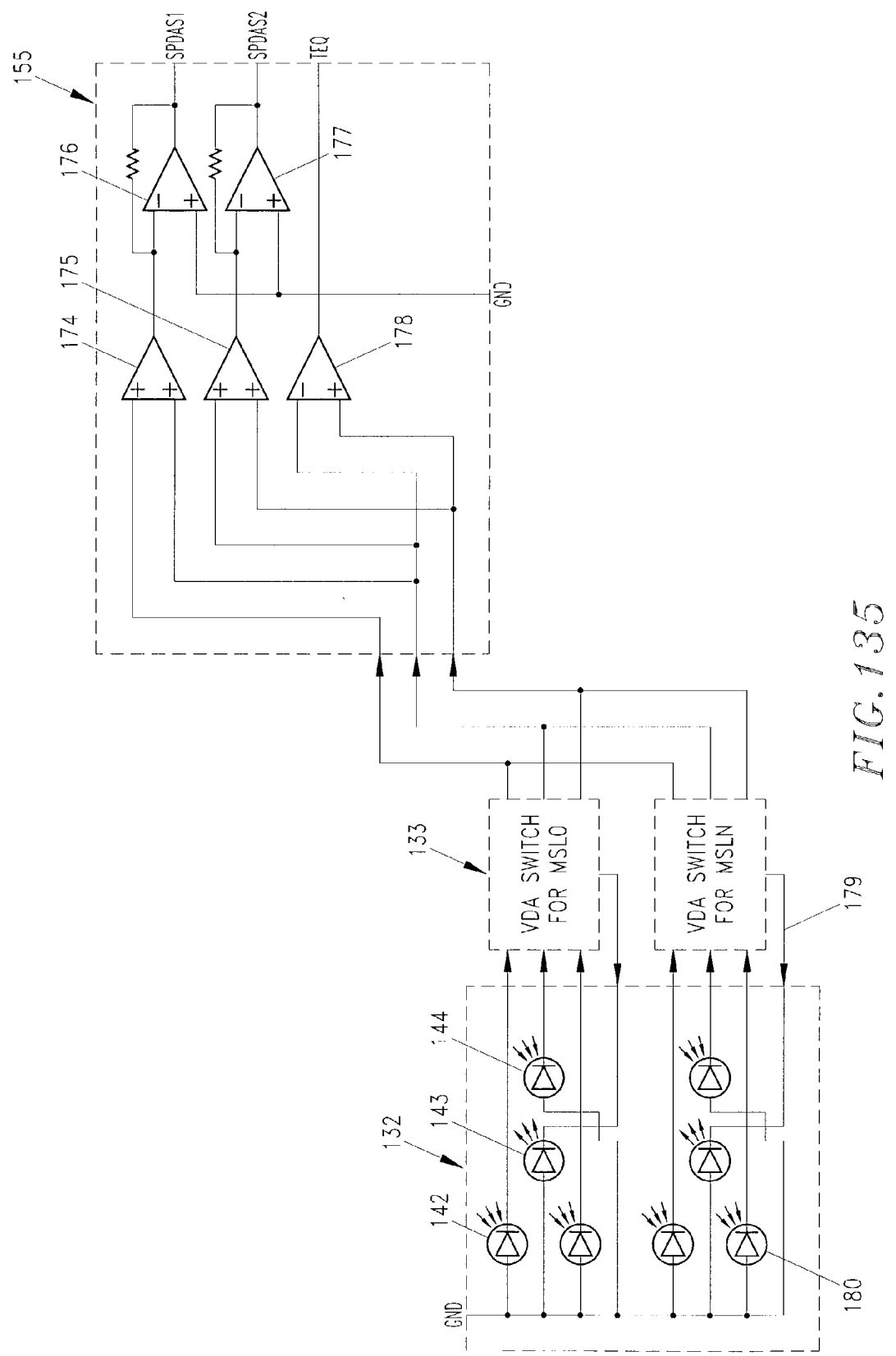

FIG. 135 is a circuit and logic-diagram drawing of a Source Detector circuit, which along with other source detectors form an array that partially comprises the multiple read-channel of every Multichannel Phase-Change Microhead Array Chip.

Figure 136:
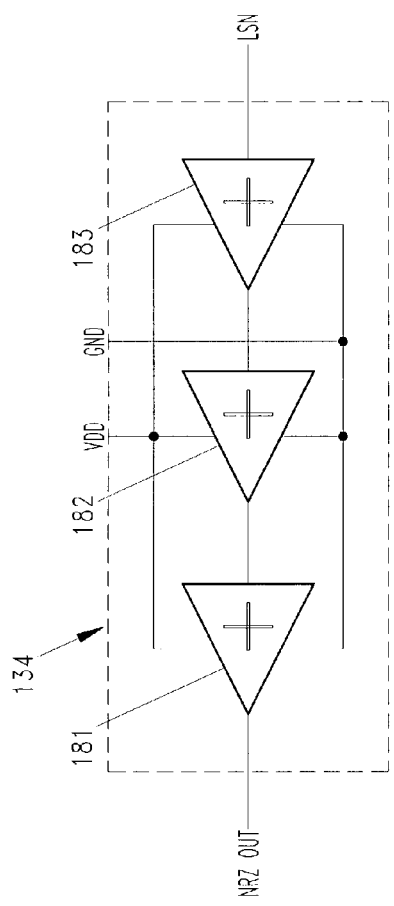

FIG. 136 is a logic-diagram drawing of a Photo-Emitter Driver circuit, which along with other photo-emitter driver circuits form an array that partially comprises the multiple write-channel of every Multichannel Phase-Change Microhead Array Chip.

Figure 137:
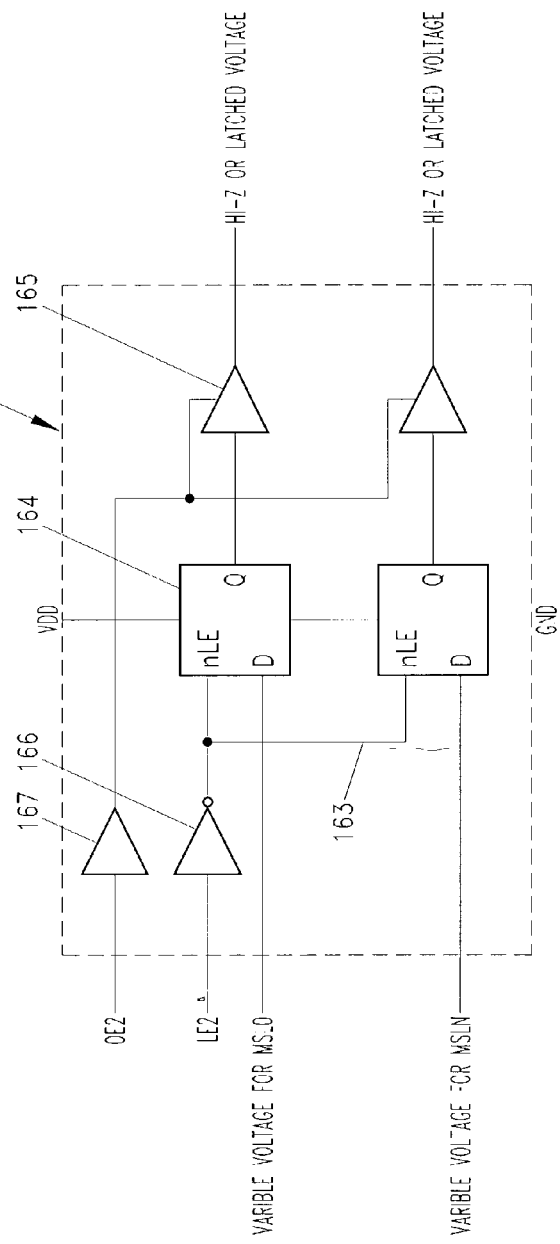

FIG. 137 is a logic-diagram drawing of a Voltage-Variable MSL Buffer and Latch circuit, which along with other voltage-variable msl buffer and latch circuits form a buffer and amplification circuit for every microhead selection line variable-voltage that occurs within a Multichannel Phase-Change Microhead Array Chip.

Figure 138:
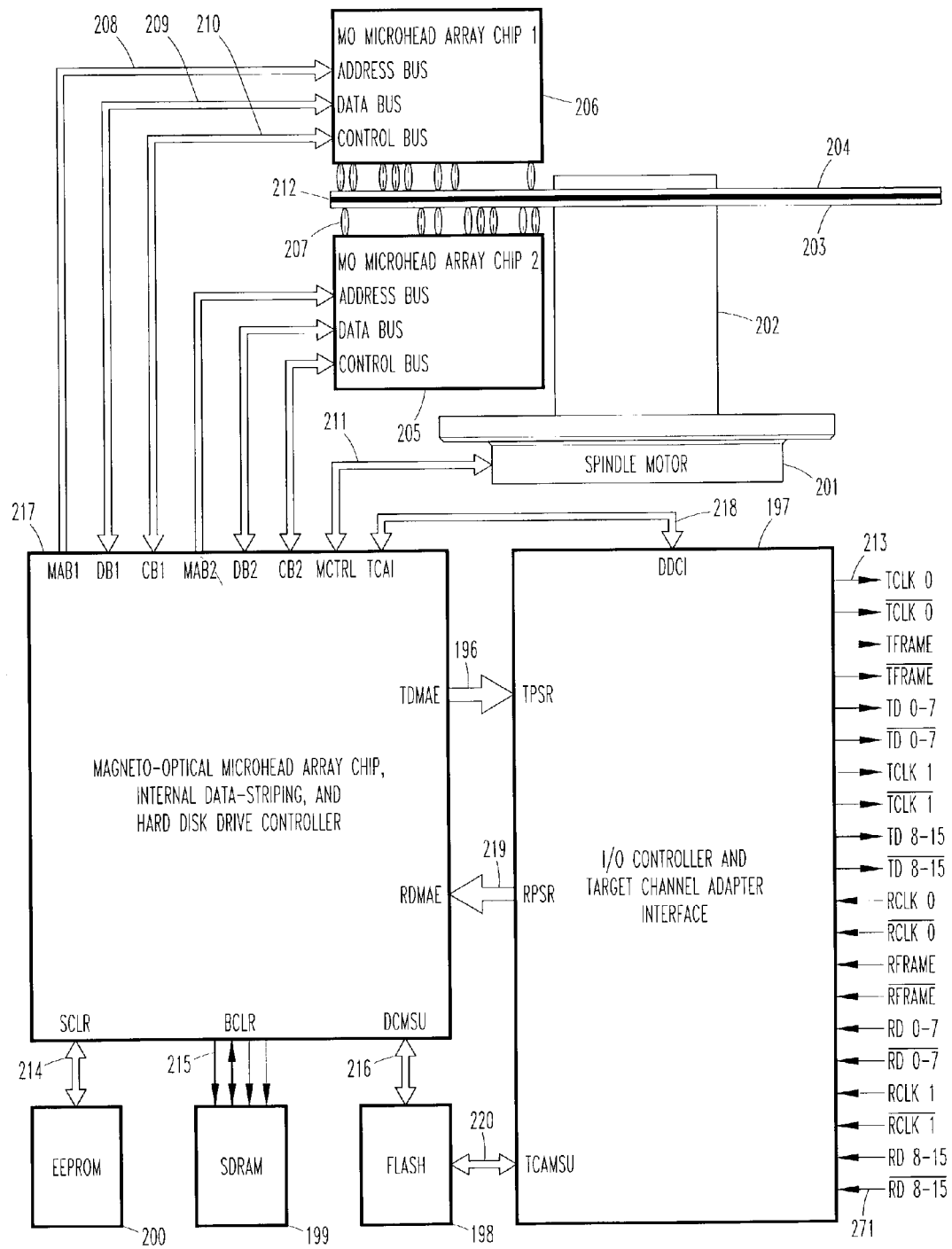

FIG. 138 is a block-diagram drawing of the Microhead-array Chip, Internal Data-Striping, Hard Disk Drive, I/O and Target Channel Adapter Interface Controller used in the Multichannel Phase-Change Microhead Array Chip Hard Disk Drive design.

Figure 139:
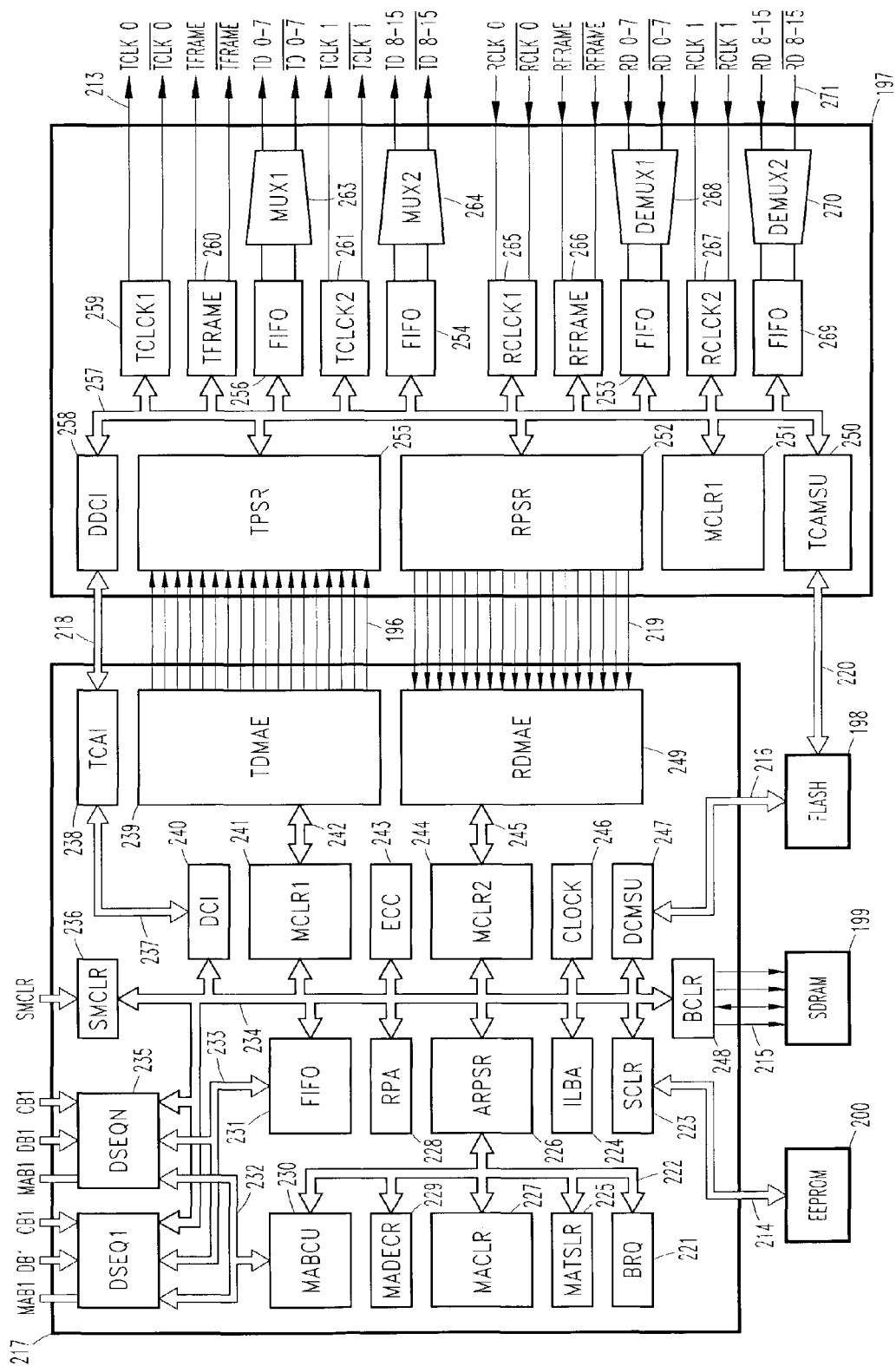

FIG. 139 is a block-diagram drawing of the Microhead-array Chip, Internal Data-Striping, Hard Disk Drive, I/O and Target Channel Adapter Interface Controller used in the Multichannel Phase-Change Microhead Array Chip Hard Disk Drive design that displays the internal component configurations of the controller.

DETAILED DESCRIPTIONS OF INVENTION

The present invention can have its bus-system configured using three different bus-system embodiments:
  i.) A Phase-Change Microhead Array Chip Hard Disk Drive design that uses microhead address, microhead control, and microhead data bus systems that are shared by all Phase-Change Microhead Array Chips that are installed into a Phase-Change Microhead Array Chip Hard Disk Drive's unit-assembly. Wherein, all Phase-Change Microhead Array Chips are connected together then collectively to the hard disk drive's unit-assembly using a shared daisy-chain bus-cable configuration. Whereby, only one Phase-Change Microhead Array Chip and one of its microheads can be selected at any one time to execute a read-data or a write-data disk-operation on a respective disk-platter's data-surface.
  ii.) A Phase-Change Microhead Array Chip Hard Disk Drive design that uses microhead address, microhead control, and microhead data bus systems, which are dedicated and, therefore are independently connected to all Phase-Change Microhead Array Chips that are installed into a Phase-Change Microhead Array Chip Hard Disk Drive's unit-assembly using a separate and dedicated bus-cable configuration. Wherein, all Phase-Change Microhead Array Chips are not connected collectively to the hard disk drive, but are independently connected to the hard disk drive's unit-assembly using their own separate independent bus cables. Whereby, multiple Phase-Change Microhead Array Chips can be simultaneously selected and controlled independently to execute simultaneous read-data or write-data disk-operations on each of their separate and respective disk-platter data-surface.
  iii.) A Phase-Change Microhead Array Chip Hard Disk Drive design that uses microhead address, microhead' control, and microhead data bus systems, which are dedicated and, therefore independently connected to all Phase-Change Microhead Array Chips installed into a Phase-Change Microhead Array Chip Hard Disk Drive's unit-assembly, using a separate dedicated bus cable configuration. Wherein, all Phase-Change Microhead Array Chips are not connected collectively to the hard disk drive, but are independently connected to the hard disk drive using their own separate independent and dedicated bus cables. Whereby, multiple Phase-Change Microhead Array Chips can be simultaneously selected and controlled independently to execute simultaneous and multiple read-data or write-data disk-operations on each of their separate and respective disk-platter's data-surface, while using simultaneously a multiplicity of microheads on each of their respective data-surfaces.

Moreover, two performance issues confronting a designer of a high capacity magnetic or optical hard disk drive are 'average seek times' and 'full stroke seek times'. Seek-times are the movement of read/write data-head stack-assemblies from one data-track to another for the facilitation of data storage and data retrieval. To a designer the before mentioned seek-times presents a serious amount of lag-time or a 'bottle-neck' in a hard disk drive's execution of data storage or data retrieval processes. In addition, is the loss of a hard disk drive's data-surface real estate to embedded-servo sectoring and servo-information fields; normally needed by a conventional hard disk drive's tracking system, as defined by prior art.

However, when it comes to Phase-Change Microhead Array Chip Hard Disk Drive designs, problems normally associated with traditional tracking methods and conventional voice-coil actuators are not improved upon, but are all together eliminated. Furthermore, to understand the functionality and improvements the Phase-Change Microhead Array Chip Hard Disk Drive design introduces, we must begin by considering the structures illustrated in drawing FIGS. 1, 2, and 3. Moreover, these illustrations are orthographic drawings of a Phase-Change Microhead Array Chip Hard Disk Drive's unit-assembly.

Figure 1:
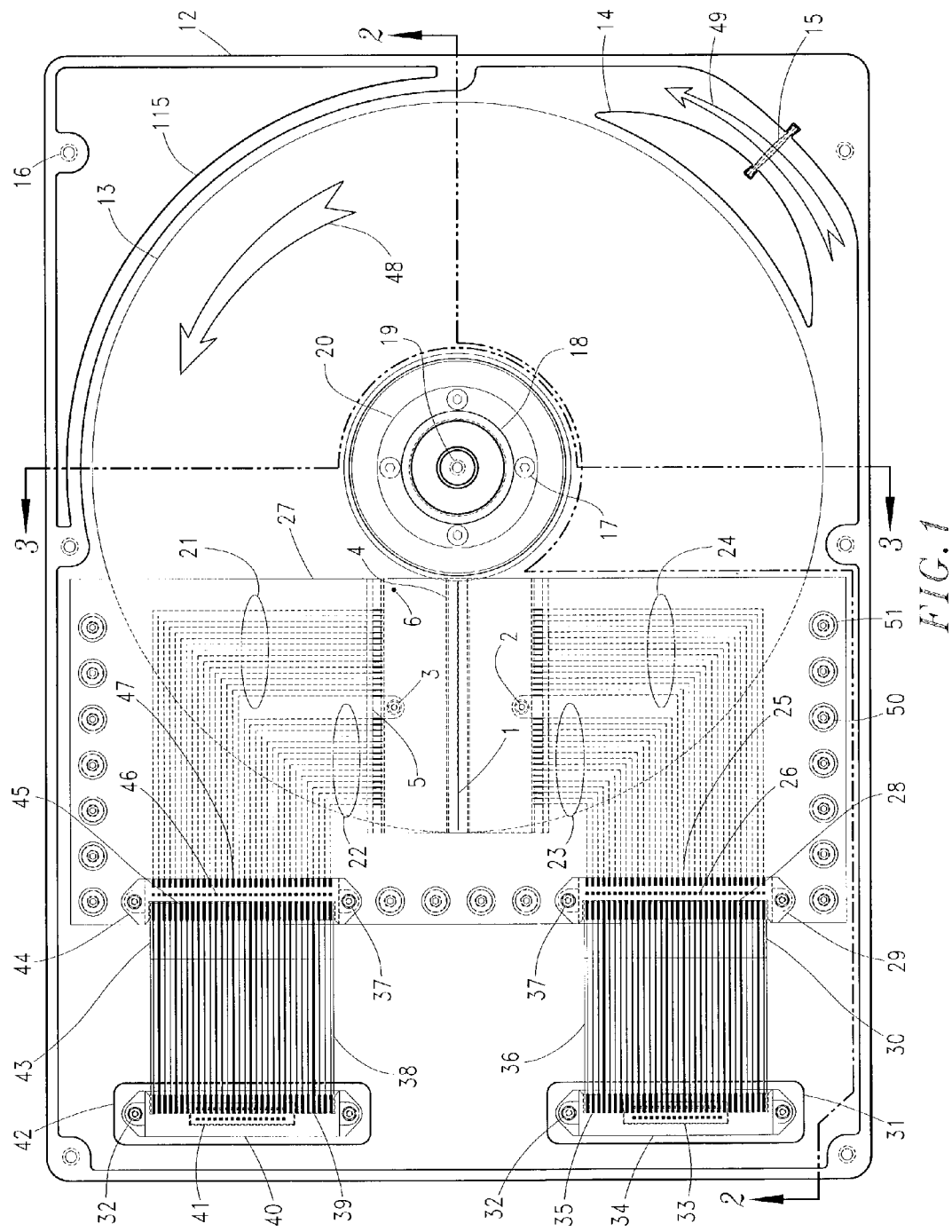
FIG. 1 shows an orthographic plan-view of a Phase-Change Microhead Array Chip Hard Disk Drive unit-assembly, shown with the hard disk drive cover and sealing gasket removed and configured with a shared Microhead-array Chip bus system.
Figure 2:
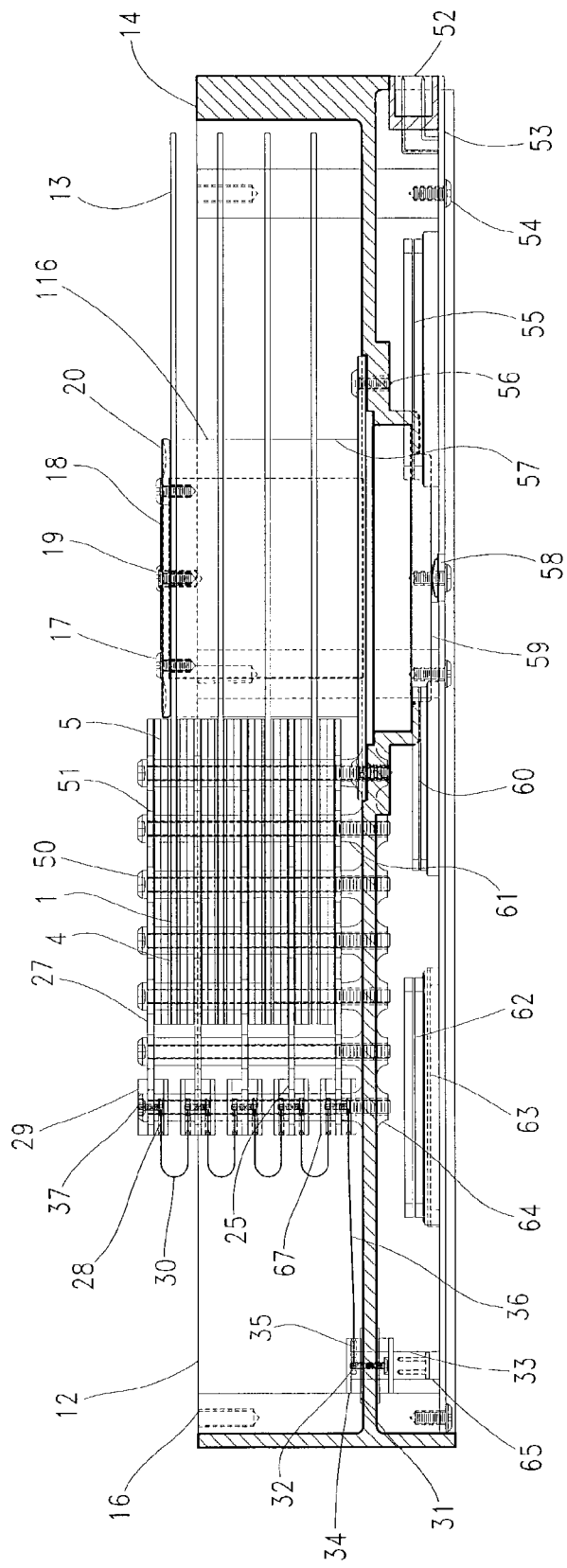
FIG. 2 shows an orthographic side-view of a Phase-Change Microhead Array Chip Hard Disk Drive unit-assembly, shown with the hard disk drive cover and sealing gasket removed and configured with a shared Microhead-array Chip bus system, displaying section 2-2.
Figure 3:
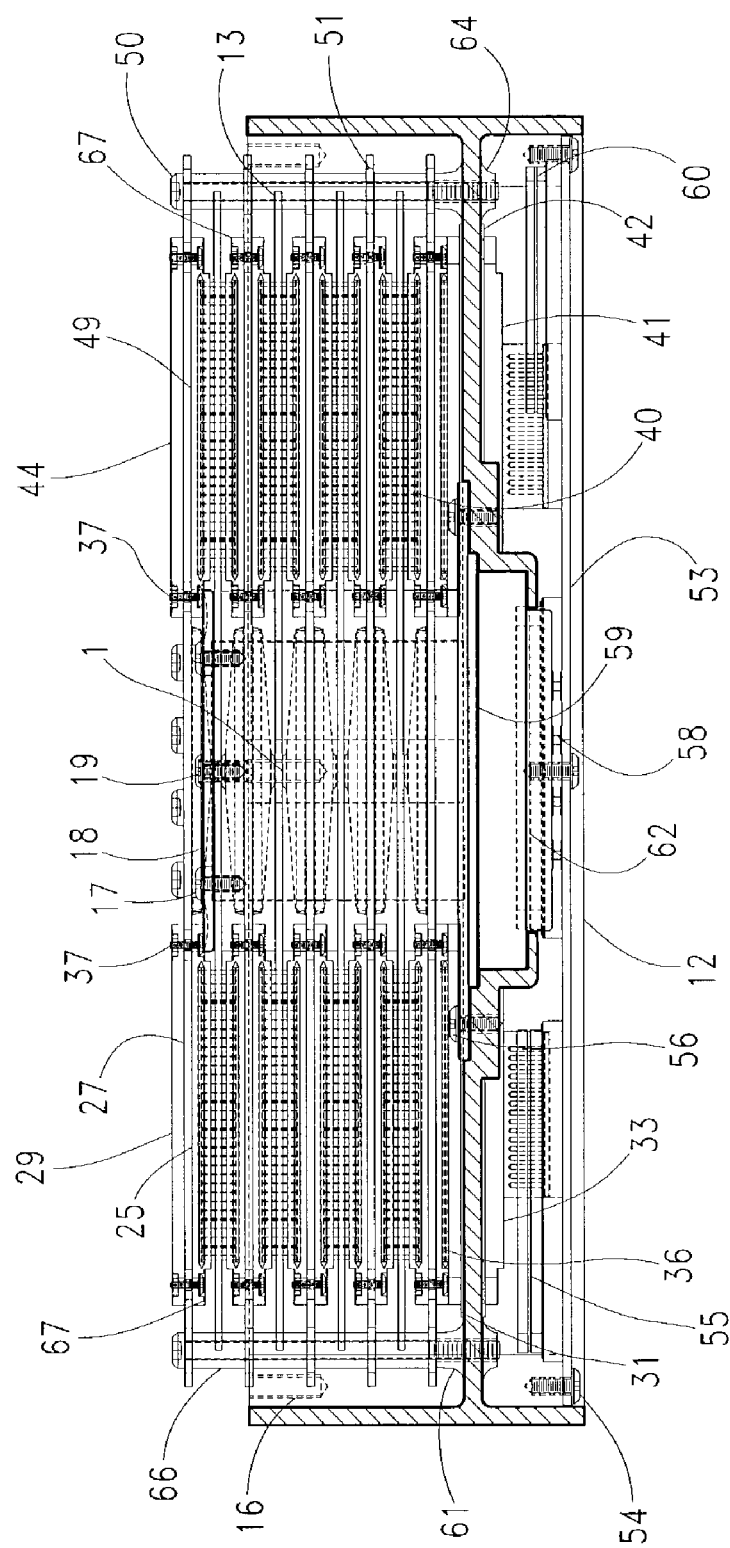
FIG. 3 shows an orthographic front-view of a Phase-Change Microhead Array Chip Hard Disk Drive unit-assembly, shown with the hard disk drive cover and sealing gasket removed and configured with a shared Microhead-array Chip bus system, displaying section 3-3.

Furthermore, a first and basic embodiment, as illustrated in drawing FIGS. 1, 2, and 3, begins by describing a Phase-Change Microhead Array Chip Hard Disk Drive's structure and how its is constructed, starting with the drive's casting-base 12 (FIGS. 1, 2, and 3), which is constructed from a single machined piece of aluminum-alloy that provides a mounting surface for a spindle-motor drive mechanism 59 (FIGS. 2 and 3), a "Printed Circuit Board" (PCB) hard disk drive controller 53 (FIGS. 2 and 3), a hard disk drive's cover and cover sealing-gasket (i.e., not shown here), Phase-Change Microhead Array Chip chip-positioning circuit board assemblies 27 (FIGS. 1, 2, 3, 6, 9, and 10). The bottom inside of the before mentioned casting-base 12 (FIGS. 1, 2, and 3) acts as a mounting flange for the before mentioned "Direct Current" (DC) 'Spindle-Motor' drive assembly 59 (FIGS. 2 and 3). Furthermore, integral with the before mentioned casting-base 12 (FIGS. 1, 2, and 3), is the before mentioned DC Spindle-Motor's drive assembly, which is a fixed-shaft and brushless DC Spindle-Motor drive mechanism 59 (FIGS. 2 and 3) that drives the 'counterclockwise' rotation 48 (FIG. 1) of the data-storage disk-platters 13 (FIGS. 1, 2, and 3) installed in a Phase-Change Microhead Array Chip Hard Disk Drive's unit-assembly, as illustrated in FIG. 117.

In addition, a Phase-Change Microhead Array Chip Hard Disk Drive's unit-assembly uses data-storage disk-platters 13 (FIGS. 1, 2, and 3) to store various kinds of information, where the before mentioned disk-platters are constructed as double-sided, multi-layered, and circular-shaped disk storage media. Further, a disc substrate, constructed from a composite of liquid crystal Polymer and rare-earth magnetic powder, which is caste into a disk shape and than covered in a highly reflective composite alloy material like "Titanium-Chromate" (TiCr), a transparent dielectric layer, a phase-change recording layer, and a protective layer altogether comprise a disk-platter's multi-layered structure, where deposition of the before mentioned layers is outward from both sides of a disk-platter's disc-shaped substrate.

Moreover, as a preferred embodiment a highly-reflective disc shaped substrate is made using a composite of liquid crystal Polymer, glass, or Invar material, which altogether are molded into a disc shape then coated with a reflective low "Coefficient of Thermal Expansion" (CTE) exhibiting "Titanium-Chromate" (TiCr) alloy comprising material like "Titanium-Aluminum-Cobalt-B" (TiAlCo—B), which is used by the before mentioned disk-platters as a reflective layer to reflect laser-light output emissions produced by laser-diodes located within Phase-Change Microhead Array Chips.

Furthermore, a multilayered deposition, upon the outermost surfaces of a substrate disk-platter, begins with a first transparent dielectric layer, which is formed from a transparent de-oxygenated material such as "Silicon-Nitride" (SiN) or "Aluminum-Nitride" (AlN), while a recording-layer is formed from an amorphous Phase-Change alloy such as Tellurium, and finally a second protective layer, which is also formed from a transparent de-oxygenated material such as "Silicon-Nitride" (SiN) or "Aluminum-Nitride" (AlN). Moreover, the Phase-Change disc media 13, which is used for optical phase-change data storage systems, record information in an optical phase-change memory material that is switchable between at least two detectable states by the application of optical energy. Optical phase-change memory material is typically incorporated in an optical recording medium having a structure such that the optical phase-change memory material is supported by a substrate and protected by encapsulates. In the case of optical recording media, the encapsulates include, for example, anti-ablation materials and layers, thermal insulation materials and layers, anti-reflection materials and layers, reflective layers, and chemical isolation layers.

Moreover, various layers may perform more than one of these functions. For example, anti-reflection layers may also be anti-ablation layers and thermal insulating layers. The thicknesses of the layers, including the layer or layers of optical phase-change memory material are engineered to minimize the energy necessary for effecting the state change as well as to optimize the high contrast ratio, high carrier-to-noise ratio, and high stability of the optical phase-change memory materials. Formation of optical recording media includes deposition of the individual layers by e-beam evaporative material deposition, chemical vapor material deposition, and/or plasma material deposition. Further, as used herein, plasma material deposition includes sputtering, glow discharge, and "Plasma Enhanced Chemical Vapor Deposition" (PECVD).

Moreover, an optical phase-change material is capable of being switched from one detectable state to another detectable state or states by the application of optical energy. The state of the phase-change material is detectable by properties such as, for example, index of refraction, optical absorption, optical reflectivity, or any combination thereof. Tellurium based materials have been utilized as phase-change media for data storage, where the change is evidenced by a change in a physical property such as reflectivity. Tellurium based state changeable materials, in general, are single or multi-phased systems. The ordering phenomena of such materials include a nucleation and growth process (including both, or either homogeneous and heterogeneous nucleation) to convert a system of disordered materials to a system of ordered and disordered materials. The vitrification phenomena includes attaining a high mobility state and rapid quenching of the phase changeable material to transform a system of disordered and ordered materials to a system of largely disordered materials. The above phase changes and separations occur over relatively small distances, with intimate interlocking of the phases and gross structural discrimination, and may be highly sensitive to local variations in stoichiometry. Tellurium provides for high-speed transformation by passing through a high mobility state. This high mobility state allows for high-speed transformation from one state of relative order to another. The high mobility state does not specifically correspond to the molten state, but more accurately corresponds to a state of high system mobility.

Generally, a laser is used to supply the optical energy to cause the phase transitions between amorphous and crystalline states in an optical phase-change memory material. The amount of energy applied to the memory material is a function of both the power of the laser as well as the period of time that the laser pulse is applied. The crystallization energy is defined herein as the amount of energy per unit volume needed to re-crystallize an amorphous region of the memory material. The crystallization energy is dependent upon many factors, including the energy necessary for nucleation during the crystallization process. If the crystallization energy is too high, the memory material requires exposure to either a higher power laser pulse or a longer laser pulse in order to convert the material from the amorphous to the crystalline states. It is desirable to be able to control the crystallization energy of a phase-change memory material via the addition of one or more modifier elements. It is also desirable to increase the erasability of optical recording media.

Moreover, a spindle motor 59 rotates the Phase-Change disc 13 in counterclockwise direction shown by arrow 49. The microhead-array 1 is stationary and used for accessing a desired data-sector or data-sector area that is located on the Phase-Change disc 13. Further, the wavelength $\lambda$ of a readout beam to be used in the present invention is preferably at a level of 630- to 800-nm. Usually, a wavelength of 780-, 680-, or 630-nm is employed. While the substrate, which is preferably employed in the present invention as being generally reflective to a recording and readout beam, such a highly-reflective substrate could be made from a single piece of thermally anisotropic liquid-crystal Polymer, glass, or Invar alloy material and coated with a highly-reflective material like "TiAlCo—B", and used to reflect laser-beam light being produced by microhead-arrays located within each Phase-Change Microhead Array Chip. Additionally, land/groove-tracks for servo could be formed in the thermally anisotropic liquid-crystal Polymer substrate. Wherein, each of land of each groove of the land/groove-tracks will have a substantially flat-region. To make the readout signals created from a land or a groove to be equal, then the widths of each flat-region must be preferably and substantially equal.

In addition, because phase-change materials oxidize easily, destroying a rare-earth material's ability to record data, a material that satisfies a stable substance condition must be practically oxygen free (e.g., SiN, AlN, SiC, ZnS, or ZnSe is preferably employed). Among them, SiN and ZnS are the most preferred materials. It is particularly preferred to employ SiN, but having a nitrogen content that is less than the stoicheometrical compositional ratio (i.e., $Si_3N_4$), and where a high refractive index can also be obtained. Namely, the nitrogen content is preferably at an atomic-ratio of from 0.6 to 1.0 relative to 1.0 of Silicon. To prepare such a SiN material, it is preferred to carry out reactive sputtering of a Silicon target in a gas mixture of an inert gas and nitrogen-gas to form "Silicon-Nitride" (SiN) upon a highly reflective substrate layer. Further, the nitrogen content can be adjusted by adjusting the mixing ratio of nitrogen-gas to inert gas (usually Argon), or by adjusting the pressure during sputtering.

In addition, the disk-platters are mounted upon a rotating spindle assembly 57 (FIG. 2), which is rotated 3,400 to 20,000 "Revolutions-Per-Minute" (RPM) by an in-spindle brushless "Direct Current" (DC) Spindle-Motor 59 (FIGS. 2 and 3), relative to the before mentioned frame casting-base 12 (FIGS. 1, 2, and 3). Typically, the Spindle-Motor is secured to an aluminum-alloy casting-base 12 (FIGS. 1, 2, and 3) with four motor mounting hex-screws 56 (FIGS. 2 and 3). Further, the Spindle-Motor 59 (FIGS. 2 and 3) has a rotor 57 (FIG. 2), which is flanged at the base, and a disk-platter axle, which is located at the center of the previously mentioned rotor 57 (FIG. 2). A rotating 'flanged rotor housing' is used to both position and firmly secure all of the before mentioned disk-platters, where each disk-platter has a disk-spacer 116 (FIG. 2) placed between each previously installed disk-platter. While, having a final disk-platter 13 (FIGS. 1, 2, and 3) secured into place with a rotor housing-cap 20 (FIGS. 1 and 2) and four-rotor housing-cap mounting hex-screws 17 (FIGS. 1, 2, and 3). Preferably, the Spindle-Motor bearings are formed as a part of the Spindle-Motor drive assembly 59 (FIGS. 2 and 3), and used to rotate the spindle-assembly 57 (FIG. 2) relative to the frame casting-base 12 (FIGS. 1, 2, and 3). The Spindle-Motor 59 (FIGS. 2 and 3) itself is mounted to the bottom-inside surface of the casting-base 12 (FIGS. 1, 2, and 3) with four motor mounting hex-screws 56 (FIGS. 2 and 3).

Furthermore, in the center of a rotor-housing's top bearing 18 (FIGS. 1, 2, and 3) is a Spindle-Motor's non-moving bearing-rod core 19 (FIGS. 1, 2, and 3), where a non-moving bearing-rod core 19 (FIGS. 1, 2, and 3) has its top-end threaded for a Phase-Change Microhead Array Chip Hard Disk Drive's housing-cover mounting screw-hole 19 (FIGS. 1, 2, and 3), which is used to secure a Phase-Change Microhead Array Chip Hard Disk Drive's housing-cover to the before mentioned casting-base 12 (FIGS. 1, 2, and 3). Preferably, there are "6" other threaded hex-screw holes 16 (FIGS. 1, 2, and 3) in a Phase-Change Microhead Array Chip Hard Disk Drive's casting-base 12 (FIGS. 1, 2, and 3), which are also used for the securing and sealing of a (i.e., not shown here) Phase-Change Microhead Array Chip Hard Disk Drive's housing-cover, which is used to cover and seal a Phase-Change Microhead Array Chip Hard Disk Drive's casting-base housing.

Figure 61A:
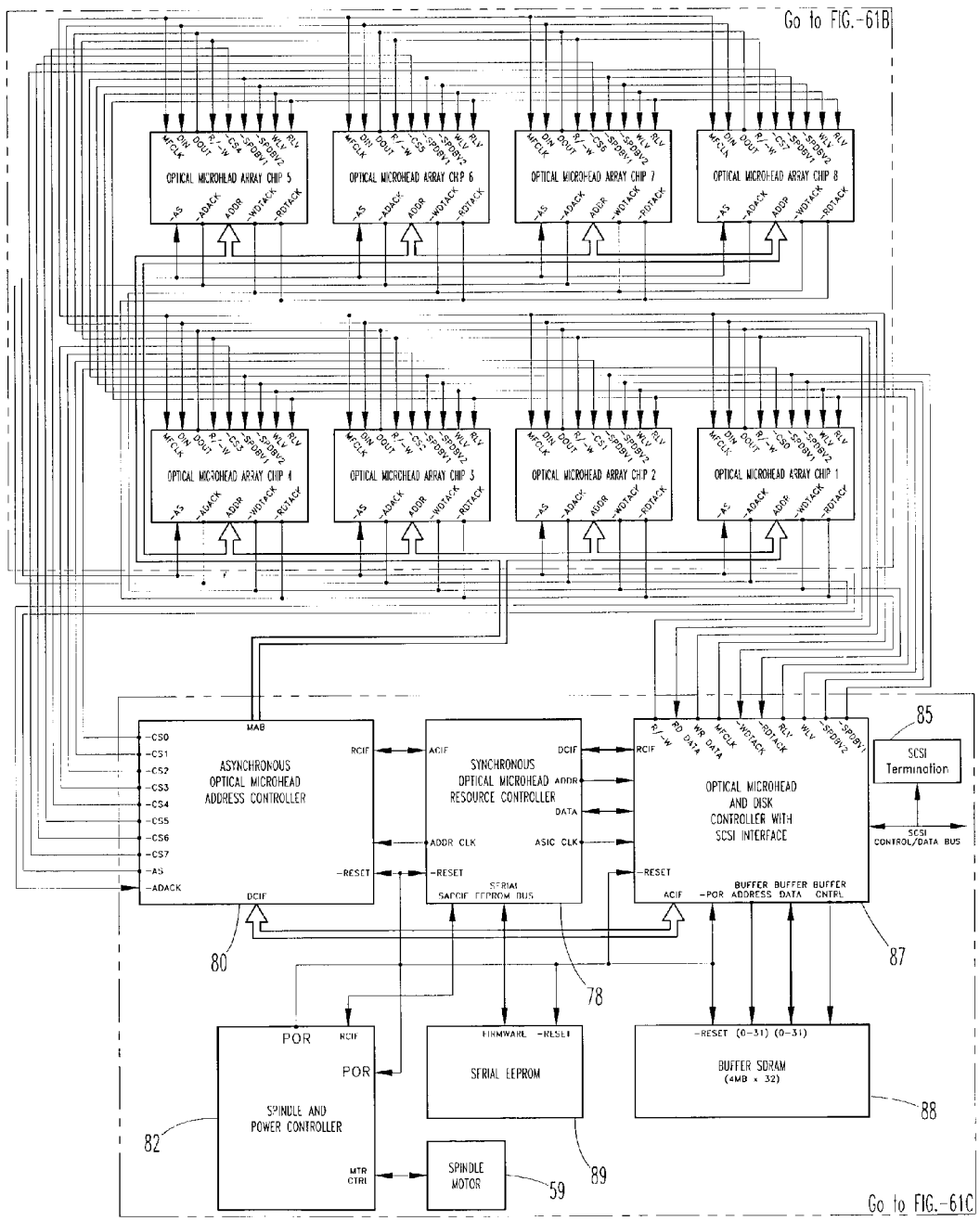
FIG. 61A is a block-diagram drawing of the SCSI Disk Controller used in the Phase-Change Microhead Array Chip Hard Disk Drive design, which displays areas within FIG. 61A that were copied to separate drawing files as block-diagram drawing figures containing enlarged areas of block-diagram 61A.
Figure 61C:
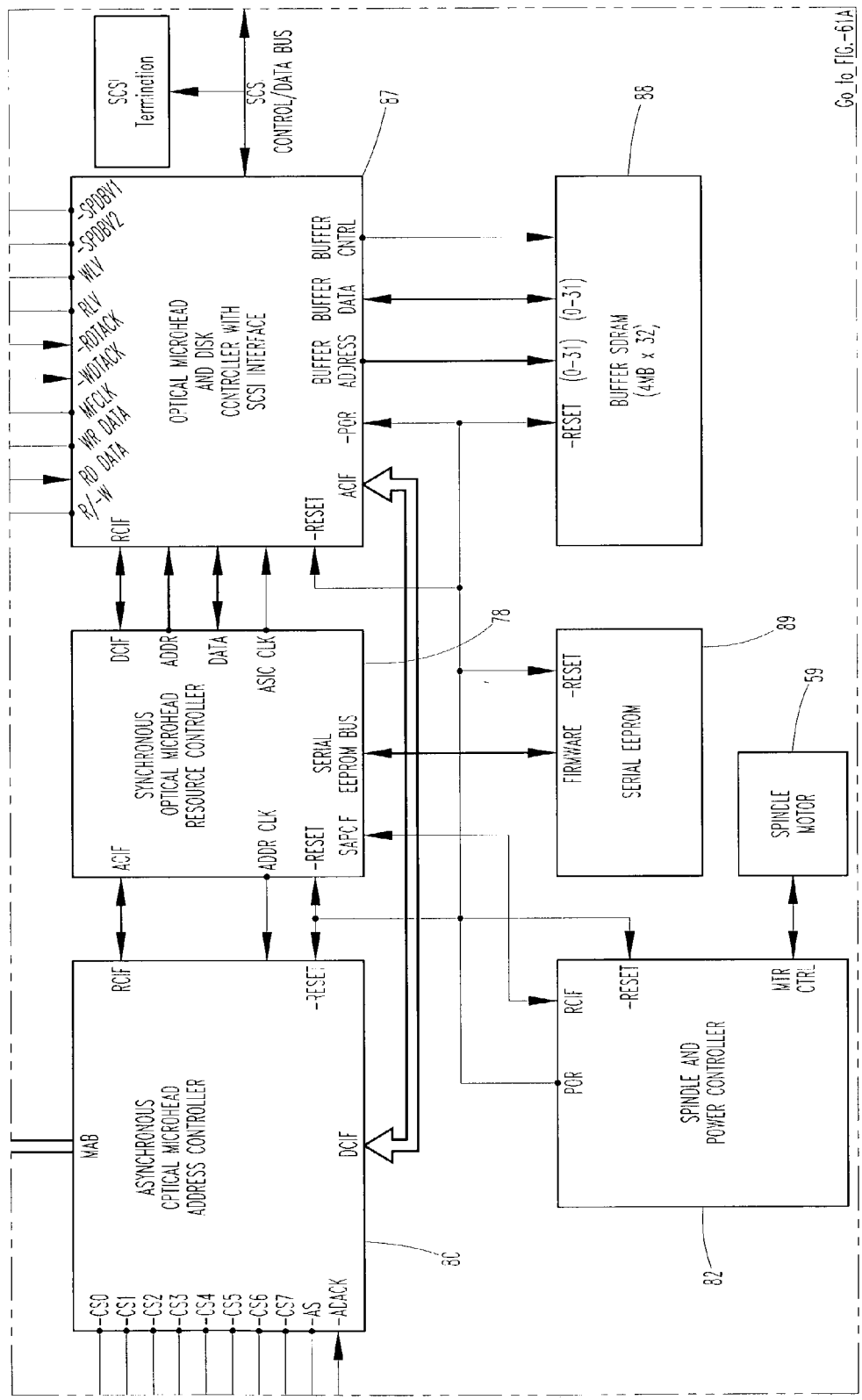
FIG. 61C is an enlarged block-diagram drawing of the SCSI Disk Controller used in the Phase-Change Microhead Array Chip Hard Disk Drive design, which displays an enlarged block-diagram showing details of the block-diagram illustrated in FIG. 61A.
Figure 62A:
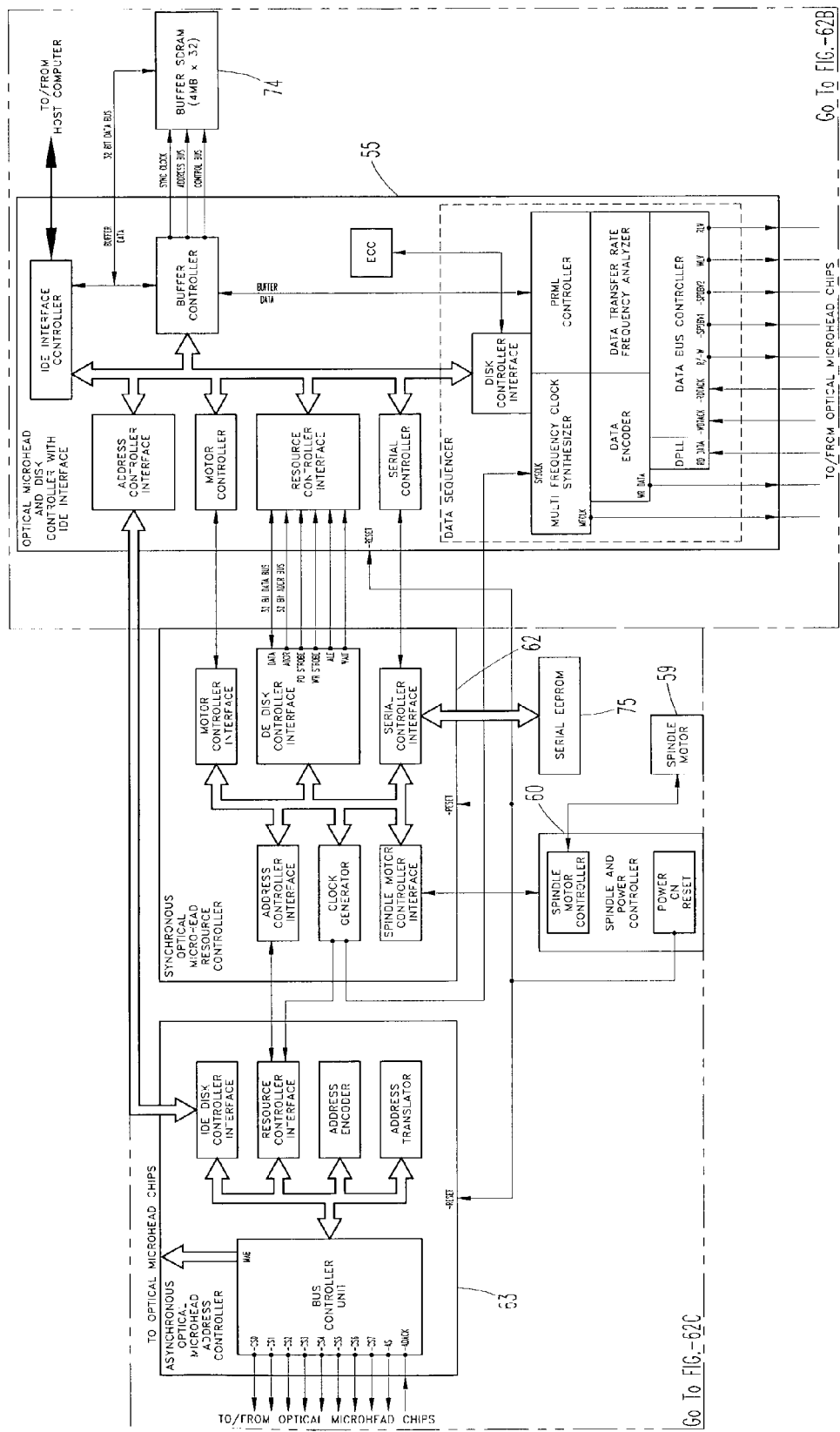
FIG. 62A is a block-diagram drawing showing the internal component configurations for the ATA-2 IDE Disk Controller used in the Phase-Change Microhead Array Chip Hard Disk Drive design, which displays areas within FIG. 62A that were copied to separate drawing files as block-diagram drawing figures containing enlarged areas of block-diagram 62A.
Figure 62C:
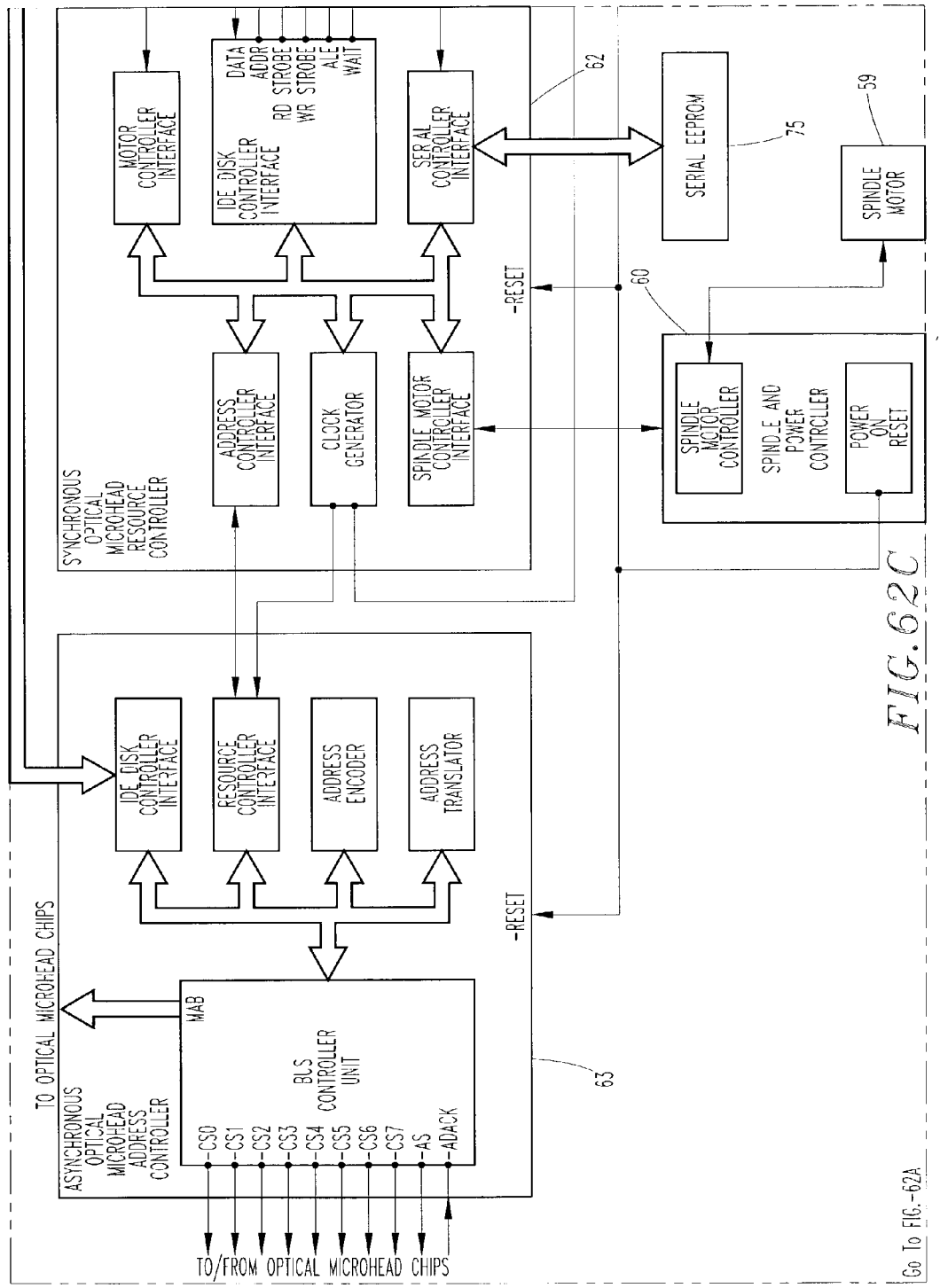
FIG. 62C is an enlarged block-diagram drawing showing details of internal component configurations for the ATA-2 IDE Disk Controller used in the Phase-Change Microhead Array Chip Hard Disk Drive design, which displays an enlarged block-diagram drawing showing details of the block-diagram illustrated in FIG. 62A.
Figure 63A:
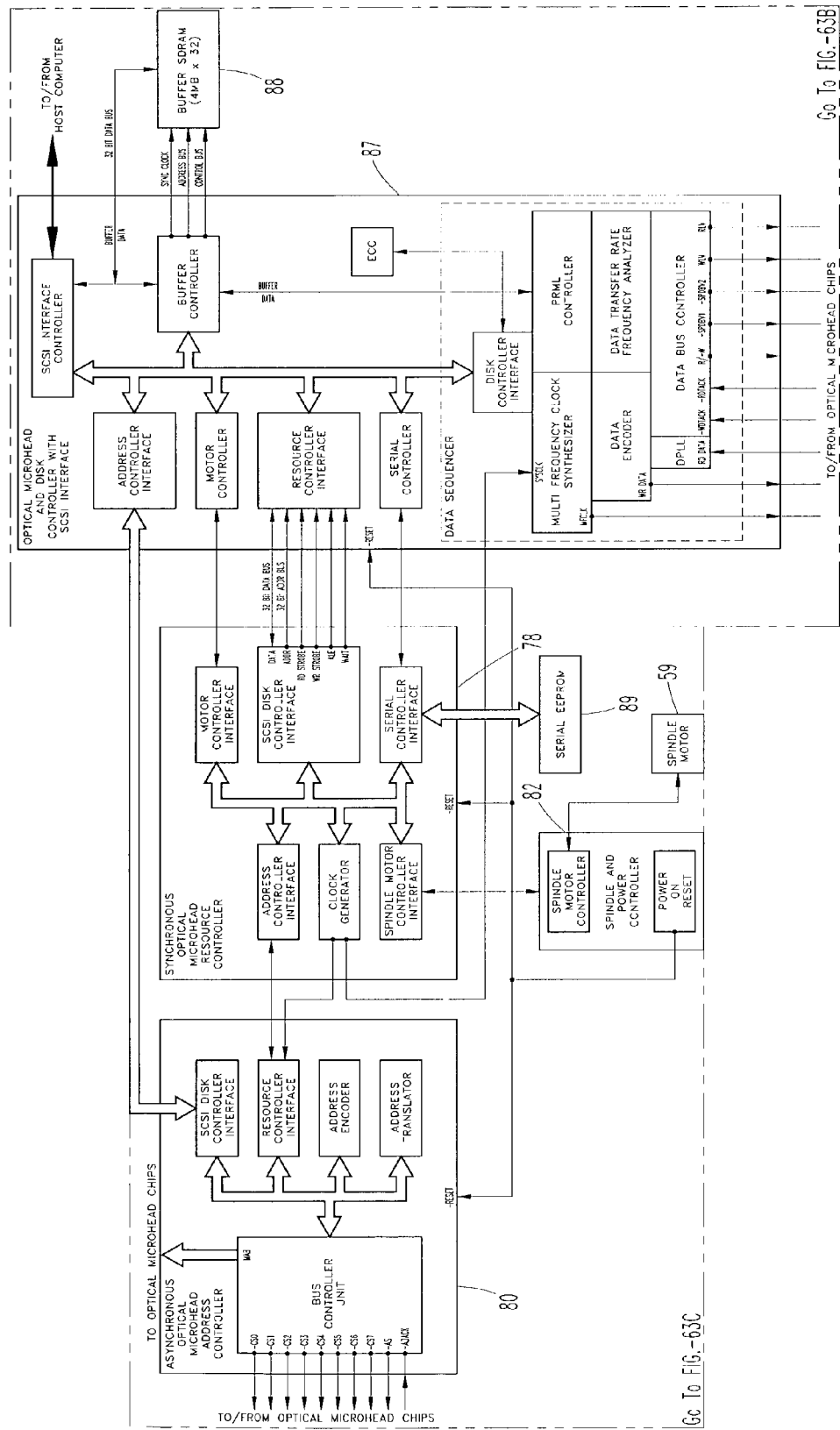
FIG. 63A is a block-diagram drawing showing the internal component configurations for the SCSI Disk Controller used in the Phase-Change Microhead Array Chip Hard Disk Drive design, which displays areas within FIG. 63A that were copied to separate drawing files as block-diagram drawing figures containing enlarged areas of block-diagram 63A.

Furthermore, the before mentioned Spindle-Motor's driver-circuit, which is called the Spindle And Power Controller 60 (FIG. 4), 82 (FIG. 5), 60 (FIG. 60A), 60 (FIG. 59), 82 (FIG. 61A), 82 (FIG. 61C), 60 (FIG. 62A), 60 (FIG. 62C), 82 (FIG. 63A), 82 (FIG. 63C) is provided to communtate e.g. with the three-phase windings of a Phase-Change Microhead Array Chip Hard Disk Drive's brushless Spindle-Motor 59 (FIGS. 2, 3, 60A, 60C, 61A, 61C, 62A, 62C, 63A, and 63C). Furthermore, 'Hall-Sensors' (not shown here) are also provided to determine the position of the permanent-magnetic rotary-elements located within a rotor relative to the fixed windings and poles of the before mentioned Spindle-Motor 59 (FIG. 2), (FIG. 3). Typically, Hall-Sensors provide response-control information to a 'Spindle And Power Controller' 60 (FIG. 4), 82 (FIG. 5), 60 (FIG. 60A), 60 (FIG. 59), 82 (FIG. 61A), 82 (FIG. 61C), 60 (FIG. 62A), 60 (FIG. 62C), 82 (FIG. 63A), 82 (FIG. 63C). Further, the previously mentioned Spindle And Power Controller's driver-circuit will also control the Hall-Sensors in a conventional fashion as well.

In addition, the final assembly of a Phase-Change Microhead Array Chip Hard Disk Drive is done in a contamination free 'clean room' manufacturing facility. To provide the Phase-Change Microhead Array Chip Hard Disk Drive s with a contamination free environment a hard disk drive cover sealing-gasket provides an air-tight seal between a Phase-Change Microhead Array Chip Hard Disk Drive's casting-base 12 (FIGS. 1, 2, and 3) and its metal cast-aluminum (i.e., not shown here) housing cover. Sealing-gaskets will be installed during final assembly of the Phase-Change Microhead Array Chip Hard Disk Drive unit assemblies using "6" threaded hex-screws (i.e., not shown here).

Furthermore, to provide an environment that continues to be clean and free from air-contaminants; an internal air-filtering device is used 15 (FIG. 1) to filter the drive's internal air supply. Moreover, an orthographic plan-view drawing FIG. 1 shows the location of the before mentioned internal air-filtering device 15 (FIG. 1), which also displays internal airflow direction 49 (FIG. 1) with a direction indicating arrow. Indicating that the air flowing through the before mentioned air-filter 15 (FIG. 1) is moving in the same counterclockwise direction of rotation 48 (FIG. 1) as the data-storage disk-platters 13 (FIGS. 1, 2, and 3) of a Phase-Change Microhead Array Chip Hard Disk Drive does.

Moreover, the Phase-Change Microhead Array Chips that are used within a Phase-Change Microhead Array Chip Hard Disk Drive's unit-assembly are positioned very close to a Phase-Change Microhead Array Chip Hard Disk Drive's rotating disk-platter data-surfaces. Therefore, it is essential that the air circulation through Phase-Change Microhead Array Chip Hard Disk Drive s be kept free of dust, pollen, and other air-borne particles and contaminates, least they are trapped between a microhead-array of a Phase-Change Microhead Array Chip and a disk-platter's data-surface, causing disk-platter data-surface damage and data-loss. Further, when the Phase-Change Microhead Array Chip Hard Disk Drive s are in use the rotation of its installed disk-platters will force air through a Phase-Change Microhead Array Chip Hard Disk Drive's internal air-filter 15 (FIG. 1). Internal air-pressure within a Phase-Change Microhead Array Chip Hard Disk Drive's unit-assembly is shifted by a internal air-foil 14 (FIG. 1) from the outer-perimeter of its rotating disk-platters to a air-filter's 15 (FIG. 1) passage-way, where a constant stream of air is made to flow through a 0.3-µm air-filter 15 (FIG. 1).

Moreover, the before mentioned air-filter is installed into a slot lying between the upper right-hand corner of a Phase-Change Microhead Array Chip Hard Disk Drive's casting-base 12 (FIG. 1), and the before mentioned airfilter's air circulating airfoil air-scoop 14 (FIG. 1). Further, during normal hard disk drive operation, while the disk-platters within a Phase-Change Microhead Array Chip Hard Disk Drive are rotating, the air-circulating airfoil air-scoop design 14 (FIG. 1) will also help a Phase-Change Microhead Array Chip Hard Disk Drive to keep cool.

Another preferred, first, and basic embodiment, as illustrated in drawing FIGS. 1, 2, 3, 6, 9, 10, 29, 30, 31, 32, 33, 34, 35, 36, 37, and 38, shows how to execute the placement of the Phase-Change Microhead Array Chips. Moreover, positioned by specially designed chip-positioning circuit boards 27 (FIGS. 1, 2, 3, 6, 9, and 10). To insure rigid and stable placement of the before mentioned Phase-Change Microhead Array Chips, the previously mentioned chip-positioning circuit boards need their core structures constructed from a rigid alloy material like 'Titanium' or from a rigid composite material like 'Graphite Carbon'.

Furthermore, a chip-positioning circuit board's core structure 27 (FIGS. 1, 2, 3, 6, 9, and 10) has two sides, where each side of every chip-positioning circuit board would have eighteen embossed bolt-flanges, with a total of thirty-six bolt-flanges 51 (FIGS. 1, 2, 3, and 6) for each chip-positioning circuit board's core structure. Moreover, each chip-positioning circuit board's thirty-six embossed bolt-flanges are created as raised surfaces; protruding "{fraction (1/16)}" of one-inch in an outward direction, which is perpendicular to a chip-positioning circuit board's surface, which will later contain sixty-four copper-circuit trace-runs. Each embossed bolt-flange will have its top-surface area machined down and shaped into a bolt-flange with a high degree of flatness, which must be within an allowed tolerance of plus or minus 1/8 of 1.0-μm.

Moreover, after each chip-positioning circuit board has its thirty-six embossed bolt-flanges machined down to a degree of flatness that is within their specified tolerances, a first-layer application of fiberglass insulation is applied to the chip-positioning circuit boards' outer surfaces. The before mentioned first fiberglass insulation layer will provide fundamental electrical insulation for a chip-positioning circuit board's installed copper circuit trace-runs 21, 22, 23, 24 (FIGS. 1, 6, 29, 30, 31, 32, 34, 35, 36, and 37). Furthermore and only after the before mentioned fiberglass insulation has been applied to surfaces reserved for the future installation of copper circuit trace-runs, can installation of a chip-positioning circuit board's sixty-four copper circuit trace-runs proceed. Further, installation of the before mentioned fiberglass insulation will both protect and isolate installed copper circuit trace-runs, not only from each other, but also from the rigid metallic or composite material used to construct a chip-positioning circuit board's core-structure.

In addition, the before mentioned thirty-six embossed bolt-flanges 51 (FIGS. 1, 2, 3, and 6), which are passively used to install completed chip-positioning circuit boards into a Phase-Change Microhead Array Chip Hard Disk Drive's unit-assembly (FIG. 117) and, moreover will need to be free of dirt, fiberglass, or any other particulate matter. Moreover, to explain this further, if, during a Phase-Change Microhead Array Chip Hard Disk Drive's final assembly, illustrated by FIG. 117, any particulate matter were to be left on any chip-positioning circuit board's embossed bolt-flange mounting surfaces 51 (FIGS. 1, 2, 3, and 6), the installation and placement of chip-positioning circuit boards, as illustrated by FIGS. 29, 30, 31, 32, 33, 34, 35, 36, 37, and 38, and not yet installed would, after installation become misalign while in their respective Phase-Change Microhead Array Chip Hard Disk Drive's unit-assembly (FIG. 117), adversely affecting the respective Phase-Change Microhead Array Chip Hard Disk Drive's overall performance.

Therefore, after applying the before mentioned fiberglass insulation to a chip-positioning circuit board's outermost surfaces the thirty-six embossed bolt-flanges 51 (FIGS. 1, 2, 3, and 6) of the chip-positioning circuit boards must be cleaned and made fiberglass free.

In addition, surface-mounted chip-socket 5 (FIGS. 1, 2, and 6), which are used by chip-positioning circuit boards, illustrated by FIGS. 29, 30, 31, 32, 33, 34, 35, 36, 37, and 38, to install, position, and connect Phase-Change Microhead Array Chips (FIGS. 25, 26, 27, and 28) into a Phase-Change Microhead Array Chip Hard Disk Drive's unit-assembly (FIG. 117), while providing connectivity between them and installed copper circuit trace-run surfaces 21, 22, 23, 24 (FIGS. 30, 32, 35, and 37) of chip-positioning circuit boards, as illustrated in FIGS. 29, 30, 31, 32, 33, 34, 35, 36, 37, and 38.

In addition, and only after the installation of a chip-positioning circuit board's surface-mounted chip-socket 5 (FIGS. 1, 2, and 6) has been accomplished, can a final topcoat layer of insulating fiberglass be applied to a chip-positioning circuit board's outer-most surface areas 21, 22, 23, 24 (FIGS. 30, 32, 35, and 37) and, therein to its surface-mounted chip-socket's base-area perimeter 5 (FIGS. 1, 2, and 6), which will help to seal and secure a chip-positioning circuit board's surface-mounted chip-socket(s) 5 (FIGS. 1, 2, and 6) into their final position(s). While applying fiberglass to a chip-positioning circuit board and to a chip-positioning circuit board's surface-mounted chip-socket(s) 5 (FIGS. 1, 2, and 6) care must be taken to keep the before mentioned fiberglass insulation off any chip-positioning circuit board's embossed machined bolt-flange mounting surfaces 51 (FIGS. 1, 2, 3, and 6), and out of the contact-circuit areas 93 (FIGS. 30, 32, 35, and 37) of a chip-positioning circuit board's surface-mounted chip-socket(s) 5 (FIGS. 1, 2, and 6).

Moreover, contact-circuit areas 93 (FIGS. 30, 32, 35, and 37), which are used to connect installed Phase-Change Microhead Array Chips, illustrated by FIGS. 29, 31, 34, and 36, to a Phase-Change Microhead Array Chip Hard Disk Drive's internal bus system are located at the inner-bottom surface-areas 93 (FIGS. 30, 32, 35, and 37) of every surface-mounted chip-socket(s) 5 (FIGS. 1, 2, and 6) of every chip-positioning circuit board installed into a Phase-Change Microhead Array Chip Hard Disk Drive's unit-assembly, as illustrated in FIG. 117.

Moreover, the surface-mounted chip-sockets 5 (FIGS. 1, 2, and 6), like the ones illustrated in chip-positioning circuit board drawing FIGS. 29, 30, 31, 32, 33, 34, 35, 36, 37, and 38, have been designed to firmly secure and position Phase-Change Microhead Array Chips into pre-designated and stationary positions above disk-platter data-surfaces. Furthermore, the secured installation of the before mentioned Phase-Change Microhead Array Chips (FIGS. 29, 31, 34, and 36) into their surface-mounted chip-sockets 5 (FIGS. 1, 2, and 6) is accomplished through a triangular-shaped "Chip Placement Key" 11 (FIGS. 7, 8, 26, and 27) and two surface mounting chip-socket threaded hex-screws (i.e., two threaded hex-screws per Phase-Change Microhead Array Chip) 2 (FIGS. 1 and 6).

Figure 26:
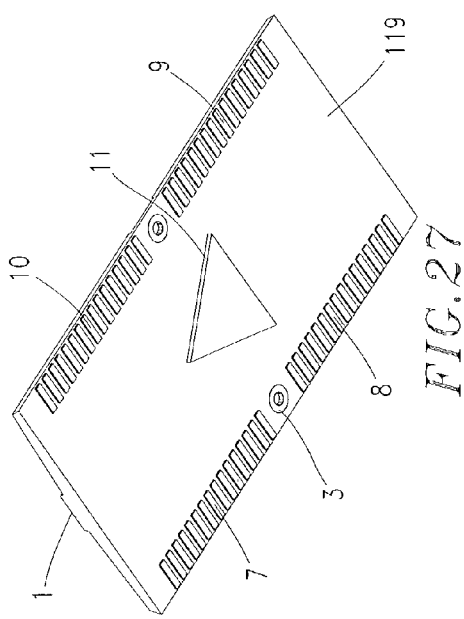
FIG. 26 is a 3D bottom-view drawing of the disk-platters' Top Data-Surface Phase-Change Microhead Array Chip.
Figure 27:
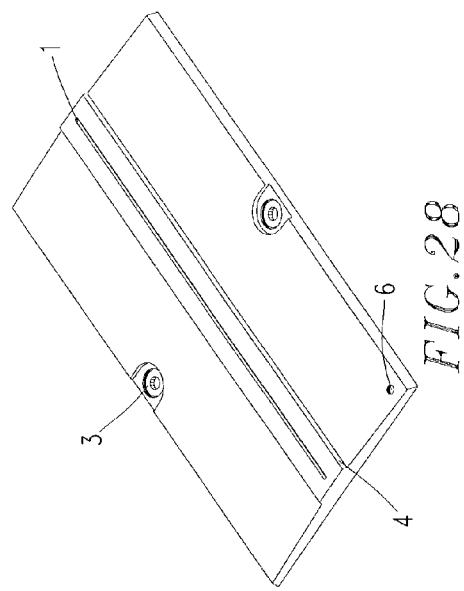
FIG. 27 is a 3D bottom-view drawing of the disk-platters' Bottom Data-Surface Phase-Change Microhead Array Chip.
Figure 29:
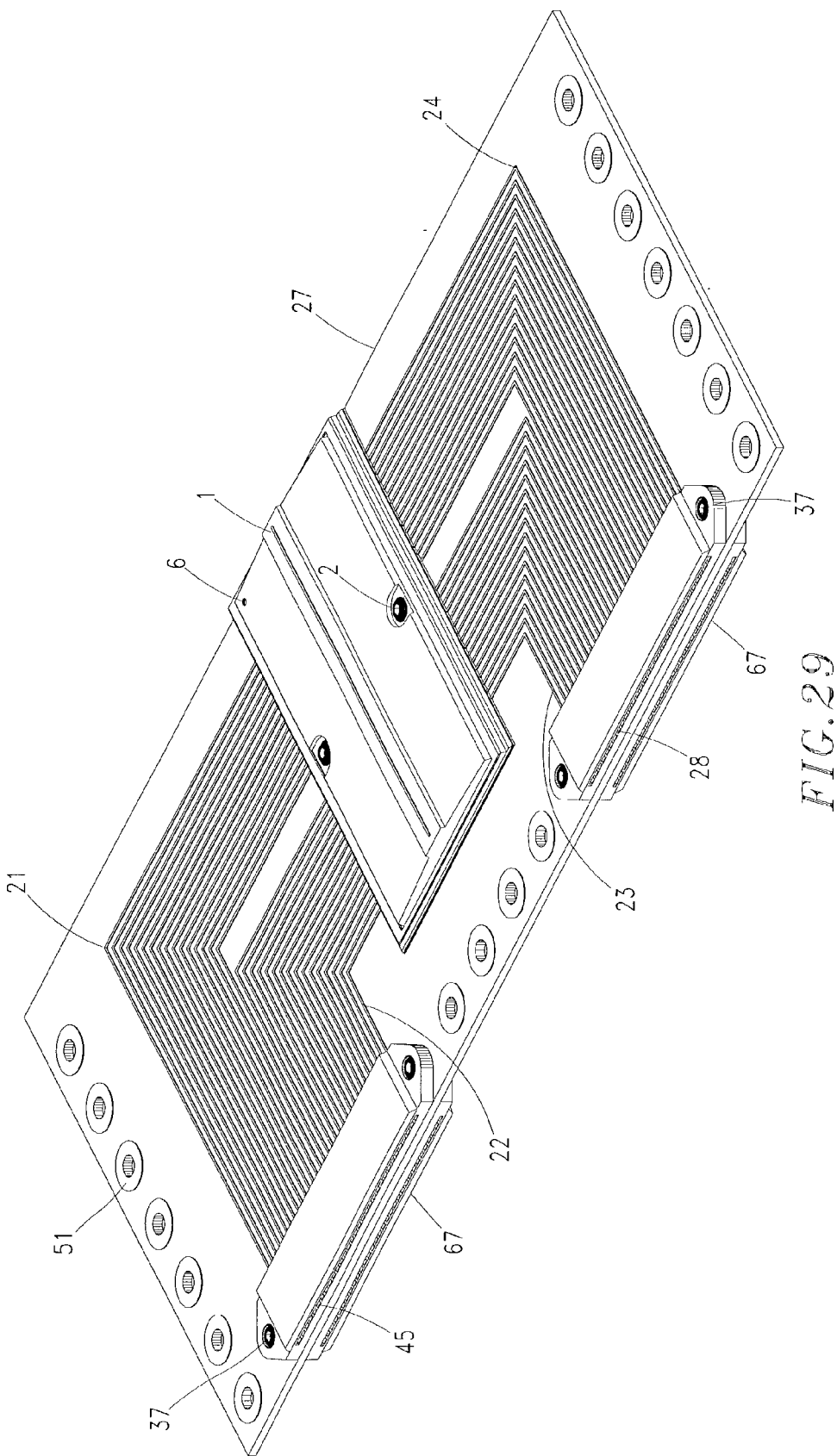
FIG. 29 is a 3D top back-view drawing of the between disk-platter chip-positioning circuit board assembly, shown with both Phase-Change Microhead Array Chips as being installed.
Figure 30:
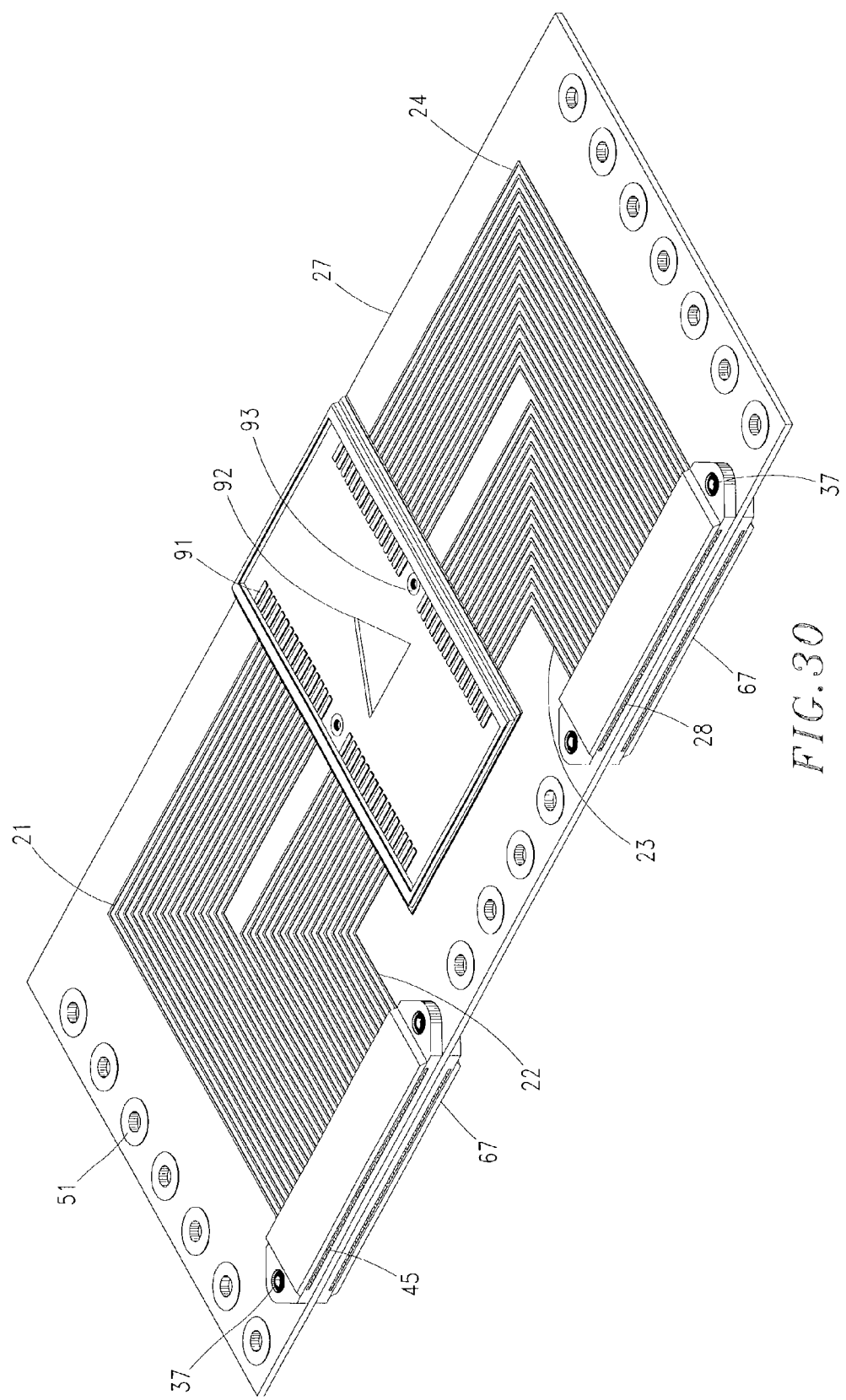
FIG. 30 is a 3D top back-view drawing of the between disk-platters chip-positioning circuit board assembly, shown with the Phase-Change Microhead Array Chips as not being installed.
Figure 31:
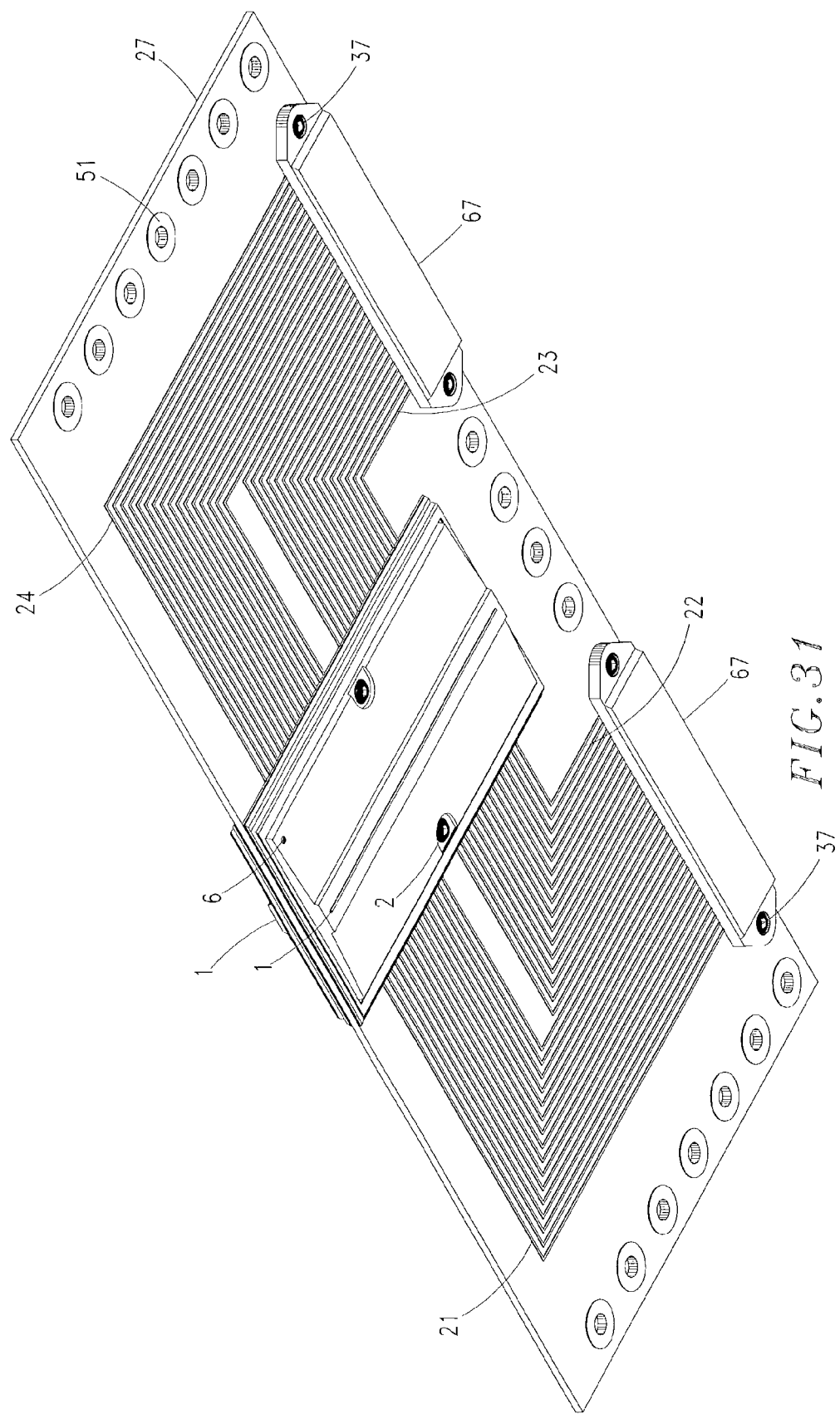
FIG. 31 is a 3D bottom front-view drawing of the between disk-platters chip-positioning circuit board assembly, shown with both Phase-Change Microhead Array Chips as being installed.
Figure 32:
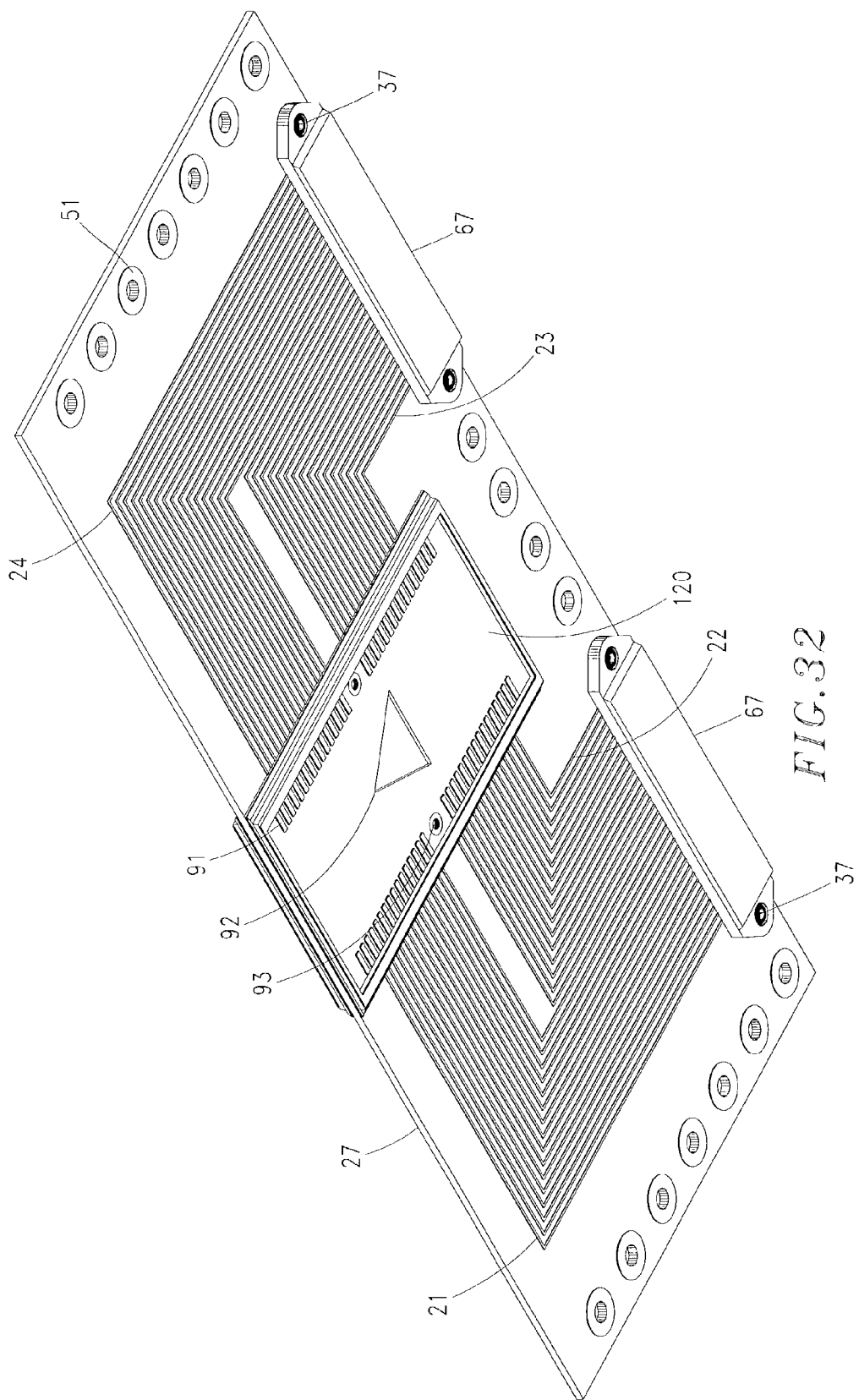
FIG. 32 is a 3D bottom front-view drawing of the between disk-platters chip-positioning circuit board assembly, shown with the Phase-Change Microhead Array Chips as not being installed.

In addition, a triangular-shaped placement key 11 (FIGS. 7, 8, 26, and 27) of a Phase-Change Microhead Array Chip is molded and shaped out of an extruded bottom-surface material, which is part of every Phase-Change Microhead Array Chip's outer-casing package 4 (FIGS. 1, 26, and 27). To meet with tolerances, triangular-shaped placement keys 11 (FIGS. 7, 8, 26, and 27) of Phase-Change Microhead Array Chips are located at the bottom of every Phase-Change Microhead Array Chip and machined down into a final triangular-shaped extruding plate 11 (FIGS. 7, 8, 26, and 27). After final machining a Phase-Change Microhead Array Chip's placement key 11 (FIG. 7), (FIG. 8), (FIG. 26), (FIG. 27) will protrude about "1/16" of one-inch down from underneath the bottom-center surface of a Phase-Change Microhead Array Chip's outer-casing package 4 (FIGS. 1, 26, and 27). The triangle-shaped chip placement keys 11 (FIGS. 7, 8, 26, and 27) will both position and secure the Phase-Change Microhead Array Chips (FIGS. 29, 31, 34, and 36) into the surface-mounted chip-sockets 5 (FIGS. 1, 2, and 6) of chip-positioning circuit boards, as illustrated in FIGS. 29, 30, 31, 32, 33, 34, 35, 36, 37, and 38, by fitting the previously mentioned triangle-shaped keys 11 (FIGS. 7, 8, 26, and 27) into triangle-shaped and correspondingly sized chip placement keyholes 92 (FIGS. 30, 32, 35, and 37), which are located at the top-center surface of the bottom-center plane 92 of every surface-mounted chip-socket installed 5 (FIGS. 1, 2, and 6). Afterwards, the chip placement keyholes 92 (FIGS. 30, 32, 35, and 37) will have the apex of their triangular shaped keyhole pointed toward the front of its respective chip-positioning circuit board's front-end 92 (FIGS. 30, 32, 35, and 37).

Furthermore, Phase-Change Microhead Array Chips are secured into surface-mounted chip-sockets by using two threaded hex-screws 2 (FIGS. 1, 6, 7, and 8), which are pushed through a Phase-Change Microhead Array Chip's two un-threaded hex-screw holes 3 (FIGS. 1, 6, 7, 8, 25, 26, 27, and 28) into a surface-mounted chip-socket's two threaded hex-screw holes 93 (FIGS. 30, 32, 35, and 37) and threaded into the previously mentioned surface-mounted chip-socket's two threaded hex-screw holes 93, by turning them in a clock-wise-direction, using torque wrench, until the two surface-mounted chip-socket's hex-screws 2 have reached a predetermined tightness. In this way, the surface-mounted chip-sockets will keep the Phase-Change Microhead Array Chips, illustrated by FIGS. 29, 31, 34, 36, tightly seated and secured into their respective chip-positioning circuit boards, as illustrated in FIGS. 29, 30, 31, 32, 33, 34, 35, 36, 37, and 38.

Figure 4:
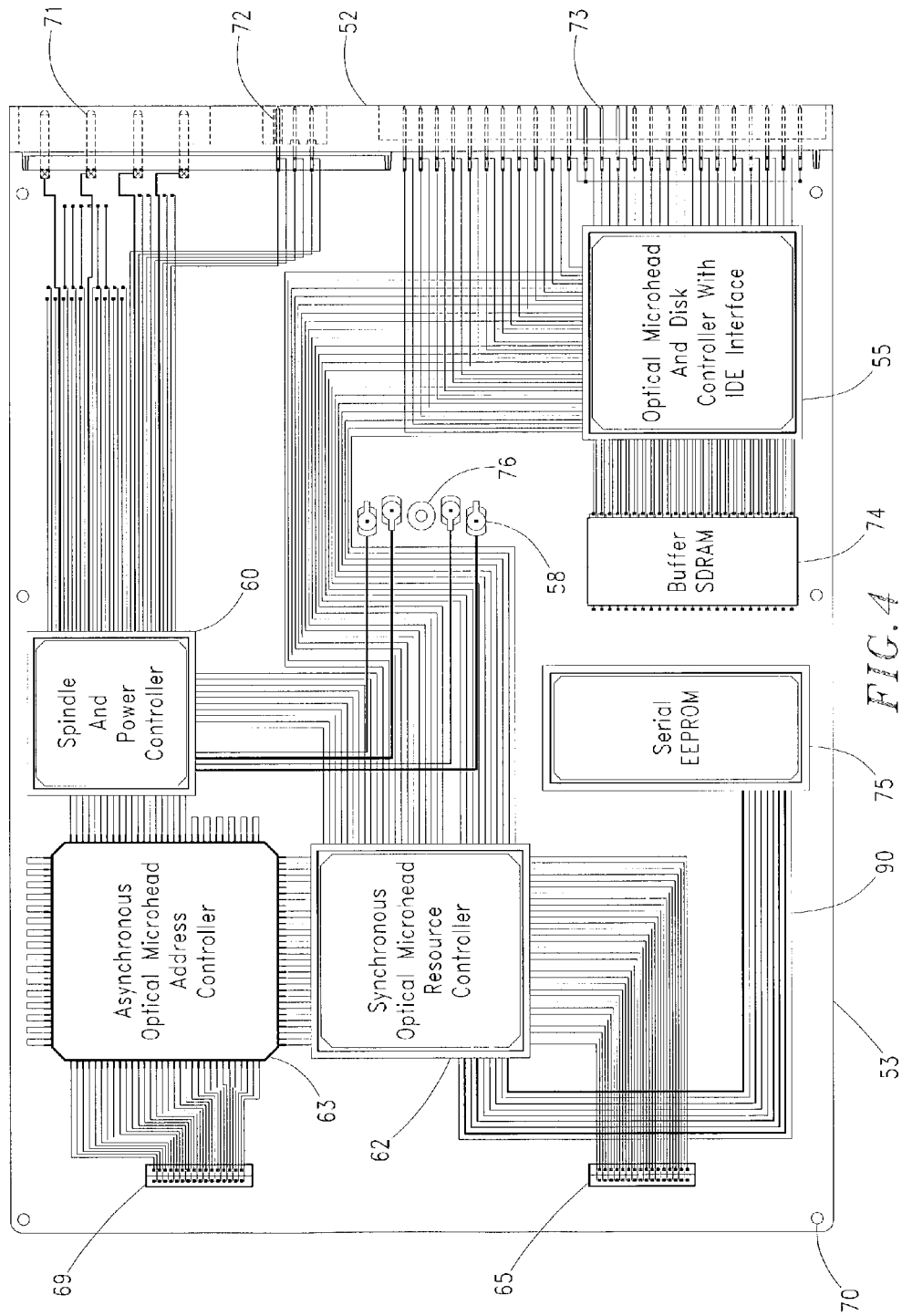
FIG. 4 shows an orthographic plan-view of an ATA-2 IDE Disk Controller PCB for a Phase-Change Microhead Array Chip Hard Disk Drive design.
Figure 5:
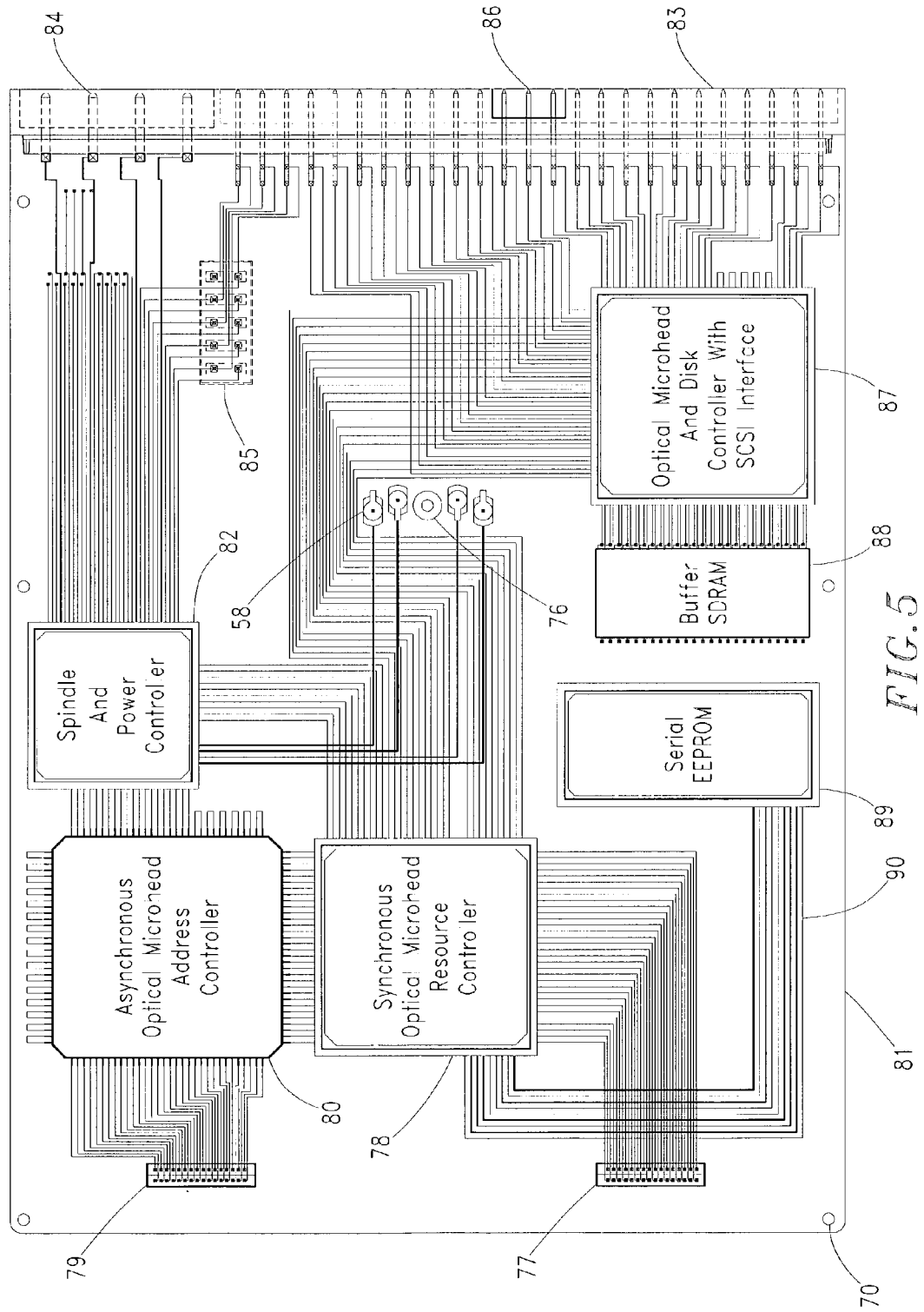
FIG. 5 shows an orthographic plan-view of a SCSI Disk Controller PCB for a Phase-Change Microhead Array Chip Hard Disk Drive design.

Another preferred first and basic embodiment of the Phase-Change Microhead Array Chip Hard Disk Drive design is the how, the where, and the why of the previously mentioned Polymer flex-cables, and their respective Polymer flex-cable connectors 67, as illustrated in FIGS. 1, 2, 3, 6, 9, 10, 29, 30, 31, 32, 33, 34, 35, 36, and 37, are used to give bus-system connectivity to installed Phase-Change Microhead Array Chips. Polymer flex-cable connectors 67 are installed onto chip-positioning circuit boards 27 (FIGS. 1, 2, 3, 6, 9, and 10) to provide, via Polymer flex-cables 43, 36, 38, 30 (FIGS. 1, 2, 3, 6, 9, and 10), to chip-positioning circuit boards, as illustrated in FIGS. 29, 30, 31, 32, 33, 34, 35, 36, 37, and 38, and their installed Phase-Change Microhead Array Chips (FIGS. 29, 31, 34, and 36), connectivity to a Phase-Change Microhead Array Chip Hard Disk Drive's Disk Controller, which is illustrated by FIGS. 4 and 5.

Moreover, Polymer flex-cable connectors 67 and Polymer flex-cables 43, 36, 38, 30 will giving to the before mentioned Phase-Change Microhead Array Chips (FIGS. 25, 26, 27, and 28) access to a Phase-Change Microhead Array Chip Hard Disk Drive's bus-systems, while in return giving to the before mentioned Phase-Change Microhead Array Chip Hard Disk Drive's bus-systems access to the before mentioned Phase-Change Microhead Array Chips, as illustrated in FIGS. 25, 26, 27, and 28. The before mentioned Polymer flex-cable connectors 67 make circuit connections with the chip-positioning circuit boards 27 and, therein to the chip-positioning circuit boards' sixty-four copper-circuit trace-runs 21, 22, 23, 24 (FIGS. 1, 6, 29, 30, 31, 32, 34, 35, 36, and 37).

Moreover, by using open-circuit contact-points 46, 26 (FIGS. 1 and 6), which are located on the forward-facing side of the bottom inside-edge of a Polymer flex-cable connector's outer-shell casing 25, 47 (FIGS. 1, 2, 3, 6, 9, and 10), the before mentioned open-circuit contact-points 46, 26 (FIGS. 1 and 6) shall form a multiple circuit connection with a chip-positioning circuit board's 27 (FIGS. 1, 2, 3, 6, 9, and 10) sixty-four copper-circuit trace-runs 21, 22, 23, 24 when the Polymer flex-cable connectors 67 (FIGS. 29, 30, 31, 32, 33, 34, 35, 36, and 37) are bolted, using two Polymer flex-cable connector hex-screws 37 (FIGS. 1, 2, and 3), onto the exposed copper-circuit trace-ends 47, 25 (FIG. 1) of the chip-positioning circuit boards 27 (FIGS. 1, 2, and 3) sixty-four copper-circuit trace-runs 21, 22, 23, 24 (FIGS. 29, 30, 31, 32, 33, 34, 35, 36, and 37).

In addition, when the exposed copper-circuit trace-ends 46, 26 (FIGS. 1 and 6) of Polymer flex-cables 43, 30 (FIGS. 1 and 6) are inserted into Polymer flex-cable connector female connections 28, 45 (FIGS. 1, 2, 6, 10, and 29) they are held into place by internal spring-contacts 28, 45 of Polymer flex-cable connectors, giving the Polymer flex-cable connectors 67 (FIGS. 1, 2, and 3) and chip-positioning circuit boards 27 (FIGS. 1, 2, 3, 6, 9, and 10) they are bolted onto, connectivity to a Disk Controller's bus-system.

In addition, open-circuit contact-points 46, 26 (FIGS. 1 and 6) located within each Polymer flex-cable connector's outer-shell casing 25, 47 (FIGS. 1, 2, 3, 6, 9, and 10), also connect to Polymer flex-cable connectors 67 (FIGS. 29, 30, 31, 32, 33, 34, 35, 36, and 37), which are installed onto a chip-positioning circuit-board's opposite-side or bottom side through, what is called a chip-positioning circuit board's pass-through circuit connection 46, 26 (FIGS. 1 and 6). The pass-through circuit connection 46, 26 (FIGS. 1 and 6) comprises a group of pin-holes 46, 26 (FIGS. 1 and 6), which act as unobstructed passageways that thirty-two micro-plugs having diameters one-half in size to the previously mentioned pin-hole passage-ways, connect two Polymer flex-cable connectors 67 with opposed locations, by allowing each Polymer flex-cable connector's respective group of micro-plugs to connect 46, 26 (FIGS. 1 and 6) with an opposed Polymer flex-cable connector's installation; moreover, creating a pass-through circuit connection 46, 26 (FIGS. 1 and 6). The pass-through circuit, also eliminates the possibility of a short-circuit occurring between the Polymer flex-cable connector's micro-plug contacts and its respective chip-positioning circuit board's inner metal-core 27 (FIGS. 1, 2, 3, 6, 9, and 10).

In addition, chip-positioning circuit board pass-through circuits 46, 26 (FIGS. 1 and 6) will give bus-system connectivity to installed Polymer flex-cable connectors 67 (FIGS. 1, 2, and 3), through the open-circuit contact-points 46, 26 of Polymer flex-cable connectors, which in turn gives bus-system connectivity to a chip-positioning circuit board's two groups of sixty-four copper-circuit trace-runs 21, 22, 23, 24 (FIGS. 29, 30, 31, 32, 34, 35, 36, and 37), which are located just under the outermost skin of a chip-positioning circuit board's last layer of applied fiber-glass insulation 27 (FIGS. 1, 2, 3, 6, 9, and 10).

Figure 33:
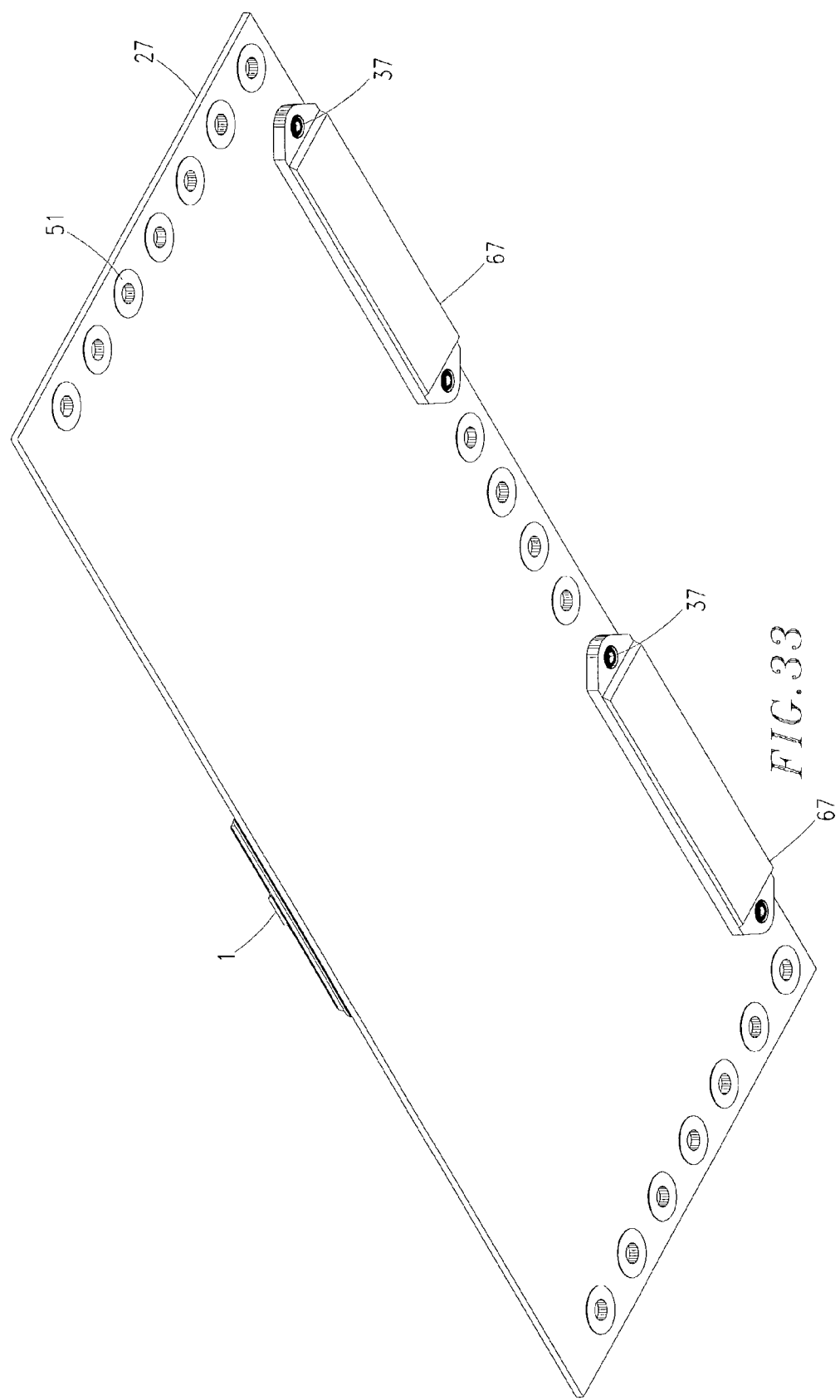
FIG. 33 is a 3D bottom front-view drawing of a first disk-platter's chip-positioning circuit board assembly, shown with a Phase-Change Microhead Array Chip as being installed.
Figure 34:
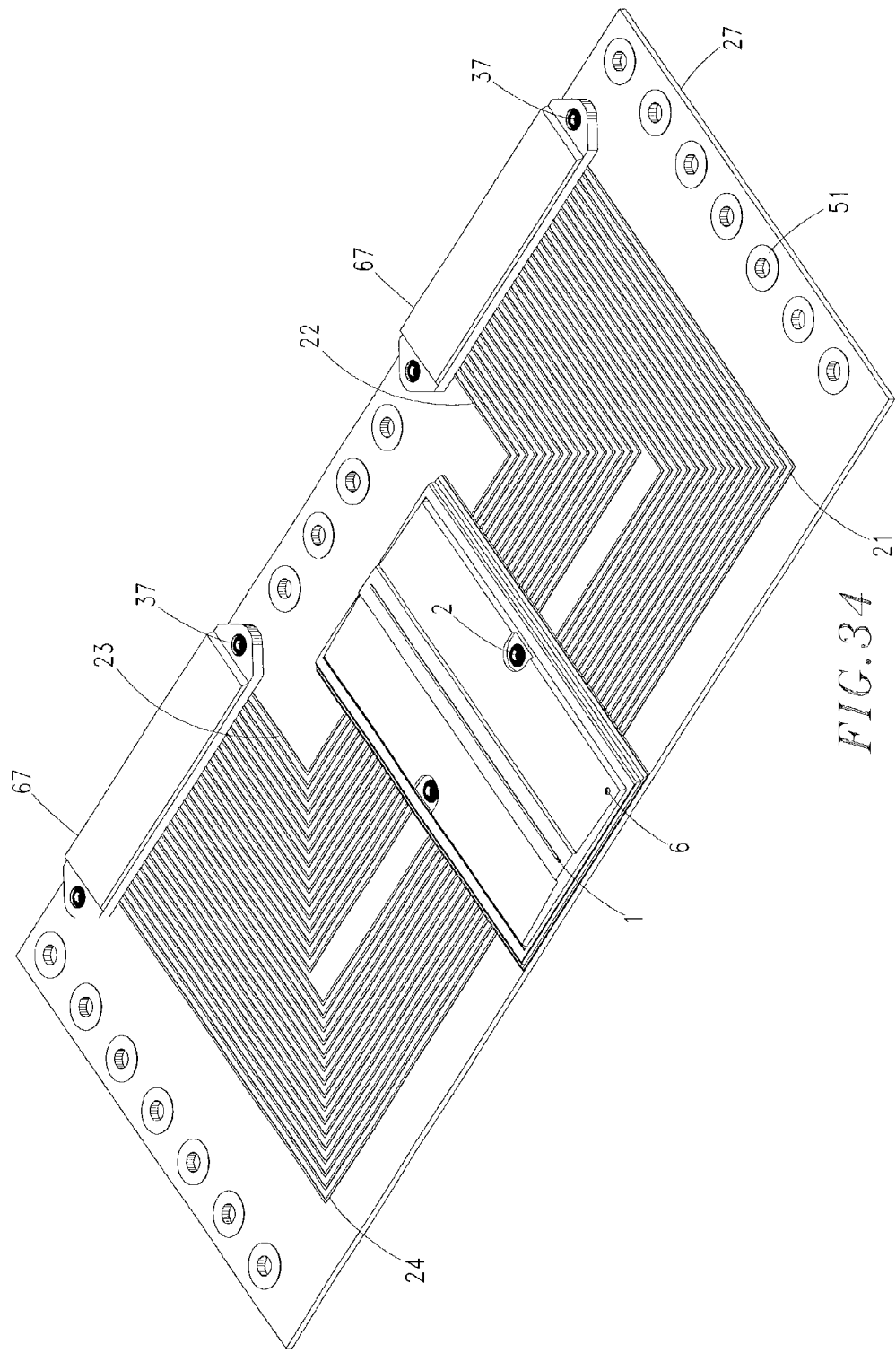
FIG. 34 is a 3D top front-view drawing of a first disk-platter's chip-positioning circuit board assembly, shown with a Phase-Change Microhead Array Chip as being installed.
Figure 35:
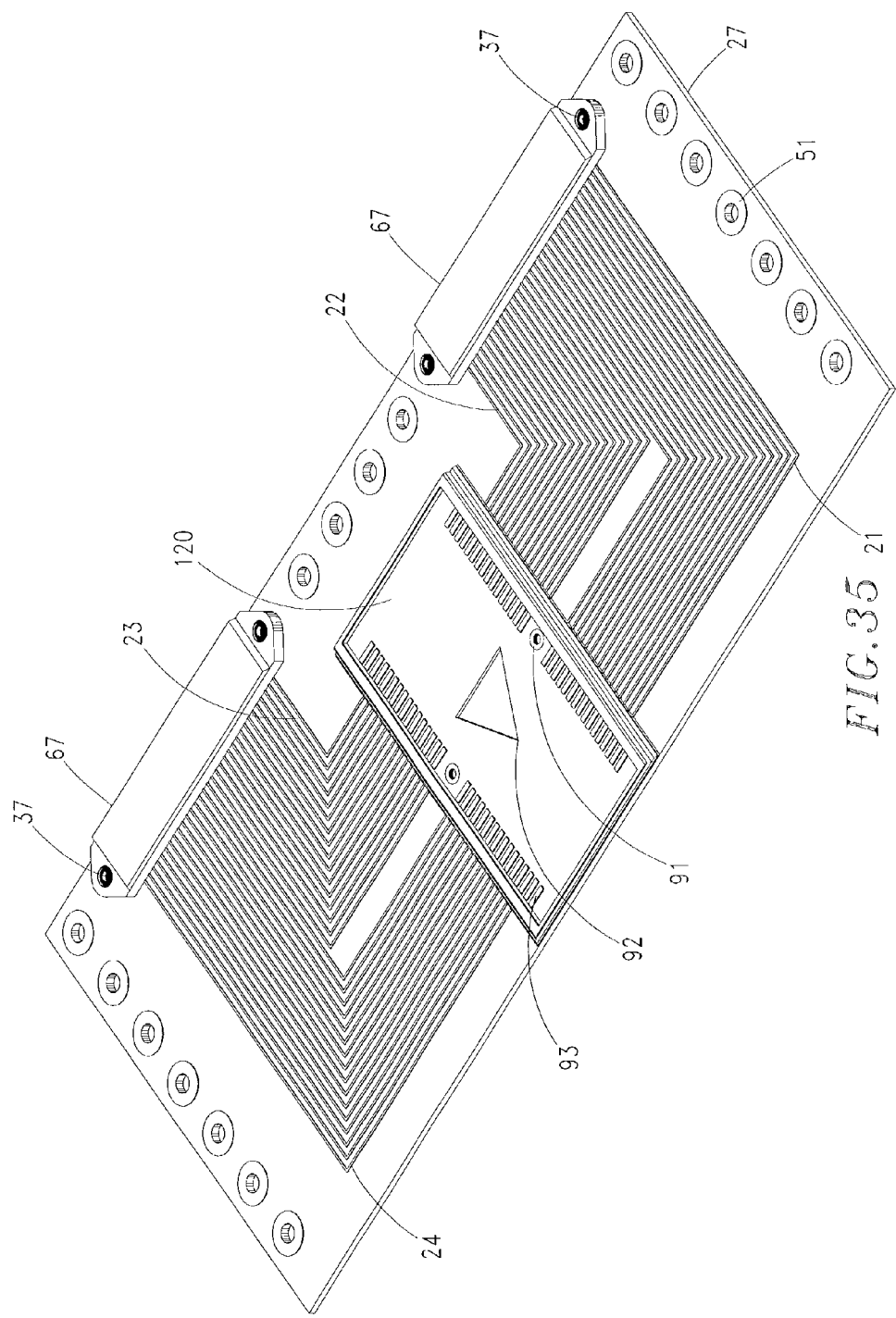
FIG. 35 is a 3D top front-view drawing of a first disk-platter's chip-positioning circuit board assembly, shown with a Phase-Change Microhead Array Chip as not being installed.

Moreover, a Phase-Change Microhead Array Chip Hard Disk Drive's first chip-positioning circuit board, as illustrated in FIGS. 33, 34, and 35, is positioned at and attached to a Phase-Change Microhead Array Chip Hard Disk Drive's casting-base 12 (FIGS. 1, 2, and 3) and chip-positioning circuit board mounting pedestals 61, 64 (FIGS. 2, 3, and 117). Further, when a Phase-Change Microhead Array Chip Hard Disk Drive's unit-assembly (FIG. 117) is viewed with its front-end turned-up vertical into the Y-direction of Cartesian coordinates (i.e., what is sometimes called the portrait-position), the Polymer flex-cable connectors 67 (FIGS. 29, 30, 31, 32, 33, 34, 35, 36, and 37) and the Polymer flex-cables 30 (FIGS. 1, 6, 10, and 15), if located on the right-hand side of the chip-positioning circuit boards installed into a Phase-Change Microhead Array Chip Hard Disk Drive's unit-assembly (FIG. 117) are multiple connection cable circuits, which are dedicated to a Phase-Change Microhead Array Chip Hard Disk Drive's Power, Ground, Data I/O, and Control bus-systems.

Furthermore, the Polymer flex-cable connectors 67 (FIGS. 29, 30, 31, 32, 33, 34, 35, 36, and 37) and the Polymer flex-cables 30 (FIGS. 1, 6, 10, and 15), if installed on the right-hand side of the before mentioned chip-positioning circuit boards will form a multiple circuit connection between installed Phase-Change Microhead Array Chips (FIGS. 29, 31, 34, 36, and 38), through a Phase-Change Microhead Array Chip's chip-connecting contact-points 7, 8 (FIGS. 7, 8, 26, and 27), and a Disk Controller's PCB unit-assembly 53 (FIGS. 2, 3, 4, and 5). Remembering that a Disk Controller's PCB 53 is positioned just under a Phase-Change Microhead Array Chip Hard Disk Drive's Spindle-Motor unit-assembly 59 (FIGS. 2 and 3), facing the bottom-inside surface of a Phase-Change Microhead Array Chip Hard Disk Drive's casting-base 12 (FIGS. 1, 2, and 3).

In addition, when a Phase-Change Microhead Array Chip Hard Disk Drive's unit-assembly (FIG. 117) is viewed with its front-end turned-up vertical into the Y-direction of Cartesian coordinates (i.e., what is sometimes called the portrait-position), the Polymer flex-cable connectors 67 (FIGS. 29, 30, 31, 32, 33, 34, 35, 36, and 37) and the Polymer flex-cables 43 (FIGS. 1, 6, 10, and 16), if located on the left-hand side of the chip-positioning circuit boards installed into a Phase-Change Microhead Array Chip Hard Disk Drive's unit-assembly (FIG. 117) are multiple connection cable circuits, which are dedicated to a Phase-Change Microhead Array Chip Hard Disk Drive's 32-bit microhead addressing bus-system.

In addition, the Polymer flex-cable connectors 67 (FIGS. 29, 30, 31, 32, 33, 34, 35, 36, and 37) and the Polymer flex-cables 43 (FIGS. 1, 6, 10, and 16), if installed on the left-hand side of the chip-positioning circuit boards, will create a multiple circuit connection between installed Phase-Change Microhead Array Chips (FIGS. 29, 31, 34, 36, and 38), through their chip-connecting contact-points 9, 10 (FIGS. 7, 8, 26, and 27) and a Disk Controller's PCB unit-assembly 53 (FIGS. 2, 3, 4, and 5). Moreover, remembering that a Disk Controller's PCB 53 (FIGS. 2, 3, 4, and 5) is positioned just under a Phase-Change Microhead Array Chip Hard Disk Drive's Spindle-Motor unit-assembly 59 (FIGS. 2 and 3), facing the bottom-inside surface of a Phase-Change Microhead Array Chip Hard Disk Drive's casting-base 12 (FIGS. 1, 2, and 3).

In addition too the Polymer flex-cable connectors 67 (FIGS. 29, 30, 31, 32, 33, 34, 35, 36, and 37) there are Polymer flex-cable connectors called female bridge-connectors 34, 40 (FIGS. 1, 2, and 3), which are used to connect a Phase-Change Microhead Array Chip Hard Disk Drive's chip-positioning circuit board assemblies, illustrated by FIGS. 29, 30, 31, 32, 33, 34, 35, 36, 37, and 38, up to the previously mentioned Disk Controller's PCB unit-assembly 53 (FIGS. 2, 3, 4, and 5). Wherein, a top-plug portion or first top-half of the female bridge-connector 34, 40 (FIGS. 1, 2, and 3) comprises a thirty-two spring-contact Polymer flex-cable 32-bit female-connector 33, 41 (FIGS. 1, 2, and 3), a sealing-gasket 31, 42 (FIGS. 1, 2, and 3) and two installation hex-screws 32 (FIGS. 1, 2, 3, 6, and 10).

Moreover, the aforesaid top-plug portions of two female bridge-connectors 34, 40 (FIGS. 1, 2, and 3) are to be installed into two holes, which were previously created in the bottom-half of a casting-base's component mounting base-plate 12 (FIGS. 1, 2, and 3), which is opposite to the Phase-Change Microhead Array Chip Hard Disk Drive's front-end (FIGS. 1, 2, and 3). Moreover, the top-plug portions of the female bridge-connectors 34, 40 (FIGS. 1, 2, and 3) are connected, using two hex-screws 32 (FIGS. 1, 2, and 3), to the inside top-surface of the bottom-half of the casting-base's component mounting base-plate 12 (FIGS. 1, 2, and 3).

Furthermore, in addition to the top-plug portion (sometimes called the first-half) of the female bridge-connector 34, 40 (FIGS. 1, 2, and 3) is a bottom-plug portion (sometimes called the second-half) of the female bridge-connector 33, 41 (FIGS. 1, 2, and 3), which comprises a 32-pin micro-plug female-connector, which has an install location identical to the install location of its companion top-plug portion 34, 40 (FIGS. 1, 2, and 3). Moreover, the two female bridge-connectors 34, 40 (FIGS. 1, 2, and 3) are used to connect a Phase-Change Microhead Array Chip Hard Disk Drive's chip-positioning circuit boards, as illustrated in FIGS. 29, 30, 31, 32, 33, 34, 35, 36, 37, and 38, to a Disk Controller's two 32-pin micro-plug male connectors 65, 69 (FIG. 4) 77, 79 (FIG. 5). The micro-plug male connectors 65, 69 (FIG. 4) 77, 79 (FIG. 5) are located on the top-surface of a Disk Controller's PCB unit-assembly 53, 81 (FIGS. 2, 3, 4, and 5), which faces toward a Spindle-Motor has flanged mounting-base 12 (FIGS. 1, 2, and 3). The top-plug portions of the female bridge-connectors 34, 40 (FIGS. 1, 2, and 3) comprise the same thirty-two spring-contact Polymer flex-cable 32-bit female connector 35, 39 (FIGS. 1, 2, and 3) used in the chip-positioning circuit board's Polymer flex-cable connectors 67 (FIGS. 1, 2, and 3). Additionally, every female bridge-connector 34, 40 (FIGS. 1, 6, 10, and 117) that is installed into a Phase-Change Microhead Array Chip Hard Disk Drive has two sealing-gaskets 31, 42 (FIGS. 1, 6, and 10), which are used for sealing a Phase-Change Microhead Array Chip Hard Disk Drive's interior-space from any air-borne particles existing in the air outside the drive's sealed interior-space.

Preferably, the Phase-Change Microhead Array Chip Hard Disk Drive design will use in its construction four sealing gaskets 31, 42 (FIG. 1) two for a right-side female bridge-connector and two for a left-side female bridge-connector 31, 42 (FIGS. 1, 2, 3, 6, 10, 117). Moreover, the sealing gaskets 31, 42 (FIG. 1) will tightly seal surface areas located between the female bridgeconnectors' top-plug and bottom-plug portions, and the female bridgeconnectors' installation slot-holes 34, 40, 33, 41 (FIGS. 1, 2, and 3). Moreover, the sealing gaskets 31, 42 (FIG. 1) will also protect a Phase-Change Microhead Array Chip Hard Disk Drive's enclosed interior environment from air-borne dust and/or particle contamination. Therefore, the female bridge-connectors 34, 40, 33, 41 (FIGS. 1, 2, and 3) are tightly fastened to a Phase-Change Microhead Array Chip Hard Disk Drive's casting-base 12 (FIGS. 1, 2, and 3) using two female bridge-connector threaded hex-screws 32, 43 (FIGS. 1, 2, 3, 6, 9, and 10).

Furthermore, as illustrated by FIGS. 29, 30, 31, 32, 33, 34, 35, 36, 37, and 38, the top-plug portion of the female bridge-connectors 34, 40 (FIGS. 1 and 6) also provide connectivity between a Phase-Change Microhead Array Chip Hard Disk Drive's bus-system, a Phase-Change Microhead Array Chip Hard Disk Drive's Disk Controller, and a Phase-Change Microhead Array Chip Hard Disk Drive's chip-positioning circuit boards, and their respective Phase-Change Microhead Array Chips (FIGS. 29, 31, 34, and 36). Moreover, the connectivity between bus-systems and a Disk Controller is executed through two primary bus-system Polymer flex-cables 36, 38 (FIGS. 1, 6, 10, 15, 16, and 117), which are physically connected, using two female bridge-connector's top-plug portions 34, 40 (FIG. 1), to a chip-positioning circuit board's two bottom Polymer flex-cable connectors 67 (FIGS. 2 and 10).

Furthermore, the first chip-positioning circuit board is installed into a Phase-Change Microhead Array Chip Hard Disk Drive's unit-assembly (FIG. 117) using eighteen 'Titanium' alloy circuit-board spacers 66 (FIGS. 1, 2, and 3), a casting-base 12 (FIGS. 1, 2, and 3), and eighteen hex-screw bolt-pedestals 61, 64 (FIGS. 2 and 3). Moreover, eighteen additional chip-positioning circuit board spacers 66 (FIGS. 1, 2, and 3) are used to install each proceeding chip-positioning circuit board into a Phase-Change Microhead Array Chip Hard Disk Drive's unit-assembly, as illustrated by FIG. 117. As illustrated in FIGS. 2, 3, 36, 37, 38, and 117, the last chip-positioning circuit board assembly is installed into a Phase-Change Microhead Array Chip Hard Disk Drive's unit-assembly (FIG. 117) and locked into place 66 (FIGS. 1, 2, 3, and 117) with eighteen chip-positioning circuit board's hex-screws 50 (FIGS. 1, 2, 3, and 117).

Moreover, installation of all chip-positioning circuit boards is finally accomplished when the chip-positioning circuit board's eighteen installation hex-screws 50 (FIGS. 1, 2, 3, and 117) are first inserted into and through the hex-screw holes 51 (FIGS. 1, 2, and 3) of the last chip-positioning circuit board, while continuing with the insertion of the hex-screws 50 through all chip-positioning circuit board spacers 66 and spacer holes 66 (FIGS. 1, 2, and 3) until they reach a respective hex-screw hole 51 (FIGS. 1, 2, 3, and 117). Next, the hex-screws 50 (FIGS. 1, 2, 3, and 117) are tightly threaded into their respective bolt-pedestals 61, 64 (FIGS. 2 and 3), which are located at the top outermost inner-surface of the bottom-half 13 (FIGS. 1, 2, and 3) of a drive's casting-base. Further, after the threaded hex-screws 50 (FIGS. 1, 2, 3, and 117) are threaded into the eighteen hex-screw bolt-pedestals 61, 64 (FIGS. 1, 2, and 3) located at the top outermost inner-surface of the bottom-half 13 (FIGS. 1, 2, and 3) of a drive's casting-base, the threaded hex-screws are tightened securely into place using a torque hex-wrench, which will simultaneously secure all of the chip-positioning circuit boards into their final and stationary positions, as illustrated in FIGS. 1, 2, 3, and 117.

Another preferred first and basic embodiment of the present invention, as illustrated in drawing FIGS. 29, 30, 31, 32, 33, 34, 35, 36, 37, and 38, describes chip-positioning circuit board assemblies, which are used in the Phase-Change Microhead Array Chip Hard Disk Drive design to position their previously mentioned and respective Phase-Change Microhead Array Chips FIG. 29, FIG. 31, FIG. 34, FIG. 36 above their respective disk-platters 13 (FIGS. 1, 2, and 3). Moreover, with the first chip-positioning circuit board FIG. 33, FIG. 34, FIG. 35, having a top-installed 'Bottom Surface Phase-Change Microhead Array Chip' FIG. 28, put into a stationary position above a Phase-Change Microhead Array Chip Hard Disk Drive's disk-platter one, data-surface one 13 (FIGS. 1, 2, and 3).

In addition, the first chip-positioning circuit board will provide system connectivity through its two bottom Polymer flex-cable connectors 36, 38 (FIGS. 1, 6, 15, 16, and 117), which are located closest to a Phase-Change Microhead Array Chip Hard Disk Drive's casting-base 12 (FIGS. 1, 2, and 3), connectivity is accomplished using two extra-long bus-system Polymer flex-cables 36, 38 (FIGS. 1, 2, and 117), which are inserted into the bottom two spring-contact 32-bit flex-cable connectors 67 (FIGS. 2, 3, 10, and 117) of the first chip-positioning circuit board.

Moreover, a first chip-positioning circuit board's spring-contact flex-cable connectors are ultimately used to parallel-connect all of the installed chip-positioning circuit board assemblies used in a Phase-Change Microhead Array Chip Hard Disk Drive's unit-assembly (FIG. 117) into a Phase-Change Microhead Array Chip Hard Disk Drive's bus-system, as illustrated in FIGS. 29, 30, 31, 32, 33, 34, 35, 36, 37, and 38. Moreover, by using the two female bridge-connectors 34, 40 (FIGS. 1 and 6), which are located on the inside-bottom surface of a Phase-Change Microhead Array Chip Hard Disk Drive's casting-base 12 (FIGS. 1, 2, and 3), the two female bridge-connector's bottom-plug portion female-connector 33, 41 (FIGS. 1, 2, and 3) connects to the Disk Controller's two 32-pin mini-plug male connectors, which are located on the Disk Controller's PCB 65, 69 (FIG. 4) 77, 79 (FIG. 5), through two rectangular shaped slot-holes located in the bottom-half of the casting-base's component mounting base-plate 12 (FIGS. 1, 2, and 3).

In addition, the second chip-positioning circuit board installed into a Phase-Change Microhead Array Chip Hard Disk Drive's unit-assembly (FIG. 117) is an 'In-between Disk-Platter' chip-positioning circuit board assembly, illustrated by FIGS. 29, 30, 31, and 32, which show a bottom-installed 'Top-surface Phase-Change Microhead Array Chip' (FIG. 25) as being put into position for disk-platter one, data-surface two, while showing a top-installed 'Bottom Surface Phase-Change Microhead Array Chip' (FIG. 28) as being put into position for disk-platter two, data-surface one.

Furthermore, a second chip-positioning circuit board's bottom two Polymer flex-cables 30, 43 (FIGS. 1, 2, 3, and 117) are used to connect to a first chip-positioning circuit board's top two 32-bit Polymer flex-cable spring-contact connectors 67 (FIGS. 2, 3, 10, and 117); creating a daisy chained bus-system for all installed Phase-Change Microhead Array Chips and their respective chip-positioning circuit board assemblies, as illustrated in FIGS. 29, 30, 31, 32, 33, 34, 35, 36, 37, and 38.

In addition, the third chip-positioning circuit board, illustrated by FIGS. 29, 30, 31, and 32, which is installed into a Phase-Change Microhead Array Chip Hard Disk Drive's unit-assembly as an 'In-between Disk-Platter' chip-positioning circuit board assembly, illustrated by FIGS. 29, 30, 31, and 32, which show a bottom-installed 'Top-surface Phase-Change Microhead Array Chip' (FIG. 25) as being put into position for disk-platter two, data-surface two, while showing a top-installed 'Bottom Surface Phase-Change Microhead Array Chip' (FIG. 28) as being put into position for disk-platter three, data-surface one.

Furthermore, a third chip-positioning circuit board's bottom two Polymer flex-cables 30, 43 (FIGS. 1, 2, 3, and 117), which connect to a second chip-positioning circuit board's top two 32-bit flex-cable spring-contact connectors 67 (FIGS. 2, 3, 10, and 117), are used to provide a third chip-positioning circuit board with connectivity to a Phase-Change Microhead Array Chip Hard Disk Drive's system-bus.

In addition, the fourth chip-positioning circuit board to be installed into a Phase-Change Microhead Array Chip Hard Disk Drive's unit-assembly is also an 'In-between Disk-Platter' chip-positioning circuit board, illustrated by FIGS. 29, 30, 31, and 32, which show a bottom-installed 'Top-surface Phase-Change Microhead Array Chip' (FIG. 25) as being put into position for disk-platter three, data-surface two, while showing a top-installed 'Bottom Surface Phase-Change Microhead Array Chip' (FIG. 28) as being put into position for disk-platter four, data-surface one.

Furthermore, the fourth chip-positioning circuit board's bottom two Polymer flex-cables 30, 43 (FIGS. 1, 2, 3, and 117), which connect to a third chip-positioning circuit board's top two 32-bit flex-cable spring-contact connectors 67 (FIGS. 2, 3, 10, and 117), are used to provide a fourth chip-positioning circuit board with connectivity to a Phase-Change Microhead Array Chip Hard Disk Drive's system-bus.

Figure 36:
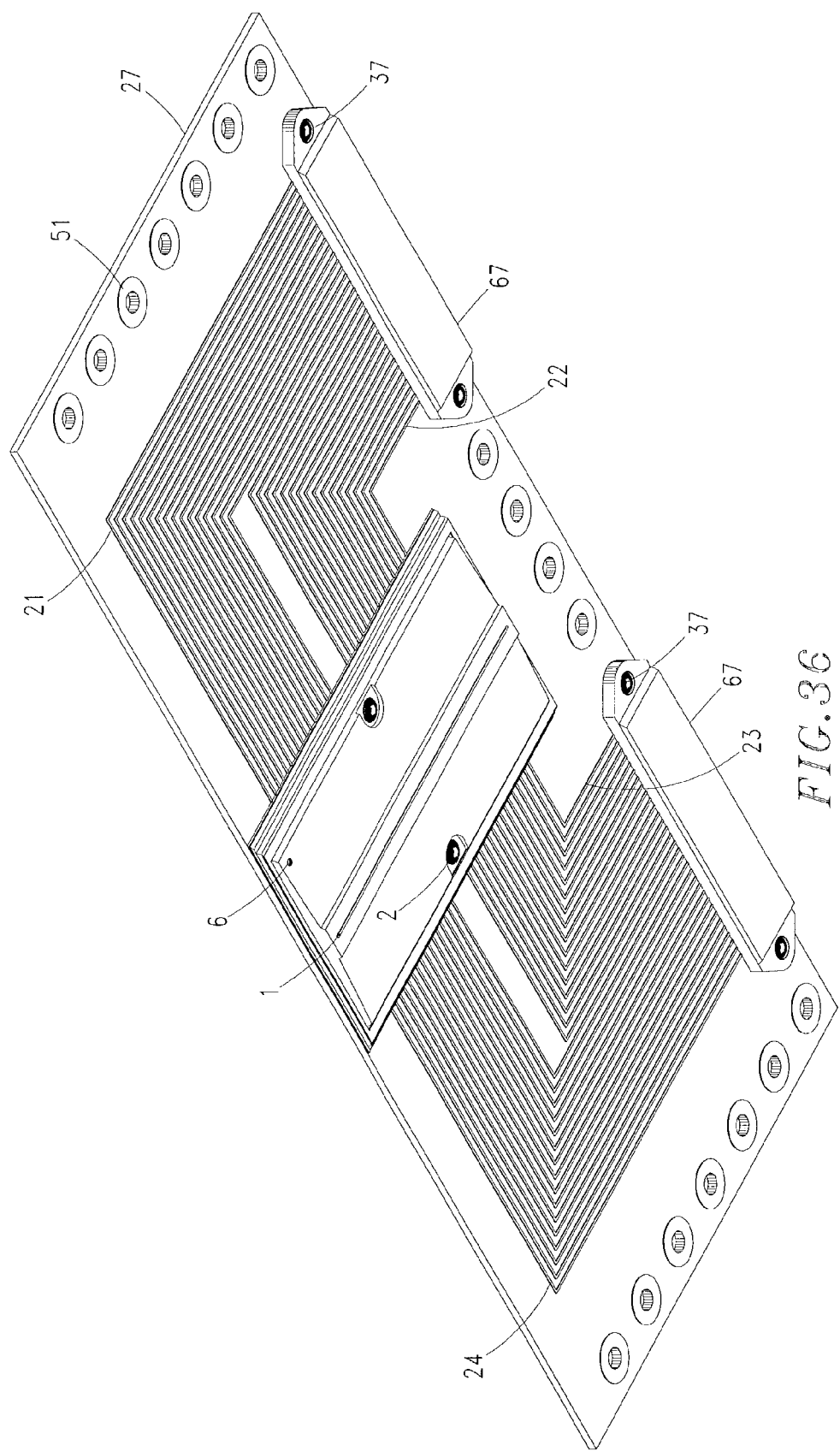
FIG. 36 is a 3D bottom front-view drawing of a last disk-platter's chip-positioning circuit board assembly, shown with the Phase-Change Microhead Array Chip as being installed.
Figure 37:
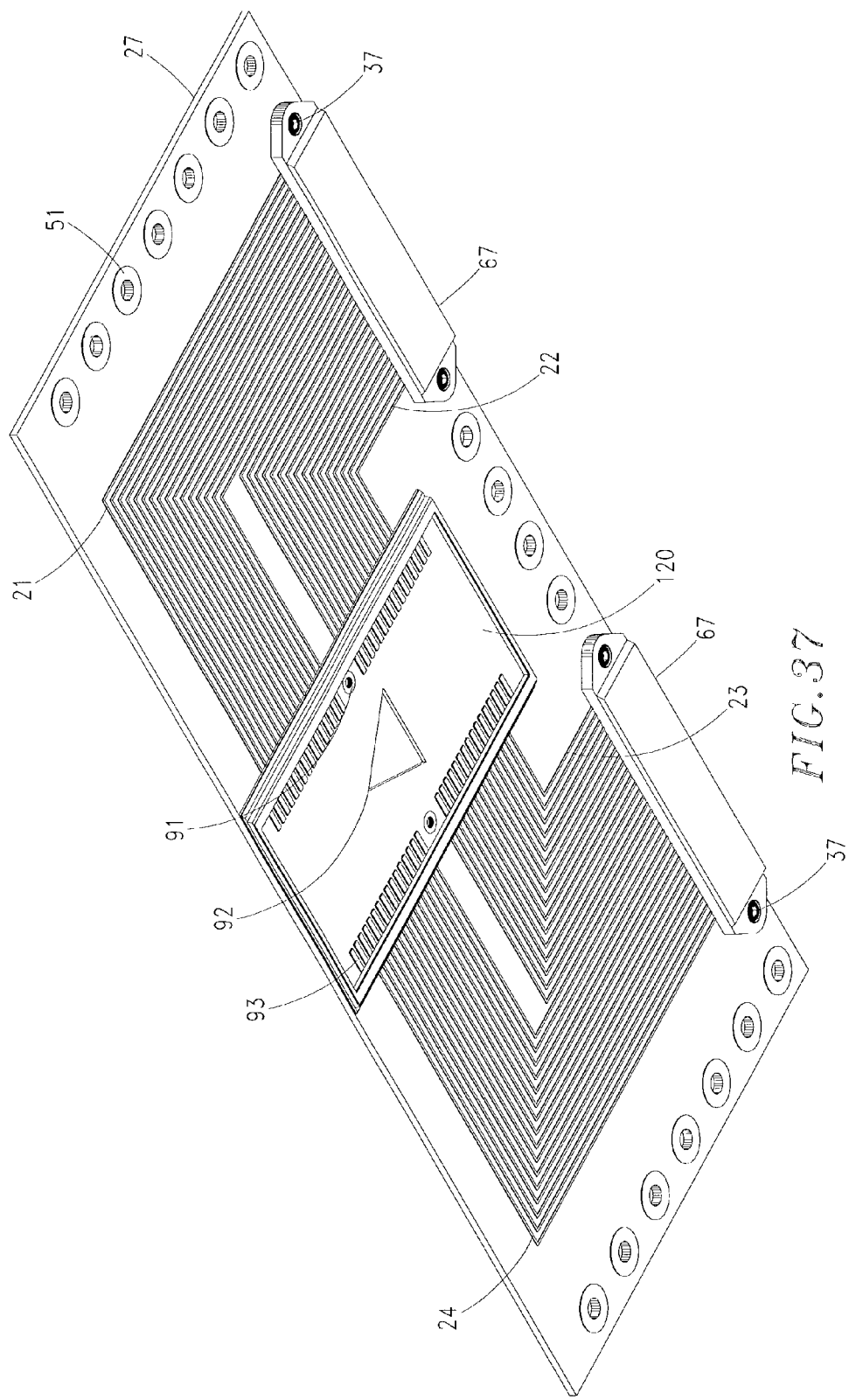
FIG. 37 is a 3D-bottom front-view drawing of a last disk-platter's chip-positioning circuit board assembly, shown with a Phase-Change Microhead Array Chip as not being installed.
Figure 38:
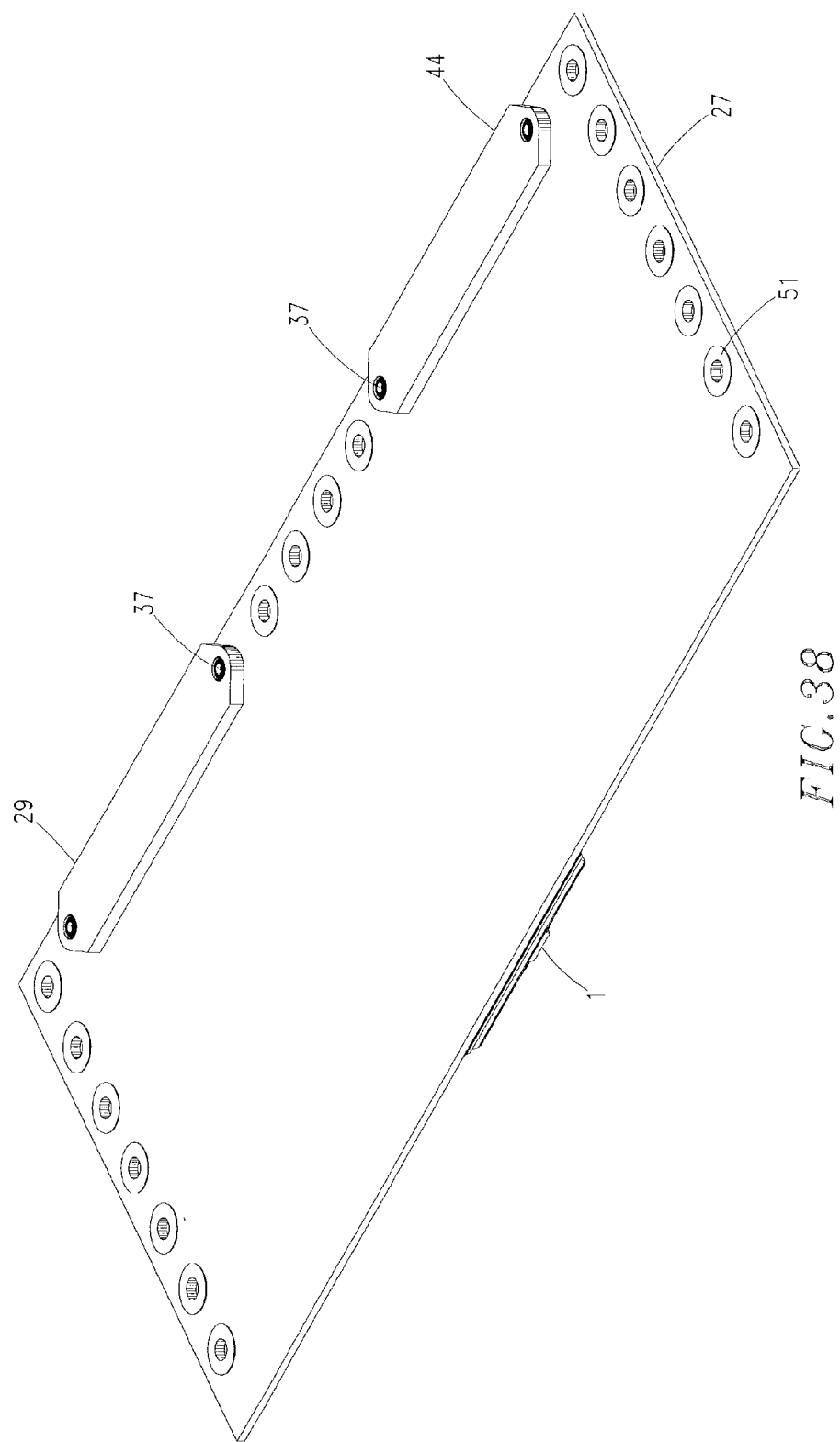
FIG. 38 is a 3D top front-view drawing of a last disk-platter's chip-positioning circuit board assembly, shown with a Phase-Change Microhead Array Chip as being installed.

In addition, the fifth chip-positioning circuit board installed into a Phase-Change Microhead Array Chip Hard Disk Drive's unit-assembly is a 'Last Disk Platter' chip-positioning circuit board assembly, illustrated by FIGS. 36, 37, and 38, which show its bottom-installed 'Top-surface Phase-Change Microhead Array Chip' (FIG. 25) as being put into position for disk-platter four, data-surface two. Furthermore, the fifth Phase-Change Microhead Array Chip chip-positioning circuit board's bottom two Polymer flex-cables 30, 43 (FIGS. 1, 2, 3, and 117), which connect to the fourth chip-positioning circuit board's top two 32-bit flex-cable spring-contact connectors 67 (FIGS. 2, 3, 10, and 117).

In addition, the last two Polymer flex-cable connectors 29, 44 (FIGS. 1, 2, 3, 6, 38, and 117) are not Polymer flex-cable connectors at all, but are in reality Polymer flex-cable connector termination-caps. Moreover, the termination-caps are located on the topside surface of the before mentioned fifth and last chip-positioning circuit board (FIG. 38) used in a Phase-Change Microhead Array Chip Hard Disk Drive's unit-assembly, as illustrated in FIG. 117. The fastening of the fifth chip-positioning circuit board's two termination-caps 29, 44 (FIGS. 1, 2, 3, 6, 38, and 117) to the fifth and last chip-positioning circuit board's (FIG. 38) topside surface is accomplished with four threaded flex-cable connector hex-screws 37 (FIGS. 1, 2, 3, 6, 9, 10, and 117).

In addition, every chip-positioning circuit board installed into a Phase-Change Microhead Array Chip Hard Disk Drive's unit-assembly (FIG. 117) is connected to the other chip-positioning circuit board, starting from the casting-base, with two Polymer flex-cables 30, 43 (FIGS. 1, 2, 3, and 117). The chip-positioning circuit boards used in Phase-Change Microhead Array Chip Hard Disk Drive s are all connected to one another in a daisy-chained bus-system cable configuration.

Moreover, a daisy-chained bus-system cable configuration starts from the casting-base female bridge-connectors 34, 40 (FIGS. 1, 6, and 10), and ending at the fifth and last chip-positioning circuit board (FIG. 38) to be installed into a Phase-Change Microhead Array Chip Hard Disk Drive's unit-assembly, as illustrated in FIG. 117. The daisy-chained bus-system cable configuration of chip-positioning circuit board assemblies, illustrated by FIGS. 29, 30, 31, 32, 33, 34, 35, 36, 37, and 38, will simplify a Phase-Change Microhead Array Chip Hard Disk Drive's manufacturing, upgrading, and repair.

Figure 76:
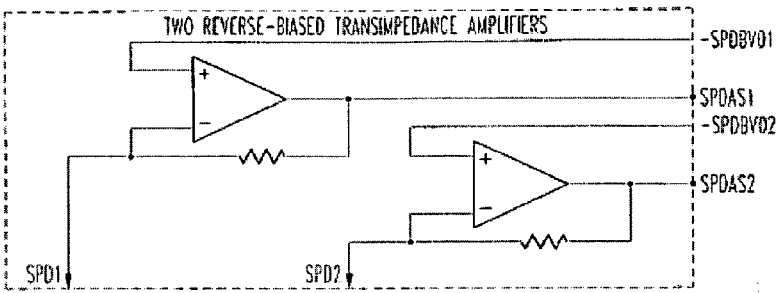
FIG. 76 is an auxiliary block-diagram drawing, which displays details of the reverse-biased transimpedence amplifier circuits used by the Phase-Change Microhead Array Chip read-channel's SPC devices.

In addition, the first embodiment of the present invention, as illustrated in drawing FIGS. 2, 3, 4, 5, and 81, describes a printed circuit board 53 (FIGS. 2, 3, 4, 5, and 81), which is installed onto the bottom of a Phase-Change Microhead Array Chip Hard Disk Drive's casting-base 12 (FIGS. 1, 2, and 3). A Phase-Change Microhead Array Chip Hard Disk Drive's Disk Controller will control the Phase-Change Microhead Array Chips through two 32-pin mini-plug male-connectors 65, 69 (FIGS. 4, 5, 77, and 79). Moreover, the previously mentioned two 32-pin mini-plug male-connectors 65, 69 (FIGS. 4, 5, 77, and 79) will connect to two 32-pin mini-plug female bridge-connectors 34, 40 (FIGS. 1, 6, 10, and 117), which are located at the bottom area of a casting-base's component mounting base-plate 12 (FIGS. 1, 2, and 3). The Disk Controller's PCB is attached to a Phase-Change Microhead Array Chip Hard Disk Drive's casting-base 12 (FIGS. 1, 2, and 3) with six PCB mounting hex-screws 54 (FIGS. 2 and 3). Moreover, the previously mentioned six PCB mounting hex-screws 54 are inserted through a Disk Controller's six PCB hex-screw holes 70 (FIGS. 4, 5, and 76), and screwed clockwise into the previously mentioned six PCB hex-screw holes, which are located around the bottom edge areas 16 (FIGS. 1, 2, and 3) of a Phase-Change Microhead Array Chip Hard Disk Drive's casting-base 12 (FIGS. 1, 2, and 3).

In addition, the previously mentioned Disk Controller's PCB has attached at its center, four metal circuit-contacts 58 (FIGS. 4 and 5). The previously mentioned metal circuit-contacts 58 are used by a Spindle And Power Controller's driver circuitry to commutate with a Spindle-Motor and its hall-sensor circuits (i.e., not shown here). Further, when the Disk Controller's PCB unit-assembly is installed onto a Phase-Change Microhead Array Chip Hard Disk Drive's casting-base 16 (FIGS. 1, 2, and 3) the four metal circuit-contacts 58 (FIGS. 1, 2, 3, 4 and 5) will make a connection with the previously mentioned Spindle And Power Controller's driver circuitry through circuit-contacts located on a Polymer circuit-trace substrate flex-cable (FIGS. 1, 2, and 3), which is located at the bottom of a Spindle-Motor's stator housing 58 (FIGS. 1, 2, and 3). Through four circuit-contacts 58 (FIGS. 1, 2, 3, 4, and 5), all of a Spindle-Motor's 59 (FIGS. 1, 2, and 3) velocity and radial positioning and control, along with its hall sensor monitoring signals, will be sent by two-way communication, through a Spindle-Motor's Polymer circuit-trace substrate-cable, to and from a PCB's circuit-contacts 53 (FIGS. 2, 3, 4, and 5), and back again to a Phase-Change Microhead Array Chip Hard Disk Drive's 'Spindle-Motor' 59 (FIGS. 1, 2, and 3). Moreover, a Disk Controller's PCB unit-assembly is used in a Phase-Change Microhead Array Chip Hard Disk Drive's unit-assembly to contain and install most of a Phase-Change Microhead Array Chip Hard Disk Drive's electronics. A Disk Controller's PCB unit-assembly consists of four main "Very Large Scale Integration" (VLSI) surface-mounted microprocessors.

Furthermore, the previously mentioned VLSI components will include an IDE bus-interface 55 (FIG. 4), or a SCSI bus-interface 87 (FIG. 5), which reside on a Disk Controller's PCB unit-assembly, as illustrated in FIGS. 4 and 5. However, the electronics used by every Phase-Change Microhead Array Chip to control functions like 'Microhead-Addressing and Selection', 'Read and Write-Channel Pre-Amplification', 'Read and Write-Channel Data Stream Encoding and Decoding', and 'Write Driver Data Demodulation' are all built into the Phase-Change Microhead Array Chips themselves.

Figure 60A:
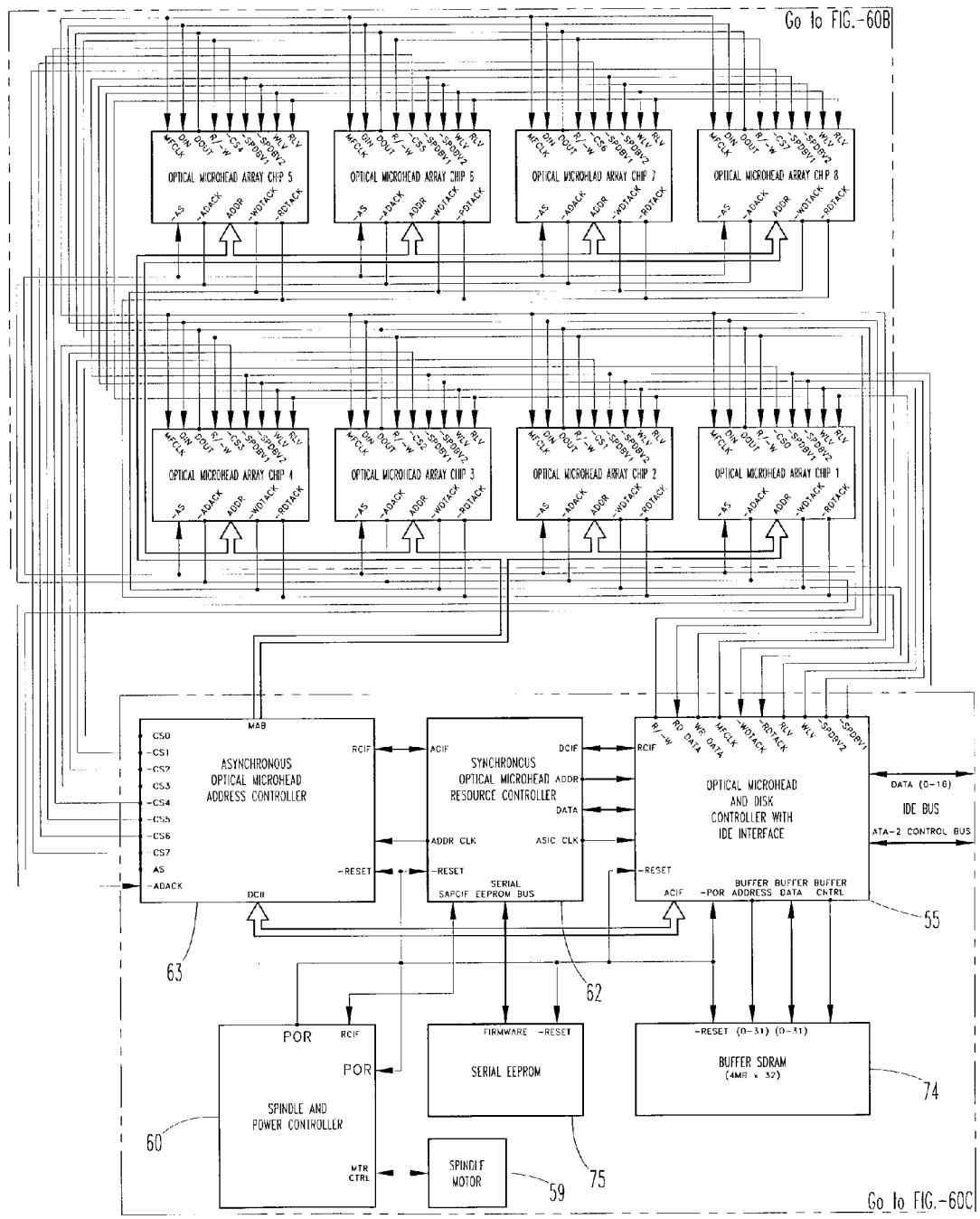
FIG. 60A is a block-diagram drawing of the ATA-2 IDE Disk Controller used in the Phase-Change Microhead Array Chip Hard Disk Drive design, which displays areas within FIG. 60A that were copied to separate drawing files as block-diagram drawing figures containing enlarged areas of block-diagram 60A.
Figure 60B:
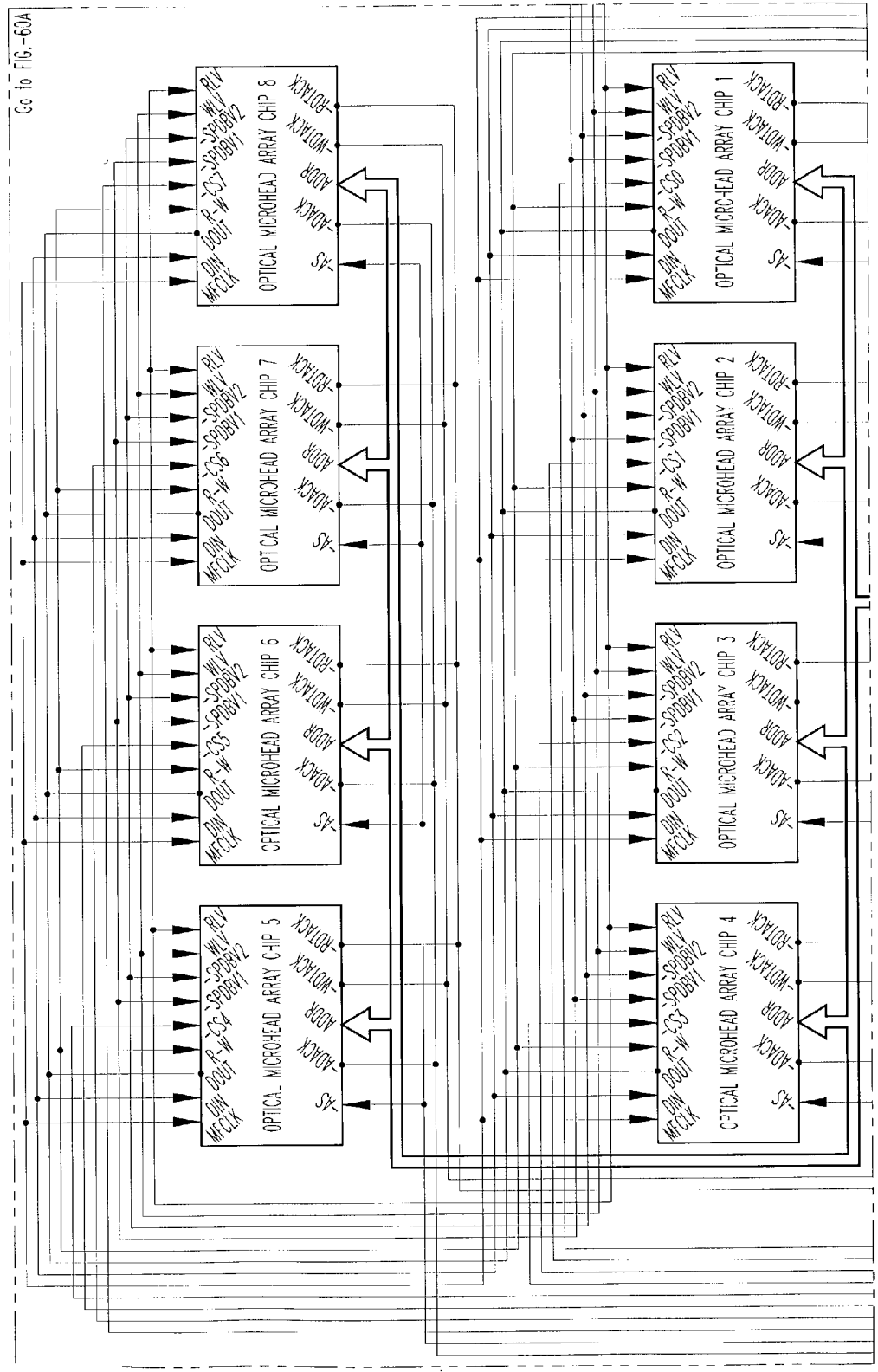
FIG. 60B is an enlarged block-diagram drawing of the ATA-2 IDE Disk Controller used in the Phase-Change Microhead Array Chip Hard Disk Drive design, which displays an enlarged block-diagram showing details of the block-diagram illustrated in FIG. 60A.
Figure 60C:
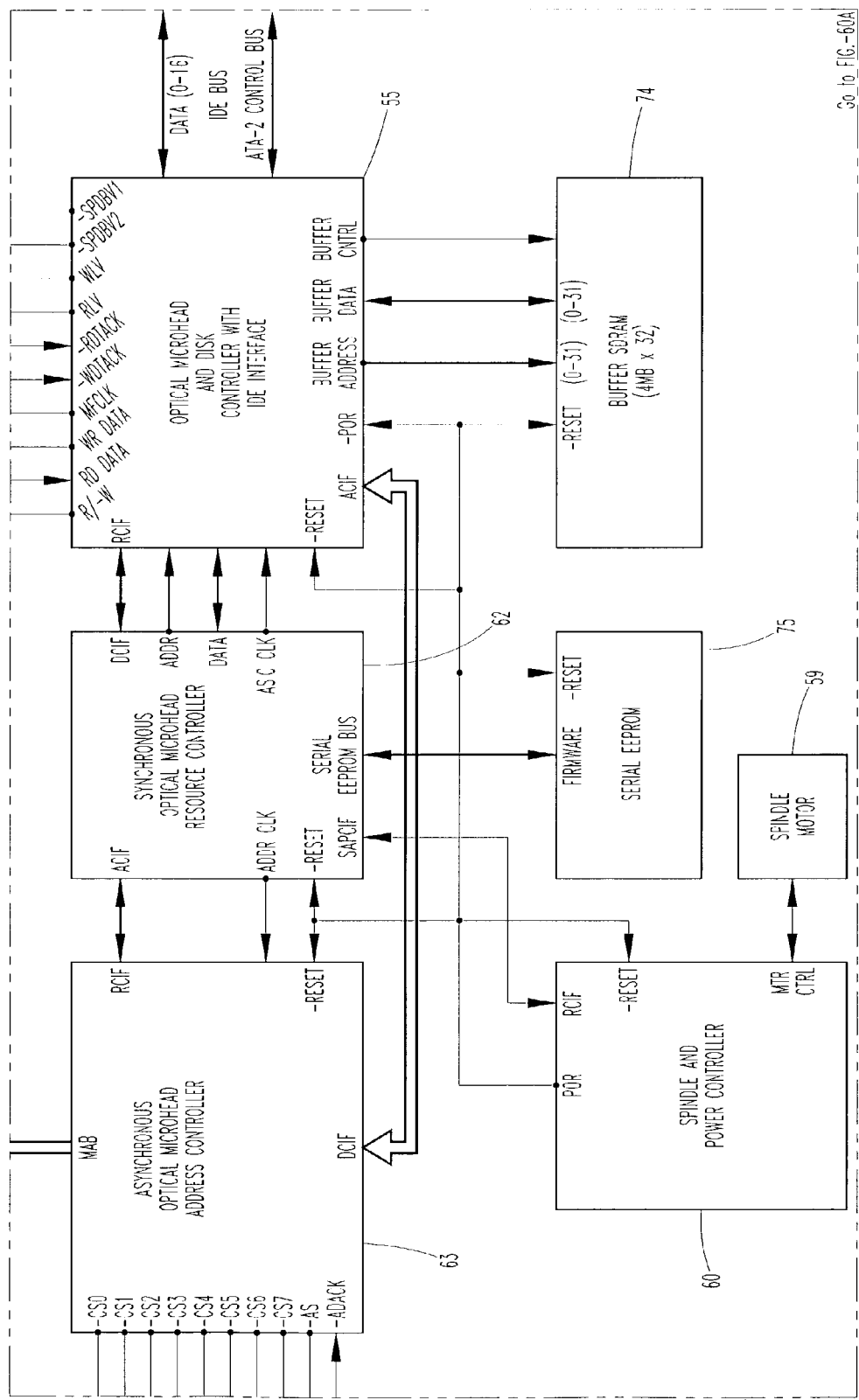
Figure 61B:
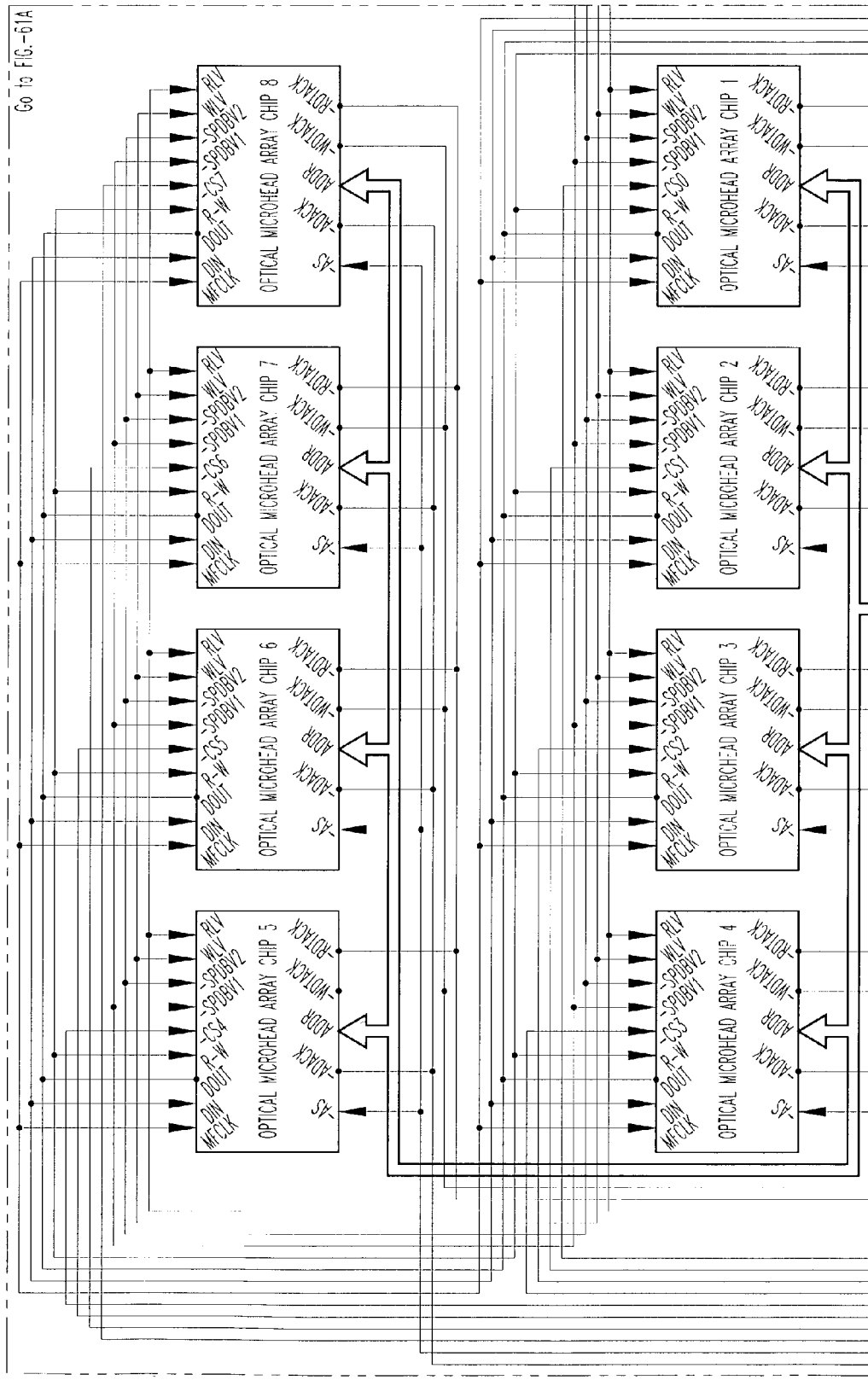
FIG. 61B is an enlarged block-diagram drawing of the SCSI Disk Controller used in the Phase-Change Microhead Array Chip Hard Disk Drive design, which displays an enlarged block-diagram showing details of the block-diagram illustrated in FIG. 61A.

Furthermore, the integration that occurs between a microhead-array of a Phase-Change Microhead Array Chip and its internal circuitry significantly improves the 'signal-to-noise' ratio of output-signals being created by the Phase-Change Microhead Array Chips. Moreover, as illustrated in FIGS. 60A, 60B, and 60C, the encoded data-stream signals created within a Phase-Change Microhead Array Chip's read-channel (FIGS. 64A and 64C) is transported through shared data-bus system lines to a Phase-Change Microhead Array Chip Hard Disk Drive Disk Controller's 'Data-Sequencer' for signal processing. Block-diagrams, as illustrated in FIGS. 60A, 60B, and 60C, are used to represent a IDE bus design, while the block-diagrams, as illustrated in FIGS. 61A, 61B, and 61C, are used to represent a SCSI bus design; moreover, illustrations that display a Phase-Change Microhead Array Chip Hard Disk Drive's connectivity between Phase-Change Microhead Array Chips, a Phase-Change Microhead Array Chip Hard Disk Drive's Disk Controller, and the Disk Controller's 53 (FIGS. 4, 5, and 81) four main VLSI microprocessors.

Furthermore, a first microprocessor, which is called a 'Synchronous Optical Microhead Resource Controller' 62 (FIG.

4) is presented here in two interface formats: an IDE bus design 62 (FIG. 4), and a SCSI bus design 78 (FIG. 5). Both designs as presented here provide, while under program control, local microprocessor services to a Phase-Change Microhead Array Chip Hard Disk Drive's other PCB electronics.

Furthermore, as presented, both Synchronous Optical Microhead Resource Controller designs 62 (FIG. 4), 78 (FIG. 5) will also manage the various resources of a Phase-Change Microhead Array Chip Hard Disk Drive's other PCB electronic-units. A Disk Controller's other PCB electronic-units include an 'Optical Microhead And Disk Controller With IDE or SCSI Interface' 55 (FIG. 4), 87 (FIG. 5), a 'Spindle And Power Controller' 60 (FIG. 4), 82 (FIG. 5), an 'Asynchronous Optical Microhead Address Controller' 63 (FIG. 4), 80 (FIG. 5), a 'Serial EEPROM' 75 (FIG. 4), 89 (FIG. 5), and a 'SDRAM Buffer' 74 (FIG. 4), 88 (FIG. 5).

In addition, the previously mentioned 'Synchronous Optical Microhead Resource Controllers' 62 (FIG. 4), 78 (FIG. 5) will also communicate serially with a 'Serial EEPROM' firmware chip 75 (FIG. 4), 89 (FIG. 5), which contains operational program code used by a Phase-Change Microhead Array Chip Hard Disk Drive to conduct various disk and data I/O operations. Primarily, the Synchronous Optical Microhead Resource Controllers will execute the previously mentioned program code to complete hard disk drive power-on-resets, spin-ups, and re-calibration procedures. In addition, the before mentioned Synchronous Optical Microhead Resource Controllers 62, 78 (FIGS. 4, 5, 60A, 60C, 61A, 61C, 62A, 62C, 63A, and 63C), will also, during a Phase-Change Microhead Array Chip Hard Disk Drive's normal operation 74 (FIG. 4), 88 (FIG. 5), read additional operational control code from a disk-platter data-surface and store it in a Disk Controller's memory buffer, which is comprised of "Synchronous Dynamic Random Access Memory" (SDRAM).

Furthermore, the previously mentioned operational control code is typically called "Operational Code" (Opcode) and is used in much the same way as a host-computer's microprocessor might use a host-computer's disk-stored "Operation System" (OS) software to execute system wide operations. Moreover, the Synchronous Optical Microhead Resource Controllers 62, 78, which are used in both PCB interface designs will run as synchronous devices on their Disk Controller's PCB 55 (FIG. 4), 87 (FIG. 5). In addition, the Serial EEPROMs 75 (FIG. 4), 89 (FIG. 5), used in both PCB interface designs, will also run as synchronous devices, along with a Disk Controller's SDRAM 74 (FIG. 4), 88 (FIG. 5) memory buffer's addressing control, data I/O busing control, and control-bus operating control.

Moreover, the Optical Microhead And Disk Controller With IDE or SCSI Interfaces 55 (FIG. 4), 87 (FIG. 5) will provide control-functions to the Phase-Change Microhead Array Chip Hard Disk Drive s under the direction of their Synchronous Optical Microhead Resource Controllers 62 (FIG. 4), 78 (FIG. 5). The 'Optical Microhead And Disk Controller With IDE Interface' bus design (FIG. 4) has a block-diagram that illustrates the various component modules it uses, while displaying their connectivity (FIGS. 62A, 62B, and 62C), as well.

In addition, the 'Optical Microhead And Disk Controller With SCSI Interface' bus design (FIG. 5) also has a block-diagram that illustrates the various component modules it uses, while displaying their connectivity (FIGS. 63A, 63B, and 63C). The previously mentioned block-diagrams also illustrate how each of a Disk Controller's microprocessor modules interconnect and communicate with one another to form and facilitate a Phase-Change Microhead Array Chip Hard Disk Drive's control system.

Furthermore, a Optical Microhead And Disk Controller With IDE bus design (FIG. 4) has an "Error Correction Control" (ECC) system built into its 'Optical Microhead And Disk Controller With IDE Interface' 55 (FIGS. 4, 62A, 62B, and 62C). In addition, the Optical Microhead And Disk Controller With SCSI bus design (FIG. 5) also has an ECC built into its 'Optical Microhead And Disk Controller With SCSI Interface' 87 (FIGS. 5, 63A, 63B, and 63C), as well. The Error Correction Codes executed during host-requested read-data or write-data disk-operations are used by both previously mentioned Disk Controllers (FIGS. 4 and 5), and are based upon a Reed-Solomon encoder/decoder circuit's calculated error results.

Furthermore, the previously mentioned Optical Microhead And Disk Controller With IDE bus design (FIG. 4) has a 'Data Sequencer' (i.e., sometimes called a Data-Formatter) built into its 'Optical Microhead And Disk Controller With IDE Interface' 55 (FIGS. 4, 62A, 62B, and 62C). In addition, the Optical Microhead And Disk Controller With SCSI bus design (FIG. 5) also has a 'Data Sequencer' (i.e., sometimes called a Data-Formatter) built into its 'Optical Microhead And Disk Controller With SCSI Interface' 87 (FIGS. 5, 63A, 63B, and 63C), as well. The previously mentioned 'Data Sequencer' as illustrated in FIGS. 62A, 63A, 62B, 63B, 62C, and 63C is used in both IDE and SCSI interfaces to control the operation of the read and the write-channels of a Phase-Change Microhead Array Chip Hard Disk Drive's Disk Controller 55 (FIG. 4), 87 (FIG. 5).

In addition, to initiate a host-requested disk-operation a 'Synchronous Optical Microhead Resource Controller' 62, 78 (FIGS. 4, 5, 62A, 63A, 62C, and 63C) will load a set of commands into a 'Writable Control Store Register', where the loading and manipulation of this register is done through a Synchronous Optical Microhead Resource Controller's 'Interface Registers'.

Moreover, as illustrated in FIGS. 60A, 60B, 60C, 61A, 61B, and 61C, a Disk Controller's 'Data Sequencer', as illustrated in FIGS. 62A, 63A, 62C, and 63C, directly controls a "Read and Write Enable" (R/–W) output line, a "Read Data Acknowledge" (–RDTACK) input line, a "Write Data Acknowledge" (–WDTACK) input line, a "Multiple Frequency Clock" (MF CLK) output line, a "Data Read" (DATA RD) input line, a "Data Write" (DATA WR) output line, a "SPD Bias Voltage One" (SPDBV1) output line, a "SPD Bias Voltage Two" (SPDBV2) output line, a "Write Laser Voltage" (WLV) output line, a "Read Laser Voltage" (RLV) output line, and a "System Clock" (SYSCLK) input line.

Furthermore, during host-requested read-data disk-operations a particular data-zone, which is located on a particular disk-platter's data-surface, will need to have its data-sectors, containing host requested data, to be read. Moreover, to accomplish this read-data disk-operation a Disk Controller's 'Data Sequencer' (FIGS. 62A, 63A, 62B, 63B, 62C, and 63C) will use a 'Data Transfer Rate Frequency Analyzer' circuit to calculate a data-transfer frequency-rate for that particular data-zone. Next, a Data Sequencer's 'Multi-Frequency Clock Synthesizer' circuit will commute the previously calculated data-transfer frequency-rate to a "Voltage-Controlled Oscillator" (VCO) circuit located within a Data Sequencer's "Digital Phased-Locked Loop" (DPLL) circuit. Wherein, the previously mentioned DPLL circuit will transmit, after receiving the previously mentioned data-transfer frequency-rate calculation, a "Divided Clock" (DCLOCK) signal to a "Multi-Frequency Clock" (MF CLK) input-connection of a singularly selected Phase-Change Microhead Array Chip, which is positioned above that particular disk-platter's data-zone containing the previously mentioned host-requested data-sectors needing to be read.

Contradictory, during host-requested write-data disk-operations a particular data-zone, which is located on a particular Phase-Change disk-platter's data-surface, will need to have its host requested data-sectors written to. Therefore, a Disk Controller's 'Data Sequencer', illustrated by FIGS. 62A, 63A, 62B, 63B, 62C, and 63C, will also need to perform a data-encoding of data, which is transmitted from the Disk Controller, over a system-bus's write-data line, to a "Data In" (DIN) input of a singularly selected Phase-Change Microhead Array Chip, which is positioned above that particular diskplatter's data-zone containing the previously mentioned host-requested data-sectors to be written too.

Moreover, to accomplish the previously mentioned write-data disk-operation a 'Write Driver Circuit' (FIGS. 64A, 75, 65A, and 65C) will execute data-modulated current amplitudes within a Phase-Change Microhead Array Chip's selected laser-diode microhead when it receives incoming data-streams of encoded data, which are first encoded, then sent, by a Disk Controller's 'Data Sequencer', illustrated by FIGS. 62A, 63A, 62B, 63B, 62C, and 63C, through a shared data-bus line connected to all Phase-Change Microhead Array Chips that are installed into a Phase-Change Microhead Array Chip Hard Disk Drive's unit-assembly.

Furthermore, an Optical Microhead And Disk Controller With IDE Interface processor (FIG. 4) has a 'Buffer Controller' built into its 'Optical Microhead And Disk Controller With IDE Interface' 55 (FIGS. 4, 62A, 62B, and 62C). In addition, an Optical Microhead And Disk Controller With SCSI Interface processor (FIG. 5), also has a 'Buffer Controller' built into its 'Optical Microhead And Disk Controller With SCSI Interface' 87 (FIGS. 5, 63A, 63B, and 63B). Moreover, the previously mentioned 'Buffer Controller', illustrated by FIGS. 62A, 63A, 62B, 63B, 62C, and 63C, will support a '4-Mbyte SDRAM' buffer-cache. Moreover, a 32-bit wide implementation of this 'buffer-cache' provides a "120" MB/s of maximum buffer bandwidth to a Phase-Change Microhead Array Chip Hard Disk Drive's I/O systems. Consequently, this increase in bandwidth will allow a 'Synchronous Optical Microhead Resource Controller' to have direct access to the buffer itself, eliminating the need for a separate buffer SDRAM resource controller. Moreover, a Disk Controller's 'Buffer Controller', illustrated by FIGS. 62A, 63A, 62B, 63B, 62C, and 63C, and operates under the direction of a Disk Controller's 'Synchronous Optical Microhead Resource Controller'.

In addition, an Optical Microhead And Disk Controller With IDE Interface processor 55 (FIGS. 4, 62A, 62B, and 62C) will have a 'Resource Controller Interface' built into its 'Optical Microhead And Disk Controller With IDE Interface' 55 (FIG. 4). In addition, an Optical Microhead And Disk Controller With SCSI Interface 87 (FIGS. 5, 63A, 63B, and 63C) will also have a 'Resource Controller Interface' built into its Optical Microhead And Disk Controller With SCSI Interface 87 (FIG. 5). The previously mentioned 'Resource Controller Interface', illustrated by FIGS. 62A, 63A, 62B, 63B, 62C, and 63C, for both interface designs, will provide the means for the Synchronous Optical Microhead Resource Controllers to read and write "Operational Code" (Opcode) and user data to a Disk Controller's various microprocessor modules; either to control their operations, or to supply them with needed system information.

In addition, the 'Resource Controller Interface', as illustrated in FIGS. 62A, 63A, 62B, 63B, 62C, and 63C, consists of both physical and logical components. The physical components of the interface comprise a 32-bit Address-bus, a 32-bit Data-bus, a "Read Strobe" (RD STROBE) control line, a "Write Strobe" (WR STROBE) control line, an (ALE) "Address Latch Enable" control line, and a "Wait" (WAIT) control line. While, the logical components of the previously mentioned 'Resource Controller Interface', as illustrated in FIGS. 62A, 63A, 62B, 63B, 62C, and 63C, comprise 'Internal Control Registers' and 'Data Registers', which are both accessible to the before mentioned Disk Controller's 'Synchronous Optical Microhead Resource Controller'. Further, by writing to and reading from the previously mentioned logical registers, a Disk Controller's 'Synchronous Optical Microhead Resource Controller' can control and configure a Disk Controller's 'Buffer Controller' and a Disk Controller's 'Data Sequencer', as well.

In addition, an Optical Microhead And Disk Controller With IDE Interface microprocessor 55 (FIGS. 4, 62A, 62B, and 62C) has a 'Serial Interface' built into its Optical Microhead And Disk Controller With IDE Interface 55 (FIG. 4). In addition, an Optical Microhead And Disk Controller With IDE Interface microprocessor 55 (FIGS. 4, 62A, 62B, and 62C) has a 'Serial Interface' built into its Synchronous Optical Microhead Resource Controller 62 (FIG. 4). In addition, an Optical Microhead And Disk Controller With SCSI Interface microprocessor 87 (FIGS. 5, 63A, 63B, and 63C) has a 'Serial Interface' built into its Optical Microhead And Disk Controller With SCSI Interface 87 (FIG. 5). In addition, an Optical Microhead And Disk Controller With SCSI Interface microprocessor 87 (FIGS. 5, 63A, 63B, and 63C) has a 'Serial Interface' built into its 'Synchronous Optical Microhead Resource Controller' 78 (FIG. 5). The two Serial Interfaces, as illustrated in FIGS. 62A, 63A, 62B, 63B, 62C, and 63C, will provide a high-speed pathway for firmware operational control-code and data-streams. Wherein, the previously mentioned firmware's operational control-code and data-streams are transferred from a Serial EEPROM component 75 (FIGS. 4, 5, and 89) to its Disk Controller 55 (FIG. 4), 87 (FIG. 5), through an executed control of its system's Synchronous Optical Microhead Resource Controller 62 (FIG. 4), 78 (FIG. 5).

In addition, an Optical Microhead And Disk Controller With IDE Interface processor 55 (FIG. 4), (FIG. 62A), (FIG. 62B), (FIG. 62C) has a 'IDE Interface Controller' built right into its 'Optical Microhead And Disk Controller With IDE Interface' 55 (FIGS. 4, 62A, 62B, and 62C). Additionally, an Optical Microhead And Disk Controller With SCSI Interface microprocessor 87 (FIGS. 5, 63A, 63B, and 63C) has a 'SCSI Interface Controller' built right into its 'Optical Microhead And Disk Controller With SCSI Interface' 87 (FIG. 5). The previously mentioned IDE & SCSI Interface Controllers, as illustrated in FIGS. 62A, 63A, 62B, 63B, 62C, and 63C, provide the data handling, the bus control, and the transfer management services to and from an IDE or SCSI interface. The 'Synchronous Optical Microhead Resource Controller' in both IDE & SCSI Disk Controller designs executes the configuration and control of an IDE or SCSI interface across a 32-bit address-bus and 32-bit data-bus, while a Disk Controller's 'Buffer Controller' module, as illustrated in FIGS. 4 and 5, controls all data-transfer operations within the before mentioned Disk Controller.

In addition, for the IDE hard disk drive design, interfacing with a host-system is done through a 40-pin IDE interface-connector 52 (FIGS. 4, 62A, 62B, and 62C). Further, the IDE Disk Controller's 55 (FIG. 4) IDE Interface Controller module, as illustrated in FIGS. 62A, 62B, and 62C, implements the IDE interface-logic, while operating under a Resource Controller's processor control. The IDE Disk Controller will receive and transmit words of data over the IDE bus. The IDE Disk Controller's Buffer Controller writes data to or reads data from the SDRAM buffer cache over thirty-two data lines. Furthermore, while under the Resource Controller's direction the IDE Disk Controller 55 (FIG. 4) controls the transfer of data and handles the addressing of the Phase-Change Microhead Array Chip Hard Disk Drive's cache. Moreover, the internal data transfer-rate to and from the Phase-Change Microhead Array Chip Hard Disk Drive's cache will be at "66.66" MB/s. Additionally, these high-speed transfer-rates will allow the IDE Disk Controller to communicate over the IDE interface at a PIO data transfer-rate of "13.34" MB/s without using "I/O Ready" (IOREADY), at a PIO data transfer-rate up to "33.34" MB/s using "I/O Ready" (IOREADY), or at a DMA transfer-rate of "66.66" MB/s using Ultra DMA. Further, the IDE Disk Controller simultaneously controls disk-to-buffer RAM transfers and microcontroller access to control-code stored in the buffer SDRAM's 74 (FIG. 4) memory during data transference across the IDE Interface.

In addition, for the SCSI hard disk drive design, interfacing with a host-system is done through a 50-pin SCSI interface-connector 83 (FIGS. 5, 63A, 63B, and 63C). Further, the SCSI Disk Controller's 87 (FIG. 5) SCSI Interface Controller module, as illustrated in FIGS. 63A, 63B, and 63C, implements the SCSI interface logic, while operating under a Resource Controller's processor control. Further, the SCSI Disk Controller will receive and transmit bytes of data over the SCSI bus. The SCSI Disk Controller's Buffer Controller writes data to or reads data from the SDRAM buffer cache over thirty-two data lines. Further, while under the Resource Controller's direction the SCSI Disk Controller 87 (FIG. 5) controls the transfer of data and handles the addressing of the Phase-Change Microhead Array Chip Hard Disk Drive's cache. Moreover, the internal data transfer rate to and from the Phase-Change Microhead Array Chip Hard Disk Drive's cache is "64" MB/s. This high-speed transfer-rate will allow the SCSI Disk Controller to communicate over the SCSI interface at an asynchronous data transfer-rate of "12" MB/s, or at a synchronous transfer-rate of up to "40" MB/s.

In addition, the SCSI Disk Controller simultaneously controls disk-to-buffer RAM transfers and microcontroller access to control-code stored in the buffer SDRAM's 88 (FIG. 5) memory during data transference across the SCSI Interface. Additionally, the Phase-Change Microhead Array Chip Hard Disk Drive design uses a serial connected and code containing Firmware chip, which is comprised of a "Flash EEPROM" chip that contains "Operational Code" (Opcode) 75 (FIGS. 4, 62A, and 62C) 89 (FIGS. 5, 63A, and 63C). The Firmware chip is connected to a Phase-Change Microhead Array Chip Hard Disk Drive's Resource Controller through a high-speed serial connection. Further, this device is programmable and controls various features like disk caching, track skewing, cylinder skewing, error detection, and error correction.

In addition, caching for the Phase-Change Microhead Array Chip Hard Disk Drive s will enhance hard disk drive performance and significantly improve system throughput. Further, through a dynamic caching scheme, like the one featured in the Phase-Change Microhead Array Chip Hard Disk Drive design, will make better use of the buffer SDRAM's memory areas 74 (FIGS. 4 and 62C) 88 (FIGS. 5 and 63C). Moreover, with this dynamic caching feature, the buffer's memory space used during a read-data or write-data disk-operation will be dynamically allocated and controlled. In addition, the cache will be flexibly divided into several memory segments under program control with each memory segment containing one cache-entry. Furthermore, a cache-entry will consist of the requested read-data, plus its corresponding prefetch-data.

Consequently, dynamic segmentation will allow Phase-Change Microhead Array Chip Hard Disk Drives to make optimum use of their cache memory buffers. Moreover, by allowing the amount of stored data to be increased or decreased, which ever is required; dynamically the 'dynamic-cache' of Phase-Change Microhead Array Chip Hard Disk Drives will anticipate host-system requests for data and store that data for faster access. Further, when the host-system requests a particular segment of data the Phase-Change Microhead Array Chip Hard Disk Drive s' dynamic caching feature will use a prefetch strategy. Moreover, a prefetch strategy that looks ahead and automatically stores the subsequent data from a disk-platter's data-surface into a high-speed buffer contained within the SDRAM memory area of the Phase-Change Microhead Array Chip Hard Disk Drive.

Moreover, since 50% or more of all hard disk drive host-requested data-reads are sequential, the host-system, more likely will request the previously cached subsequent-data from the SDRAM 74, 88 (FIGS. 4, 5, 62C, and 63C) memory buffer rather than from a particular Phase-Change Microhead Array Chip Hard Disk Drive's disk-platter data-surface sector-area. Moreover, the subsequent-data, being dynamically stored in high-speed cache, will be retrieved for use in microseconds, rather than in milliseconds. Consequently, the previously mentioned process of 'Dynamic Caching' can provide substantial timesaving, during at least half of all hard disk drive data requests. Therefore, the use of 'Dynamic Caching' will save most of the transaction time occurring for a Phase-Change Microhead Array Chip Hard Disk Drive by eliminating the 'rotational latency delays' that dominate a typical disk transaction. In addition, the before mentioned process of 'Dynamic Caching' also works by continuing to fill its memory areas with adjacent data, while transferring any data requested by the host-system. Further, unlike a non-caching Disk Controller, a Disk Controller used in a Phase-Change Microhead Array Chip Hard Disk Drive's design will continue on with further read operations after the requested-data has been transferred to the host-system, via the I/O interface. However, the previously mentioned read operations would terminate after a programmed amount of subsequent-data had been read into a dynamic memory-segment of the before mentioned buffer cache.

In addition, the cache memory will consist of SDRAM 74 (FIGS. 4 and 62C), 88 (FIGS. 5 and 63C), which is allocated to hold data. Moreover, data that can be directly accessed by the host-system, by means of the "Read Data" (RDDATA) and the "Write Data" (WRDATA) commands. Further, the buffer cache memory will function as a group of segments with rollover points at the end of each segment. Additionally, the unit of data stored will be a logical block (i.e., a multiple of a 512-byte sector). Therefore, all access to the buffer cache memory must be in multiples of "512" byte size sectors. Furthermore, when a "Write Data" (WRDATA) command is executed Phase-Change Microhead Array Chip Hard Disk Drives will store the data to be written in a SDRAM cache buffer 74 (FIGS. 4 and 62C), 88 (FIGS. 5 and 63C). In addition, the Buffer Controller will immediately send a "Good Data" (GDDATA) status-message to the host-system before the data can actually be written to a disk-platter's data-surface. The host-system will then be free to move on to other tasks, such as preparing data for the next data-transfer, without having to wait for the Phase-Change Microhead Array Chip Hard Disk Drive to switch to a different microhead located above the appropriate track, or rotate the disk-platters to the specified sector.

Furthermore, while the host-system is preparing data for the next data-transfer, the Phase-Change Microhead Array Chip Hard Disk Drive will immediately write the cached data to a disk-platter's data-sector. This will usually complete the write-operation in less than 20.0-ms after issuing the "Good Data" (GDDATA) status-message. Moreover, when writing to the cache, a single-block random write, for example, would require only 3.0-ms of host-system processing time to execute. Therefore, without the Disk Controller's ability to write to the cache, the same write-operation would have occupied the host-system for about 20.0-ms.

In addition, writing to cache memory dynamically will allow data to be transferred to a Phase-Change Microhead Array Chip Hard Disk Drive in a continuous flow, rather than as individual blocks of data separated by hard disk drive access delays. This is achieved by taking advantage of a Phase-Change Microhead Array Chip Hard Disk Drive's ability to write blocks of data sequentially to a Phase-Change Microhead Array Chip Hard Disk Drive with data-surfaces that where formatted with a '1:1 hard drive interleave'. This means that as the last byte of data is transferred out of the write-cache and the selected laser-diode microhead passes over the next sector of a diskplatter's data-sector the first byte of the next data-block will be transferred, causing no interruption, or delay in the data-transfer process. The write to cache algorithm fills the cache buffer with new data from the host-system, while simultaneously transferring any data that the host-system had previously stored in the cache to the Phase-Change Microhead Array Chip Hard Disk Drive.

Furthermore, a Phase-Change Microhead Array Chip Hard Disk Drive without some kind of cache optimization would suffer just as a conventional hard disk drive would from the delays during sequential reads, which occur simply because all hard disk drives exhibit a 'rotational latency' even if the selected microhead within that same Phase-Change Microhead Array Chip's microhead-array were above the desired data-track to be read 'rotational latency' would still be a problem. Therefore, cache optimization is used to eliminate a Phase-Change Microhead Array Chip Hard Disk Drive's rotational latency time (i.e., the average rotational latency period is 7.50-ms) when the requested data resides in the cache.

However, the hard disk drives of today must often service requests from multiple processes in a multitasking or multi-user environment. Further, in these instances, while each process might request-data sequentially, a hard disk drive must time-share among all these processes. Moreover, in conventional hard disk drive designs, the data-heads must move from one-track location to another. Therefore, with cache optimization, even if another process interrupts, the hard disk drive will continue to access the data sequentially from its high-speed cache memory. Therefore, in handling multiple processes, and when the desired data resides in the cache, cache memory optimization will achieve its most impressive performance gains, saving on both seek and latency times.

Furthermore, the cache can be flexibly divided into several memory-segments, under program control, with each memory-segment containing one cache-entry. Moreover, a cache-entry would consist of requested read-data along with any corresponding prefetch-data. The requested read-data will take up a certain amount of space in the cache-segment so the corresponding prefetch-data can essentially occupy the rest of the available space within that memory-segment. Other factors determining prefetch size are the maximum and minimum prefetch settings present in a Disk Controller's circuit design. Furthermore, the Phase-Change Microhead Array Chip Hard Disk Drive's prefetch algorithm will dynamically control the actual prefetch value based on the current demands, with consideration for overhead to subsequent commands.

Another Firmware feature incorporated into a Phase-Change Microhead Array Chip Hard Disk Drive's Phase-Change Microhead Array Chips is 'Track Skewing'. Track Skewing reduces the latency time that results from a hard disk drive's switching of a read or write data-head to access sequential data. Moreover, a track skew is employed in such a way that the next logical sector of data to be accessed will be under the read or write microhead once the microhead switch has been made and that same data is ready to be accessed. In addition, when sequential-data is on the same cylinder, but on a different disk-surface, a microhead switch would also need to be executed. Since sequential microhead switching times are well defined within the Phase-Change Microhead Array Chip Hard Disk Drive design, the sector being addressed can be optimally positioned across track-boundaries to minimize any latency time accrued during Phase-Change Microhead Array Chip's microhead switching.

Another Firmware feature incorporated into Phase-Change Microhead Array Chip Hard Disk Drive design is 'Cylinder Skewing'. Cylinder Skewing is also used to help minimize the latency time associated with 'single-cylinder seeks'. A cylinder skew is employed in such a way that the next logical sector of data that crosses a cylinder boundary will be positioned on the hard drive's disk-platter, after a single-cylinder seek is performed. Moreover, when a Phase-Change Microhead Array Chip Hard Disk Drive is ready to continue accessing data, the sector to be accessed will be positioned directly under the addressed read or write microhead. Therefore, the cylinder skew can take place between the last-sector of data of a cylinder and the first-sector of data of the hard drive disk-platter's next cylinder.

In addition, the Phase-Change Microhead Array Chip Hard Disk Drives will also incorporate an 'ID-less Format' for tracking sector locations across its data-surfaces. Moreover, the ID-Less Format has several advantages over the traditional 'ID After Wedge' or 'ID Before Sector' methods of sector tracking. For example, the lack of an 'ID field' written to hard drive disk-platter data-surfaces will regain approximately 4% of the data-surface real-estate present within the Phase-Change Microhead Array Chip Hard Disk Drive's unit-assembly. Further, since no ID's have to be read or corrected in case of an error, the drives overall throughput is also increased. In ID-Less Formatting of data-sectors, the ID of each sector is not written onto a disk-platter's data-surface, instead it is stored in a SDRAM's 74 (FIGS. 4 and 62C) 88 (FIGS. 5 and 63C) buffer memory area, which is called the 'Descriptor'.

In addition, each data-sector will have an associated Descriptor containing the rotational start-time for each sector's disk location. Subsequently, the Descriptor does not have any defect information stored within its memory areas. Phase-Change Microhead Array Chip Hard Disk Drive s will also store a 'Defect Map' within the hard disk drive's SDRAM's 74 (FIGS. 4 and 62C) 88 (FIGS. 5 and 63C) buffer memory, but in a separate memory-location away from the Descriptor. Subsequently, for the Phase-Change Microhead Array Chip Hard Disk Drive design the Sequencer section of the Disk Controller will have access to both the Descriptor and the Defect Map listings through requests made to the buffer-block within the Disk Controller. Therefore, only 'end user data' and ECC information are actually written to the Phase-Change Microhead Array Chip Hard Disk Drive's disk-platter data-surfaces.

In addition, error detection and correction for the Phase-Change Microhead Array Chip Hard Disk Drive design will become a concern as the Phase-Change Microhead Array Chip Hard Disk Drive's areal densities continue to increase. Moreover, the obtaining of extremely low error-rates will require sophisticated "Error Correction Codes" (ECC). Further, Phase-Change Microhead Array Chip Hard Disk Drives will implement a Reed-Solomon error correction technique to reduce the uncorrectable read-error rates of any data-bits being read. Therefore, when errors do occur, an automatic retry, a double-burst, and a more rigorous triple-burst correction algorithm will enable the correction of any data-sector with three-bursts of four incorrect-bytes each. Before invoking, the complex triple-burst ECC algorithm the Phase-Change Microhead Array Chip Hard Disk Drive design will always try to recover from an error by attempting to re-read the data correctly.

Furthermore, this strategy prevents the invoking of correction, on non-repeatable errors. Moreover, each time a data-sector in error is re-read, a set of ECC syndromes has to be computed, and this is a very wasteful use of processing time. Therefore, if the entire syndrome-values equal zero, the data was read with no errors, and the data-sector is next transferred to the host-system. However, if any of the syndrome-values do not equal zero an error has occurred, the syndrome-values are retained, and another re-read is invoked. Non-repeatable errors are usually related to the signal-to-noise ratio of the system and are not due to media-defects.

Furthermore, when sets of syndromes from two consecutive re-reads are the same, a stable-syndrome has been achieved. This event may be significant depending on whether or not the automatic read-reallocation or early-correction features have been enabled within the Phase-Change Microhead Array Chip Hard Disk Drive. Additionally, if an early correction feature has been enabled and a stable-syndrome has been achieved, triple-burst ECC correction is applied, and the appropriate message will be transferred to the host-system (e.g., corrected data, etc.). The ECC bit will enable early ECC triple-burst correction if a stable-syndrome has been achieved before all of the rereads have been exhausted. Therefore, if the automatic read-reallocation feature is enabled, the drive, when encountering triple-burst errors, will attempt to re-read the data. Further, Phase-Change Microhead Array Chip Hard Disk Drive s will be equipped with an automatic read-reallocation feature, so any new defective data-sectors can be easily and automatically reallocated for the end-user.

In addition, to accommodate inline-sparing of defective sectors Phase-Change Microhead Array Chip Hard Disk Drives will allocate thousands of extra data-sectors to the end of its physical data storage area. While in the factory, the media will be scanned for defects, and if a data-sector is found defective, the address of the defective data-sector is added to Phase-Change Microhead Array Chip Hard Disk Drive's Defect Map listing. Data sectors located physically after the defective data-sector moreover will be assigned logical block addresses, so that a sequential ordering of logical blocks can be maintained. The inline-sparing technique will be maintained in an attempt to eliminate any slow data-transfers, which result from a single defective data-sector on a cylinder. Subsequently, all factory defective data-sectors will be inline-spared, but if a defective data-sector is found in the field, inline-sparing will not be performed on those sectors. Instead, the data-sector will be reallocated to an available spare-sector on a nearby cylinder, while its previous sector location is marked as being bad.

Another preferred embodiment of the present invention, as illustrated in FIGS. 7, 11, 13, 27, and 28, defines chip configurations for a 'Bottom Data-Surface Phase-Change Microhead Array Chip', and a 'Top Data-Surface Phase-Change Microhead Array Chip', where each Phase-Change Microhead Array Chip has a different surface mounting circuit-contact pin-out arrangement. The illustrations in drawing FIGS. 7, 11, 13, 27, and 28 display a Bottom Data-Surface Phase-Change Microhead Array Chip's circuit-contact pin-out arrangements, while the illustrations in drawing FIGS. 8, 12, 14, 25, and 26 display a Top Data-Surface Phase-Change Microhead Array Chip's circuit-contact pin-out arrangements. Further, illustrations in FIGS. 7, 11, 13, 27, 28, 8, 12, 14, 25, and 26 show how the bus-system and bus-system cables are connected and used in the Phase-Change Microhead Array Chip Hard Disk Drive, while defining why there needs to be two different Phase-Change Microhead Array Chip circuit-contact pin-out arrangements.

Moreover, when a Bottom Data-Surface Phase-Change Microhead Array Chip 6 is used in a Phase-Change Microhead Array Chip Hard Disk Drive (FIGS. 7 and 28) it is installed into a chip-positioning circuit board with its laser-diode microhead-array facing upward toward the observer, if the observer is looking down into a plan view of the chip through the Cartesian Y-axis. Moreover, when installed, a Bottom Data-Surface Phase-Change Microhead Array Chip's 6 (FIGS. 7, 11, 13, and 28) pin-one designation dot should be located in the upper-left hand corner of the Phase-Change Microhead Array Chip's outer-package.

Alternatively, when a Top Data-Surface Phase-Change Microhead Array Chip 6 (FIGS. 8 and 25) is used in a Phase-Change Microhead Array Chip Hard Disk Drive it is installed into a chip-positioning circuit board with its laser-diode microhead-array facing downward away from an observer, if the observer is looking down into a plan view of the chip through the Cartesian Y-axis. Moreover, when installed a Top Data-Surface Phase-Change Microhead Array Chip's 6 (FIGS. 8, 12, 14, and 25) pin-one designation dot should also be located in the upper-left hand corner of the Phase-Change Microhead Array Chip's outer-package.

Furthermore, when Phase-Change Microhead Array Chips are installed into their chip-positioning circuit boards, and their chip-positioning circuit boards are installed into a Phase-Change Microhead Array Chip Hard Disk Drive's casting-base, there will ultimately be one Phase-Change Microhead Array Chip that is positioned for and facing each data-surface of every disk-platter installed into a Phase-Change Microhead Array Chip Hard Disk Drive's unit-assembly. The arrangement described above is how both Phase-Change Microhead Array Chip designs will align with each other when installed into a Phase-Change Microhead Array Chip Hard Disk Drive's unit-assembly. Additionally, when installed into a Phase-Change Microhead Array Chip Hard Disk Drive's unit-assembly, there should be at-least two laser-diode microhead-arrays facing each other (FIGS. 9 and 10) with at-least one disk-platter 13 (FIGS. 1, 2, and 3) positioned between them. The Phase-Change Microhead Array Chips are orientated as if each installed Phase-Change Microhead Array Chip were looking at a reflection of itself in a mirror. Further, the main reason for this approach is to simplify a Phase-Change Microhead Array Chip Hard Disk Drive's bus-system design, and to create a simple form of connectivity and construction for a Phase-Change Microhead Array Chip Hard Disk Drive's unit-assembly.

Another embodiment of the present invention, as illustrated in drawing FIGS. 1, 6, 9, 10, and 15, shows Polymer flex-cable connectors 34, 67 (FIGS. 1, 6, 9, and 10) and their associated Polymer flex-cables 36 (FIGS. 1, 6, 10, and 15), which are located, when looking down into a plan view illustration of a Phase-Change Microhead Array Chip Hard Disk Drive's unit-assembly, on both the right-hand side and left-hand side of the before mentioned Phase-Change Microhead Array Chip Hard Disk Drive's chip-positioning circuit boards. The previously mentioned Polymer flex-cable connectors and Polymer flex-cables, if installed on the right-hand side of a Phase-Change Microhead Array Chip Hard Disk Drive's unit-assembly are dedicated to the Power, the Ground, the Data I/O, and the Control bus-systems that are used in a Phase-Change Microhead Array Chip Hard Disk Drive.

Furthermore, the previously mentioned Polymer flex-cables 36 (FIGS. 1, 6, 10, and 15) and their associated Polymer flex-cable connectors 34, 67 (FIGS. 1, 6, 9, and 10), which are located on the right-hand side of a Phase-Change Microhead Array Chip Hard Disk Drive's unit-assembly (FIG. 117), create multiple circuit connections between chip-connecting contact-points that are located on the right-hand side of installed Phase-Change Microhead Array Chips 7, 8 (FIGS. 7, 8, 26, and 27), and a Disk Controller's "Printed Circuit Board" (PCB). Moreover, the Disk Controller PCB used in Phase-Change Microhead Array Chip Hard Disk Drives is located underneath a Phase-Change Microhead Array Chip Hard Disk Drive's Spindle-Motor unit-assembly at the bottom of a Phase-Change Microhead Array Chip Hard Disk Drive's casting-base 12 (FIGS. 1, 2, and 3).

However, if the Polymer flex-cable connectors 40, 67 (FIGS. 1, 6, 9, and 10), and their associated Polymer flex-cables 38 (FIGS. 1, 6, 10, and 16), are installed on the left-hand side of a Phase-Change Microhead Array Chip Hard Disk Drive's unit-assembly, they are dedicated to the 32-bit Microhead-Addressing bus-systems of the Phase-Change Microhead Array Chip Hard Disk Drive. Further, the Polymer flex-cables 38 (FIGS. 1, 6, 10, 16), and their Polymer flex-cable connectors 40, 67 (FIGS. 1, 6, 9, and 10), which are located on the left-hand side of a Phase-Change Microhead Array Chip Hard Disk Drive's unit-assembly (FIG. 117), create multiple circuit connections between the chip-connecting contact-points that are located on the left-hand side of installed Phase-Change Microhead Array Chips 9, 10 (FIGS. 7, 8, 26, and 27), and a Disk Controller's PCB. Moreover, the Disk Controller PCB used in a Phase-Change Microhead Array Chip Hard Disk Drive is located underneath a Phase-Change Microhead Array Chip Hard Disk Drive's Spindle-Motor unit-assembly at the bottom of a Phase-Change Microhead Array Chip Hard Disk Drive's casting-base 12 (FIGS. 1, 2, and 3).

Another preferred first and basic embodiment of the present invention, as illustrated in drawing FIGS. 26 and 27, shows a 'Chip Placement Key' 11, which is located on the outer-package bottom-surface areas of Phase-Change Microhead Array Chips. Moreover, the previously mentioned 'Chip Placement Key' 11 (FIGS. 26 and 27), which is shaped like a triangle, and located at the bottom-center of every Phase-Change Microhead Array Chip's outer-package, when installed, will have its triangle-apex facing toward the front of its outer-package's top-edge surface, while facing a Phase-Change Microhead Array Chip Hard Disk Drive's front-end. Additionally, the 'Chip Placement Keys' used in the Phase-Change Microhead Array Chips protrude about "{fraction (1/16)}" of one inch out from underneath the bottom-center surface of a Phase-Change Microhead Array Chip's outer-package 11 (FIGS. 26 and 27). The sidewalls of the 'Chip Placement Keys' form 90° angles from the bottom-surface of its outer-structure. Additionally, the triangular-shaped 'Chip Placement Keys' 11 (FIGS. 26 and 27) will also have a corresponding and triangular-shaped 'Chip Placement Keyhole' 92 (FIGS. 30, 32, 35, and 37). Moreover, the previously mentioned 'Chip Placement Keyholes' are located at the top-surface of the bottom-inside center mounting-plane of every chip-positioning circuit board's surface-mounted chip-socket.

In addition, the previously mentioned 'Chip Placement Keyholes' 92 are also triangle-shaped and have a machined-out recess that measures "{fraction (1/16)}" of one-inch from the top-surface of the bottom-inside center mounting-plane of every chip-positioning circuit board's surface-mounted chip-socket. Moreover, the sidewalls of the Chip Placement Keyholes will form 270° angles from the exposed bottom-center top-surface of every chip-positioning circuit board's surface-mounted chip-socket 92 (FIGS. 30, 32, 35, and 37). Further, the manufacturing and machining dimensions for the 'Chip Placement Keys' 11 (FIGS. 26 and 27) and 'Chip Placement Keyholes' 92 (FIGS. 30, 32, 35, and 37) are critical and must adhere to a tolerance that is plus or minus "{fraction (1/1000)}" of one-inch. Moreover, the previously mentioned dimensional tolerance used for the 'Chip Placement Keys' and 'Chip Placement Keyholes' is necessary to insure an accurate, a secure, and a non-compromizable placement of the before mentioned Phase-Change Microhead Array Chips into surface-mounted chip-sockets of installed chip-positioning circuit boards.

Furthermore, the installation of the Phase-Change Microhead Array Chips into their chip-positioning circuit board's surface-mounted chip-sockets is done using two Phase-Change Microhead Array Chip's chip-mounting threaded hex-screws 2 (FIGS. 1, 6, 7, and 8). Moreover, the two chip-mounting hex-screws thread into a surface-mounted chip-socket's two hex-screw holes 92 (FIGS. 30, 32, 35, and 37). This will completely seat and secure the Phase-Change Microhead Array Chips into their surface-mounted chip-socket's inside-bottom chip mounting surface 92 (FIGS. 30, 32, 35, and 37).

In addition, the removal or displacement of a Phase-Change Microhead Array Chip after its installation into a chip-positioning circuit board's surface-mounted chip-socket should only occur if a Phase-Change Microhead Array Chip has failed. Moreover, a failed Phase-Change Microhead Array Chip would then need to be removed and replaced with a new and fully functioning Phase-Change Microhead Array Chip. However, if a Phase-Change Microhead Array Chip were replaced the newly installed Phase-Change Microhead Array Chip would need to be used to execute a low-level and operating system reformatting of the disk-platter data-surface located under the Phase-Change Microhead Array Chip replacement. After a low-level and operating system reformatting has been executed for the disk-platter data-surface located under the replacement chip, the newly installed replacement Phase-Change Microhead Array Chips should never be re-adjusted or moved in any way, or, a new low-level and operating system reformatting of the adjusted Phase-Change Microhead Array Chip's disk-platter data-surface would be required.

Another embodiment of the present invention, as illustrated in drawing FIGS. 26 and 27, shows a Phase-Change Microhead Array Chip's sixty-eight circuit connecting contacts, which are physically embedded into the bottom-surface 7, 8, 9, 10 (FIGS. 26 and 27) of every Phase-Change Microhead Array Chip's outer-package. Moreover, for every Phase- Change Microhead Array Chip's sixty-eight embedded circuit connecting contacts there is a matching set of sixty-eight circuit connecting contacts 92 (FIGS. 30, 32, 35, and 37), which are physically embedded into the top-surface of the bottom-inside center mounting-plane of every chip-positioning circuit board's surface-mounted chip-socket 5 (FIGS. 1, 2, 7, and 8). When viewing a Phase-Change Microhead Array Chip in a plan-view the location of a Phase-Change Microhead Array Chip's pin-one designation dot can be clearly seen 6 (FIGS. 1, 7, 8, 25, and 28). Moreover, the pin-one designation dot of a plan-viewed Phase-Change Microhead Array Chip indicates that it is either a 'Top Data-Surface Phase-Change Microhead Array Chip' or a 'Bottom Data-Surface Phase-Change Microhead Array Chip'. Therefore, the pin-one designation dot of a plan-viewed Phase-Change Microhead Array Chip, also indicates, by way of reference, the locations, the names, and the number-designations of the viewed Phase-Change Microhead Array Chip's sixty-eight embedded circuit-connecting contacts, as illustrated in FIGS. 11 and 12.

Therefore, when viewing a Phase-Change Microhead Array Chip with its microheads facing upward in a portrait plan-view position, its pin-one designation dot will be located in the upper left-hand corner of its outer-package, which indicates that it is an installed 'Bottom Data-Surface Phase-Change Microhead Array Chip'. Additionally, when viewing a Phase-Change Microhead Array Chip with its microheads facing downward in a portrait plan-view position, its pin-one designation dot will also be located in the upper left-hand corner of its outer-package, which indicates that it is an installed 'Top Data-Surface Phase-Change Microhead Array Chip'.

However, when viewing a Phase-Change Microhead Array Chip with its microheads facing upward in a portrait plan-view position, while its pin-one designation dot is located in the upper left-hand corner of its outer-package, would indicate that this is an un-installed 'Bottom Data-Surface Phase-Change Microhead Array Chip' 6 (FIGS. 1, 7, 11, 13, and 28). Additionally, when viewing a Phase-Change Microhead Array Chip with its microheads again facing upward in a portrait plan-view position, while its pin-one designation dot is located in the upper right-hand corner of its outer-package, would indicate that this is an un-installed 'Top Data-Surface Phase-Change Microhead Array Chip' 6 (FIGS. 1, 8, 12, 14, and 25).

Figure 11:
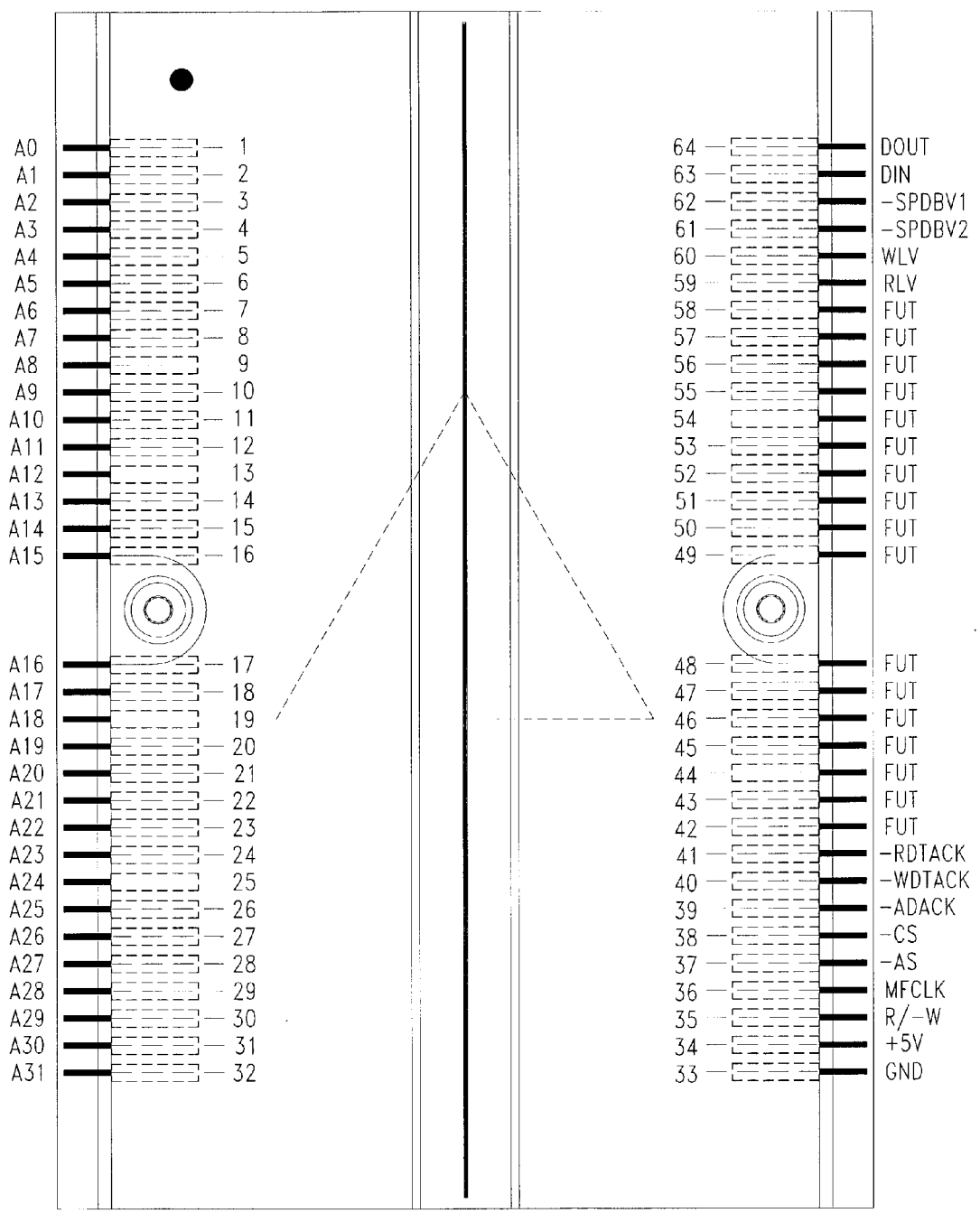
FIG. 11 is an orthographic plan-view drawing of a Phase-Change Microhead Array Chip, shown installed into a surface-mounted chip-socket that displays pin locations, number assignments, and logic-function labels for the Bottom Data-Surface Phase-Change Microhead Array Chips.
Figure 12:
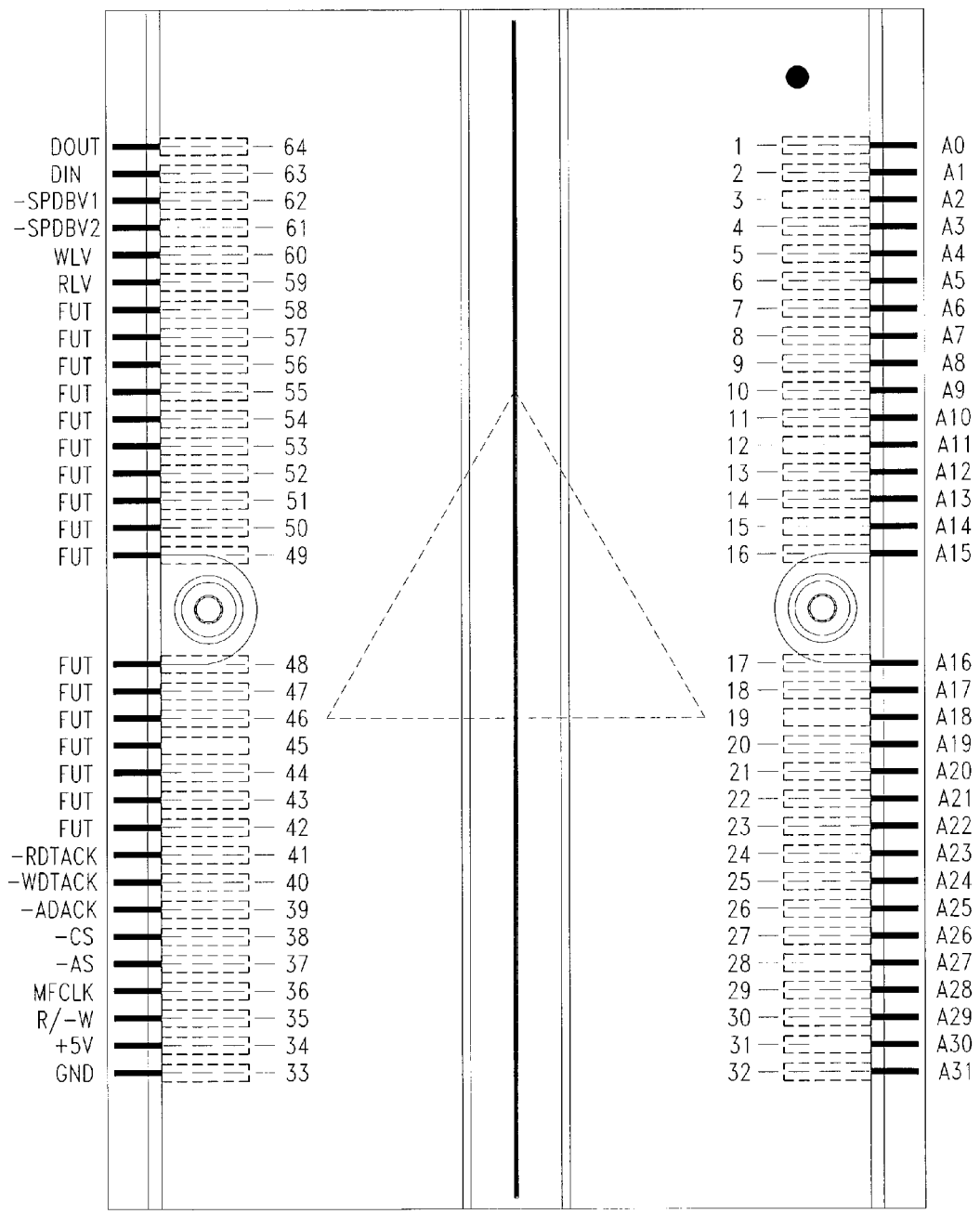
FIG. 12 is an orthographic plan-view drawing of a Phase-Change Microhead Array Chips own installed into a surface-mounted chip-socket that displays pin locations, number assignments, and logic-function labels for the Top Data-Surface Phase-Change Microhead Array Chips.
Figure 28:
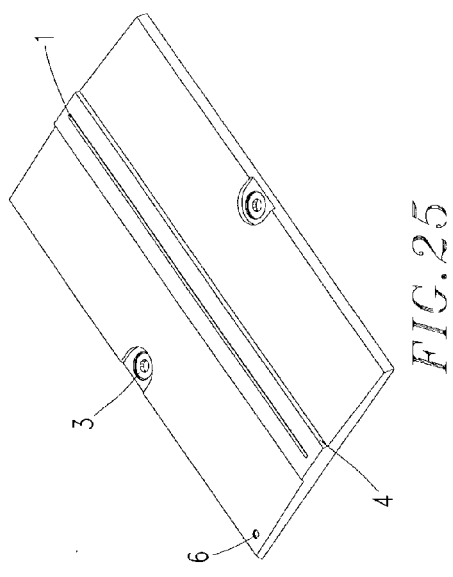
FIG. 28 is a 3D top-view drawing of the disk-platters' Bottom Data-Surface Phase-Change Microhead Array Chip.

Furthermore, the plan-viewed and un-installed version of a 'Bottom Data-Surface Phase-Change Microhead Array Chip' has its 32-bit Microhead-Addressing bus-circuit's connecting input-contacts (FIG. 11) located on the left-hand side of its outer-package's bottom-surface 9, 10 (FIGS. 7, 11, and 27). Moreover, the thirty-two Microhead-Addressing and bus-circuit connecting input-contacts are presented as two groups of sixteen input-contacts 9, 10 (FIGS. 7, 11, and 27). Moreover, a group number-one will contain input-contacts zero to sixteen 10 (FIGS. 1, 7, and 11), while a group number-two will contain input-contacts seventeen to thirty-one 9 (FIGS. 1, 7, and 11). The two groups of sixteen circuit-connecting input-contacts are physically separated from each other by a Phase-Change Microhead Array Chip's chip installing hex-screws 2 (FIGS. 1 and 7), and hex-screw holes 3 (FIGS. 1, 7, and 28). However, when logically combined, the previously mentioned two groups of sixteen circuit-connecting input-contacts complete a 32-bit Microhead-Addressing bus-system's contact configuration.

Furthermore, the plan-viewed and un-installed 'Bottom Data-Surface Phase-Change Microhead Array Chip' should have its control and data I/O bus-circuit's connecting contacts (FIG. 11) located on the right-hand side of its outer-package's bottom-surface 7, 8 (FIGS. 1, 7, and 27). Further, the thirty-two control and data I/O bus-circuit connecting contacts are presented as two groups of sixteen contacts 7, 8 (FIGS. 1, 7, and 27). Wherein, group number one will contain contacts thirty-two to forty-eight 8 (FIGS. 1, 7, and 11), while group number two will contain contacts forty-nine to sixty-four 7 (FIGS. 1, 7, and 11). Further, the previously mentioned two groups of sixteen circuit-connecting contacts are physically separated from each other by a Phase-Change Microhead Array Chip's installation hex-screw 2 (FIGS. 1 and 7), and hex-screw hole 3 (FIGS. 1, 7, and 28). However, when logically combined, the previously mentioned two groups of sixteen circuit-connecting contacts complete a control and data I/O bus-system's contact configuration.

Figure 25:
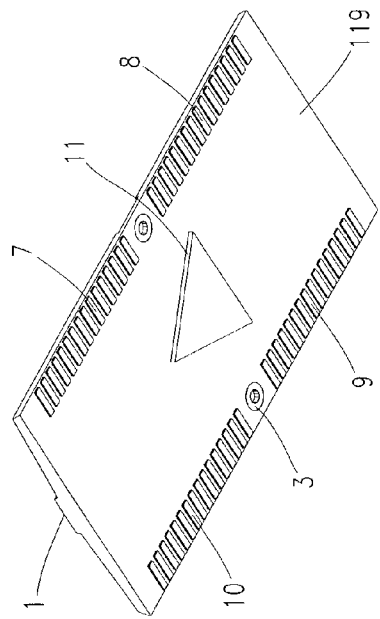
FIG. 25 is a 3D top-view drawing of the disk-platters' Top Data-Surface Phase-Change Microhead Array Chip.

Furthermore, the before mentioned plan-viewed and un-installed 'Top Data-Surface Phase-Change Microhead Array Chip', should have its 32-bit Microhead-Addressing bus-circuit's connecting input-contacts (FIG. 12) located on the right-hand side of its outer-package's bottom-surface 9, 10 (FIGS. 8 and 26). Further, the thirty-two Microhead-Addressing bus-circuit-connecting input-contacts are presented as two groups of sixteen input-contacts 9, 10 (FIGS. 8 and 26). Wherein, group number one will contain input-contacts zero to sixteen 10 (FIGS. 8 and 12), while group number two will contain input-contacts seventeen to thirty-one 9 (FIGS. 8 and 12). Further, the previously mentioned two groups of sixteen circuit-connecting input-contacts are physically separated from each other by a Phase-Change Microhead Array Chip's installation hex-screw 2 (FIG. 8), and hex-screw hole 3 (FIGS. 8 and 25). However, when logically combined, the previously mentioned two groups of sixteen circuit-connecting input-contacts complete a 32-bit Microhead-Addressing bus-system's contact configuration.

Furthermore, the plan-viewed and un-installed 'Top Data-Surface Phase-Change Microhead Array Chip', should have its control and data I/O buscircuit's connecting contacts (FIG. 12) located on the left-hand side of its outer-package's bottom-surface 7, 8 (FIGS. 8 and 26). Further, the thirty-two control and data I/O bus-circuit connecting contacts are presented as two groups of sixteen contacts 7, 8 (FIGS. 8 and 26). Wherein, group number one will contain contacts thirty-two to forty-eight 8 (FIGS. 8 and 12), while group number two will contain contacts forty-nine to sixty-four 7 (FIGS. 8 and 12). Further, the previously mentioned two groups of sixteen circuit-connecting contacts are physically separated from each other by a Phase-Change Microhead Array Chip's installation hex-screw 2 (FIG. 8) and hex-screw hole 3 (FIGS. 8 and 25). However, when logically combined, the previously mentioned two groups of sixteen circuit-connecting contacts complete a control and data I/O bus-system's contact configuration.

Furthermore, a plan-viewed and installed 'Bottom Data-Surface Phase-Change Microhead Array Chip' will have its pin-one designation dot located in the upper left-hand corner of a Phase-Change Microhead Array Chip's outer-package 6 (FIGS. 1, 7, and 28). Moreover, a before mentioned plan-viewed and installed 'Bottom Data-Surface Phase-Change Microhead Array Chip' (FIGS. 29 and 34) has its 32-bit addressing bus-circuit's connecting input-contacts (FIG. 11) located on the left-hand side of its outer-package's bottom-surface 9, 10 (FIGS. 7 and 27). In addition, a before mentioned plan-viewed and installed 'Bottom Data-Surface Phase-Change Microhead Array Chip' (FIGS. 29 and 34) has its input-contacts one to thirty-two FIG. 11 dedicated to its 32-bit addressing bus-circuit.

In conclusion, an installed 'Bottom Data-Surface Phase-Change Microhead Array Chip' connects its 32-bit addressing bus-circuit to a Phase-Change Microhead Array Chip Hard Disk Drive's Disk Controller and its bus-system through its surface-mounted chip-socket's "A0" to "A31" connection-contacts, as illustrated in FIG. 11.

Furthermore, the plan-viewed and installed 'Bottom Data-Surface Phase-Change Microhead Array Chip' will have its pin-one designation dot located in the upper left-hand corner of a Phase-Change Microhead Array Chip's outer-package 6 (FIGS. 1, 7, and 28). Moreover, a plan-viewed and installed 'Bottom Data-Surface Phase-Change Microhead Array Chip' (FIGS. 29 and 34) has its control and data I/O bus-circuit's connecting-contacts (FIG. 11) located on the right-hand side of its outer-package's bottom-surface 7, 8 (FIGS. 7 and 27).

In addition, a plan-viewed and installed 'Bottom Data-Surface Phase-Change Microhead Array Chip' (FIGS. 29 and 34) has contacts thirty-three to thirty-eight (FIG. 11) dedicated to its "Ground" (GND) output-contact, its "VDD Power" (+5) input-contact, its "Read or Write Enable" (R/−W) input-contact, its "Multi-Frequency Clock" (MFCLK) input-contact, its "Address Strobe" (−AS) input-contact, and its "Chip Select" (−CS) input-contact, as illustrated in FIG. 11. Additionally, a plan-viewed and installed 'Bottom Data-Surface Phase-Change Microhead Array Chip' (FIGS. 29 and 34) has contacts thirty-nine to forty-one (FIG. 11) dedicated to its "Address Acknowledge" (ADACK) output-contact, its "Write Data Acknowledge" (−WDTACK) output-contact, and its "Read Data Acknowledge" (−RDTACK) output-contact, as illustrated in FIG. 11.

In addition, a plan-viewed and installed 'Bottom Data-Surface Phase-Change Microhead Array Chip' (FIGS. 29 and 34) has contacts forty-two to sixty-two (FIG. 1) dedicated to its "Future" (FUT) I/O contacts, as illustrated in FIG. 11. Additionally, as illustrated in FIG. 11, a plan-viewed and installed 'Bottom Data-Surface Phase-Change Microhead Array Chip' (FIGS. 29 and 34) has contact fifty-nine (FIG. 11) dedicated to its "Read Laser Voltage" (RLV) output-contact, as illustrated in FIG. 11. Further, as illustrated in FIG. 11, a plan-viewed and installed 'Bottom Data-Surface Phase-Change Microhead Array Chip' (FIGS. 29 and 34) has contact sixty (FIG. 11) dedicated to its "Write Laser Voltage" (WLV) output-contact.

In addition, a plan-viewed and installed 'Bottom Data-Surface Phase-Change Microhead Array Chip' (FIGS. 29 and 34) has contact sixty-one (FIG. 11) dedicated to its "Semiconductor Photo-Diode Biased Voltage 2" (SPDBV2) output-contact, as illustrated in FIG. 11. A plan-viewed and installed 'Bottom Data-Surface Phase-Change Microhead Array Chip' (FIGS. 29 and 34) has contact sixty-two (FIG. 11) dedicated to its "Semiconductor Photo-Diode Biased Voltage 1" (SPDBV1) output-contact, as illustrated in FIG. 11.

Figure 13:
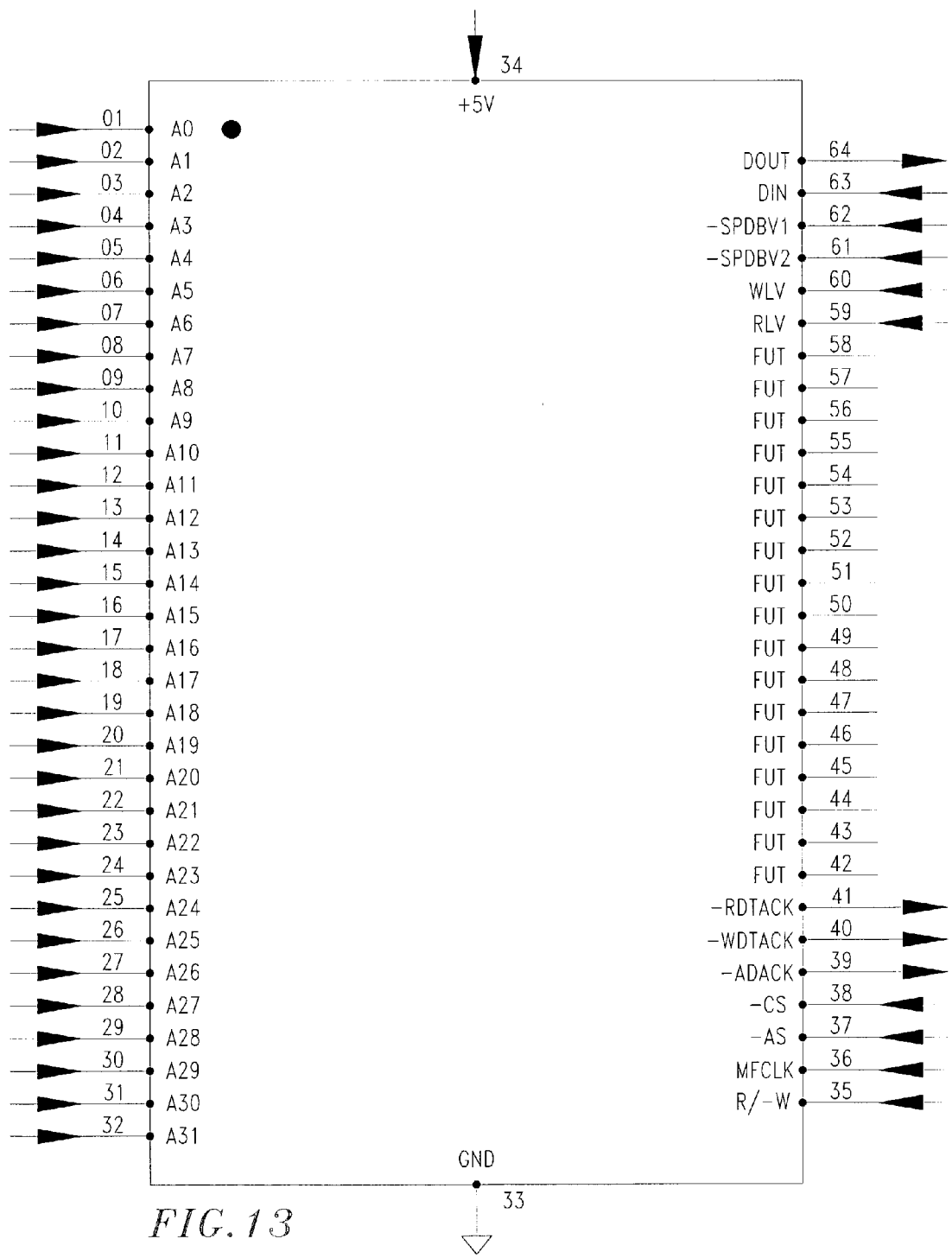
FIG. 13 is a logic-signal flow schematic for the Bottom Data-Surface Phase-Change Microhead Array Chips, displaying signal direction, pin assignments, and function labels.

In addition, a plan-viewed and installed 'Bottom Data-Surface Phase-Change Microhead Array Chip' (FIGS. 29 and 34) has contacts sixty-three to sixty-four (FIG. 11) dedicated to its "Data-In" (DIN) input-contact, and to its "Data-out" (Dout) output-contact, as illustrated in FIG. 11. In conclusion, an installed 'Bottom Data-Surface Phase-Change Microhead Array Chip' connects its control and data I/O bus-circuits to a Phase-Change Microhead Array Chip Hard Disk Drive's Disk Controller and its bus-systems through a surface-mounted chip-socket's connection-contacts as they were previously numbered and named, and illustrated in FIG. 11. The 'Signal-Flow' (i.e., sometimes called an in-put/out-put logic-flow configuration) for an un-installed 'Bottom Data-Surface Phase-Change Microhead Array Chip' is illustrated in FIG. 13.

Furthermore, a plan-viewed and installed 'Top Data-Surface Phase-Change Microhead Array Chip' has its pin-one designation dot located in the upper left-hand corner of the Phase-Change Microhead Array Chip's outer-package 6 (FIGS. 8 and 25). Moreover, a plan-viewed and installed 'Top Data-Surface Phase-Change Microhead Array Chip' (FIG. 31, FIG. 36) has its 32-bit Microhead-Addressing bus-circuit's connecting input-contacts (FIG. 12) located on the left-hand side of its outer-package's bottom-surface 9, 10 (FIGS. 8 and 26).

In addition, a plan-viewed and installed 'Top Data-Surface Phase-Change Microhead Array Chip' (FIGS. 31 and 36) has its input-contacts one to thirty-two (FIG. 12) dedicated to its 32-bit Microhead-Addressing bus-circuit, as illustrated in FIG. 12. In conclusion, an installed 'Top Data-Surface Phase-Change Microhead Array Chip' connects its 32-bit addressing bus-circuit to a Phase-Change Microhead Array Chip Hard Disk Drive's Disk Controller and its bus-system through its surface-mounted chip-socket's "A0" to "A31" connection-contacts, as illustrated in FIG. 12.

Furthermore, a plan-viewed and installed 'Top Data-Surface Phase-Change Microhead Array Chip' has its pin-one designation dot located in the upper left-hand corner of the Phase-Change Microhead Array Chip's outer-package 6 (FIGS. 8 and 25). Moreover, a plan-viewed and installed 'Top Data-Surface Phase-Change Microhead Array Chip' (FIGS. 31 and 36) has its control and data I/O bus-circuit's connecting contacts (FIG. 12) located on the right-hand side of its outer-package's bottom-surface 7, 8 (FIGS. 7 and 26).

In addition, a plan-viewed and installed 'Top Data-Surface Phase-Change Microhead Array Chip' (FIGS. 31 and 36) has its contacts thirty-three to thirty-eight (FIG. 12) dedicated to its "Ground" (GND) output-contact, its "VDD Power" (+5) input-contact, its "Read or Write Enable" (R/−W) input-contact, its "Multi-Frequency Clock" (MFCLK) input-contact, its "Address Strobe" (AS) input-contact, and its "Chip Select" (−CS) input-contact, as illustrated in FIG. 12. Additionally, as illustrated in FIG. 12, contacts thirty-nine to forty-one (FIG. 12) are dedicated to its "Address Acknowledge" (−ADACK) output-contact, its "Write Data Acknowledge" (−WDTACK) output-contact, and its "Read Data Acknowledge" (−RDTACK) output-contact. While, as illustrated in FIG. 12, contacts forty-two to sixty-two (FIG. 12) are dedicated to the chip's "Future" (FUT) I/O contacts.

Figure 14:
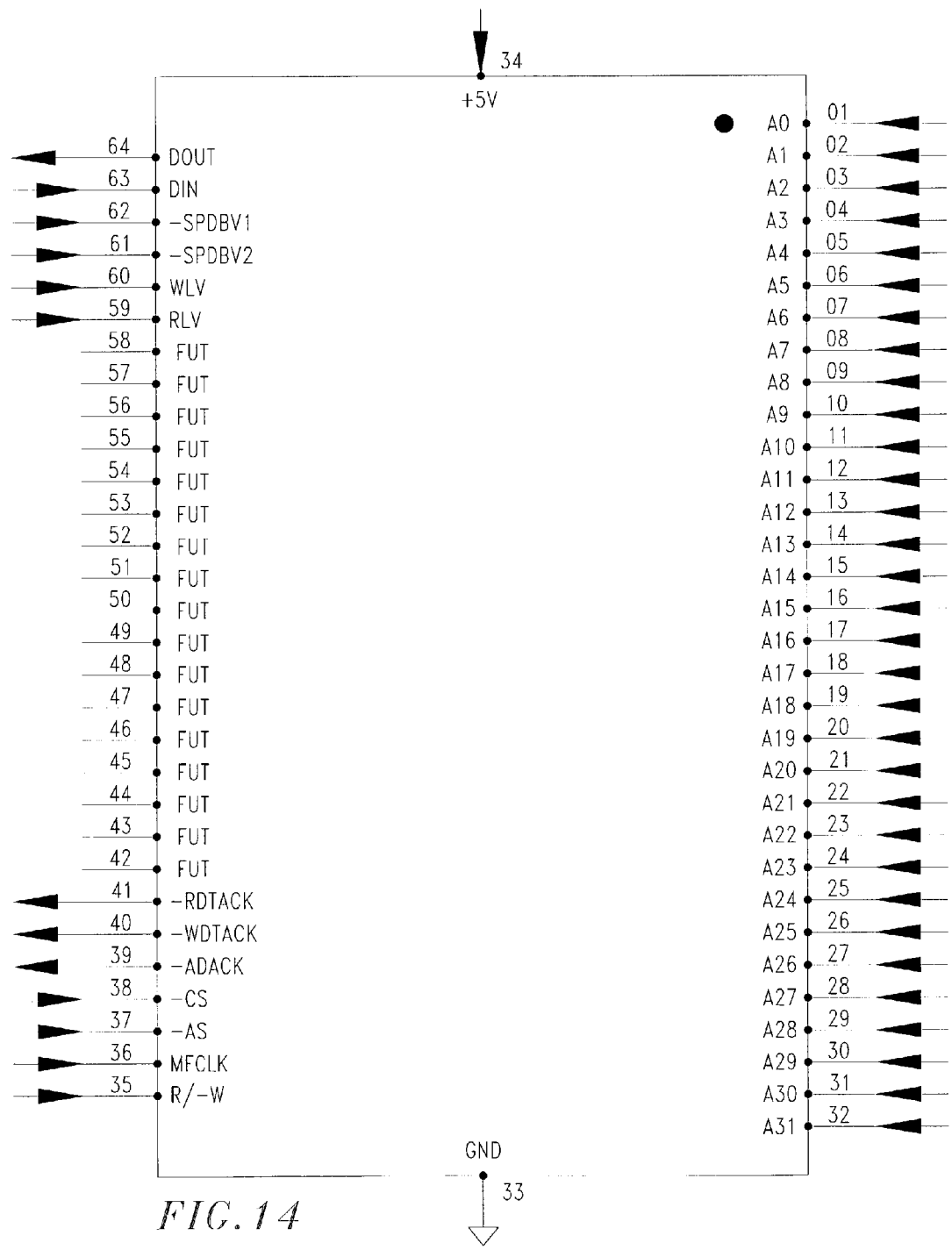
FIG. 14 is a logic-signal flow schematic for the Top Data-Surface Phase-Change Microhead Array Chips, displaying signal direction, pin assignments, and pin function labels.
Figure 15:
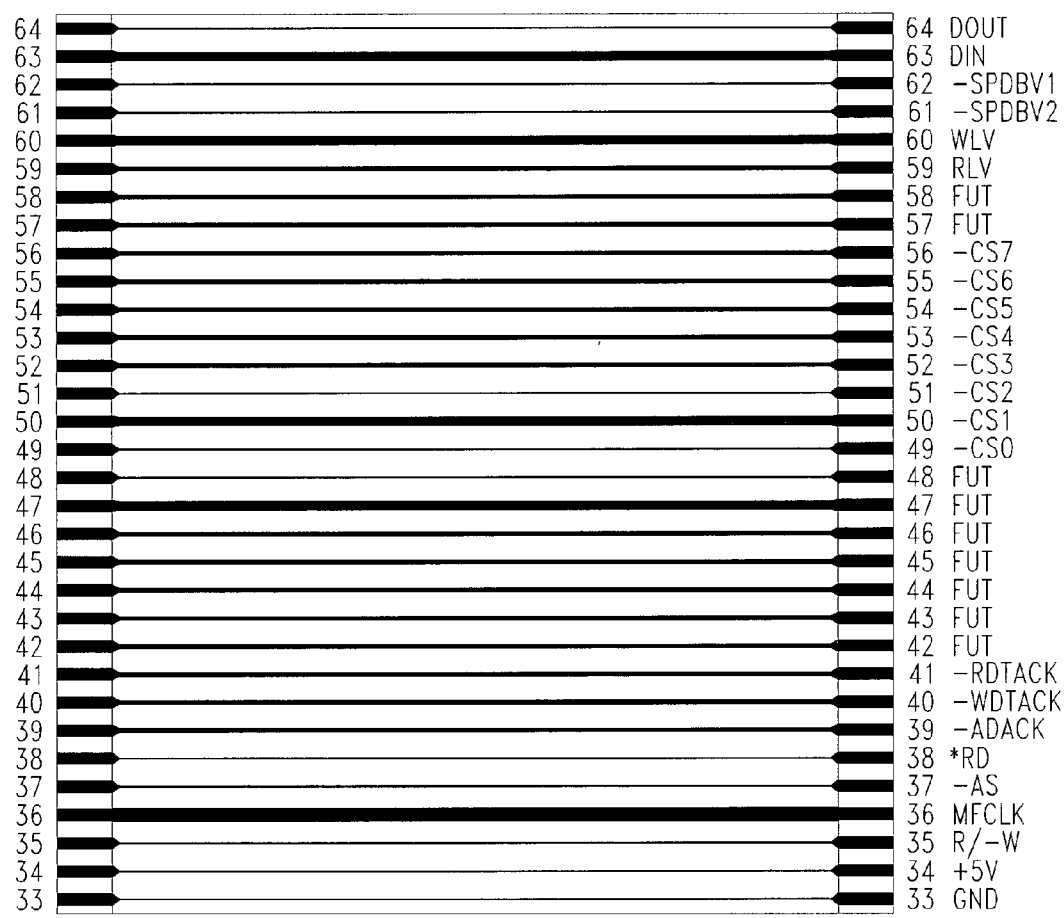
FIG. 15 is a plan-view drawing of a Polymer flex bus-cable for the chip-positioning circuit boards' right side connector used in the Phase-Change Microhead Array Chip design, displaying data-bus, future-bus, and control-bus pin assignments.
Figure 16:
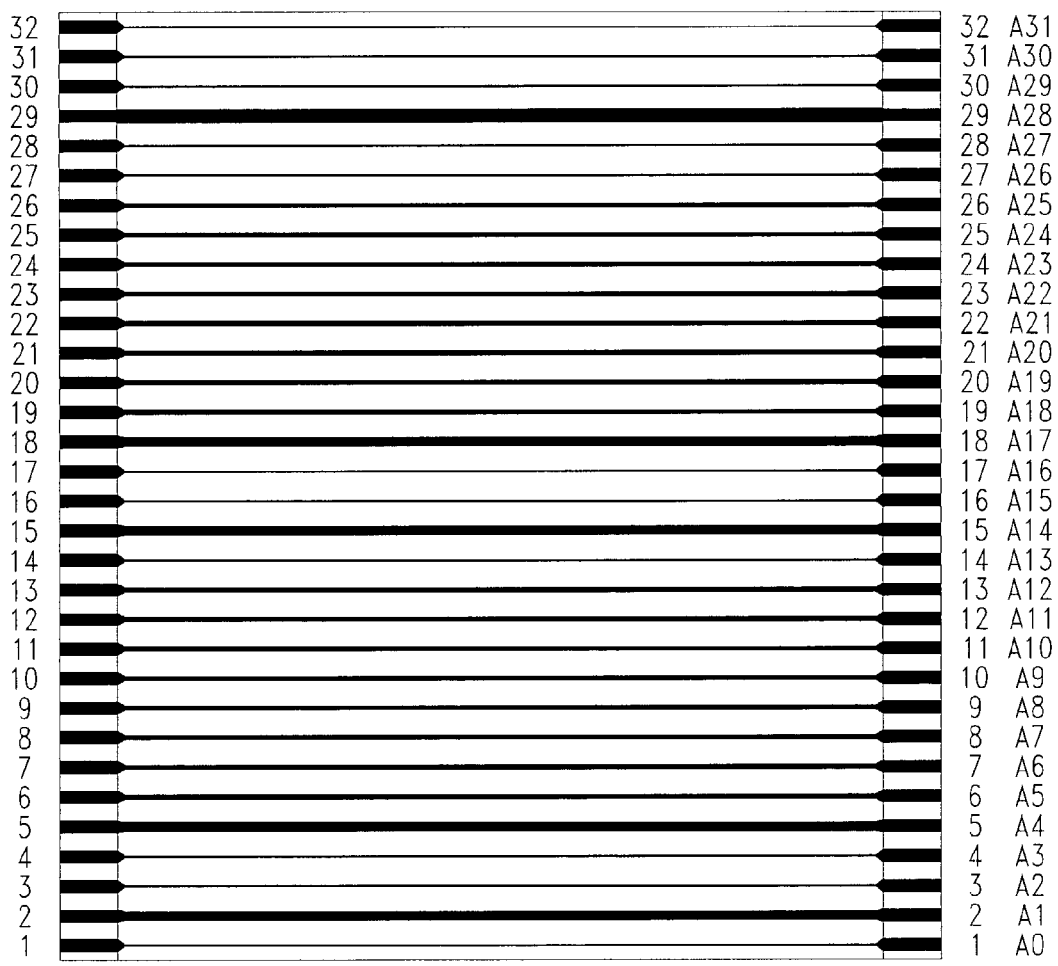
FIG. 16 is a plan-view drawing of a Polymer flex bus-cable for the chip-positioning circuit boards' left side connector used in the Phase-Change Microhead Array Chip design, displaying the 32-bit address-bus pin assignments.

In addition, contact fifty-nine (FIG. 12) is dedicated to its "Read Laser Voltage" (RLV) output-contact, contact sixty (FIG. 12) is dedicated to its "Write Laser Voltage" (WLV) output-contact, and contact sixty-one (FIG. 12) is dedicated to its "Semiconductor Photo-Diode Biased Voltage 2" (SPDBV2) output-contact. While, as illustrated in FIG. 12, contact sixty-two is dedicated to its "Semiconductor Photo-Diode Biased Voltage 1" (SPDBV1) output-contact. Further, as illustrated in FIG. 12, contacts sixty-three to sixty-four are dedicated to the chip's "Data-In" (DIN) input-contact and to the chip's "Data-out" (Dout) output-contact. In conclusion, an installed 'Top Data-Surface Phase-Change Microhead Array Chip' connects its control and data I/O bus-circuits to a Phase-Change Microhead Array Chip Hard Disk Drive's Disk Controller and it's bus-systems through a surface-mounted chip-socket's connection-contacts as they were previously numbered and named, as illustrated in FIG. 12. The 'Signal-Flow' (i.e., sometimes called an in-put/out-put logic-flow design configuration) for an un-installed 'Top Data-Surface Phase-Change Microhead Array Chip' is illustrated in FIG. 14.

Figure 39:
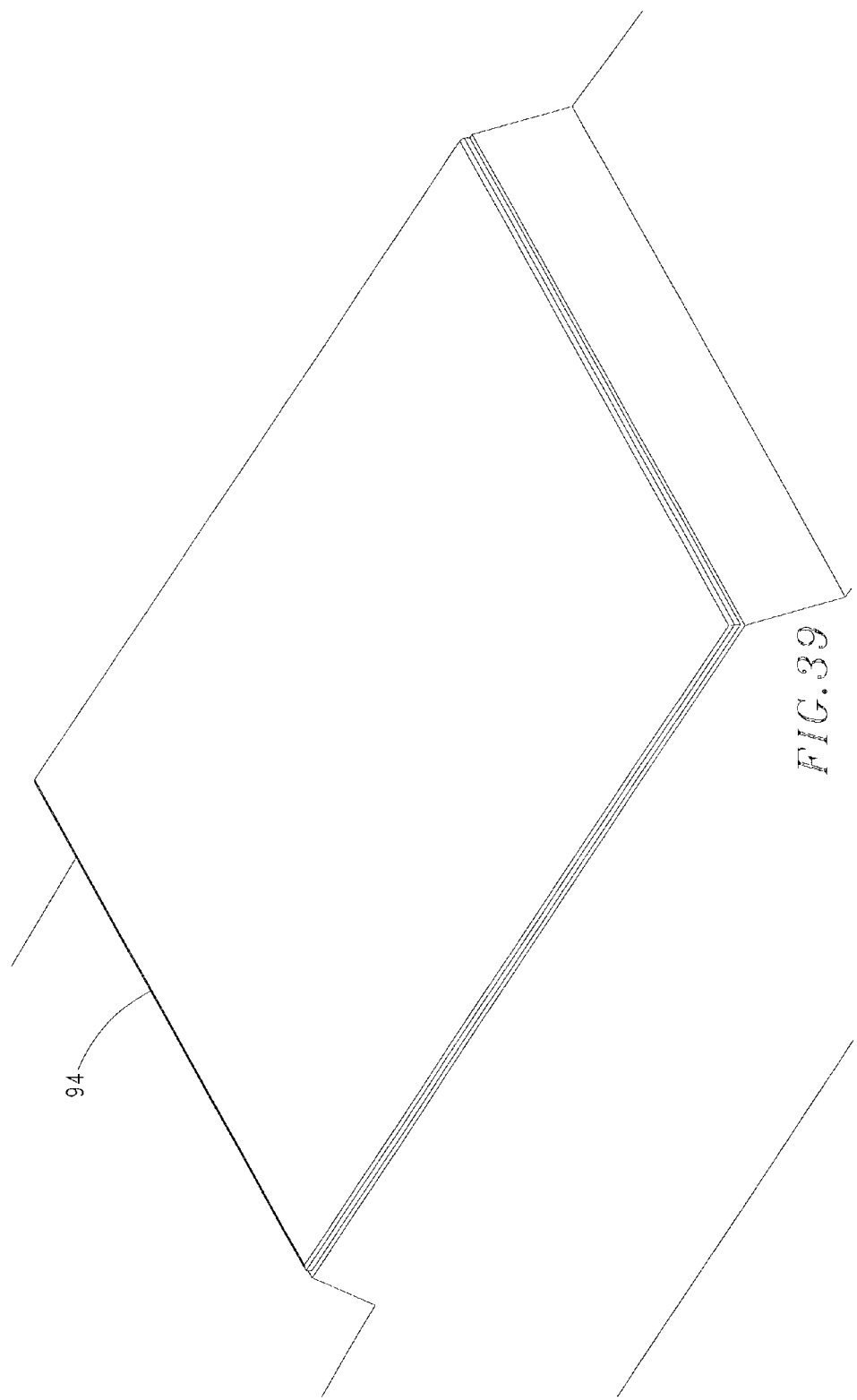
FIG. 39 is a 3D top front-view drawing of a Phase-Change Microhead Array Chip's concealed VCSEL microhead-array that displays the quarter-wave calcite plate covering the microhead-array.
Figure 40:
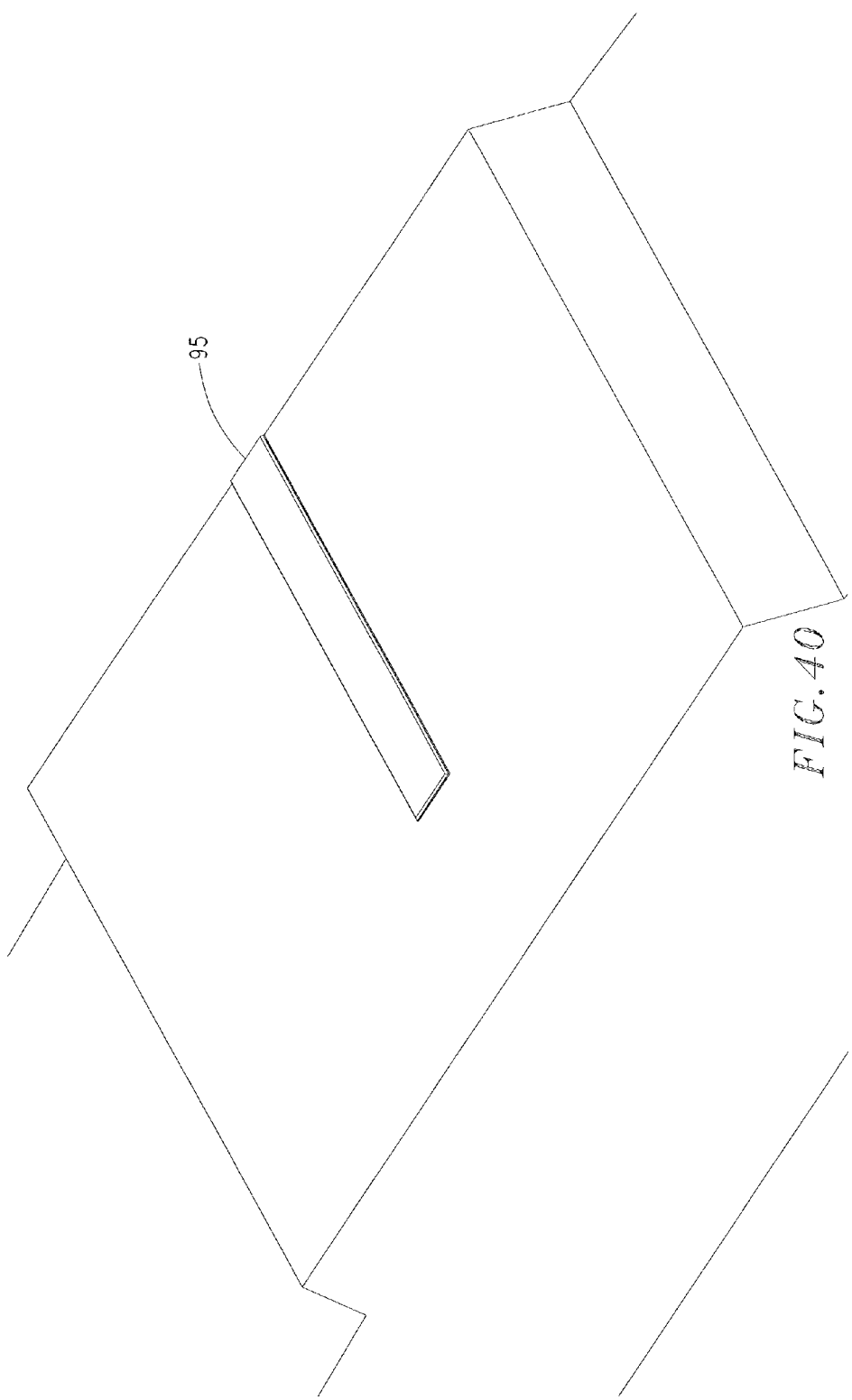
FIG. 40 is a 3D top front-view drawing of a Phase-Change Microhead Array Chip's two Bi-Metal Planar Induction Coils and concealed VCSEL microhead-array that displays a smaller quarter-wave calcite plate covering the microhead-array.
Figure 41:
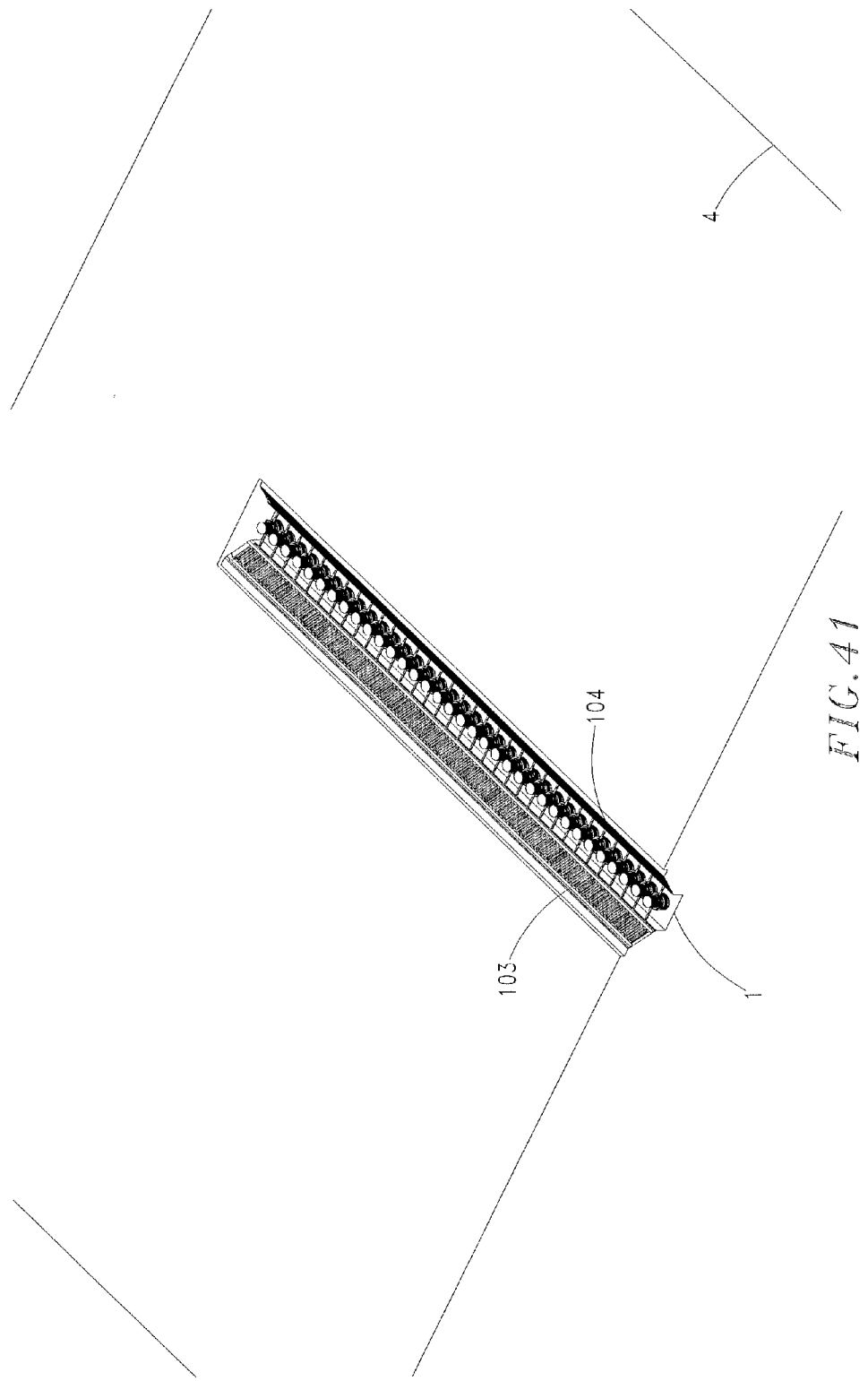
FIG. 41 is a 3D drawing of a top-front right-side view of a Phase-Change Microhead Array Chip's two Bi-Metal Planar Induction Coils and unconcealed VCSEL microhead-array that displays the reference-voltage and signal-voltage read-channel photo-diode array semiconductor substrates.
Figure 42:
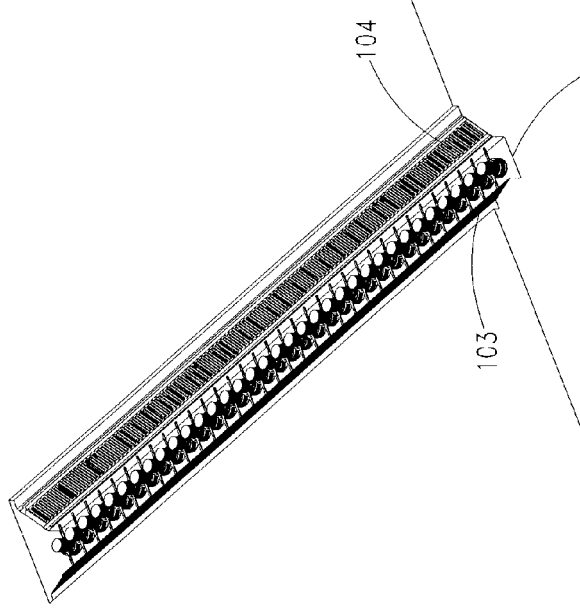
FIG. 42 is a 3D drawing of a top-front left-side view of a Phase-Change Microhead Array Chip's two Bi-Metal Planar Induction Coils and unconcealed VCSEL microhead-array that displays the reference-voltage and signal-voltage read-channel photo-diode array semiconductor substrates.
Figure 43:
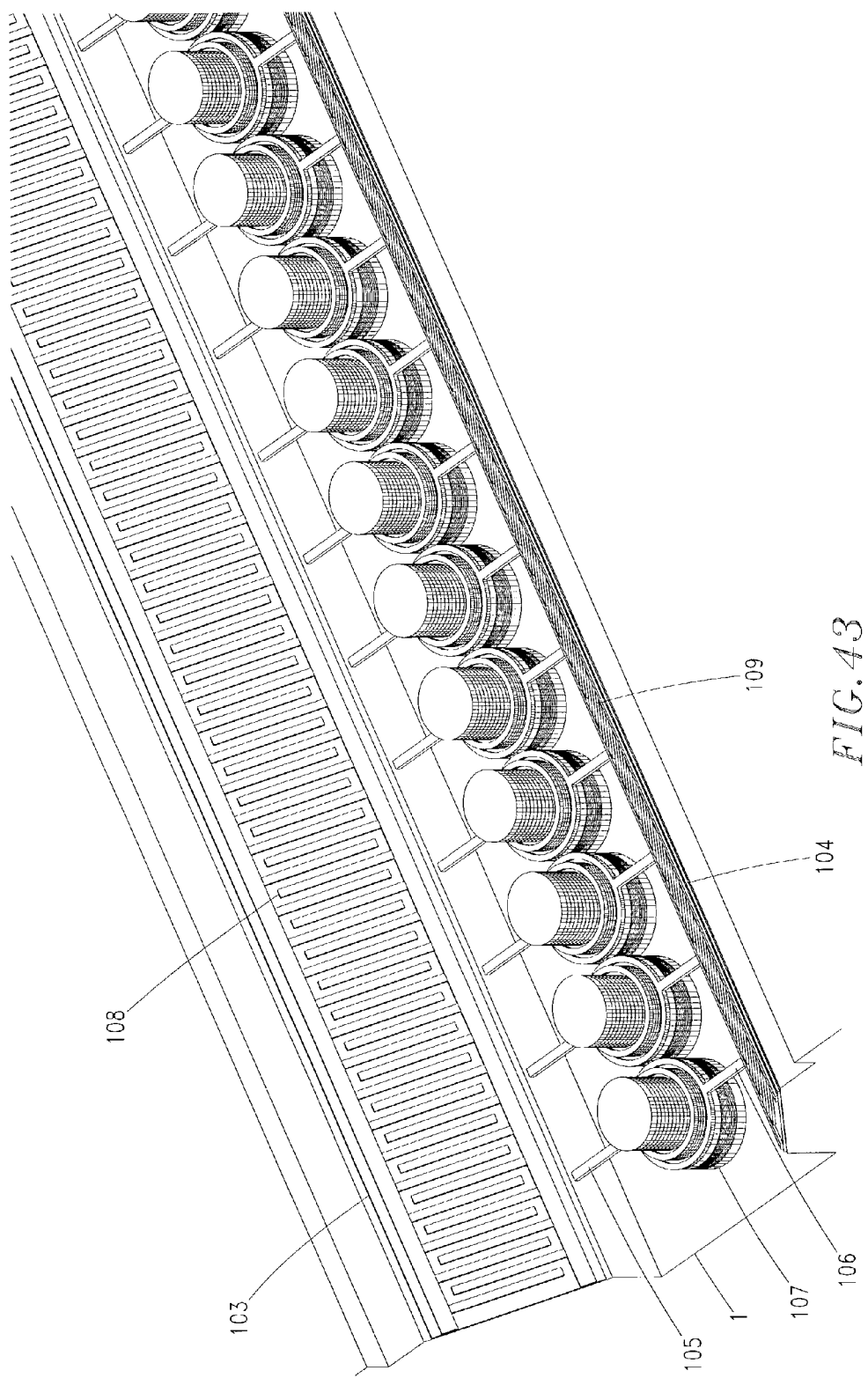
FIG. 43 is a 3D drawing showing a 30° top-front right-side close-up of a Phase-Change Microhead Array Chip's un-concealed VCSEL microhead-array that displays details of the VCSEL microheads and two reversed-biased "Semiconductor Photo-Conductor" (SPC) "Cadmium Sulfide" (CdS) based semiconductor photo-detecting diode devices.
Figure 44:
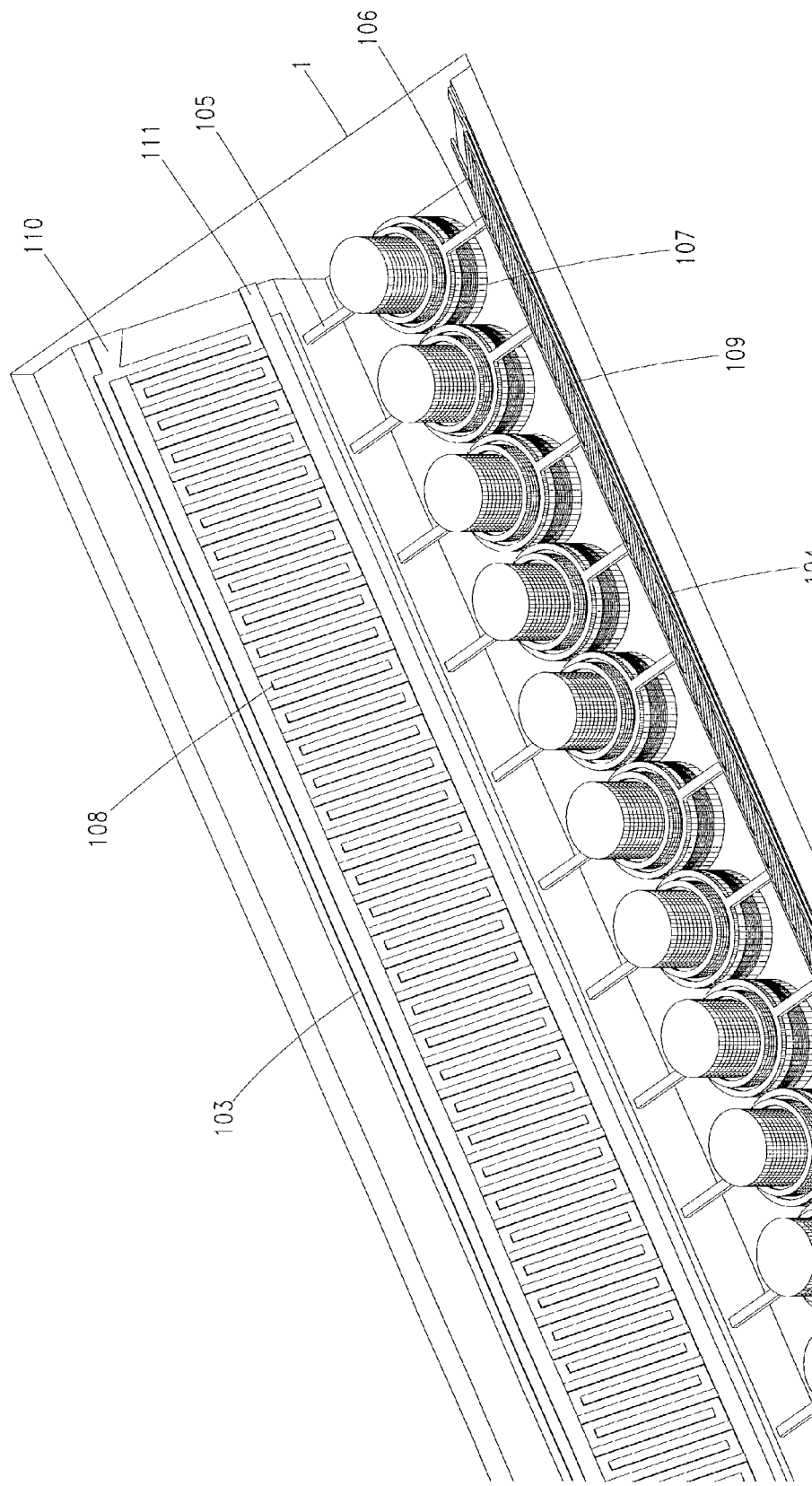
FIG. 44 is a 3D drawing showing a 30° top back right-side close-up of a Phase-Change Microhead Array Chip's un-concealed VCSEL microhead-array that displays details of the VCSEL microheads and two reversed-biased SPC "Cadmium Sulfide" (CdS) based semiconductor photo-detector diode devices.
Figure 45:
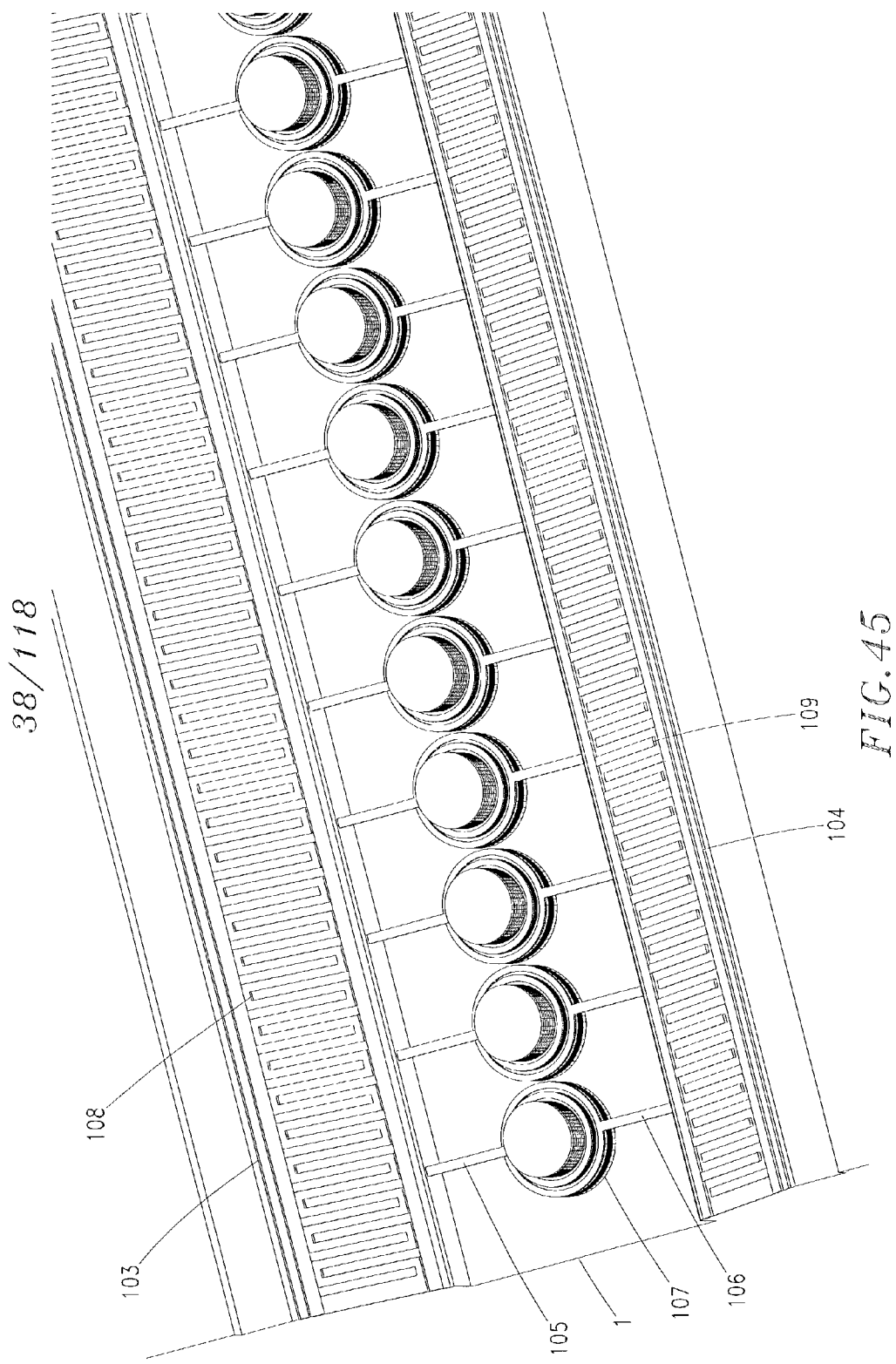
FIG. 45 is a 3D drawing showing a 10° top front-end right-side close-up of a Phase-Change Microhead Array Chip's un-concealed VCSEL microhead-array that displays details of the VCSEL microheads and two reversed-biased SPC "Cadmium Sulfide" (CdS) based semiconductor photo-detector diode devices.
Figure 46:
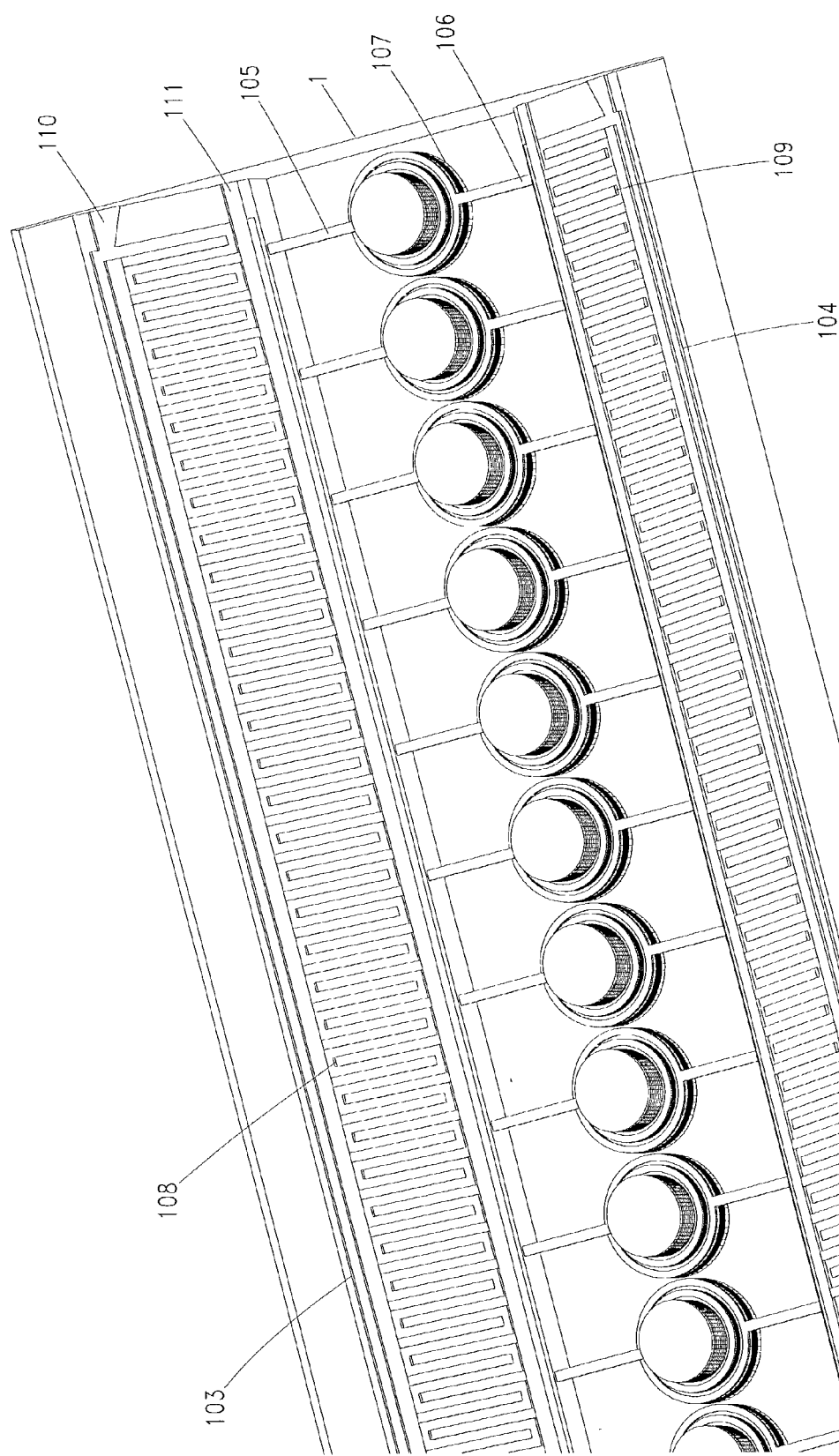
FIG. 46 is a 3D drawing of a 10° top back-end right-side close-up of a Phase-Change Microhead Array Chip's un-concealed VCSEL microhead-array that displays details of the VCSEL microheads and two reversed-biased SPC "Cadmium Sulfide" (CdS) based semiconductor photo-detector diode devices.
Figure 47:
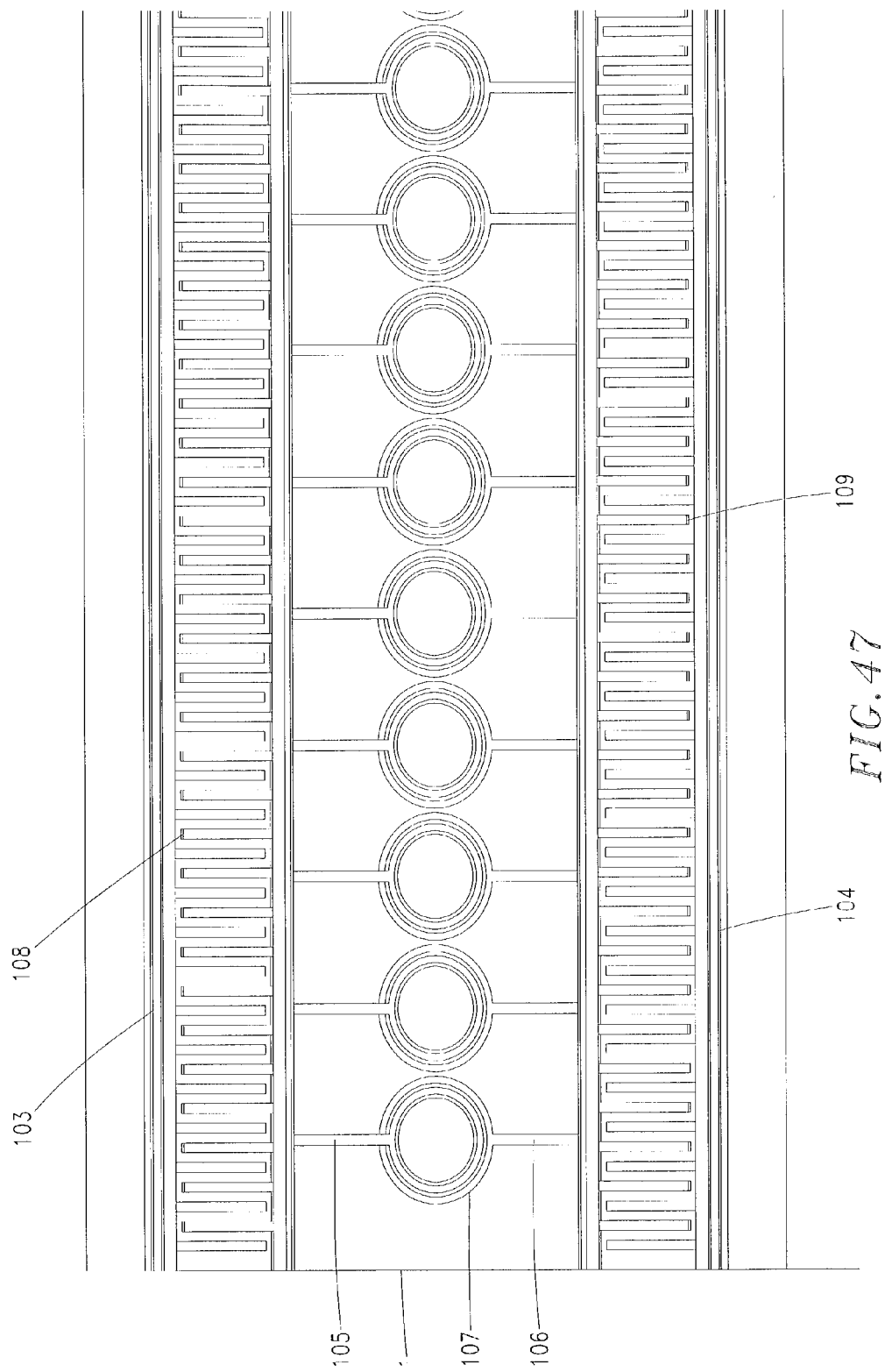
FIG. 47 is an orthographic drawing showing a front-end plan-view close-up of a Phase-Change Microhead Array Chip's un-concealed VCSEL microhead-array that displays details of the VCSEL microheads and two reversed-biased SPC "Cadmium Sulfide" (CdS) based semiconductor photo-detector diode devices.
Figure 48:
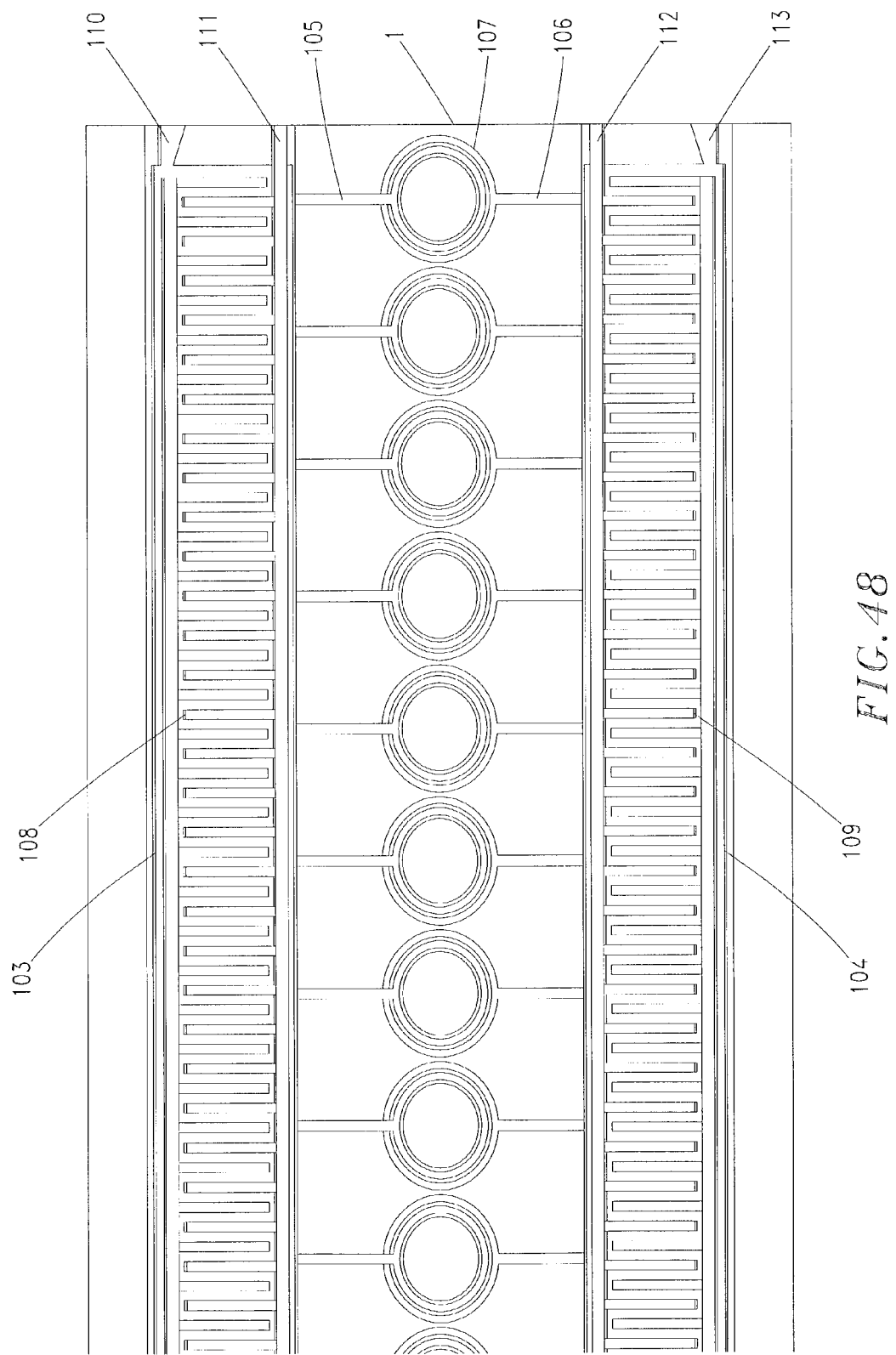
FIG. 48 is an orthographic drawing showing a back-end plan-view close-up of a Phase-Change Microhead Array Chip's un-concealed VCSEL microhead-array that displays details of the VCSEL microheads and two reversed-biased SPC "Cadmium Sulfide" (CdS) based semiconductor photo-detector diode devices.
Figure 49:
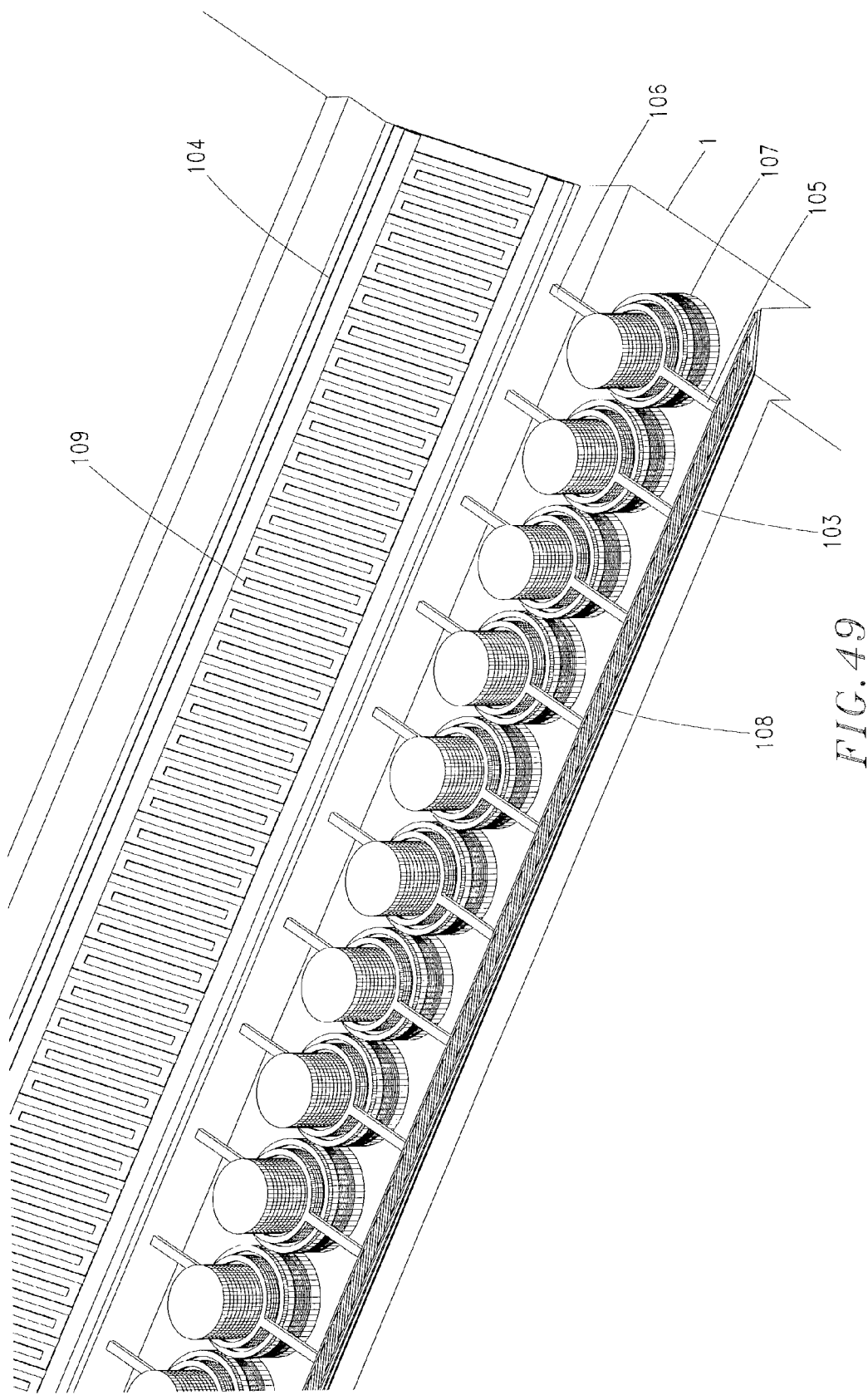
FIG. 49 is a 3D drawing showing a 30° top front-end left-side close-up of a Phase-Change Microhead Array Chip's un-concealed VCSEL microhead-array, while displaying details of the VCSEL microheads and two reversed-biased SPC "Cadmium Sulfide" (CdS) based semiconductor photo-detector diode devices.
Figure 50:
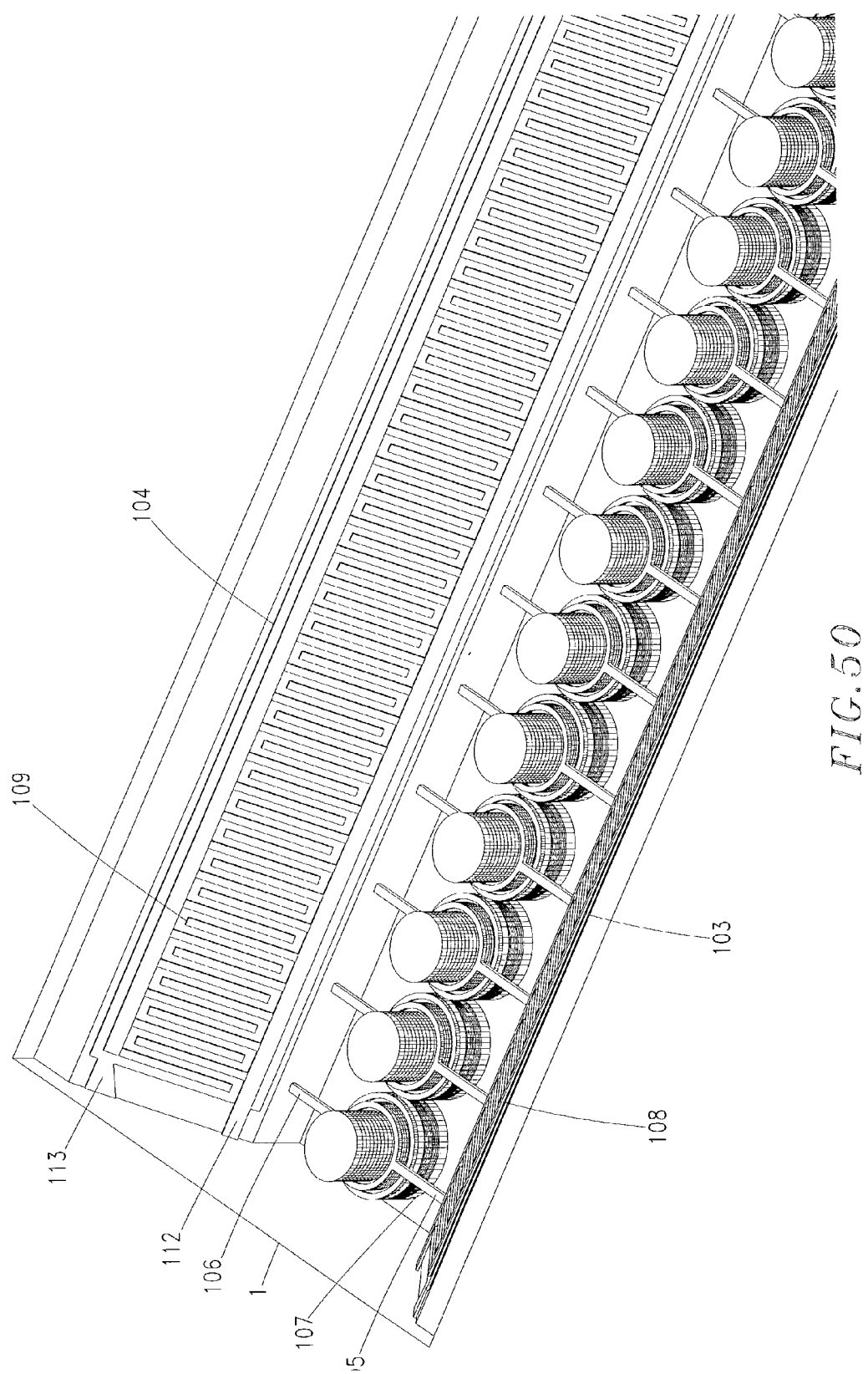
FIG. 50 is a 3D drawing showing a 30° top back-end left-side close-up of a Phase-Change Microhead Array Chip's un-concealed VCSEL microhead-array, while displaying details of the VCSEL microheads and two reversed-biased SPC "Cadmium Sulfide" (CdS) based semiconductor photo-detector diode devices.
Figure 51:
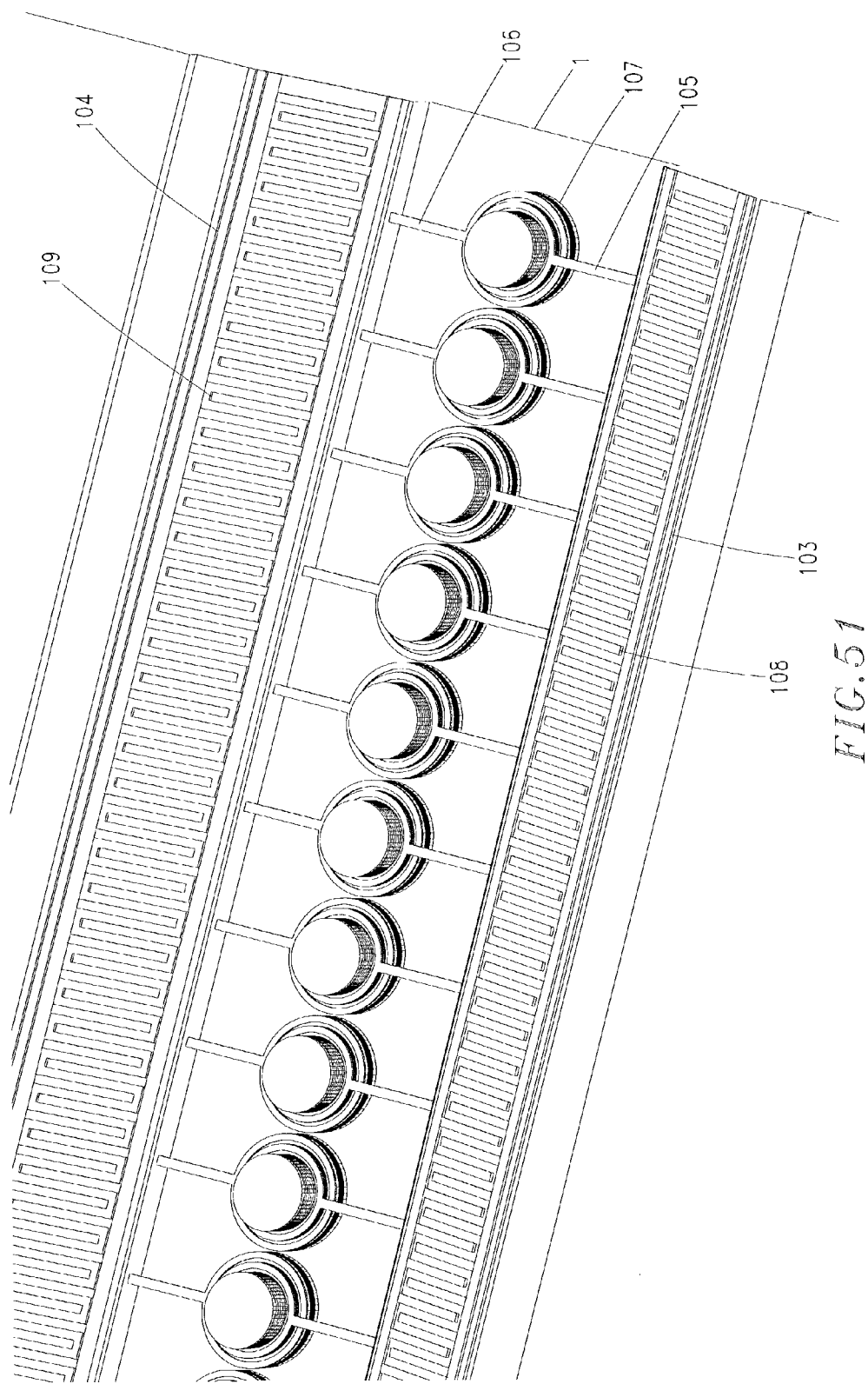
FIG. 51 is a 3D drawing showing a 10° top front-end left-side close-up of a Phase-Change Microhead Array Chip's un-concealed VCSEL microhead-array, while displaying details of the VCSEL microheads and two reversed-biased SPC "Cadmium Sulfide" (CdS) based semiconductor photo-detector diode devices.
Figure 52:
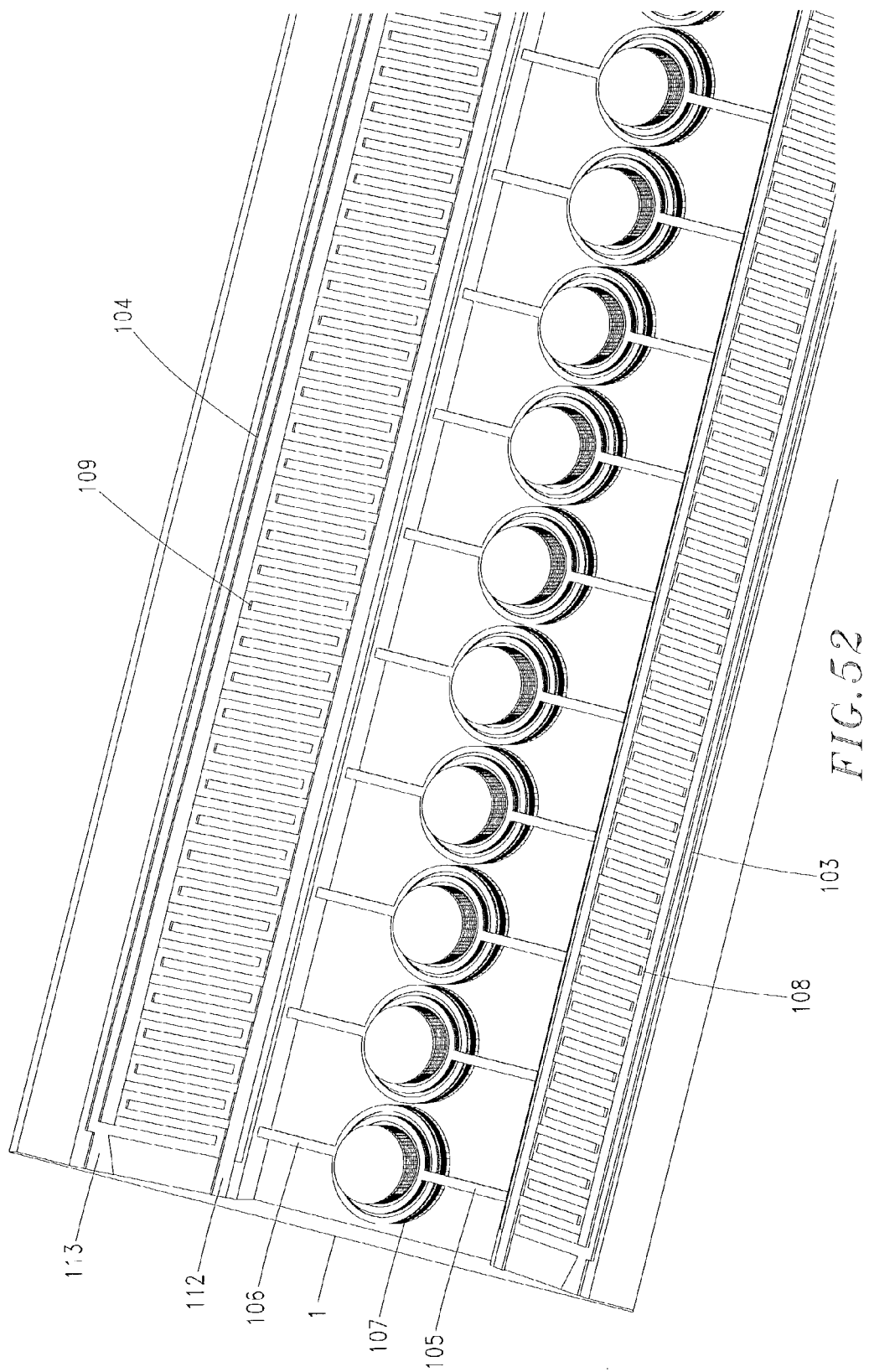
FIG. 52 is a 3D drawing showing a 10° top back-end left-side close-up of a Phase-Change Microhead Array Chip's un-concealed VCSEL microhead-array, while displaying details of the VCSEL microheads and two reversed-biased SPC "Cadmium Sulfide" (CdS) based semiconductor photo-detector diode devices.

Another embodiment of the present invention, as illustrated in drawing FIGS. 41, 42, 43, 44, 45, 46, 47, 48, 49, 50, 52, and 52, is the Phase-Change Microhead Array Chip core design and internal microhead structures, which are located within every Phase-Change Microhead Array Chip and comprises a microhead-array containing as few as one-hundred or up to as many as four-billion multi-layered laser-diode or (VCSEL) "Vertical Cavity Surface Emitting Laser" devices 1 (FIGS. 1, 2, and 3) per Phase-Change Microhead Array Chip 4 (FIGS. 41 and 42), two reversed-biased (SPD) "Semiconductor PhotoDiode" photocell arrays 103, 104 (FIGS. 41 and 42), one quarter-wave polarizing plate 94, 95 (FIGS. 39 and 40), and one Ahrens polarizing analyzer and beam-splitting calcite crystal 129, 130, 131 (FIGS. 108A and 108B).

Furthermore, the laser-diode or "Vertical Cavity Surface Emitting Laser" (VCSEL) microhead-arrays used in the Phase-Change Microhead Array Chips are typically forward-biased, microscopic, and alloy-doped double-heterojunction semiconductor structures. Moreover, the laser-diode or VCSELs are typically shown as being built-up layer-upon-layer from a single semiconductor substrate using existing "Molecular Beam Epitaxy" (MBE) or "Metal-Organic Vapor-Phase Epitaxy" (MOVPE), or some other equivalent epitaxial manufacturing method to initiate deposition. While, the Phase-Change Microhead Array Chips' support circuitry is fully integrated and constructed from the same previously mentioned material used to construct the laser-diode or "Vertical Cavity Surface Emitting Laser" (VCSEL) microhead-array, and within this embodiment comprise a 'Microhead Address Latch And Decoder Circuit', a 'Chip-Selection And Chip-Control Circuit', a 'Data I/O And Pre-Amplification Circuit', a 'Data Encoding/Decoding Circuit', and two reversed-biased "Semiconductor Photo-Conductor" (SPC) devices, or as an alternative embodiment two reversed-biased "Semiconductor Photo-Diode" (SPD) photocell (Si) "Silicon" based, or "Charged Coupled Device" (CCD) semiconductor arrays.

Furthermore, the previously mentioned photocell arrays can either be constructed from and upon semiconductor substrates that are different and separate from the before mentioned support circuitry's before mentioned substrates 1 (FIGS. 1, 2, and 3) or from the same material and substrate used to construct the laser-diode microhead-arrays. Moreover, the previously mentioned integrated circuits are typically masked, lithographed, etched, and built-up from the same semiconductor substrate as the previously mentioned laser-diode microhead-arrays, along with their support and control circuitry. For example, if the previously mentioned support circuitry is made from 'Silicon' based "Complementary Metal Oxide Semiconductor" (CMOS) semiconductor wafer-chips, the wafers being typically covered with a photo-resistant oxide material that is exposed to ultraviolet-light through a light blocking mask, which causes, using a photo-resist masking technique, the oxide-areas of the Silicon wafer not masked to be exposed to the ultraviolet-light becoming therein, photo-chemically altered, and later chemically developed to expose an underlying layer beneath the photo-resist oxide material.

Moreover, the newly exposed lower layers of semiconductor material are next chemically removed, or etched-out, leaving therein, empty areas in the wafer itself, where the empty areas can later be filled-in with various alloys or doped semiconductor and/or conducting materials creating therein, a CMOS based integrated circuit. Further, deposited between the laser-diode microhead-arrays and semiconductor support-circuitry are layers of non-conducting epitaxially deposited 'SiO$_2$' material, which is used as a fill-in insulating material for the non-conducting and iso-insulation areas present around every semiconductor and laser-diode or VCSEL microhead that is built into every Phase-Change Microhead Array Chip. The previously mentioned non-conducting 'SiO$_2$' insulating structures are also epitaxially or sputtered layer-upon-layer at the same time as the other semiconductor support circuitry also built into every Phase-Change Microhead Array Chip.

In addition, as illustrated in FIGS. 55 and 56, there is a ultra-violet VCSEL design, which is presented as an example of existing prior-art technology that utilizes 'electron/hole' recombination (i.e., injection) to produce a blue-green to ultra-violet laser-diode or VCSEL with a wavelength range between 435-nm to 350-nm. This VCSEL design is described in FIG. 58, using a section drawing, as a double heterojunction ultra-violet VCSEL based laser-diode, which displays different semiconductor layers as being built-up via "Molecular Beam Epitaxy" (MBE) or "Metal-Organic Vapor-Phase Epitaxy" (MOVPE). Moreover, an epitaxy structure, which comprises first, a metallic supporting substrate that is used as a back-reflecting mirror, while providing a base-structure for the growth of the VCSEL's 107 (FIGS. 55, 56, and 58) subsequent multitude of layers. Whereby, this base-structure, while conductive, and as an alternative embodiment, if composed of a "Nickel-Aluminum" (NiAl) alloy-mixture, serves as an electrode, having between an eight to twelve percent lattice mismatch, or more specifically a ten percent lattice mismatch to "Gallium-Nitride" (GaN), the ultra-violet VCSEL's principle construction material.

Nevertheless, "Nickel-Aluminum" (NiAl) is the typically preferred alloy-mixture for this kind of structure, while having a surface roughness of less than 15 Å thick, the before mentioned Ni—Al alloy-mixture, also displays a highly reflective property as well. Further, as illustrated in FIG. 58, what is also needed for constructing this VCSEL structure is a multi-layered epitaxial growth of "Aluminum-Nitride" (AlN), while each AlN layer being only a few atoms thick, the multiple AlN layers are utilized as a buffer-layer 123 (FIGS. 55, 56, and 58) for facilitating the epitaxial-growth of the subsequent multi-layers that will eventually comprise the VCSEL's and/or VCSEL based microhead-arrays.

In addition, is a first distributed Bragg reflector 126 (FIGS. 55, 56, and 58), which is epitaxially grown onto the previously mentioned multi-layered buffer 123 (FIGS. 55, 56, and 58), by using any suitable epitaxial deposition method, such as MBE or MOVPE. Moreover, a first distributed Bragg reflector 126 (FIG. 58) is composed of alternating layers of n-doped "Gallium-Nitride" (GaN) 126A (FIG. 58) and n-doped "Aluminum-Gallium-Nitride" (AlGaN) 126B (FIG. 58). Thereby, making a mirror-pair or one pair of refractive opposing reflectors (AlGaN/GaN), or more precisely two refractive alternating layers that completes one 'mirror-pair'. However, if additional mirror-pairs are required several more layers can be epitaxially deposited onto the last existing mirror-pair thus, producing additional mirror-pairs. Whereby, the number of mirror-pairs displayed is five to ten mirror-pairs 126A, 126B (FIG. 58), 126C, 126D (FIG. 58), 126E, 126F (FIG. 58), 126G, 126H (FIG. 58), while the actual number of mirror-pairs could range from fifty to one hundred mirror-pairs, depending on the laser emission frequency of the VCSEL in question.

Figure 58:
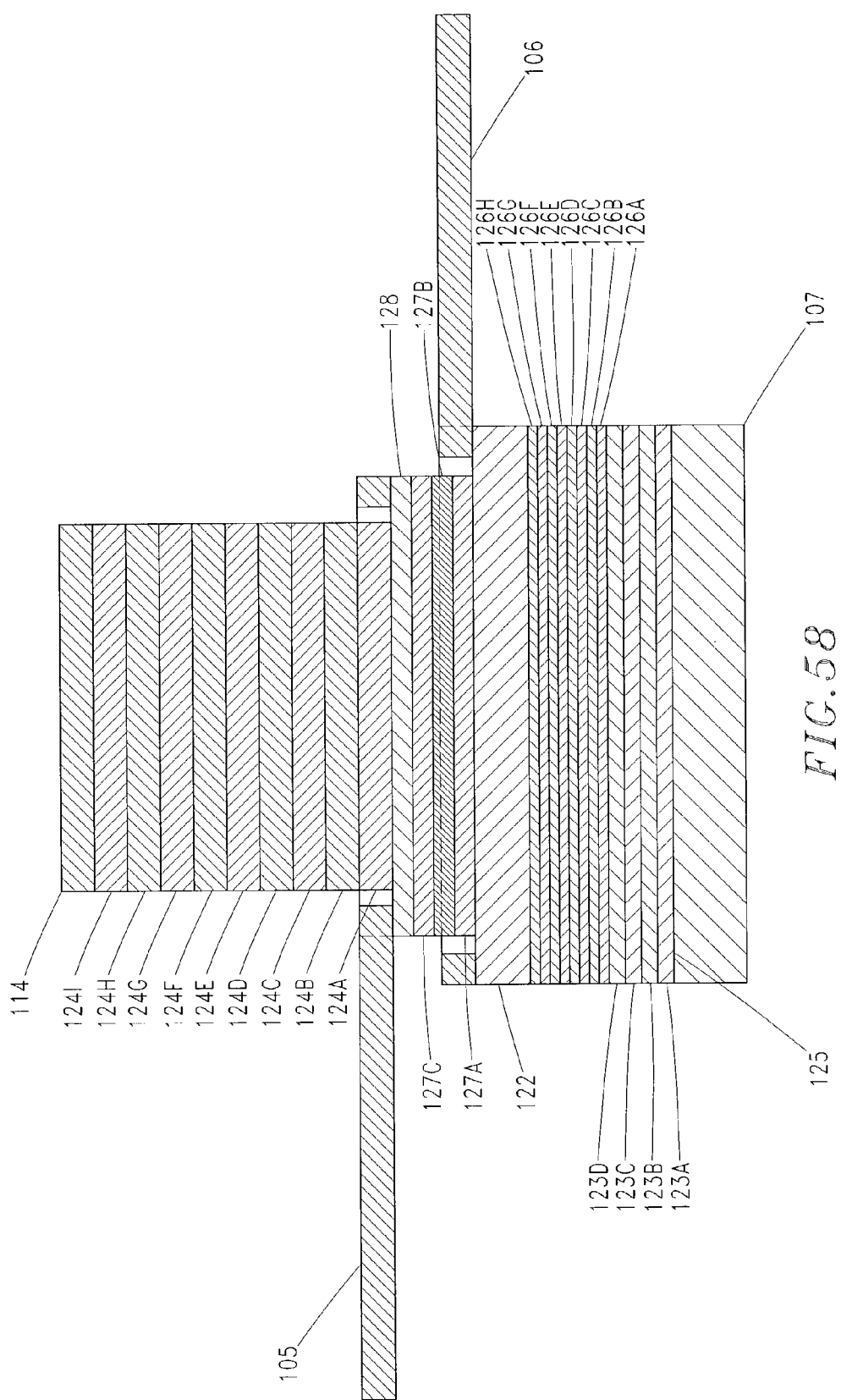
FIG. 58 is an orthographic side-view close-up drawing of a typical mesa-etched VCSEL device, which displays section 3-3 of FIG. 57 while illustrating the various layers and structures normally used in the construction of a typical prior art mesa-etched VCSEL device.

In addition, the second distributed Bragg reflector 124 (FIG. 58) is to be composed of alternating layers of "Aluminum-Oxide" (Al2O3) 124A (FIG. 58) and "Zinc-Oxide" (ZnO) 124B (FIG. 58). Thereby, making a mirror-pair or one pair of refractive opposing reflectors (Al2O3/ZnO), or more precisely two refractive alternating layers that completes one 'mirror-pair'. However, if additional mirror-pairs are required several more layers can be epitaxially deposited onto the last existing mirror-pair thus, producing additional mirror-pairs. Whereby, the number of mirror-pairs displayed is five to ten mirror-pairs 124A, 124B (FIG. 58), 124C, 124D (FIG. 58), 124E, 124F (FIG. 58), 124G, 124H (FIG. 58), 124I, 114 (FIG. 58), while the actual number of mirror-pairs could range from twenty-five to fifty mirror-pairs, depending on the laser emission frequency of the VCSEL in question.

However, it should be understood that the thickness and doping level of every epitaxial layer must be precisely controlled. Therefore, any deviation from design parameters, no matter how slight, would affect a typical VCSEL's performance (i.e., frequency range and flux intensity). For example, if a VCSEL microhead were designed to emit laser light with a frequency range, say 200- to 550-nm, the layers that go into its construction would typically need to be one-quarter of one wavelength of the laser emission 139 (FIG. 108A) emitted by the example VCSEL's emitter layer 114 (FIG. 58). In general, each distributed layer used in a distributed Bragg reflector, or more specifically distributed Bragg reflectors 126, 124 (FIGS. 55, 56, and 58), must have an optical thickness that is equal to one-quarter of one wavelength of a VCSEL's laser output emission.

Furthermore, the doping of the semiconductor layers used in the construction of the VCSEL microheads is accomplished by the addition of various dopant materials (e.g., gaseous n-type dopants and gaseous p-type dopants) during the epitaxial deposition of growth materials; causing the doping of the epitaxially deposited material. Typically, the semiconductor layers used in the construction of the VCSEL microheads will use many different dopant concentrations of specific dopant materials within their different intrinsic semiconductor structures, forming as a result extrinsic semiconductor structures. For example, the alternating layers of the first distributed Bragg reflector 126 (FIG. 58) are n-type and doped with 'Selenium', 'Silicon', or the like to a concentration that ranges from 1E15- to 1E20-$cm^3$ with a preferred range from 1E17- to 1E19-$cm^3$, while a nominal range would be from 5E17- to 5E18-$cm^3$ 124A (FIG. 58). Further, the percent of composition of the first distributed Bragg reflector 126 (FIG. 58) can be stated as (AlxGaxN/GaN), where x is the variable of "0.05" to "0.96", while in a preferred embodiment x would be greater than "0.8".

Therefore, once the plurality of alternating layers that are used in the before mentioned first distributed Bragg reflector 126 (FIG. 58) have been deposited on buffer layer 123 (FIG. 58), a first contact-layer 122 (FIG. 58), which is composed of highly n-doped "Gallium-Nitride" (GaN) material and epitaxially grown on top of the last alternating layer of the first distributed Bragg reflector 126 (FIG. 58). Additionally, the first contact-layer 122 (FIG. 58) will provide connectivity to a VCSEL's n-metal contact 106 (FIG. 58), but also enhances the reliability of a VCSEL, by preventing the migration of dislocations, and the like, to a VCSEL's active-region. Further, to prevent the overcrowding of the cladding-regions, each is shown as a single layer 127A, 127C (FIG. 58). However, it should be understood that each cladding-region can also be made of more than one layer 127A, 127C (FIG. 58) with each cladding-region epitaxially deposited onto the previous cladding-region 127A (FIG. 58). Where each cladding-region 127A, 127C (FIG. 58) is composed of any suitable doped or un-doped material, such as an n-doped and a p-doped "Aluminum-Gallium-Nitride" (AlGaN) epitaxially deposited material.

In addition, the active-region 127B (FIG. 58) of a VCSEL is also represented by a single layer and epitaxially deposited onto the first cladding-region 127A (FIG. 58). However, it should be understood that the previously mentioned active-region 127B (FIG. 58) can also include one or more barriers and quantum-wells; particularly, a first barrier-layer and a second barrier-layer with a quantum-well positioned between the previously mentioned first barrier-layer and the second barrier-layer, while the active-region 127B (FIG. 58) is composed of "Indium-Gallium-Nitride" (InGaN) epitaxially deposited material. Additionally, a second contact-layer 128 (FIG. 58), moreover a layer of highly p-doped "Gallium-Nitride" (GaN) material, which is epitaxially grown onto a VCSEL's second cladding-region 127C (FIG. 58). Further, where the previously mentioned second contact-layer provides connectivity to a VCSEL's p-metal contact 105 (FIG. 58).

In addition, is a second distributed Bragg reflector, which is made of a plurality of alternating layers 124, 114 (FIG. 58) that includes one or more layers of "Aluminum-Oxide" ($Al_2O_3$) material, which are illustrated as layers 124A, 124C, 124E, 124G, 124I (FIG. 58), and one or more layers of "ZincOxide" (ZnO) material, which are illustrated as layers 124B, 124D, 124F, 124H, 114 (FIG. 58). For example, a layer of "Aluminum-Oxide" ($Al_2O_3$), which is epitaxially deposited onto the second contact-layer 128 (FIG. 58), will have a layer of "Zinc-Oxide" (ZnO) subsequently, and epitaxially deposited onto itself. Thereby, making a first mirror-pair of dielectric (Al2O3/ZnO) reflectors 124A, 124B (FIG. 58). Further, if additional mirror-pairs are required several more layers of additional mirror-pairs can be deposited on the existing layers of $Al_2O_3$ and ZnO. Additionally, the plurality of alternating layers of the previously mentioned second distributed Bragg reflector 124 (FIG. 58) are formed from one mirror-pair to ten mirror-pairs with a preferred number of mirror-pairs ranging from four to five pairs. However, it should be understood that the number of mirror-pairs could be adjusted for specific applications.

In addition, is a p-metal electrical contact 105 (FIG. 58), which is formed on the second contact-layer 128 (FIG. 58) by disposing any suitable conductive material onto the top outermost surface of the previously mentioned second contact-layer 128 (FIG. 58), using a metal alloy such as Indium-Tin-Oxide, Gold, Zinc, Platinum, Tungsten, or Germanium as a construction material. Additionally, an n-metal electrical contact 106 (FIG. 58) is formed on the first contact-layer 122 (FIG. 58) by disposing any suitable conductive material onto the top outermost surface of the previously mentioned first contact-layer 122 (FIG. 58), using a metal alloy such as Indium-Tin-Oxide, Gold, Zinc, Platinum, Tungsten, or Germanium as a construction material. Further, it should be understood that depending upon which material is selected for the previously mentioned electrical contacts 105, 106 (FIG. 58), that a specific method of disposition, disposing, and patterning onto the previously mentioned first and second contact-layers 122, 128 (FIG. 58) for a specific material, will change along with that particular material's electrical contacts 105, 106 (FIG. 58).

Furthermore, the layers used to make-up the previously described double hetero-junction ultra-violet VCSEL's structures are listed below according to their ascending order of epitaxial deposition, and comprise:

i.) A double hetero-junction ultra-violet VCSEL's base-substrate back-reflecting mirror structure composed of "Nickel-Aluminum" (NiAl) alloy-mixture 107 (FIG. 58);

ii.) A double hetero-junction ultra-violet VCSEL's multi-layered buffer structure comprising four layers composed of "Aluminum-Nitride" (AlN) 123A, 123B, 123C, 123D (FIG. 58);

iii.) A double hetero-junction ultra-violet VCSEL's first distributed Bragg reflector 126 (FIG. 58) comprising alternating layers of n-doped "Gallium-Nitride" (GaN) 126A, 126C, 126E, 126G (FIG. 58) and n-doped "Aluminum-Gallium-Nitride" (AlGaN) 126B, 126D, 126F, 126H (FIG. 58);

iv.) A double hetero-junction ultra-violet VCSEL's first contact-layer composed of a highly n-doped "Gallium-Nitride" (GaN) material 122 (FIG. 58);

v.) A double hetero-junction ultra-violet VCSEL's n-metal contact 106 (FIG. 58);

vi.) A double hetero-junction ultra-violet VCSEL's first cladding-region composed of an n-doped "Aluminum-Gallium-Nitride" (AlGaN) material 127A (FIG. 58);

vii.) A double hetero-junction ultra-violet VCSEL's active-region comprising a single or multiple quantum-well composed of "Indium-Gallium-Nitride" (InGaN) material 127B (FIG. 58);

viii.) A double hetero-junction ultra-violet VCSEL's second cladding-region composed of a p-doped "Aluminum-GalliumNitride" (AlGaN) material 127C (FIG. 58);

ix.) A double hetero-junction ultra-violet VCSEL's second contact-layer composed of a highly p-doped "Gallium-Nitride" (GaN) material 128 (FIG. 58);

x.) A double hetero-junction ultra-violet VCSEL's p-metal contact 105 (FIG. 58);

xi.) A double hetero-junction ultra-violet VCSEL's second distributed Bragg reflector 124 (FIG. 58) comprising alternating layers of "Aluminum-Oxide" ($Al_2O_3$) material, which are illustrated as layers 124A, 124C, 124E, 124G, 124I (FIG. 58) and alternating layers of "Zinc-Oxide" (ZnO) material, which are illustrated as layers 124B, 124D, 124F, 124H, 114 (FIG. 58).

Furthermore, it should be noted that a double hetero-junction ultra-violet VCSEL's second contact-layer 128 (FIG. 58), second cladding-region 127C (FIG. 58), quantum-well active-region 127B (FIG. 58), and first cladding-region 127A (FIG. 58) are altogether mesa-etched, and therefore define the overall mesa structure of the VCSEL (FIG. 58), while their diameters will remain substantially larger than the VCSEL's emission aperture 114 (FIG. 58), and its operating vertical cavity.

In addition, is a p-metal contact 105 (FIG. 58), which is deposited upon the VCSEL's second contact-layer 128 (FIG. 58), leaving the VCSEL's emission aperture area open 114 (FIG. 58). Further, an n-metal contact is deposited upon the first contact-layer 122 (FIG. 58), or as an alternative the previously mentioned n-metal contact is deposited upon the VCSEL's back-reflecting metal-alloy based substrate layer 107 (FIGS. 55, 56, and 58). Whereby, the previously mentioned back-reflecting metal-alloy based substrate layer 107 (FIGS. 55, 56, and 58), in conjunction with the "Aluminum-Gallium-Nitride/Gallium-Nitride" (AlGaN/GaN) based distributed Bragg reflector, provides for approximately 99% of the VCSEL's reflectivity.

Figure 57:
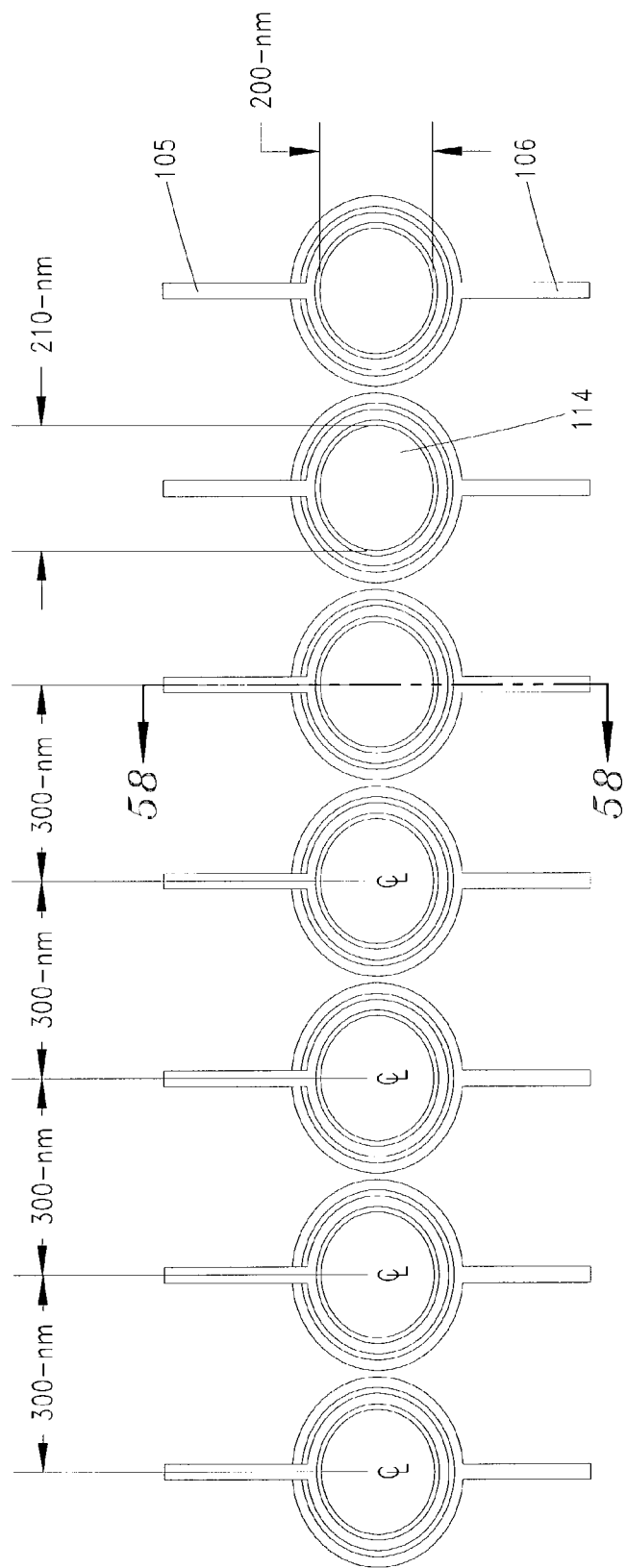
FIG. 57 is an orthographic plan-view close-up drawing of seven Phase-Change Microhead Array Chip VCSEL microheads that display section lines 2-2 and 3-3, but the drawing also illustrates the diameter and the spacing dimensions for each of the seven Phase-Change Microhead Array Chip VCSEL microheads shown.

Moreover, as illustrated in FIG. 57, the VCSEL microheads present within a Phase-Change Microhead Array Chip's microhead-array, would typically have a centerline-to-centerline dimension of approximately 300-nm (FIGS. 53, 54, and 57), while the same VCSELs would have an elliptical dimension ranging from 210-nm length×200-nm width to 1010-nm length×1000-nm width for their emission aperture layers 114 (FIG. 58). Additionally, the previously mentioned and novel elliptical shape of the double hetero-junction ultraviolet VCSEL microheads (FIGS. 47 and 48) will cause the laser-emission output from VCSEL based microheads to exhibit stable polarity.

Furthermore, the before mentioned two reversed-biased "Cadmium Sulfide" (CdS) based "Semiconductor Photo-Conductor" (SPC) photo-detectors or photo-detector arrays 103, 104, 107, 108 (FIGS. 41, 42, 43, 44, 45, 46, 47, 48, 49, 50, 51, and 52), or as an alternative embodiment, two reversed-biased "Silicon" (Si) based "Semiconductor Photo-Diode" (SPD) photo-cell detectors or photo-cell detector arrays. Additionally, since the two reversed-biased SPC and SPD photo-detectors or photo-detector arrays 103, 104, 107, 108 (FIGS. 41 and 42) are incapable of detecting frequencies of ultra-violet light; they are coated with a phosphorous material like "Coronene" or "Liumogen" to convert disk-reflected ultra-violet light into detectable frequencies of visible light.

Detailed Operation—FIGS. 62A, 63A, 62B, 63B, 62C, and 63C

The first and simplest embodiment of the present Phase-Change Microhead Array Chip Hard Disk Drive invention is based upon a shared bus-system, which is thoroughly described in the proceeding paragraphs along with the SCSI or IDE interface protocols a shared bus-system would use in communicating with a host computer system.

Moreover, a detailed description of a Phase-Change Microhead Array Chip Hard Disk Drive's operation typically begins with the initialization of the Phase-Change Microhead Array Chip Hard Disk Drive itself, which occurs by first performing a boot-up of its operating system and the running of its pre-check protocols. Thereafter, a Phase-Change Microhead Array Chip Hard Disk Drive will normally begin its regular operation with either a host-requested read-data or host-requested write-data disk-operation.

For example, during a read-data disk-operation a Phase-Change Microhead Array Chip Hard Disk Drive's Disk Controller will first forward a host-requested cylinder/track and data-sector address location to a Phase-Change Microhead Array Chip Hard Disk Drive's 'Asynchronous Optical Microhead Address Controller' 63 (FIG. 4), 80 (FIG. 5) for translation and analysis. Wherein, an 'Asynchronous Optical Microhead Address Controller', which is located on a Phase-Change Microhead Array Chip Hard Disk Drive Controller's "Printed Circuit Board" (PCB) 63 (FIG. 4), 80 (FIG. 5), will temporarily store the host-requested address locations in an Asynchronous Optical Microhead Address Controller's 'Address Translation Register', which is located in the Asynchronous Optical Microhead Address Controller's 'Address Unit'.

Next, an 'Asynchronous Optical Microhead Address Controller' will translate and analysis the address location information stored in an Asynchronous Optical Microhead Address Controller's 'Address Translation Register' into executable control-code. Wherein, the 'control-code' will be used to execute the host-selection of one particular Phase-Change Microhead Array Chip, which contains a stationary microhead-array that contains a stationary microhead laser-diode located above one particular cylinder/track and data-sector location containing the host-requested data.

Moreover, host-selection of a Phase-Change Microhead Array Chip and the microheads it contains are executed through a bus-system that is collectively shared by all installed Phase-Change Microhead Array Chips. This bus-system comprises of a group of cables that connect all installed Phase-Change Microhead Array Chips into a daisy-chained configuration, and is used to send microhead address location and chip-control bus-signals to all Phase-Change Microhead Array Chips that are installed into a Phase-Change Microhead Array Chip Hard Disk Drive's unit-assembly.

However, before a read-data disk-operation can take place the 'Asynchronous Optical Microhead Address Controller' must first select and enable one particular Phase-Change Microhead Array Chip from a group of other installed chips. While this selection process is similar to the read/write data-head selection process used by conventional hard disk drives, it has several differences. This is because unlike flying data-head devices every installed Phase-Change Microhead Array Chip is comprised as a stationary device (i.e., always in one place), which contains a stationary microhead-array that comprises a multitude of stationary and singularly addressable laser-diode microheads 1 (FIGS. 41, 42, 43, and 44).

In addition, the previously mentioned Phase-Change Microhead Array Chip process of selection is first initialized by executing a "Chip Select" (–CS) chip-control bus-signal (FIG. 64A, FIG. 64B), which is one of two control-signals responsible for the selection of a Phase-Change Microhead Array Chip amongst many that are collectively connected together in a Phase-Change Microhead Array Chip Hard Disk Drive's unit-assembly. Further, a Phase-Change Microhead Array Chip's chip selection process is accomplished by using point-to-point individual –CS chip-control bus-lines. Wherein, one point-to-point chip-control bus-line is dedicated to and for each Phase-Change Microhead Array Chip installed into a Phase-Change Microhead Array Chip Hard Disk Drive's unit-assembly (i.e., eight installed Phase-Change Microhead Array Chips would each have its own separate 'Chip Select' point-to-point control bus-line).

Subsequently, as illustrated in FIG. 17, 18, 19, 20, 21, 22, 23, and 24, the previously mentioned –CS point-to-point chip-control bus-lines are each redirected from their bus-line flex-cable connector location, which is present on every chip-positioning circuit board, to a chip-positioning circuit board surface-mounted chip-socket's input-contact assigned as pin-number "38". Further, the redirection of the "Chip Select" (–CS) point-to-point chip-control bus-lines, which are located on every chip-positioning circuit board that is installed into a Phase-Change Microhead Array Chip Hard Disk Drive's unit-assembly is based upon a cross-connect design, which uses a different and redirected –CS line that is unique to each chip-positioning circuit board, to its circuit-trace architecture, and to the Phase-Change Microhead Array Chip installed into its chip-positioning circuit board's surface-mounted chip-socket.

Therefore, a Phase-Change Microhead Array Chip chip-positioning circuit board surface-mounted chip-socket's input-contact labeled as pin-number "38", and a single chip-positioning circuit board's Polymer flex-cable connector input are together cross-connected, using a different Polymer flex-cable connector input contact location that is unique to each chip-positioning circuit board and the Phase-Change Microhead Array Chip installed therein.

Moreover, giving individual 'chip select' control over every Phase-Change Microhead Array Chip installed into a Phase-Change Microhead Array Chip Hard Disk Drive's unit-assembly. Further, there are eight different examples of redirected "Chip Select" (–CS) chip-selection chip-positioning circuit board cross-connects used within the first embodiment of the Phase-Change Microhead Array Chip Hard Disk Drive.

Figure 17:
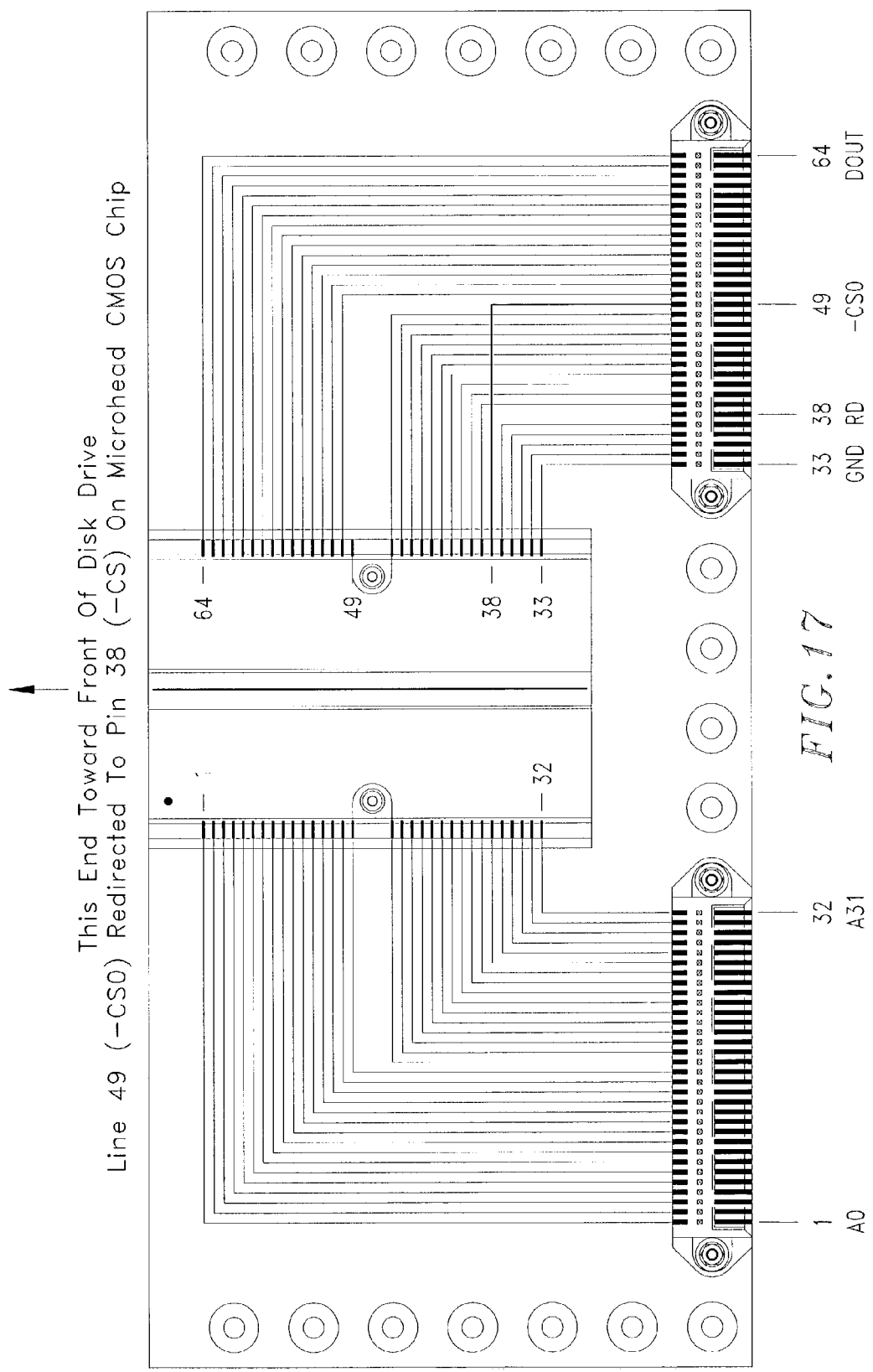
FIG. 17 is a plan-view drawing of a chip-positioning circuit board that displays a "Redirection" (RD) of the "Chip Select" (−CS) line for Phase-Change Microhead Array Chip number 1, which is positioned for disk-platter one's bottom-side, also labeled side-one of disk-platter one.

In addition, as FIG. 17 illustrates, the –CS Polymer flex-cable input bus-line "49", also called "Chip Select 0" (–CS0), is physically redirected to the surface-mounted chip-socket's contact-input labeled as pin-number "38" (FIGS. 11 and 12), which is present in all Phase-Change Microhead Array Chips.

Figure 18:
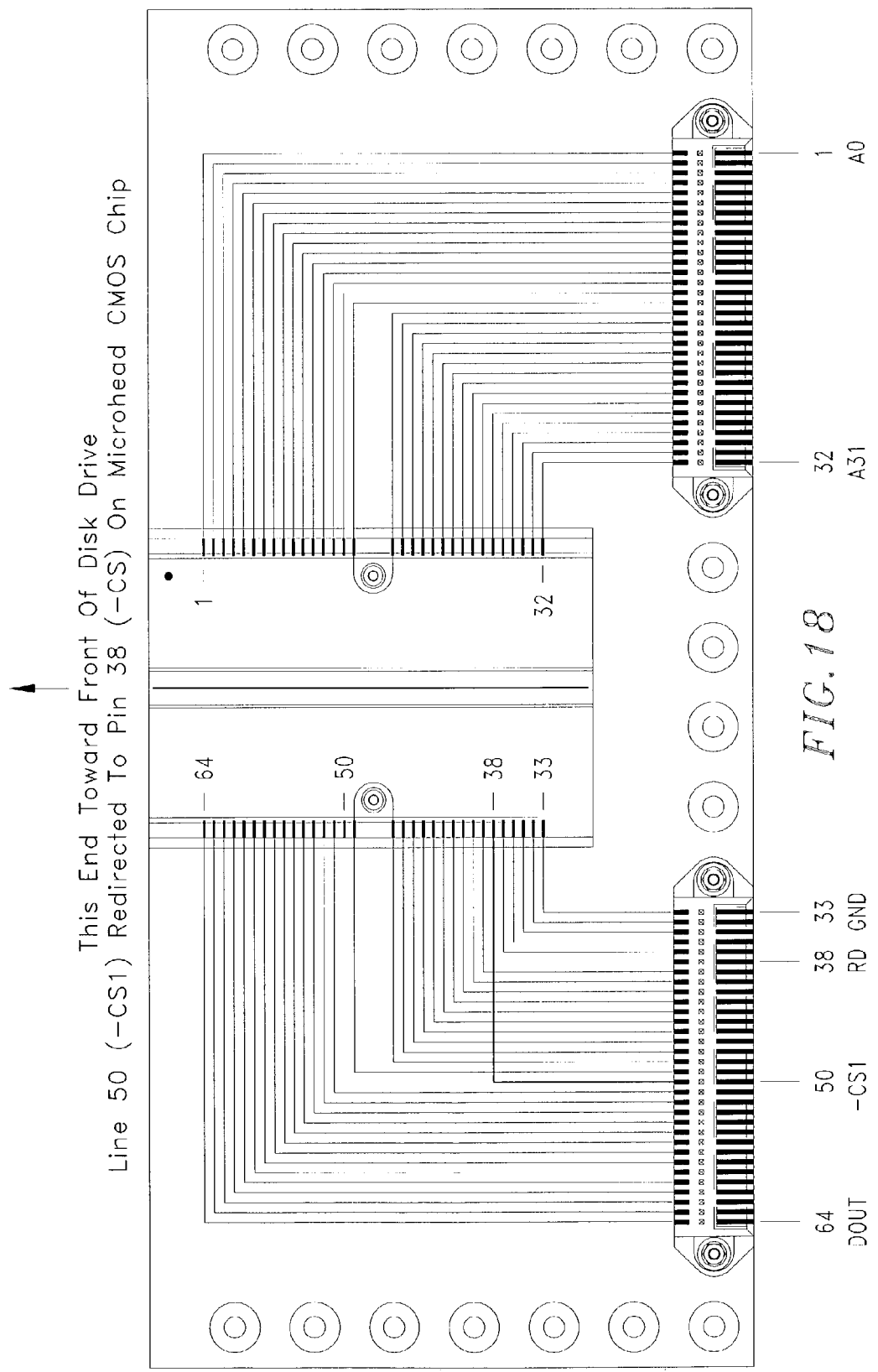
FIG. 18 is a plan-view drawing of a chip-positioning circuit board that displays a RD of the −CS line for Phase-Change Microhead Array Chip number-2, which is positioned for disk-platter one's topside, also labeled side-two of disk-platter one.

In addition, as FIG. 18 illustrates, the –CS Polymer flex-cable input bus-line "50", also called "Chip Select 1" (–CS1), is physically redirected to the surface-mounted chip-socket's contact-input labeled as pin-number "38" (FIGS. 11 and 12), which is present in all Phase-Change Microhead Array Chips.

Figure 19:
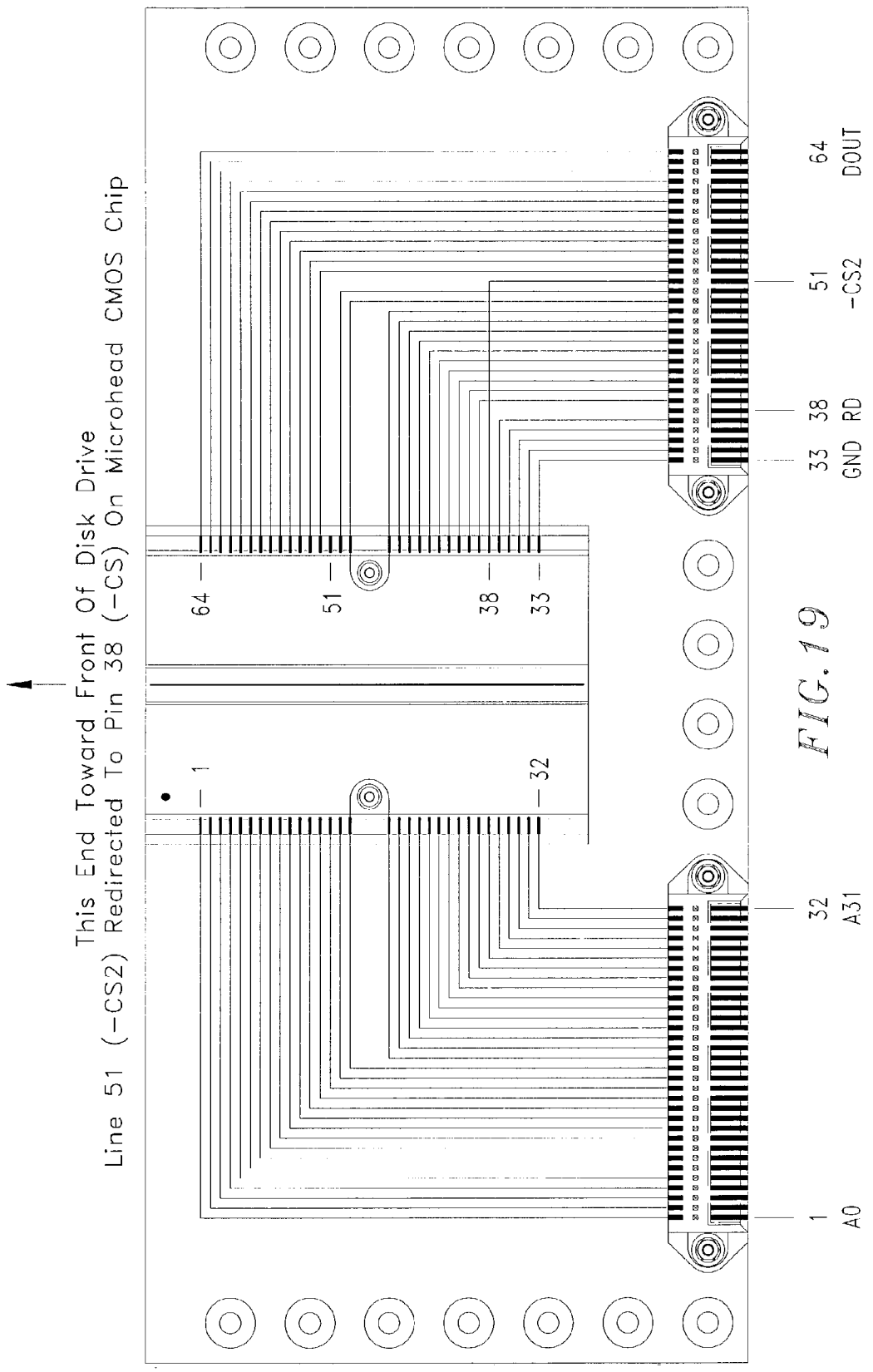
FIG. 19 is a plan-view drawing of a chip-positioning circuit board that displays a RD of the −CS line for Phase-Change Microhead Array Chip number-3, which is positioned for disk-platter two's bottom-side, also labeled side-one of disk-platter two.

In addition, as FIG. 19 illustrates, the –CS Polymer flex-cable input bus-line "51", also called "Chip Select 2" (–CS2), is physically redirected to the surface-mounted chip-socket's contact-input labeled as pin-number "38" (FIGS. 11 and 12), which is present in all Phase-Change Microhead Array Chips.

Figure 20:
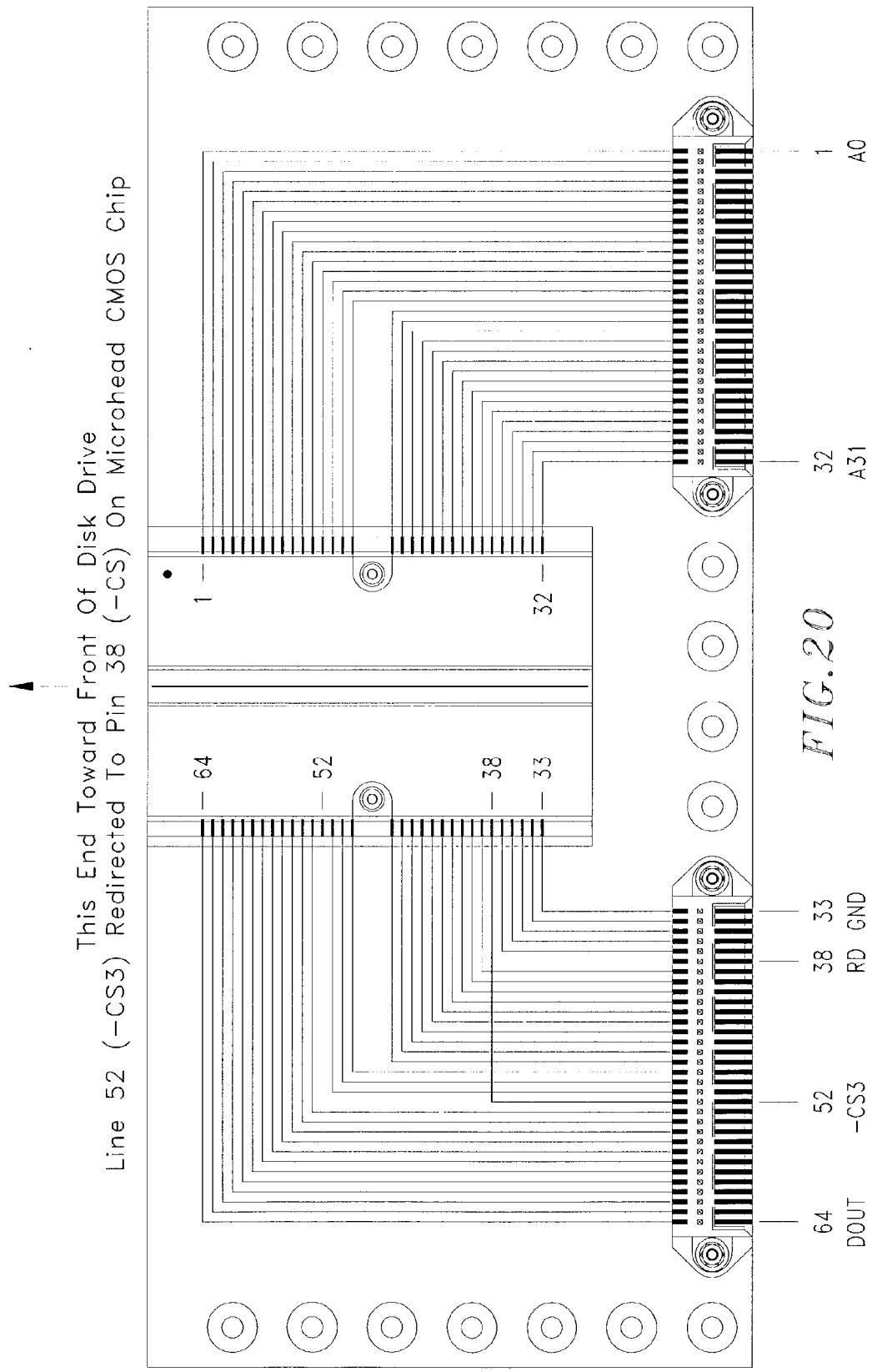
FIG. 20 is a plan-view drawing of a chip-positioning circuit board that displays a RD of the −CS line for Phase-Change Microhead Array Chip number-4, which is positioned for disk-platter two's top-side, also labeled side-two of disk-platter two.

In addition, as FIG. 20 illustrates, the –CS Polymer flex-cable input bus-line "52", also called "Chip Select 3" (–CS3), is physically redirected to the surface-mounted chip-socket's contact-input labeled as pin-number "38" (FIGS. 11 and 12), which is present in all Phase-Change Microhead Array Chips.

Figure 21:
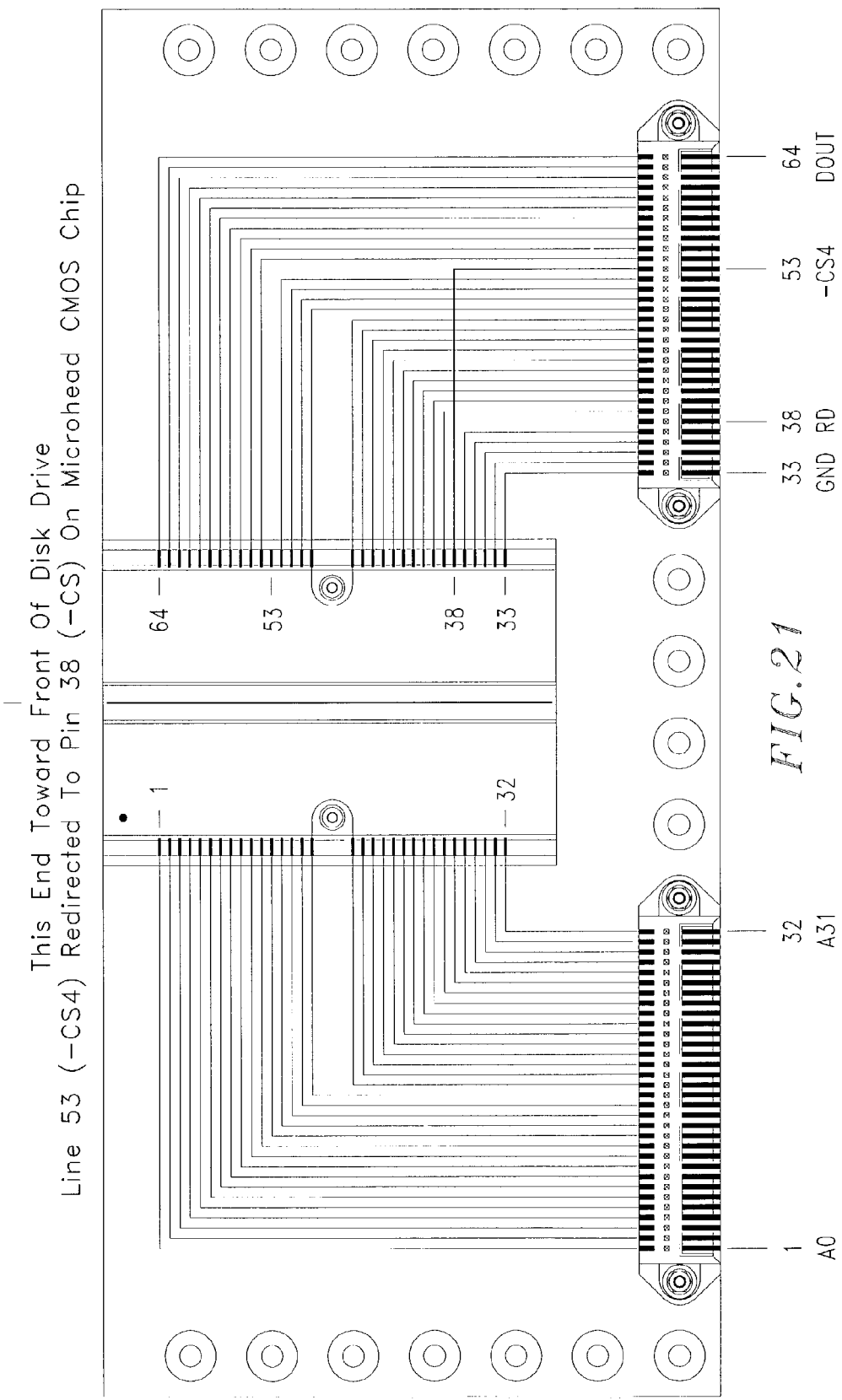
FIG. 21 is a plan-view drawing of a chip-positioning circuit board that displays a RD of the −CS line for Phase-Change Microhead Array Chip number-5, which is positioned for disk-platter three's bottom-side, also labeled side-one of disk-platter three.

In addition, as FIG. 21 illustrates, the –CS Polymer flex-cable input bus-line "53", also called "Chip Select 4" (–CS4), is physically redirected to the surface-mounted chip-socket's contact-input labeled as pin-number "38" (FIGS. 11 and 12), which is present in all Phase-Change Microhead Array Chips.

Figure 22:
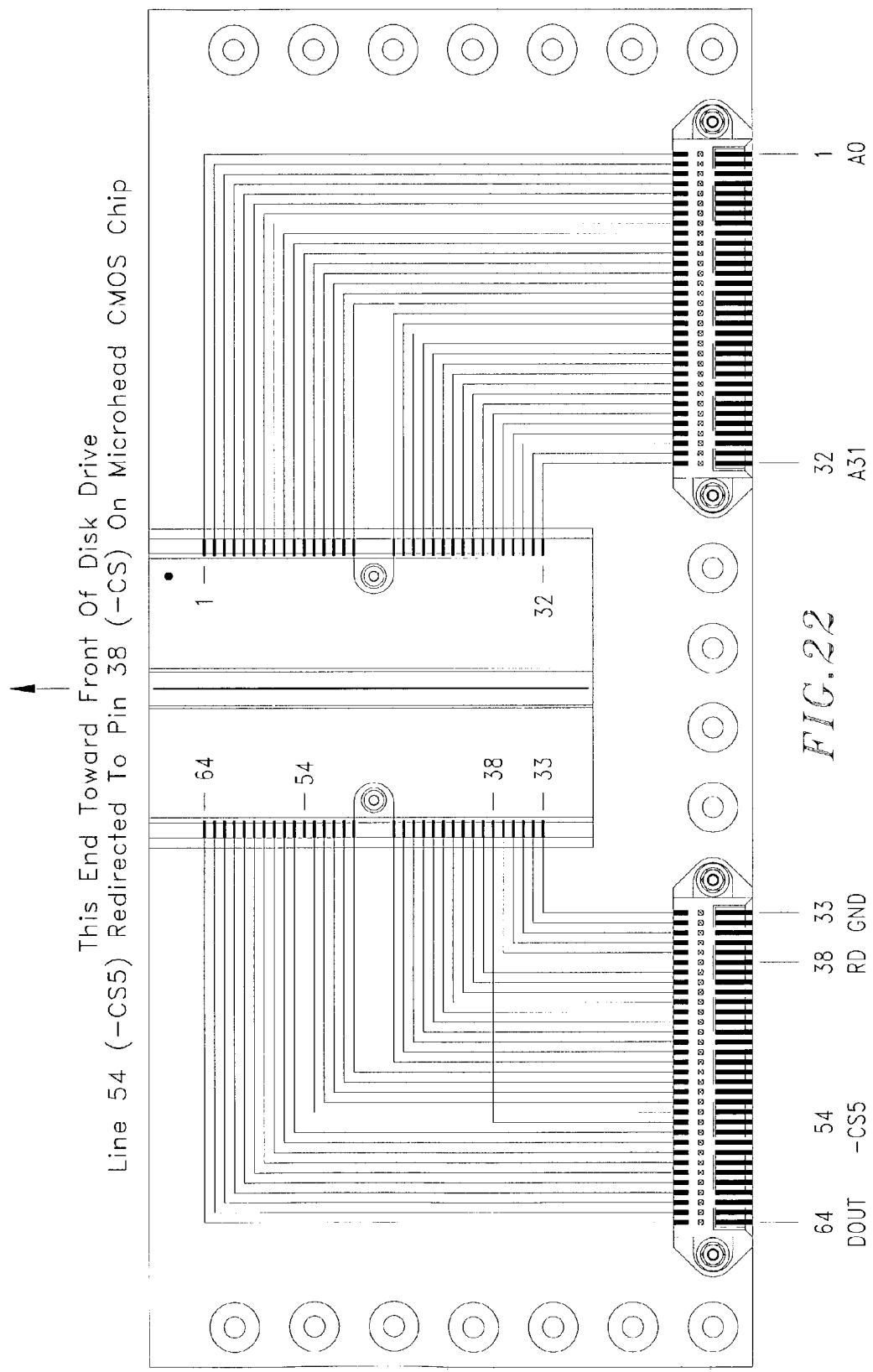
FIG. 22 is a plan-view drawing of a chip-positioning circuit board that displays a RD of the −CS line for Phase-Change Microhead Array Chip number-6, which is positioned for disk-platter three's top-side, also labeled side-two of disk-platter three.

In addition, as FIG. 22 illustrates, the –CS Polymer flex-cable input bus-line "54", also called "Chip Select 5" (–CS5), is physically redirected to the surface-mounted chip-socket's contact-input labeled as pin-number "38" (FIGS. 11 and 12), which is present in all Phase-Change Microhead Array Chips.

Figure 23:
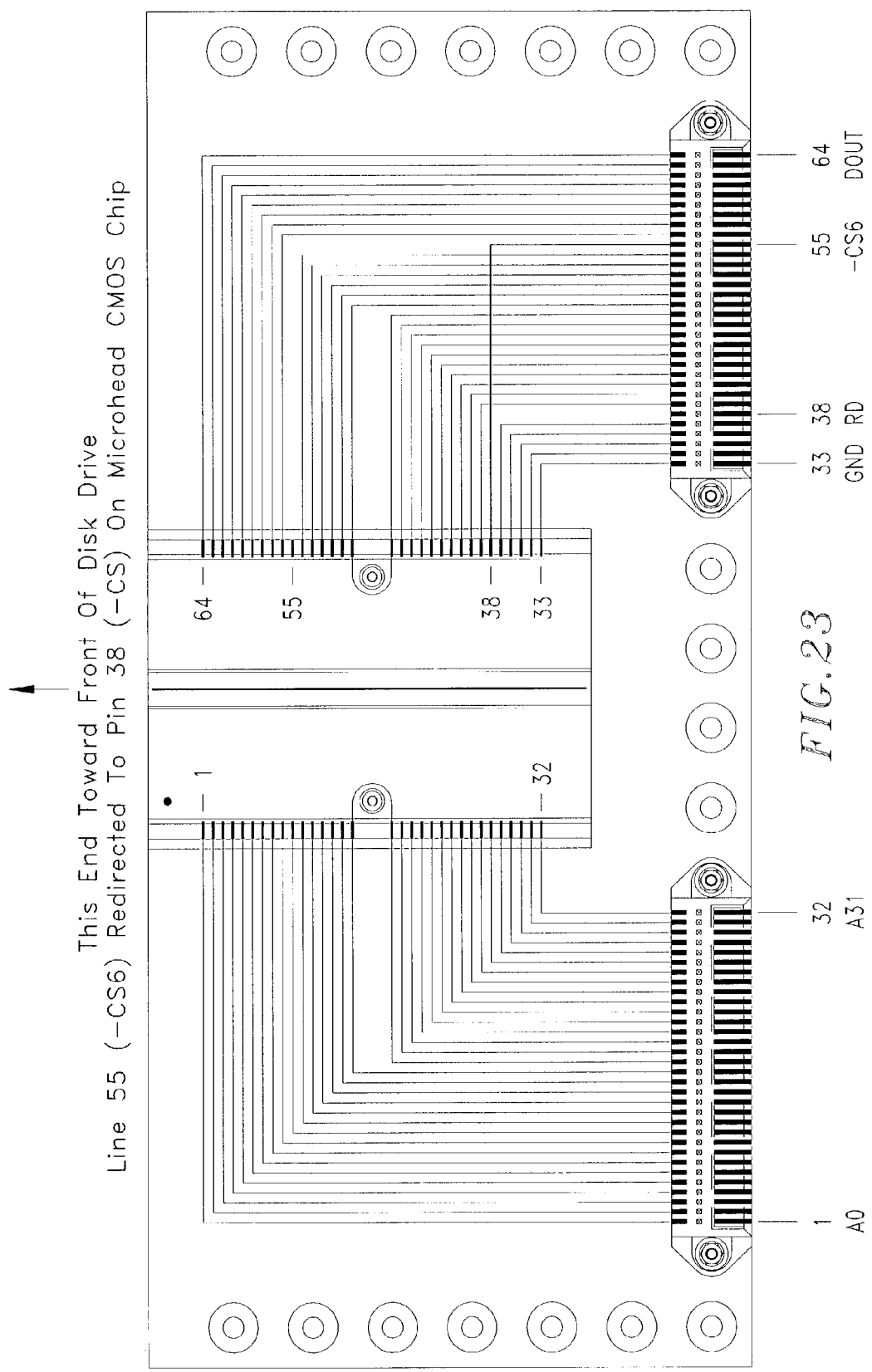
FIG. 23 is a plan-view drawing of a chip-positioning circuit board that displays a RD of the −CS line for Phase-Change Microhead Array Chip number-7, which is positioned for disk-platter four's bottom-side, also labeled side-one of disk-platter four.

In addition, as FIG. 23 illustrates, the –CS Polymer flex-cable input bus-line "55", also called "Chip Select 6" (–CS6), is physically redirected to the surface-mounted chip-socket's contact-input labeled as pin-number "38" (FIGS. 11 and 12), which is present in all Phase-Change Microhead Array Chips.

Figure 24:
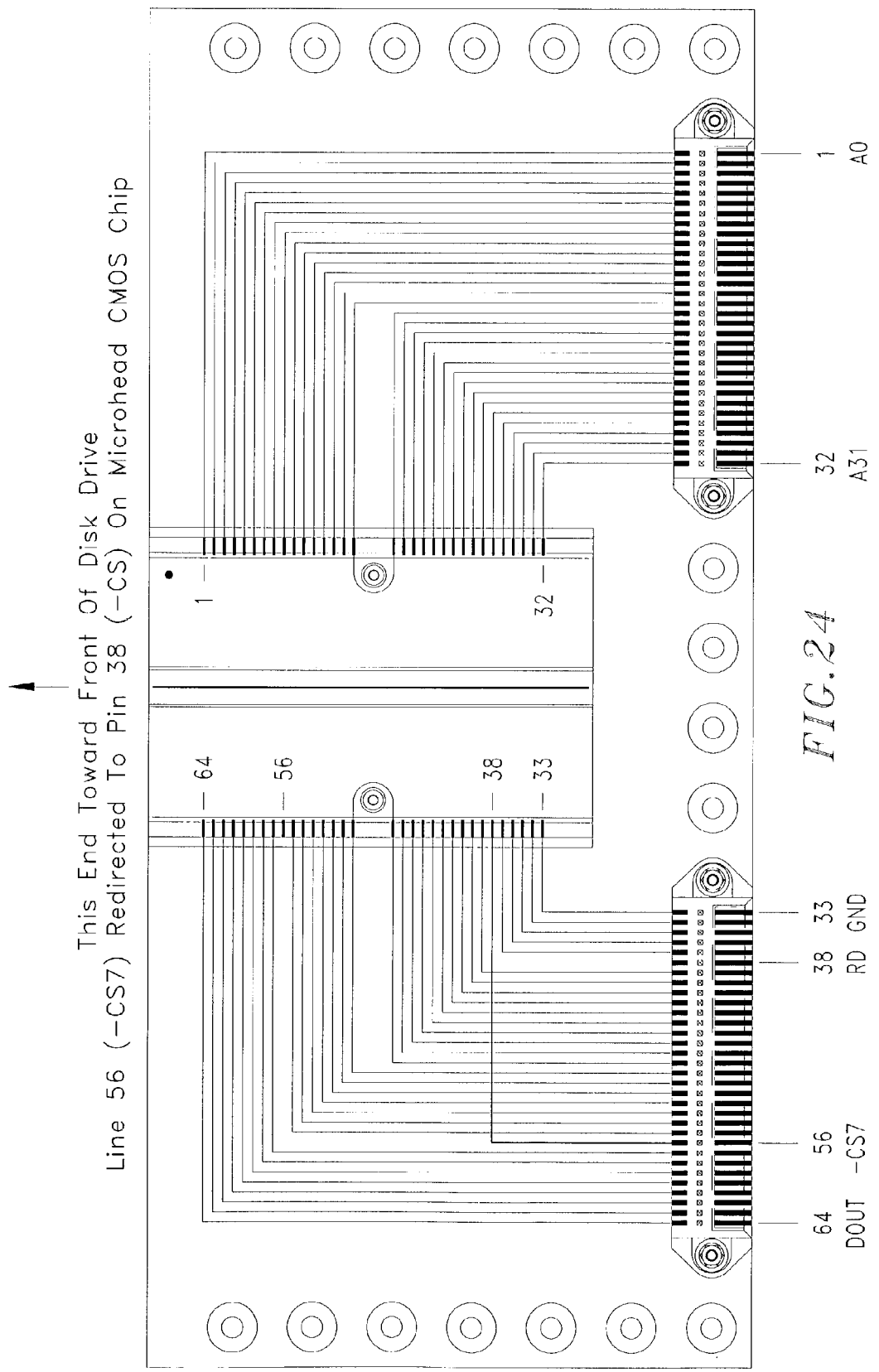
FIG. 24 is a plan-view drawing of a chip-positioning circuit board that displays a RD of the −CS line for Phase-Change Microhead Array Chip number-8, which is positioned for disk-platter four's top-side, also labeled side-two of disk-platter four.

In addition, as FIG. 24 illustrates, the –CS Polymer flex-cable input bus-line "56", also called "Chip Select 7" (–CS7), is physically redirected to the surface-mounted chip-socket's contact-input labeled as pin-number "38" (FIGS. 11 and 12), which is present in all Phase-Change Microhead Array Chips.

Furthermore, since there is one unique (i.e., non-bused point-to-point) "Chip Select" (–CS) bus-line available for each of the installed "8" Phase-Change Microhead Array Chips, using cross-connected circuitry each of the installed "8" Phase-Change Microhead Array Chips can now be individually selected and controlled during any read-data disk-operation. The connectivity of the Phase-Change Microhead Array Chip 'Chip-Selection' circuitry is illustrated in drawing FIGS. 60A, 61A, 60B, 61B, 60C, and 61C.

Another preferred embodiment of the present Phase-Change Microhead Array Chip Hard Disk Drive invention, as illustrated in drawing FIGS. 4 and 5, describes a Phase-Change Microhead Array Chip's read-channel and the pathway of its output-signal. Further, to start with the previously mentioned Phase-Change Microhead Array Chip's read-channel and the pathway of its output-signal begins at a Phase-Change Microhead Array Chip's two reversed-biased "Cadmium Sulfide" (CdS) based "Semiconductor Photo-Conductor" (SPC) photoconductor-array read-elements 103, 104, 107, 108 (FIGS. 41, 42, 43, 44, 45, 46, 47, 48, 49, 50, 51, and 52), or as an alternative embodiment, begins with the two reversed-biased "Silicon" (Si) based "Semiconductor Photo-Diode" (SPD) photocell-array read-elements, as illustrated in FIGS. 64A, 64B, 64C, 64D, and 64E.

Moreover, as 'optical transitions', previously recorded on a Phase-Change Microhead Array Chip Hard Disk Drive disk-platter's data-surface, pass under a selected microhead's low-intensity data-scanning 'Read Laser' output emission, the two reversed-biased SPD photocell-array read-elements mentioned before generate output-voltages from the reflected light they receive as the previously mentioned disk-platters rotate under the pre-selected laser-diode or VCSEL microhead's 'Read Laser' output emission. Further, the read-channel output-signals created therein will be passed from the two reversed-biased SPD photocell-array read-elements to the read-element's "Semiconductor Photo-Diode Analog-signal 1" (SPDAS1) and "Semiconductor Photo-Diode Analog-signal 2" (SPDAS2) inputs for pre-amplification and signal encoding, as illustrated in FIGS. 64A, 64C, 79, 80, 81, 82, 83, 84, 85, and 85. Wherein, the pre-amplification of a selected microhead's data-stream signal-output will occur during a Phase-Change Microhead Array Chip Hard Disk Drive's read-data disk-operation. In-conclusion, the following paragraphs contain a detailed description of a Phase-Change Microhead Array Chip's entire read-data disk-operation as its occurs during a read-channel's reading of data-sectors, which is thoroughly defined from its beginning (i.e., the host-systems request for data stored on a particular disk-platter) to its end (i.e., the host-systems reception of the requested data).

Moreover, a read-data disk-operation actually begins when a Phase-Change Microhead Array Chip Hard Disk Drive's Disk Controller has received a read-data request from a host computer system; moreover, a request to read-data from a particular disk-platter's cylinder/track containing a disk-sector or disk-sectors identified as containing host-requested data. For example, a host-system sends a read-data request to a Phase-Change Microhead Array Chip Hard Disk Drive's Disk Controller, through a computer system's IDE or SCSI interface, where it is received by a Disk Controller's 'Optical Microhead And Disk Controller With IDE or SCSI Interface' module.

Moreover, the request might look something like this: Request data-read using—disk id: "0", data-head number: "5", cylinder/track address-number: "4562", data-sector address-number: "43". Whereby, the 'Asynchronous Optical Microhead Address Controller' module 63 (FIGS. 60A and 59), 80 (FIGS. 61A and 61C), 63 (FIGS. 62A and 62B), 80 (FIGS. 63A and 63C) when it receives the request from the Disk Controller it will sample and hold the request within its 'Disk Controller Interface Register', where it will be held until a different request is requested by the host-system or the read-data disk-operation has been completed. Further, an Asynchronous Optical Microhead Address Controller's 'Address Translator' will translate and analysis the information contained within a 'Disk Controller Interface Register' and convert them into executable code the Asynchronous Optical Microhead Address Controller can use to activate the required Phase-Change Microhead Array Chip's 'Address Latch And Chip-Select Circuit' bus-system signal-lines.

Moreover, to execute control over a particular Phase-Change Microhead Array Chip, an Asynchronous Optical Microhead Address Controller's 'Address Translator' (FIGS. 62A, 63A, 62C, and 63C) will first tell the Asynchronous Optical Microhead Address Controller's 'Address Unit' that Phase-Change Microhead Array Chip Number "5" is to be selected, moreover being equivalent to a conventional flying data-head numbered as "5". Wherein, an Asynchronous Optical Microhead Address Controller's response will be to enable the point-to-point "Chip Select" line-number "4" (–CS4) (i.e., examples of the chip select lines available in the present invention are here listed as CS0, CS1, CS2, CS3, CS4, CS5, CS6, and CS7) with a logic-low chip-control bus-signal, as illustrated in FIGS. 60A, 61A, 60B, 61B, 60C, and 61C. This begins the process that executes the addressed selection of a single Phase-Change Microhead Array Chip, which is chosen because of its stationary location above the host-requested data-sectors present on disk-surface number "5".

In addition, as illustrated in FIGS. 62A, 63A, 62B, 63B, 62C, and 63C, a "Chip Select" (–CS) logic-low chip-control bus-signal will make the Phase-Change Microhead Array Chip number "5" the only Phase-Change Microhead Array Chip connected to a Phase-Change Microhead Array Chip Hard Disk Drive's shared microhead addressing bus-system able to latch into its 'Address Latch And Chip Select Circuit' (FIGS. 64A, 64B, and 64E) a single microhead's 32-bit address-location number, which is sent down a Phase-Change Microhead Array Chip Hard Disk Drive's thirty-two microhead addressing bus-system's thirty-two address-lines to every Phase-Change Microhead Array Chip connected to the shared microhead addressing bus-system.

However, at the same time as the shared 32-bit microhead addressing bus-system sends the (i.e., cylinder/track) address number "4562" down its thirty-two lines, which are connected in parallel to all Phase-Change Microhead Array Chips installed into a Phase-Change Microhead Array Chip Hard Disk Drive's unit-assembly, a chip-control bus-system's logic-low control-signal called the "Address Strobe" (–AS) will be sent down the chip-control bus-system's –AS signal-line to an input-contact labeled as pin-number "37" (FIGS. 11 and 12) for every installed Phase-Change Microhead Array Chip. Only when a simultaneous and combined transmission of logic-low chip-control bus-signals are sent down both the "Chip Select 4" (–CS4) selection line-number "5" to input-contact labeled as pin-number "38", and the "Address Strobe" (–AS) to input-contact labeled as pin-number "37" (FIGS. 65, 66, 67, and 68), will the Phase-Change Microhead Array Chip number "5" be selected for executing the host-requested read-data disk-operation. Conclusion, only the Phase-Change Microhead Array Chip number "5" is selected to latch (FIGS. 70A and 70B), into its tri-stated 'Address Latch And Chip Select Circuit', (FIGS. 69, 70A, and 70B) the previously mentioned cylinder/track location address-number "4562". The 32-bit address-number "4562" will stay latched into a Phase-Change Microhead Array Chip's tri-stated 'Address Latch And Chip Select Circuit' as long as the previously mentioned –CS4 and –AS bus-lines continue to have logic-low chip-control bus-signals present on their bus-lines. Further, a Phase-Change Microhead Array Chip's microhead addressing shared bus-system connection consists of a 32-bit input of thirty-two contacts, which are assigned numbers "A0" through "A31", as illustrated in FIGS. 11, 12, 13, and 14.

Figures 70A, 70B:
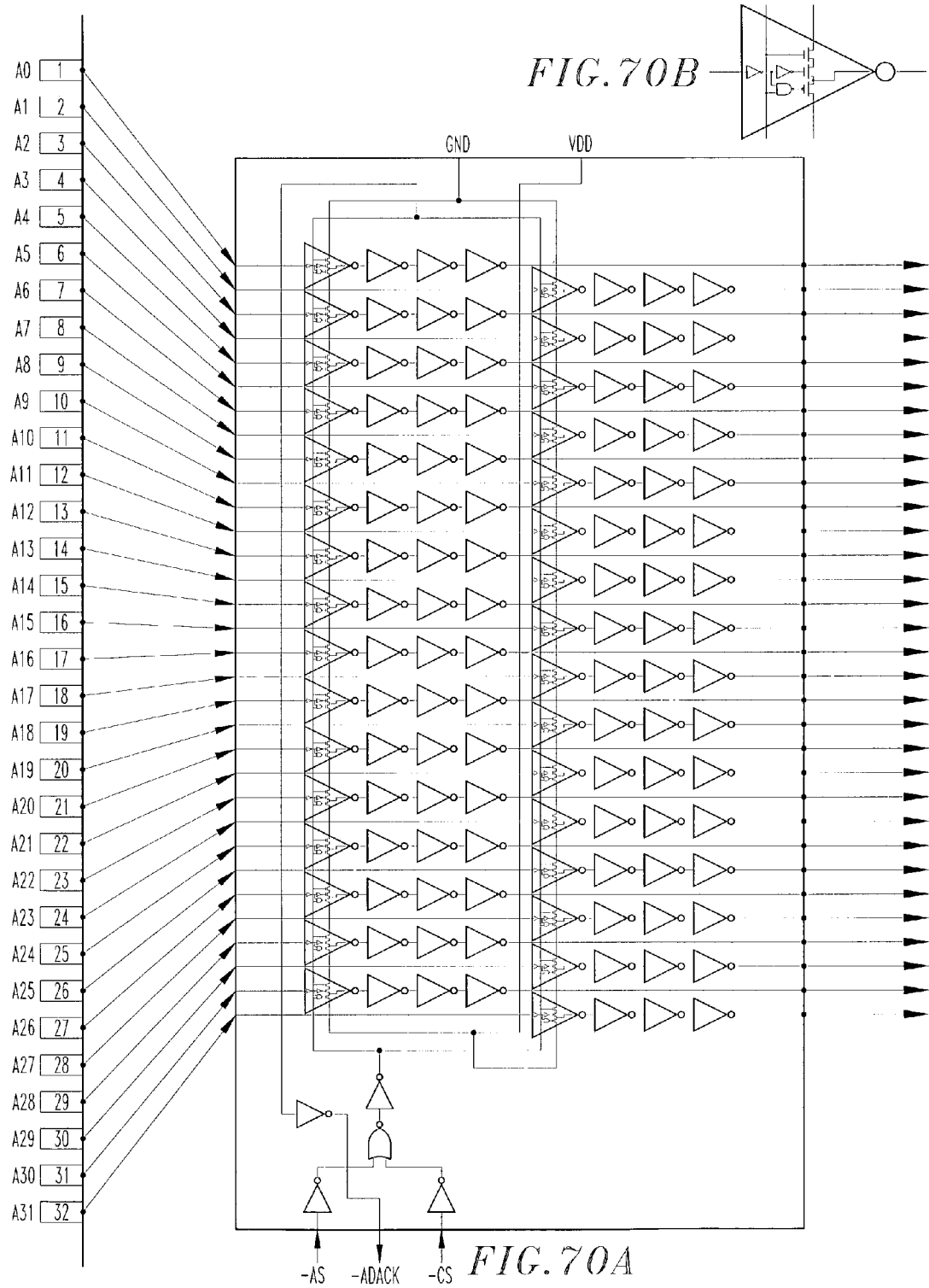
FIG. 70A is a circuit-diagram drawing of the 32-bit Address-Latch And Chip-Select circuit used in the Phase-Change Microhead Array Chip design, which displays circuit configurations of the Address-Latch And Chip-Select circuit.
FIG. 70B is an auxiliary circuit-diagram drawing showing circuit details of the buffers used in the Address-Latch circuit.
Figure 71:
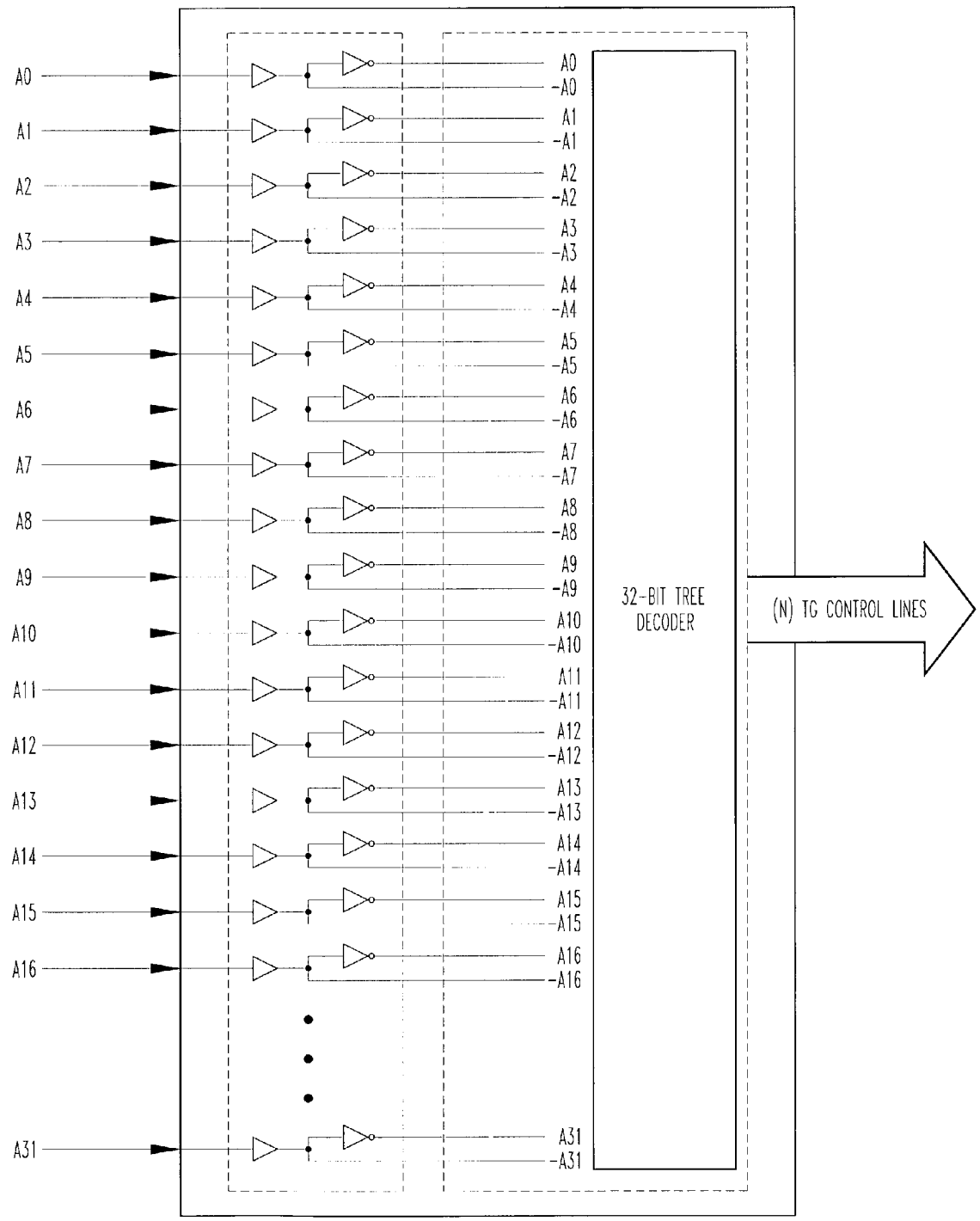
FIG. 71 is a logic-diagram drawing of the 32-bit Address-Decoder circuit.
Figure 72:
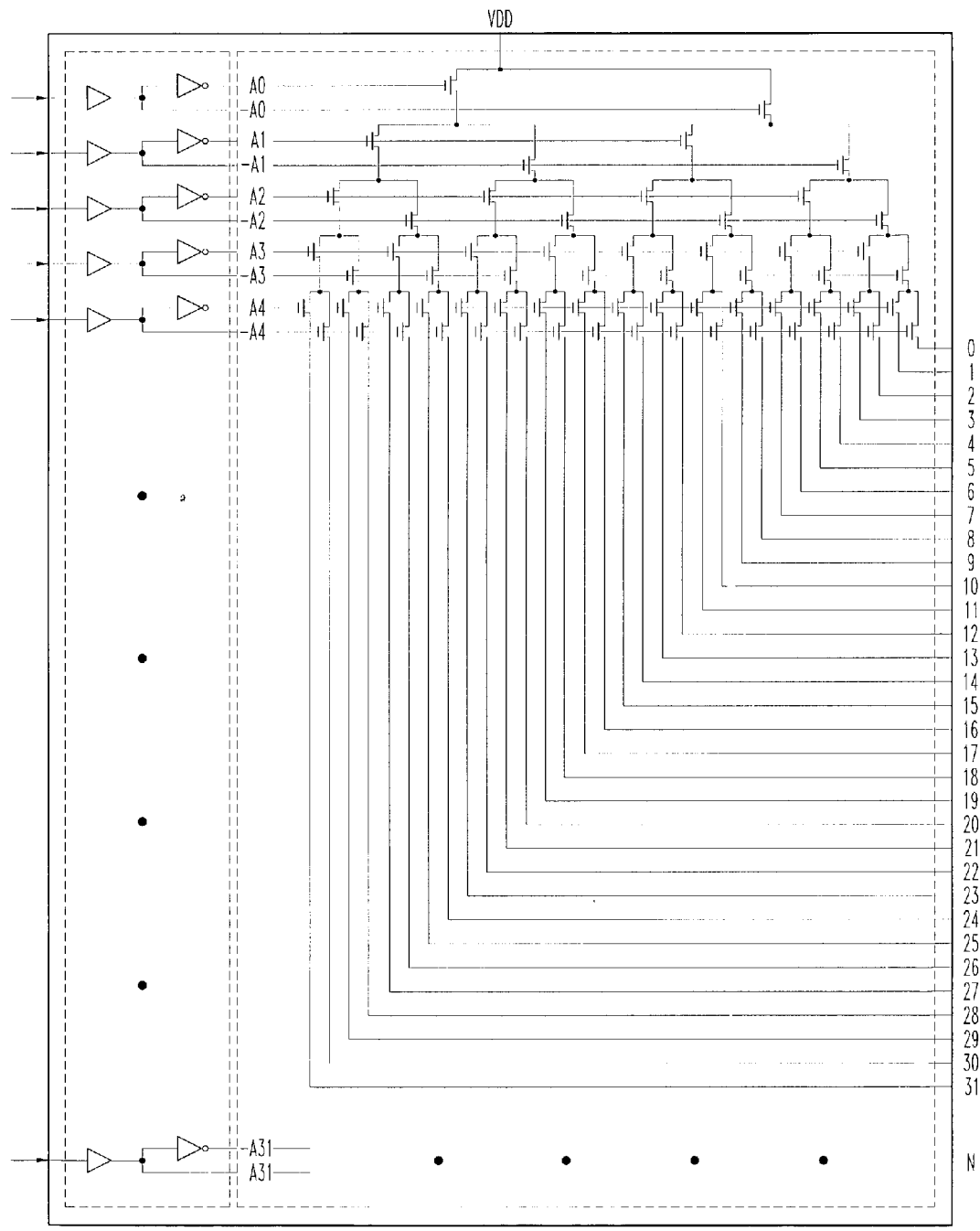
FIG. 72 is a circuit-diagram drawing showing circuit details of the 32-bit Address-Decoder circuit.
Figure 73:
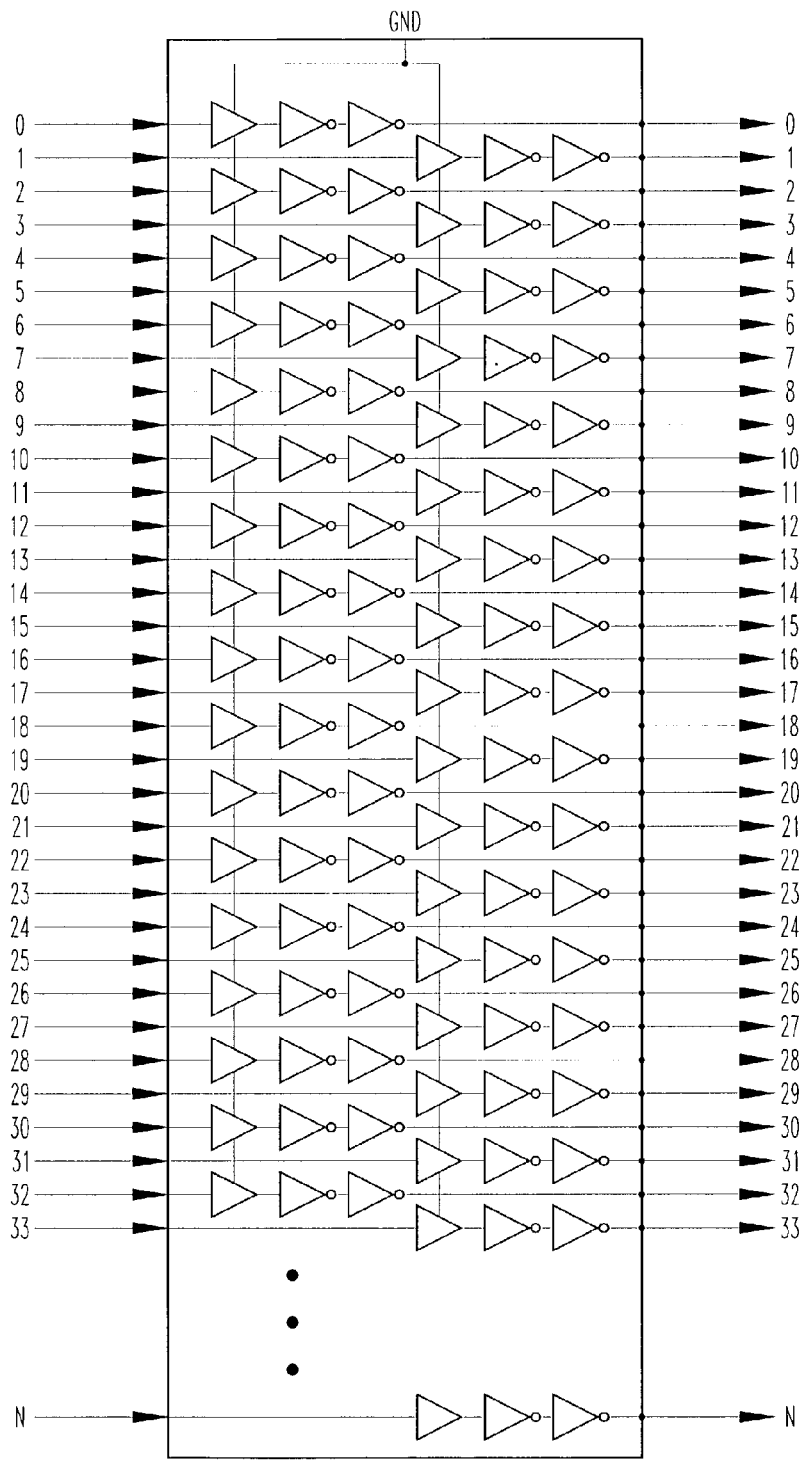
FIG. 73 is a logic-diagram drawing of the Address-Buffers circuit used in the Phase-Change Microhead Array Chip design, which displays the digital logic behind the operation of an address-decoder selected microhead's line-buffer.

In addition, as illustrated in FIGS. 65, 66, 67, and 68, only when the microhead location address-number "4562" has been successfully latched into an 'Address Latch And Chip Select Circuit' is the "Address Acknowledge" (ADACK) circuit made to send a logic-low chip-control bus-signal down its chip-control bus-system control line. Moreover, the –ADACK chip-control bus-signal is generated from the simultaneous enabling of a selected Phase-Change Microhead Array Chip's –CS4 and –AS chip-control circuits (FIGS. 65, 66, 67, and 68), which are located within a selected Phase-Change Microhead Array Chip's 'Address Latch And Chip Select Circuit'. As illustrated in FIGS. 69, 70A, and 70B, the –ADACK chip-control bus-signal is sent from a selected Phase-Change Microhead Array Chip's output-contact (FIGS. 11, 12, 13, and 14) labeled as pin-number "40" down the bus-system's cable to an Asynchronous Optical Microhead Address Controller module's 63 (FIGS. 60A and 59), 80 (FIGS. 61A and 61C), 63 (FIGS. 62A and 62B), 80 (FIGS. 63A and 63C) 'Address Acknowledge' input-contact location (FIGS. 60A, 61A, 60C, and 61C), which is physically located on a Phase-Change Microhead Array Chip Hard Disk Drive's PCB 63 (FIG. 4), 80 (FIG. 5).

Furthermore, the logic-low chip-control bus-signal received at an Asynchronous Optical Microhead Address Controller's "Address Acknowledge" (−ADACK) input-contact (FIGS. 60A, 61A, 60C, and 61C) tells an 'Asynchronous Optical Microhead Address Controller' that the microhead location address-number "4562" has been successfully latched into a selected Phase-Change Microhead Array Chip's 'Address Latch And Chip Select Circuit' (FIGS. 69, 70A, and 70B) located in the selected Phase-Change Microhead Array Chip number "5". Further, as illustrated in FIGS. 64A, 64B, 71, 72, the successfully latched 32-bit microhead selecting address-signal is next sent from the previously mentioned 32-bit 'Address Latch And Chip Select Circuit' to a selected Phase-Change Microhead Array Chip's 32-bit 'Address Decoder Circuit' for decoding.

Subsequently, as illustrated in FIGS. 64A, 64B, 72, and 73, when a selected Phase-Change Microhead Array Chip's 'Address Decoder Circuit' receives a 32-bit microhead location address-number selection signal (i.e., thirty-two high and low electronic signals) it will decode it internally using an 'address tree decoder' circuit. The process of decoding a latched 32-bit microhead location address-number by the before mentioned 'address tree decoder' circuit (FIGS. 71 and 72) results in the enabling of one microhead selecting 'microhead selection-line' with a logic-high chip-control bus-signal. Whereby, the previously mentioned microhead selection-line, which is numbered as "4562", is enabled out of "4,000,000,000" (i.e., thirty-two bits) of possible microhead addressing selection-line addresses (i.e., actual number of addressable selection-lines within each microhead chip would more likely be between 100,000 and 300,000 microhead addressing selection lines).

In addition, due to what is sometimes called 'inverter body effect' or the signal loss caused by semiconductor circuits containing a large number of switchable inverters; for example, like the large number of inverters present within an 'address tree decoder' circuit. Moreover, this is due to the shear number of MOSFET or MESFET inverter and/or emitter-gates a logic-high control-signal must travel through, which ultimately causes the previously mentioned logic-high control-signal to undergo signal-loss and therefore, to degrade. Consequently, an address tree decoder's singularly enabled "Microhead Selection-Line" (MSL) will need its logic-high control-signal regenerated by a Phase-Change Microhead Array Chip's 'Address Buffer Circuit' (FIGS. 73 and 74), or the previously mentioned signal-loss is bound to occur possibly causing a microhead selection line error.

Figure 64A:
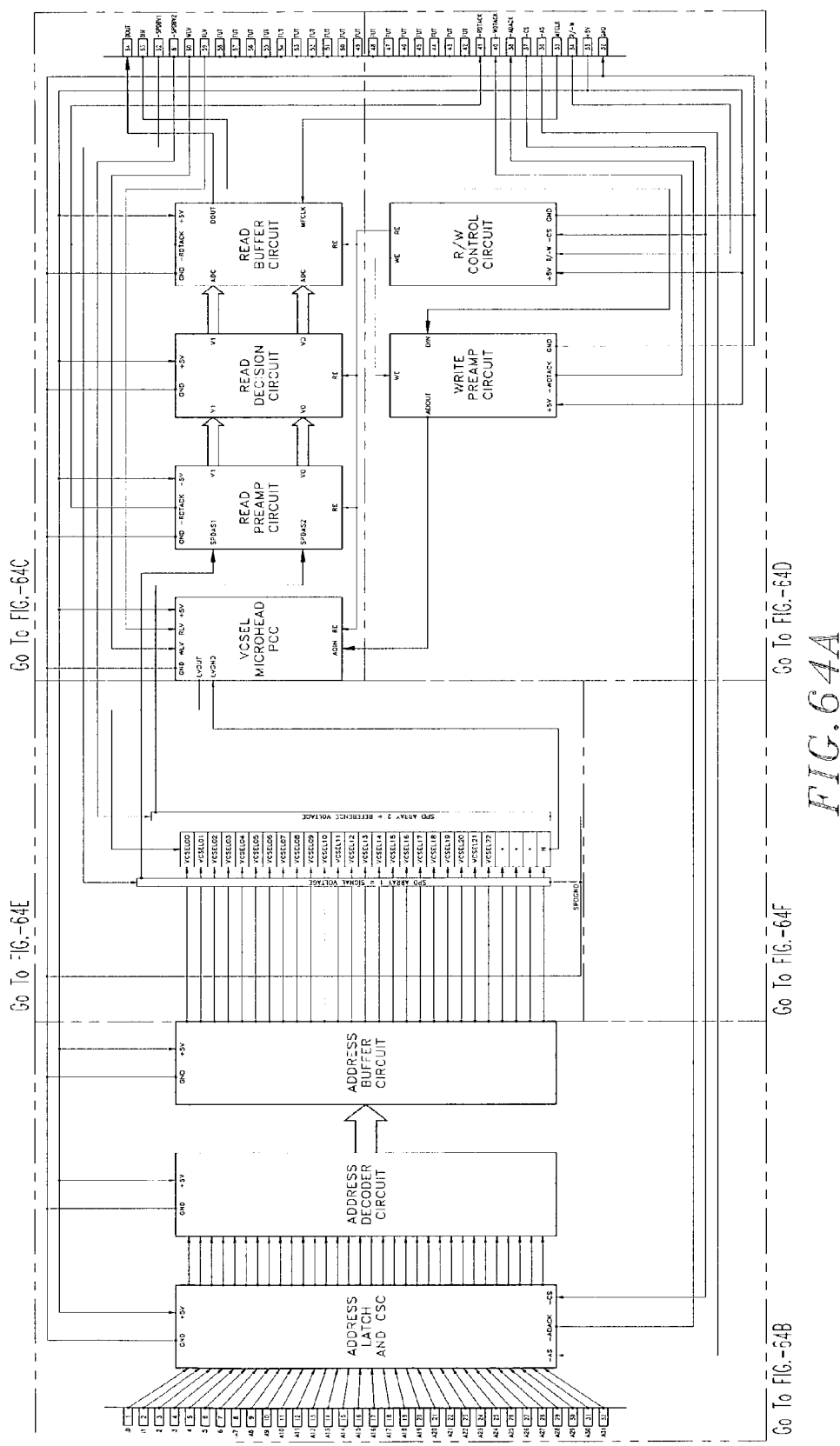
FIG. 64A is a block-diagram drawing of the Phase-Change Microhead Array Chip design used in the Phase-Change Microhead Array Chip Hard Disk Drive, which displays areas within FIG. 64A copied to separate drawing files as block-diagram drawing figures containing enlarged areas of block-diagram 64A.
Figure 64B:
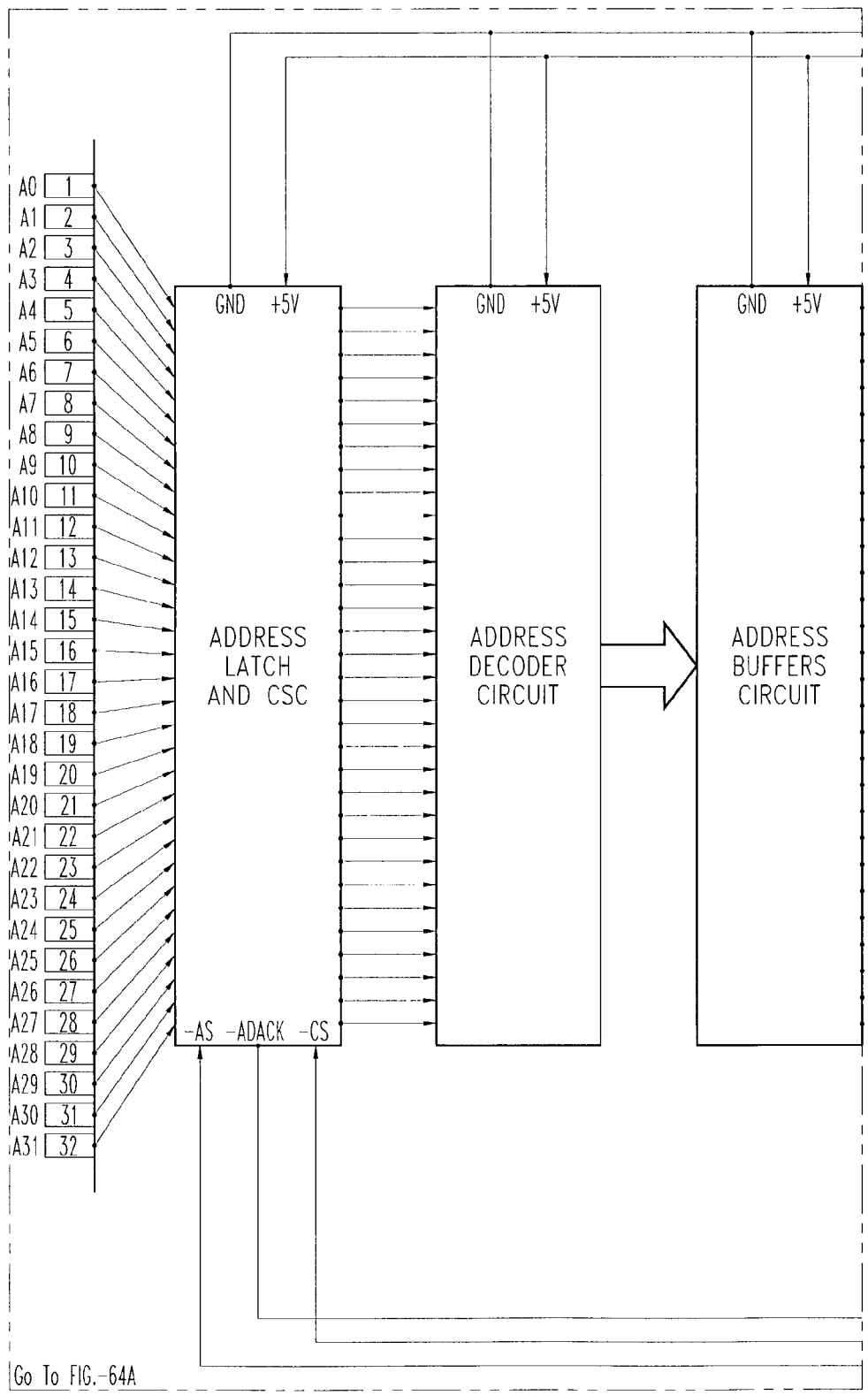
FIG. 64B is an enlarged block-diagram drawing of the Phase-Change Microhead Array Chip design used in the Phase-Change Microhead Array Chip Hard Disk Drive, which displays an enlarged block-diagram drawing showing details of the Microhead-Addressing and Chip-Selection circuits illustrated in block-diagram FIG. 64A.
Figure 74:
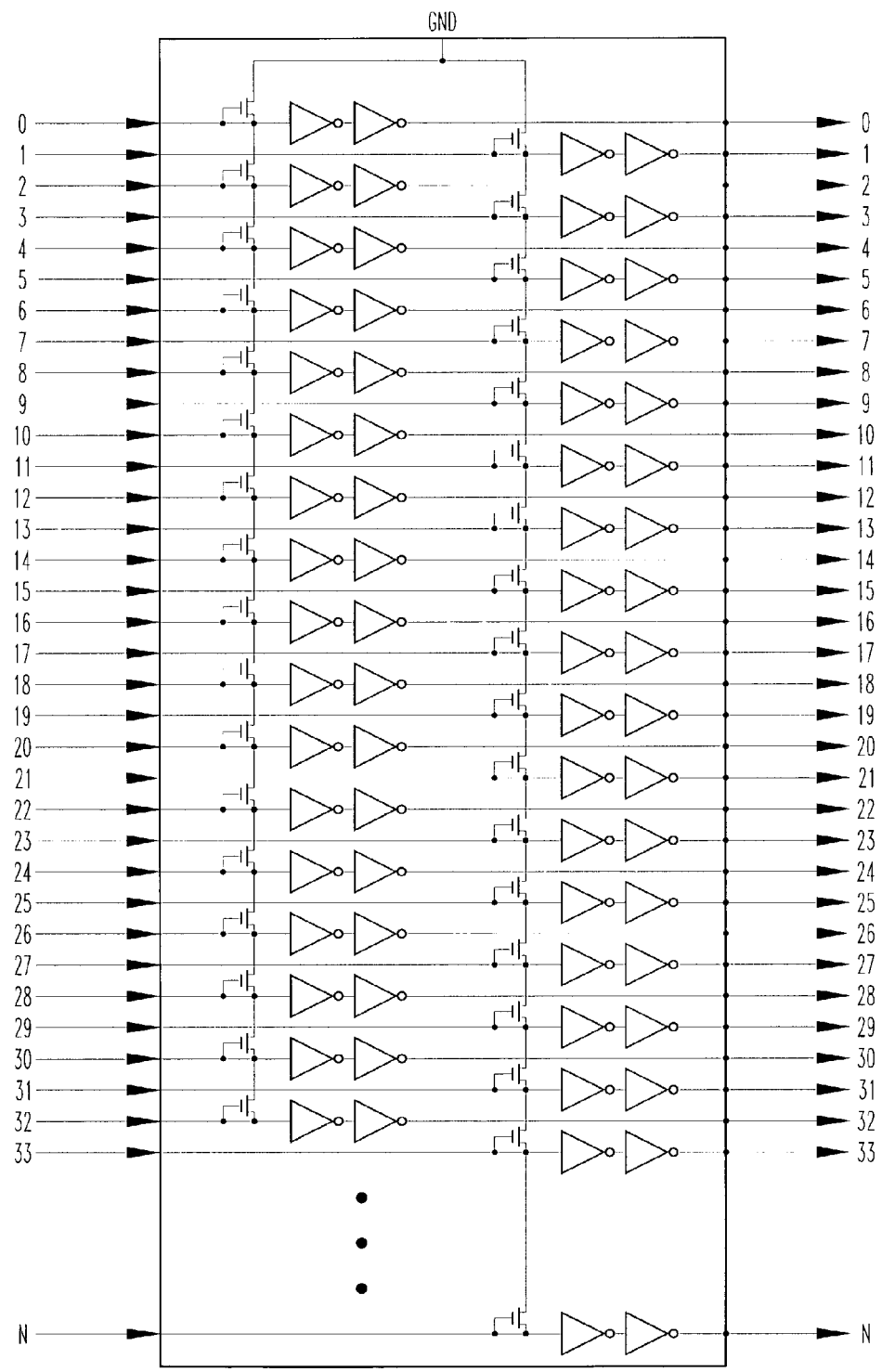
FIG. 74 is a circuit-diagram drawing of the Address-Buffers circuit used in the Phase-Change Microhead Array Chip design, which displays the circuit details behind an address-decoder selected microhead's line-buffer, while displaying how the un-selected microhead's selection lines are pull-to-ground using Long-L inverter line-buffer circuits.
Figure 78:
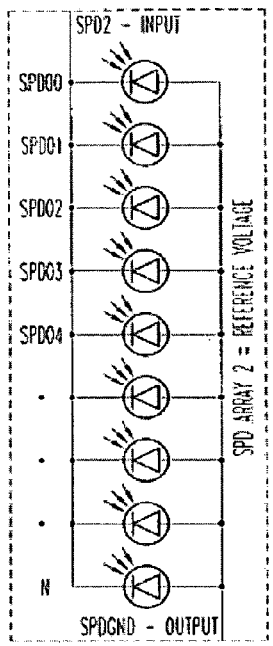
FIG. 78 is an auxiliary block-diagram drawing, which displays details of the reversed-biased SPD based photocell-array labeled as 'SPD Array 2'.
Figure 77:
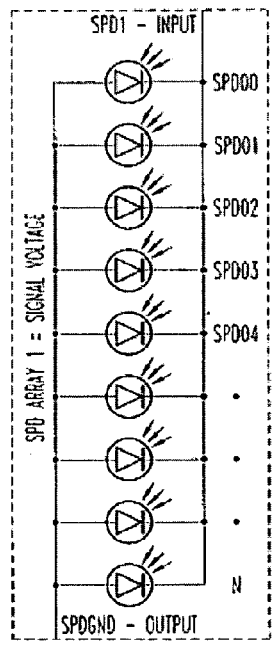
FIG. 77 is an auxiliary block-diagram drawing, which displays details of the reversed-biased SPD based photocell-array labeled as 'SPD Array 1'.

Furthermore, when a Phase-Change Microhead Array Chip's 'Address Decoder Circuit' sends a logic-high activation signal down a host-requested microhead's selection-line to a Phase-Change Microhead Array Chip's 'Address Buffer Circuit' (FIGS. 64A, 64B, 73, and 74) two very important and simultaneous processes will occur:

i.) A regeneration of an address tree decoder's logic-high microhead selection signal by a Phase-Change Microhead Array Chip's 'Address Buffer Circuit', as illustrated in FIGS. 64A, 64B, and 74;

ii.) A pulling-down of the address tree decoders' unsolicited microhead selection-lines into a ground state using the Long-L inverters present within a Phase-Change Microhead Array Chip's 'Address Buffer Circuit', as illustrated in FIGS. 64A, 64B, and 74.

Consequently, the pulling-down of the unsolicited microhead selection-lines into a ground state will also put those same microhead selection lines into what is normally called a "High Impedance Line State" (Hi−Z). Further, every MSL located within a selected Phase-Change Microhead Array Chip's microhead-array has its beginning in a Phase-Change Microhead Array Chip's 'Address Decoder Circuit'. While, as a contradiction, having its termination in the respective microhead location. Whereby, each previously mentioned MSL is terminated by a transmission-gate control-circuit, as illustrated in FIGS. 64A, 64B, 64E, 107, and 111. Further, as illustrated in FIGS. 107 and 111, the MSL transmission-gates (FIGS. 107 and 111) are used to control independently a microhead's access to the host-selected Phase-Change Microhead Array Chips' power-bus system lines.

In addition, as illustrated in FIGS. 87, 88, 89, and 90, the "Read Laser Voltage" (RLV), the "Write Laser Voltage One" (WLV1), and the "Write Laser Voltage 2" (WLV2) microhead laser power-signals, which are inputted at different time periods at a selected Phase-Change Microhead Array Chip's (FIGS. 107 and 111) "Laser Voltage In" (LVIN) input-contact (FIGS. 64A and 64E), or more specifically, the switching that occurs between a Phase-Change Microhead Array Chip's "Read Laser Voltage" (RLV) and a Phase-Change Microhead Array Chip's "Write Laser Voltage One" (WLV1) and "Write Laser Voltage Two" (WLV2) microhead power-signals, occurs within a selected Phase-Change Microhead Array Chip's "Microhead Power Control Circuit" (Microhead PCC) (FIGS. 64A, 64D, 109, and 110), while the switching itself is controlled by a selected Phase-Change Microhead Array Chip's 'R/W Control Circuit' during read-data or write-data disk operations.

In addition, as illustrated in FIGS. 62A, 63A, 62B, 63B, 62C, and 63C, the actual switching on or off of electrical current to a selected Phase-Change Microhead Array Chip's "Read Laser Voltage" (RLV), "Write Laser Voltage One" (WLV1), and "Write Laser Voltage Two" (WLV2) power-bus line is executed by a Data Sequencer's 'Data Bus Controller'. Remember, for a host-requested read-data disk-operation to even occur, a Phase-Change Microhead Array Chip's 'R/W Control Circuit' (FIGS. 87, 88, 89, and 90) must first enable a selected Phase-Change Microhead Array Chip's read-channel with a "Read Enable" (RE) logic-high control-signal.

Furthermore, in order for Phase-Change Microhead Array Chip Hard Disk Drives to commence disk-operations as quickly as possible a Phase-Change Microhead Array Chip's R/W Control Circuit, after a 'Power-On-Restart' and/or 'Power-On-Initialization' has been executed, as a default setting, will have its selected Phase-Change Microhead Array Chip's read-channel become enabled and activated. The purpose of enabling a Phase-Change Microhead Array Chip's read-channel just after a 'Power-On-Restart' and/or 'Power-On-Initialization' is so that the "Operational Code" (OP Code) stored on the data-surface of a particular disk-platter can be read as quickly as possible from track-0 of the data-surface into a Disk Controller's "Synchronous Dynamic Random Access Memory" (SDRAM) buffer area, which has been put aside for the execution of a Phase-Change Microhead Array Chip Hard Disk Drive's operating 'OP Code' software.

Furthermore, the control-bus circuits that enable or disable a read-channel of a host-selected Phase-Change Microhead Array Chip consist of three control logic circuits:

i.) A Phase-Change Microhead Array Chip's "Read or Write enable" (R/−W) control-bus signal-line, which is connected at input-contact pin-number "35";

ii.) A Phase-Change Microhead Array Chip's "VDD" (+5V) control-bus signal-line, which is connected at input-contact, pin-number "34";

iii.) A Phase-Change Microhead Array Chip's "Chip Select" (−CS) point-to-point control-bus signal-line, which is connected at input-contact pin-number "38".

Moreover, the three previously mentioned control logic circuits are located in every Phase-Change Microhead Array Chip (FIGS. 64A, 64C, 87, 88, 89, and 90) installed into a Phase-Change Microhead Array Chip Hard Disk Drive's unit-assembly. To enable a read-channel, which is located within every Phase-Change Microhead Array Chip, three logic conditions must occur simultaneously within the selected Phase-Change Microhead Array Chip's 'R/W Control Circuit':

i.) A logic-high control-signal must be present on a host-requested Phase-Change Microhead Array Chip's input-contact pin-number "34" "VDD" (+5V);

ii.) A logic-low control-signal must be present on a host-requested Phase-Change Microhead Array Chip's input-contact pin-number "38" "Chip Select" (−CS);

iii.) A logic-high control-signal must be present on a host-requested Phase-Change Microhead Array Chip's input-contact pin-number "35" "Read or Write enable" (R/−W).

Moreover, the previously mentioned three control bus-system signal-lines must have three logic signal conditions simultaneously present across their lines in order for a host-requested Phase-Change Microhead Array Chip's read-channel to become enabled for a read-data disk-operation to be executed by the Disk Controller. Since all Phase-Change Microhead Array Chips have the same pin assignment configuration, in order to select any particular Phase-Change Microhead Array Chip that might be needed, a physical re-direction of an Asynchronous Optical Microhead Address Controller's point-to-point "Chip Select" (−CS) line must be accomplished at the level of the chip-positioning circuit board.

For example, the physical re-direction of an Asynchronous Optical Microhead Address Controller's point-to-point −CS for a line-number "4" would need to be made physically at the copper-trace circuit-runs (FIG. 21) of the chip-positioning circuit board containing the host-requested Phase-Change Microhead Array Chip number "5". Whereby, a predetermined cross-connection is physically made for "Chip Select" line-number "4" (−CS4), by re-routing a single copper-trace circuit-run (FIG. 21) from input-contact pin-number "53" of a chip-positioning circuit board's Polymer flex-cable spring-contact connector 67 (FIGS. 2, 3, and 10) location to a "Chip Select" (−CS) and null input-contact location labeled as pin-number "38" at the host-requested Phase-Change Microhead Array Chip's surface-mounted chip-socket 5 (FIGS. 7, 8, and 21).

Moreover, as the first bus-system embodiment of the present Phase-Change Microhead Array Chip Hard Disk Drive invention, every Phase-Change Microhead Array Chip installed into a Phase-Change Microhead Array Chip Hard Disk Drive, using a chip-positioning circuit board, as described above, will be connected to the 'Address Bus' system, the 'Data I/O Bus' system, and the 'Chip Control Bus' system of the Phase-Change Microhead Array Chip Hard Disk Drive's unit-assembly. It is through the previously described circuit cross-connection that a host-requested Phase-Change Microhead Array Chip, like chip number "5", which was used in the previously cross-connection example, becomes the only Phase-Change Microhead Array Chip connected to a Phase-Change Microhead Array Chip Hard Disk Drive's bus-system to become selected; having its read-channel activated, while all other Phase-Change Microhead Array Chips connected to a Phase-Change Microhead Array Chip Hard Disk Drive's bus-system, being non-selected, will have their read-channels placed into a non-logic state-of-impedance, or what is sometimes called a "High Impedance Line State" (Hi−Z).

Furthermore, a Phase-Change Microhead Array Chip, after being selected by a host-system to execute a read-data disk-operation, will also need to have its read-channel I/O enabled with a "Read Enable" (RE) logic-high control-signal, which is sent internally by a selected Phase-Change Microhead Array Chip's 'R/W Control Circuit', which itself comprises of three read-channel I/O enabling line-driver circuits. The three read-channel line-driver circuits (FIGS. 79, 80, 85, and 86) after their simultaneous reception of a R/W Control Circuit's "Read Enable" (RE) logic-high control-signal, will activate the read-channel's I/O; providing open connectivity to a Phase-Change Microhead Array Chip Hard Disk Drive's Disk Controller, which is waiting for the microhead selecting address-cycle to be completed in order to go ahead and execute the host-requested data retrieval.

Figure 64C:
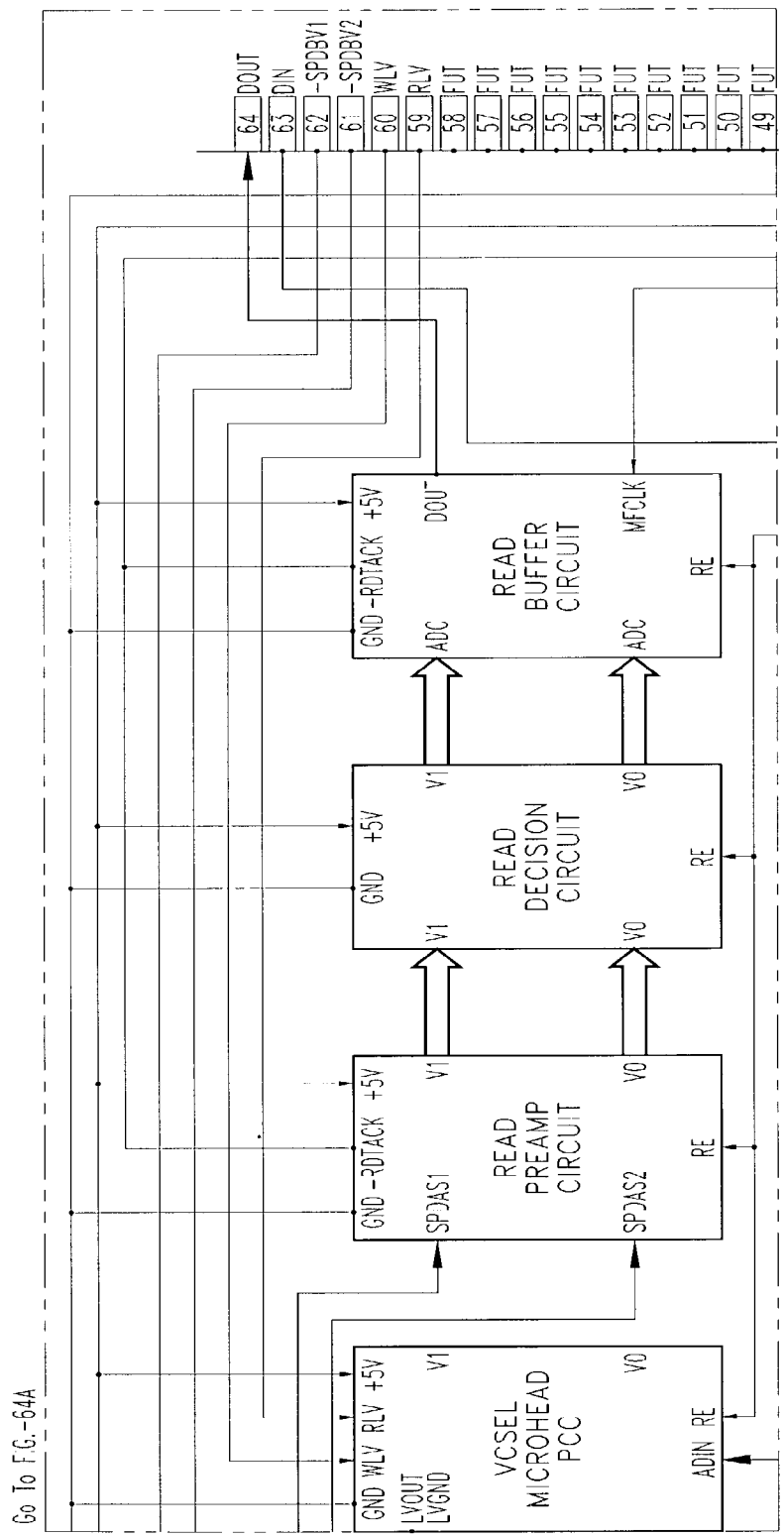
FIG. 64C is an enlarged block-diagram drawing of the Phase-Change Microhead Array Chip design used in the Phase-Change Microhead Array Chip Hard Disk Drive, which displays an enlarged block-diagram drawing showing details of the Data Read-Channel and the Data-Acknowledgment circuits illustrated in block-diagram FIG. 64A.
Figure 64D:
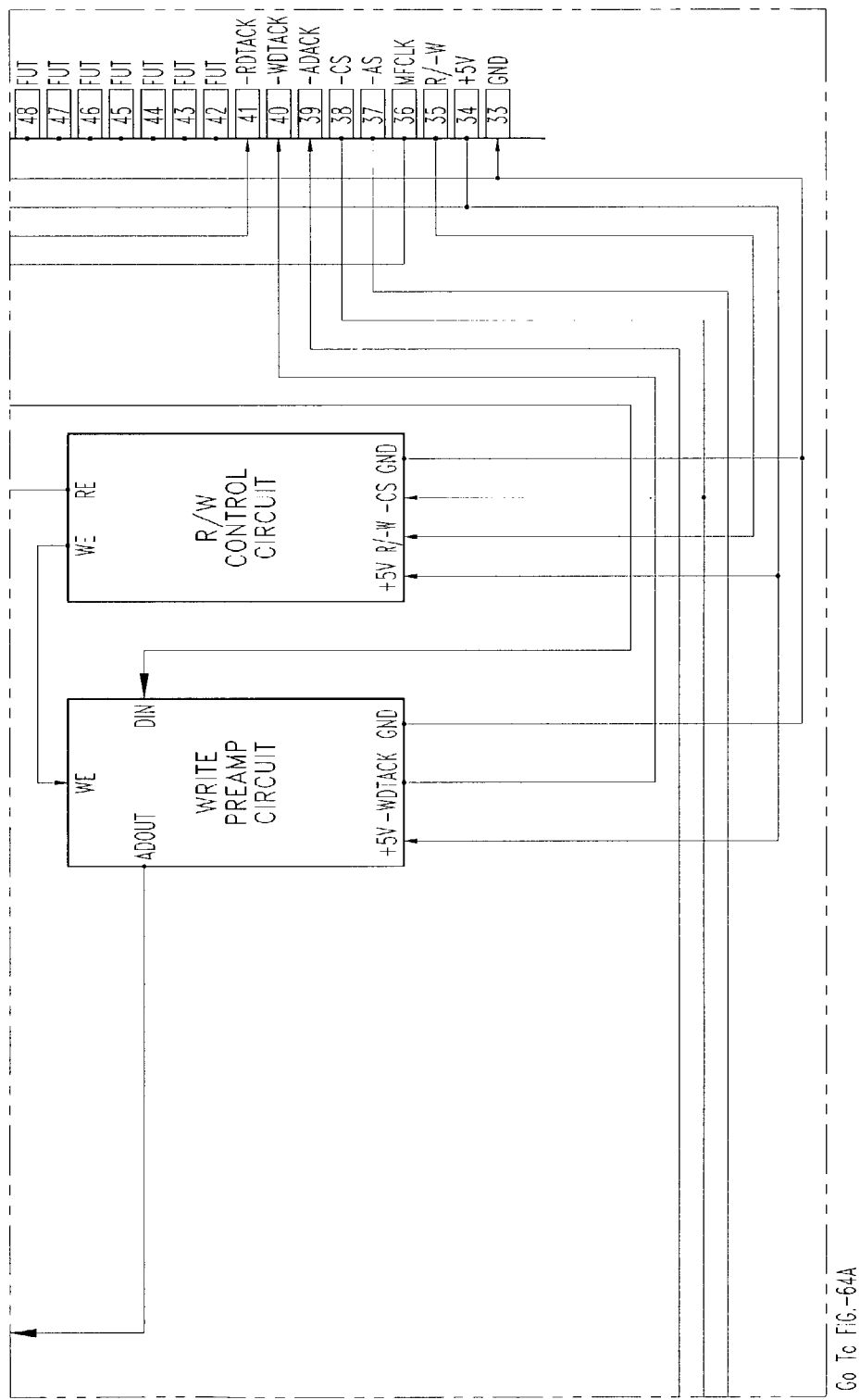
FIG. 64D is an enlarged block-diagram drawing of the Phase-Change Microhead Array Chip design used in the Phase-Change Microhead Array Chip Hard Disk Drive, which displays an enlarged block-diagram drawing showing details of the Data Write-Channel and the Data-Acknowledgment circuits illustrated in block-diagram FIG. 64A.
Figure 64F:
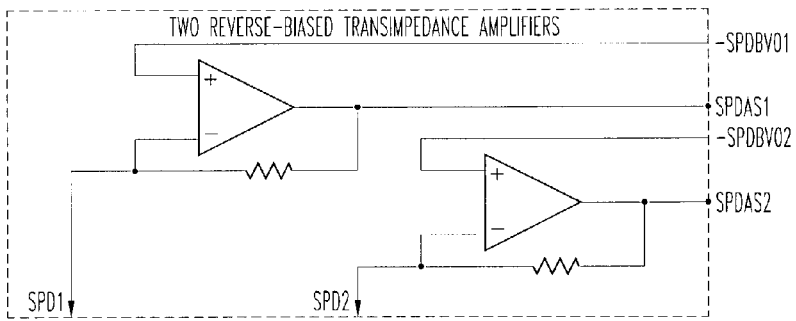
Figure 64H:
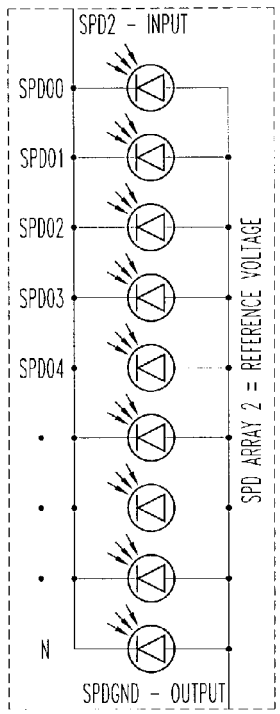
Figure 64G:
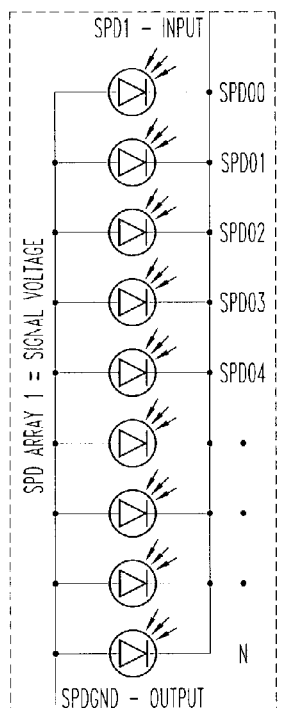

Moreover, as illustrated in FIGS. 64A, 64C, and 64D, the read-channel's activation process is described in greater detail in the following paragraphs found below. Wherein, two logic-high control-signals are sent by two of the read-channel's three line-drivers to the (A) and (B) inputs of the read-channel's double NAND "Read Data Acknowledge" (−RDTACK) control-circuit. Whereby, if the previously mentioned (A) and (B) inputs of the read-channel's double NAND "Read Data Acknowledge" (−RDTACK) control-circuit (FIGS. 102, 103, 104, and 105) both receive logic-high control-signals, then the control-circuit's double NAND circuit will in response, output a "Read Data Acknowledge" (−RDTACK) logic-low control-signal onto the "Read Data Acknowledge" (−RDTACK) control-bus line, which is connected, via the bus-system, to every Phase-Change Microhead Array Chip installed at the input-contact labeled as pin-number "41".

Moreover, as illustrated in FIGS. 62A, 63A, 62C, and 63C, a Phase-Change Microhead Array Chip's "Read Data Acknowledge" (−RDTACK) logic-low control-signal, while being sent to pin-number "41" over the shared control-bus, will travel through a control-bus Polymer flex-cable's "Read Data Acknowledge" (−RDTACK) control-bus signal-line 30, 36 (FIGS. 1 and 6) until it reaches a "Read Data Acknowledge" (−RDTACK) input-contact, which is located in the Data Sequencer's 'Data Bus Controller'. Further, after a Data Sequencer's 'Data Bus Controller' has received the "Read Data Acknowledge" (−RDTACK) logic-low control-signal, the Data Sequencer's 'Data Bus Controller' will know that the selected Phase-Change Microhead Array Chip's read-channel is now open and is ready to read host-requested data from a host-requested data-sector. For example, data-sector "45", which is located on its respective disk-platter number "5", at cylinder/track location "4562", and is read using the addressed microhead "4562", which is located directly above cylinder/data-track location "4562".

In addition, a Phase-Change Microhead Array Chip's "Microhead Power Control Circuit" (MPCC) will also receive a "Read Enable" (RE) logic-high control-signal from a Phase-Change Microhead Array Chip's 'R/W Control Circuit', which in turn will cause the Microhead Power Control Circuit's respective transmission-gates to toggle-switch a selection (FIGS. 109 and 110) of a Phase-Change Microhead Array Chip's "Read Laser Voltage" (RLV) power-line over the Phase-Change Microhead Array Chip's "Write Laser Voltage One" (WLV1), and/or "Write Laser Voltage Two" (WLV2) power-lines. Further, once toggled, a selected power-line will have access to a Phase-Change Microhead Array Chip's "Laser Voltage Output" (LVOUT) circuit terminal (FIGS. 109 and 110), which ultimately leads to a Phase-Change Microhead Array Chip's "Laser Voltage Input" (LVIN) circuit terminal (FIGS. 107 and 111).

Furthermore, although a "Read Laser Voltage" (RLV) power-line has been selected for a host-requested read-data disk-operation, no electrical-current will be sent down the power-line to a Phase-Change Microhead Array Chip's host-selected microhead until a host-requested data-sector has been rotated into position and detected as being underneath the host-selected microhead. Whereby, at the very instant the host-requested data-sector lines-up underneath the address selected microhead, will a low-powered electrical current be sent down the power-line to the Phase-Change Microhead Array Chip's "Read Laser Voltage" (RLV) internal power-line, which in turn activates a selected microhead's data-reading low-power laser-emissions, which is continued until the whole host-requested data-sector is read in one complete revolution of the disk platter containing the sector.

Moreover, the previously mentioned data-sector as it passes underneath the host-selected microhead it is essentially scanned by the microhead's data-reading low-power laser-emissions; as this scanning process occurs, the resultant output is a streaming data-signal, which is partially encoded during its output to the Data-Sequencer's 'DPLL circuit', where it will receive additional signal conditioning and conversion. Afterwards, the signal converted data-signal is next passed via the Data-Sequencer's Disk Controller Interface to the Disk Controller's 'ECC circuit', where it is checked against an 'ECC table' for errors, if the data is error free it is next passed to the Disk Controller's 'internal memory cache' via the previously mentioned Disk Controller Interface and the Disk Controller's 'Buffer Controller circuit', where it is next stored temporarily until the host-system is ready to retrieve it.

Furthermore, a Phase-Change Microhead Array Chip Hard Disk Drive's 'Hall-Sensors' (i.e., not shown here) will provide information pertaining to the disk-platter rotation relative to data-sector location. Moreover, by using the constantly changing rotational placement of permanent-magnetic rotary-elements, which are located within a rotor-housing, the Disk Controller, using Hall-Sensors to detect the rotor located permanent-magnetic rotary-elements, will always know at any given moment the location and rotational position of the disk-platters and the data-sectors they contain. Moreover, the previously mentioned rotational placement is relative to the fixed windings and poles of a 'Spindle-Motor' 59 (FIGS. 2 and 3). Typically, the previously mentioned 'Hall-Sensors' will provide response-feedback and control information to a Phase-Change Microhead Array Chip Hard Disk Drive's 'Spindle And Power Controller' 60 (FIG. 4), 82 (FIG. 5) and Spindle-Motor's 'driver-circuit', which is located on a Disk Controller's PCB.

In addition, the before mentioned 'Hall-Sensors' (i.e., not shown here) will also provide the real-time rate of rotation and positional information for the disk-platters installed within a Phase-Change Microhead Array Chip Hard Disk Drive's unit-assembly. This information is typically sent to the before mentioned 'Spindle And Power Controller' 60 (FIG. 4), 82 (FIG. 5), which, in-turn sends disk-platter rate of rotation and positional information to a Disk Controller's 'Data Sequencer', which, in-turn precisely controls the switching on and off of a Phase-Change Microhead Array Chip Hard Disk Drive's "Read Laser Voltage" (RLV), "Write Laser Voltage One" (WLV1), or "Write Laser Voltage Two" (WLV2) all of which are laser power control signals that exhibit three different levels of electrical-current, which are used during host-requested read-data or write-data disk-operations to activate a selected microhead's laser-emissions output.

Moreover, the source of the laser-light used during host-requested disk-operations could possibly come from any applicably constructed semiconductor laser-diode, preferably a VCSEL or some other type of surface emitting laser-diode. Wherein, such semiconductor laser-diodes, along with their respective photo-detectors, would be comprised as a plurality of microheads; altogether forming a microhead-array within every Phase-Change Microhead Array Chip. Additionally, located within the previously mentioned microhead-array, there is an 'Ahrens Polarizing Analyzer' laser-light polarizer, which in one embodiment is positioned just above the top surface of a group of microhead laser-diode emitters 114 (FIG. 108A). Wherein, a multidirectional un-polarized light-beam being emitted by a host-selected microhead laser-diode 135 (FIG. 108A) is instantly changed into linearly polarized laser-light 139 (FIG. 108A) as it enters the 'Ahrens Polarizing Analyzer' calcite-crystal's bottom lowermost surface 130 (FIG. 108A). Further, because the top surfaces of the laser-diode emitters are flush up against the bottom lowermost surface of an 'Ahrens Polarizing Analyzer' calcite-crystal's bottom 130 (FIG. 108A), eliminates the need for a collimating lens allowing evanescent coupling to take place between the emitter surfaces of the laser-diodes and the bottom lowermost surface of the 'Ahrens Polarizing Analyzer'.

Moreover, when un-polarized collimated laser-light 139 (FIG. 108A) reaches the first-diagonal or hypotenuse-surface 131 (FIG. 108A) of the before mentioned analyzer's bottom calcite-crystal 130 (FIG. 108A) it becomes linearly polarized (i.e., changed from a laser-light beam that is un-polarized and omni-directional into a laser-light beam that is linearly polarized and directional), while being split into two separate laser-light beams 137, 138 (FIG. 108A). Further, because the two calcite-crystal triangles that make up an 'Ahrens Polarizing Analyzer' have a horizontal optical-axis 136 (FIG. 108A) the 'O-ray' and 'E-ray' laser-light output, which comprise the two laser-light beams created earlier by the 'Ahrens Polarizing Analyzer' 137, 138 (FIG. 108A) when the analyzer split an original laser-light beam source into two separate laser-light beams, will have a propagating direction that is naturally horizontal.

Furthermore, first of the two linearly polarized laser-light beams created by the analyzer consists of 'O-rays' 137 (FIG. 108A) (i.e., Ordinary-rays of linearly polarized light that is perpendicular to the plane of illustration FIG. 108A), which are reflected 90° to the right by the bottom calcite-crystal's 130 (FIG. 108A) diagonal hypotenuse 131 (FIG. 108A), where they are projected through and beyond the calcite crystal's right-angle plane 130 (FIG. 108A) as 'O-rays' 137 (FIG. 108A) of linearly polarized horizontal traveling light-rays. Moreover, the previously mentioned 'O-rays' are perpendicular to the plane of illustration FIG. 108A. Subsequently, the previously mentioned 'O-rays' of linearly polarized horizontal traveling laser-light continue to travel in their redirected horizontal direction 137 (FIG. 108A) until they strike 140 (FIG. 108A) the 'SPD Array 2' (FIGS. 64A and 75) "Semiconductor Photo-Diode" (SPD) reference-voltage photo-detector read element 104, 109 (FIG. 108A). Wherein, the 'O-rays' will generate a reference-voltage analog-signal, which is immediately pre-amplified by a transimpedence-amplifier (FIGS. 64A and 76) and sent to the read-channel's "Semiconductor Photo-Diode Analog-signal 2" (SPDAS2) signal input circuit as the selected Phase-Change Microhead Array Chip's reference-signal, as illustrated in FIGS. 64A, 64C, 79, 80, 81, 82, 83, 84, 85, and 86.

Furthermore, second of the two linearly polarized laser-light beams consists of vertically traveling 'E-rays' 138 (FIG. 108A) (i.e., Extraordinary-rays of linearly polarized light that are parallel to the plane of illustration FIG. 108A), which will vertically pass through the non-reflective surface-side 139 (FIG. 108A) of the Ahrens Polarizing Analyzer's 'Half-Mirror' 131 (FIG. 108A), where the Half-Mirror's reflective surface-side is facing toward the top calcite-crystal's 129 (FIG. 108A) diagonal hypotenuse's bottom-surface 131 (FIG. 108A). Further, after the previously mentioned 'Ahrens Polarizing Analyzer' converts un-polarized laser-beams into laser-beams that are linearly polarized, it will split the vertically traveling linearly polarized laser-beams into two separate laser-beams vertically traveling 'E-ray' laser-beams 142 (FIG. 108A) and into horizontally traveling 'O-ray' laser-beams. Moreover, the vertically traveling 'E-ray' laser-beams 142 (FIG. 108A) will during a read-data disk-operation be redirected to vertically strike from a perpendicular direction, the data-surface 13 (FIGS. 1, 2, 3, and 108A) of a disk-platter containing a 'Tellurium' based 'Phase-Change' recording medium 13 (FIGS. 1, 2, and 3). Further, upon vertically striking the data-surface containing 'Tellurium' based 'Phase-Change' recording medium 13 (FIGS. 1, 2, and 3) 'E-ray' laser-beams 142 (FIG. 108A) will be reflected 133 (FIG. 108A) back into a perpendicular direction 133 (FIG. 108A) towards the Phase-Change Microhead Array Chip's 'Ahrens Polarizing Analyzer' 137, 138 (FIG. 108A). Upon encountering the 'Ahrens Polarizing Analyzer' 137, 138 (FIG. 108A) the 'E-ray' laser-beams 142 (FIG. 108A) will be reflected 90° to the left by the Ahrens Polarizing Analyzer's 'Half-Mirror' 131 (FIG. 108A), where the 'E-ray' laser-beams 142 (FIG. 108A) will next be redirected to impinge upon the outer surface of the 'SPD Array 1' (FIGS. 64A and 75) "Semiconductor Photo-Diode" (SPD) reference-voltage photo-detector read element 104, 109 (FIG. 108A). Wherein, the 'E-rays' will generate a read-voltage analog-signal, which is immediately pre-amplified by a transimpedence-amplifier (FIGS. 64A and 76) and sent to the read-channel's "Semiconductor Photo-Diode Analog-signal 1" (SPDAS1) signal input circuit as the selected Phase-Change Microhead Array Chip's read-signal, as illustrated in FIGS. 64A, 64C, 79, 80, 81, 82, 83, 84, 85, and 86.

In addition, the previously mentioned horizontal traveling 'E-rays' 143 (FIG. 108A) of linearly polarized laser-light once it leaves the analyzer it will next become incident upon the 'SPD Array 1' (FIGS. 64A and 75) "Semiconductor Photo-Diode" (SPD) photo detector read-element (FIG. 77), which in-turn will convert the incident laser-light into electrons, generating a signal-voltage analog-signal, which in turn is pre-amplified by a transimpedence-amplifier (FIGS. 64A and 76) and sent to the read-channel's signal input "Semiconductor Photo-Diode Analog-signal 1" (SPDAS1) as a Phase-Change Microhead Array Chip's streaming data-signal, as illustrated in FIGS. 64A, 64C, 79, 80, 81, 82, 83, 84, 85, and 86.

To summarize the process, when data scanning laser-light comprising of 'E-rays' of linearly polarized laser-light is reflected by the data-surface containing 'Tellurium' based 'Phase-Change' recording medium 13 (FIGS. 1, 2, and 3), and the medium's area where the previously mentioned reflection takes place comprises of data-cells that are molecularly disorganized, then a Phase-Change Microhead Array Chip's 'Ahrens Polarizing Analyzer' will convert the reflected 'E-rays' into a low-intensity form of laser-light, which in turn will be made to impact the 'SPD Array 1' (FIGS. 64A and 75) "Semiconductor Photo-Diode" (SPD) photo detector array read-element to generate a low-peak signal-voltage analog-signal. Whereby, the previously mentioned low-peak signal-voltage analog-signal will next, using a read-channel's first comparator, be compared to a divided-by-half reference-voltage analog-signal. Wherein, the previously mentioned comparator will create a digital logic-low data-bit, having a logic value of "0".

Contradictorily, when data scanning laser-light comprising of 'E-rays' of linearly polarized laser-light is reflected by the data-surface containing 'Tellurium' based 'Phase-Change' recording medium 13 (FIGS. 1, 2, and 3), and the medium's area where the previously mentioned reflection takes place comprises of data-cells that are molecularly organized, then a Phase-Change Microhead Array Chip's 'Ahrens Polarizing Analyzer' will convert the reflected 'E-rays' into a high-intensity form of laser-light, which in turn will be made to impact the 'SPD Array 1' (FIGS. 64A and 75) "Semiconductor PhotoDiode" (SPD) photo detector array read-element to generate a high-peak signal-voltage analog-signal. Whereby, the previously mentioned high-peak signal-voltage analog-signal, using a read-channel's first comparator, will be compared to a divided-by-half reference-voltage analog-signal. Wherein, the previously mentioned comparator will create a digital logic-high data-bit, having a logic value of "1".

In addition, after an addressed VCSEL based microhead has completed a successful data-reading scanning process the "5" to "15" milli-watts of electrical current used to power the host-selected microhead laser-diode during its data-reading scanning process will be switched off from the "Laser Voltage Input" (LVIN) power-bus (FIGS. 107 and 111) by a Data Sequencer's 'Bus Controller' (FIGS. 62A, 63A, 62B, 63B, 62C, and 63C), but only after the host-requested data-sectors have been successfully read from the correct disk-platter cylinder/track data-surface location into a Data Sequencer's "Digital Phase-Locked Loop" (DPLL) circuit for signal processing. Consequently, powering up a selected microhead laser-diode (FIGS. 107 and 111) for only the amount of time it is actually used to read-data greatly increases the "Mean Time Before Failure" (MTBF) rating of every single microhead laser-diode that comprises a Phase-Change Microhead Array Chip's microhead-array.

In addition, let us take a closer look at a Phase-Change Microhead Array Chip's conversion of two analog-signals to a digital data-stream, which only occurs during a host-requested read-data disk-operation. Moreover, digital data-streams are created when a host-selected Phase-Change Microhead Array Chip's microhead-array, during a read-data disk-operation, generates two analog-signals, which are then used to create the previously mentioned digital data-stream. Wherein, as the result of incidental laser-light, a first analog-signal 'signal-one' is generated from a Semiconductor Photo-Diode Array 1's output, as illustrated in FIGS. 64A, 75, 64F, 64G, 79, 80, 81, and 82, which is next passed to an analog read-channel's "Semiconductor Photo-Diode Analog Signal 1" (SPDAS1) pre-amp input as a read-channel's signal-voltage analog-signal, as illustrated in FIGS. 64A, 75, 64F, 64G, 79, 80, 81, and 82. Further, while a second analog-signal 'signal-two' is generated from a Semiconductor Photo-Diode Array 2's output, as illustrated in FIGS. 64A, 75, 64F, 64G, 79, 80, 81, and 82, which is next passed to an analog read-channel's "Semiconductor Photo-Diode Analog Signal 2" (SPDAS2) pre-amp input as a read-channel's reference-voltage analog-signal, as illustrated in FIGS. 64A, 75, 64F, 64G, 79, 80, 81, and 82.

Furthermore, during a host-requested read-data disk-operation the previously mentioned two analog-signals coming from the read channel's "Semiconductor Photo-Diode Analog Signal 1" (SPDAS1) and "Semiconductor Photo-Diode Analog Signal 2" (SPDAS2) outputs are each pre-amplified by a transimpedence amplifier. Wherein, the read-channel's signal-voltage analog-signal and reference-voltage analog-signal is made to enter a read-channel's 'Read Preamp Circuit' (FIGS. 64A and 64C). Wherein, the two analog-signals will begin to undergo an "Analog to Digital" (ADC) conversion process. Further, after receiving the read channel's signal-voltage analog-signal and reference-voltage analog-signal (FIGS. 64A and 64C), using a 'High Performance Comparator' circuit (FIGS. 79 and 80) located in a read-channel's 'Read Preamp Circuit' (FIGS. 64A and 64C), the read-channel will begin a comparison process between the read channel's signal-voltage analog-signal and reference-voltage analog-signal (FIGS. 64A and 64C). Moreover, the 'High Performance Comparator' circuit's (FIGS. 79 and 80) output of digital data-streams are based upon a comparative logic formula, which states (V1 positive)>(V0 negative)= (Logic 1)=(VDD) or +5–V, while (V1 positive)<(V0 negative)=(Logic 0)=(VSS) or 0–V.

Figure 79:
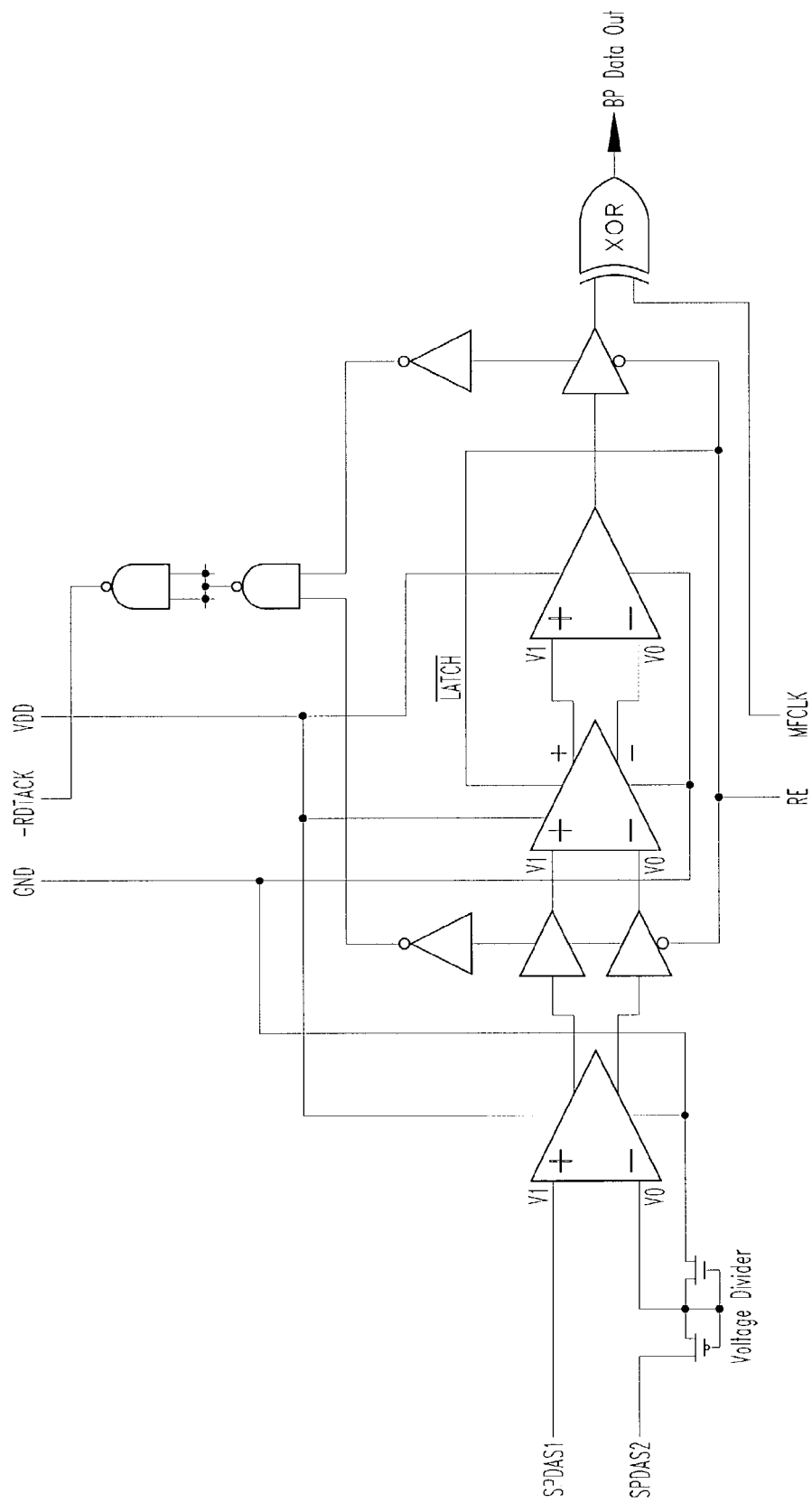
FIG. 79 is a logic-diagram drawing showing the digital logic behind the operation of the read-channels used in the Phase-Change Microhead Array Chips, while displaying the digital logic behind the operation of the Voltage Dividers, the Analog/Digital Comparators, the Pre-Amps, and the XOR bi-phase data-stream encoders.
Figure 80:
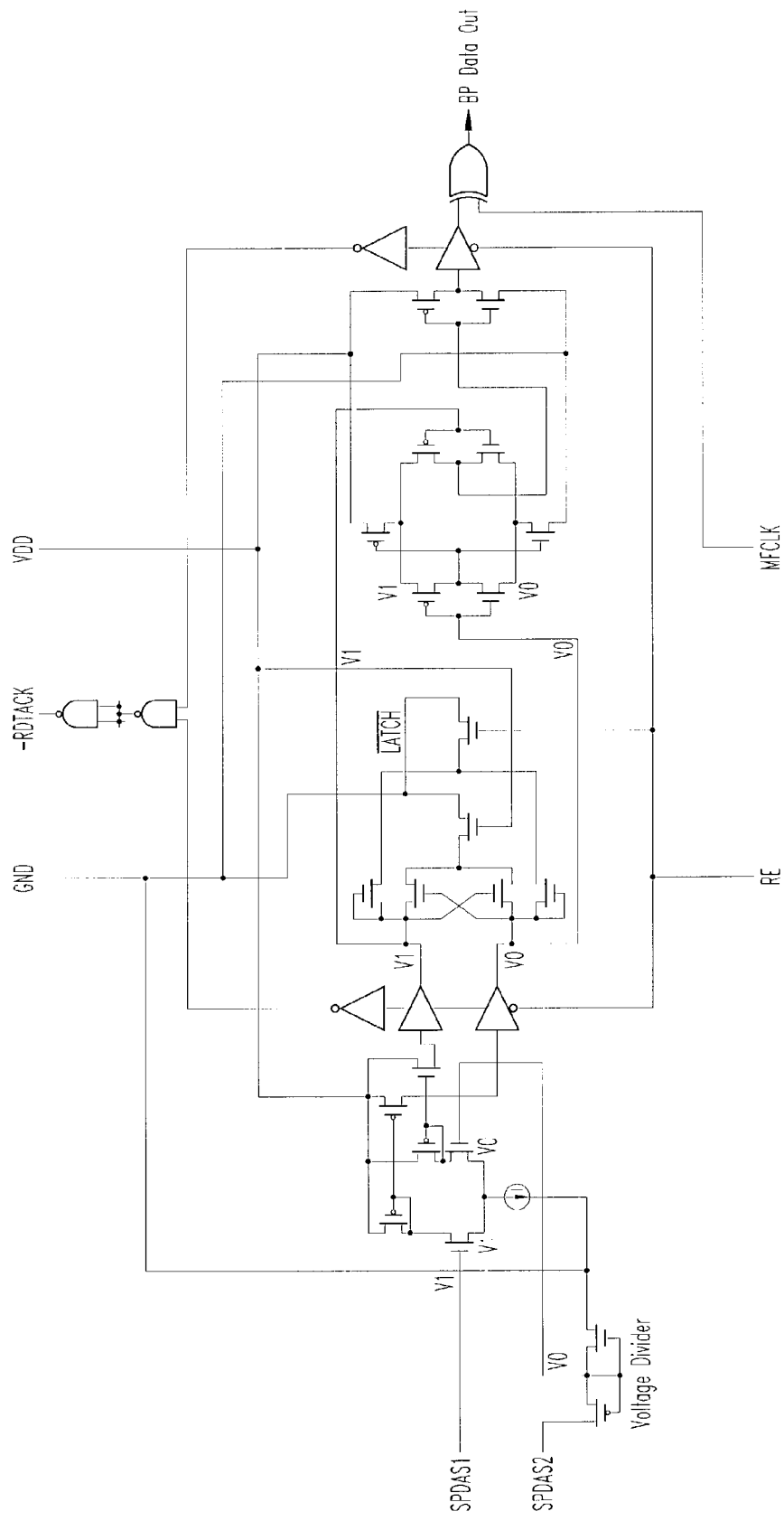
FIG. 80 is a circuit-diagram drawing showing the circuit configurations behind the operation of the read-channels used in the Phase-Change Microhead Array Chips, while displaying circuit configurations behind the operation of the Voltage Dividers, the Analog/Digital Comparators, the Pre-Amps, and the XOR bi-phase data-stream encoders.

Therefore, as illustrated in FIGS. 64A, 75, 64F, and 64G, if the signal-voltage received by the 'High Performance Comparator' SPDAS1's signal-voltage input comes from the SPDAS1's signal-voltage output as a signal with a voltage level above the voltage-divided reference-signal's voltage-threshold, then the 'High Performance Comparator' will output a logic "1", as illustrated in FIGS. 79 and 80. However, as illustrated in FIGS. 64A, 75, 64F, and 64G, if the signal-voltage received by the 'High Performance Comparator' SPDAS1's signal-voltage input comes from a SPDAS1's signal-voltage output as a signal with a voltage level that is below the voltage-divided reference-signal's voltage-threshold, then the 'High Performance Comparator' will output a logic "0", as illustrated in FIGS. 79 and 80.

Figure 81:
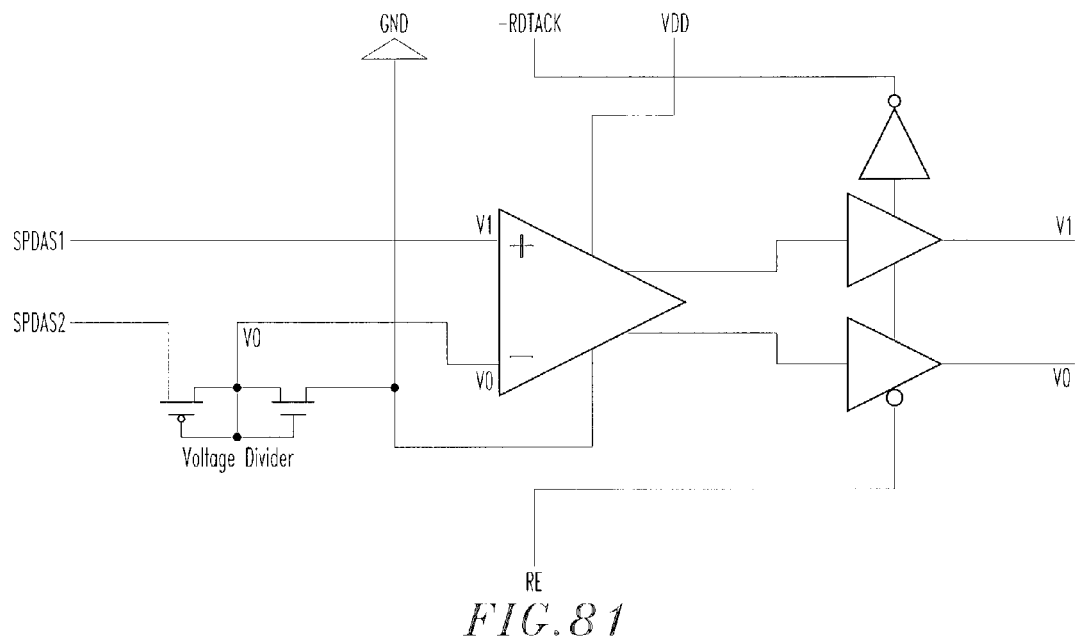
FIG. 81 is a logic-diagram drawing detail showing the digital logic behind the operation of a read-channel's Voltage Divider, Analog-Comparator, Digital Pre-Amp, and "Read Data Acknowledge" (–RDTACK) control circuits.
Figure 82:
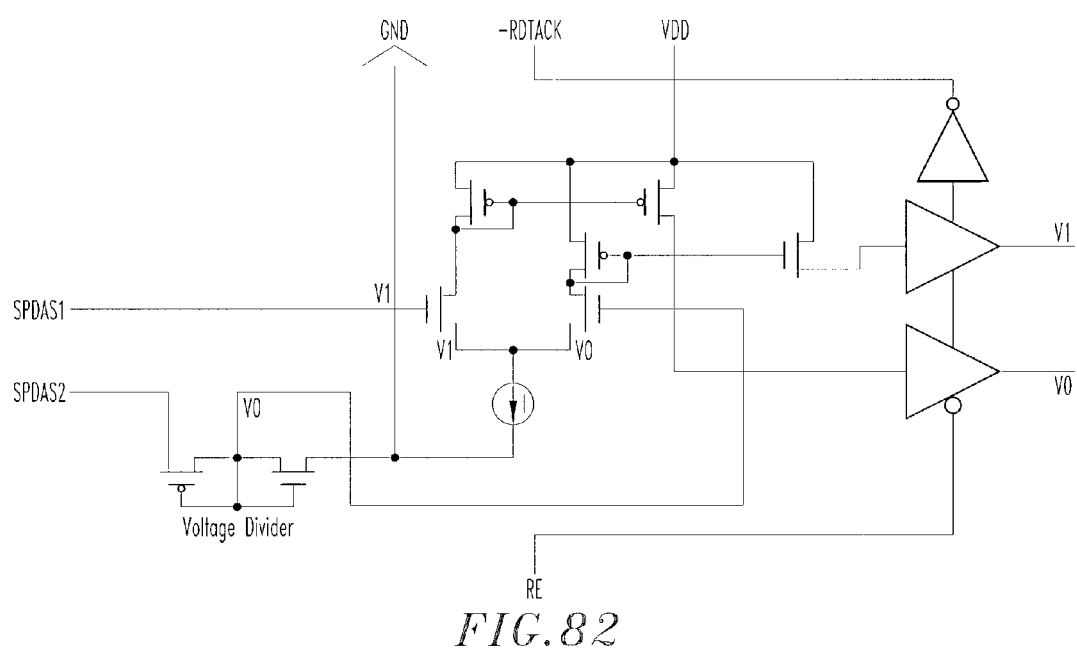
FIG. 82 is a circuit-diagram drawing detail showing the circuit configurations behind the operation of a read-channel's Voltage Divider, Analog-Comparator, Digital Pre-Amp, and "Read Data Acknowledge" (–RDTACK) control circuits.
Figure 83:
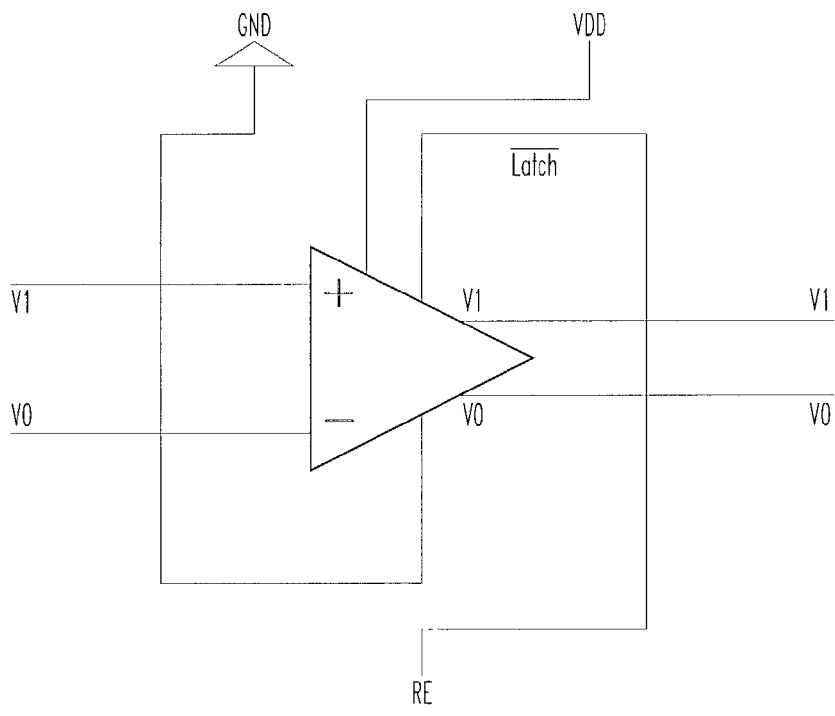
FIG. 83 is a logic-diagram drawing detail showing the digital logic behind the operation of a read-channel's Comparator Decision-Circuit and Read-Enable Latching Circuit.
Figure 84:
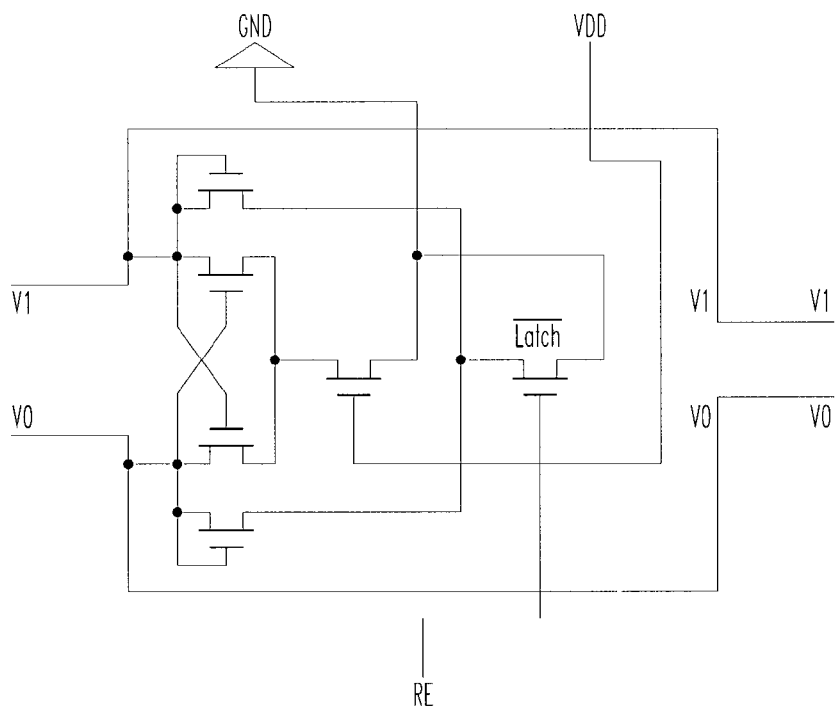
FIG. 84 is a circuit-diagram drawing detail showing the circuit configurations behind the operation of a read-channel's Comparator Decision-Circuit and Read-Enable Latching Circuit.

Furthermore, as illustrated in FIGS. 79, 80, 81, 82, 83, 84, 85, and 86, the circuit that directly proceeds the two signal pre-amplifying analog-signal transimpedence amplifiers in the order of processing data-signal output is a Phase-Change Microhead Array Chip's read-channel 'High Performance Comparator' circuit. Further, the 'High Performance Comparator' circuit offers greater accuracy in its 'analog-to-digital' signal conversions, while providing amplification to the comparators digital-signal output. A read-channel's 'High Performance Comparator' circuit, as illustrated in FIGS. 79, 80, 81, 82, 83, 84, 85, and 86, consists of three-stages, comprising:

i.) An input-preamplifier stage, as illustrated in FIGS. 81 and 82;
ii.) A positive-feedback or what is sometimes called a decision-stage, as illustrated in FIGS. 83 and 84;
iii.) An output-buffer stage, as illustrated in FIGS. 85 and 86.

Subsequently, the previously mentioned 'input pre-amplifier stage' (FIGS. 81 and 82) amplifies incoming-signals to improve the aforesaid comparators sensitivity (i.e., increases the minimum input signal with which the previously mentioned comparator can make a precise decision when it converts an analog signal to a digital signal), while isolating input-signals from any switching noise that might come from the aforesaid positive-feedback stage (i.e., this stage is very important because of the low signal-to-noise ratio the circuit provides to the read-channel's output-signals). In summary, the 'positive-feedback stage' (FIGS. 83 and 84) is used to determine, by using a comparator, which of the two previously mentioned input-signal voltages is largest.

Figure 85:
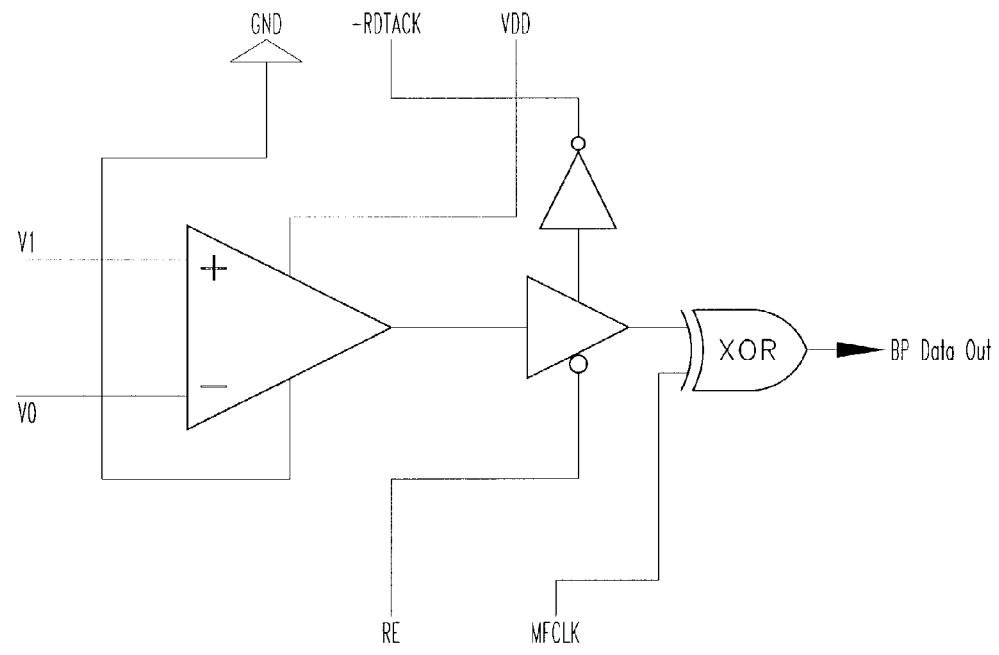
FIG. 85 is a logic-diagram drawing detail showing the digital logic behind the operation of a read-channel's Comparator Buffer Post-Amp Circuits, "Read Data Acknowledge" (–RDTACK) Input Circuits, and XOR Bi-Phase Data-Stream Encoding Pre-DPLL Circuit.
Figure 86:
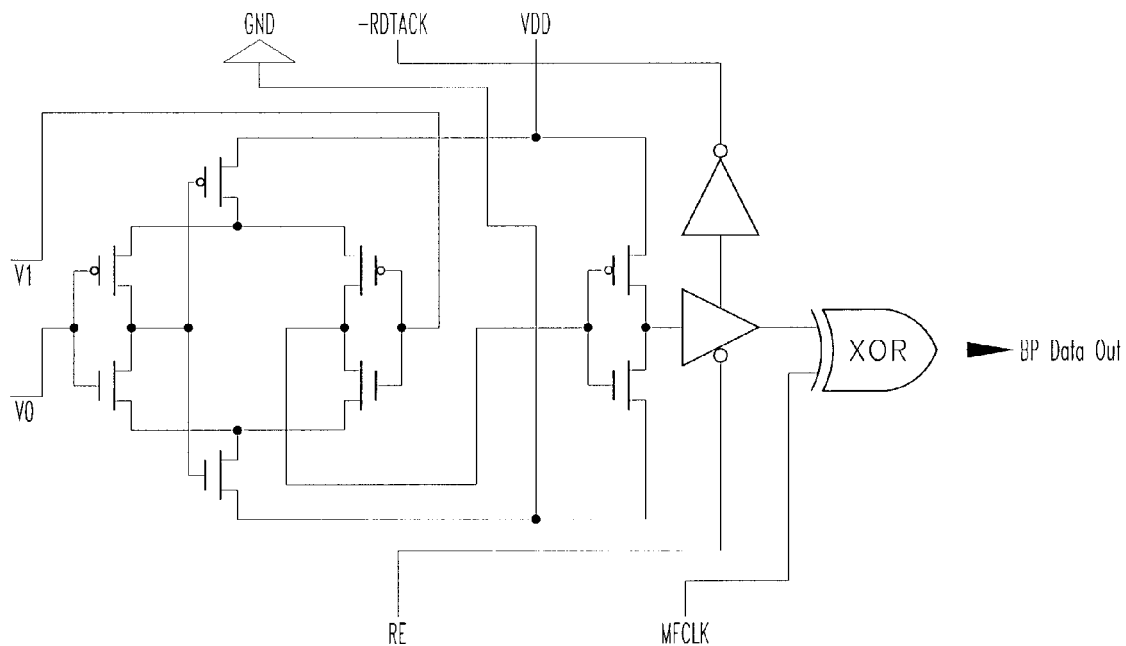
FIG. 86 is a circuit-diagram drawing detail showing the circuit configurations behind the operation of a read-channel's Comparator Buffer Post-Amp Circuit, "Read Data Acknowledge" (–RDTACK) Input Circuit, and XOR Bi-Phase Data-Stream Encoding Pre-DPLL Circuit.
Figure 96:
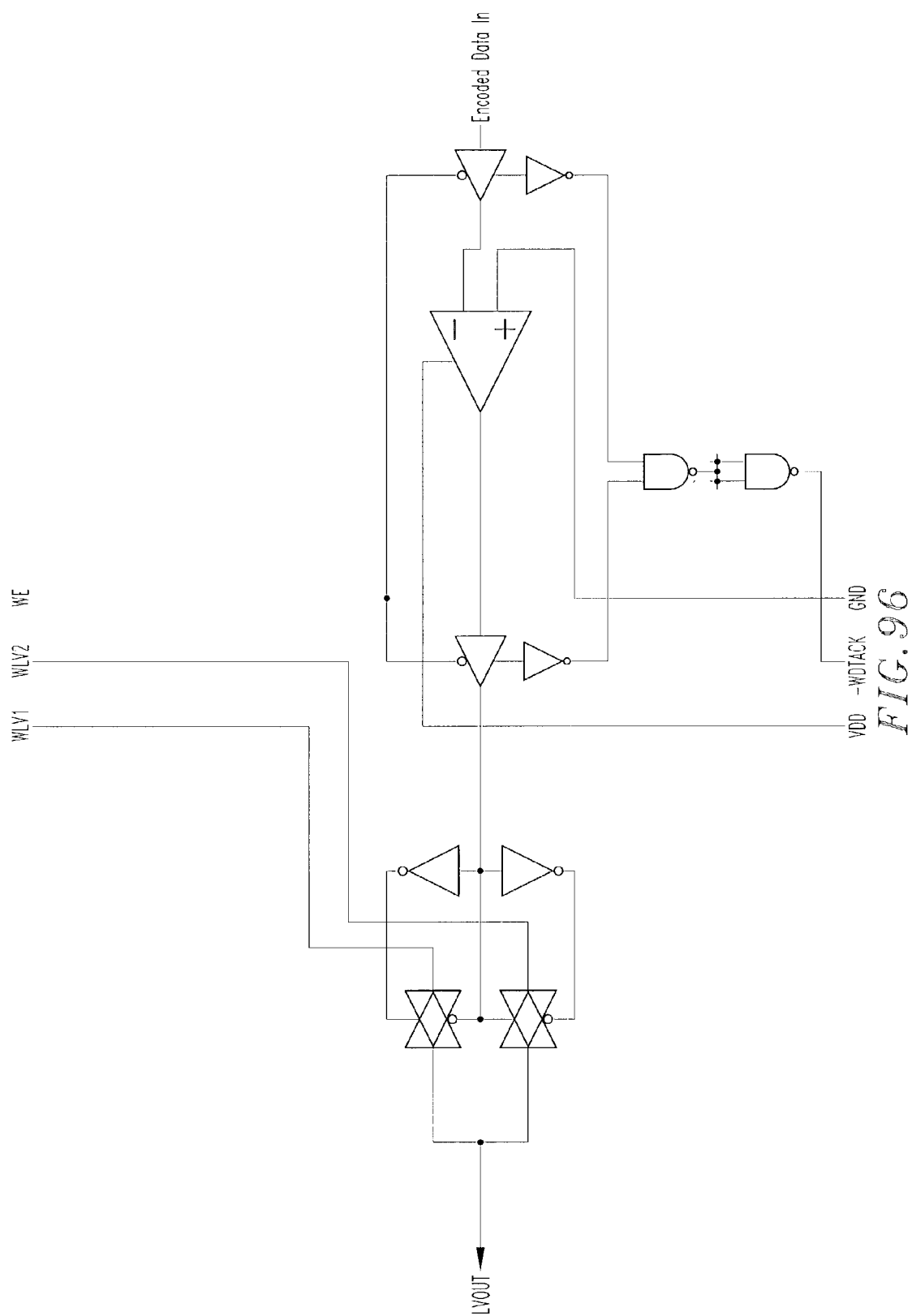
FIG. 96 is a logic-diagram drawing showing the digital logic behind the operation of a write-channel's Pre-Amp and Write Driver Circuit, while displaying the digital logic behind the operation of "Write Data Acknowledge" (–WDTACK) control signals.
Figure 97:
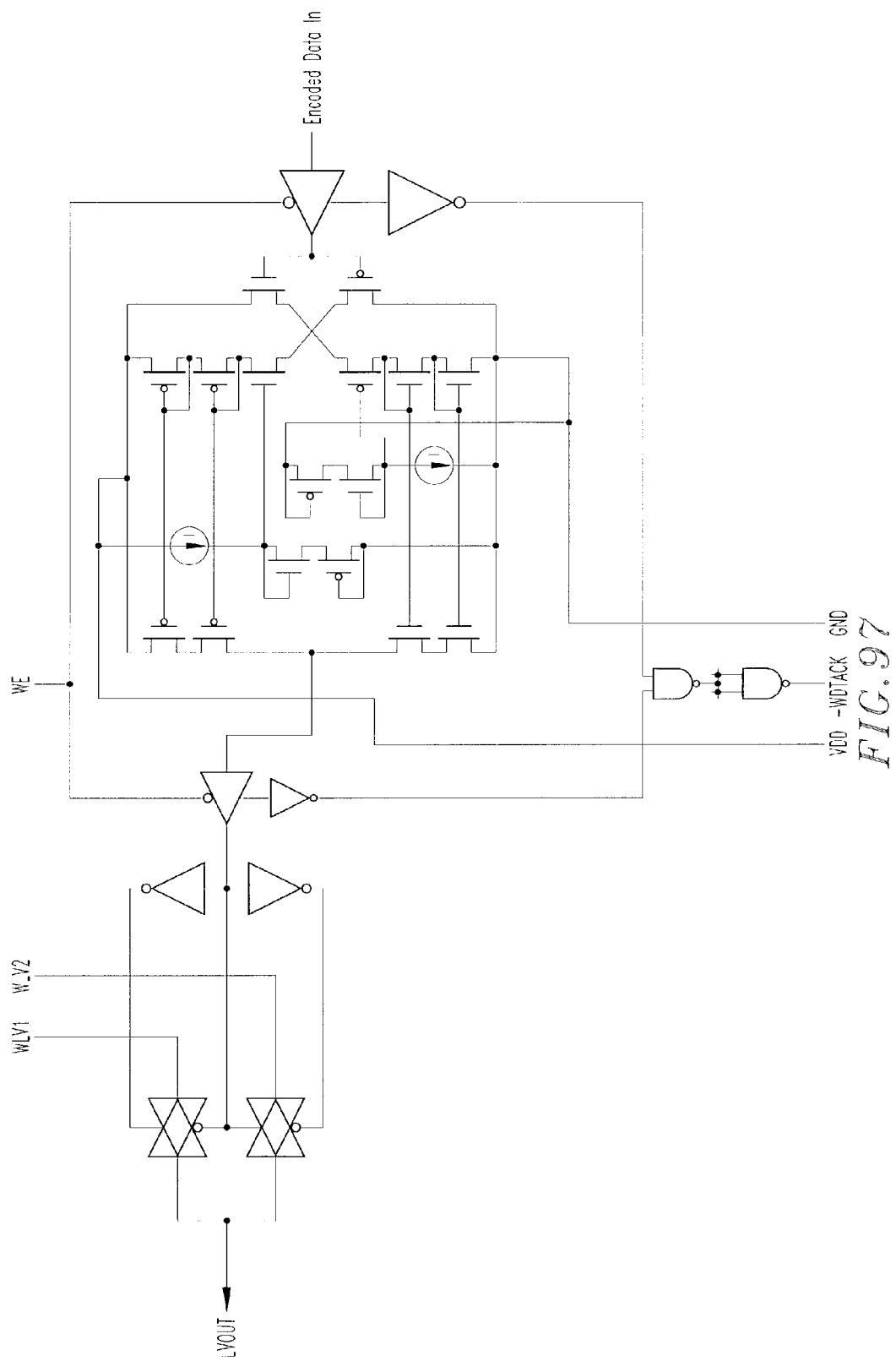
FIG. 97 is a circuit-diagram drawing showing the circuit configurations behind the operation of a write-channel's Pre-Amp and Write Driver Circuits, while displaying the circuit configurations behind the operation of "Write Data Acknowledge" (–WDTACK) control circuits.
Figure 98:
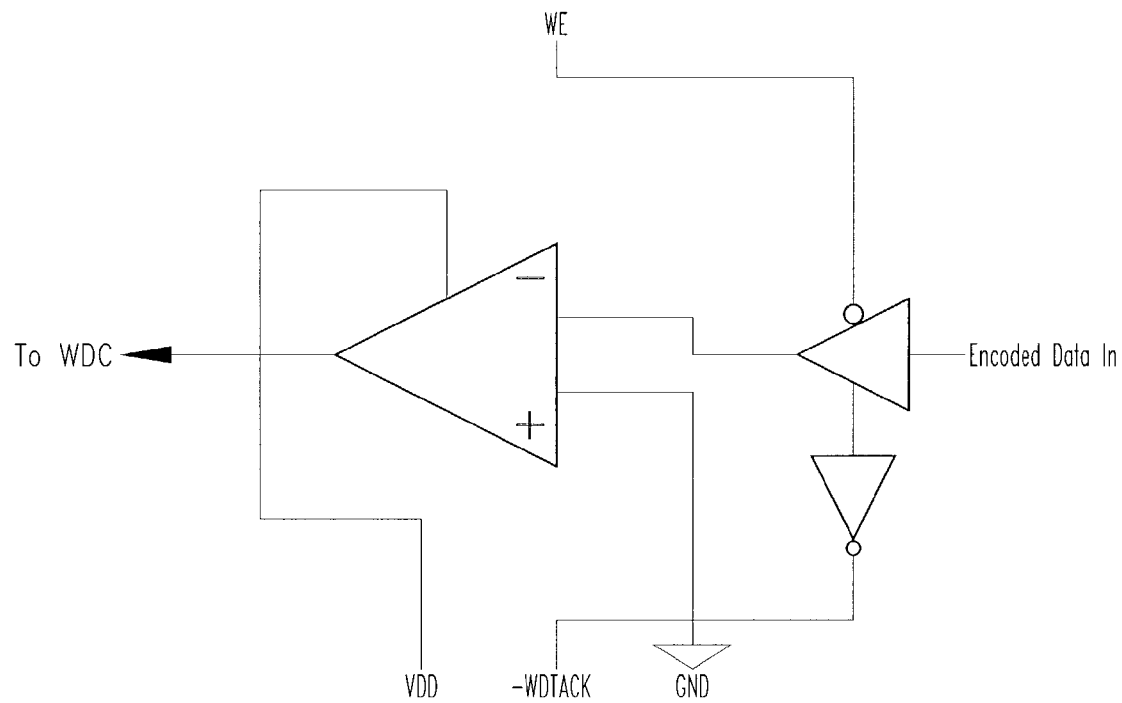
FIG. 98 is a logic-diagram drawing showing the digital logic behind the operation of a write-channel's (AB Class) Pre-Amp Circuit, while displaying the digital logic behind the operation of "Write Data Acknowledge" (–WDTACK) control signals.
Figure 99:
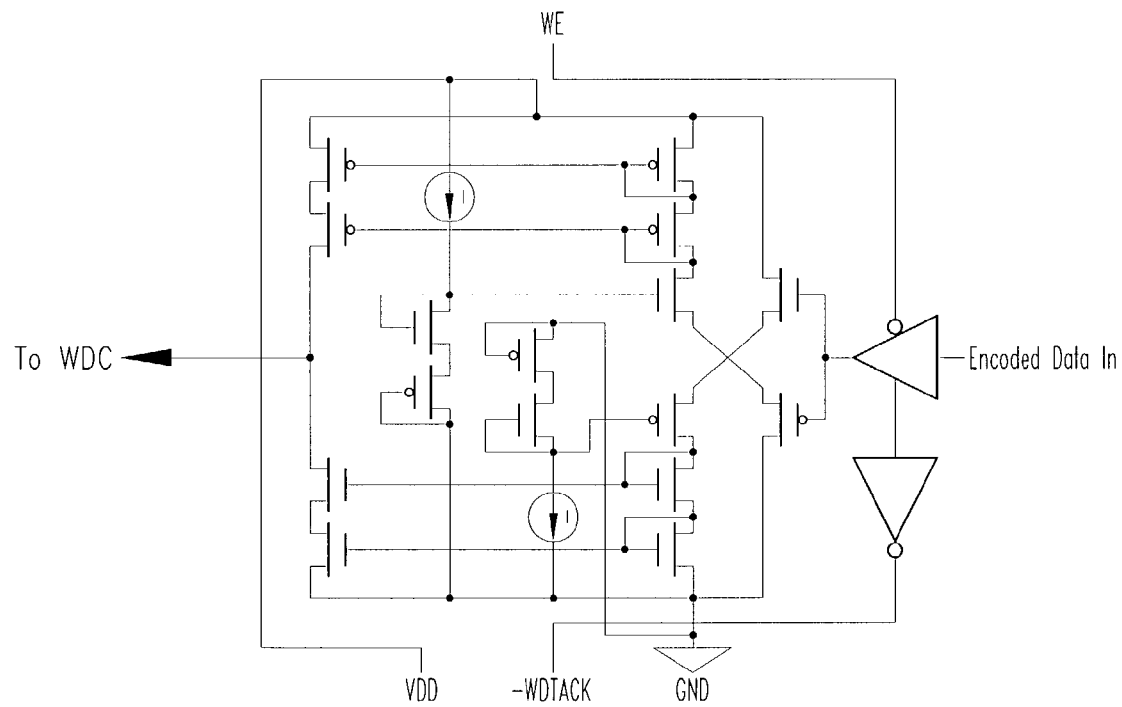
FIG. 99 is a circuit-diagram drawing showing the circuit configurations behind the operation of a write-channel's (AB Class) Pre-Amp Circuit, while displaying the circuit configurations behind the operation of "Write Data Acknowledge" (–WDTACK) control circuits.
Figure 100:
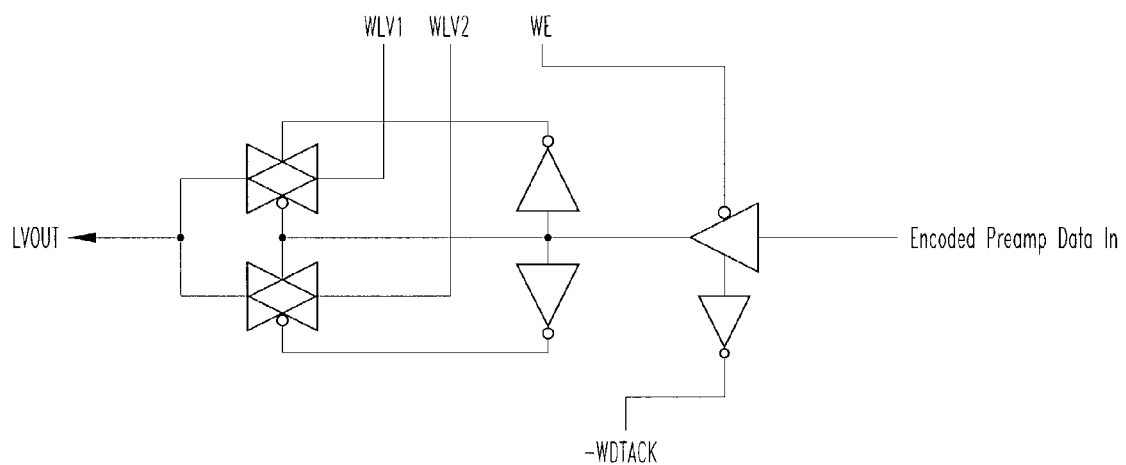
FIG. 100 is a logic-diagram drawing showing the digital logic behind the operation of a write-channel's Data Modulated Write Driver Circuit, while displaying the digital logic behind the operation of "Write Data Acknowledge" (–WDTACK) control signals.
Figure 101:
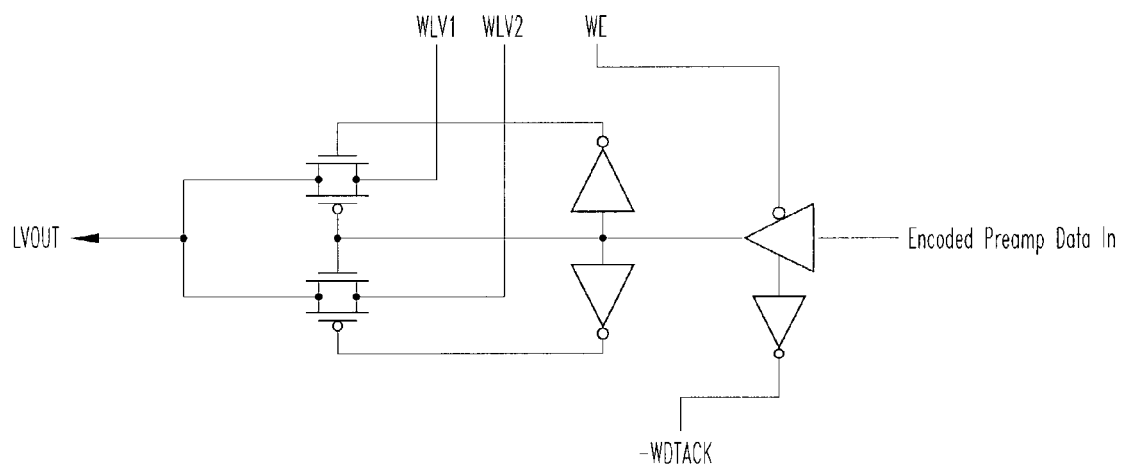
FIG. 101 is a circuit-diagram drawing showing the circuit configurations behind the operation of a write-channel's Data Modulated Write Driver Circuit, while displaying the circuit configurations behind the operation of "Write Data Acknowledge" (–WDTACK) control circuits.
Figure 106:
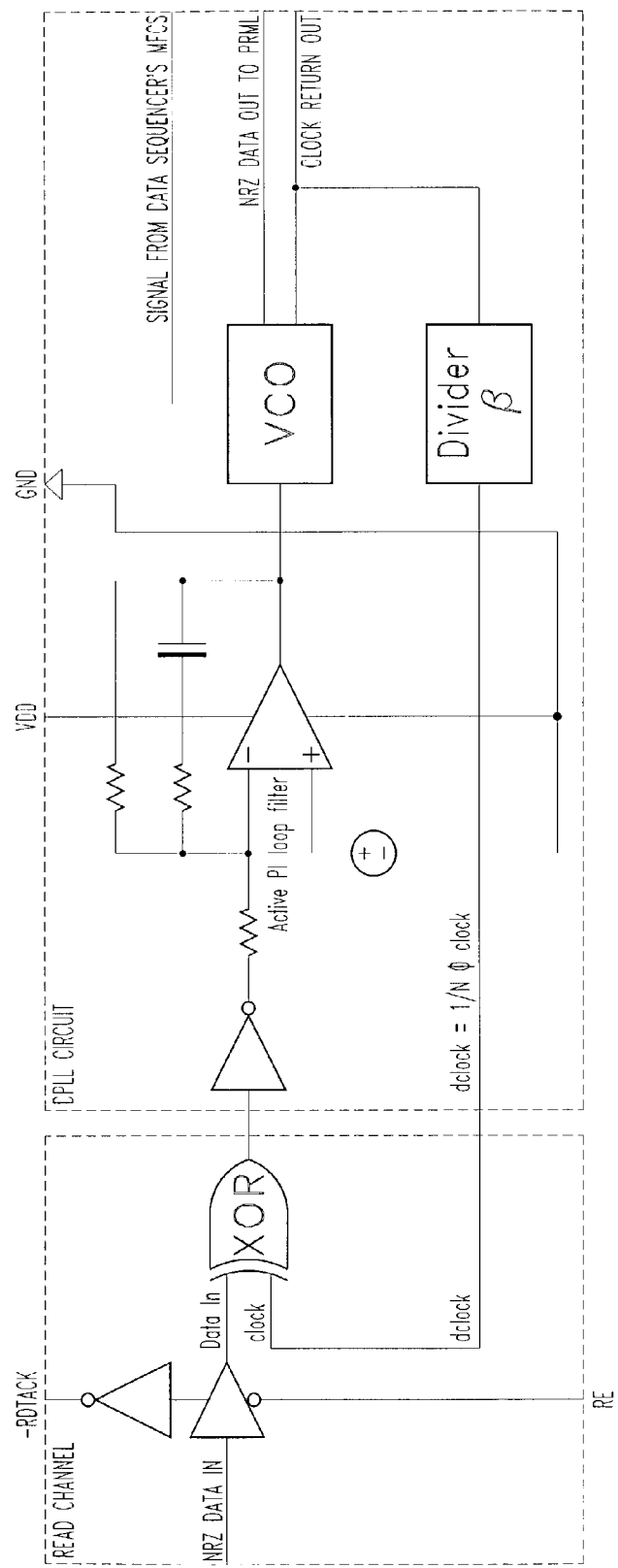
FIG. 106 is both a logic and a block-diagram drawing showing the digital logic behind the operation of a read-channel's XOR and Pre-DPLL Circuit.

In addition, and in the order of signal processing is an aforesaid 'output-buffer stage' (FIGS. 85 and 86), which amplifies the signal output of the 'positive-feedback stage' creating therein a digital data-stream signal, which is next passed onto a read-channel's 'XOR Phase Detector' circuit, where it will undergo a process of encoding (FIGS. 85, 86, and 106). Wherein, a read-channel's output-signal is encoded with a frequency-specific 'Bi-Phase Data Encoding' square-wave code, as illustrated in FIGS. 91, 92, 93, 94, 95, and 106.

The resulting output-signal is a 'Bi-Phase Encoded Data Stream', as illustrated in FIGS. 91, 92, 93, 94, 95, and 106, which is next passed to a Phase-Change Microhead Array Chip's "Data out" (Dout) output-contact labeled as pin-number "63".

Furthermore, as illustrated in FIGS. 62A, 63A, 62C, and 63C, only during a read-data disk-operation, when the read-data laser scanning process actually occurs, will a 'Bi-Phase Encoded Data Stream' output-signal be generated contiguously onto the aforesaid data-bus cable (FIGS. 15 and 16), where it is redirected to a Disk Controller's 'Data-Sequencer' for further signal processing. The read-channel's frequency-specific bi-phase data encoded data-stream output-signal is next made to enter a Data Sequencer's "Digital Phased-Locked Loop" (DPLL) circuit for further signal processing (FIGS. 62A, 63A, 62B, and 63B). Wherein, the previously mentioned data-stream output-signal is next decoded and its clock-signal is recovered (FIG. 106) (the following paragraphs will explain this process in detail).

Moreover, as illustrated in FIGS. 62A, 63A, 62B, and 63B, during a host requested read-data disk-operation a Data Sequencer has a 'Data Transfer Rate Frequency Analyzer' (FIGS. 62A, 63A, 62B, and 63B) calculate the optimal transfer frequency-rate for any data-zone needing to be read during the operation, and then communicates that calculation to a Data Sequencer's 'Multi-Frequency Clock Synthesizer' module. Wherein, a Data Sequencer's 'Multi-Frequency Clock Synthesizer' using calculations it had received earlier from the 'Data Transfer Rate Frequency Analyzer', will generate and then transmit a clock-referencing voltage-signal to a Data Sequencer's "Digital Phased-Locked Loop" (DPLL) circuit, where the clock-referencing voltage-signal is used to assist in the asynchronous and error-free assimilation of data-streams that contain digital reproductions of previously stored data being retrieved from specific disk-platter data-surfaces that contain the host-requested data-sector locations.

In addition, the previously mentioned "Digital Phased-Locked Loop" (DPLL) circuit (FIGS. 62A, 63A, 62B, and 63B), which has a "Voltage Controlled Oscillator" (VCO) circuit that is used to generate a divided-by-two dclock-signal from the clock-referencing voltage-signal it receives from a Data Sequencer's 'Multi-Frequency Clock Synthesizer'. Wherein, the previously mentioned VCO will send the dclock-signal, using a "Multi-Frequency Clock" (MFCLK) control bus line (FIGS. 15 and 16), to all "Multi-Frequency Clock" (MFCLK) input-contacts labeled as pin-number "35", which is present in all Phase-Change Microhead Array Chips, as illustrated in FIGS. 11, 12, 13, and 14. Further, once received by the host-selected Phase-Change Microhead Array Chip, which as an example is labeled within this embodiment as chip number "5", the "Divided Clock" (DCLOCK) dclock-signal is rerouted from the input-contact labeled as pin-number "35" to the dclock-signal input of the read-channel's pre-dpll 'XOR Phase Detector' circuit (FIG. 106), which is located opposite the data-signal input of the read-channel's pre-dpll 'XOR Phase Detector' circuit, as illustrated in FIGS. 85, 86, 91, and 92.

Moreover, as illustrated in FIGS. 85, 86, 91, 92, and 106, to finish the encoding process the read-channel's buffered data-stream signal is next routed directly to the data-signal input (FIG. 106) of the read-channel's pre-dpll 'XOR Phase Detector' circuit, where it will undergo a final process of 'bi-phase data encoding'. For example, during the host requested read-data disk-operation, scanned data, using Phase-Change Microhead Array Chip number: "5", from data-surface: "5", using microhead: "4562", from cylinder/track number: "4562", at sector number: "43" is converted from a photo-generated analog-signal to a comparator-generated digital-signal. After which, the comparator generated digital-signal is passed onto the previously mentioned XOR phase-detector's 'Bi-Phase Data Encoding Circuit' (FIGS. 85, 86, 91, and 92), where the read-channel's data-stream output is bi-phase encoded then as a next step in the read-data disk-operation it is sent to the Data Sequencer's "Digital Phase-Locked Loop" (DPLL) circuit (FIG. 106) for further signal processing.

Furthermore, the Disk Controller's 'Data Sequencer' contains the data-receiving portion of a Phase-Change Microhead Array Chip's pre-dpll circuit, which is located within the Data-Sequencer's "Digital Phase-Locked Loop" (DPLL) circuit, as illustrated in FIGS. 62A, 63A, 62B, and 63B. Additionally, the Data Sequencer's 'DPLL circuit', as illustrated in FIGS. 62A, 63A, 62C, 63C, uses circuits located within its "Voltage Controlled Oscillator" (VCO) to recover clock-signals from the 'Bi-Phase Encoded Data Stream' output-signals it receives. Further, after a clock-signal is recovered and extracted by the 'VCO circuit' the recovered clock-signal is primarily used during a host requested read-data disk-operation to resolve any data-transfer frequency-rates for any disk-platter data-zone needed to be read during the read-data disk-operation; as per read-data requests sent by the host-system. Moreover, the Disk Controller's 'Data Sequencer' is also designed to make on-the-fly data-transfer frequency-rate comparisons, which will be used to make on-the-fly adjustments to a Phase-Change Microhead Array Chip Hard Disk Drive's data-transfer frequency-rates and spindle-motor control systems used to control the rate of rotation for all disk-platters installed into a Phase-Change Microhead Array Chip Hard Disk Drive's unit-assembly.

Therefore, when the Data Sequencer makes on-the-fly comparisons of the various feedback signals it receives; it can, using the DPLL's clock generating "Voltage Controlled Oscillator" (VCO) circuit (FIG. 106) to implement changes to the frequency-rate of its dclock output-signal, make on-the-fly changes in data-transfer frequency-rates that occur within the DPLL circuit. As a result, the Data Sequencer can implement instantly data-transferring frequency-rate optimizations and/or corrections within the system in real-time. For example, on-the-fly adjustments to a Spindle-Motor's 'constant angular velocity' are accomplished using a Data Sequencer's 'Disk Controller Interface'. Wherein, the 'Disk Controller Interface', by analyzing the feedback signals generated by the 'Spindle Motor' the 'Disk Controller Interface' can accurately control a Spindle-Motor's rate of "Revolutions-Per-Minute" (RPM) using a Disk Controller's 'Motor Controller' circuit to execute an on-the-fly control over the Spindle-Motor, as illustrated in FIGS. 62A, 63A, 62B, 63B, 62C, and 63C. Consequently, this also offers a more responsive and a faster Phased-Locked Loop of data-stream output-signals created by a selected Phase-Change Microhead Array Chip's read-channel during read-data disk-operations.

Moreover, as illustrated in FIG. 106, the Data Sequencer's "Digital Phase-Locked Loop" (DPLL) circuit, after receiving the read-channel's encoded data-stream output-signal, it will decode the 'Bi-Phase Encoded Data Stream' and recover the clock-signal contained within the data-stream's signal, using circuits located within the DPLL's "Voltage Controlled Oscillator" (VCO) circuit (FIG. 106) to execute the clock-signal's recovery. The clock-signal after being recovered by the DPLL's VCO circuit is sent to a Data Sequencer's 'Data Transfer Rate Frequency Analyzer' for further processing. Moreover, the 'Data Transfer Rate Frequency Analyzer' will use recovered clock-signals to help resolve the data-transfer frequency-rate of any data-zone requested by the host. Further, to accomplish an on-the-fly resolving of any particular data-zone's data-transfer frequency-rate the 'Data Transfer Rate Frequency Analyzer' will make an on-the-fly comparisons between the data-transfer frequency-rate of the DPLL's recovered clock-signals and the original data-transfer frequency-rates that were calculated earlier and used to initialize the read-data disk-operation for any particular data-zone containing host-requested data.

Moreover, the Data Sequencer's 'Data Transfer Frequency Rate Analyzer' will make on-the-fly comparisons between the various feedback-signals it receives. Further, the 'Data Transfer Frequency Rate Analyzer', after it makes its on-the-fly comparisons of various feedback signals, will create an optimized data-transfer frequency-rate calculation, which is next transferred to a Data Sequencer's "Multi-Frequency Clock Synthesizer" (MFCS) module, as illustrated in FIGS. 62A, 63A, 62B, and 63B. Moreover, the "Multi-Frequency Clock Synthesizer" (MFCS) will use the data-transfer frequency-rate calculation it received from the Data Sequencer's 'Data Transfer Frequency Rate Analyzer' to create a new clock-signal at the new frequency rate, which in turn will be sent to a DPLL's 'VCO circuit', where the new clock-signal is re-routed as a divided or dclock-signal to the host-selected Phase-Change Microhead Array Chip, where it will be used to implement read-data synchronization between data-stream output-signals and the Disk Controller. Additionally, as illustrated in FIGS. 62A, 63A, 62B, and 63B, the decoded 'Bi-Phase Encoded Data Stream' data-signal is re-encoded by the VCO circuit (FIG. 106) into a more conventional "Non-Return to Zero" (NRZ) encoded data-signal, which is next transferred to a Disk Controller's 'PRML Controller' circuit, where it will next undergo additional signal processing.

Moreover, the encoding of a read-channel's data-stream output-signals with 'Bi-Phase Data Encoding' is executed using an exclusive 'XOR Phase Detector' circuit to perform the process, as illustrated in FIGS. 91, 92, 93, 94, 95, and 106. As illustrated in FIG. 106, the previously described encoding strategy makes possible a quick and easy recovery of a clock-signal from the read-channel's data-stream output-signals, and the conversion of the remaining serial-data output into the more conventional "Non-Return to Zero" (NRZ) encoded data-stream, using a well-known encoding process. Further, the previously mentioned bi-phase data encoding of the read-channel's data-stream output-signals, also makes it possible to 'Digitally Phase-Lock Loop' the data-stream with much greater accuracy, while avoiding placement of an odd-parity bit at the end of every eight-bit word to eliminate the possibility of all eight bits being high. Therefore, when we use 'Bi-Phase Data Encoding' (FIG. 93) to encode a data-stream output-signal, the parity bits normally used by a data-stream output-signal to achieve full data-transfer synchronization are not needed when using this scheme. Further, because bi-phase encoding reconfigures the data-stream output-signal to have its rise and fall of its square-wave to occur at the center of the data-stream's clock, full data-transfer synchronization is easily accomplished.

In addition, the "Non-Return to Zero" (NRZ) encoded data-stream is sent by the DPLL's "Voltage Controlled Oscillator" (VCO) (FIG. 106) circuit as a serial signal to a Data Sequencer's 'PRML Controller' circuit for 'Veterbi' signal-analysis. The Data Sequencer's 'PRML Controller' circuit is also where a "Non-Return to Zero" (NRZ) encoded serial data-stream will undergo a final conversion, where it is changed into a 16-bit double data-word. After which, the reproduced data is next transferred to a Disk Controller's 'Buffer Controller' for temporary storage, so that the Data Sequencer's Disk Controller Interface and ECC circuits, as illustrated in FIGS. 62A, 63A, 62B, 63B, 62C, and 63C, can identify the temporarily stored data, as belonging to, for example, the host-requested data as contained in data-sector "43". Consequently, if the Data Sequencer's Disk Controller Interface and ECC circuits, as illustrated in FIGS. 62A, 63A, 62B, 63B, 62C, and 63C, make a positive target-sector identification, for example as in the case of data-sector "43", then the read-data that the Disk Controller's 'Buffer Controller' has temporarily stored can be presented to the host-system in the form of 16-bit data-blocks, which is executed through a Disk Controller's 'IDE or SCSI Interface Controller'.

In addition, during a read-data disk-operation, when a full data-sector is read (i.e., for example data-sector "43" being a full data-sector of "1024k") into the Disk Controller's 'Buffer Controller' for temporary storage, after which the Disk Controller's "Error Correction Control" (ECC) circuit module will check to see if the firmware stored in a Disk Controller's 'Serial EEPROM' needs to apply "Error Correction Control" (ECC) to the temporarily stored reproduced data. Further, the Disk Controller's 'Buffer Controller' will store the reproduced data into a temporary memory-cache, while ECC, if needed, is applied to it, if it is not then the reproduced data is transferred to the host-system using an IDE or an SCSI interface as the transfer interface. Wherein, a Disk Controller's 'IDE or SCSI Interface Controller' is used to execute and control the transfer of host-requested data to the host-system; for example, the transfer of host-requested data, which was read and reproduced from data-sector "43".

In addition, the detailed description of the present Phase-Change Microhead Array Chip Hard Disk Drive invention's first embodiment will continue, as illustrated in drawing FIGS. 64A and 64D, with a description of a Phase-Change Microhead Array Chip's write-channel, along with all of the various circuits that comprise it. Including a detailed description explaining how the write-channel gives connectivity to the host-system, using the Phase-Change Microhead Array Chip Hard Disk Drive's SCSI or IDE interfaces, which are both used in the first embodiment to connect a Phase-Change Microhead Array Chip Hard Disk Drive up to the host computer system.

Furthermore, a write-channel's signal-path during a write-data disk-operation will essentially follow a reversal of the steps used to describe the read-channel's signal-path during a read-data disk-operation. Moreover, a host-system executes a write-data disk-operation within a Phase-Change Microhead Array Chip Hard Disk Drive by first presenting it with a 16-bit data-word data-block. The previously mentioned data-block is sent to the 'IDE or SCSI Interface Controller' located within the Phase-Change Microhead Array Chip Hard Disk Drive's Disk Controller, via an IDE or SCSI interface connector attached to the Disk Controller's PCB. During a write-data disk-operation, the 16-bit data-word data-block would first be transmitted to the Disk Controller's 'Buffer Controller' for temporary storage in a Phase-Change Microhead Array Chip Hard Disk Drive's cache memory.

To explain further, because data-blocks can be presented to a Phase-Change Microhead Array Chip Hard Disk Drive at transfer-rates that exceeds the transfer-rate at which a Phase-Change Microhead Array Chip Hard Disk Drive can write-data to a disk-platter's data-surface, data is stored temporarily in the Buffer Controller's cache-memory. Further, the host-system can present data to a Phase-Change Microhead Array Chip Hard Disk Drive for storage at transfer-rates independent of the transfer-rate at which a Phase-Change Microhead Array Chip Hard Disk Drive can write-data to a diskplatter's data-surface.

Therefore, upon correct identification of a target-sector's address, the before mentioned data-block will be shifted to a Data Sequencer's 'Disk Controller Interface' and then to the drive's 'ECC' circuits, as illustrated in FIGS. 62A, 63A, 62B, 63B, 62C, and 63C. After the data-block is shifted to the drive's 'ECC' circuits, "Error Correction Code" (ECC) will be generated and appended to the before mentioned data-block. A Data Sequencer's 'Data Encoder' will next convert the previously mentioned data-blocks into a "Non-Return to Zero" (NRZ) encoded serial data-stream input-signal. The data-stream input-signal, after being encoded will be transferred at a calculated and optimal data-transfer frequency-rate for the data-zone containing the empty data-sector the host-system will use for the data-block's storage. The data-stream input-signal is used to complete the write-data disk-operation, by using it's encoded data-stream to execute a controlled modulation of either a selected laser-diode's write-data output-power emissions to create a faithful writing of the data comprising the data-stream input-signal to a disk-platter's data-surface containing a 'Tellurium' based 'Phase-Change' recording medium 13 (FIGS. 1, 2, and 3).

However, before data can be written to any particular data-sector of any particular disk-platter a Phase-Change Microhead Array Chip must first be host-selected to execute the process. This process begins when a Phase-Change Microhead Array Chip Hard Disk Drive's Disk Controller first forwards a host-requested cylinder/track and data-sector address location to a Phase-Change Microhead Array Chip Hard Disk Drive's 'Asynchronous Optical Microhead Address Controller' 63 (FIG. 4), 80 (FIG. 5) for translation.

Wherein, an 'Asynchronous Optical Microhead Address Controller', which is located on a Phase-Change Microhead Array Chip Hard Disk Drive Disk Controller's "Printed Circuit Board" (PCB) 63 (FIG. 4), 80 (FIG. 5) temporally stores the host-requested data location addresses in an Asynchronous Optical Microhead Address Controller's 'Address Translation Register', which is located in the Asynchronous Optical Microhead Address Controller's 'Address Unit'. Further, an 'Asynchronous Optical Microhead Address Controller' will translate the address information stored in an Asynchronous Optical Microhead Address Controller's 'Address Translation Register' into executable form of control-code. Wherein, the control-code will be used to execute the host-requested selection of one particular Phase-Change Microhead Array Chip, which contains a stationary microhead that is located above one particular cylinder/track and data-sector location the host-system wishes to use to store incoming data.

Moreover, the host-selection of a Phase-Change Microhead Array Chip and the data-sector locating microhead it contains is executed through a bus-system that is collectively shared by all installed Phase-Change Microhead Array Chips. This bus-system comprises a group of cables, which will collectively connect all installed Phase-Change Microhead Array Chips into a daisy-chained bus configuration, and will be used to send asynchronous microhead address and chip-control bus-signals simultaneously to all of the Phase-Change Microhead Array Chips that are installed into a Phase-Change Microhead Array Chip Hard Disk Drive's unit-assembly.

However, before a write-data disk-operation can take place, the 'Asynchronous Optical Microhead Address Controller' must first select and enable one particular Phase-Change Microhead Array Chip from the group of installed chips. While this selection process is similar to that used in conventional hard disk drives it differs because every installed Phase-Change Microhead Array Chip is comprised as a stationary device (i.e., never moving, always in one place), which has a stationary microhead-array located within itself that comprises a multitude of stationary photo-detectors and singularly addressable laser-diodes 1 (FIGS. 41, 42, 43, and 44) all of which are contained within every stationary microhead-array.

In addition, the previously mentioned Phase-Change Microhead Array Chip selection process is first initialized by executing a "Chip Select" (–CS) chip-control bus-signal (FIG. 64A, FIG. 64B), which is one of two control-signals responsible for the selection of one Phase-Change Microhead Array Chip amongst many that are collectively connected to a Phase-Change Microhead Array Chip Hard Disk Drive. A Phase-Change Microhead Array Chip's Chip-Selection process is accomplished through point-to-point individual "Chip Select" (–CS) chip-control bus-system ribbon cable lines. Wherein, point-to-point chip-control bus-system control lines somewhere along their signal paths are dedicated to and for each Phase-Change Microhead Array Chip that is installed into a Phase-Change Microhead Array Chip Hard Disk Drive's unit-assembly (i.e., eight installed Phase-Change Microhead Array Chips would each have its own separate Chip Select point-to-point chip-control bus-system control line).

Subsequently, the "Chip Select" (–CS) point-to-point control-signal bus lines are each redirected from their bus line flex-cable connector location, which is present on every chip-positioning circuit board to a previously mentioned chip-positioning circuit board's surface-mounted chip-socket's pin-number "38" input-contact. Further, the previously mentioned redirection of the "Chip Select" (–CS) point-to-point chip-control bus-system signal lines, which are located on every chip-positioning circuit board installed into a Phase-Change Microhead Array Chip Hard Disk Drive's unit-assembly is based upon a cross-connect design that uses a "Chip Select" (–CS) line that is different and unique for every chip-positioning circuit board's circuit-trace architecture, as illustrated in FIG. 17, 18, 19, 20, 21, 22, 23, and 24.

Therefore, the Phase-Change Microhead Array Chip's chip-positioning circuit board surface-mounted chip-socket's input-contact labeled pin-number "38" and the chip-positioning circuit board's Polymer flex-cable connector inputs are cross-connected, giving control over the selection of every Phase-Change Microhead Array Chip installed into a Phase-Change Microhead Array Chip Hard Disk Drive's unit-assembly.

In addition, here are eight examples of redirected "Chip Select" (–CS) Chip-Selection chip-positioning circuit board cross-connects used by the Phase-Change Microhead Array Chips. Further, as FIG. 17 illustrates, the –CS Polymer flex-cable input bus-line "49", also called "Chip Select 0" (–CS0), is physically redirected to the surface-mounted chip-socket's contact-input labeled as pin-number "38" (FIGS. 11 and 12), which is present in all Phase-Change Microhead Array Chips.

In addition, as FIG. 18 illustrates, the –CS Polymer flex-cable input bus-line "50", also called "Chip Select 1" (–CS1), is physically redirected to the surface-mounted chip-socket's contact-input labeled as pin-number "38" (FIGS. 11 and 12), which is present in all Phase-Change Microhead Array Chips.

In addition, as FIG. 19 illustrates, the –CS Polymer flex-cable input bus-line "51", also called "Chip Select 2" (CS2), is physically redirected to the surface-mounted chip-socket's contact-input labeled as pin-number "38" (FIGS. 11 and 12), which is present in all Phase-Change Microhead Array Chips.

In addition, as FIG. 20 illustrates, the –CS Polymer flex-cable input bus-line "52", also called "Chip Select 3" (–CS3), is physically redirected to the surface-mounted chip-socket's contact-input labeled as pin-number "38" (FIGS. 11 and 12), which is present in all Phase-Change Microhead Array Chips.

In addition, as FIG. 21 illustrates, the –CS Polymer flex-cable input bus-line "53", also called "Chip Select 4" (–CS4), is physically redirected to the surface-mounted chip-socket's contact-input labeled as pin-number "38" (FIGS. 11 and 12), which is present in all Phase-Change Microhead Array Chips.

In addition, as FIG. 22 illustrates, the –CS Polymer flex-cable input bus-line "54", also called "Chip Select 5" (–CS5), is physically redirected to the surface-mounted chip-socket's contact-input labeled as pin-number "38" (FIGS. 11 and 12), which is present in all Phase-Change Microhead Array Chips.

In addition, as FIG. 23 illustrates, the –CS Polymer flex-cable input bus-line "55", also called "Chip Select 6" (–CS6), is physically redirected to the surface-mounted chip-socket's contact-input labeled as pin-number "38" (FIGS. 11 and 12), which is present in all Phase-Change Microhead Array Chips.

In addition, as FIG. 24 illustrates, the –CS Polymer flex-cable input bus-line "56", also called "Chip Select 7" (–CS7), is physically redirected to the surface-mounted chip-socket's contact-input labeled as pin-number "38" (FIGS. 11 and 12), which is present in all Phase-Change Microhead Array Chips.

Furthermore, since there is one unique (i.e., non-bused point-to-point) "Chip Select" (–CS) bus-line available to each of the installed "8" Phase-Change Microhead Array Chips through cross-connect circuitry, each of the installed "8" Phase-Change Microhead Array Chips can now be individually selected and controlled during the course of a write-data disk-operation. Moreover, the connectivity of the Phase-Change Microhead Array Chip 'ChipSelection' process is illustrated in FIGS. 60A, 61A, 60B, 61B, 60C, and 61C.

In addition, a Data Sequencer's 'Data Bus Controller' is used during a write-data disk-operation to switch a selected Phase-Change Microhead Array Chip's "Read or Write" (R/–W) condition from a "Read Enable" (RE) read condition to a "Write Enabled" (WE) write condition. Whereby, the switching of a Phase-Change Microhead Array Chip's Data I/O condition from a "Read Enable" (RE) read-condition to a "Write Enabled" (WE) write-condition is simply accomplished, when the Data Sequencer sends a logic-low low-voltage chip-control bus-signal down through the "Read or Write" (R/–W) chip-control bus-line, where it collectively connects to every Phase-Change Microhead Array Chip installed and connected to a Phase-Change Microhead Array Chip Hard Disk Drive's bus-system and through, which the logic-low low-voltage chip-control bus-signal will finely reach the host-selected Phase-Change Microhead Array Chip. Whereby, the Phase-Change Microhead Array Chip being host-selected, would be the only Phase-Change Microhead Array Chip connected to the bus-system to have its Data I/O condition switched from a read-condition to a write-condition, as illustrated in FIGS. 60A, 61A, 60B, 61B, 60C, and 61C.

In addition, and at a precise rotational moment, when the host-requested disk-sector to be written too is directly underneath the host-selected microhead, an encoded "Runtime Length Limited" (RLL) data-stream signal is transmitted from the Data Sequencer's 'Data Bus Controller', as illustrated in FIGS. 62A, 63A, 62B, 63B, 62C, and 63C, to a selected Phase-Change Microhead Array Chip's "Data In" (DIN) input-contact labeled as pin-number "63" (FIGS. 64A and 64C). Wherein, the data-stream signal is re-routed to the host-selected Phase-Change Microhead Array Chip's Write Pre-amp Circuit's "Data In" (DIN) input. This is where the "Runtime Length Limited" (RLL) data-stream signal is first pre-amplified, and sent to the "Data Modulated Input 1" (DMOD1) input of the selected Phase-Change Microhead Array Chip's Write Driver Circuit.

However, during a write-data disk-operation the write-data process actually begins when a Disk Controller has received a write-data disk-operation request from the host-system to write-data to a particular disk-platter's cylinder/track location that contains disk-sector(s) marked as empty. For example, the previously mentioned host-system will send a write-data request through its respective computer's IDE or SCSI interface. Wherein, the write-data request is received by a Phase-Change Microhead Array Chip Hard Disk Drive's Disk Controller, and might look like this—Requested write-data using disk id: "0", at head number: "5", at cylinder/track number: "4562", at sector number: "43". Moreover, the previously mentioned Disk Controller's 'Asynchronous Optical Microhead Address Controller', as illustrated in FIGS. 62A, 63A, 62B, 63B, 62C, and 63C, would receive the previously mentioned write-data request from a Phase-Change Microhead Array Chip Hard Disk Drive's Disk Controller and place it into its 'Disk Controller Interface Register' (FIGS. 62C and 63C), where it would be held until a different microhead address is requested by the host-system, or the write-data disk-operation has been completed.

Moreover, an Asynchronous Optical Microhead Address Controller's, as illustrated in FIGS. 62A, 63A, 62B, 63B, 62C, and 63C, 'Address Translator' reads the previously mentioned address information from within a 'Disk Controller Interface Register' and translates it into control code. The control code is then stored into an Address Translator's 'Address Translator Register', where it is utilized by the Disk Controller's 'Asynchronous Optical Microhead Address Controller' to activate the required Phase-Change Microhead Array Chip's microhead addressing and Chip-Selection chip-control bus-system signal-lines.

Furthermore, an Asynchronous Optical Microhead Address Controller's 'Address Translator', as illustrated in FIGS. 62A, 63A, 62C, and 63C, first tells an Asynchronous Optical Microhead Address Controller's 'Address Unit' that Phase-Change Microhead Array Chip Number "5", being basically equivalent to a conventional flying head numbered as head number "5" is the data-head to be used. The Asynchronous Optical Microhead Address Controller's response is to enable the point-to-point "Chip Select" line number "4" (−CS4) (i.e., the chip select lines available within the present design are CS0, CS1, CS2, CS3, CS4, CS5, CS6, CS7) with a logic-low control-signal, as illustrated in FIGS. 60A, 61A, 60B, 61B, 60C, and 61C. This enabling of the "Chip Select" line number "4" (−CS4) simply begins a process that executes the selection of a single Phase-Change Microhead Array Chip, which is chosen because of its stationary location above the host-requested data-sectors present on disk-platter number "3", disk-surface number "5".

Figure 64E:
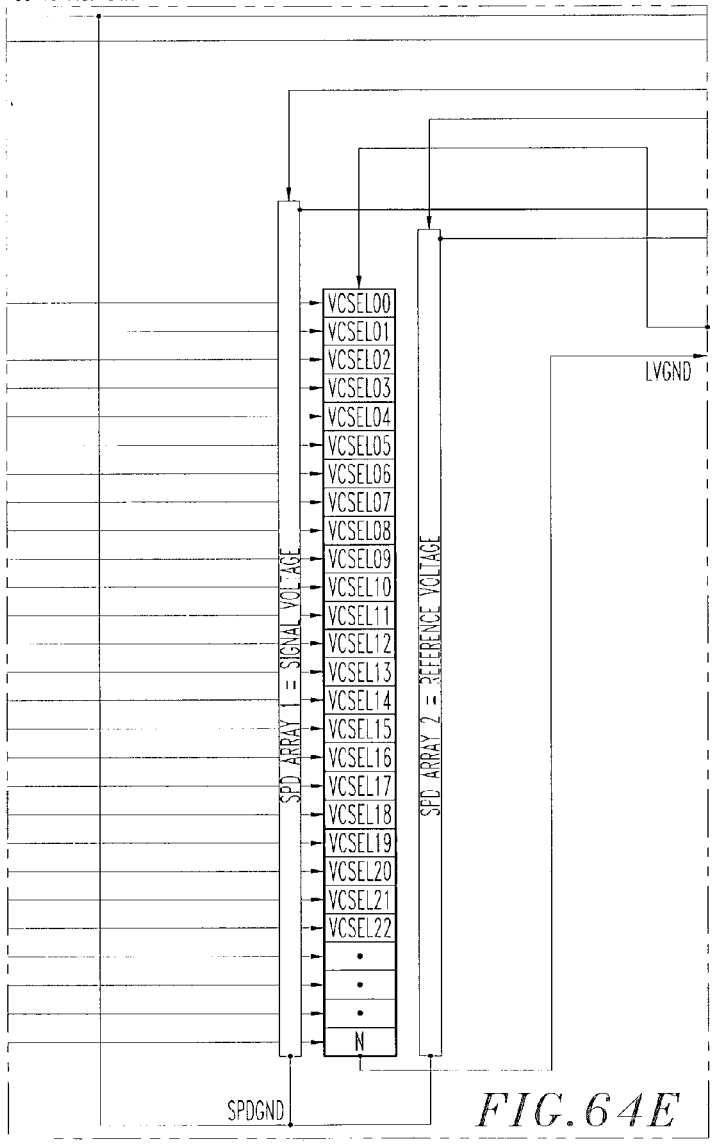

In addition, the "Chip Select" (−CS) logic-low control-signal makes the requested Phase-Change Microhead Array Chip number "5" the only Phase-Change Microhead Array Chip connected to a Phase-Change Microhead Array Chip Hard Disk Drive's 32-bit microhead addressing bus-system able to latch into its 'Address Latch Circuit', as illustrated in FIGS. 64A, 64B, and 64E, a particular microhead's 32-bit address number, which is sent down a Phase-Change Microhead Array Chip Hard Disk Drive's thirty-two address-lines to all of the installed Phase-Change Microhead Array Chips that are connected to a Phase-Change Microhead Array Chip Hard Disk Drive's 32-bit microhead addressing bus-system, as illustrated in FIGS. 62A, 63A, 62B, 63B, 62C, and 63C.

However, at the same time as the previously mentioned 32-bit microhead addressing bus-system sends a (i.e., same as the cylinder/track number) and microhead address number "4562" down its thirty-two address bus-lines a chip-select control-bus control-signal called an "Address Strobe" (−AS) control-signal is simultaneously sent down its own signal line to every installed Phase-Change Microhead Array Chip's input-contact assigned as pin-number "37", as illustrated in FIGS. 11 and 12. Moreover, through a simultaneous and combined execution of these two logic-low control-signals for "Chip Select 4" (−CS4) line-number "5" at input-contact assigned as pin-number "38", and for "Address Strobe" (−AS) at input-contact assigned as pin-number "37", as illustrated in FIGS. 65, 66, 67, and 68, can a particular Phase-Change Microhead Array Chip number "5" be selected for the host-requested write-data disk-operation.

Conclusion, a Phase-Change Microhead Array Chip, which is assigned as chip number "5" in a daisy-chain flex-cable line-up is singularly selected to tri-state latch (FIGS. 70A and 70B) the cylinder/track address number "4562" into its 'Address Latch And Chip Select Circuit', as illustrated in FIGS. 69, 70A, and 70B. Further, the before mentioned 32-bit microhead address number "4562" will stay latched in a Phase-Change Microhead Array Chip's tri-stated 'Address Latch And Chip Select Circuit' as long as the −CS4 and −AS control-signal bus-system signal lines continue to have logic-low control-signals present on their lines.

In addition, the address line inputs of Phase-Change Microhead Array Chips consists of thirty-two input contact-pins, where a Phase-Change Microhead Array Chip's microhead addressing bus-system signal inputs are assigned numbers "A0" through "A31", as illustrated in FIGS. 11, 12, 13, and 14. Further, during a write-data disk-operation the microhead address number "4562" is latched into an 'Address Latch And Chip Select Circuit', where it is temporally stored. In the mean time an "Address Acknowledge" (−ADACK) circuit will send a logic-low control-signal down an "Address Acknowledge" (−ADACK) circuit's chip-control control-bus signal-line. The −ADACK control-signal is generated when the −CS4 and the −AS circuits (FIGS. 65, 66, 67, and 68) are simultaneously enabled.

Moreover, the −CS4 and the −AS circuits, as illustrated in FIGS. 65, 66, 67, and 68, are located within a host-selected Phase-Change Microhead Array Chip's 'Address Latch And Chip Select Circuit', as illustrated by drawing FIGS. 69, 70A, and 70B. Further, as illustrated in FIGS. 11, 12, 13, and 14, the −ADACK control-bus signal is sent from a host-selected Phase-Change Microhead Array Chip's output-contact assigned as pin-number "39" to an "Address Acknowledge" (−ADACK) input-contact located in a Disk Controller's 'Asynchronous Optical Microhead Address Controller', as illustrated in FIGS. 60A, 61A, 60C, 61C, which is a microchip located on a Phase-Change Microhead Array Chip Hard Disk Drive's PCB 63 (FIG. 4), 80 (FIG. 5).

In addition, as illustrated in FIGS. 69, 70A, and 70B, a logic-low control-bus signal received at an −ADACK input-contact of the aforesaid 'Asynchronous Optical Microhead Address Controller' tells the aforesaid 'Asynchronous Optical Microhead Address Controller' that microhead address number "4562" has been successfully latched into the 'Address Latch And Chip Select Circuit', which is located in the host-selected Phase-Change Microhead Array Chip number "5". Further, as illustrated in FIGS. 64A, 64B, 71, and 72, as a next step the successfully latched address-signal is passed from the 32-bit 'Address Latch And Chip Select Circuit' down to a host-selected Phase-Change Microhead Array Chip's 32-bit 'Address Decoder Circuit'. Subsequently, when the host-selected Phase-Change Microhead Array Chip's 'Address Decoder Circuit' receives the aforesaid 32-bit microhead address signal it will reroute it to its internal 'address tree decoder' for decoding, as illustrated in FIGS.

64A, 64B, 72, and 73. Additionally, the decoding process of the previously latched 32-bit microhead address signal, by the 'address tree decoder' circuit (FIGS. 71 and 72), will result in the enabling of one particular microhead selection-line with a logic-high control-signal. Moreover, the previously mentioned microhead selection-line also, has for the physical circuit-line it represents, an address number of "4562", which is the same as the host requested microhead's number.

In addition, what is normally called 'inverter body effect', which is associated with and caused by circuits that contain a large number of semiconductor inverters, like the number of inverters present in an 'address tree decoder' circuit, will ultimately be the cause of poor signal strength. Consequently, an address tree decoder's singularly enabled microhead selection-line will need its logic-high control-signal regenerated by a host-selected Phase-Change Microhead Array Chip's 'Address Buffer Circuit' (FIGS. 73 and 74), or the aforesaid microhead selection-line's signal will suffer signal-loss, causing a microhead selection error to occur.

Furthermore, as illustrated in FIGS. 64A, 64B, 73, and 74, when a host-selected Phase-Change Microhead Array Chip's 'Address Decoder Circuit' sends a microhead selection-line's signal to a host-selected Phase-Change Microhead Array Chip's 'Address Buffer Circuit' two very important and simultaneous processes will occur:
  i.) A signal regeneration of an address tree decoder's only enabled microhead selection-line by a Phase-Change Microhead Array Chip's 'Address Buffer Circuit', will occur;
  ii.) The unsolicited microhead selection-lines of the address tree decoder are pulled-down to a ground state through the microhead selection-lines' internal Long-L inverters, as illustrated in FIGS. 64A, 64B, and 74, where pulling-down of the unsolicited microhead selection-lines, into a grounded state, will also put the unsolicited microhead selection-lines into a "High Impedance Line State" (Hi−Z).

Furthermore, every microhead selection-line within a Phase-Change Microhead Array Chip has its circuit beginning in an 'Address Decoder Circuit' and its circuit ending to occur at its respective microhead. Wherein, each selection-line is terminated with a selection-line transmission-gate control-circuit, which is attached to a selection-line's circuit ending, as illustrated in FIGS. 64A, 64B, 64E, 107, and 111. Moreover, a selection-line's transmission-gate (FIGS. 107 and 111) will independently control its respective microhead's access to power-bus lines, as illustrated in FIGS. 107 and 111.

However, "Read Laser Voltage" (RLV), "Write Laser Voltage One" (WLV1), and "Write Laser Voltage Two" (WLV2) power-bus power signals are inputted at a single (FIGS. 107 and 111) "Laser Voltage In" (LVIN) input (FIGS. 64A and 75), or to be more specific, the switching between the "Read Laser Voltage" (RLV), the "Write Laser Voltage One" (WLV1), and the "Write Laser Voltage Two" (WLV2) power-bus power signals occurs within a Phase-Change Microhead Array Chip's "Vertical Cavity Surface Emitting Laser Power Control Circuit" (VCSEL Microhead PCC), as illustrated in FIGS. 64A, 64D, 109, and 110, by a 'R/W Control Circuit', as illustrated in FIGS. 87, 88, 89, and 90.

In addition, the actual on and off switching of electrical power to the "Read Laser Voltage" (RLV), the "Write Laser Voltage One" (WLV1), and the "Write Laser Voltage Two" (WLV2) power-bus power lines is executed by a Data Sequencer's 'Data Bus Controller', as illustrated in FIGS. 62A, 63A, 62B, 63B, 62C, and 63C. Further, during a write-data disk-operation an 'R/W Control Circuit', as illustrated in FIGS. 87, 88, 89, and 90, must first enable a host-selected Phase-Change Microhead Array Chip's write-channel with a "Write Enable" (WE) logic-low control-signal. Further, in order for Phase-Change Microhead Array Chip Hard Disk Drives to commence disk-operations as quickly as possible the previously mentioned R/W Control Circuit's default setting, after a 'Power-On-Restart' or 'Power-On-Initialization' is to have a host-selected Phase-Change Microhead Array Chip's read-channel enabled. The purpose of enabling the host-selected; i.e., host-selected, meaning the Phase-Change Microhead Array Chip that is positioned over the disk-platter data-surface that contains the hard disk drive's "Operational Code" (OP Code) and hard disk drive's operating system software instructions. The previously mentioned Phase-Change Microhead Array Chip will have an activated read-channel after a 'Power-On-Restart' or 'Power-On-Initialization', so the "Operational Code" (OP Code), which is usually stored on cylinder/track "0", is read from a disk-platter's track "0" immediately into a buffer's "Synchronous Dynamic Random Access Memory" (SDRAM) memory area, which is put aside for the execution of a Phase-Change Microhead Array Chip Hard Disk Drive's "Operational Code" (OP Code) and hard disk drive's system operating instructions. Additionally, a "Read or Write enable" (R/−W) control-bus signal is used to enable a host-selected Phase-Change Microhead Array Chip's write-channel during a write-data disk-operation, and is comprised of three chip-control logic circuits:
  i.) A "Read or Write enable" (R/−W) control-bus signal-line, which is connected at the input-contact assigned pin-number "35", where it can be accessed by the Disk Controller;
  ii.) A "VDD" (+5) control-bus signal-line, which is connected at the input-contact assigned pin-number "34", where it can be accessed by the Disk Controller;
  iii.) An Asynchronous Optical Microhead Address Controller's "Chip Select" (−CS) point-to-point signal-line, which is connected at the input-contact assigned pin-number "38", where it can be accessed by the Disk Controller.

Moreover, as illustrated in FIGS. 64A, 64C, 87, 88, 89, and 90, the three chip-control logic circuits described in the above paragraphs are duplicated in every Phase-Change Microhead Array Chip installed into a Phase-Change Microhead Array Chip Hard Disk Drive's unit-assembly.

Furthermore, to enable a write-channel within a host-selected Phase-Change Microhead Array Chip, three logic-signal conditions must simultaneously occur within the host requested Phase-Change Microhead Array Chip's 'R/W Control Circuit':
  i.) Reception of a logic-high control-signal at the host-selected Phase-Change Microhead Array Chip's input-contact labeled as pin-number "34" and designated "VDD" (+5V);
  ii.) Reception of a logic-low control-signal at the host-selected Phase-Change Microhead Array Chip's input-contact labeled as pin-number "38" and designated "Chip Select" (−CS);
  iii.) Reception of a logic-low control-signal at the host-selected Phase-Change Microhead Array Chip's input-contact labeled as pin-number "35" and designated "Read or Write enable" (R/−W).

Moreover, the three chip-control bus-signal line-conditions, previously described in the above paragraph, must first be simultaneously activated by continuous transmission of the three chip-control bus-signals across their respective chip-control bus-cable signal-lines, where they will be received by a host-selected Phase-Change Microhead Array Chip's 'R/W Control Circuit'. Wherein, the 'R/W Control Circuit' will send out three "Write Enable" (WE) bus-signals to enable the three circuits, when enabled together will create a Phase-Change Microhead Array Chip's write-channel circuit.

For example, during a write-data disk-operation the host-system will requested selection of the installed Phase-Change Microhead Array Chip number "5" to occur. This is accomplished using a physical re-direction of an Asynchronous Optical Microhead Address Controller's point-to-point "Chip Select" (−CS4) signal-line, assigned as signal-line number "4". Moreover, a cross-connect circuit redirection can easily be made to occur for the "Chip Select" (−CS4) signal-line, by making a cross-connect circuit redirection at the fifth Phase-Change Microhead Array Chip's chip-positioning circuit board. Therefore, by using the copper circuit-trace assigned as copper circuit-trace number "53" (FIG. 21), we can make a cross-connect circuit redirection to occur for "Chip Select" (−CS3) line-number "4", by creating a copper circuit-trace that begins its circuit run at the input-contact assigned as pin-number "53" of a chip-positioning circuit board's Polymer flex-cable spring-contact connector 67 (FIGS. 2, 3, and 10), and from there traces its way to the "Chip Select" (−CS) and null input-contact, where it will complete its cross-connect circuit redirection of "Chip Select" (−CS3) line-number "4", by making its circuit completing physical connection with pin-number "38" of a host-requested Phase-Change Microhead Array Chip's chip-positioning circuit board's surface-mounted chip-socket 5 (FIGS. 7, 8, and 21) using copper circuit-trace number "53" (FIG. 21).

Furthermore, every installed Phase-Change Microhead Array Chip is connected to a Phase-Change Microhead Array Chip Hard Disk Drive's three-bus system, which are labeled as:

i.) The 'Address Bus' bus-system;
ii.) The 'Data I/O Bus' bus-system;
iii.) The 'Chip Control Bus' bus-system.

Thereafter, the host-selected Phase-Change Microhead Array Chip, which is labeled as Phase-Change Microhead Array Chip number "5", becomes the only Phase-Change Microhead Array Chip connected to a Phase-Change Microhead Array Chip Hard Disk Drive's bus-system to have its write-channel, during a write-data disk-operation, activated. While all of the other installed Phase-Change Microhead Array Chips connected to a Phase-Change Microhead Array Chip Hard Disk Drive's bus-system, would have their write-channels three-stated into a "High Impedance Line State" (Hi−Z).

Furthermore, the host-selected Phase-Change Microhead Array Chip write-channel's I/O is enabled when a "Write Enable" (WE) logic-high control signal is sent to a host-selected Phase-Change Microhead Array Chip's 'R/W Control Circuit'. Additionally, as illustrated in FIGS. 96, 97, 98, and 99, a write-channel's two line-drivers will receive an R/W Control Circuit's "Write Enable" (WE) logic-high control-signal, thereby activating the previously mentioned write-channel's I/O connectivity to a Phase-Change Microhead Array Chip Hard Disk Drive's bus-system and its Disk Controller as well. Moreover, two logic-high control-signals were also sent by the previously mentioned write-channel's two line-drivers, where they entered the (A) and (B) input-terminals of a write-channel's double NAND "Write Data Acknowledge" (−WDTACK) control-circuit.

Moreover, if the previously mentioned two input-terminals (A) and (B) of a write-channel's double NAND "Write Data Acknowledge" (−WDTACK) control-circuit, as illustrated in FIGS. 102, 103, 104, and 105, were to receive logic-high control-signals, then the write-channel's double NAND "Write Data Acknowledge" (−WDTACK) control-circuit, would in response output a "Write Data Acknowledge" (−WDTACK) logic-low control-signal out onto a −WDTACK's control-bus signal line, which is connected to all output-contacts labeled with a pin-number of "40" of every installed Phase-Change Microhead Array Chip, as illustrated in FIGS. 64A, 64C, and 64D.

In addition, a Phase-Change Microhead Array Chip's "Write Data Acknowledge" (−WDTACK) logic-low control-signal, after being sent to pin-number "40", will travel through a Phase-Change Microhead Array Chip Hard Disk Drive's bus-system Polymer flex-cable's "Write Data Acknowledge" (−WDTACK) control-bus signal line 30, 36 (FIGS. 1 and 6) until it reaches a "Write Data Acknowledge" (−WDTACK) input, which is located at a Data Sequencer's 'Data Bus Controller', as illustrated in FIGS. 62A, 63A, 62C, and 63C. Moreover, after the previously mentioned Data Sequencer's 'Data Bus Controller' has received the before mentioned "Write Data Acknowledge" (−WDTACK) logic-low control-signal the aforesaid Data Sequencer's 'Data Bus Controller', will know, that a host-selected Phase-Change Microhead Array Chip's write-channel is open and ready to write host-requested data to data-sector "43", which is located on cylinder/track "4562", using address selected VCSEL microhead "4562".

Furthermore, a "Microhead Power Control Circuit" (MPCC) also receives a "Write Enable" (WE) logic-high control-signal from the before mentioned 'R/W Control Circuit', which will cause the aforesaid VCSEL Microhead PCC's transmission-gate controller to switch its selection (FIGS. 109 and 110) of "Write Laser Voltage" (WLV) bus-line over to the "Read Laser Voltage" (RLV) bus-line. Moreover, the switch selected "Write Laser Voltage" (WLV) bus-line can now channel a Write Laser Voltage to a "Laser Voltage Output" (LVOUT) circuit terminal (FIGS. 109 and 110), which leads to a host-selected Phase-Change Microhead Array Chip microhead-array's input terminal "Laser Voltage Input" (LVIN) terminal (FIGS. 107 and 111), and although the previously mentioned "Write Laser Voltage" (WLV) power-line (FIGS. 107 and 111) has been selected for a host-requested write-data disk-operation no electrical-current will be sent to the host-selected microhead; at least, not until the host requested data-sector passes directly underneath the previously selected microhead. Moreover, when the host requested data-sector rotates directly underneath the previously selected VCSEL's microhead will a high-output of electrical current be sent down a "Write Laser Voltage" (WLV) power-line (FIGS. 107 and 111) turning on a host-selected microhead's high-powered write-data laser-emission output.

Furthermore, 'Hall-Sensors' (i.e., not shown here) will provide the radial position of any data-sector, at all times, on-the-fly through the permanent-magnetic rotary-elements located in the spindle motor's rotor, which are relative to the fixed windings and poles of the 'Spindle-Motor' 59 (FIGS. 2 and 3) stator. Typically, the previously mentioned 'Hall-Sensors' (i.e., not shown here) will provide response-control information to the before mentioned 'Spindle And Power Controller' 60 (FIG. 4), 82 (FIG. 5), which is the driver-circuit for the Spindle-Motor. Additionally, the aforesaid 'Hall-Sensors' (i.e. not shown here) will also provide a Phase-Change Microhead Array Chip Hard Disk Drive's disk-platters rate of rotation and positional information, which is necessary in an 'ID-less Tracking Format', to the before mentioned 'Spindle And Power Controller' 60 (FIG. 4), 82 (FIG. 5).

In addition, during a host-requested write-data disk-operation, the before mentioned 'Spindle And Power Controller' 60 (FIG. 4), 82 (FIG. 5), will in-turn send this information to the before mentioned Disk Controller's 'Data Sequencer', which in turn will control the on and off switching of the previously mentioned "Write Laser Voltage" (WLV) power-line's electric current, which is based upon the rate of rotation, and positional information it receives.

Furthermore, during a write-data disk-operation an address selected microhead will activate its data-writing high-power or medium-power laser-diode emission output, where it is applied to a disk-platter's data-surface comprising a Tellurium based recording material. Moreover, an address selected microhead's data-writing high-power or medium-power output laser-diode emission output will raise the temperature of a 500-nm in diameter domain-cell, which causes a Tellurium recording material comprising a domain-cell area to undergo a phase-change. Alternatively, if host-selected data-sectors, which are typically pre-configured within a disk-media's Tellurium data-recording material layer as a plurality of concentric circle data-track segments containing pluralities of molecularly oriented data-cells, were subjected to a host-selected laser-diode's high-power emission output, they would undergo a molecular dis-orientated phase-change, which is used to represent a binary "1"s. Contradictorily, if host-selected data-sectors, which are typically pre-configured within a disk-media's Tellurium data-recording material layer as a plurality of concentric circle data-track segments containing pluralities of molecularly oriented data-cells, were subjected to a host-selected laser-diode's medium-power emission output, they would undergo a molecular reoriented phase-change, which is used to represent binary "0"s.

Additional Embodiments—FIGS. 113 through 141

Additional Embodiments, as illustrated in FIGS. 113 through 141, describes two additional bus-systems, which will be utilized by the present invention when greater throughput to data and disk-sector data-areas and increased data transfer rates is required. Moreover, the two additional bus-systems are comprised as 1.) A dedicated microhead-array chip bus-system; and 2.) A dedicated multichannel microhead-array chip bus-system. As illustrated in drawing FIGS. 113, 114, and 115, we can see that there are some structural similarities between the advanced bus-system embodiments about to be described and the structure of the first bus-system design described earlier in a first bus-system embodiment.

Moreover, the two additional bus-system embodiments begin by describing the general structure of the Phase-Change Microhead Array Chip Hard Disk Drive that utilizes the dedicated microhead-array chip and multichannel microhead array chip bus-system designs. Moreover, the two additional bus-system embodiments will finish, first by describing the physical structures and configurations of the dedicated microhead-array chip and dedicated multichannel microhead-array chip bus-systems; second by describing the operation of the dedicated microhead-array chip and dedicated multichannel microhead-array chip bus-systems.

The casting-base 12 (FIGS. 113, 114, and 115) of dedicated microhead-array chip and dedicated multichannel microhead-array chip based Phase-Change Microhead Array Chip Hard Disk Drives is constructed from a single machined piece of aluminum-alloy, which provides a mounting surface for a spindle-motor drive mechanism 59 (FIGS. 2 and 3), a "Printed Circuit Board" (PCB) hard disk drive controller 53 (FIGS. 2 and 3), a hard disk drive's housing-cover and housing-cover gasket (i.e., not shown here), and plurality of Phase-Change Microhead Array Chip chip-positioning circuit board assemblies 27 (FIGS. 113, 114, and 115). The bottom inside of the casting-base 12 (FIGS. 113, 114, and 115) acts as a mounting flange for a "Direct Current" (DC) 'Spindle-Motor' drive assembly 59 (FIGS. 114 and 115). Integral with the casting-base 12 (FIGS. 113, 114, and 115) is the DC Spindle-Motor drive assembly, which comprises a fixed-shaft and brushless DC Spindle-Motor drive mechanism 59 (FIGS. 114 and 115) that drives the 'counterclockwise' rotation 48 (FIG. 113) of disk-platters 13 (FIGS. 113, 114, and 115) installed into a Phase-Change Microhead Array Chip Hard Disk Drive's unit-assembly, as illustrated in FIG. 117.

In addition, a Phase-Change Microhead Array Chip Hard Disk Drive's unit-assembly uses data-storage disk-platters 13 (FIGS. 1, 2, and 3) to store various kinds of information, where a highly-reflective disc shaped substrate is made using a composite of liquid crystal Polymer, glass, or Invar material, which altogether are molded into a disc shape then coated with a reflective low "Coefficient of Thermal Expansion" (CTE) exhibiting "Titanium-Chromate" (TiCr) alloy comprising material like "Titanium-Aluminum-Cobalt-B" (TiAlCo—B), which is used by the before mentioned disk-platters as a reflective layer to reflect laser-light output emissions produced by laser-diodes located within Phase-Change Microhead Array Chips.

Furthermore, a multilayered deposition, upon the outermost surfaces of a substrate disk-platter, begins with a first transparent dielectric layer, which is formed from a transparent de-oxygenated material such as "Silicon-Nitride" (SiN) or "Aluminum-Nitride" (AlN), while a recording-layer is formed from an amorphous Phase-Change alloy such as Tellurium, and finally a second protective layer, which is also formed from a transparent de-oxygenated material such as "Silicon-Nitride" (SiN) or "Aluminum-Nitride" (AlN). Moreover, the Phase-Change disc media 13, which is used for optical phase-change data storage systems, record information in an optical phase-change memory material that is switchable between at least two detectable states by the application of optical energy. Optical phase-change memory material is typically incorporated in an optical recording medium having a structure such that the optical phase-change memory material is supported by a substrate and protected by encapsulates. In the case of optical recording media, the encapsulates include, for example, anti-ablation materials and layers, thermal insulation materials and layers, anti-reflection materials and layers, reflective layers, and chemical isolation layers.

Moreover, various layers may perform more than one of these functions. For example, anti-reflection layers may also be anti-ablation layers and thermal insulating layers. The thicknesses of the layers, including the layer or layers of optical phase-change memory material are engineered to minimize the energy necessary for effecting the state change as well as to optimize the high contrast ratio, high carrier-to-noise ratio, and high stability of the optical phase-change memory materials. Formation of optical recording media includes deposition of the individual layers by e-beam evaporative material deposition, chemical vapor material deposition, and/or plasma material deposition. Further, as used herein, plasma material deposition includes sputtering, glow discharge, and "Plasma Enhanced Chemical Vapor Deposition" (PECVD).

Moreover, an optical phase-change material is capable of being switched from one detectable state to another detectable state or states by the application of optical energy. The state of the phase-change material is detectable by properties such as, for example, index of refraction, optical absorption, optical reflectivity, or any combination thereof. Tellurium based materials have been utilized as phase-change media for data storage, where the change is evidenced by a change in a physical property such as reflectivity. Tellurium based state changeable materials, in general, are single or multi-phased systems. The ordering phenomena of such materials include a nucleation and growth process (including both or either homogeneous or heterogeneous nucleation) to convert a system of disordered materials to a system of ordered and disordered materials. The vitrification phenomena includes attaining a high mobility state and rapid quenching of the phase changeable material to transform a system of disordered and ordered materials to a system of largely disordered materials. The above phase changes and separations occur over relatively small distances, with intimate interlocking of the phases and gross structural discrimination, and may be highly sensitive to local variations in stoichiometry. Tellurium provides for high-speed transformation by passing through a high mobility state. This high mobility state allows for high-speed transformation from one state of relative order to another. The high mobility state does not specifically correspond to the molten state, but more accurately corresponds to a state of high system mobility.

Generally, a laser is used to supply the optical energy to cause the phase transitions between amorphous and crystalline states in an optical phase-change memory material. The amount of energy applied to the memory material is a function of both the power of the laser as well as the period of time that the laser pulse is applied. The crystallization energy is defined herein as the amount of energy per unit volume needed to re-crystallize an amorphous region of the memory material. The crystallization energy is dependent upon many factors, including the energy necessary for nucleation during the crystallization process. If the crystallization energy is too high, the memory material requires exposure to either a higher power laser pulse or a longer laser pulse in order to convert the material from the amorphous to the crystalline states. It is desirable to be able to control the crystallization energy of a phase-change memory material via the addition of one or more modifier elements. It is also desirable to increase the erasability of optical recording media.

Typically, disk-platters are mounted upon a rotating spindle assembly 57 (FIG. 114), which is rotated "3,400" to "20,000" "Revolutions-Per-Minute" (RPM) by an in-spindle brushless DC Spindle-Motor 59 (FIGS. 114 and 115), relative to the before mentioned frame casting-base 12 (FIGS. 113, 114, and 115). Typically, a Spindle-Motor is secured to an aluminum-alloy casting-base 12 (FIGS. 113, 114, and 115) with four motor mounting hex-screws 56 (FIGS. 114 and 115). In addition, the Spindle-Motor 59 (FIGS. 114 and 115) has a rotor 57 (FIG. 114), which is flanged at the base, and a disk-platter axle, which is located at the center of the previously mentioned rotor 57 (FIG. 114). Additionally, a rotatable flanged-rotor-housing is used to firmly secure and position all installed disk-platters. Wherein, each disk-platter has a respective disk-spacer 116 (FIG. 114) placed between each proceeded disk-platter installed within the drive. With a final disk-platter 13 (FIGS. 113, 114, and 115) shown as being secured into place by a rotor-housing cap 20 (FIGS. 113) and four rotor-housing cap mounting hex-screws 17 (FIGS. 113, 114, and 115).

Preferably, the Spindle-Motor should have bearings formed as part of the Spindle-Motor's drive-assembly 59 (FIGS. 114 and 115), which is typically used to rotate a spindle-assembly 57 (FIG. 114) in a counter-clockwise direction relative to the frame casting-base 12 (FIGS. 113, 114, and 115). The Spindle-Motor 59 (FIGS. 114 and 115) itself is mounted to the bottom-inside surface of the casting-base 12 (FIGS. 113, 114, and 115) using four motor mounting hex-screws 56 (FIGS. 114 and 115).

Furthermore, located at the center of the rotor-housing's top-bearing 18 (FIGS. 113, 114, and 115) is a Spindle-Motor's non-moving bearing-rod-core 19 (FIGS. 113, 114, and 115). Moreover, a non-moving bearing-rod-core 19 (FIGS. 113, 114, and 115) has its top-end threaded for use in securing a Phase-Change Microhead Array Chip Hard Disk Drive's housing-cover. Wherein, the securing of the previously mentioned housing-cover is accomplished using a single cover mounting hex-screw, which is screwed into the threaded top-end of the bearing-rod core, through a single cover mounting hex-screw hole 19 (FIGS. 113, 114, and 115), which is located along with several other cover mounting hex screw holes within the housing-cover and used along with their respective cover mounting hex screws to tightly secure a Phase-Change Microhead Array Chip Hard Disk Drive's housing-cover to the drive's casting-base 12 (FIGS. 113, 114, and 115). Preferably, there are "6" other threaded hex-screw holes 16 (FIGS. 113, 114, and 115) in a Phase-Change Microhead Array Chip Hard Disk Drive's casting-base 12 (FIGS. 113, 114, and 115), all of which are also used in the additional securing and sealing of a (i.e., not shown here) Phase-Change Microhead Array Chip Hard Disk Drive's housing-cover onto the drive's casting-base housing.

Furthermore, the Spindle-Motor's driver-circuit, which is called the "Spindle And Power Controller" 60 (FIG. 4), 82 (FIG. 5), 60 (FIG. 60A), 60 (FIG. 59), 82 (FIG. 61A), 82 (FIG. 61C), 60 (FIG. 62A), 60 (FIG. 62C), 82 (FIG. 63A), 82 (FIG. 63C) is provided to communtate e.g. with the three-phase windings of a Phase-Change Microhead Array Chip Hard Disk Drive's brushless Spindle-Motor 59 (FIGS. 114 and 115). Hall-Sensors (i.e., not shown here) are also provided to determine the position of the permanent-magnetic rotary-elements located within a rotor relative to the fixed windings and poles of the Spindle-Motor itself 59 (FIGS. 114 and 115). Typically, Hall-Sensors (i.e., not shown here) provide response-control feedback information to a "Spindle And Power Controller" 60 (FIG. 4), 82 (FIG. 5), 60 (FIG. 60A), 60 (FIG. 59), 82 (FIG. 61A), 82 (FIG. 61C), 60 (FIG. 62A), 60 (FIG. 62C), 82 (FIG. 63A), 82 (FIG. 63C). In addition, the previously mentioned Spindle And Power Controller's driver-circuit is also used to control the Hall-Sensors in a conventional fashion as well.

In addition, final assembly of a Phase-Change Microhead Array Chip Hard Disk Drive will be done in a contamination free "Clean Room" manufacturing facility. To provide the Phase-Change Microhead Array Chip Hard Disk Drives with contamination free environments a housing-cover sealing-gasket is provided to create an air-tight seal between a Phase-Change Microhead Array Chip Hard Disk Drive's casting-base 12 (FIGS. 113, 114, and 115) and its (i.e., not shown here) housing-cover. Sealing-gaskets will be installed during final assembly of the Phase-Change Microhead Array Chip Hard Disk Drive unit assemblies, by using "6" threaded hex-screws (i.e., not shown here) to secure into place a Phase-Change Microhead Array Chip Hard Disk Drive's housing-cover, causing the housing-cover gasket, which is installed between the housing-cover and the casting-base along a gasket compressing grove, to compress in the vertical direction, while causing it to expand in the horizontal direction, creating an air-tight seal between the housing-cover and the casting-base that will maintain for the drive's interior an environment free from contamination.

Furthermore, to provide an environment that continues to be clean and free from air-borne contaminants; an internal air-filtering device is used 15 (FIG. 113) to filter the drive's internal air supply. The drawing FIG. 113 comprises an orthographic plan-view drawing that clearly illustrates the location of an internal air-filtering device 15 (FIG. 113), while using an air-flow direction indication arrow to illustrate air flow 49 (FIG. 113) direction through the filter. Also, drawing FIG. 113 visually clarifies that the air-flow direction through the air-filter 15 (FIG. 113) follows the same 48 (FIG. 113) direction of counterclockwise rotation used by a Phase-Change Microhead Array Chip Hard Disk Drive's installed disk-platters 13 (FIGS. 113, 114, and 115).

Moreover, the Phase-Change Microhead Array Chips used within a Phase-Change Microhead Array Chip Hard Disk Drive's unit-assembly are installed into fixed positions that lie very close to a Phase-Change Microhead Array Chip Hard Disk Drive's rotating disk-platter data-surfaces (i.e., within a very close 150-µm). Therefore, it is essential that the air circulating through Phase-Change Microhead Array Chip Hard Disk Drive s be kept free of dust, pollen, and other air-borne particles and contaminates, least they become trapped between a microhead-array of a Phase-Change Microhead Array Chip and a disk-platter's data-surface, causing surface damage and data-loss to a disk-platter's data-surface. Further, when the Phase-Change Microhead Array Chip Hard Disk Drives are in use rotation of its installed disk-platters force air through the previously described air-filter 15 (FIG. 113). By using an airfoil shape 14 (FIG. 113) within the air-filter's passageway design, internal air-pressure within the passageway will be slightly lowered 15 (FIG. 113) from the rest of the drive's interior area, forcing a constant stream of air to flow through the 0.3-µm air-filter 15 (FIG. 113). The air-filter is installed into a slot lying between the upper right-hand corner of a Phase-Change Microhead Array Chip Hard Disk Drive's casting-base 12 (FIG. 113), and the air-filter's airfoil shaped passageway 14 (FIG. 113). Further, during normal hard disk drive operation, while the disk-platters within a Phase-Change Microhead Array Chip Hard Disk Drive are rotating, the air-circulation induced by an airfoil shaped low-pressure passageway 14 (FIG. 113) will also help a Phase-Change Microhead Array Chip Hard Disk Drive to keep cool by expelling internal heat from the drive.

Additional embodiments of the present invention, as illustrated in FIGS. 113 through 141, also show how to execute placement of Phase-Change Microhead Array Chips. Wherein, the Phase-Change Microhead Array Chips are positioned by a chip-positioning circuit board 27 (FIGS. 113, 114, and 115). To insure rigid and stable placement of the Phase-Change Microhead Array Chips, the chip-positioning circuit boards need core structures constructed from a rigid material like "Titanium" or from a rigid material like "Graphite Carbon Composite". Further, a chip-positioning circuit board's core structure 27 (FIGS. 113, 114, and 115) has two main large-area plan parallel surfaces. Wherein, each side of every chip-positioning circuit board would have eighteen embossed bolt-flanges, a total of thirty-six bolt-flanges 51 (FIGS. 113, 114, and 115) for each chip-positioning circuit board's core structure. Moreover, each chip-positioning circuit board's thirty-six embossed bolt-flanges are created as raised surfaces; protruding "1/16" of one-inch in an outward direction perpendicular to a chip-positioning circuit board's main large-area surface, which will later contain sixty-four copper-circuit trace-runs. Each embossed bolt-flange will have its top-surface area machined down and shaped into a bolt-flange with a high degree of flatness, which must be within an allowed tolerance of plus or minus "1/8" of one-micron.

Moreover, after each chip-positioning circuit board has its thirty-six embossed bolt-flanges machined down to a specified tolerance, a first-layer application of fiberglass insulation is applied to the outer surfaces of the chip-positioning circuit boards. The before mentioned first fiberglass insulation layer will provide fundamental electrical insulation for a chip-positioning circuit board's installed copper circuit trace-runs 21, 22, 23, 24 (FIG. 113). Only after the fiberglass insulation has been applied to surfaces reserved for the future installation of a chip-positioning circuit board's copper circuit trace-runs, can installation of a chip-positioning circuit board's sixty-four copper circuit trace-runs proceed. Installation of the fiberglass insulation will both protect and isolate any installed copper circuit trace-runs, not only from each other, but also from the metallic material used to construct a chip-positioning circuit board's core-structure.

In addition, the previously mentioned thirty-six embossed bolt-flanges 51 (FIGS. 113), which are passively used to install completed chip-positioning circuit boards into a Phase-Change Microhead Array Chip Hard Disk Drive's unit-assembly (FIG. 117). Moreover, completed chip-positioning circuit boards will need to be free of dirt, fiberglass, or any other particulate matter to be installed properly. To explain this further, during a Phase-Change Microhead Array Chip Hard Disk Drive's final assembly (FIG. 117) if any particulate matter were to be left on any chip-positioning circuit board's embossed bolt-flange mounting surfaces 51 (FIGS. 113), the installation and placement of chip-positioning circuit boards, as illustrated by FIGS. 113, 114, and 115, could, after the installation be misaligned while in their respective Phase-Change Microhead Array Chip Hard Disk Drive's unit-assembly (FIG. 117), adversely affecting the Phase-Change Microhead Array Chip Hard Disk Drive's overall performance. Therefore, after applying fiberglass insulation to a chip-positioning circuit board's outermost surfaces the thirty-six embossed bolt-flanges 51 (FIG. 113) of the chip-positioning circuit boards must be thoroughly cleaned and made fiberglass and dirt free.

In addition, surface-mounted chip-sockets 5 (FIGS. 113, 114, and 115), which are used by chip-positioning circuit boards to install, position, and connect Phase-Change Microhead Array Chips into a Phase-Change Microhead Array Chip Hard Disk Drive's unit-assembly (FIG. 112), while providing electrical connectivity between the Phase-Change Microhead Array Chips and the copper circuit trace-runs 21, 22, 23, 24 located across the outer surface of a chip-positioning circuit board, as illustrated in FIGS. 113, 116, and 117.

In addition, and only after the installation of a chip-positioning circuit board's surface-mounted chip-socket 5 (FIGS. 113, 114, and 115) has been accomplished, can a final topcoat layer of insulating fiberglass be applied to a chip-positioning circuit board's outer-most surface areas 21, 22, 23, 24 (FIGS. 30, 32, 35, and 37) and, therein to its surface-mounted chip-socket's base-area perimeter 5 (FIGS. 113, 114, and 115), which will help to seal and secure a chip-positioning circuit board's surface-mounted chip-socket(s) 5 into their final position(s). While applying fiberglass to a chip-positioning circuit board and to a chip-positioning circuit board's surface-mounted chip-socket(s) 5 (FIGS. 113, 114, and 115) care must be taken to keep the before mentioned fiberglass insulation off any chip-positioning circuit board's embossed machined bolt-flange mounting surfaces 51 (FIGS. 113, 114, and 115), and out of the contact-circuit areas 93 (FIGS. 30, 32, 35, and 37) of a chip-positioning circuit board's surface-mounted chip-socket(s) 5 (FIGS. 113, 114, and 115).

Moreover, contact-circuit areas 93 (FIGS. 30, 32, 35, and 37), which are used to connect installed Phase-Change Microhead Array Chips, illustrated by FIGS. 29, 31, 34, and 36, to a Phase-Change Microhead Array Chip Hard Disk Drive's internal bus system are located at the inner-bottom surface-areas 93 (FIGS. 30, 32, 35, and 37) of every surface-mounted chip-socket(s) 5 (FIGS. 113, 114, and 115) of every chip-positioning circuit board installed into a Phase-Change Microhead Array Chip Hard Disk Drive's unit-assembly, as illustrated in FIG. 117.

Moreover, the surface-mounted chip-sockets 5 (FIGS. 113, 114, and 115), like the chip-sockets illustrated in chip-positioning circuit board drawing FIGS. 29, 30, 31, 32, 33, 34, 35, 36, 37, and 38, have been designed to firmly secure and position Phase-Change Microhead Array Chips into pre-designated and stationary positions above a drive's disk-platter data-surfaces. Further, the secured installation of the Phase-Change Microhead Array Chips (FIGS. 29, 31, 34, and 36) into their surface-mounted chip-sockets 5 (FIGS. 113, 114, and 115) is accomplished using a triangular-shaped 'Chip Placement Key' 11 (FIGS. 7, 8, 26, and 27) and two surface mounting chip-socket threaded hex-screws (i.e., two threaded hex-screws per Phase-Change Microhead Array Chip) 2 (FIGS. 1 and 6).

In addition, a triangular-shaped placement key 11 (FIGS. 7, 8, 26, and 27) of a Phase-Change Microhead Array Chip is molded and shaped out of an extruded bottom-surface material, which is part of every Phase-Change Microhead Array Chip's outer-casing package 4 (FIGS. 26 and 27). To meet with tolerances, triangular-shaped placement keys 11 (FIGS. 7, 8, 26, and 27) of Phase-Change Microhead Array Chips are located at the bottom of every Phase-Change Microhead Array Chip and machined down into a final triangular-shaped extruding plate 11 (FIGS. 7, 8, 26, and 27). After its final machining a Phase-Change Microhead Array Chip's placement key 11 will protrude about about "{fraction (1/16)}" of one-inch down from underneath the bottom-center surface of a Phase-Change Microhead Array Chip's outer-casing package 4 (FIGS. 1, 26, and 27). The triangle-shaped chip placement keys 11 will both position and secure the Phase-Change Microhead Array Chips (FIGS. 29, 31, 34, and 36) into the surface-mounted chip-sockets 5 (FIGS. 1, 2, and 6) of chip-positioning circuit boards, as illustrated in FIGS. 29, 30, 31, 32, 33, 34, 35, 36, 37, and 38, by fitting the previously mentioned triangle-shaped keys 11 into triangle-shaped and correspondingly sized chip placement keyholes 92 (FIGS. 30, 32, 35, and 37), which are located at the top-center surface of the bottom-center plane 92 of every surface-mounted chip-socket installed 5 (FIGS. 1, 2, and 6). Further, the previously mentioned chip placement keyholes 92 (FIGS. 30, 32, 35, and 37) will have the apex of their triangular shaped keyhole pointed toward the front of its respective chip-positioning circuit board's front-end 92 (FIGS. 30, 32, 35, and 37).

Furthermore, the Phase-Change Microhead Array Chips are secured into surface-mounted chip-sockets using two threaded hex-screws 2 (FIGS. 113, 114, and 115), which are pushed through a Phase-Change Microhead Array Chip's two un-threaded hex-screw holes 3 (FIGS. 1, 6, 7, 8, 25, 26, 27, and 28) into a surface-mounted chip-socket's two threaded hex-screw holes 93 (FIGS. 30, 32, 35, and 37). Wherein, the previously mentioned hex-screws are screwed into the previously mentioned surface-mounted chip-socket's two threaded hex-screw holes 93, by turning them, using a torque wrench, in a clockwise-direction, until the two surface-mounted chip-socket's hex-screws 2 have reached a predetermined tightness, which will be indicated by the torque wrench. In this way, the surface-mounted chip-sockets will keep the Phase-Change Microhead Array Chips, illustrated by FIGS. 29, 31, 34, 36, tightly seated and secured into their respective chip-positioning circuit boards, as illustrated in FIGS. 29, 30, 31, 32, 33, 34, 35, 36, 37, and 38.

In addition, as illustrated in drawing FIGS. 113, 114, and 115, the additional embodiments of the Phase-Change Microhead Array Chip Hard Disk Drive design describes in detail the structures behind the previously mentioned Polymer flex-cables and their respective Polymer flex-cable connectors 67. Polymer flex-cable connectors 67 are installed onto chip-positioning circuit boards 27 (FIGS. 113, 114, and 115) to provide via Polymer flex-cables 126, 127 (FIGS. 113, 114, and 115) bus-system connectivity between chip-positioning circuit boards the Phase-Change Microhead Array Chips (FIGS. 29, 31, 34, and 36) they contain, and the Drive's Disk Controller, which is illustrated by FIGS. 4 and 5.

Moreover, Polymer flex-cable connectors 67 and Polymer flex-cables 126, 127 (FIGS. 113, 114, and 115), will be giving to each Phase-Change Microhead Array Chip (FIGS. 25, 26, 27, and 28) separate and dedicated access to a Phase-Change Microhead Array Chip Hard Disk Drive's Disk Controller. Further, the previously mentioned Polymer flex-cable connectors 67 and Polymer flex-cables 126, 127 (FIGS. 113, 114, and 115) will in return, be giving to a Phase-Change Microhead Array Chip Hard Disk Drive's Disk Controller separate and dedicated access to each Phase-Change Microhead Array Chip, as illustrated in FIGS. 25, 26, 27, and 28. When the previously mentioned Polymer flex-cable connectors 67 are installed onto a chip-positioning circuit board they will provide multiple circuit connections between an installed Phase-Change Microhead Array Chip and the connectors 67 respective Polymer flex-cables 43, 36, 38, 30, by making physical electron conducting contact with the exposed copper ends of a chip-positioning circuit boards sixty-four copper-circuit trace-runs 21, 22, 23, 24 (FIGS. 113, 114, and 115).

To explain further, by using open-circuit contact-points 46, 26 (FIGS. 113, 114, and 115), which are located on the forward-facing side of the bottom inside-edge of a Polymer flex-cable connector's outer-shell casing 25, 47 (FIGS. 113, 114, and 115), the before mentioned open-circuit contact-points 46, 26 (FIGS. 113, 114, and 115) shall form a multiple circuit connection with a chip-positioning circuit board's 27 (FIGS. 113, 114, and 115) sixty-four copper-circuit trace-runs 21, 22, 23, 24 when the Polymer flex-cable connectors 67 (FIGS. 29, 30, 31, 32, 33, 34, 35, 36, and 37) are bolted, using two Polymer flex-cable connector hex-screws 37 (FIGS. 113, 114, and 115), onto the exposed copper ends of copper-circuit trace-runs 47, 25 (FIG. 113) of the chip-positioning circuit boards 27 (FIGS. 113, 114, and 115).

Furthermore, when the exposed copper ends of the copper-circuit trace-runs 46, 26 (FIGS. 113, 114, and 116) of Polymer flex-cables 43, 30 (FIGS. 113, 114, and 115) are inserted into Polymer flex-cable female connectors 28, 45 (FIGS. 113, 114, and 115) the cables are held into place by internal spring-contacts 28, 45 located within the Polymer flex-cable connectors. Giving the previously mentioned Polymer flex-cable connectors 67 (FIGS. 113, 114, and 115) and their respective Phase-Change Microhead Array Chip containing chip-positioning circuit boards 27 (FIGS. 113, 114, and 115), using a single Polymer flex-cable, a connectivity to a Disk Controller and its various bus-systems that is dedicated and separate from all other Phase-Change Microhead Array Chips installed into Phase-Change Microhead Array Chip Hard Disk Drive's unit-assembly (FIG. 112).

Moreover, a Phase-Change Microhead Array Chip Hard Disk Drive's first chip-positioning circuit board, illustrated in FIGS. 33, 34, and 35, is positioned at and attached to a Phase-Change Microhead Array Chip Hard Disk Drive's casting-base 12 (FIGS. 113, 114, and 115) and chip-positioning circuit board mounting pedestals 61, 64 (FIGS. 114 and 115) therein. Furthermore, when a Phase-Change Microhead Array Chip Hard Disk Drive's unit-assembly (FIG. 112) is viewed with its front-end turned-up vertical into the Y-direction of Cartesian coordinates (i.e., what is sometimes called the portrait-position), the before mentioned Polymer flex-cable connectors 67 (FIGS. 113, 114, and 115) and the Polymer flex-cables 126, 127 (FIGS. 113, 114, and 115), if located on the right-hand side of chip-positioning circuit boards installed into a Phase-Change Microhead Array Chip Hard Disk Drive's unit-assembly (FIG. 112) will provide for each installed Phase-Change Microhead Array Chip a multiple connection circuit that provides a separate and dedicated access to a Phase-Change Microhead Array Chip Hard Disk Drive's Disk Controller and the Disk Controller's Power, Ground, Data I/O, and Control bus-systems.

Furthermore, the before mentioned Polymer flex-cable connectors 67 (FIGS. 113, 114, and 115) and the before mentioned Polymer flex-cables 126, 127 (FIGS. 113, 114, and 115), if installed on the right-hand side of the before mentioned chip-positioning circuit boards will form a multiple circuit connection between installed Phase-Change Microhead Array Chips (FIGS. 29, 31, 34, 36, and 38), through a Phase-Change Microhead Array Chip's chip-connecting contact-points 7, 8 (FIGS. 7, 8, 26, and 27), and a Disk Controller's (PCB) "Printed Circuit Board" unit-assembly 53 (FIGS. 113, 114 and 115). Moreover, remembering that a Disk Controller's PCB 53 is positioned just under a Phase-Change Microhead Array Chip Hard Disk Drive's Spindle-Motor unit-assembly 59 (FIGS. 114 and 115), facing the bottom-inside surface of a Phase-Change Microhead Array Chip Hard Disk Drive's casting-base 12 (FIGS. 113, 114, and 115).

In addition, when a Phase-Change Microhead Array Chip Hard Disk Drive's unit-assembly (FIG. 112) is viewed with its front-end turned-up vertical into the Y-direction of Cartesian coordinates (i.e., what is sometimes called the portrait-position), the before mentioned Polymer flex-cable connectors 67 (FIGS. 29, 30, 31, 32, 33, 34, 35, 36, and 37) and the before mentioned Polymer flex-cables 126, 127 (FIGS. 113, 114, and 115), if located on the left-hand side of chip-positioning circuit boards installed into a Phase-Change Microhead Array Chip Hard Disk Drive's unit-assembly (FIG. 112) will provide for each installed Phase-Change Microhead Array Chip a multiple connection circuit that provides a separate and dedicated access to a Phase-Change Microhead Array Chip Hard Disk Drive's 32-bit Microhead Addressing bus-system.

In addition, the Polymer flex-cable connectors 67 (FIGS. 29, 30, 31, 32, 33, 34, 35, 36, and 37) and the Polymer flex-cables 126, 127 (FIGS. 113, 114, and 115), if installed on the left-hand side of the chip-positioning circuit boards, will form a multiple circuit connection between installed Phase-Change Microhead Array Chips (FIGS. 29, 31, 34, 36, and 38), through their chip-connecting contact-points 9, 10 (FIGS. 7, 8, 26, and 27) and a Disk Controller's "Printed Circuit Board" (PCB) unit-assembly 53 (FIGS. 113, 114, and 115). Moreover, remembering that a Disk Controller's PCB 53 (FIGS. 113, 114, and 115) is positioned just under a Phase-Change Microhead Array Chip Hard Disk Drive's Spindle-Motor unit-assembly 59 (FIGS. 114 and 115), facing the bottom-inside surface of a Phase-Change Microhead Array Chip Hard Disk Drive's casting-base 12 (FIGS. 113, 114, and 115).

Furthermore, in addition to the previously mentioned Polymer flex-cable connectors 67 (FIGS. 29, 30, 31, 32, 33, 34, 35, 36, and 37), there is Polymer flex-cable connectors called female bridge-connectors 124, 129 (FIGS. 113, 114, and 115), which are used to connect a Phase-Change Microhead Array Chip Hard Disk Drive's chip-positioning circuit board assemblies, illustrated by FIGS. 29, 30, 31, 32, 33, 34, 35, 36, 37, and 38, up to the previously mentioned Disk Controller's PCB unit-assembly 53 (FIGS. 113, 114, and 115). Wherein, a top-plug portion or first top-half of the female bridge-connector 124, 129 (FIGS. 113, 114, and 115) comprises a thirty-two spring-contact Polymer flex-cable 32-bit female-connector 121, 128 (FIGS. 113, 114, and 115), a sealing-gasket 120 (FIGS. 113, 114, and 115), and a two installation hex-screws 122 (FIGS. 113, 114, and 115).

Moreover, the aforesaid top-plug portions of the two female bridge-connectors 124, 129 (FIGS. 113, 114, and 115) are to be installed into two slot-holes, which were previously created in the bottom-half of a casting-base's component mounting base-plate 12 (FIGS. 113, 114, and 115), which is opposite to the previously mentioned Phase-Change Microhead Array Chip Hard Disk Drive's front-end (FIGS. 113, 114, and 115). Moreover, the previously mentioned top-plug portions of female bridge-connectors 124, 129 (FIGS. 113, 114, and 115) are connected using two hex-screws 122 (FIGS. 113, 114, and 115) to the inside top-surface of the bottom-half of the casting-base's component mounting base-plate 12 (FIGS. 113, 114, and 115).

Furthermore, in addition to the top-plug portion or first-half of the previously mentioned female bridge-connector 124, 129 (FIGS. 113, 114, and 115) is a bottom-plug portion or second-half of the female bridge-connector 124, 129 (FIGS. 113, 114, and 115), which comprises a 32-pin micro-plug female-connector 125, 130 (FIGS. 113, 114, and 115), which has an install location identical to the install location of its companion top-plug portion 124, 129 (FIGS. 113, 114, and 115). Moreover, the two female bridge-connectors 124, 129 (FIGS. 113, 114, and 115) are used to connect a Phase-Change Microhead Array Chip Hard Disk Drive's chip-positioning circuit boards, as illustrated in FIGS. 29, 30, 31, 32, 33, 34, 35, 36, 37, and 38, to a Disk Controller's two 32-pin micro-plug male connectors 65, 69 (FIG. 4) 77, 79 (FIG. 5). The previously mentioned micro-plug male connectors 65 (FIG. 114) are located on the top-surfaces of Disk Controller PCB unit-assemblies 53 (FIGS. 113, 114, and 115), which also face toward a Spindle-Motor's flanged mounting-base 12 (FIGS. 113, 114, and 115). The top-plug portions of the female bridge-connectors 124, 129 (FIGS. 113, 114, and 115) will each comprise eight thirty-two spring-contact Polymer flex-cable 32-bit female connectors 121, 128 (FIGS. 113, 114, and 115).

In addition, every female bridge-connector 124, 129 (FIGS. 113, 114, and 115) installed into a Phase-Change Microhead Array Chip Hard Disk Drive has two sealing-gaskets 120 (FIGS. 113, 114, and 115), which are used for sealing a Phase-Change Microhead Array Chip Hard Disk Drive's interior-space from any air-borne particles existing in the air outside a Phase-Change Microhead Array Chip Hard Disk Drive's enclosed interior-space.

Moreover, the sealing gaskets 120 (FIG. 113) will tightly seal the surface lying areas between a female bridge-connector's top-plug and bottom-plug portions and a female bridge-connector's installation slot-holes. Moreover, the sealing gaskets 120 (FIG. 113) will also protect a Phase-Change Microhead Array Chip Hard Disk Drive's enclosed interior environment from air-borne dust and/or particle contamination. Further, the female bridge-connectors 124, 129 (FIGS. 113, 114, and 115) are fastened to a Phase-Change Microhead Array Chip Hard Disk Drive's casting-base 12 (FIGS. 113,

114, and 115) using two female bridge-connector threaded hex-screws 122 (FIGS. 113, 114, and 115).

Furthermore, the top-plug portion or first-half of the previously mentioned female bridge-connectors 124, 129 (FIGS. 113, 114 and 115) provides separate and dedicated connectivity between a Phase-Change Microhead Array Chip Hard Disk Drive's bus-system, a Phase-Change Microhead Array Chip Hard Disk Drive's Disk Controller, and a Phase-Change Microhead Array Chip Hard Disk Drive's chip-positioning circuit boards, illustrated by FIGS. 29, 30, 31, 32, 33, 34, 35, 36, 37, and 38, and their respective Phase-Change Microhead Array Chips (FIGS. 29, 31, 34, and 36). Moreover, the separate and dedicated connectivity between the previously mentioned bus-system and Disk Controller is executed through two primary bus-system Polymer flex-cables 126, 127 (FIGS. 113, 114, and 115), which are physically connected, using the before mentioned two female bridge-connector's top-plug portions 124, 129 (FIG. 113), to a first chip-positioning circuit board's two bottom Polymer flex-cable connectors 67 (FIGS. 114 and 115).

Furthermore, the first chip-positioning circuit board to be installed into a Phase-Change Microhead Array Chip Hard Disk Drive's unit-assembly (FIG. 112) is positioned by eighteen "Titanium" alloy circuit-board spacers 66 (FIGS. 113, 114, and 115), a casting-base 12 (FIGS. 113, 114, and 115), and eighteen hex-screw bolt-pedestals 61, 64 (FIGS. 113, 114, and 115). Moreover, eighteen chip-positioning circuit board spacers 66 (FIGS. 113, 114, and 115) are also used to install each proceeding chip-positioning circuit board into a Phase-Change Microhead Array Chip Hard Disk Drive's unit-assembly, illustrated by FIG. 112. The last chip-positioning circuit board assembly, as illustrated in FIGS. 2, 3, 36, 37, 38, and 112, which is installed into a Phase-Change Microhead Array Chip Hard Disk Drive's unit-assembly (FIG. 112) and locked into place 66 (FIGS. 113, 114, and 115) with eighteen chip-positioning circuit board's hex-screws 50 (FIGS. 113, 114, and 115).

Installation of all chip-positioning circuit boards into a Phase-Change Microhead Array Chip Hard Disk Drive's unit-assembly (FIG. 112) is finally accomplished when the before mentioned chip-positioning circuit board's eighteen installation hex-screws 50 (FIGS. 113, 114, and 115) are first inserted into and through a last chip-positioning circuit board's hex-screw holes 51 (FIGS. 113, 114, and 115), while continuing with the insertion of the before mentioned chip-positioning circuit board hex-screws 50 through all chip-positioning circuit board spacers and spacer holes 66 (FIGS. 113, 114, and 115) until they reach the hex-screw holes 51 (FIGS. 113, 114, and 115) then, afterwards threading the chip-positioning circuit board hex-screws 50 (FIGS. 113, 114, and 115) into a casting-base's eighteen hex-screw bolt-pedestals 61, 64 (FIGS. 114 and 115), which are located on the upward facing outer-surface of a casting-base component mounting base-plate's bottom-half area 13 (FIGS. 113, 114, and 115).

Moreover, the threaded hex-screws 50 (FIGS. 113, 114, and 115) are tightened into place by turning them clockwise with a torque hex-wrench into the eighteen hex-screw bolt-pedestals 61, 64 (FIGS. 113, 114, and 115) of a casting-base, which are located on the top outer-surface of the component mounting base-plate's bottom-half 13 (FIGS. 113, 114, and 115), which will secure all of the previously mentioned chip-positioning circuit boards into their final and stationary positions, as illustrated in FIGS. 113, 114, and 115.

In addition, chip-positioning circuit board assemblies, as illustrated in drawing FIGS. 113, 114, 115, 116 and 117, are used in the Phase-Change Microhead Array Chip Hard Disk Drive design to place the Phase-Change Microhead Array Chips into stationary positions above respective disk-platter data-surfaces 13 (FIGS. 113, 114, and 115). Moreover, with the first chip-positioning circuit board having a top-installed 'Bottom Surface Phase-Change Microhead Array Chip' is installed into a stationary position above a Phase-Change Microhead Array Chip Hard Disk Drive's disk-platter number one, data-surface number one 13 (FIGS. 113, 114, and 115).

In addition, the first chip-positioning circuit board will provide system connectivity through its two bottom Polymer flex-cable connectors 67 (FIGS. 113, 114, and 115), which are located closest to a Phase-Change Microhead Array Chip Hard Disk Drive's casting-base 12 (FIGS. 113, 114, and 115), where connectivity is accomplished using two bus-system Polymer flex-cables 126, 127 (FIGS. 113, 114, and 115), which are inserted into the bottom two 32 bit spring-contact flex-cable connectors 67 (FIGS. 114 and 115) of the first chip-positioning circuit board.

Moreover, chip-positioning circuit board spring-contact flex-cable connectors are ultimately used to connect two separate Polymer flex-cables 126, 127 to each of the installed chip-positioning circuit board assemblies used in a Phase-Change Microhead Array Chip Hard Disk Drive's unit-assembly (FIG. 112) into a Phase-Change Microhead Array Chip Hard Disk Drive's bus-system. Moreover, the two female bridge-connectors 124, 129 (FIGS. 114 and 115), which are located on the inside-bottom surface of a Phase-Change Microhead Array Chip Hard Disk Drive's casting-base 12 (FIGS. 113, 114, and 115) are used to connect to a Disk Controller's two 32-pin mini-plug male connectors, which are located on the Disk Controller's PCB 65 (FIG. 114), through two rectangular shaped slot-holes located in the bottom-half of the casting-base's component mounting base-plate 12 (FIGS. 113, 114, and 115).

In addition, the second chip-positioning circuit board installed into a Phase-Change Microhead Array Chip Hard Disk Drive's unit-assembly (FIG. 112) is an 'In-between Disk-Platter' chip-positioning circuit board assembly, as illustrated by FIGS. 29, 30, 31, and 32, shows a bottom-installed 'Top-surface Phase-Change Microhead Array Chip' (FIG. 25) as being put into position for disk-platter number one, data-surface number two, while displaying a top-installed 'Bottom Surface Phase-Change Microhead Array Chip' (FIG. 28) as being put into position for disk-platter number two, data-surface number one.

Furthermore, a second chip-positioning circuit board's bottom two Polymer flex-cables 126, 127 (FIGS. 113, 114, and 115) are used to connect the second chip-positioning circuit board's bottom-installed 'Top-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the second chip-positioning circuit board's bottom-installed 'Top-surface Phase-Change Microhead Array Chip' (FIG. 25).

Furthermore, a second chip-positioning circuit board's top two Polymer flex-cables 126, 127 (FIGS. 113, 114, and 115) are used to connect the second chip-positioning circuit board's top-installed 'Bottom-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the second chip-positioning circuit board's bottom-installed 'Bottom-surface Phase-Change Microhead Array Chip' (FIG. 25).

In addition, the third chip-positioning circuit board installed into a Phase-Change Microhead Array Chip Hard Disk Drive's unit-assembly (FIG. 112) is an 'In-between Disk-Platter' chip-positioning circuit board assembly, as illustrated by FIGS. 29, 30, 31, and 32, shows a bottom-installed 'Top-surface Phase-Change Microhead Array Chip' (FIG. 25) as being put into position for disk-platter two, data-surface two, while displaying a top-installed 'Bottom Surface Phase-Change Microhead Array Chip' (FIG. 28) as being put into position for disk-platter number three, data-surface number one.

Furthermore, a third chip-positioning circuit board's bottom two Polymer flex-cables 126, 127 (FIGS. 113, 114, and 115) are used to connect the third chip-positioning circuit board's bottom-installed 'Top-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the third chip-positioning circuit board's bottom-installed 'Top-surface Phase-Change Microhead Array Chip' (FIG. 25).

Furthermore, a third chip-positioning circuit board's top two Polymer flex-cables 126, 127 (FIGS. 113, 114, and 115) are used to connect the third chip-positioning circuit board's top-installed 'Bottom-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the third chip-positioning circuit board's bottom-installed 'Bottom-surface Phase-Change Microhead Array Chip' (FIG. 25).

In addition, the fourth chip-positioning circuit board installed into a Phase-Change Microhead Array Chip Hard Disk Drive's unit-assembly (FIG. 112) is an 'In-between Disk-Platter' chip-positioning circuit board assembly, as illustrated by FIGS. 29, 30, 31, and 32, shows a bottom-installed 'Top-surface Phase-Change Microhead Array Chip' (FIG. 25) as being put into position for disk-platter three, data-surface two, while displaying a top-installed 'Bottom Surface Phase-Change Microhead Array Chip' (FIG. 28) as being put into position for disk-platter four, data-surface one.

Furthermore, a fourth chip-positioning circuit board's bottom two Polymer flex-cables 126, 127 (FIGS. 113, 114, and 115) are used to connect the fourth chip-positioning circuit board's bottom-installed 'Top-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the fourth chip-positioning circuit board's bottom-installed 'Top-surface Phase-Change Microhead Array Chip' (FIG. 25).

Furthermore, a fourth chip-positioning circuit board's top two Polymer flex-cables 126, 127 (FIGS. 113, 114 and 115) are used to connect the fourth chip-positioning circuit board's top-installed 'Bottom-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the fourth chip-positioning circuit board's bottom-installed 'Bottom-surface Phase-Change Microhead Array Chip' (FIG. 25).

In addition, the fifth chip-positioning circuit board installed into a Phase-Change Microhead Array Chip Hard Disk Drive's unit-assembly is a 'Last Disk Platter' chip-positioning circuit board assembly, as illustrated by FIGS. 36, 37, and 38, which displays a bottom-installed 'Top-surface Phase-Change Microhead Array Chip' (FIG. 25) as being put into position for disk-platter four, data-surface two.

Furthermore, a fifth chip-positioning circuit board's bottom two Polymer flex-cables 126, 127 (FIGS. 113, 114, and 115) are used to connect the fifth chip-positioning circuit board's bottom-installed 'Top-surface Phase-Change Microhead Array Chip' (FIG. 25) to the top-plug portion or first-half of the previously mentioned female bridge-connectors 124, 129 (FIGS. 113, 114 and 115), which in turn will provide a separate and dedicated connectivity between a Phase-Change Microhead Array Chip Hard Disk Drive's bus-system, a Phase-Change Microhead Array Chip Hard Disk Drive's Disk Controller, and the fifth chip-positioning circuit board's bottom-installed 'Top-surface Phase-Change Microhead Array Chip' (FIG. 25).

In addition, the last two Polymer flex-cable connectors 29, 44 (FIGS. 113, 114, and 115) are not Polymer flex-cable connectors at all, but are in reality Polymer flex-cable connector termination-caps. Moreover, the termination-caps are located on the topside surface of the fifth and last chip-positioning circuit board used in a Phase-Change Microhead Array Chip Hard Disk Drive's unit-assembly, as illustrated in FIG. 112. The fastening of the fifth chip-positioning circuit board's two termination-caps 29, 44 (FIGS. 113, 114, and 115) to the fifth and last chip-positioning circuit board's topside surface is accomplished with four threaded flex-cable connector hex-screws 37 (FIGS. 113, 114, and 115).

Additional Embodiments, as illustrated in FIGS. 113 through 141, also describes a 'Phase-Change Microhead Array Chip, Internal Data-Striping, And Hard Disk Drive Controller' and "I/O Controller And Target Channel Adapter Interface", which are two major printed circuit board 53 (FIGS. 113, 114, and 115) components that comprise a Disk Controller used by the dedicated multichannel microhead-array chip bus-system Phase-Change Microhead Array Chip Hard Disk Drive design. Components located on a printed circuit board 53 (FIGS. 113, 114, and 115), which is installed onto the bottom of a Phase-Change Microhead Array Chip Hard Disk Drive's casting-base 12 (FIGS. 1, 2, and 3). The Disk Controller used by a dedicated multichannel microhead-array chip bus-system will control installed Phase-Change Microhead Array Chips through sixteen 32-pin mini-plug male connectors 65 (FIGS. 114 and 115).

Moreover, the sixteen 32-pin mini-plug male connectors 65 (FIGS. 114 and 115) will connect to sixteen 32-pin mini-plug female bridge-connectors 130 (FIGS. 114), which are located at the bottom area of a casting-base's component mounting base-plate 12 (FIG. 114). The Disk Controller's PCB is attached to a Phase-Change Microhead Array Chip Hard Disk Drive's casting-base 12 (FIGS. 113, 114, and 115) with six PCB mounting hex-screws 54 (FIGS. 114 and 115).

Moreover, the previously mentioned six PCB mounting hex-screws 54 are inserted through a Disk Controller's six PCB hex-screw holes 70 (FIGS. 4 and 5), and screwed clockwise into the previously mentioned six PCB hex-screw holes, which are located around the bottom edge areas 16 (FIGS. 113, 114, and 115) of a Phase-Change Microhead Array Chip Hard Disk Drive's casting-base 12 (FIGS. 113, 114, and 115).

In addition, a Disk Controller's PCB has attached at its center, four metal circuit-contacts 58 (FIGS. 4 and 5). The previously mentioned metal circuit-contacts 58 are used by a Spindle And Power Controller's driver circuitry to communtate with a Spindle-Motor and its hall-sensor circuits (i.e., not shown here). Furthermore, when the Disk Controller's PCB unit-assembly is installed onto a dedicated multichannel microhead-array chip bus-system Phase-Change Microhead Array Chip Hard Disk Drive's casting-base 12 (FIGS. 113, 114, and 115) the four metal circuit-contacts 58 will make a connection with the previously mentioned Spindle And Power Controller's driver circuitry through circuit-contacts located on a Polymer circuit-trace substrate flex-cable 211 (FIG. 138), which is located at the bottom of a Spindle-Motor's stator housing 59, 202 (FIGS. 113, 114, 115, and 138). Further, using the before mentioned four circuit-contacts 58, all of a Spindle-Motor's 59, 201 (FIGS. 113, 114, 115, and 138) velocity and radial positioning control, along with its hall sensor monitoring signals, altogether will be sent by two-way communication, through a Spindle-Motor's Polymer circuit-trace substrate-cable 211 (FIG. 138) to and from the previously mentioned PCB's circuit-contacts 53 (FIGS. 114 and 115), and back again to a dedicated multichannel microhead-array chip bus-system Phase-Change Microhead Array Chip Hard Disk Drive's Spindle-Motor 59, 201 (FIGS. 113, 114, 115, and 138).

Moreover, a Disk Controller's PCB unit-assembly is used in a dedicated multichannel microhead-array chip bus-system Phase-Change Microhead Array Chip Hard Disk Drive's unit-assembly to contain and install most of a dedicated multichannel microhead-array chip bus-system Phase-Change Microhead Array Chip Hard Disk Drive's electronics. A Disk Controller's PCB unit-assembly consists of two main "Very Large Scale Integration" (VLSI) surface-mounted microprocessors. Further, the previously mentioned VLSI components include an 'I/O Controller And Target Channel Adapter Interface' 197 (FIGS. 138 and 139) and a 'Phase-Change Microhead Array Chip, Internal Data-Striping, And Hard Disk Drive Controller' 217 (FIGS. 138 and 139), which reside on a Disk Controller's PCB unit-assembly. However, the electronics used by every installed Phase-Change Microhead Array Chip to control functions like 'Microhead-Addressing and Selection' are all built into the Phase-Change Microhead Array Chips themselves.

Furthermore, the integration that occurs between the microhead-array of a dedicated multichannel microhead-array chip bus-system Phase-Change Microhead Array Chip and a dedicated multichannel microhead-array chip bus-system Phase-Change Microhead Array Chip's internal circuitry significantly improves the 'signal-to-noise' ratio of the output-signals being created by the dedicated multichannel microhead-array chip bus-system Phase-Change Microhead Array Chips. As illustrated in FIGS. 138 and 139, the multiple data-stream signals created then output to a dedicated multichannel microhead-array chip bus-system Phase-Change Microhead Array Chip's multiple read-channel (FIG. 125) are transported using dedicated data-bus system lines to a dedicated multichannel microhead-array chip bus-system Phase-Change Microhead Array Chip Hard Disk Drive Disk Controller and the plurality of Data-Sequencers it uses in multichanneled signal processing.

Moreover, the Block-diagram, as illustrated in FIG. 138, is used to represent the general connectivity between components used in a dedicated multichannel microhead-array chip bus-system Phase-Change Microhead Array Chip Hard Disk Drive's design, while the block-diagram, illustrated in FIG. 139, is used to represent the general connectivity between the 'Phase-Change Microhead Array Chip, Internal Data-Striping, And Hard Disk Drive Controller' and the 'I/O Controller And Target Channel Adapter Interface' components, which are the main VLSI microprocessors that make up a dedicated multichannel microhead-array chip bus-system Phase-Change Microhead Array Chip Hard Disk Drive's Disk Controller 53 (FIGS. 114 and 115).

Furthermore, a VLSI component, which is called a "Phase-Change Microhead Array Chip, Internal Data-Striping, And Hard Disk Drive Controller" 217 (FIGS. 138 and 139) is presented here to provide, while under program control, local microprocessor services to a dedicated multichannel microhead-array chip bus-system Phase-Change Microhead Array Chip Hard Disk Drive. Furthermore, a "Phase-Change Microhead Array Chip, Internal Data-Striping, And Hard Disk Drive Controller" 217 (FIGS. 138 and 139) is also presented here to manage the various resources of a dedicated multichannel microhead-array chip bus-system Phase-Change Microhead Array Chip Hard Disk Drive's other PCB electronic-units. Including, a "Serial EEPROM" 200 (FIGS. 138 and 139), a "SDRAM Buffer" 199 (FIGS. 138 and 139), and a "Serial Flash VDRAM" 198 (FIGS. 138 and 139).

In addition, the previously mentioned "Phase-Change Microhead Array Chip, Internal Data-Striping, And Hard Disk Drive Controller" 217 (FIGS. 138 and 139) will communicate serially with a "Serial EEPROM" firmware chip 200 (FIGS. 138 and 139), which contains operational program code used by a dedicated multichannel microhead-array chip bus-system Phase-Change Microhead Array Chip Hard Disk Drive to conduct various disk and data I/O operations. Primarily, the previously mentioned "Phase-Change Microhead Array Chip, Internal Data-Striping, And Hard Disk Drive Controller" 217 (FIGS. 138 and 139) will execute the previously mentioned program code to complete hard disk drive power-on-resets, spin-ups, and re-calibration procedures. In addition, the previously mentioned "Phase-Change Microhead Array Chip, Internal Data-Striping, And Hard Disk Drive Controller" 217 (FIGS. 138 and 139) will also, during a dedicated multichannel microhead-array chip bus-system Phase-Change Microhead Array Chip Hard Disk Drive's normal operation, read additional operational control code from a disk-platter 204, 205 (FIG. 139), data-surface and store it in a Disk Controller's memory buffer, which is comprised as (SDRAM) "Synchronous Dynamic Random Access Memory" 199 (FIGS. 138 and 139).

Furthermore, the previously mentioned operational control code is typically called (Opcode) "Operational Code" and is used in much the same way as a host-computer's microprocessor might use a host-computer's disk-stored (OS) "Operation System" software to execute system wide operations. Moreover, the previously mentioned "Phase-Change Microhead Array Chip, Internal Data-Striping, And Hard Disk Drive Controller" 217 (FIGS. 138 and 139), which is used as a synchronous device on a Disk Controller's PCB 217 (FIGS. 138 and 139). In addition, the Serial EEPROM 200 (FIGS. 138 and 139), will run as an asynchronous device, while a Disk Controller's (SDRAM) "Synchronous Dynamic Random Access Memory" 199 (FIGS. 139 and 140) will run as the Disk Controller's synchronous memory buffer with synchronous addressing control, synchronous data I/O busing control, and synchronous control-bus operational control.

Moreover, a "Phase-Change Microhead Array Chip, Internal Data-Striping, And Hard Disk Drive Controller" 217 (FIGS. 138 and 139), will provide control-functions throughout the dedicated multichannel microhead-array chip bus-system based Phase-Change Microhead Array Chip Hard Disk Drives. In addition, a "Phase-Change Microhead Array Chip, Internal Data-Striping, And Hard Disk Drive Controller" 217 (FIG. 139), also has a block-diagram that illustrates the various internal component modules it uses, while displaying their connectivity 217 (FIG. 139). The previously mentioned block-diagram (FIG. 139) also illustrate how each of a "Phase-Change Microhead Array Chip, Internal Data-Striping, And Hard Disk Drive Controller" 217 (FIGS. 138 and 139) internal modules interconnect and communicate with one another to form and facilitate a dedicated multichannel microhead-array chip bus-system Phase-Change Microhead Array Chip Hard Disk Drive's control system.

Furthermore, a "Phase-Change Microhead Array Chip, Internal Data-Striping, And Hard Disk Drive Controller" 217 (FIGS. 138 and 139) has an internal (ECC) "Error Correction Control" system module 243 (FIG. 139) built into it. The Error Correction Codes executed during host-requested read-data or write-data disk-operations that are used by a "Phase-Change Microhead Array Chip, Internal Data-Striping, And Hard Disk Drive Controller" 217 (FIGS. 138 and 139) are based upon a Reed-Solomon encoder/decoder circuit's calculated error results.

Furthermore, the previously mentioned "Phase-Change Microhead Array Chip, Internal Data-Striping, And Hard Disk Drive Controller" 217 (FIGS. 138 and 139) has a plurality of "Data Sequencers" 235 (FIG. 139) (i.e., sometimes called a Data-Formatter) built into it. Wherein, each of the Data Sequencers that make up the previously mentioned plurality of Data Sequencers, as illustrated in FIG. 139, is used to control the operation of an equal number of read and the write-channels of used within a dedicated multichannel microhead-array chip bus-system Phase-Change Microhead Array Chip Hard Disk Drive.

In addition, to initiate a host-requested disk-operation a "Phase-Change Microhead Array Chip, Internal Data-Striping, And Hard Disk Drive Controller" 217 (FIGS. 138 and 139) will load a set of commands into a "Writable Control Store Register", where the loading and manipulation of this register is done through a "Phase-Change Microhead Array Chip, Internal Data-Striping, And Hard Disk Drive Controller's" 217 (FIGS. 138 and 139) internal "Interface Registers", which is located internally within its (ARPSR) "Arm RISC Processor" 226 (FIG. 139).

Moreover, as illustrated in FIG. 139, each Data-Sequencer contained within a Phase-Change Microhead Array Chip, Internal Data-Striping, And Hard Disk Drive Controller's 217 (FIGS. 138 and 139) plurality of Data Sequencers 235 (FIG. 139) has direct control over its own (MAB) "Microhead Address-Bus" output, a (DB) "Data I/O-Bus" input/output, a (CB) "Control-Bus" output.

In addition, "Phase-Change Microhead Array Chip, Internal Data-Striping, And Hard Disk Drive Controller" 217 (FIGS. 138 and 139) has a (BCLR) "Buffer Controller" built into itself 248 (FIG. 139). Moreover, the previously mentioned (BCLR) "Buffer Controller" 248 (FIG. 139), illustrated by FIG. 139, will support a "1-Gbyte SDRAM" buffer-cache. Moreover, a 128 bit wide implementation of this "buffer-cache" provides a "30" GB/s of maximum buffer bandwidth to a dedicated multichannel microhead-array chip bus-system based Phase-Change Microhead Array Chip Hard Disk Drive's I/O systems 197 (FIGS. 138 and 139).

Consequently, this increase in bandwidth will allow a "Phase-Change Microhead Array Chip, Internal Data-Striping, And Hard Disk Drive Controller" 217 (FIGS. 138 and 139) to have direct access to the buffer itself, eliminating the need for a separate buffer (SDRAM) "Synchronous Dynamic Random Access Memory" resource controller. Moreover, a Phase-Change Microhead Array Chip, Internal Data-Striping, And Hard Disk Drive Controller's 217 (FIGS. 138 and 139) (BCLR) "Buffer Controller" 248 (FIG. 139) operates internally under the direction of the (ARPSR) "Arm RISC Processor" 226 (FIG. 139).

In addition, a "Phase-Change Microhead Array Chip, Internal Data-Striping, And Hard Disk Drive Controller" 217 (FIGS. 138 and 139) will have a (TCAI) "Target Channel Adapter Interface" 238 (FIG. 139) built into itself. The previously mentioned (TCAI) "Target Channel Adapter Interface" 238 (FIG. 139), by interfacing with the (DDCI) "Disk Drive Controller Interface" 258 (FIG. 139), will provide the means for the "Phase-Change Microhead Array Chip, Internal Data-Striping, And Hard Disk Drive Controller" 217 (FIGS. 138 and 139) to read and write (Opcode) "Operational Code" and user data to and from itself and the "I/O Controller And Target Channel Adapter Interface" 197 (FIGS. 138 and 139). Wherein, communication between the (TCAI) "Target Channel Adapter Interface" 238 (FIG. 139) and the (DDCI) "Disk Drive Controller Interface" 258 (FIG. 139) is necessary to control the operations of both "Phase-Change Microhead Array Chip, Internal Data-Striping, And Hard Disk Drive Controller" 217 (FIGS. 138 and 139) and "I/O Controller And Target Channel Adapter Interface" 197 (FIGS. 138 and 139) modules, and to supply both modules with needed system information.

In addition, the (BCLR) "Buffer Controller" 248 (FIG. 139) operates consists of both physical and logical components. The physical components of the interface comprise a 32-bit Address-bus, a 128-bit Data-bus, (RD STROBE) "Read Strobe", (WR STROBE) "Write Strobe" control lines, an (ALE) "Address Latch Enable" control line, and a (WAIT) "Wait" control line. While, the logical components of the previously mentioned (BCLR) "Buffer Controller" 248 (FIG. 139) comprise of "Internal Control Registers" and "Data Registers", which are both accessible to the "Phase-Change Microhead Array Chip, Internal Data-Striping, And Hard Disk Drive Controller" 217 (FIGS. 138 and 139). Furthermore, by writing to and reading from the previously mentioned logical registers, a Disk Controller's "Phase-Change Microhead Array Chip, Internal Data-Striping, And Hard Disk Drive Controller" 217 (FIGS. 138 and 139) can control and configure a (BCLR) "Buffer Controller" 248 (FIG. 139).

In addition, a Disk Controller's "Phase-Change Microhead Array Chip, Internal Data-Striping, And Hard Disk Drive Controller" 217 (FIGS. 138 and 139) has an internal (SCLR) "Serial Controller" 223 (FIG. 139). The previously mentioned (SCLR) "Serial Controller" 223 (FIG. 139) will provide the "Phase-Change Microhead Array Chip, Internal Data-Striping, And Hard Disk Drive Controller" 217 (FIGS. 138 and 139) with an internal high-speed serial interface and pathway for firmware based operational control-code and data-streams. Wherein, the previously mentioned firmware's operational control-code and data-streams are transferred at high speeds between a firmware containing Serial EEPROM 200 (FIGS. 138 and 139) and a "Phase-Change Microhead Array Chip, Internal Data-Striping, And Hard Disk Drive Controller" 217 (FIGS. 138 and 139), through an executed control of the internal (SCLR) "Serial Controller" 223 (FIG. 139).

In addition, a "I/O Controller And Target Channel Adapter Interface" 197 (FIGS. 138 and 139) has a "System Wide Network" (SWN) interface 213, 271 (FIGS. 138 and 139) that provides connectivity to a system wide network comprised with an architecture that is designed around a point-to-point, switched I/O fabric, whereby end node devices (i.e., which can range from very inexpensive I/O devices like single chip SCSI or Ethernet adapters to very complex host computers) are interconnected by cascaded switch devices. The physical properties of the previously mentioned architecture will interconnect and support two predominant environments, with bandwidth, distance, and cost optimizations appropriate for these environments:

i.) Module-to-module, as typified by computer systems that support I/O module add-in slots;

ii.) Chassis-to-chassis, as typified by interconnecting computers, external storage systems, and external LAN/WAN access devices (such as switches, hubs, and routers) in a data-center environment.

The architecture's switched fabric provides a reliable transport mechanism, where messages are queued for delivery between end nodes. In general, message content and meaning is not specified by the previously mentioned architecture, but rather is left to the designers of end node devices and the processes that are hosted on those end node devices. The previously mentioned architecture will define hardware transport protocols that are sufficient to support both reliable messaging (i.e., send/receive) and memory manipulation semantics (e.g., remote DMA) without software intervention in the data movement path.

In addition, the previously mentioned architecture will define protection and error detection mechanisms that permit the architecture's transactions to originate and terminate from either privileged kernel mode (i.e., to support legacy I/O and communication needs) or user space (i.e., to support emerging interprocess communication demands). The previously mentioned architecture's specification also addresses the need for a rich manageability infrastructure to support interoperability between multiple generations of components from many vendors over time. This infrastructure will provide an ease of use and consistent behavior for high volume, cost sensitive deployment environments. The previously mentioned architecture also specifies the interfaces for industry standard management that will interoperate with enterprise-class management-tools for configuration, asset management, error reporting, performance metric collection, and topology management necessary for data center deployment of the previously mentioned architecture.

The previously mentioned "I/O Controller And Target Channel Adapter Interface" 197 (FIGS. 138 and 139) will provide the data handling, the bus control, and the transfer management services to and from and its "System Wide Network" (SWN) interface 213, 271 (FIGS. 138 and 139). The "Phase-Change Microhead Array Chip, Internal Data-Striping, And Hard Disk Drive Controller" 217 (FIGS. 138 and 139) executes the configuration and control over the "I/O Controller And Target Channel Adapter Interface" 197 (FIGS. 138 and 139) and its "System Wide Network" (SWN) interface 213, 271 (FIGS. 138 and 139) across a 32-bit address-bus and 128-bit data-bus, while a Phase-Change Microhead Array Chip, Internal Data-Striping, And Hard Disk Drive Controller's 217 (FIGS. 138 and 139) "Buffer Controller" module controls all data-transfer operations within the before mentioned Disk Controller.

In addition, interfacing with a host-system is done through a 24-pin interface-connector (i.e., not shown here) for I/O Controller and Target Channel Adapter boards to the previously mentioned architecture's backplanes. These connectors are a one-piece design mounted on the backplane, into which the previously mentioned architecture's board is inserted. One example of a suitable connector is specified in a draft called: New Work Proposal to the International Electro technical Commission (IEC). The detailed connector specification is included in draft specification IEC 61076. Two connectors are defined, one type for use with 1× and 4× boards, and a second type for 12× boards. The previously mentioned architecture's boards and backplanes shall incorporate features shown in the appropriate sections below that specify the connector to board and connector to backplane interfaces. The 1×/4× and 12× connectors are externally identical, but the backplane footprint for the 1×/4× connector may have a reduced footprint from that used for the 12× connector if desired, due to the smaller number of contacts utilized. The board footprint for the connector contacts is the same in all cases.

Moreover, the board edge "paddle" which mates with the connector is covered by a "paddle guard", a plastic shroud that fits over the paddle to protect the contacts during insertion and withdrawal of the board from the previously mentioned architecture's backplane connector. The paddle guard also serves to initiate closure of the connector housing when the board is inserted. It is the responsibility of the connector supplier to perform the indicated tests on any backplane connectors used by the previously mentioned architecture's boards, and to supply the data to potential customer companies to indicate compliance.

Moreover, the previously mentioned architecture's backplane connector is a low insertion force connector with two sets of contacts. One set of contacts is used on the primary side of the previously mentioned architecture's board for high-speed differential pair signals and their corresponding grounds. A second set of contacts is used on the secondary side of the board for low-speed signals, power, and ground. The 12× connector contains 24 pairs of high-speed contacts (i.e., 48 pins) and 18 low speed/power contacts. The 1×/4× connector contains eight pairs of high-speed contacts and the same number (i.e., 18) low speed/power contacts.

Moreover, closure of the mechanism that engages the high-speed contacts is achieved by an internal mechanism, which is actuated by outline features on the paddle guard. It is thus vitally important that the paddle guard outline not deviate from that described in the sections below. Sequencing of low speed/power contacts for hot insertion and withdrawal of boards is accomplished with contact staggering, controlled by openings in the paddle guard. The mechanical, electrical, and environmental performance requirements for the previously mentioned architecture's backplane connectors are defined in the below sections.

FIG. 89, Backplane connector, and board paddle (a), paddle guard assembly (b) a b. Note that all drawing dimensions in the following sections are in millimeters (i.e., mm). The connector drawings contained in this document are intended for reference purposes only. The reader is encouraged to consult IEC specification 61076 and the respective supplier's drawings for detailed design information.

i.) The contact patterns shown in FIG. 90 shall be used on the primary side of the previously mentioned architecture's boards for high-speed contacts to the backplane connector.

ii.) The contact pattern shown in FIG. 91 shall be used on the secondary side of the previously mentioned architecture's boards for low-speed and power contacts.

iii.) The board paddle design shown in FIG. 92 shall be used on the previously mentioned architecture's boards to insure interoperability.

Moreover, as mentioned in the previous sections, the sequencing of signals for hot insertion and withdrawal is controlled by the openings in the paddle guard.

Furthermore, an "I/O Controller And Target Channel Adapter Interface" 197 (FIGS. 138 and 139) implements "System Wide Network" (SWN) 213, 271 (FIGS. 138 and 139) interface-logic, while operating under a Phase-Change Microhead Array Chip, Internal Data-Striping, And Hard Disk Drive Controller's 217 (FIGS. 138 and 139) control. The "I/O Controller And Target Channel Adapter Interface" 197 (FIGS. 138 and 139) will receive and transmit words of data over the "System Wide Network" (SWN) 213, 271 (FIGS. 138 and 139) bus, which connects directly into a switch controlled backplane.

The Phase-Change Microhead Array Chip, Internal Data-Striping, And Hard Disk Drive Controller's 217 (FIGS. 138 and 139) "Buffer Controller" 248 (FIG. 139) writes data to or reads data from the SDRAM buffer-cache 199 (FIGS. 138 and 139) over one-hundred and twenty-eight data lines 215 (FIGS. 138 and 139). While under the Phase-Change Microhead Array Chip, Internal Data-Striping, And Hard Disk Drive Controller's 217 (FIGS. 138 and 139) direction the "Buffer Controller" 248 (FIG. 139) controls the transfer of data and handles the addressing of a dedicated multichannel microhead-array chip bus-system Phase-Change Microhead Array Chip Hard Disk Drive's cache 199 (FIGS. 138 and 139).

Moreover, the internal data transfer-rate to and from a dedicated multichannel microhead-array chip bus-system Phase-Change Microhead Array Chip Hard Disk Drive's cache 199 (FIGS. 138 and 139) will be at "10" GB/s. In addition, these high-speed transfer-rates will allow the "I/O Controller And Target Channel Adapter Interface" 197 (FIGS. 138 and 139) to communicate over a "System Wide Network" (SWN) 213, 271 (FIGS. 138 and 139) interface at a transfer-rate of "10"GB/s using a multiple of DMA channels. Furthermore, Phase-Change Microhead Array Chip, Internal Data-Striping, And Hard Disk Drive Controller 217 (FIGS. 138 and 139) simultaneously controls disk-to-buffer RAM transfers and microcontroller access to control-code stored in the buffer SDRAM's 74 (FIG. 4) memory during a data transference across the "System Wide Network" (SWN) 213, 271 (FIGS. 138 and 139) interface.

In addition, a dedicated multichannel microhead-array chip bus-system Phase-Change Microhead Array Chip Hard Disk Drive uses a serial connected and code containing Firmware chip, which is comprised of a "Flash EEPROM" chip that contains (Opcode) "Operational Code" 200 (FIGS. 138 and 139). The Firmware chip is connected to a dedicated multichannel microhead-array chip bus-system Phase-Change Microhead Array Chip Hard Disk Drive's Phase-Change Microhead Array Chip, Internal Data-Striping, And Hard Disk Drive Controller 217 (FIGS. 138 and 139) through a high-speed serial connection 214. This device is programmable and controls various features like disk caching, track skewing, cylinder skewing, error detection, and error correction.

In addition, caching for dedicated multichannel microhead-array chip bus-system Phase-Change Microhead Array Chip Hard Disk Drives will enhance hard disk drive performance and significantly improve system throughput. Through a dynamic caching scheme, like the one featured in the dedicated multichannel microhead-array chip bus-system Phase-Change Microhead Array Chip Hard Disk Drive design, will make better use of the buffer SDRAM's memory areas 200 (FIGS. 138 and 139). With this dynamic caching feature, the buffer's memory space used during a read-data or write-data disk-operation will be dynamically allocated and controlled. The cache will be flexibly divided into several memory segments under program control with each memory segment containing one cache-entry. A cache-entry will consist of the requested read-data, plus its corresponding prefetch-data.

Consequently, dynamic segmentation will allow dedicated multichannel microhead-array chip bus-system Phase-Change Microhead Array Chip Hard Disk Drives to make optimum use of their cache memory buffers. By allowing the amount of stored data to be increased or decreased, which ever is required, dynamically the dynamic-cache of dedicated multichannel microhead-array chip bus-system Phase-Change Microhead Array Chip Hard Disk Drives will anticipate host-system or SWN requests for data and store that data for faster access. When a host-system or SWN requests a particular segment of data, a dedicated multichannel microhead-array chip bus-system Phase-Change Microhead Array Chip Hard Disk Drive's dynamic caching feature will use a prefetch strategy. A prefetch strategy looks ahead and automatically stores subsequent data from a particular disk-platter's data-surface into a high-speed buffer contained within the SDRAM 200 (FIGS. 138 and 139) memory area of the dedicated multichannel microhead-array chip bus-system Phase-Change Microhead Array Chip Hard Disk Drive.

Moreover, since fifty-percent or more of all hard disk drive host-requested or SWN requested data-reads are sequential, the before mentioned host-system or SWN, more likely, will request the previously cached subsequent-data from the SDRAM 200 (FIGS. 138 and 139) memory buffer rather than from a particular data-surface sector area. Moreover, the before mentioned subsequent-data, being dynamically stored in high-speed cache, will be retrieved for use in microseconds, or even in nanoseconds, rather than in the more typical milliseconds. Consequently, the previously mentioned process of "Dynamic Caching" can provide substantial timesaving, during at least half of all dedicated multichannel microhead-array chip bus-system Phase-Change Microhead Array Chip Hard Disk Drive data requests.

Furthermore, the use of "Dynamic Caching" will save most of the transaction time occurring for a dedicated multichannel microhead-array chip bus-system Phase-Change Microhead Array Chip Hard Disk Drive by eliminating, in concert with microhead-array chips that are controlled independently from each other, the "rotational latency delays" that dominate a typical disk transaction. The process of "Dynamic Caching" works by continuing to fill its memory areas with adjacent data, while transferring any data requested by the host-system or SWN. Unlike a non-caching Disk Controller, a Disk Controller used in a dedicated multichannel microhead-array chip bus-system Phase-Change Microhead Array Chip Hard Disk Drive will continue on with further read-data disk operations after the requested-data has been transferred to a host-system or SWN, via the "System Wide Network" (SWN) 213, 271 (FIGS. 138 and 139) interface. However, the previously mentioned read-data disk operations would terminate after a programmed amount of subsequent-data had been read into a buffered dynamic memory-segment of the before mentioned cache.

In addition, the cache memory will consist of (SDRAM) "Synchronous Dynamic Random Access Memory" 200

(FIGS. 138 and 139), which is allocated to hold data. Data that can be directly accessed by the host-system or SWN, by means of the (RDDATA) "Read Data" and the (WRDATA) "Write Data" commands. A buffer cache memory functions as a group of segments with rollover points at the end of each segment. The unit of data stored will be a logical block; i.e., for example a multiple of a 512-byte sector. All access to the buffer cache memory must be in multiples of "512" byte size sectors; i.e., for example "4096" byte size sectors. Furthermore, when a (WRDATA) "Write Data" command is executed a dedicated multichannel microhead-array chip bus-system Phase-Change Microhead Array Chip Hard Disk Drive will store the data to be written in a SDRAM based cache buffer SDRAM 200 (FIGS. 138 and 139). The "Buffer Controller" 248 (FIG. 139) will immediately send a (GDDATA) "Good Data" status-message to the host-system or SWN before the data can actually be written to a disk-platter's data-surface. The host-system or SWN will then be free to move on to other tasks, such as preparing data for the next data-transfer, without having to wait for a dedicated multichannel microhead-array chip bus-system Phase-Change Microhead Array Chip Hard Disk Drive to switch to a different microhead, located above the appropriate track, or rotate the disk-platters to the specified sector.

Furthermore, while the host-system or SWN is preparing data for the next data-transfer a dedicated multichannel microhead-array chip bus-system Phase-Change Microhead Array Chip Hard Disk Drive will immediately write the cached data to a disk-platter's data-sector. This will usually complete a write-data disk operation in less than "20" milliseconds after issuing the (GDDATA) Good Data status-message. When writing data to the cache, a single-block random write, for example, typically requires only "3" milliseconds of host-system or SWN processing time to execute. Therefore, without the Disk Controller's ability to write data to the cache, the same write-operation would typically occupy the host-system or SWN for about "20" milliseconds.

In addition, writing data to cache memory dynamically allows the data to be transferred to a dedicated multichannel microhead-array chip bus-system Phase-Change Microhead Array Chip Hard Disk Drive in a continuous flow, rather than as individual blocks of data separated by hard disk drive's access delays. This is achieved by taking advantage of a dedicated multichannel microhead-array chip bus-system Phase-Change Microhead Array Chip Hard Disk Drive's ability to write blocks of data sequentially to data-surfaces that where formatted with a "1:1 hard disk drive interleave". This means that as the last byte of data is transferred out of the write-cache and the selected laser-diode microhead passes over the next sector of a disk-platter's data-sector the first byte of the next data-block will be transferred, causing no interruption, or delay in the data-transfer process. The write data to cache algorithm fills the cache buffer with new data from the host-system or SWN, while simultaneously transferring any data that the host-system or SWN had previously stored in the cache to the dedicated multichannel microhead-array chip bus-system Phase-Change Microhead Array Chip Hard Disk Drive.

Furthermore, a dedicated multichannel microhead-array chip bus-system Phase-Change Microhead Array Chip Hard Disk Drive without some kind of cache optimization would suffer, just as any conventional hard disk drive would, from delays during sequential reads, which occur simply because all hard disk drive designs exhibit "rotational latency". Even if a single microhead selected within that same Phase-Change Microhead Array Chip's microhead-array was above the desired data-track to be read "rotational latency" would still occur.

However, if multiple of microheads within the same array were to be used simultaneously along with cache optimization, and each microhead-array chip installed within a drive were simultaneously used and independently controlled, a dedicated multichannel microhead-array chip bus-system Phase-Change Microhead Array Chip Hard Disk Drive's rotational latency time would typically average a "0.01" milliseconds. Current hard disk drives often service requests from multiple processes in a multitasking or multi-user environment. In these instances, while each process might request-data sequentially, a current hard disk drive must time-share among all these processes. In conventional hard disk drive designs, the data-heads must move from one data-track location to another. With cache optimization, even if another pro-process were to interrupt another the hard disk drive would continue to access the data sequentially from its high-speed cache memory. In handling multiple processes, and when the desired data resides in the cache, "cache memory optimization" will achieve its most impressive performance gains, saving on both seek and latency times.

Furthermore, the cache can be flexibly divided into several memory-segments, while under program control, with each memory-segment containing one cache-entry. A cache-entry would consist of requested read-data along with any corresponding prefetch-data. The requested read-data will only take up a certain amount of memory space in the cache-segment so the corresponding prefetch-data can essentially occupy the rest of the available memory space within the cache. Other factors determining prefetch size are the maximum and minimum prefetch settings determined by the "Buffer Controller" 248 (FIG. 139). A dedicated multichannel microhead-array chip bus-system Phase-Change Microhead Array Chip Hard Disk Drive's prefetch algorithm will dynamically control the actual prefetch value, which is based upon the current demands with consideration for overhead to subsequent commands.

In addition, another Firmware feature incorporated into a dedicated multichannel microhead-array chip bus-system Phase-Change Microhead Array Chip Hard Disk Drive's Microhead-array Chips is "Track Skewing". Track Skewing reduces the latency time that results from a hard disk drive's switching of a read or write data-head to access sequential data. A track skew is employed in such a way that the next logical sector of data to be accessed will be under the read or write microhead once the microhead switch has been made and that same data is ready to be accessed. When sequential-data is on the same cylinder/track, but on a different disk-surface, an electronically executed microhead switch would also need to be performed. Since sequential microhead switching times are well defined within the dedicated multi-channel microhead-array chip bus-system Phase-Change Microhead Array Chip Hard Disk Drive design, the data-sector being addressed can be optimally positioned across track-boundaries to minimize any latency time accrued during Phase-Change Microhead Array Chip's microhead switching.

In addition, another firmware feature incorporated into the dedicated multichannel microhead-array chip bus-system Phase-Change Microhead Array Chip Hard Disk Drive design is called "Cylinder Skewing". Cylinder Skewing is also used to help minimize the latency time associated with "single-cylinder seeks". A cylinder skew is employed in such a way that the next logical sector of data, across a cylinder boundary, will be accordingly positioned on a proceeding disk-platter, after a single-cylinder seek is performed. When a dedicated multichannel microhead-array chip bus-system Phase-Change Microhead Array Chip Hard Disk Drive is ready to continue accessing data, the sector to be accessed will be positioned directly under the addressed read or write microhead. Therefore, the Cylinder Skew can take place between the last-sector of data of a cylinder and the first-sector of data of a proceeding disk-platter's seeked cylinder.

In addition, the dedicated multichannel microhead-array chip bus-system Phase-Change Microhead Array Chip Hard Disk Drives will also incorporate an "ID-less Format" for tracking data sector locations across its multiple data-surfaces. The ID-Less Format has several advantages over the traditional "ID After Wedge" or "ID Before Sector" methods of data sector tracking. For example, the lack of an "ID field" typically written to current hard drive disk-platter data-surfaces will regain approximately "4" percent of the overall data track real-estate present within a dedicated multichannel microhead-array chip bus-system Phase-Change Microhead Array Chip Hard Disk Drive's unit-assembly (FIG. 112). Since no ID's have to be read or corrected in case of an error, a dedicated multichannel microhead-array chip bus-system Phase-Change Microhead Array Chip Hard Disk Drive's overall data throughput is also increased. In ID-Less Formatting of data-sectors, the ID of each data sector is not written onto a disk-platter's data-surface, instead it is stored in a SDRAM's 199 (FIGS. 138 and 139) buffer memory area called the "Descriptor".

In addition, each data-sector will have an associated Descriptor containing the rotational start-time for each data sector's disk-platter location. Subsequently, the Descriptor does not have any defect information stored within its memory areas. Dedicated multichannel microhead-array chip bus-system Phase-Change Microhead Array Chip Hard Disk Drives also store a "Defect Map" within a SDRAM's 199 (FIGS. 138 and 139) buffer memory, but in a separate memory-location away from the Descriptor. Subsequently, for the dedicated multichannel microhead-array chip bus-system Phase-Change Microhead Array Chip Hard Disk Drive design the multiple Data Sequencers 235 (FIG. 139) within a Phase-Change Microhead Array Chip, Internal Data-Striping, And Hard Disk Drive Controller 217 (FIGS. 138 and 139) will have access to both the Descriptor and the Defect Map listings, which is accessed through special requests made to the "Buffer Controller" 248 (FIG. 139) located within a Phase-Change Microhead Array Chip, Internal Data-Striping, And Hard Disk Drive Controller 217 (FIGS. 138 and 139). Only "end user data" and ECC information are actually written to data-surfaces of a dedicated multichannel microhead-array chip bus-system Phase-Change Microhead Array Chip Hard Disk Drive's disk-platters.

In addition, error detection and correction for a dedicated multichannel microhead-array chip bus-system Phase-Change Microhead Array Chip Hard Disk Drive becomes a concern as the dedicated multichannel microhead-array chip bus-system Phase-Change Microhead Array Chip Hard Disk Drive's areal densities continue to increase. Wherein, the obtaining of extremely low error-rates will require sophisticated (ECC) "Error Correction Codes". Dedicated multichannel microhead-array chip bus-system Phase-Change Microhead Array Chip Hard Disk Drives will implement a Reed-Solomon error correction technique to reduce the uncorrectable read-error rates of any data-bits being read. Therefore, when errors do occur, an automatic retry, a double-burst, and a more rigorous triple-burst correction algorithm will enable the correction of any data-sector, using three-bursts each with four incorrect-bytes. Before invoking the complex triple-burst ECC algorithm, dedicated multichannel microhead-array chip bus-system Phase-Change Microhead Array Chip Hard Disk Drives will always try to recover from an error by attempting to re-read the data correctly.

Furthermore, this error correction strategy prevents the invoking of correction, on non-repeatable errors. Each time a data-sector in error is re-read, a set of ECC syndromes has to be computed, and this is a very wasteful use of processing time. Therefore, if the entire syndrome-values equal zero, the data was read with no errors and the data-sector is transferred to the host-system or SWN. However, if any of the syndrome-values do not equal zero, an error has occurred; the syndrome-values are retained, and another re-read is invoked. Non-repeatable errors are usually related to the signal-to-noise ratio of a drive's system and are not due to media-defects.

Furthermore, when sets of syndromes from two consecutive re-reads are the same, a stable-syndrome has been achieved. This event may be significant depending on whether or not the automatic read-reallocation or early-correction features have been enabled within a dedicated multichannel microhead-array chip bus-system Phase-Change Microhead Array Chip Hard Disk Drive's unit-assembly (FIG. 112). If, however, an early correction feature has been enabled and a stable-syndrome has been achieved, triple-burst ECC correction is applied, and the appropriate message will be transferred to the host-system or SWN (e.g., corrected data, etc.). The ECC bit will enable early ECC triple-burst correction if a stable-syndrome has been achieved before all of the re-reads have been exhausted.

Therefore, if the automatic read-reallocation feature is enabled, the drive, when encountering triple-burst errors, will attempt to re-read the data. Additionally, dedicated multichannel microhead-array chip bus-system Phase-Change Microhead Array Chip Hard Disk Drives will be equipped with an automatic read-reallocation feature, so any new defective data-sectors can be easily and automatically reallocated for the end-user.

In addition, to accommodate inline-sparing of defective data-sectors dedicated multichannel microhead-array chip bus-system Phase-Change Microhead Array Chip Hard Disk Drives will allocate thousands of extra data-sectors to the end of its physical data storage area. While in the factory, the media will be scanned for defects, and if a data-sector is found defective, the address of the defective data-sector is added to a dedicated multichannel microhead-array chip bus-system Phase-Change Microhead Array Chip Hard Disk Drive's Defect Map listing. Data-sectors located physically after the defective data-sector; moreover, will be assigned logical block addresses, so that a sequential ordering of logical blocks can be maintained. The inline-sparing technique will be maintained in an attempt to eliminate any slow data-transfers, which result from a single defective data-sector on a cylinder. Subsequently, all factory defective data-sectors will be inline-spared, but if a defective data-sector is found in the field, inline-sparing will not be performed on those sectors. Instead, the data-sector will be reallocated to an available spare-sector on a nearby cylinder, while its previous sector location is marked as being bad.

Additional embodiments of the present invention, as illustrated in FIGS. 118, 119, 120 and 121, defines chip configurations for a "Bottom Data-Surface a dedicated multichannel microhead-array chip bus-system Phase-Change Microhead Array Chip", and a "Top Data-Surface dedicated multichannel microhead-array chip bus-system Phase-Change Microhead Array Chip". Wherein, each dedicated multichannel microhead-array chip bus-system Phase-Change Microhead Array Chip has a different surface mounting circuit-contact pin-out arrangement. FIG. 118 illustrates a Bottom Data-Surface Phase-Change Microhead Array Chip's circuit-contact pin-out arrangements, while FIG. 119 illustrates a Top Data-Surface Phase-Change Microhead Array Chip's circuit-contact pin-out arrangements. FIGS. 120 and 121 illustrate signal configurations and directions for a 'Bottom Data-Surface Phase-Change Microhead Array Chip', and a 'Top Data-Surface Phase-Change Microhead Array Chip'. While, FIGS. 122 and 123 illustrate flex cable configurations. FIGS. 118, 119, 120, 121, 122, and 123, while displaying connectivity, also explain why their needs to be two different dedicated multichannel microhead-array chip bus-system Phase-Change Microhead Array Chip circuit-contact pin-out arrangements.

Moreover, when a Bottom Data-Surface (FIGS. 113, 116, 118, and 120) dedicated multichannel microhead-array chip bus-system Phase-Change Microhead Array Chip 4 (FIGS. 113, and 114) is used in a dedicated multichannel microhead-array chip bus-system Phase-Change Microhead Array Chip Hard Disk Drive it is installed into a chip-positioning circuit board with its laser-diode microhead-array facing upward toward the observer, if the observer is looking down into a plan view of the chip through the Cartesian Y-axis.

Moreover, when installed, a Bottom Data-Surface dedicated multichannel microhead-array chip bus-system Phase-Change Microhead Array Chip's 6 (FIGS. 113, 118, and 120) pin-one designation dot should be located in the upper-left hand corner of the before mentioned dedicated multichannel microhead-array chip bus-system Phase-Change Microhead Array Chip's outer-package. Alternatively, when a Top Data-Surface (FIGS. 117, 119, and 121) dedicated multichannel microhead-array chip bus-system Phase-Change Microhead Array Chip 4 (FIGS. 113, and 114) is used in a dedicated multichannel microhead-array chip bus-system Phase-Change Microhead Array Chip Hard Disk Drive it is installed into a chip-positioning circuit board with its laser-diode microhead-array facing downward away from an observer, if the observer is looking down into a plan view of the chip through the Cartesian Y-axis.

Moreover, when installed, a Top Data-Surface dedicated multichannel microhead-array chip bus-system Phase-Change Microhead Array Chip's (FIGS. 119 and 121) pin-one designation dot should also be located in the upper-left hand corner of the before mentioned dedicated multichannel microhead-array chip bus-system Phase-Change Microhead Array Chip's outer-package.

Furthermore, when Phase-Change Microhead Array Chips are installed into their chip-positioning circuit boards, and their chip-positioning circuit boards are installed into a dedicated multichannel microhead-array chip bus-system Phase-Change Microhead Array Chip Hard Disk Drive's casting-base, there will ultimately be one Phase-Change Microhead Array Chip that is positioned for and facing each data-surface of every disk-platter installed into a dedicated multichannel microhead-array chip bus-system Phase-Change Microhead Array Chip Hard Disk Drive's unit-assembly (FIG. 112).

Moreover, the arrangement described above is how both dedicated multichannel microhead-array chip bus-system Phase-Change Microhead Array Chip designs will align with each other when installed and connected into a dedicated multichannel microhead-array chip bus-system Phase-Change Microhead Array Chip Hard Disk Drive's unit-assembly (FIG. 112) and bus-system. When installed into a dedicated multichannel microhead-array chip bus-system Phase-Change Microhead Array Chip Hard Disk Drive's unit-assembly, there should be at-least two laser-diode microhead-arrays facing each other (FIGS. 9 and 10) with at-least one disk-platter 13 (FIGS. 113, 114, and 115) positioned between them, as if each installed dedicated multichannel microhead-array chip bus-system Phase-Change Microhead Array Chip were looking at a reflection of itself in a mirror.

Additional embodiments of the present invention, as illustrated in FIGS. 113 through 141, shows Polymer flex-cable connectors 67 (FIGS. 113, 114, and 115) and their associated Polymer flex-cables 126, 127 (FIGS. 113, 114, and 115), which are located, when looking down into a plan view illustration of a dedicated multichannel microhead-array chip bus-system Phase-Change Microhead Array Chip Hard Disk Drive's unit-assembly (FIG. 112), on both the right-hand side and left-hand side of the dedicated multichannel microhead-array chip bus-system Phase-Change Microhead Array Chip Hard Disk Drive's chip-positioning circuit boards. Wherein, the Polymer flex-cable connectors 67 and Polymer flex-cables 126, 127 if installed on the right-hand side of a dedicated multichannel microhead-array chip bus-system Phase-Change Microhead Array Chip Hard Disk Drive's unit-assembly (FIG. 112) are dedicated to the Power, the Ground, the Data I/O, and the Control bus-systems that are used in a dedicated multichannel microhead-array chip bus-system Phase-Change Microhead Array Chip Hard Disk Drive.

Furthermore, the previously mentioned Polymer flex-cables 126, 127 (FIGS. 113, 114, and 115) and their associated Polymer flex-cable connectors 67 (FIGS. 113, 114, and 115), which are located on the right-hand side of a dedicated multichannel microhead-array chip bus-system Phase-Change Microhead Array Chip Hard Disk Drive's unit-assembly (FIG. 112), create multiple circuit connections between chip-connecting contact-points that are located on the right-hand side of installed dedicated multichannel microhead-array chip bus-system Phase-Change Microhead Array Chips 4 (FIG. 113), and a Disk Controller's (PCB) "Printed Circuit Board" 53 (FIGS. 113, 114, and 115). The Disk Controller PCB 53 used in dedicated multichannel microhead-array chip bus-system Phase-Change Microhead Array Chip Hard Disk Drives is located underneath a dedicated multichannel microhead-array chip bus-system Phase-Change Microhead Array Chip Hard Disk Drive's Spindle-Motor unit-assembly 59 (FIGS. 113, 114, and 115) at the bottom of a dedicated multichannel microhead-array chip bus-system Phase-Change Microhead Array Chip Hard Disk Drive's casting-base 12 (FIGS. 113, 114, and 115).

However, if the Polymer flex-cable connectors 67 (FIGS. 113, 114, and 115), and their associated Polymer flex-cables 126, 127 (FIGS. 113, 114, and 115) are installed on the left-hand side of a dedicated multichannel microhead-array chip bus-system Phase-Change Microhead Array Chip Hard Disk Drive's unit-assembly (FIG. 112), they are dedicated to the 32-bit Microhead-Addressing bus-systems of the dedicated multichannel microhead-array chip bus-system Phase-Change Microhead Array Chip Hard Disk Drive.

Furthermore, the before mentioned Polymer flex-cables 126, 127 (FIGS. 113, 114, and 115), and their Polymer flex-cable connectors 67 (FIGS. 113, 114, and 115), which are located on the left-hand side of a dedicated multichannel microhead-array chip bus-system Phase-Change Microhead Array Chip Hard Disk Drive's unit-assembly (FIG. 112), create multiple circuit connections between the chip-connecting contact-points that are located on the left-hand side of installed Phase-Change Microhead Array Chips 4 (FIGS. 113, 114, and 115), and a Disk Controller's (PCB) "Printed Circuit Board" 53.

Moreover, the Disk Controller PCB 53 used in a dedicated multichannel microhead-array chip bus-system Phase-Change Microhead Array Chip Hard Disk Drive is located underneath a dedicated multichannel microhead-array chip bus-system Phase-Change Microhead Array Chip Hard Disk Drive's Spindle-Motor unit-assembly 59 at the bottom of a dedicated multichannel microhead-array chip bus-system Phase-Change Microhead Array Chip Hard Disk Drive's casting-base 12 (FIGS. 113, 114, and 115).

Additional embodiments of the present invention, as illustrated in FIGS. 113 through 141, shows a "Chip Placement Key" 11 (FIGS. 26 and 27), which is located on the outer-package bottom-surface areas of dedicated multichannel microhead-array chip bus-system Phase-Change Microhead Array Chips. The previously mentioned "Chip Placement Key" 11 (FIGS. 26 and 27), which is shaped like a triangle, is installed it will have its triangle-apex facing toward the front of its outer-package's top-edge surface, while facing a dedicated multichannel microhead-array chip bus-system Phase-Change Microhead Array Chip Hard Disk Drive's front-end.

In addition, the "Chip Placement Keys" 11 used in dedicated multichannel microhead-array chip bus-system Phase-Change Microhead Array Chips protrude about "$\frac{1}{16}$" of one inch out from underneath the bottom-center surface of a Chip's outer-package 11 (FIGS. 26 and 27). Furthermore, the sidewalls of the before mentioned "Chip Placement Keys" form "90" degree angles from the bottom-surface of its outer-package. Additionally, the triangular-shaped "Chip Placement Keys" 11 (FIGS. 26 and 27) will also have a corresponding and triangular-shaped "Chip Placement Keyhole" 92 (FIGS. 30, 32, 35, and 37). The previously mentioned "Chip Placement Keyholes" 92 are located at the top-surface of the bottom-inside center mounting-plane of every chip-positioning circuit board's surface-mounted chip-socket.

In addition, the previously mentioned "Chip Placement Keyholes" 92 are also triangle-shaped and have a machined-out recess that measures "$\frac{1}{16}$" of one-inch from the top-surface of the bottom-inside center mounting-plane of every chip-positioning circuit board's surface-mounted chip-socket 5 (FIGS. 113, 114, and 115). The sidewalls of the Chip Placement Keyholes 92 (FIGS. 30, 32, 35, and 37) will form 270° angles from the exposed bottom-center top-surface of every chip-positioning circuit board's surface-mounted chip-socket. The manufacturing and machining dimensions for the "Chip Placement Keys" 11 (FIGS. 26 and 27) and "Chip Placement Keyholes" 92 (FIGS. 30, 32, 35, and 37) are critical and must adhere to a tolerance that is plus or minus "$\frac{1}{1000}$" of one-inch. The previously mentioned dimensional tolerance used for the "Chip Placement Keys" and "Chip Placement Keyholes" is necessary to insure an accurate, a secure, and a non-compromizable placement of dedicated multichannel microhead-array chip bus-system Phase-Change Microhead Array Chips into surface-mounted chip-sockets of installed chip-positioning circuit boards 27 (FIGS. 113, 114, and 115).

Furthermore, the installation of the dedicated multichannel microhead-array chip bus-system Phase-Change Microhead Array Chips into their chip-positioning circuit board's surface-mounted chip-sockets is done using two chip-mounting threaded hex-screws 2 (FIG. 113). The two chip-mounting hex-screws 2 thread into a surface-mounted chip-socket's two hex-screw holes 92 (FIGS. 30, 32, 35, and 37). This will completely seat and secure the dedicated multichannel microhead-array chip bus-system Phase-Change Microhead Array Chips into their surface-mounted chip-socket's inside-bottom chip mounting surface 92 (FIGS. 30, 32, 35, and 37).

In addition, the removal or displacement of a dedicated multichannel microhead-array chip bus-system Phase-Change Microhead Array Chip after its installation into a chip-positioning circuit board's surface-mounted chip-socket should only need to occur if a dedicated multichannel microhead-array chip bus-system Phase-Change Microhead Array Chip has failed. A failed dedicated multichannel microhead-array chip bus-system Phase-Change Microhead Array Chip would then need to be removed and replaced with a new and fully functioning Chip.

Additional embodiments of the present invention, as illustrated in FIGS. 113 through 141, shows a dedicated multichannel microhead-array chip bus-system Phase-Change Microhead Array Chip's sixty-four circuit connecting contacts, which are physically embedded into the bottom-surface of every a dedicated multichannel microhead-array chip bus-system Phase-Change Microhead Array Chip's outer-package. For every dedicated multichannel microhead-array chip bus-system Phase-Change Microhead Array Chip's sixty-four embedded circuit connecting contacts there is a matching set of sixty-four circuit connecting contacts, which are physically embedded into the top-surface of the bottom-inside center mounting-plane of every chip-positioning circuit board's surface-mounted chip-socket 5 (FIGS. 113, 114, and 115).

Moreover, when viewing a dedicated multichannel microhead-array chip bus-system Phase-Change Microhead Array Chip in plan-view, where the location of a dedicated multichannel microhead-array chip bus-system Phase-Change Microhead Array Chip's pin-one designation dot can be clearly seen 6 (FIG. 113). The pin-one designation dot of a plan-viewed dedicated multichannel microhead-array chip bus-system Phase-Change Microhead Array Chip indicates that it is either a "Top Data-Surface dedicated multichannel microhead-array chip bus-system Phase-Change Microhead Array Chip" or a "Bottom Data-Surface dedicated multichannel microhead-array chip bus-system Phase-Change Microbead Array Chip".

Therefore, the pin-one designation dot of a plan-viewed Phase-Change Microhead Array Chip, also indicates, by way of reference, the locations, the names, and the number-designations of the plan-viewed dedicated multichannel microhead-array chip bus-system Phase-Change Microhead Array Chip's sixty-four embedded circuit-connecting contacts, as illustrated in FIGS. 118 and 119.

Moreover, when viewing a dedicated multichannel microhead-array chip bus-system Phase-Change Microhead Array Chip with its microheads facing upward in a portrait plan-view position, its pin-one designation dot will be located in the upper left-hand corner of its outer-package, which indicates that it is an installed "Bottom Data-Surface dedicated multichannel microhead-array chip bus-system Phase-Change Microhead Array Chip" (FIG. 118). When viewing a dedicated multichannel microhead-array chip bus-system Phase-Change Microhead Array Chip with its microheads facing downward in a portrait plan-view position, its pin-one designation dot will also be located in the upper left-hand corner of its outer-package, which indicates that it is an installed "Top Data-Surface dedicated multichannel microhead-array chip bus-system Phase-Change Microhead Array Chip" (FIG. 119).

However, when viewing a dedicated multichannel microhead-array chip bus-system Phase-Change Microhead Array Chip with its microheads facing upward in a portrait plan-view position, while its pin-one designation dot is located in the upper left-hand corner of its outer-package, could also indicate that this is an un-installed "Bottom Data-Surface dedicated multichannel microhead-array chip bus-system Phase-Change Microhead Array Chip" (FIGS. 118 and 120). Additionally, when viewing a dedicated multichannel microhead-array chip bus-system Phase-Change Microhead Array Chip with its microheads again facing upward in a portrait plan-view position, while its pin-one designation dot is located in the upper right-hand corner of its outer-package, this would indicate that this is an un-installed "Top Data-Surface dedicated multichannel microhead-array chip bus-system Phase-Change Microhead Array Chip" (FIGS. 119 and 121).

Furthermore, the plan-viewed and un-installed version of a "Bottom Data-Surface dedicated multichannel microhead-array chip bus-system Phase-Change Microhead Array Chip" has its 32-bit Microhead-Addressing bus-circuit's connecting input-contacts (FIG. 118) located on the left-hand side of its outer-package's bottom-surface. The thirty-two Microhead-Addressing and bus-circuit connecting input-contacts are presented as two groups of sixteen input-contacts. Group number-one will contain input-contacts zero to sixteen, while a group number-two contains input-contacts seventeen to thirty-one. The two groups of sixteen circuit-connecting input-contacts are physically separated from each other by a dedicated multichannel microhead-array chip bus-system Phase-Change Microhead Array Chip's chip installing hex-screws 2 (FIG. 113) and hex-screw holes 3 (FIG. 113). When logically combined, the previously mentioned two groups of sixteen circuit-connecting input-contacts complete a 32-bit Microhead-Addressing bus-system's contact configuration.

Furthermore, the before mentioned plan-viewed and un-installed "Bottom Data-Surface dedicated multichannel microhead-array chip bus-system Phase-Change Microhead Array Chip" has its control and data I/O bus-circuit's connecting contacts (FIG. 118) located on the right-hand side of its outerpackage's bottom-surface. The thirty-two control and data I/O bus-circuit connecting contacts are presented as two groups of sixteen contacts. Group number one will contain contacts thirty-two to forty-eight, while group number two contains contacts forty-nine to sixty-four. The two groups of sixteen circuit-connecting contacts are physically separated from each other by a dedicated multichannel microhead-array chip bus-system Phase-Change Microhead Array Chip's installation hex-screw 2 (FIG. 113) and hex-screw hole 3 (FIG. 113). When logically combined, the previously mentioned two groups of sixteen circuit-connecting contacts complete a control and data I/O bus-system's contact configuration.

Furthermore, the before mentioned plan-viewed and un-installed "Top Data-Surface dedicated multichannel microhead-array chip bus-system Phase-Change Microhead Array Chip" has its 32-bit Microhead-Addressing bus-circuit's connecting input-contacts (FIG. 119) located on the right-hand side of its outer-package's bottom-surface. The thirty-two Microhead-Addressing bus-circuit-connecting input-contacts are presented as two groups of sixteen input-contacts. Group number one will contain input-contacts zero to sixteen, while group number two contains input-contacts seventeen to thirty-one. The previously mentioned two groups of sixteen circuit-connecting input-contacts are physically separated from each other by a dedicated multichannel microhead-array chip bus-system Phase-Change Microhead Array Chip's installation hex-screw 2 (FIG. 113) and hex-screw hole 3 (FIG. 113). When logically combined, the previously mentioned two groups of sixteen circuit-connecting input-contacts complete a 32-bit Microhead-Addressing bus-system's contact configuration.

Furthermore, the plan-viewed and un-installed "Top Data-Surface Phase-Change Microhead Array Chip" has its control and data I/O bus-circuit's connecting contacts (FIG. 119) located on the left-hand side of its outer-package's bottom-surface. The thirty-two control and data I/O bus-circuit connecting contacts are presented as two groups of sixteen contacts. Group number one will contain contacts thirty-two to forty-eight, while group number two contains contacts forty-nine to sixty-four. The previously mentioned two groups of sixteen circuit-connecting contacts are physically separated from each other by a Phase-Change Microhead Array Chip's installation hex-screw 2 (FIG. 113) and hex-screw hole 3 (FIG. 113). When logically combined, the previously mentioned two groups of sixteen circuit-connecting contacts complete a control and data I/O bus-system's contact configuration.

In addition, a plan-viewed and installed "Bottom Data-Surface Phase-Change Microhead Array Chip" will have its pin-one designation dot located in the upper left-hand corner of its outer-package 6 (FIG. 113). While, a plan-viewed and installed "Bottom Data-Surface Phase-Change Microhead Array Chip" (FIG. 113) has its 32-bit addressing bus-circuit's connecting input-contacts (FIG. 118) located on the left-hand side of its outer-package's bottom-surface.

Additionally, the plan-viewed and installed "Bottom Data-Surface Phase-Change Microhead Array Chip" (FIG. 118) has its input-contacts one to thirty-two dedicated to its 32-bit addressing bus-circuit. An installed "Bottom Data-Surface Phase-Change Microhead Array Chip" connects its 32-bit addressing bus-circuit to a Phase-Change Microhead Array Chip Hard Disk Drive's Disk Controller and its dedicated multichannel microhead-array chip bus-system, through the circuit connection-contacts "A0" thru "A31" of installed surface-mounted chip-sockets.

Furthermore, the plan-viewed and installed "Bottom Data-Surface Phase-Change Microhead Array Chip" will have its pin-one designation dot located in the upper left-hand corner of a Phase-Change Microhead Array Chip's outer-package 6 (FIG. 113). A plan-viewed and installed "Bottom Data-Surface Phase-Change Microhead Array Chip" has its control and data I/O bus-circuit's connecting-contacts (FIG. 118) located on the right-hand side of its outer-package's bottom-surface.

In addition, a plan-viewed and installed "Bottom Data-Surface Phase-Change Microhead Array Chip" has contacts thirty-three to sixty-four (FIGS. 118 and 120) dedicated to its "Output Enable" (OE) input-contact, its "Latch Enable" (LE) input-contact, its "Data Output Track Number" (DOTN) output-contact, its "Future" (FUT) input-contact, its "VDD" (+5V) input-contact, its "VSS" (GND) output-contact, its (LSN) "Laser Signal Number" input-contact, a second "VDD" (+5V) input-contact, and its "Variable" (VAR) voltage input-contact.

Moreover, the plan-viewed and installed "Bottom Data-Surface Phase-Change Microhead Array Chip" (FIGS. 118 and 120) has contact number thirty-three dedicated to its "Output Enable" (OE) input-contact, as illustrated in FIG. 118. A plan-viewed and installed "Bottom Data-Surface Phase-Change Microhead Array Chip" (FIGS. 118 and 120) has contact number thirty-four dedicated to its "Latch Enable" (LE) input-contact, as illustrated in FIG. 118. A plan-viewed and installed "Bottom Data-Surface Phase-Change Microhead Array Chip" (FIGS. 118 and 120) has contacts thirty-five through forty-three dedicated to its "Data Output Track Number" (DOTN) output-contacts, as illustrated in FIG. 118.

In addition, a plan-viewed and installed "Bottom Data-Surface Phase-Change Microhead Array Chip" (FIGS. 118 and 120) has contacts forty-four through fifty dedicated to its "Future" (FUT) alternatively called the "to be determined or reserved for future contacts", as illustrated in FIG. 118. A plan-viewed and installed "Bottom Data-Surface Phase-Change Microhead Array Chip" (FIGS. 118 and 120) has contact fifty-one dedicated to its first "VDD" (+5V) input-contact, as illustrated in FIG. 118. A plan-viewed and installed "Bottom Data-Surface Phase-Change Microhead Array Chip" (FIGS. 118 and 120) has contact number fifty-two dedicated to its first "VSS" (GND) ground output-contact, as illustrated in FIG. 118. A plan-viewed and installed "Bottom Data-Surface Phase-Change Microhead Array Chip" (FIGS. 118 and 120) has contacts fifty-three through sixty-one dedicated to its "Laser Signal Number" (LSN) input-contacts, as illustrated in FIG. 118. A plan-viewed and installed "Bottom Data-Surface Phase-Change Microhead Array Chip" (FIGS. 118 and 120) has contact sixty-two dedicated to its second "VSS" (GND) ground output-contact, as illustrated in FIG. 118. A plan-viewed and installed "Bottom Data-Surface Phase-Change Microhead Array Chip" (FIGS. 118 and 120) has contact sixty-three dedicated to its second (+5V) "VDD" input-contact, as illustrated in FIG. 118. Additionally, a plan-viewed and installed "Bottom Data-Surface Phase-Change Microhead Array Chip" (FIGS. 118 and 120) has contact sixty-four dedicated to its "Variable" (VAR) channel selecting voltage input-contact, as illustrated in FIG. 118.

In conclusion, an installed "Bottom Data-Surface Phase-Change Microhead Array Chip" connects its control and data I/O bus-circuits to a Phase-Change Microhead Array Chip Hard Disk Drive's Disk Controller and its bus-systems through the connection-contacts of surface-mounted chip-sockets, as they were previously numbered and named and illustrated in FIG. 118. Additionally, the 'Signal-Flow' (i.e., sometimes called an in-put/out-put logic-flow configuration) for an un-installed "Bottom Data-Surface Phase-Change Microhead Array Chip" is illustrated in FIG. 120.

In addition, a plan-viewed and installed "Top Data-Surface Phase-Change Microhead Array Chip" has its pin-one designation dot orientated in the upper left-hand corner of its outer-package 6 (FIG. 113). Wherein, a plan-viewed and installed "Top Data-Surface Phase-Change Microhead Array Chip" (FIGS. 119 and 121) has its 32-bit Microhead-Addressing bus-circuit's connecting input-contacts located on the left-hand side of its outer-package's bottom-surface.

Moreover, the plan-viewed and installed "Top Data-Surface Phase-Change Microhead Array Chip" (FIG. 119) has its input-contacts one to thirty-two dedicated to its 32-bit addressing bus-circuit. An installed "Top Data-Surface Phase-Change Microhead Array Chip" connects its 32-bit addressing bus-circuit to a Phase-Change Microhead Array Chip Hard Disk Drive's Disk Controller and its dedicated multichannel microhead-array chip bus-system, through its surface-mounted chip-socket's "A0" to "A31" circuit connection-contacts.

Furthermore, the plan-viewed and installed "Top Data-Surface Phase-Change Microhead Array Chip" has its pin-one designation dot orientated in the upper left-hand corner of its outer-package 6 (FIG. 113). Wherein, a plan-viewed and installed "Top Data-Surface Phase-Change Microhead Array Chip" has its control and data I/O bus-circuit's connecting-contacts (FIG. 119) located on the right-hand side of its outer-package's bottom-surface.

In addition, a plan-viewed and installed "Top Data-Surface Phase-Change Microhead Array Chip" has contacts thirty-three to sixty-four (FIGS. 118 and 120) dedicated to its "Output Enable" (OE) input-contact, its "Latch Enable" (LE) input-contact, its "Data Output Track Number" (DOTN) output-contact, its "Future" (FUT) input-contact, its "VDD" (+5V) input-contact, its "VSS" (GND) output-contact, its "Laser Signal Number" (LSN) input-contact, a second (+5V) "VDD" input-contact, and its "Variable" (VAR) voltage input-contact.

Moreover, the plan-viewed and installed "Top Data-Surface Phase-Change Microhead Array Chip" (FIGS. 119 and 121) has contact number thirty-three dedicated to its "Output Enable" (OE) input-contact, as illustrated in FIG. 119. A plan-viewed and installed "Top Data-Surface Phase-Change Microhead Array Chip" (FIGS. 119 and 121) has contact thirty-four dedicated to its "Latch Enable" (LE) input-contact, as illustrated in FIG. 119. A plan-viewed and installed "Top Data-Surface dedicated multichannel microhead-array chip bus-system Phase-Change Microhead Array Chip" (FIGS. 119 and 121) has contacts thirty-five through forty-three dedicated to its (DOTN) "Data Output Track Number" output-contacts, as illustrated in FIG. 119.

In addition, a plan-viewed and installed "Top Data-Surface Phase-Change Microhead Array Chip" (FIGS. 119 and 121) has contacts forty-four through fifty dedicated to its (FUT) "Future" alternatively called the "to be determined or reserved for future contacts", as illustrated in FIG. 119. A plan-viewed and installed "Top Data-Surface dedicated multichannel microhead-array chip bus-system Phase-Change Microhead Array Chip" (FIGS. 119 and 121) has contact number fifty-one dedicated to its first (+5V) "VDD" input-contact, as illustrated in FIG. 119. A plan-viewed and installed "Top Data-Surface Phase-Change Microhead Array Chip" (FIGS. 119 and 121) has contact fifty-two dedicated to its first (GND) "VSS" ground output-contact, as illustrated in FIG. 119. A plan-viewed and installed "Top Data-Surface Phase-Change Microhead Array Chip" (FIGS. 119 and 121) has contacts fifty-three through sixty-one dedicated to its "Laser Signal Number" (LSN) input-contacts, as illustrated in FIG. 119. A plan-viewed and installed "Top Data-Surface Phase-Change Microhead Array Chip" (FIGS. 119 and 121) has contacts sixty-two dedicated to its second (GND) "VSS" ground output-contact, as illustrated in FIG. 119. A plan-viewed and installed "Top Bottom Data-Surface Phase-Change Microhead Array Chip" (FIGS. 119 and 121) has contact sixty-three dedicated to its second (+5V) "VDD" input-contact, as illustrated in FIG. 119. Additionally, as illustrated in FIG. 119, a plan-viewed and installed "Top Data-Surface Phase-Change Microhead Array Chip" (FIGS. 119 and 121) has contact sixty-four dedicated to its "Variable" (VAR) channel selecting voltage input-contacts.

In conclusion, an installed "Top Data-Surface Phase-Change Microhead Array Chip" connects its control and data I/O bus-circuits to a Phase-Change Microhead Array Chip Hard Disk Drive's Disk Controller and its bus-systems through the connection-contacts of surface-mounted chip-sockets, as they were previously numbered, named, and illustrated in FIG. 119. Additionally, the 'Signal-Flow' (i.e., sometimes called an in-put/out-put logic-flow configuration) for an un-installed "Top Data-Surface Phase-Change Microhead Array Chip" is illustrated in FIG. 121.

Additional embodiments of the present invention, as illustrated in FIGS. 113 through 141, shows a dedicated multichannel microhead-array chip bus-system Phase-Change Microhead Array Chip's internal core and microhead structures, which are located within every dedicated multichannel microhead-array chip bus-system Phase-Change Microhead Array Chip and comprises a microhead-array containing a multitude of microheads, each comprising a laser-diode or (VCSEL) "Vertical Cavity Surface Emitting Laser" device 1 (FIGS. 113, 114, and 115), a reversed-biased "Semiconductor PhotoConductor" (SPC) photo-sensing "Cadmium Sulfide" (CdS) based semiconductor device, or as an alternative embodiment, a reversed-biased "Semiconductor Photo-Diode" (SPD) photocell, or "Charged Coupled Device" (CCD) semiconductor based photo-detector 191 (FIGS. 120 and 121).

Furthermore, the laser-diode microhead-arrays used in the dedicated multichannel microhead-array chip bus-system Phase-Change Microhead Array Chips are typically forward-biased, microscopic, and alloy-doped double-heterojunction semiconductor diode plus mirror structures. The laser-diodes or VCSELs are typically built-up layer-upon-layer from a single semiconductor substrate, using well-known manufacturing processes like MBE, MOVPE, MOCVD, or some other equivalent epitaxial deposition of material. While, a dedicated multichannel microhead-array chip bus-system Phase-Change Microhead Array Chip's support and signal circuitry is fully integrated and constructed either from the same extrinsic semiconductor material used to construct the diodes used to form laser-diodes or VCSELs (e.g., Gallium-Arsenide or Gallium-Nitride) or constructed using "Silicon On Insulator" (SOI) based technologies, like CMOS on Sapphire. As illustrated in FIG. 124, the previously mentioned support and signal circuitry will comprise a Microhead Addressing Unit 131, a Microhead-array 132, a Track-Channel "Analog to Digital Conversion" (ADC) Array 135, a "Driver" Array (DVR) 134, an array of "Microhead Selection Line Number" (MSLN) "Voltage Detector Array Number" (VDAN) 133. The previously mentioned integrated circuits are typically masked, lithographed, etched, and built-up from the same semiconductor substrate (i.e., insulator) as the previously mentioned laser-diode microhead-arrays.

Moreover, the extrinsic semiconductor materials used in constructing laser-diodes and VCSELs have crystalline lattice structures that are incompatible to the lattice structures of Silicon and Silicon-Oxide substrates and therefore, will not grow epitaxially upon CMOS based substrates. However, by using a well-known insulator material like Sapphire as the substrate material, full integration of CMOS based Silicon-Oxide circuits and Gallium-Arsenide or Gallium-Nitride laser-diodes VCSELs is possible. The construction of a CMOS/laser-diode or CMOS/VCSEL hybrid is therefore accomplished using a well-known SOI manufacturing process.

Moreover, the support circuitry and photo-detectors of a dedicated multichannel microhead-array chip bus-system Phase-Change Microhead Array Chip are constructed first before its support circuitry. Wherein, the previously mentioned insulator substrate material (e.g., a 100-μm of Sapphire) is covered with a thin layer of Silicon using a high-temperature method of epitaxial deposition. Next, the previously mentioned layer of Silicon is selectively oxidized and covered with a photo-resistant oxide material. Next, the wafer, covered with photo-resistant oxide material is exposed to ultraviolet-light using an ultraviolet-light blocking mask, which causes the oxide-areas of the wafer not masked to undergo a photochemical change. Wherein, the photo-chemically-changed areas of the wafer not masked are then developed to expose an underlying 'Silicon-Oxide' layer beneath the photo-resist oxide material. Further, the newly exposed layers of 'Silicon-Oxide' are next chemically removed or etched-out, leaving empty uncovered areas in the wafer's surface. These empty uncovered areas in the wafer's surface can later be filled-in with various alloys or doped semi-conducting and/or conducting materials using well-known metalising deposition processes creating therein, submicron CMOS based control and signal circuitry.

Moreover, the laser-diodes or VCSEL microheads of a Phase-Change Microhead Array Chip are constructed using an epitaxial process like "Molecular Beam Epitaxy" (MBE), "Metal-Organic Vapor-Phase Epitaxy" (MOVPE), and/or "Metal-Organic Chemical Vapor Deposition" (MOCVD) to deposit multiple layers of Gallium based material upon a properly prepared substrate-wafer of Gallium-Arsenide, or as an alternative embodiment, have the previously mentioned Gallium based material epitaxially deposited upon insulator (e.g., Sapphire, which is sometimes called Corundum, having a chemical formula $Al_2O_3$) wafer. Further, after Gallium-Arsenide is epitaxially deposited upon an insulator based substrate wafer it can be made to undergo recrystallization via annealing processes. Next, the previously mentioned layers of Gallium based semiconductor materials are shaped, using various etching and lithography techniques, into the laser-diodes or VCSELs used in a dedicated multichannel microhead-array chip bus-system Phase-Change Microhead Array Chip as a light source(s).

Furthermore, deposited between the laser-diode microhead-arrays and CMOS based support circuitry are layers of non-conducting epitaxially deposited 'Silicon-Oxide' material, which moreover is used as a fill-in and insulating material for the non-conducting and iso-insulation areas present around every laser-diode or VCSEL structure built within a dedicated multichannel microhead-array chip bus-system Phase-Change Microhead Array Chip's structure. The previously mentioned non-conducting 'Silicon-Oxide' insulating structures are epitaxially constructed, layer-upon-layer, just like the other semi-conducting circuit structures used within every a dedicated multichannel microhead-array chip bus-system Phase-Change Microhead Array Chip.

Figure 59:
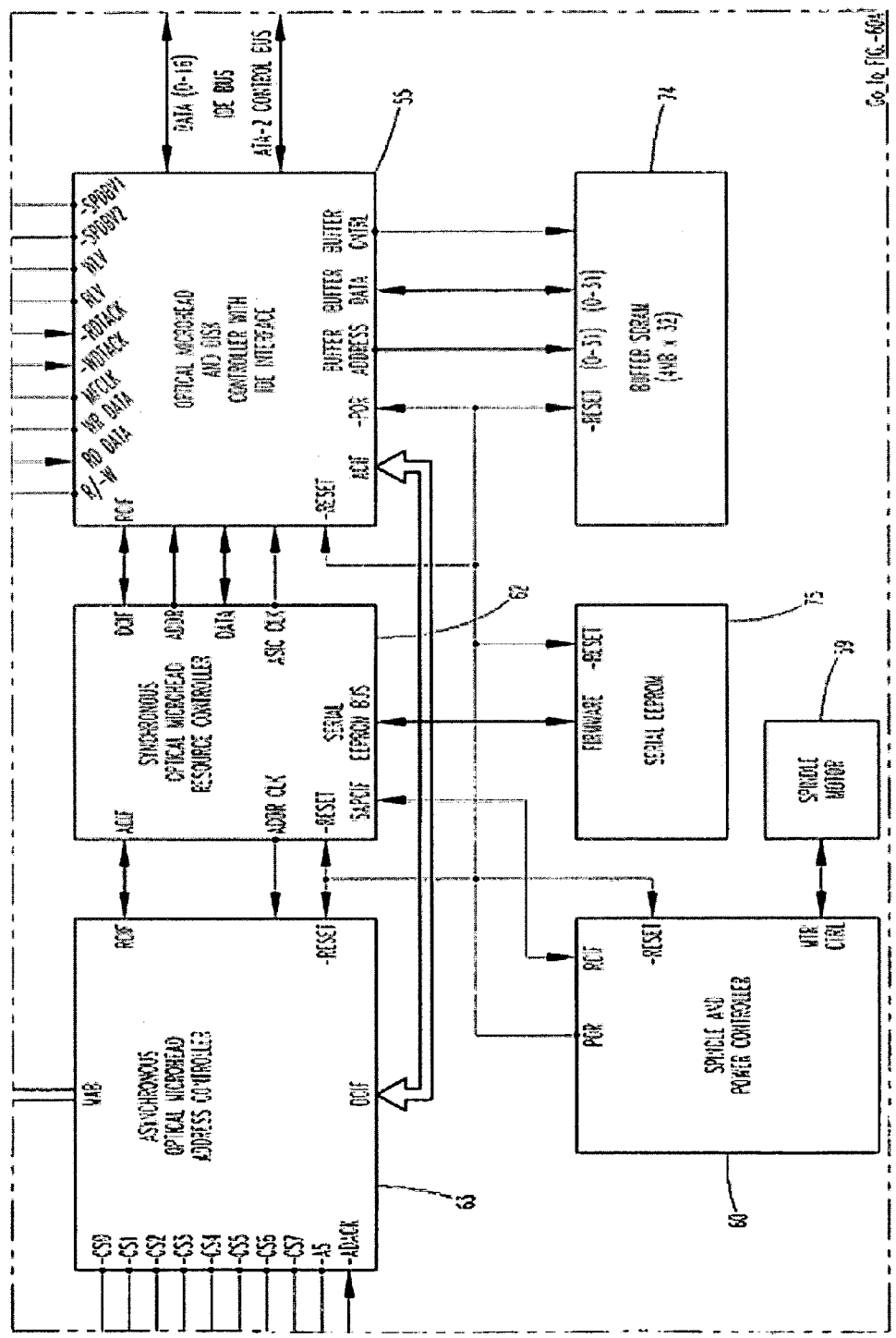
FIG. 59 is an enlarged block-diagram drawing of the ATA-2 IDE Disk Controller used in the Phase-Change Microhead Array Chip Hard Disk Drive design, which displays an enlarged block-diagram showing details of the block-diagram illustrated in FIG. 60A.

Additional embodiments of the present invention, as illustrated in FIGS. 58 and 59, defines a ultra-violet VCSEL design, which is presented as an example of existing prior art technology that utilizes 'electron/hole' recombination (i.e., injection) to produce a blue-green to ultra-violet laser-diode or VCSEL laser with a wavelength range of 435- to 350-nm. Illustrated in FIG. 58 is a section drawing of a double heterojunction ultra-violet VCSEL laser-diode that displays the different semiconductor layers used to comprise the double hetero-junction ultra-violet VCSEL laser-diode, these layers are built up epitaxially via "Molecular Beam Epitaxy" (MBE), "Metal-Organic Vapor-Phase Epitaxy" (MOVPE), and/or "Metal-Organic Chemical Vapor Deposition" (MOCVD). Further, the double hetero-junction ultra-violet VCSEL laser-diode has a mesa etched structure, which comprises a metallic supporting substrate that is also used as a back-reflecting mirror, while providing a base-structure and substrate for the epitaxial growth of the VCSELs' 107 (FIGS. 55, 56, and 58) subsequent layers. Typically, this base-structure is conductive and therefore, as an alternative embodiment, if constructed from a "Nickel-Aluminum" (NiAl) alloy-mixture, serves as a VCSEL's anode configured electrode. Further, NiAl also has the advantage of having between an eight to twelve percent lattice mismatch, and more specifically a ten percent lattice mismatch to "Gallium-Nitride" (GaN) the VCSEL's principle construction material. Nevertheless, "Nickel-Aluminum" (NiAl) is the preferred alloy-mixture for this kind of base structure, while having a surface roughness of less than 15-atoms thick, the "Nickel-Aluminum" (Ni—Al) alloy-mixture, also displays a highly reflective property, as well. Further, as illustrated in FIG. 58, what is also needed for constructing double hetero-junction ultra-violet VCSEL laser-diodes is a multi-layered epitaxial growth of "Aluminum-Nitride" (AlN), while each AlN layer is only a few atoms thick, a multitude of AlN layers can be readily utilized as a buffer layer 123 (FIGS. 55, 56, and 58) for facilitating the epitaxial-growth of subsequent layers that will eventually comprise the VCSEL's and/or VCSEL based microhead-array's completed structure(s).

In addition, a first Distributed Bragg reflector 126 (FIGS. 55, 56, 58, and 59), which is epitaxially grown onto the previously mentioned multi-layered buffer 123 (FIGS. 55, 56, 58, and 59), using any suitable epitaxial deposition method, such as "Molecular Beam Epitaxy" (MBE), "Metal-Organic Vapor-Phase Epitaxy" (MOVPE), and/or "Metal-Organic Chemical Vapor Deposition" (MOCVD). Further, a first Distributed Bragg reflector 126 (FIG. 58) is composed of alternating layers of n-doped "Gallium-Nitride" (GaN) 126A (FIG. 58) and n-doped "Aluminum-Gallium-Nitride" (AlGaN) 126B (FIG. 58). Thereby, making a mirror-pair, or one pair of mirror forming index opposing layers (e.g., AlGaN/GaN), or more precisely, two alternate layers of high refractive index, $n_H$, (e.g., Zinc-Sulfide has an $n_H$=2.3), and low refractive index, $n_L$, (e.g., Magnesium-Floride has an $n_L$=1.3) altogether are used to complete one 'mirror-pair'. However, if additional mirror-pairs are required, several more layers can be epitaxially deposited onto the last existing mirror-pair; thus, producing additional mirror-pairs. Wherein, the number of mirror-pairs displayed is five to ten mirror-pairs 126A, 126B (FIG. 58), 126C, 126D (FIG. 58), 126E, 126F (FIG. 58), 126G, 126H (FIG. 58), while the actual number of mirror-pairs could range from fifty to one hundred mirror-pairs, depending on the laser's emission wavelength.

In addition, the second Distributed Bragg reflector 124 (FIG. 58) is to be composed of alternating layers of "Aluminum-Oxide" ($Al_2O_3$) 124A (FIG. 58) and "Zinc-Oxide" (ZnO) 124B (FIG. 58); thereby, making a mirror-pair or one pair of refractive opposing reflectors ($Al_2O_3$/ZnO), or more precisely, two alternating layers that completes one 'mirror-pair'. However, if additional mirror-pairs are required, several more layers can be epitaxially deposited onto the last existing mirror-pair; thus, producing additional mirror-pairs. Wherein, the number of mirror-pairs displayed is five to ten mirror-pairs 124A, 124B (FIG. 58), 124C, 124D (FIG. 58), 124E, 124F (FIG. 58), 124G, 124H (FIG. 58), 124I, 114 (FIG. 58), while the actual number of mirror-pairs could range from twenty-five to fifty mirror-pairs, depending on the laser's emission wavelength. It should be understood that the thickness and doping level of every epitaxial layer must be precisely controlled. Therefore, any deviation from design parameters, no matter how slight, would affect a typical VCSEL's performance (i.e., frequency range and flux intensity).

Furthermore, to prevent the overcrowding of the cladding-regions, each is shown as a single layer 127A, 127C (FIG. 58). However, it should be understood that each cladding-region can also be made of more than one layer 127A, 127C (FIG. 58) with each cladding-region epitaxially deposited onto the previous cladding-region 127A (FIG. 58). Further, each cladding-region 127A, 127C (FIG. 58) is an epitaxially deposited layer composed of any suitable doped or un-doped material, such as n-doped and p-doped "Aluminum-Gallium-Nitride" (AlGaN). While, the active-region 127B (FIG. 58) of a VCSEL, represented here by a single layer that is epitaxially deposited onto the before mentioned first cladding-region 127A (FIG. 58). It should be understood, however, that the previously mentioned active-region 127B (FIG. 58) can also include one or more barriers and quantum-wells; particularly a first barrier and a second barrier with a quantum-well positioned between the previously mentioned first barrier layer and the previously mentioned second barrier layer, while the before mentioned active-region 127B (FIG. 58) is composed of "Indium-Gallium-Nitride" (InGaN) ternary semiconductor material. A second contact-layer 128 (FIG. 58), which is a layer constructed using highly p-doped "Gallium-Nitride" (GaN) a binary semiconductor material that is epitaxially grown onto a VCSEL's second cladding-region 127C (FIG. 58). Wherein, the previously mentioned second contact-layer provides connectivity to a VCSEL's p-metal contact 105 (FIG. 58).

In addition, the second distributed Bragg reflector 124 (FIG. 58) is to be composed of alternating layers of "Aluminum-Oxide" ($Al_2O_3$) 124A (FIG. 58) and "Zinc-Oxide" (ZnO) 124B (FIG. 58); thereby, making a mirror-pair or one pair of refractive opposing reflectors ($Al_2O_3$/ZnO), or more precisely, two alternating layers that completes one 'mirror-pair'. If additional mirror-pairs are required, several more layers can be epitaxially deposited onto the last existing mirror-pair; thus, producing additional mirror-pairs. Further, as illustrated the number of mirror-pairs displayed is five to ten mirror-pairs 124A, 124B (FIG. 58), 124C, 124D (FIG. 58), 124E, 124F (FIG. 58), 124G, 124H (FIG. 58), 124I, 114 (FIG. 58), while the actual number of mirror-pairs could range from twenty-five to fifty mirror-pairs, depending upon a particular VCSEL's emission wavelength. It should be understood, however, that the thickness and doping level of every epitaxial layer must be precisely controlled. Therefore, any deviation from design parameters, no matter how slight, would affect a typical VCSEL's performance (i.e., frequency range and flux intensity).

For example, if a VCSEL microhead were designed to emit laser light with a wavelength range, say 200- to 550-nm, the layers that go into its construction would typically need to be one-quarter of one wavelength of the laser light emission 139 (FIG. 108A) emitted by the example VCSEL's emitter layer 114 (FIG. 58). In general, each distributed layer used in a Bragg reflector, more specifically, "Distributed Bragg Reflector(s)" (DBR) 126, 124 (FIGS. 55, 56, and 58), must have an optical thickness that is equal to one-quarter of one wavelength of a VCSEL's laser light emissions.

Furthermore, the doping of the semiconductor layers used in the construction of a VCSEL microhead is accomplished by the addition of various dopant materials (e.g., gaseous n-type dopants and gaseous p-type dopants) during the epitaxial deposition of growth materials; thereby, doping the epitaxially deposited material. Typically, the semiconductor layers used in the construction of a VCSEL microhead will use many different dopant concentrations of specific dopant materials within their different intrinsic semiconductor structures forming moreover extrinsic semiconductor structures.

For example, the alternating layers of the before mentioned first distributed Bragg reflector 126 (FIG. 58) are n-type and doped with Selenium, Silicon, or the like, to a concentration that ranges from 1E15- to 1E20-cm.$^{-3}$, with a preferred range from 1E17- to 1E19-cm.$^{-3}$, while a nominal range would be from 5E17- to 5E18-cm.$^{-3}$ 124A (FIG. 58). Furthermore, the percent of composition of the before mentioned first distributed Bragg reflector 126 (FIG. 58) can be stated as (AlxGaxN/GaN) where x is the variable of 0.05 to 0.96, while in a preferred embodiment x would be greater than 0.8.

In addition, is a second distributed Bragg reflector, which is made of a plurality of alternating layers 124 (FIG. 58). Moreover, a plurality of alternating layers 124, 114 (FIG. 58) that includes one or more layers of "Aluminum-Oxide" ($Al_2O_3$) material, which are illustrated as layers 124A, 124C, 124E, 124G, 124I (FIG. 58), and one or more layers of "Zinc-Oxide" (ZnO) material, which are illustrated as layers 124B, 124D, 124F, 124H, 114 (FIG. 58). For example, a layer of "Aluminum-Oxide" ($Al_2O_3$), which was epitaxially deposited on the previously mentioned second contact-layer 128

(FIG. 58), has a layer of "Zinc-Oxide" (ZnO) subsequently and epitaxially deposited on the previously mentioned first layer of "Aluminum-Oxide" ($Al_2O_3$); thus, making a first mirror-pair of dielectric ($Al_2O_3$/ZnO) reflectors 124A, 124B (FIG. 58). If additional mirror-pairs are required, several more layers of additional mirror-pairs are deposited on the existing layers of "Aluminum Oxide" ($Al_2O_3$) and "Zinc Oxide" (ZnO). The plurality of alternating layers used to create the previously mentioned second Distributed Bragg reflector 124 (FIG. 58) are formed from one mirror-pair to ten mirror-pairs, with a preferred number of mirror-pairs ranging from four to five mirror-pairs.

However, it should be understood that the number of mirror-pairs could be adjusted for specific applications. In addition, a p-metal electrical contact 105 (FIG. 58) is formed on the previously mentioned second contact-layer 128 (FIG. 58) by disposing any suitable conductive material on the previously mentioned second contact-layer 128 (FIG. 58). Moreover, the previously mentioned metal material used in the construction of the p-metal electrical contact could be made using Indium-Tin-Oxide, Gold, Zinc, Platinum, Tungsten, and Germanium like metallic alloys. In addition, an n-metal electrical contact 106 (FIG. 58) is formed on the previously mentioned first contact-layer 122 (FIG. 58) by disposing any suitable conductive material such as Indium-Tin-Oxide, Gold, Zinc, Platinum, Tungsten, and Germanium like metallic alloys. It should be understood that depending upon which material is selected for the previously mentioned electrical contacts 105, 106 (FIG. 58) that a specific method of disposition, disposing and patterning, onto the previously mentioned first and second contact-layers 122, 128 (FIG. 58) for a specific material, will change, along with that materials electrical contacts 105, 106 (FIG. 58).

Furthermore, it should be noted that the second contact-layer 128 (FIG. 58), the second cladding-region layer 127C (FIG. 58), the multiple-quantum-well active-region 127B (FIG. 58), and the first cladding-region layer 127A (FIG. 58), after being epitaxially deposited across the entire surface area of the double hetero-junction ultra-violet VCSEL's base substrate-wafer, will altogether be simultaneously etched to form a multitude of multilayered structures, each having the same mesa etched circular shape and the same mesa etched circular diameter dimension. Consequently, being the first layers to undergo mesa etching, these layers will define the overall structure of the mesa etched double hetero-junction ultra-violet VCSEL (FIG. 58). As a design consequence, the previously mentioned layers, after being mesa-etched, will altogether have a diameter dimension that is substantially larger than the diameter dimensions altogether exhibited by a multitude of layers used to construct the partially reflective DBR based mirror-stack assembly and the emission aperture layer 114 (FIG. 58) of the double hetero-junction ultra-violet VCSEL.

Furthermore, so that the active-region 127B (FIG. 58) of the before mentioned VCSEL is not damaged by the etching process, a proton-implantation mask having a diameter dimension slightly larger than the diameter dimension of the emission aperture layer 114 (FIG. 58) of the double hetero-junction ultra-violet VCSEL. Additionally, after the etching and the proton-implantation steps have been completed, a p-metal contact 105 (FIG. 58), using a mask and an e-beam evaporation process, is deposited upon the VCSEL's second contact-layer 128 (FIG. 58), while leaving the VCSEL's emission aperture layer 114 (FIG. 58) uncovered. Further, as a next step in the construction of a VCSEL based microhead-array is the deposition of a n-metal contact, which, using a mask and an e-beam evaporation process, is made to occur upon the first contact-layer 122 (FIG. 58) for each VCSEL installed within the microhead-array.

Figure 54:
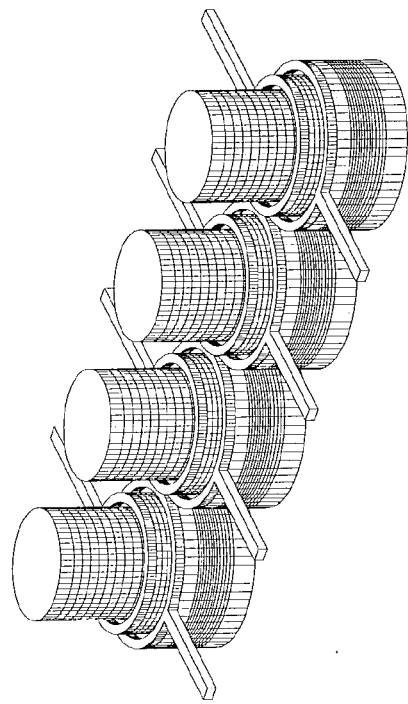
FIG. 54 is a 3D drawing showing a 5° left-side close-up of four Phase-Change Microhead Array Chip VCSEL microheads, while displaying minute structural details, along with typical diameter and spacing dimensions for the VCSEL microheads.
Figure 53:
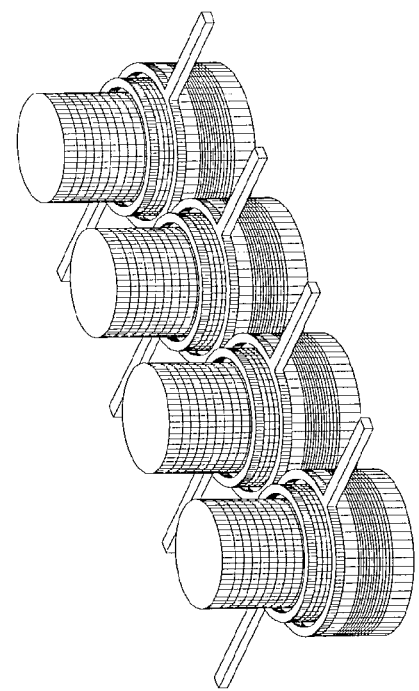
FIG. 53 is a 3D drawing showing a 5° right-side close-up of four Phase-Change Microhead Array Chip VCSEL microheads, while displaying minute structural details, along with typical diameter and spacing dimensions for the VCSEL microheads.

Moreover, as an alternative embodiment, the n-metal contact could be deposited upon a VCSEL's back-reflecting metal-alloy based substrate structure 107 (FIGS. 55, 56, and 58). Further, a back-reflecting metal-alloy based substrate structure 107 (FIGS. 55, 56, and 58), in conjunction with the "Aluminum-Gallium-Nitride/Gallium-Nitride" (AlGaN/GaN) based Distributed Bragg reflector, would provide a total reflectivity of 0.97 out of 1.0 for the double hetero-junction ultra-violet VCSEL. Additionally, when VCSEL microheads like the one described above are used within microhead-arrays of installed Phase-Change Microhead Array Chips, they would typically be configured as mesa etched surface emitting laser-diodes having stationary locations and a microhead-centerline to microhead-centerline spacing dimension of approximately 1000-nm (FIGS. 53, 54, and 57). Further, each VCSEL microhead installed within a microhead-array would have a mesa-etched emission aperture 114 (FIG. 59) with a circular diameter dimension of approximately 1000-nm, as illustrated in FIG. 59.

Alternative Operation—FIGS. 113 through 141

The alternative operational embodiment for the present Phase-Change Microhead Array Chip Hard Disk Drive invention describes two different embodiments of the invention's high-speed high-end bus-system:

1. ) A bus-system for a dedicated Phase-Change Microhead Array Chip Hard Disk Drive design; and
2. ) A bus-system for a dedicated multichannel Phase-Change Microhead Array Chip Hard Disk Drive design.

Wherein, both embodiments are thoroughly described along with the operation of high-speed PCI transcending interfaces and how they connect a Phase-Change Microhead Array Chip Hard Disk Drive up to a Host Computer or Storage Area Network system. A detailed description of Phase-Change Microhead Array Chip Hard Disk Drive's alternative operation typically begins with the initialization of a Phase-Change Microhead Array Chip Hard Disk Drive itself, which occurs by first performing a boot-up of its operating system and the running of its pre-check protocols. Thereafter, a Phase-Change Microhead Array Chip Hard Disk Drive will normally begin its regular operation with either a host-requested read-data or host-requested write-data disk-operation.

In addition, in order for Phase-Change Microhead Array Chip Hard Disk Drives to commence disk-operations as quickly as possible a Phase-Change Microhead Array Chip's R/W Control Circuit's default setting after a "PowerOn-Restart" and/or "Power-On-Initialization" has been executed is to have a selected Phase-Change Microhead Array Chip's read-channel enabled. The purpose of enabling a Phase-Change Microhead Array Chip's read-channel just after a "Power-On-Restart" and/or "Power-On-Initialization" is so that the (OP Code) "Operational Code" from a system containing disk-platter data-surface can be read from track-0 into a Disk Controller's (SDRAM) "Synchronous Dynamic Random Access Memory" buffer area 198 (FIGS. 138 and 139), which has been put aside for the execution of a Phase-Change Microhead Array Chip Hard Disk Drive's disk operating OP Code software.

Moreover, before a read-data disk-operation can take place the "Phase-Change Microhead Array Chip, Internal Data-Stripping, And Hard Disk Drive Controller" 217 (FIGS. 138 and 139) must first select and enable specific Phase-Change Microhead Array Chips. While this selection process is similar to that used in conventional hard disk drives it differs because unlike flying data-head hard disk drives every installed Phase-Change Microhead Array Chip is comprised as a stationary device (i.e., always located in one place) that contains a microhead-array comprising a multitude of stationary and singularly addressable laser-diode microheads 1 (FIGS. 113, 114, and 115). Further, the previously mentioned Phase-Change Microhead Array Chip process of selection is initialized through individual cables 126, 127 (FIGS. 113, 114, 115, 122, and 123) that are dedicated to every installed Phase-Change Microhead Array Chip.

For example, during a read-data disk-operation a Phase-Change Microhead Array Chip Hard Disk Drive's Disk Controller will first forward nine host-requested cylinder/track and data-sector address locations to a Phase-Change Microhead Array Chip Hard Disk Drive's "I/O Controller And Target Channel Adapter Interface" 197 (FIGS. 138 and 139) for translation and analysis. Wherein, an "I/O Controller And Target Channel Adapter Interface", which is located on a Phase-Change Microhead Array Chip Hard Disk Drive Controller's (PCB) "Printed Circuit Board" 63 (FIG. 4), 80 (FIG. 5), will temporarily store the host-requested address locations in an I/O Controller And Target Channel Adapter Interface's "Address Translation Register", which is located in the Asynchronous Optical Microhead Address Controller's "TCAMSU" 250 (FIG. 139). Next, an "I/O Controller And Target Channel Adapter Interface" will translate and analysis the address location information stored in an I/O Controller And Target Channel Adapter Interface's "Address Translation Register" into executable control-code, which will be sent 220 (FIGS. 138 and 139) to Flash SRAM memory, where it will be stored and later used by the drive's "Phase-Change Microhead Array Chip, Internal Data-Stripping, And Hard Disk Drive Controller" 217 (FIGS. 138 and 139).

Moreover, a component called the "DCMSU" 247 (FIGS. 138 and 139), which is internal to the "Phase-Change Microhead Array Chip, Internal Data-Stripping, And Hard Disk Drive Controller" 217 (FIGS. 138 and 139), reads using an address-bus 216 from flash memory the translated address location control-codes for a preselect number of microheads. These translated address location control-codes are used by the "DCMSU" 247 (FIGS. 138 and 139) to generate a multitude of thirty-two bit microhead address signals it also redirects to and is used by the Phase-Change Microhead Array Chip, Internal Data-Stripping, And Hard Disk Drive Controller's individual "Microhead Address Bus" lines 208, 209, 210 to select a multitude of microheads to perform, in parallel, read-data and/or write-data disk-operations. This dedicated multichannel bus-system comprises a group of ribbon-cables 126, 127 (FIGS. 113, 114, and 115) that separately connect each installed Phase-Change Microhead Array Chip to a hard disk drive's Disk-Controller and unit-assembly and are used to send microhead address bus-signals to each Phase-Change Microhead Array Chip that is installed in a Phase-Change Microhead Array Chip Hard Disk Drive's unit-assembly FIG. 112.

For example, each installed Microhead-array Chip will contiguously receive eight thirty-two bit microhead address signals from the Phase-Change Microhead Array Chip, Internal Data-Stripping, And Hard Disk Drive Controller, which are next latched within a Microhead-array Chip's "Microhead Addressing Unit" 131 (FIG. 124). Each time a microhead address signal is latched in circuit location 157, 158, 159 (FIG. 127) and then decoded in a microhead address decoder circuit location 162 (FIG. 128) an individual "Microhead Selection Line" (MSL) is selected to activate one particular microhead for use during a read-data disk-operation. At the same time each individual "Microhead Selection Line"

(MSL) 154 (FIG. 126) has a different voltage-signal (voltage varies from 1 to 9 volts) placed on its line, which in turn is latched in circuit location 163, 164, 165 (FIG. 129), and used to select and activate one out of nine "Track Channel Bus" (TCB) data-bus lines 150, 149, 148 (FIGS. 125 and 126).

Moreover, this step is repeated contiguously another eight times until each selected microhead has its own track-channel data-bus selected. Further, when a specific voltage is routed down a MSL line 154 it comes in contact with nine 'Voltage-Detectors' 140 (FIG. 131) that have each been configured, using a series of voltage passing diodes 139, to specifically pass only one particular voltage level. Each Voltage Detector has a ground-line (GND) 146, a CD line 145, a resistor-line 141 (FIG. 126), and a logic RESET line. When a specific voltage is passed through one of the nine 'Voltage-Detectors' 140 (FIGS. 126 and 132) the Voltage Detector's logic RESET line sends a logic "1" voltage signal to a group of three CMOS inverter logic-gates 141, causing them to allow read data-bus signals 151, 153 (FIG. 126) to pass on through to only one particular "Target Channel Bus" data-bus line 148, 149, 150 (FIG. 126). The read-data signals are generated by two photo-detectors 142, 144 (FIG. 126).

As illustrated in drawing FIGS. 113 through 139, a Phase-Change Microhead Array Chip's read-channel and its output signal's pathway begins at a Phase-Change Microhead Array Chip's two reversed-biased (SPC) "Semiconductor Photo-Conductor" semiconductor photoconductor-array read-elements 132, 142, 144, 108 (FIGS. 124, 126, 134, and 135). Further, as "magnetic-optical flux transitions", previously recorded on a Phase-Change Microhead Array Chip Hard Disk Drive disk-platter data-surfaces pass under the previously selected microheads' low-intensity data-scanning "Read Laser" 207 (FIG. 138), the two reversed-biased (SPD) "Semiconductor Photo-Diode" read-elements 142, 144 mentioned above will generate output-voltages from the reflected light they receive as disk-platter data-surfaces 203, 204 (FIG. 138) rotate under pre-selected microheads. Further, the read-channel output signals created therein, will be passed from the two reversed-biased (SPD) "Semiconductor Photo-Diode" read-elements 142, 144 previously mentioned to the read-channel's (SPDAS1) "Semiconductor Photo-Diode Analog-signal 1" 174, 176 (FIG. 135) and (SPDAS2) "Semiconductor Photo-Diode Analog-signal 2" 175, 177 (FIG. 135) inputs for pre-amplification and signal encoding, as illustrated in FIGS. 125, 132, 133, and 135. Additionally, the pre-amplification 174, 175 of a selected microhead's data-stream signal-output will occur during a Phase-Change Microhead Array Chip Hard Disk Drive's read-data disk-operation.

In addition, each Phase-Change Microhead Array Chip's microhead addressing bus-system connection consists of a 32-bit input of thirty-two contacts 136, which are assigned numbers "A0" through "A31", as illustrated in FIGS. 124 and 127. A 32-bit microhead address signal is latched when the OE1 160 (FIG. 127) and the LE1 161 (FIG. 127) chip-control circuits located within each Phase-Change Microhead Array Chip's "Microhead Addressing Unit" are simultaneously sent chip-control logic-signals, as illustrated in FIGS. 124 and 127. Further, the successfully latched 32-bit microhead selecting address-signal is next sent from the previously mentioned 32-bit "Address Latch Circuit" (FIG. 127) to the Microhead Addressing Unit's "Address Decoder Circuit" (FIG. 128) for decoding.

Subsequently, when a selected Phase-Change Microhead Array Chip's "Address Decoder Circuit" receives a 32-bit microhead location address-number selection signal (i.e., thirty-two high and low electronic signals) it will decode it internally using an "address tree decoder" circuit, as illustrated in FIG. 128. The process of decoding a latched 32-bit microhead location address-number by the before mentioned "address tree decoder" circuit results in the enabling of one microhead selecting "Microhead Selection-Line" (MSL) with a logic-high bus-signal. Wherein, the previously mentioned microhead selection-line, which, as an example is numbered as "4562", is enabled out of "4,000,000,000" (i.e., thirty-two bits) of possible selection-line addresses (i.e., actual number of addressable section-lines within each microhead chip will more likely be between 100,000 and 300,000 addressable lines).

In addition, due to what is sometimes called "inverter body effect" or the signal loss caused by semiconductor circuits containing a large number of switchable inverters; e.g., like the number of inverters present in an "address tree decoder" circuit. Moreover, this is due to the shear number of MOSFET or MESFET inverter and/or emitter gates logic-high control-signals must travel through to accomplish microhead selection, which ultimately causes original logic-high control-signals to undergo signal-loss. Consequently, an address tree decoder's enabled "Microhead Selection-Line" (MSL) will need its logic-high control-signal regenerated by the Microhead Addressing Unit's an "Address Buffer Circuit" (FIGS. 124 and 129). Additionally, an "Address Buffer Circuit" (FIGS. 124 and 129) is also used to latch MSLN voltages, which makes TCBN selection possible.

Furthermore, every MSL located within a selected Phase-Change Microhead Array Chip's microhead-array has its beginning in a Microhead Addressing Unit's "Address Decoder Circuit" (FIG. 128), while its termination is located in a respective Microhead Selection Line termination location (FIG. 126). Wherein, each individual "Microhead Selection Line" (MSL) 154 (FIG. 126) next has a different voltage-signal (voltage varies from 1 to 9 volts) placed on its line, which in turn is latched in circuit location 163, 164, 165 (FIG. 129), and used to select and activate for example one out of nine "Track Channel Bus" (TCB) data-bus lines 150, 149, 148 (FIGS. 125 and 126). This step is repeated contiguously another eight times until each selected microhead has its own track-channel data-bus. Further, when a specific voltage is routed down a MSL line 154 it comes in contact with nine 'VoltageDetectors' 140 (FIG. 131) that have each been configured, using a series of voltage passing diodes 139, to specifically pass only one particular voltage level. Each Voltage Detector has a ground-line (GND) 146, a CD line 145, a resistor-line 141 (FIG. 126), and a logic RESET line. When a specific voltage is passed through one of the nine 'Voltage-Detectors' 140 (FIGS. 126 and 132) the Voltage Detector's logic RESET line sends a logic "1" voltage signal to a group of three CMOS inverter logic-gates 141, causing them to allow read data-bus signals 151, 153 (FIG. 126) to pass on through to only one particular "Target Channel Bus" data-bus line 148, 149, 150 (FIG. 126). The read-data signals are generated by two photo-detectors 142, 144 (FIG. 126).

In addition, (RLV) "Read Laser Voltages" microhead laser power-signals, which are made input at the Phase-Change Microhead Array Chip's "Laser Signal N" (LSN) input-contacts (FIGS. 118 and 119). The switching on and period and the power-levels of electrical current that is sent to the Phase-Change Microhead Array Chip's "Laser Signal N" (LSN) power-bus lines are controlled and executed by a multitude of "Data Sequencers" (DSEQN) 235, as illustrated in FIG. 139. Further, although "Laser Signal N" (LSN) power-bus lines have been selected for a host-requested read-data disk-operation, no electrical-current will be sent down the power-lines until a host-requested data-sector has been rotated into position and detected as being underneath the host-selected microheads. Whereby, at the very instant the host-requested data-sectors line-up underneath the address selected microheads, low-powered electrical currents will be sent down the "Laser Signal N" (LSN) power-bus lines to the Phase-Change Microhead Array Chips' contacts LS1, LS2, LS3, LS4, LS5, LS6, LS7, LS8, and LSN 137 (FIGS. 118, 119, 120, 121, and 124).

Moreover, from the LSN contacts the low-powered electrical current signals are internally rerouted to the Phase-Change Microhead Array Chips' 205, 206 (FIG. 138) internal "DVR ARRAY" circuit 134 (FIGS. 124 and 136), where they undergo pre-amplification by three passive signal-shaping operational amplifiers 181, 182, 183 (FIG. 136). Further, after pre-amplification the low-powered electrical read-data signals enter their respective TCB, where they are redirected to the Phase-Change Microhead Array Chips' internal "Microhead-array" 132 (FIGS. 124, 126, and 134) and their respective oval-shaped polarity-stable VCSEL laser-diodes 143 (FIGS. 126 and 134). Next, the multitude of low-powered read-data current signals are converted by a multitude of laser-diodes 143 (FIGS. 126 and 134) into a multitude of coherent laser-beam emissions 207, which are used to read data from each microheads' respective data-track, until the host-requested data-sectors located across a multitude of respective data-tracks are simultaneously read in one complete revolution of the disk-platter data-surfaces 203, 204 (FIG. 138) containing the respective data-sectors.

Moreover, the previously mentioned data-sector as it passes underneath the host-selected microhead it is essentially scanned by the microheads' data-reading low-power laser-emissions 207 (FIG. 138). Further, as this scanning process occurs, the resultant output is a streaming data-signal, which is partially encoded during its output to the Data-Sequencer's DPLL circuit 174 (FIG. 130), where it will receive additional signal conditioning and conversion. Afterwards, the DPLL processed data-signal is next passed via the Phase-Change Microhead Array Chip, Internal Data-Stripping, And Hard Disk Drive Controller's internal bus 234 (FIG. 139) to the Phase-Change Microhead Array Chip, Internal Data-Stripping, And Hard Disk Drive Controller's internal ECC circuit 243 (FIG. 139), where it is checked against an ECC table for errors, if the data is error free it is next passed to the Phase-Change Microhead Array Chip, Internal Data-Stripping, And Hard Disk Drive Controller's internal SDRAM memory cache 199 (FIG. 139), via the Phase-Change Microhead Array Chip, Internal Data-Stripping, And Hard Disk Drive Controller's internal bus and its "Buffer Controller" (BCLR) circuit 248 and the BCLR's address, control, data-bus lines 215, where the read-data is next stored temporarily until the host-system is ready to retrieve it from memory.

Furthermore, a Phase-Change Microhead Array Chip Hard Disk Drive's "Hall-Sensors" (i.e., not shown here) will provide information pertaining to disk-platter rotation relative to data-sector location. Accomplished, using constantly changing rotational placement of permanent-magnetic rotary-elements located within a rotor-housing 202 (FIG. 138), the Disk Controller, using Hall-Sensors, can detect a rotor's location relative to the permanent-magnetic rotary-elements. In this way the Disk Controller will always know at any given moment the location and rotational position of the hard disk drive's installed disk-platters and the data-sectors they contain. Moreover, the previously mentioned rotational placement is relative to the fixed windings and poles of a "Spindle-Motor" 201 (FIG. 138). Typically, the previously mentioned "Hall-Sensors" will provide response-feedback and control information to a Phase-Change Microhead Array Chip Hard Disk Drive's "MCTRL" 211 (FIG. 138) Spindle-Motor 201 driver-circuit, which is internally located in the Phase-Change Microhead Array Chip, Internal Data-Stripping, And Hard Disk Drive Controller 217 (FIGS. 138 and 139).

Furthermore, a Phase-Change Microhead Array Chip, after being selected by a host-system to execute a read-data disk-operation, will also need to have its read-channel I/O enabled with a "Read Enable" (RE) logic-high control-signal, which is sent internally by a selected Phase-Change Microhead Array Chip's 'R/W Control Circuit', which itself comprises of three read-channel I/O enabling line-driver circuits. The three read-channel line-driver circuits (FIGS. 79, 80, 85, and 86) after their simultaneous reception of a R/W Control Circuit's "Read Enable" (RE) logic-high control-signal, will activate the read-channel's I/O; providing open connectivity to a Phase-Change Microhead Array Chip Hard Disk Drive's Disk Controller, which is waiting for the microhead selecting address-cycle to be completed in order to go ahead and execute the host-requested data retrieval.

Moreover, as illustrated in FIGS. 64A, 64C, and 64D, the read-channel's activation process is described in greater detail in the following paragraphs found below. Wherein, two logic-high control-signals are sent by two of the read-channel's three line-drivers to the (A) and (B) inputs of the read-channel's double NAND "Read Data Acknowledge" (−RDTACK) control-circuit. Whereby, if the previously mentioned (A) and (B) inputs of the read-channel's double NAND "Read Data Acknowledge" (−RDTACK) control-circuit (FIGS. 102, 103, 104, and 105) both receive logic-high control-signals, then the control-circuit's double NAND circuit will in response, output a "Read Data Acknowledge" (−RDTACK) logic-low control-signal onto the "Read Data Acknowledge" (−RDTACK) control-bus line, which is connected, via the bus-system, to every Phase-Change Microhead Array Chip installed at the input-contact labeled as pin-number "41".

Moreover, as illustrated in FIGS. 62A, 63A, 62C, and 63C, a Phase-Change Microhead Array Chip's "Read Data Acknowledge" (−RDTACK) logic-low control-signal, while being sent to pin-number "41" over the shared control-bus, will travel through a control-bus Polymer flex-cable's "Read Data Acknowledge" (−RDTACK) control-bus signal-line 30, 36 (FIGS. 1 and 6) until it reaches a "Read Data Acknowledge" (−RDTACK) input-contact, which is located in the Data Sequencer's 'Data Bus Controller'. Further, after a Data Sequencer's 'Data Bus Controller' has received the "Read Data Acknowledge" (−RDTACK) logic-low control-signal, the Data Sequencer's 'Data Bus Controller' will know that the selected Phase-Change Microhead Array Chip's read-channel is now open and is ready to read host-requested data from a host-requested data-sector. For example, data-sector "45", which is located on its respective disk-platter number "5", at cylinder/track location "4562", and is read using the addressed microhead "4562", which is located directly above cylinder/data-track location "4562".

In addition, a Phase-Change Microhead Array Chip's "Microhead Power Control Circuit" (MPCC) will also receive a "Read Enable" (RE) logic-high control-signal from a Phase-Change Microhead Array Chip's 'R/W Control Circuit', which in turn will cause the Microhead Power Control Circuit's respective transmission-gates to toggle-switch a selection (FIGS. 109 and 110) of a Phase-Change Microhead Array Chip's "Read Laser Voltage" (RLV) power-line over the Phase-Change Microhead Array Chip's "Write Laser Voltage One" (WLV1), and/or "Write Laser Voltage Two" (WLV2) power-lines. Further, once toggled, a selected power-line will have access to a Phase-Change Microhead Array Chip's "Laser Voltage Output" (LVOUT) circuit terminal (FIGS. 109 and 110), which ultimately leads to a Phase-Change Microhead Array Chip's "Laser Voltage Input" (LVIN) circuit terminal (FIGS. 107 and 111).

Furthermore, although a "Read Laser Voltage" (RLV) power-line has been selected for a host-requested read-data disk-operation, no electrical-current will be sent down the power-line to a Phase-Change Microhead Array Chip's host-selected microhead until a host-requested data-sector has been rotated into position and detected as being underneath the host-selected microhead. Whereby, at the very instant the host-requested data-sector lines-up underneath the address selected microhead, will a low-powered electrical current be sent down the power-line to the Phase-Change Microhead Array Chip's "Read Laser Voltage" (RLV) internal power-line, which in turn activates a selected microhead's data-reading low-power laser-emissions, which is continued until the whole host-requested data-sector is read in one complete revolution of the disk platter containing the sector.

Moreover, the previously mentioned data-sector as it passes underneath the host-selected microhead it is essentially scanned by the microhead's data-reading low-power laser-emissions; as this scanning process occurs, the resultant output is a streaming data-signal, which is partially encoded during its output to the Data-Sequencer's 'DPLL circuit', where it will receive additional signal conditioning and conversion. Afterwards, the signal converted data-signal is next passed via the Data-Sequencer's Disk Controller Interface to the Disk Controller's 'ECC circuit', where it is checked against an 'ECC table' for errors, if the data is error free it is next passed to the Disk Controller's 'internal memory cache' via the previously mentioned Disk Controller Interface and the Disk Controller's 'Buffer Controller circuit', where it is next stored temporarily until the host-system is ready to retrieve it.

Furthermore, a Phase-Change Microhead Array Chip Hard Disk Drive's 'Hall-Sensors' (i.e., not shown here) will provide information pertaining to the disk-platter rotation relative to data-sector location. Moreover, by using the constantly changing rotational placement of permanent-magnetic rotary-elements, which are located within a rotor-housing, the Disk Controller, using Hall-Sensors to detect the rotor located permanent-magnetic rotary-elements, will always know at any given moment the location and rotational position of the disk-platters and the data-sectors they contain. Moreover, the previously mentioned rotational placement is relative to the fixed windings and poles of a 'Spindle-Motor' 59 (FIGS. 2 and 3). Typically, the previously mentioned 'Hall-Sensors' will provide response-feedback and control information to a Phase-Change Microhead Array Chip Hard Disk Drive's 'Spindle And Power Controller' 60 (FIG. 4), 82 (FIG. 5) and Spindle-Motor's 'driver-circuit', which is located on a Disk Controller's PCB.

In addition, the before mentioned 'Hall-Sensors' (i.e., not shown here) will also provide the real-time rate of rotation and positional information for the disk-platters installed within a Phase-Change Microhead Array Chip Hard Disk Drive's unit-assembly. This information is typically sent to the before mentioned 'Spindle And Power Controller' 60 (FIG. 4), 82 (FIG. 5), which, in-turn sends disk-platter rate of rotation and positional information to a Disk Controller's 'Data Sequencer', which, in-turn precisely controls the switching on and off of a Phase-Change Microhead Array Chip Hard Disk Drive's "Read Laser Voltage" (RLV), "Write Laser Voltage One" (WLV1), or "Write Laser Voltage Two" (WLV2) all of which are laser power control signals that exhibit three different levels of electrical-current, which are used during host-requested read-data or write-data disk-operations to activate a selected microhead's laser-emissions output.

Moreover, the source of the laser-light used during host-requested disk-operations could possibly come from any applicably constructed semiconductor laser-diode, preferably a VCSEL or some other type of surface emitting laser-diode. Wherein, such semiconductor laser-diodes, along with their respective photo-detectors, would be comprised as a plurality of microheads; altogether forming a microhead-array within every Phase-Change Microhead Array Chip. Additionally, located within the previously mentioned microhead-array, there is an 'Ahrens Polarizing Analyzer' laser-light polarizer, which in one embodiment is positioned just above the top surface of a group of microhead laser-diode emitters 114 (FIG. 108A). Wherein, a multidirectional un-polarized light-beam being emitted by a host-selected microhead laser-diode 135 (FIG. 108A) is instantly changed into linearly polarized laser-light 139 (FIG. 108A) as it enters the 'Ahrens Polarizing Analyzer' calcitecrystal's bottom lowermost surface 130 (FIG. 108A). Further, because the top surfaces of the laser-diode emitters are flush up against the bottom lowermost surface of an 'Ahrens Polarizing Analyzer' calcite-crystal's bottom 130 (FIG. 108A), eliminates the need for a collimating lens allowing evanescent coupling to take place between the emitter surfaces of the laser-diodes and the bottom lowermost surface of the 'Ahrens Polarizing Analyzer'.

Moreover, when un-polarized collimated laser-light 139 (FIG. 108A) reaches the first-diagonal or hypotenuse-surface 131 (FIG. 108A) of the before mentioned analyzer's bottom calcite-crystal 130 (FIG. 108A) it becomes linearly polarized (i.e., changed from a laser-light beam that is un-polarized and omni-directional into a laser-light beam that is linearly polarized and directional), while being split into two separate laser-light beams 137, 138 (FIG. 108A). Further, because the two calcite-crystal triangles that make up an 'Ahrens Polarizing Analyzer' have a horizontal optical-axis 136 (FIG. 108A) the 'O-ray' and 'E-ray' laser-light output, which comprise the two laser-light beams created earlier by the 'Ahrens Polarizing Analyzer' 137, 138 (FIG. 108A) when the analyzer split an original laser-light beam source into two separate laser-light beams, will have a propagating direction that is naturally horizontal.

Furthermore, first of the two linearly polarized laser-light beams created by the analyzer consists of 'O-rays' 137 (FIG. 108A) (i.e., Ordinary-rays of linearly polarized light that is perpendicular to the plane of illustration FIG. 108A), which are reflected 90° to the right by the bottom calcite-crystal's 130 (FIG. 108A) diagonal hypotenuse 131 (FIG. 108A), where they are projected through and beyond the calcite crystal's right-angle plane 130 (FIG. 108A) as 'O-rays' 137 (FIG. 108A) of linearly polarized horizontal traveling light-rays. Moreover, the previously mentioned 'O-rays' are perpendicular to the plane of illustration FIG. 108A. Subsequently, the previously mentioned 'O-rays' of linearly polarized horizontal traveling laser-light continue to travel in their redirected horizontal direction 137 (FIG. 108A) until they strike 140 (FIG. 108A) the 'SPD Array 2' (FIGS. 64A and 75) "Semiconductor Photo-Diode" (SPD) reference-voltage photo-detector read element 104, 109 (FIG. 108A). Wherein, the 'O-rays' will generate a reference-voltage analog-signal, which is immediately pre-amplified by a transimpedence-amplifier (FIGS. 64A and 76) and sent to the read-channel's "Semiconductor Photo-Diode Analog-signal 2" (SPDAS2) signal input circuit as the selected Phase-Change Microhead Array Chip's reference-signal, as illustrated in FIGS. 64A, 64C, 79, 80, 81, 82, 83, 84, 85, and 86.

Furthermore, second of the two linearly polarized laser-light beams consists of vertically traveling 'E-rays' 138 (FIG. 108A) (i.e., Extraordinary-rays of linearly polarized light that are parallel to the plane of illustration FIG. 108A), which will vertically pass through the non-reflective surface-side 139 (FIG. 108A) of the Ahrens Polarizing Analyzer's 'Half-Mirror' 131 (FIG. 108A), where the Half-Mirror's reflective surface-side is facing toward the top calcite-crystal's 129 (FIG. 108A) diagonal hypotenuse's bottom-surface 131 (FIG. 108A). Further, after the previously mentioned 'Ahrens Polarizing Analyzer' converts un-polarized laser-beams into laser-beams that are linearly polarized, it will split the vertically traveling linearly polarized laser-beams into two separate laser-beams vertically traveling 'E-ray' laser-beams 142 (FIG. 108A) and into horizontally traveling 'O-ray' laser-beams. Moreover, the vertically traveling 'E-ray' laser-beams 142 (FIG. 108A) will during a read-data disk-operation be redirected to vertically strike from a perpendicular direction, the data-surface 13 (FIGS. 1, 2, 3, and 108A) of a disk-platter containing a 'Tellurium' based 'Phase-Change' recording medium 13 (FIGS. 1, 2, and 3). Further, upon vertically striking the data-surface containing 'Tellurium' based 'Phase-Change' recording medium 13 (FIGS. 1, 2, and 3) 'E-ray' laser-beams 142 (FIG. 108A) will be reflected 133 (FIG. 108A) back into a perpendicular direction 133 (FIG. 108A) towards the Phase-Change Microhead Array Chip's 'Ahrens Polarizing Analyzer' 137, 138 (FIG. 108A). Upon encountering the 'Ahrens Polarizing Analyzer' 137, 138 (FIG. 108A) the 'E-ray' laser-beams 142 (FIG. 108A) will be reflected 90° to the left by the Ahrens Polarizing Analyzer's 'Half-Mirror' 131 (FIG. 108A), where the 'E-ray' laser-beams 142 (FIG. 108A) will next be redirected to impinge upon the outer surface of the 'SPD Array 1' (FIGS. 64A and 64E) "Semiconductor Photo-Diode" (SPD) reference-voltage photo-detector read element 104, 109 (FIG. 108A). Wherein, the 'E-rays' will generate a read-voltage analog-signal, which is immediately pre-amplified by a transimpedence-amplifier (FIGS. 64A and 64F) and sent to the read-channel's "Semiconductor Photo-Diode Analog-signal 1" (SPDAS1) signal input circuit as the selected Phase-Change Microhead Array Chip's read-signal, as illustrated in FIGS. 64A, 64C, 79, 80, 81, 82, 83, 84, 85, and 86.

In addition, the previously mentioned horizontal traveling 'E-rays' 143 (FIG. 108A) of linearly polarized laser-light once it leaves the analyzer it will next become incident upon the 'SPD Array 1' (FIGS. 64A and 75) "Semiconductor Photo-Diode" (SPD) photo detector read-element (FIG. 77), which in-turn will convert the incident laser-light into electrons, generating a signal-voltage analog-signal, which in turn is pre-amplified by a transimpedence-amplifier (FIGS. 64A and 76) and sent to a read-channel's signal input "Semiconductor Photo-Diode Analog-signal 1" (SPDAS1) as a Phase-Change Microhead Array Chip's streaming data-signal, as illustrated in FIGS. 64A, 64C, 79, 80, 81, 82, 83, 84, 85, and 86.

Figure 75:
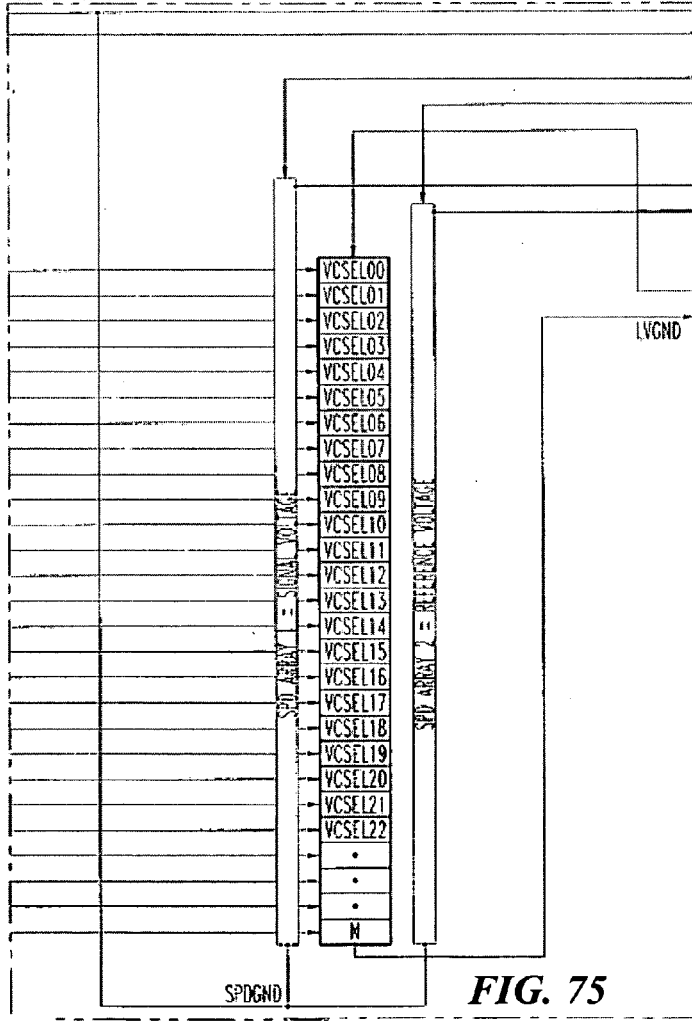
FIG. 75 is an enlarged block-diagram drawing of the Phase-Change Microhead Array Chip design used in the Phase-Change Microhead Array Chip Hard Disk Drive, which displays an enlarged block-diagram drawing showing details of the VCSEL Microhead-array, like Microhead Control-Lines, two SPC devices, and the Read and Write bus-circuits illustrated in block-diagram FIG. 64A.

To summarize the process, when data scanning laser-light comprising of 'E-rays' of linearly polarized laser-light is reflected by the data-surface containing 'Tellurium' based 'Phase-Change' recording medium 13 (FIGS. 1, 2, and 3), and the medium's area where the previously mentioned reflection takes place comprises of data-cells that are molecularly disorganized, then a Phase-Change Microhead Array Chip's 'Ahrens Polarizing Analyzer' will convert the reflected 'E-rays' into a low-intensity form of laser-light, which in turn will be made to impact the 'SPD Array 1' (FIGS. 64A and 75)

"Semiconductor Photo-Diode" (SPD) photo detector array read-element to generate a low-peak signal-voltage analog-signal. Whereby, the previously mentioned low-peak signal-voltage analog-signal will next, using a readchannel's first comparator, be compared to a divided-by-half reference-voltage analog-signal. Wherein, the previously mentioned comparator will create a digital logic-low data-bit, having a logic value of "0".

Contradictorily, when data scanning laser-light comprising of 'E-rays' of linearly polarized laser-light is reflected by the data-surface containing 'Tellurium' based 'Phase-Change' recording medium 13 (FIGS. 1, 2, and 3), and the medium's area where the previously mentioned reflection takes place comprises of data-cells that are molecularly organized, then a Phase-Change Microhead Array Chip's 'Ahrens Polarizing Analyzer' will convert the reflected 'E-rays' into a high-intensity form of laser-light, which in turn will be made to impact the 'SPD Array 1' (FIGS. 64A and 75) "Semiconductor PhotoDiode" (SPD) photo detector array read-element to generate a high-peak signal-voltage analog-signal. Whereby, the previously mentioned high-peak signal-voltage analog-signal, using a read-channel's first comparator, will be compared to a divided-by-half reference-voltage analog-signal. Wherein, the previously mentioned comparator will create a digital logic-high data-bit, having a logic value of "1".

In addition, after an addressed VCSEL based microhead has completed a successful data-reading scanning process the "5" to "15" milli-watts of electrical current used to power the host-selected microhead laser-diode during its data-reading scanning process will be switched off from the "Laser Voltage Input" (LVIN) power-bus (FIGS. 107 and 111) by a Data Sequencer's 'Bus Controller' (FIGS. 62A, 63A, 62B, 63B, 62C, and 63C), but only after the host-requested data-sectors have been successfully read from the correct disk-platter cylinder/track data-surface location into a Data Sequencer's "Digital Phase-Locked Loop" (DPLL) circuit for signal processing. Consequently, powering up a selected microhead laser-diode (FIGS. 107 and 111) for only the amount of time it is actually used to read-data greatly increases the "Mean Time Before Failure" (MTBF) rating of every single microhead laser-diode that comprises a Phase-Change Microhead Array Chip's microhead-array.

In addition, let us take a closer look at a Phase-Change Microhead Array Chip's conversion of two analog-signals to a digital data-stream, which only occurs during a host-requested read-data disk-operation. Moreover, digital data-streams are created when a host-selected Phase-Change Microhead Array Chip's microhead-array, during a read-data disk-operation, generates two analog-signals, which are then used to create the previously mentioned digital data-stream. Wherein, as the result of incidental laser-light, a first analog-signal 'signal-one' is generated from a Semiconductor Photo-Diode Array 1's output, as illustrated in FIGS. 64A, 75, 64F, 64G, 79, 80, 81, and 82, which is next passed to an analog read-channel's "Semiconductor Photo-Diode Analog Signal 1" (SPDAS1) pre-amp input as a read-channel's signal-voltage analog-signal, as illustrated in FIGS. 64A, 75, 64F, 64G, 79, 80, 81, and 82. Further, while a second analog-signal 'signal-two' is generated from a Semiconductor Photo-Diode Array 2's output, as illustrated in FIGS. 64A, 75, 64F, 64G, 79, 80, 81, and 82, which is next passed to an analog read-channel's "Semiconductor Photo-Diode Analog Signal 2" (SPDAS2) pre-amp input as a read-channel's reference-voltage analog-signal, as illustrated in FIGS. 64A, 75, 64F, 64G, 79, 80, 81, and 82.

Furthermore, during a host-requested read-data disk-operation the previously mentioned two analog-signals coming from the read channel's "Semiconductor Photo-Diode Analog Signal 1" (SPDAS1) and "Semiconductor Photo-Diode Analog Signal 2" (SPDAS2) outputs are each pre-amplified by a transimpedence amplifier. Wherein, the read-channel's signal-voltage analog-signal and reference-voltage analog-signal is made to enter a read-channel's 'Read Preamp Circuit' (FIGS. 64A and 64C). Wherein, the two analog-signals will begin to undergo an "Analog to Digital" (ADC) conversion process. Further, after receiving the read channel's signal-voltage analog-signal and reference-voltage analog-signal (FIGS. 64A and 64C), using a 'High Performance Comparator' circuit (FIGS. 79 and 80) located in a read-channel's 'Read Preamp Circuit' (FIGS. 64A and 64C), the read-channel will begin a comparison process between the read channel's signal-voltage analog-signal and reference-voltage analog-signal (FIGS. 64A and 64C). Moreover, the 'High Performance Comparator' circuit's (FIGS. 79 and 80) output of digital data-streams are based upon a comparative logic formula, which states (V1 positive)>(V0 negative)= (Logic 1)=(VDD) or +5–V, while (V1 positive)<(V0 negative)=(Logic 0)=(VSS) or 0–V.

Therefore, as illustrated in FIGS. 64A, 75, 64F, and 64G, if the signal-voltage received by the 'High Performance Comparator' SPDAS1's signal-voltage input comes from the SPDAS1's signal-voltage output as a signal with a voltage level above the voltage-divided reference-signal's voltage-threshold, then the 'High Performance Comparator' will output a logic "1", as illustrated in FIGS. 79 and 80. However, as illustrated in FIGS. 64A, 75, 64F, and 64G, if the signal-voltage received by the 'High Performance Comparator' SPDAS1's signal-voltage input comes from a SPDAS1's signal-voltage output as a signal with a voltage level that is below the voltage-divided reference-signal's voltage-threshold, then the 'High Performance Comparator' will output a logic "0", as illustrated in FIGS. 79 and 80.

Furthermore, as illustrated in FIGS. 79, 80, 81, 82, 83, 84, 85, and 86, the circuit that directly proceeds the two signal pre-amplifying analog-signal transimpedence amplifiers in the order of processing data-signal output is a Phase-Change Microhead Array Chip's read-channel 'High Performance Comparator' circuit. Further, the 'High Performance Comparator' circuit offers greater accuracy in its 'analog-to-digital' signal conversions, while providing amplification to the comparators digital-signal output. A read-channel's 'High Performance Comparator' circuit, as illustrated in FIGS. 79, 80, 81, 82, 83, 84, 85, and 86, consists of three-stages, comprising:

iv.) An input-preamplifier stage, as illustrated in FIGS. 81 and 82;

v.) A positive-feedback or what is sometimes called a decision-stage, as illustrated in FIGS. 83 and 84;

vi.) An output-buffer stage, as illustrated in FIGS. 85 and 86.

Subsequently, the previously mentioned 'input pre-amplifier stage' (FIGS. 81 and 82) amplifies incoming-signals to improve the aforesaid comparators sensitivity (i.e., increases the minimum input signal with which the previously mentioned comparator can make a precise decision when it converts an analog signal to a digital signal), while isolating input-signals from any switching noise that might come from the aforesaid positive-feedback stage (i.e., this stage is very important because of the low signal-to-noise ratio the circuit provides to the read-channel's output-signals). In summary, the 'positive-feedback stage' (FIGS. 83 and 84) is used to determine, by using a comparator, which of the two previously mentioned input-signal voltages is largest.

In addition, and in the order of signal processing is an aforesaid 'output-buffer stage' (FIGS. 85 and 86), which amplifies the signal output of the 'positive-feedback stage' creating therein a digital data-stream signal, which is next passed onto a read-channel's 'XOR Phase Detector' circuit, where it will undergo a process of encoding (FIGS. 85, 86, and 106). Wherein, a readchannel's output-signal is encoded with a frequency-specific 'Bi-Phase Data Encoding' square-wave code, as illustrated in FIGS. 91, 92, 93, 94, 95, and 106. The resulting output-signal is a 'Bi-Phase Encoded Data Stream', as illustrated in FIGS. 91, 92, 93, 94, 95, and 106, which is next passed to a Phase-Change Microhead Array Chip's "Data out" (Dout) output-contact labeled as pin-number "63".

Furthermore, as illustrated in FIGS. 62A, 63A, 62C, and 63C, only during a read-data disk-operation, when the read-data laser scanning process actually occurs, will a 'Bi-Phase Encoded Data Stream' output-signal be generated contiguously onto the aforesaid data-bus cable (FIGS. 15 and 16), where it is redirected to a Disk Controller's 'Data-Sequencer' for further signal processing. The read-channel's frequency-specific bi-phase data encoded data-stream output-signal is next made to enter a Data Sequencer's "Digital Phased-Locked Loop" (DPLL) circuit for further signal processing (FIGS. 62A, 63A, 62B, and 63B). Wherein, the previously mentioned data-stream output-signal is next decoded and its clock-signal is recovered (FIG. 106) (the following paragraphs will explain this process in detail).

Moreover, as illustrated in FIGS. 62A, 63A, 62B, and 63B, during a host requested read-data disk-operation a Data Sequencer has a 'Data Transfer Rate Frequency Analyzer' (FIGS. 62A, 63A, 62B, and 63B) calculate the optimal transfer frequency-rate for any data-zone needing to be read during the operation, and then communicates that calculation to a Data Sequencer's 'Multi-Frequency Clock Synthesizer' module. Wherein, a Data Sequencer's 'Multi-Frequency Clock Synthesizer' using calculations it had received earlier from the 'Data Transfer Rate Frequency Analyzer', will generate and then transmit a clock-referencing voltage-signal to a Data Sequencer's "Digital Phased-Locked Loop" (DPLL) circuit, where the clock-referencing voltage-signal is used to assist in the asynchronous and error-free assimilation of data-streams that contain digital reproductions of previously stored data being retrieved from specific disk-platter data-surfaces that contain the host-requested data-sector locations.

In addition, the previously mentioned "Digital Phased-Locked Loop" (DPLL) circuit (FIGS. 62A, 63A, 62B, and 63B), which has a "Voltage Controlled Oscillator" (VCO) circuit that is used to generate a divided-by-two dclock-signal from the clock-referencing voltage-signal it receives from a Data Sequencer's 'Multi-Frequency Clock Synthesizer'. Wherein, the previously mentioned VCO will send the dclock-signal, using a "Multi-Frequency Clock" (MFCLK) control bus line (FIGS. 15 and 16), to all "Multi-Frequency Clock" (MFCLK) input-contacts labeled as pin-number "35", which is present in all Phase-Change Microhead Array Chips, as illustrated in FIGS. 11, 12, 13, and 14. Further, once received by the host-selected Phase-Change Microhead Array Chip, which as an example is labeled within this embodiment as chip number "5", the "Divided Clock" (DCLOCK) dclock-signal is rerouted from the input-contact labeled as pin-number "35" to the dclock-signal input of the read-channel's pre-dpll 'XOR Phase Detector' circuit (FIG. 106), which is located opposite the data-signal input of the read-channel's pre-dpll 'XOR Phase Detector' circuit, as illustrated in FIGS. 85, 86, 91, and 92.

Moreover, as illustrated in FIGS. 85, 86, 91, 92, and 106, to finish the encoding process the read-channel's buffered data-stream signal is next routed directly to the data-signal input (FIG. 106) of the read-channel's pre-dpll 'XOR Phase Detector' circuit, where it will undergo a final process of 'bi-phase data encoding'. For example, during the host requested read-data disk-operation, scanned data, using Phase-Change Microhead Array Chip number: "5", from data-surface: "5", using microhead: "4562", from cylinder/track number: "4562", at sector number: "43" is converted from a photo-generated analog-signal to a comparator-generated digital-signal. After which, the comparator generated digital-signal is passed onto the previously mentioned XOR phase-detector's 'Bi-Phase Data Encoding Circuit' (FIGS. 85, 86, 91, and 92), where the read-channel's data-stream output is bi-phase encoded then as a next step in the read-data disk-operation it is sent to the Data Sequencer's "Digital Phase-Locked Loop" (DPLL) circuit (FIG. 106) for further signal processing.

Furthermore, the Disk Controller's 'Data Sequencer' contains the data-receiving portion of a Phase-Change Microhead Array Chip's pre-dpll circuit, which is located within the Data-Sequencer's "Digital Phase-Locked Loop" (DPLL) circuit, as illustrated in FIGS. 62A, 63A, 62B, and 63B. Additionally, the Data Sequencer's 'DPLL circuit', as illustrated in FIGS. 62A, 63A, 62C, 63C, uses circuits located within its "Voltage Controlled Oscillator" (VCO) to recover clock-signals from the 'Bi-Phase Encoded Data Stream' output-signals it receives. Further, after a clock-signal is recovered and extracted by the 'VCO circuit' the recovered clock-signal is primarily used during a host requested read-data disk-operation to resolve any data-transfer frequency-rates for any disk-platter data-zone needed to be read during the read-data disk-operation; as per read-data requests sent by the host-system. Moreover, the Disk Controller's 'Data Sequencer' is also designed to make on-the-fly data-transfer frequency-rate comparisons, which will be used to make on-the-fly adjustments to a Phase-Change Microhead Array Chip Hard Disk Drive's data-transfer frequency-rates and spindle-motor control systems used to control the rate of rotation for all disk-platters installed into a Phase-Change Microhead Array Chip Hard Disk Drive's unit-assembly.

Therefore, when the Data Sequencer makes on-the-fly comparisons of the various feedback signals it receives; it can, using the DPLL's clock generating "Voltage Controlled Oscillator" (VCO) circuit (FIG. 106) to implement changes to the frequency-rate of its dclock output-signal, make on-the-fly changes in data-transfer frequency-rates that occur within the DPLL circuit. As a result, the Data Sequencer can implement instantly data-transferring frequency-rate optimizations and/or corrections within the system in real-time. For example, on-the-fly adjustments to a Spindle-Motor's 'constant angular velocity' are accomplished using a Data Sequencer's 'Disk Controller Interface'. Wherein, the 'Disk Controller Interface', by analyzing the feedback signals generated by the 'Spindle Motor' the 'Disk Controller Interface' can accurately control a Spindle-Motor's rate of "Revolutions-Per-Minute" (RPM) using a Disk Controller's 'Motor Controller' circuit to execute an on-the-fly control over the Spindle-Motor, as illustrated in FIGS. 62A, 63A, 62B, 63B, 62C, and 63C. Consequently, this also offers a more responsive and a faster Phased-Locked Loop of data-stream output-signals created by a selected Phase-Change Microhead Array Chip's read-channel during read-data disk-operations.

Moreover, as illustrated in FIG. 106, the Data Sequencer's "Digital Phase-Locked Loop" (DPLL) circuit, after receiving the read-channel's encoded data-stream output-signal, it will decode the 'Bi-Phase Encoded Data Stream' and recover the clock-signal contained within the data-stream's signal, using circuits located within the DPLL's "Voltage Controlled Oscillator" (VCO) circuit (FIG. 106) to execute the clock-signal's recovery. The clock-signal after being recovered by the DPLL's VCO circuit is sent to a Data Sequencer's 'Data Transfer Rate Frequency Analyzer' for further processing. Moreover, the 'Data Transfer Rate Frequency Analyzer' will use recovered clock-signals to help resolve the data-transfer frequency-rate of any data-zone requested by the host. Further, to accomplish an on-the-fly resolving of any particular data-zone's data-transfer frequency-rate the 'Data Transfer Rate Frequency Analyzer' will make an on-the-fly comparisons between the data-transfer frequency-rate of the DPLL's recovered clock-signals and the original data-transfer frequency-rates that were calculated earlier and used to initialize the read-data disk-operation for any particular data-zone containing host-requested data.

Moreover, the Data Sequencer's 'Data Transfer Frequency Rate Analyzer' will make on-the-fly comparisons between the various feedback-signals it receives. Further, the 'Data Transfer Frequency Rate Analyzer', after it makes its on-the-fly comparisons of various feedback signals, will create an optimized data-transfer frequency-rate calculation, which is next transferred to a Data Sequencer's "Multi-Frequency Clock Synthesizer" (MFCS) module, as illustrated in FIGS. 62A, 63A, 62B, and 63B. Moreover, the "Multi-Frequency Clock Synthesizer" (MFCS) will use the data-transfer frequency-rate calculation it received from the Data Sequencer's 'Data Transfer Frequency Rate Analyzer' to create a new clock-signal at the new frequency rate, which in turn will be sent to a DPLL's 'VCO circuit', where the new clock-signal is re-routed as a divided or dclock-signal to the host-selected Phase-Change Microhead Array Chip, where it will be used to implement read-data synchronization between data-stream output-signals and the Disk Controller. Additionally, as illustrated in FIGS. 62A, 63A, 62B, and 63B, the decoded 'Bi-Phase Encoded Data Stream' data-signal is re-encoded by the VCO circuit (FIG. 106) into a more conventional "Non-Return to Zero" (NRZ) encoded data-signal, which is next transferred to a Disk Controller's 'PRML Controller' circuit, where it will next undergo additional signal processing.

Moreover, the encoding of a read-channel's data-stream output-signals with 'Bi-Phase Data Encoding' is executed using an exclusive 'XOR Phase Detector' circuit to perform the process, as illustrated in FIGS. 91, 92, 93, 94, 95, and 106. As illustrated in FIG. 106, the previously described encoding strategy makes possible a quick and easy recovery of a clock-signal from the read-channel's data-stream output-signals, and the conversion of the remaining serial-data output into the more conventional "Non-Return to Zero" (NRZ) encoded data-stream, using a well-known encoding process. Further, the previously mentioned bi-phase data encoding of the read-channel's data-stream output-signals, also makes it possible to 'Digitally Phase-Lock Loop' the data-stream with much greater accuracy, while avoiding placement of an odd-parity bit at the end of every eight-bit word to eliminate the possibility of all eight bits being high. Therefore, when we use 'Bi-Phase Data Encoding' (FIG. 93) to encode a data-stream output-signal, the parity bits normally used by a data-stream output-signal to achieve full data-transfer synchronization are not needed when using this scheme. Further, because bi-phase encoding reconfigures the data-stream output-signal to have its rise and fall of its square-wave to occur at the center of the data-stream's clock, full data-transfer synchronization is easily accomplished.

In addition, the "Non-Return to Zero" (NRZ) encoded data-stream is sent by the DPLL's "Voltage Controlled Oscillator" (VCO) (FIG. 106) circuit as a serial signal to a Data Sequencer's 'PRML Controller' circuit for 'Veterbi' signal-analysis. The Data Sequencer's 'PRML Controller' circuit is also where a "Non-Return to Zero" (NRZ) encoded serial data-stream will undergo a final conversion, where it is changed into a 16-bit double data-word. After which, the reproduced data is next transferred to a Disk Controller's 'Buffer Controller' for temporary storage, so that the Data Sequencer's Disk Controller Interface and ECC circuits, as illustrated in FIGS. 62A, 63A, 62B, 63B, 62C, and 63C, can identify the temporarily stored data, as belonging to, for example, the host-requested data as contained in data-sector "43". Consequently, if the Data Sequencer's Disk Controller Interface and ECC circuits, as illustrated in FIGS. 62A, 63A, 62B, 63B, 62C, and 63C, make a positive target-sector identification, for example as in the case of data-sector "43", then the read-data that the Disk Controller's 'Buffer Controller' has temporarily stored can be presented to the host-system in the form of 16-bit data-blocks, which is executed through a Disk Controller's 'IDE or SCSI Interface Controller'.

In addition, during a read-data disk-operation, when a full data-sector is read (i.e., for example data-sector "43" being a full data-sector of "1024k") into the Disk Controller's 'Buffer Controller' for temporary storage, after which the Disk Controller's "Error Correction Control" (ECC) circuit module will check to see if the firmware stored in a Disk Controller's 'Serial EEPROM' needs to apply "Error Correction Control" (ECC) to the temporarily stored reproduced data. Further, the Disk Controller's 'Buffer Controller' will store the reproduced data into a temporary memory-cache, while ECC, if needed, is applied to it, if it is not then the reproduced data is transferred to the host-system using an IDE or an SCSI interface as the transfer interface. Wherein, a Disk Controller's 'IDE or SCSI Interface Controller' is used to execute and control the transfer of host-requested data to the host-system; for example, the transfer of host-requested data, which was read and reproduced from data-sector "43".

In addition, the detailed description of the present Phase-Change Microhead Array Chip Hard Disk Drive invention's alternative operational embodiment will continue, as illustrated in drawing FIGS. 64A and 64D, with a description of a Phase-Change Microhead Array Chip's write-channel, along with all of the various circuits that comprise it. Including a detailed description explaining how the write-channel gives connectivity to the host-system, using the Phase-Change Microhead Array Chip Hard Disk Drive's SCSI or IDE interface, which is both used in the first embodiment to connect a Phase-Change Microhead Array Chip Hard Disk Drive up to the host computer system.

Furthermore, a write-channel's signal-path during a write-data disk-operation will essentially follow a reversal of the steps used to describe the read-channel's signal-path during a read-data disk-operation. Moreover, a host-system executes a write-data disk-operation within a Phase-Change Microhead Array Chip Hard Disk Drive by first presenting it with a 16-bit data-word data-block. The previously mentioned data-block is sent to the 'IDE or SCSI Interface Controller' located within the Phase-Change Microhead Array Chip Hard Disk Drive's Disk Controller, via an IDE or SCSI interface connector attached to the Disk Controller's PCB. During a write-data disk-operation, the 16-bit data-word data-block would first be transmitted to the Disk Controller's 'Buffer Controller' for temporary storage in a Phase-Change Microhead Array Chip Hard Disk Drive's cache memory.

To explain further, because data-blocks can be presented to a Phase-Change Microhead Array Chip Hard Disk Drive at transfer-rates that exceeds the transfer-rate at which a Phase- Change Microhead Array Chip Hard Disk Drive can write-data to a disk-platter's data-surface, data is stored temporarily in the Buffer Controller's cache-memory. Further, the host-system can present data to a Phase-Change Microhead Array Chip Hard Disk Drive for storage at transfer-rates independent of the transfer-rate at which a Phase-Change Microhead Array Chip Hard Disk Drive can write-data to a diskplatter's data-surface.

Therefore, upon correct identification of a target-sector's address, the before mentioned data-block will be shifted to a Data Sequencer's 'Disk Controller Interface' and then to the drive's 'ECC' circuits, as illustrated in FIGS. 62A, 63A, 62B, 63B, 62C, and 63C. After the data-block is shifted to the drive's 'ECC' circuits, "Error Correction Code" (ECC) will be generated and appended to the before mentioned data-block. A Data Sequencer's 'Data Encoder' will next convert the previously mentioned data-blocks into a "Non-Return to Zero" (NRZ) encoded serial data-stream input-signal. The data-stream input-signal, after being encoded will be transferred at a calculated and optimal data-transfer frequency-rate for the data-zone containing the empty data-sector the host-system will use for the data-block's storage. The data-stream input-signal is used to complete the write-data disk-operation, by using it's encoded data-stream to execute a controlled modulation of either a selected laser-diode's write-data output-power emissions to create a faithful writing of the data comprising the data-stream input-signal to a disk-platter's data-surface containing a 'Tellurium' based 'Phase-Change' recording medium 13 (FIGS. 1, 2, and 3).

Moreover, before a write-data disk-operation can take place the "Phase-Change Microhead Array Chip, Internal Data-Stripping, And Hard Disk Drive Controller" 217 (FIGS. 138 and 139) must first select and enable specific Phase-Change Microhead Array Chips. While this selection process is similar to that used in conventional hard disk drives it differs because unlike flying data-head hard disk drives every installed Phase-Change Microhead Array Chip is comprised as a stationary device (i.e., always located in one place) that contains a microhead-array comprising a multitude of stationary and singularly addressable laser-diode microheads 1 (FIGS. 113, 114, and 115). Further, the previously mentioned Phase-Change Microhead Array Chip process of selection is initialized through individual cables 126, 127 (FIGS. 113, 114, 115, 122, and 123) that are dedicated to every installed Phase-Change Microhead Array Chip.

For example, during a read-data disk-operation a Phase-Change Microhead Array Chip Hard Disk Drive's Disk Controller will first forward nine host-requested cylinder/track and data-sector address locations to a Phase-Change Microhead Array Chip Hard Disk Drive's "I/O Controller And Target Channel Adapter Interface" 197 (FIGS. 138 and 139) for translation and analysis. Wherein, an "I/O Controller And Target Channel Adapter Interface", which is located on a Phase-Change Microhead Array Chip Hard Disk Drive Controller's (PCB) "Printed Circuit Board" 63 (FIG. 4), 80 (FIG. 5), will temporarily store the host-requested address locations in an I/O Controller And Target Channel Adapter Interface's "Address Translation Register", which is located in the Asynchronous Optical Microhead Address Controller's "TCAMSU" 250 (FIG. 139). Next, an "I/O Controller And Target Channel Adapter Interface" will translate and analysis the address location information stored in an I/O Controller And Target Channel Adapter Interface's "Address Translation Register" into executable control-code, which will be sent 220 (FIGS. 138 and 139) to Flash SRAM memory, where it will be stored and later used by the drive's "Phase-Change Microhead Array Chip, Internal Data-Stripping, And Hard Disk Drive Controller" 217 (FIGS. 138 and 139).

Moreover, a component called the "DCMSU" 247 (FIGS. 138 and 139), which is internal to the "Phase-Change Microhead Array Chip, Internal Data-Stripping, And Hard Disk Drive Controller" 217 (FIGS. 138 and 139), reads using an address-bus 216 from flash memory the translated address location control-codes for a preselect number of microheads. These translated address location control-codes are used by the "DCMSU" 247 (FIGS. 138 and 139) to generate a multitude of thirty-two bit microhead address signals it also redirects to and is used by the Phase-Change Microhead Array Chip, Internal Data-Stripping, And Hard Disk Drive Controller's individual "Microhead Address Bus" lines 208, 209, 210 to select a multitude of microheads to perform, in parallel, read-data and/or write-data disk-operations. This dedicated multichannel bus-system comprises a group of ribbon-cables 126, 127 (FIGS. 113, 114, and 115) that separately connect each installed Phase-Change Microhead Array Chip to a hard disk drive's Disk-Controller and unit-assembly and are used to send microhead address bus-signals to each Phase-Change Microhead Array Chip that is installed in a Phase-Change Microhead Array Chip Hard Disk Drive's unit-assembly FIG. 112.

For example, each installed Microhead-array Chip will contiguously receive eight thirty-two bit microhead address signals from the Phase-Change Microhead Array Chip, Internal Data-Stripping, And Hard Disk Drive Controller, which are next latched within a Microhead-array Chip's "Microhead Addressing Unit" 131 (FIG. 124). Each time a microhead address signal is latched in circuit location 157, 158, 159 (FIG. 127) and then decoded in a microhead address decoder circuit location 162 (FIG. 128) an individual "Microhead Selection Line" (MSL) is selected to activate one particular microhead for use during a read-data disk-operation. At the same time each individual "Microhead Selection Line" (MSL) 154 (FIG. 126) has a different voltage-signal (voltage varies from 1 to 9 volts) placed on its line, which in turn is latched in circuit location 163, 164, 165 (FIG. 129), and used to select and activate one out of nine "Track Channel Bus" (TCB) data-bus lines 150, 149, 148 (FIGS. 125 and 126).

Moreover, this step is repeated contiguously another eight times until each selected microhead has its own track-channel data-bus selected. Further, when a specific voltage is routed down a MSL line 154 it comes in contact with nine 'Voltage-Detectors' 140 (FIG. 131) that have each been configured, using a series of voltage passing diodes 139, to specifically pass only one particular voltage level. Each Voltage Detector has a ground-line (GND) 146, a CD line 145, a resistor-line 141 (FIG. 126), and a logic RESET line. When a specific voltage is passed through one of the nine 'Voltage-Detectors' 140 (FIGS. 126 and 132) the Voltage Detector's logic RESET line sends a logic "1" voltage signal to a group of three CMOS inverter logic-gates 141, causing them to allow read data-bus signals 151, 153 (FIG. 126) to pass on through to only one particular "Target Channel Bus" data-bus line 148, 149, 150 (FIG. 126). The read-data signals are generated by two photo-detectors 142, 144 (FIG. 126).

As illustrated in drawing FIGS. 113 through 139, a Phase-Change Microhead Array Chip's read-channel and its output signal's pathway begins at a Phase-Change Microhead Array Chip's two reversed-biased (SPC) "Semiconductor Photo-Conductor" semiconductor photoconductor-array read-elements 132, 142, 144, 108 (FIGS. 124, 126, 134, and 135). Further, as "magnetic-optical flux transitions", previously recorded on a Phase-Change Microhead Array Chip Hard Disk Drive disk-platter data-surfaces pass under the previously selected microheads' low-intensity data-scanning "Read Laser" 207 (FIG. 138), the two reversed-biased (SPD) "Semiconductor Photo-Diode" read-elements 142, 144 mentioned above will generate output-voltages from the reflected light they receive as disk-platter data-surfaces 203, 204 (FIG. 138) rotate under pre-selected microheads. Further, the read-channel output signals created therein, will be passed from the two reversed-biased (SPD) "Semiconductor Photo-Diode" read-elements 142, 144 previously mentioned to the read-channel's (SPDAS1) "Semiconductor Photo-Diode Analog-signal 1" 174, 176 (FIG. 135) and (SPDAS2) "Semiconductor Photo-Diode Analog-signal 2" 175, 177 (FIG. 135) inputs for pre-amplification and signal encoding, as illustrated in FIGS. 125, 132, 133, and 135. Additionally, the pre-amplification 174, 175 of a selected microhead's data-stream signal-output will occur during a Phase-Change Microhead Array Chip Hard Disk Drive's read-data disk-operation.

In addition, each Phase-Change Microhead Array Chip's microhead addressing bus-system connection consists of a 32-bit input of thirty-two contacts 136, which are assigned numbers "A0" through "A31", as illustrated in FIGS. 124 and 127. A 32-bit microhead address signal is latched when the OE1 160 (FIG. 127) and the LE1 161 (FIG. 127) chip-control circuits located within each Phase-Change Microhead Array Chip's "Microhead Addressing Unit" are simultaneously sent chip-control logic-signals, as illustrated in FIGS. 124 and 127. Further, the successfully latched 32-bit microhead selecting address-signal is next sent from the previously mentioned 32-bit "Address Latch Circuit" (FIG. 127) to the Microhead Addressing Unit's "Address Decoder Circuit" (FIG. 128) for decoding.

Subsequently, when a selected Phase-Change Microhead Array Chip's "Address Decoder Circuit" receives a 32-bit microhead location address-number selection signal (i.e., thirty-two high and low electronic signals) it will decode it internally using an "address tree decoder" circuit, as illustrated in FIG. 128. The process of decoding a latched 32-bit microhead location address-number by the before mentioned "address tree decoder" circuit results in the enabling of one microhead selecting "Microhead Selection-Line" (MSL) with a logic-high bus-signal. Wherein, the previously mentioned microhead selection-line, which, as an example is numbered as "4562", is enabled out of "4,000,000,000" (i.e., thirty-two bits) of possible selection-line addresses (i.e., actual number of addressable section-lines within each microhead chip will more likely be between 100,000 and 300,000 addressable lines).

In addition, due to what is sometimes called "inverter body effect" or the signal loss caused by semiconductor circuits containing a large number of switchable inverters; e.g., like the number of inverters present in an "address tree decoder" circuit. Moreover, this is due to the shear number of MOSFET or MESFET inverter and/or emitter gates logic-high control-signals must travel through to accomplish microhead selection, which ultimately causes original logic-high control-signals to undergo signal-loss. Consequently, an address tree decoder's enabled "Microhead Selection-Line" (MSL) will need its logic-high control-signal regenerated by the Microhead Addressing Unit's an "Address Buffer Circuit" (FIGS. 124 and 129). Additionally, an "Address Buffer Circuit" (FIGS. 124 and 129) is also used to latch MSLN voltages, which makes TCBN selection possible.

Furthermore, every MSL located within a selected Phase-Change Microhead Array Chip's microhead-array has its beginning in a Microhead Addressing Unit's "Address Decoder Circuit" (FIG. 128), while its termination is located in a respective Microhead Selection Line termination location (FIG. 126). Wherein, each individual "Microhead Selection Line" (MSL) 154 (FIG. 126) next has a different voltage-signal (voltage varies from 1 to 9 volts) placed on its line, which in turn is latched in circuit location 163, 164, 165 (FIG. 129), and used to select and activate for example one out of nine "Track Channel Bus" (TCB) data-bus lines 150, 149, 148 (FIGS. 125 and 126). This step is repeated contiguously another eight times until each selected microhead has its own track-channel data-bus. Further, when a specific voltage is routed down a MSL line 154 it comes in contact with nine 'Voltage-Detectors' 140 (FIG. 131) that have each been configured, using a series of voltage passing diodes 139, to specifically pass only one particular voltage level. Each Voltage Detector has a ground-line (GND) 146, a CD line 145, a resistor-line 141 (FIG. 126), and a logic RESET line. When a specific voltage is passed through one of the nine 'Voltage-Detectors' 140 (FIGS. 126 and 132) the Voltage Detector's logic RESET line sends a logic "1" voltage signal to a group of three CMOS inverter logic-gates 141, causing them to allow read data-bus signals 151, 153 (FIG. 126) to pass on through to only one particular "Target Channel Bus" data-bus line 148, 149, 150 (FIG. 126). The read-data signals are generated by two photo-detectors 142, 144 (FIG. 126).

In addition, (RLV) "Read Laser Voltages" microhead laser power-signals, which are made input at the Phase-Change Microhead Array Chip's "Laser Signal N" (LSN) input-contacts (FIGS. 118 and 119). The switching on and period and the power-levels of electrical current that is sent to the Phase-Change Microhead Array Chip's "Laser Signal N" (LSN) power-bus lines are controlled and executed by a multitude of "Data Sequencers" (DSEQN) 235, as illustrated in FIG. 139. Further, although "Laser Signal N" (LSN) power-bus lines have been selected for a host-requested read-data disk-operation, no electrical-current will be sent down the power-lines until a host-requested data-sector has been rotated into position and detected as being underneath the host-selected microheads. Whereby, at the very instant the host-requested data-sectors line-up underneath the address selected microheads, low-powered electrical currents will be sent down the "Laser Signal N" (LSN) power-bus lines to the Phase-Change Microhead Array Chips' contacts LS1, LS2, LS3, LS4, LS5, LS6, LS7, LS8, and LSN 137 (FIGS. 118, 119, 120, 121, and 124).

Moreover, from the LSN contacts the low-powered electrical current signals are internally rerouted to the Phase-Change Microhead Array Chips' 205, 206 (FIG. 138) internal "DVR ARRAY" circuit 134 (FIGS. 124 and 136), where they undergo pre-amplification by three passive signal-shaping operational amplifiers 181, 182, 183 (FIG. 136). Further, after pre-amplification the low-powered electrical read-data signals enter their respective TCB, where they are redirected to the Phase-Change Microhead Array Chips' internal "Microhead-array" 132 (FIGS. 124, 126, and 134) and their respective oval-shaped polarity-stable VCSEL laser-diodes 143 (FIGS. 126 and 134). Next, the multitude of low-powered read-data current signals are converted by a multitude of laser-diodes 143 (FIGS. 126 and 134) into a multitude of coherent laser-beam emissions 207, which are used to read data from each microheads' respective data-track, until the host-requested data-sectors located across a multitude of respective data-tracks are simultaneously read in one complete revolution of the disk-platter data-surfaces 203, 204 (FIG. 138) containing the respective data-sectors.

Furthermore, a write-channel's signal-path during a write-data disk-operation will essentially follow a reversal of the steps used to describe the read-channel's signal-path during a read-data disk-operation. Moreover, a host-system executes a write-data disk-operation within a Phase-Change Microhead Array Chip Hard Disk Drive by first presenting it with a 16-bit data-word data-block. The previously mentioned data-block is sent to the 'IDE or SCSI Interface Controller' located within the Phase-Change Microhead Array Chip Hard Disk Drive's Disk Controller, via an IDE or SCSI interface connector attached to the Disk Controller's PCB. During a write-data disk-operation, the 16-bit data-word data-block would first be transmitted to the Disk Controller's 'Buffer Controller' for temporary storage in a Phase-Change Microhead Array Chip Hard Disk Drive's cache memory.

To explain further, because data-blocks can be presented to a Phase-Change Microhead Array Chip Hard Disk Drive at transfer-rates that exceeds the transfer-rate at which a Phase-Change Microhead Array Chip Hard Disk Drive can write-data to a disk-platter's data-surface, data is stored temporarily in the Buffer Controller's cache-memory. Further, the host-system can present data to a Phase-Change Microhead Array Chip Hard Disk Drive for storage at transfer-rates independent of the transfer-rate at which a Phase-Change Microhead Array Chip Hard Disk Drive can write-data to a diskplatter's data-surface.

Therefore, upon correct identification of a target-sector's address, the before mentioned data-block will be shifted to a Data Sequencer's 'Disk Controller Interface' and then to the drive's 'ECC' circuits, as illustrated in FIGS. 62A, 63A, 62B, 63B, 62C, and 63C. After the data-block is shifted to the drive's 'ECC' circuits, "Error Correction Code" (ECC) will be generated and appended to the before mentioned data-block. A Data Sequencer's 'Data Encoder' will next convert the previously mentioned data-blocks into a "Non-Return to Zero" (NRZ) encoded serial data-stream input-signal. The data-stream input-signal, after being encoded will be transferred at a calculated and optimal data-transfer frequency-rate for the data-zone containing the empty data-sector the host-system will use for the data-block's storage. The data-stream input-signal is used to complete the write-data disk-operation, by using it's encoded data-stream to execute a controlled modulation of either a selected laser-diode's write-data output-power emissions to create a faithful writing of the data comprising the data-stream input-signal to a disk-platter's data-surface containing a 'Tellurium' based 'Phase-Change' recording medium 13 (FIGS. 1, 2, and 3).

Furthermore, to enable a write-channel within a host-selected Phase-Change Microhead Array Chip, three logic-signal conditions must simultaneously occur within the host requested Phase-Change Microhead Array Chip's 'R/W Control Circuit':

iv.) Reception of a logic-high control-signal at the host-selected Phase-Change Microhead Array Chip's input-contact labeled as pin-number "34" and designated "VDD" (+5V);

v.) Reception of a logic-low control-signal at the host-selected Phase-Change Microhead Array Chip's input-contact labeled as pin-number "38" and designated "Chip Select" (−CS);

vi.) Reception of a logic-low control-signal at the host-selected Phase-Change Microhead Array Chip's input-contact labeled as pin-number "35" and designated "Read or Write enable" (R/−W).

Moreover, the three chip-control bus-signal line-conditions, previously described in the above paragraph, must first be simultaneously activated by continuous transmission of the three chip-control bus-signals across their respective chip-control bus-cable signal-lines, where they will be received by a host-selected Phase-Change Microhead Array Chip's 'R/W Control Circuit'. Wherein, the 'R/W Control Circuit' will send out three "Write Enable" (WE) bus-signals to enable the three circuits, when enabled together will create a Phase-Change Microhead Array Chip's write-channel circuit.

For example, during a write-data disk-operation the host-system will requested selection of the installed Phase-Change Microhead Array Chip number "5" to occur. This is accomplished using a physical re-direction of an Asynchronous Optical Microhead Address Controller's point-to-point "Chip Select" (−CS4) signal-line, assigned as signal-line number "4". Moreover, a cross-connect circuit redirection can easily be made to occur for the "Chip Select" (−CS4) signal-line, by making a cross-connect circuit redirection at the fifth Phase-Change Microhead Array Chip's chip-positioning circuit board. Therefore, by using the copper circuit-trace assigned as copper circuit-trace number "53" (FIG. 21), we can make a cross-connect circuit redirection to occur for "Chip Select" (−CS3) line-number "4", by creating a copper circuit-trace that begins its circuit run at the input-contact assigned as pin-number "53" of a chip-positioning circuit board's Polymer flex-cable spring-contact connector 67 (FIGS. 2, 3, and 10), and from there traces its way to the "Chip Select" (−CS) and null input-contact, where it will complete its cross-connect circuit redirection of "Chip Select" (−CS3) line-number "4", by making its circuit completing physical connection with pin-number "38" of a host-requested Phase-Change Microhead Array Chip's chip-positioning circuit board's surface-mounted chip-socket 5 (FIGS. 7, 8, and 21) using copper circuit-trace number "53" (FIG. 21).

Furthermore, every installed Phase-Change Microhead Array Chip is connected to a Phase-Change Microhead Array Chip Hard Disk Drive's three-bus system, which are labeled as:

iv.) The 'Address Bus' bus-system;
v.) The 'Data I/O Bus' bus-system;
vi.) The 'Chip Control Bus' bus-system.

Thereafter, the host-selected Phase-Change Microhead Array Chip, which is labeled as Phase-Change Microhead Array Chip number "5", becomes the only Phase-Change Microhead Array Chip connected to a Phase-Change Microhead Array Chip Hard Disk Drive's bus-system to have its write-channel, during a write-data disk-operation, activated. While all of the other installed Phase-Change Microhead Array Chips connected to a Phase-Change Microhead Array Chip Hard Disk Drive's bus-system, would have their write-channels three-stated into a "High Impedance Line State" (Hi−Z).

Furthermore, the host-selected Phase-Change Microhead Array Chip write-channel's I/O is enabled when a "Write Enable" (WE) logic-high control signal is sent to a host-selected Phase-Change Microhead Array Chip's 'R/W Control Circuit'. Additionally, as illustrated in FIGS. 96, 97, 98, and 99, a write-channel's two line-drivers will receive an R/W Control Circuit's "Write Enable" (WE) logic-high control-signal, thereby activating the previously mentioned write-channel's I/o connectivity to a Phase-Change Microhead Array Chip Hard Disk Drive's bus-system and its Disk Controller as well. Moreover, two logic-high control-signals were also sent by the previously mentioned write-channel's two line-drivers, where they entered the (A) and (B) input-terminals of a write-channel's double NAND "Write Data Acknowledge" (−WDTACK) control-circuit.

Moreover, if the previously mentioned two input-terminals (A) and (B) of a write-channel's double NAND "Write Data Acknowledge" (−WDTACK) control-circuit, as illustrated in FIGS. 102, 103, 104, and 105, were to receive logic-high control-signals, then the write-channel's double NAND "Write Data Acknowledge" (−WDTACK) control-circuit, would in response output a "Write Data Acknowledge" (−WDTACK) logic-low control-signal out onto a WDTACK's control-bus signal line, which is connected to all output-contacts labeled with a pin-number of "40" of every installed Phase-Change Microhead Array Chip, as illustrated in FIGS. 64A, 64C, and 64D.

In addition, a Phase-Change Microhead Array Chip's "Write Data Acknowledge" (−WDTACK) logic-low control-signal, after being sent to pin-number "40", will travel through a Phase-Change Microhead Array Chip Hard Disk Drive's bus-system Polymer flex-cable's "Write Data Acknowledge" (−WDTACK) control-bus signal line 30, 36 (FIGS. 1 and 6) until it reaches a "Write Data Acknowledge" (−WDTACK) input, which is located at a Data Sequencer's 'Data Bus Controller', as illustrated in FIGS. 62A, 63A, 62C, and 63C. Moreover, after the previously mentioned Data Sequencer's 'Data Bus Controller' has received the before mentioned "Write Data Acknowledge" (−WDTACK) logic-low control-signal the aforesaid Data Sequencer's 'Data Bus Controller', will know, that a host-selected Phase-Change Microhead Array Chip's write-channel is open and ready to write host-requested data to data-sector "43", which is located on cylinder/track "4562", using address selected VCSEL microhead "4562".

Furthermore, a "Microhead Power Control Circuit" (MPCC) also receives a "Write Enable" (WE) logic-high control-signal from the before mentioned 'R/W Control Circuit', which will cause the aforesaid VCSEL Microhead PCC's transmission-gate controller to switch its selection (FIGS. 109 and 110) of "Write Laser Voltage" (WLV) bus-line over to the "Read Laser Voltage" (RLV) bus-line. Moreover, the switch selected "Write Laser Voltage" (WLV) bus-line can now channel a Write Laser Voltage to a "Laser Voltage Output" (LVOUT) circuit terminal (FIGS. 109 and 110), which leads to a host-selected Phase-Change Microhead Array Chip microhead-array's input terminal "Laser Voltage Input" (LVIN) terminal (FIGS. 107 and 111), and although the previously mentioned "Write Laser Voltage" (WLV) power-line (FIGS. 107 and 111) has been selected for a host-requested write-data disk-operation no electrical-current will be sent to the host-selected microhead; at least, not until the host requested data-sector passes directly underneath the previously selected microhead. Moreover, when the host requested data-sector rotates directly underneath the previously selected VCSEL's microhead will a high-output of electrical current be sent down a "Write Laser Voltage" (WLV) power-line (FIGS. 107 and 111) turning on a host-selected microhead's high-powered write-data laser-emission output.

Furthermore, 'Hall-Sensors' (i.e., not shown here) will provide the radial position of any data-sector, at all times, on-the-fly through the permanent-magnetic rotary-elements located in the spindle motor's rotor, which are relative to the fixed windings and poles of the 'Spindle-Motor' 59 (FIGS. 2 and 3) stator. Typically, the previously mentioned 'Hall-Sensors' (i.e., not shown here) will provide response-control information to the before mentioned 'Spindle And Power Controller' 60 (FIG. 4), 82 (FIG. 5), which is the driver-circuit for the Spindle-Motor. Additionally, the aforesaid 'Hall-Sensors' (i.e. not shown here) will also provide a Phase-Change Microhead Array Chip Hard Disk Drive's disk-platters rate of rotation and positional information, which is necessary in an 'ID-less Tracking Format', to the before mentioned 'Spindle And Power Controller' 60 (FIG. 4), 82 (FIG. 5).

In addition, during a host-requested write-data disk-operation, the before mentioned 'Spindle And Power Controller' 60 (FIG. 4), 82 (FIG. 5), will in-turn send this information to the before mentioned Disk Controller's 'Data Sequencer', which in turn will control the on and off switching of the previously mentioned "Write Laser Voltage" (WLV) power-line's electric current, which is based upon the rate of rotation, and positional information it receives.

Furthermore, during a write-data disk-operation an address selected microhead will activate its data-writing high-power or medium-power laser-diode emission output, where it is applied to a disk-platter's data-surface comprising a Tellurium based recording material. Moreover, an address selected microhead's data-writing high-power or medium-power output laser-diode emission output will raise the temperature of a 500-nm in diameter domain-cell, which causes a Tellurium recording material comprising a domain-cell area to undergo a phase-change. Alternatively, if host-selected data-sectors, which are typically pre-configured within a disk-media's Tellurium data-recording material layer as a plurality of concentric circle data-track segments containing pluralities of molecularly oriented data-cells, were subjected to a host-selected laser-diode's high-power emission output, they would undergo a molecular dis-orientated phase-change, which is used to represent a binary "1"s. Contradictorily, if host-selected data-sectors, which are typically pre-configured within a disk-media's Tellurium data-recording material layer as a plurality of concentric circle data-track segments containing pluralities of molecularly oriented data-cells, were subjected to a host-selected laser-diode's medium-power emission output, they would undergo a molecular reoriented phase-change, which is used to represent binary "0"s.

The invention claimed is:

1. An optical hard disk drive, comprising:
    an enclosure;
    an optical data-storage media having at least one data recording surface, wherein the at least one data recording surface of the optical data-storage media comprises a plurality of concentric data tracks, and wherein the optical data-storage media is inside the enclosure;
    a motor to rotate the optical data-storage media; and
    a disk controller circuit inside the enclosure; and
    at least one optoelectronic component inside the enclosure and in communication with the disk controller circuit, wherein the optoelectronic component is positioned above a portion of the at least one data recording surface of the optical data-storage media, and wherein the at least one optoelectronic component comprises:
        a fixed, stationary array of microheads, wherein each microhead comprises at least one photo-emitter and at least one photo-detector, and wherein each microhead is positioned above a corresponding data track such that there is a microhead for each data track of the plurality of data tracks of the at least one data recording surface of the optical data-storage media;
        an address decoder circuit for selecting a multi-voltage level microhead select line in response to receipt of a multi-bit address from the disk controller circuit;
        a plurality of voltage comparators connected to the address decoder circuit for selecting one of the microheads of the array of microheads based on a voltage level of the microhead select line, wherein the plurality of voltage comparators each compare the voltage level of the microhead select line to a reference voltage wherein said plurality of voltage comparators simultaneously address individual microheads of said array of microheads, and wherein the array of microheads is positioned above a portion of the optical data-storage media such that the array is fixed and stationary relative to the rotating data-storage media and such that said microheads record data to and reconstruct data from the plurality of data tracks that are located concentrically across said data recording surface of said optical data-storage media.

2. The optical hard disk drive of claim 1, wherein the at least one optoelectronic component comprises gallium nitride.

3. The optical hard disk drive of claim 1, wherein the at least one optoelectronic component includes complementary metal oxide silicon circuitry.

4. The optical hard disk drive of claim 3, wherein the at least one optoelectronic component comprises gallium nitride.

5. The optical hard disk drive of claim 1, wherein the photo-detectors comprise cadmium-sulfide.

6. The optical hard disk drive of claim 1, wherein the voltage comparators comprise the same material as the photo-emitters.

7. The optical hard disk drive of claim 6, wherein the multitude of data-channels at least one optoelectronic component includes complementary metal oxide silicon circuitry.

8. The optical hard disk drive of claim 1, wherein the photo-emitters comprise gallium-arsenide.

9. The optical hard disk drive of claim 1, wherein the photo-detectors comprise silicon-on-insulator.

10. The optical hard disk drive of claim 1, wherein the enclosure comprises:
a cover;
a base connected to the cover; and
a sealing gasket between the cover and the base.

11. The optical hard disk drive of claim 1, further comprising an internal air filter inside the enclosure.

12. The optical hard disk drive of claim 11, further comprising an air foil inside the enclosure.

13. The optical hard disk drive of claim 1, wherein the at least one photo-emitters of each microhead comprises a vertical cavity surface emitting laser diode.

14. The optical hard disk drive of claim 13, wherein the at least one photo-detectors of each microhead comprises two reversed-biased photo-detectors.

15. The optical hard disk drive of claim 1, further comprising:
multiple optical data-storage media, each optical data-storage media having at least one data recording surface; and
multiple optoelectronic components, each optoelectronic component positioned above a portion of the data recording surface of one of the optical data-storage media, wherein each of the multiple optoelectronic components is in communication with the disk controller circuit.

* * * * *